US007172126B2

(12) United States Patent
Schmidt et al.

(10) Patent No.: US 7,172,126 B2
(45) **Date of Patent: *Feb. 6, 2007**

(54) WIRELESS AUTOMATIC LASER SCANNING BAR CODE SYMBOL READING SYSTEM, WHEREIN THE RF-BASED TRANSCEIVER CHIPSETS WITHIN THE WIRELESS HAND-SUPPORTABLE UNIT AND BASE STATION THEREOF ARE AUTOMATICALLY DEACTIVATED AND SAID RF DATA COMMUNICATION LINK THEREBETWEEN TERMINATED WHEN SAID SYSTEM ENTERS ITS POWER-SAVING SLEEP MODE, AND REACTIVATED AND RE-ESTABLISHED WHEN RE-ENTERING ITS OPERATIONAL MODE

(75) Inventors: Mark Schmidt, Williamstown, NJ (US); Garrett Russell, Wilmington, DE (US); David M. Wilz, Sr., Sewell, NJ (US); Robert Blake, Woodbury Heights, NJ (US); Donald T. Hudrick, Sicklerville, NJ (US); Stephen J. Colavito, Brookhaven, PA (US); C. Harry Knowles, Moorestown, NJ (US); George Rockstein, Audubon, NJ (US); Xiaoxun Zhu, Marlton, NJ (US); John Bonanno, Woodbury, NJ (US); Sung Byun, Voorhees, NJ (US); Congwei Xu, Suzhou (CN); Min Jiang, Jiangsu (CN); Lin Wang, Suzhou (CN); Meng Hu, Suzhou (CN); Hongjian Jin, Suzhou Industrial Park (CN); MingQing Ji, Suzhou New District (CN); Shamei Shi, Suzhou (CN); Ka Man Au, Philadelphia, PA (US); Patrick Giordano, Blackwood, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 266 days.
This patent is subject to a terminal disclaimer.

(21) Appl. No.: 10/630,622

(22) Filed: Jul. 30, 2003

(65) Prior Publication Data

US 2005/0199728 A1 Sep. 15, 2005

Related U.S. Application Data

(63) Continuation of application No. 10/342,433, filed on Jan. 12, 2003, now Pat. No. 7,028,904, which is a continuation-in-part of application No. 09/452,976, filed on Dec. 2, 1999, now Pat. No. 6,595,420, and a continuation-in-part of application No. 09/204,176, filed on Dec. 3, 1998, now Pat. No. 6,283,375.

(51) Int. Cl.
*G06K 7/10* (2006.01)

(52) U.S. Cl. .......................... 235/462.46; 235/472.01; 235/462.43

(58) Field of Classification Search ........... 235/462.46, 235/462.45, 472.01, 472.02, 462.43
See application file for complete search history.

(56) References Cited

U.S. PATENT DOCUMENTS 4,072,859 A 2/1978 McWaters
4,086,476 A 4/1978 King
4,240,064 A 12/1980 DevChoudhury
4,279,021 A 7/1981 See et al.
4,282,425 A 8/1981 Chadima, Jr.
4,387,297 A 6/1983 Swartz et al.
4,409,470 A 10/1983 Shepard et al.
4,431,912 A 2/1984 Dickson et al.
4,460,120 A 7/1984 Shepard et al.
4,465,926 A 8/1984 Apitz et al.
4,496,831 A 1/1985 Swartz et al.

4,521,678 A 6/1985 Winter
4,570,057 A 2/1986 Chadima, Jr. et al.
4,575,625 A 3/1986 Knowles
4,593,186 A 6/1986 Swartz et al.
4,621,189 A 11/1986 Kumar et al.
4,639,606 A 1/1987 Boles et al.
4,647,143 A 3/1987 Yamazaki et al.
4,673,805 A 6/1987 Shepard et al.
4,713,785 A 12/1987 Antonelli et al.
4,736,095 A 4/1988 Shepard et al.
4,760,248 A 7/1988 Swartz et al.
4,766,297 A 8/1988 McMillan
4,766,299 A 8/1988 Tierney et al.
4,806,742 A 2/1989 Swartz et al.
4,816,660 A 3/1989 Swartz et al.
4,825,057 A 4/1989 Swartz et al.
4,835,374 A 5/1989 Swartz et al.
4,845,349 A 7/1989 Cherry
4,877,949 A 10/1989 Danielson et al.
4,897,532 A 1/1990 Swartz et al.
D305,885 S 2/1990 Barkan et al.
4,930,848 A 6/1990 Knowles
4,933,538 A 6/1990 Heiman et al.
4,935,610 A 6/1990 Wike, Jr.
4,958,894 A 9/1990 Knowles
4,962,980 A 10/1990 Knowles
4,970,379 A 11/1990 Danstrom
5,015,833 A 5/1991 Shepard et al.
5,017,765 A 5/1991 Shepart et al.
5,019,698 A 5/1991 Eastman
5,021,641 A 6/1991 Swartz et al.
5,029,183 A 7/1991 Tymes
5,047,617 A 9/1991 Shepard et al.
5,059,777 A 10/1991 Wittensoldner et al.
5,065,003 A 11/1991 Wakatsuki et al.
5,075,538 A 12/1991 Swartz et al.
5,080,456 A 1/1992 Katz et al.
5,086,215 A 2/1992 Carsner et al.
5,107,100 A 4/1992 Shepard et al.
5,132,523 A 7/1992 Bassett
5,142,550 A 8/1992 Tymes
5,149,950 A 9/1992 Swartz et al.
5,153,417 A 10/1992 Sakai et al.
5,155,346 A 10/1992 Doing et al.
5,157,687 A 10/1992 Tymes
5,180,904 A 1/1993 Shepart et al.
5,198,650 A 3/1993 Wilke, Jr.
5,206,492 A 4/1993 Shepart et al.
5,212,370 A 5/1993 Wittensoldner et al.
5,216,231 A 6/1993 Ouchi
5,237,161 A 8/1993 Grodevant
5,247,162 A 9/1993 Swartz et al.
5,250,790 A 10/1993 Melitsky et al.
5,250,792 A 10/1993 Swartz et al.
5,260,553 A 11/1993 Rockstein et al.
5,262,627 A 11/1993 Shepard
5,272,323 A 12/1993 Martino
5,272,324 A 12/1993 Blevins
5,280,162 A 1/1994 Marwin
5,294,782 A 3/1994 Kumar
5,324,924 A 6/1994 Cal et al.
5,334,821 A 8/1994 Campo et al.
5,340,971 A 8/1994 Rockstein et al.
5,340,973 A 8/1994 Knowles et al.
5,347,113 A 9/1994 Reddersen et al.
5,354,977 A 10/1994 Roustaei
5,371,348 A 12/1994 Kumar et al.
5,420,411 A 5/1995 Saletto, Jr. et al.
5,424,525 A 6/1995 Rockstein et al.
5,468,949 A 11/1995 Swartz et al.
5,468,951 A 11/1995 Knowles et al.
5,484,992 A 1/1996 Wilz et al.
5,496,992 A 3/1996 Madan et al.
5,525,789 A 6/1996 Rockstein et al.
5,528,024 A 6/1996 Rockstein et al.
5,528,025 A * 6/1996 Swintek ................ 235/462.46
5,557,093 A 9/1996 Knowles et al.
5,581,707 A * 12/1996 Kuecken .................... 709/233
5,591,953 A 1/1997 Rockstein et al.
5,600,121 A 2/1997 Kahn et al.
5,610,386 A 3/1997 Ball et al.
5,616,908 A 4/1997 Wilz et al.
5,627,359 A 5/1997 Amundsen et al.
5,637,852 A 6/1997 Knowles et al.
5,661,292 A 8/1997 Knowles et al.
D385,265 S 10/1997 Knowles et al.
5,736,982 A 4/1998 Suzuki et al.
5,742,043 A 4/1998 Knowles et al.
5,756,982 A 5/1998 Knowles et al.
5,767,501 A 6/1998 Schmidt et al.
5,777,315 A 7/1998 Wilz et al.
5,786,582 A 7/1998 Roustaei et al.
5,789,730 A 8/1998 Rockstein et al.
5,789,731 A 8/1998 Amundsen et al.
5,796,091 A 8/1998 Schmidt et al.
5,808,285 A 9/1998 Rockstein et al.
5,825,012 A 10/1998 Rockstein et al.
5,828,048 A 10/1998 Rockstein et al.
5,828,049 A 10/1998 Knowles et al.
5,945,660 A 8/1999 Nakasuji et al.
6,158,662 A 12/2000 Kahn et al.
6,182,898 B1 2/2001 Schmidt et al.
6,318,636 B1 * 11/2001 Reynolds et al. ...... 235/472.01
6,811,088 B2 * 11/2004 Lanzaro et al. ........ 235/462.46

FOREIGN PATENT DOCUMENTS

EP 0 323 848 7/1989
EP 0 414 452 A1 2/1991
EP 0 424 097 A1 4/1991
EP 0 424 976 A2 5/1991
EP 0 871 138 A2 10/1998
JP EP 460 669 11/1991

OTHER PUBLICATIONS

The web-based publication entitled "Pocket-Sized Computing for Mobile Industry Professionals" by Symbol Technologies, Inc., http://www.smbol.com/wp/stwp0006.htm, 1998, pp. 1-3.
The 1998 press release entitled "Symbol Adds Functionality to Palmpilot" by Symbol Technologies, Inc., http://www.symbol.com/press.100pr.htm, Mar. 23, 1998, pp. 1-2.
The product brochure for the MH290 Hand Held Laser Scanner by Metrologic Instruments, Inc., 1987, pp. 1-2.
The technical publication entitled "Hand-Held Holographic Scanner having Highly Visible Locator Beam" by R.T. Cato, IBM Technical Disclosure Bulletin, vol. 27, No. 4, Sep. 1984, pp. 2021-2022.
PCT Search Report for PCT/US99/28530, 1999.
EPO Search Report for 99 96 2976.

* cited by examiner

*Primary Examiner*—Ahshik Kim
(74) *Attorney, Agent, or Firm*—Thomas J. Perkowski, Esq., P.C.

(57) ABSTRACT

Disclosed is an automatically-activated wireless code symbol reading system comprising a bar code symbol reading mechanism contained within a hand-supportable housing having a manually-activatable data transmission switch. During symbol reading operations, the bar code symbol reading mechanism automatically generates a visible laser scanning pattern for repeatedly reading one or more bar code symbols on an object during a bar code symbol reading cycle, and automatically generating a new symbol character data string in response to each bar code symbol read thereby. During system operation, the user visually aligns the visible laser scanning pattern with a particular bar code symbol on an object (e.g. product, bar code menu, etc.) so that the bar code symbol is scanned, detected and decoded in a cyclical manner. Each time the scanned bar code symbol is successfully read during a bar code symbol reading cycle, a new bar code symbol character string is produced, while an indicator light on the hand-supportable housing is actively driven. During the bar code symbol reading cycle, the user actuates the data transmission switch producing a data transmission control activation signal and enabling a currently or subsequently produced symbol character data string to be automatically selected and transmitted to the host system. By virtue of the present invention, automatically-activated hand-supportable bar code symbol readers are now able to accurately read, in an unprecedented manner, bar code symbols on bar code menus, consumer products positioned in crowded point-of-sale environments, and other objects requiring automatic identification and/or information access.

6 Claims, 161 Drawing Sheets

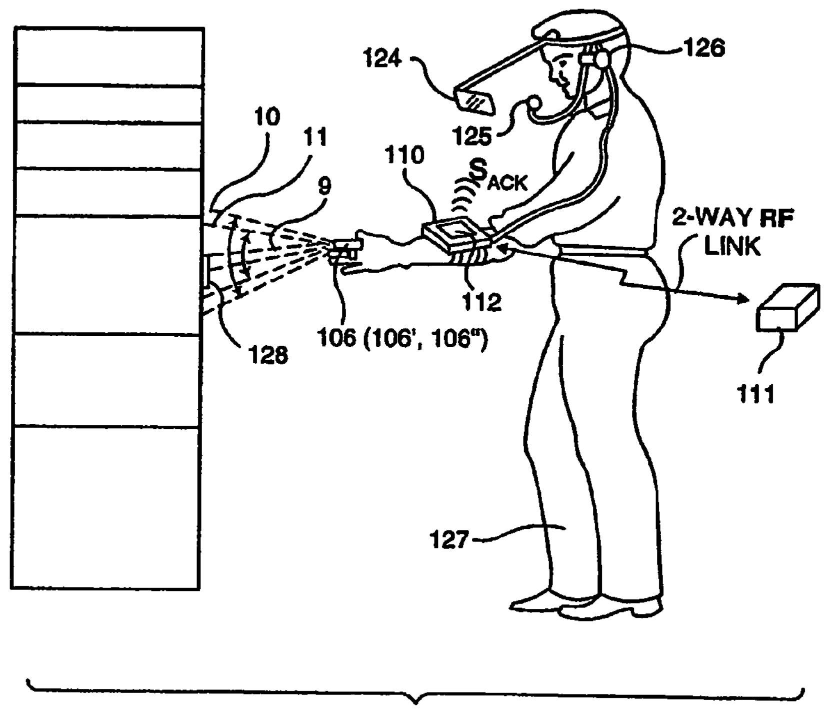
F I G. 5D

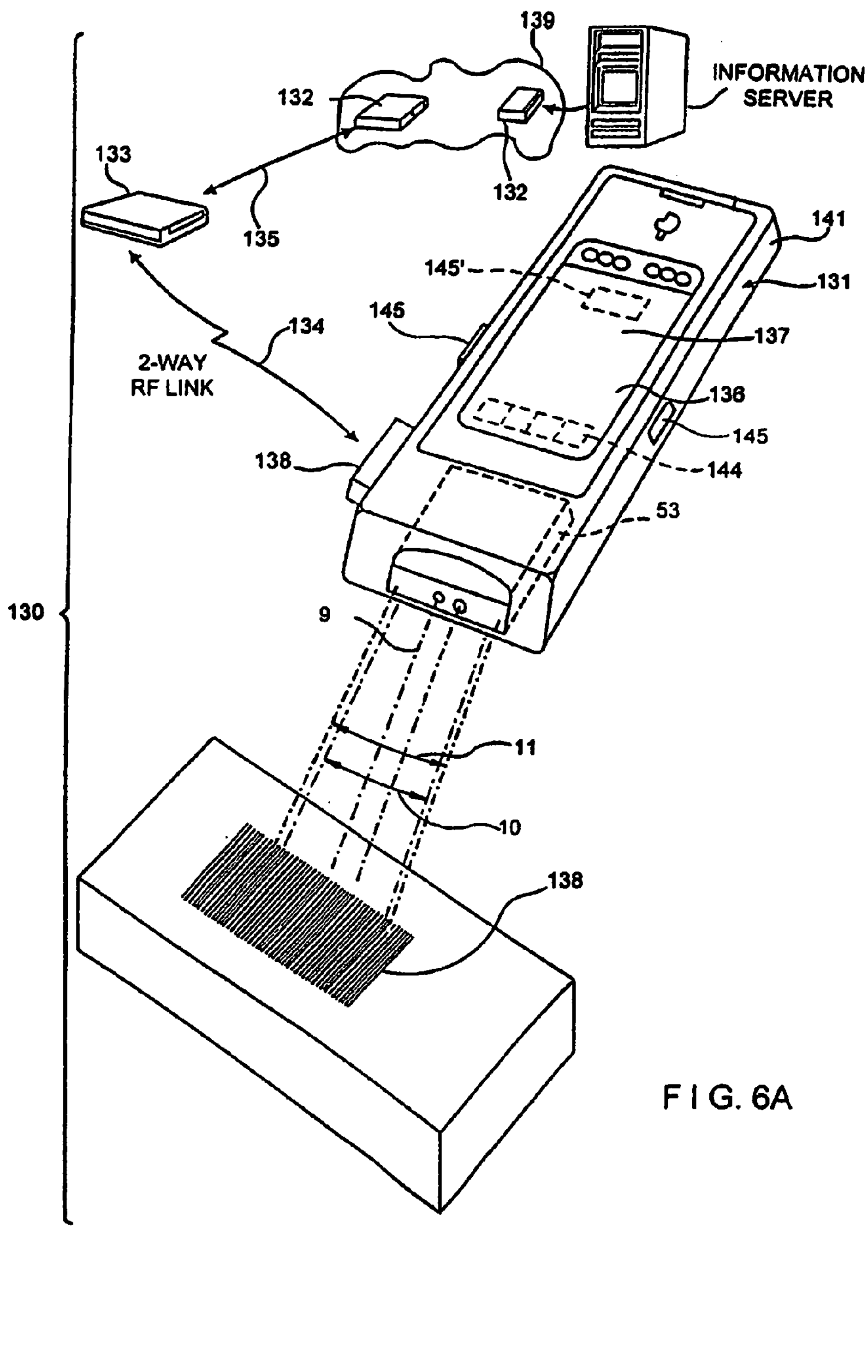
F I G. 6A

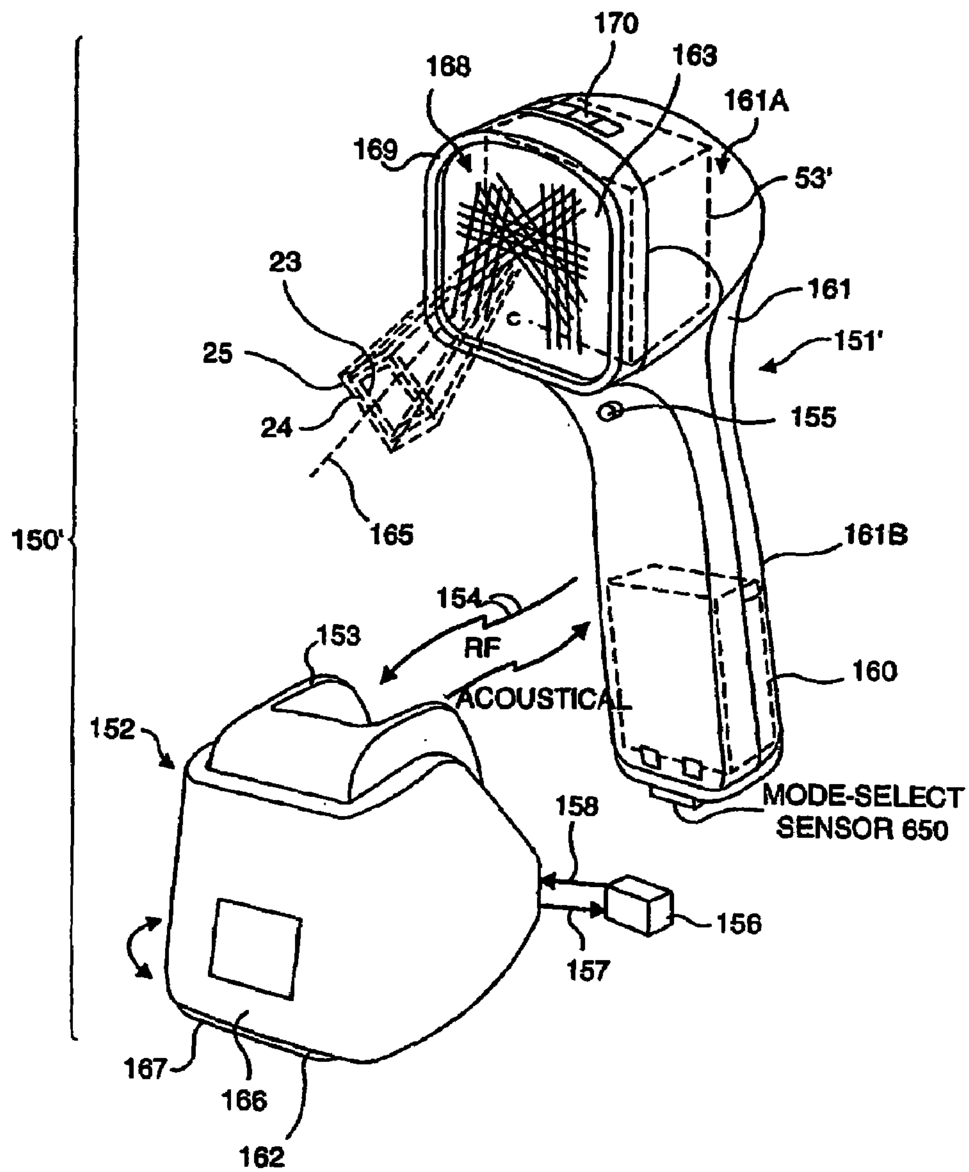
F I G. 7B

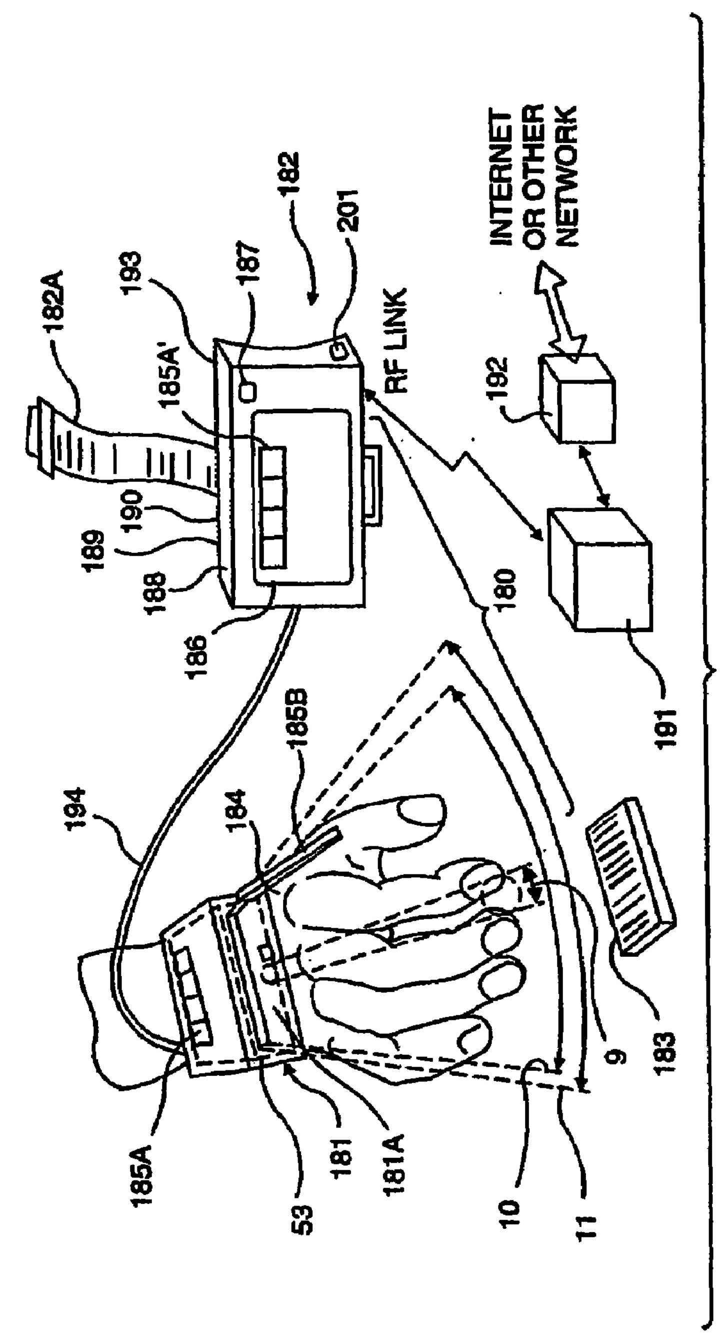
F I G. 8A

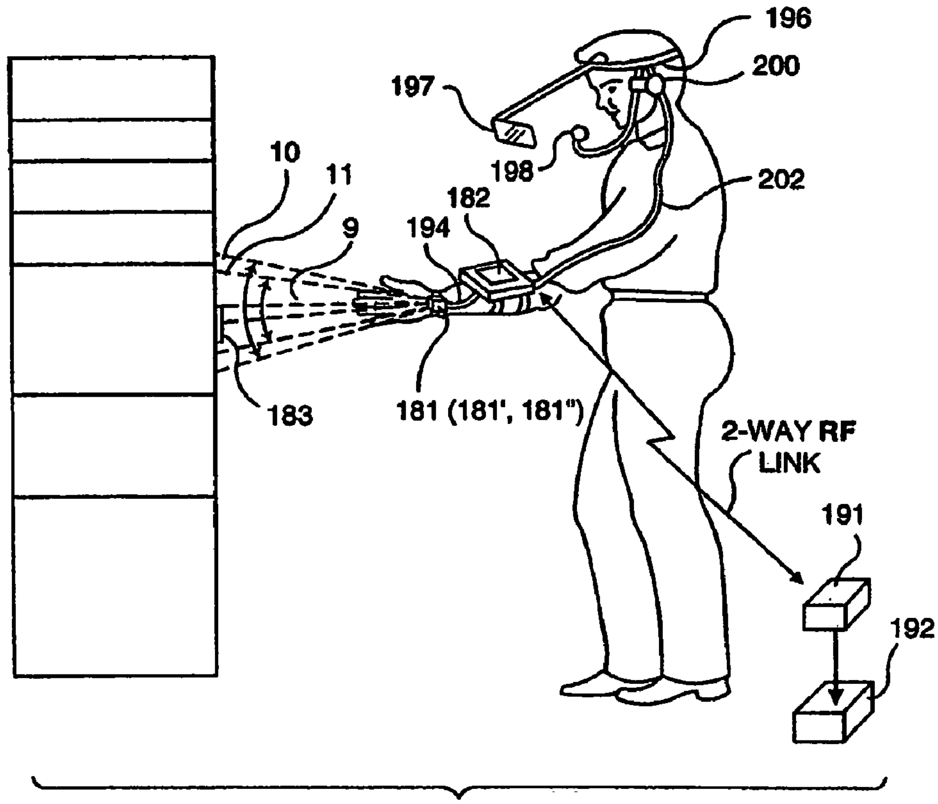
F I G. 8D

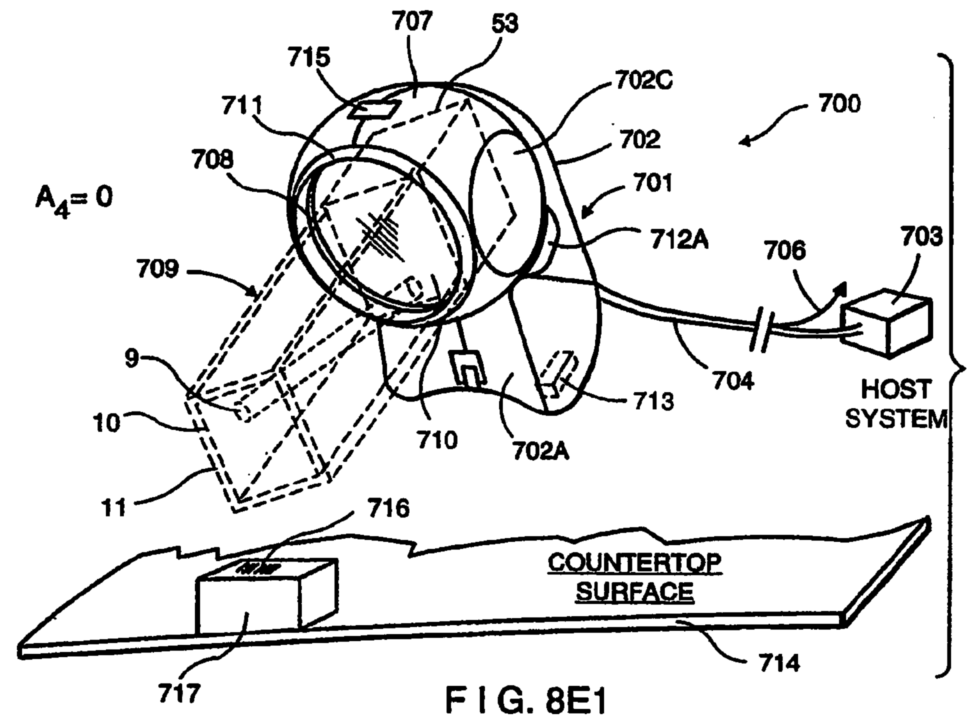
F I G. 8E1
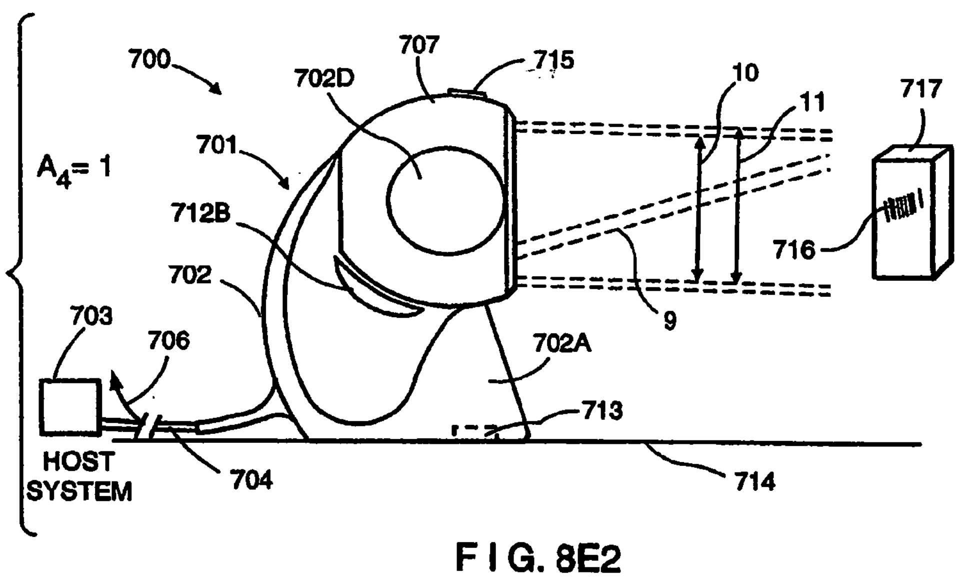
F I G. 8E2

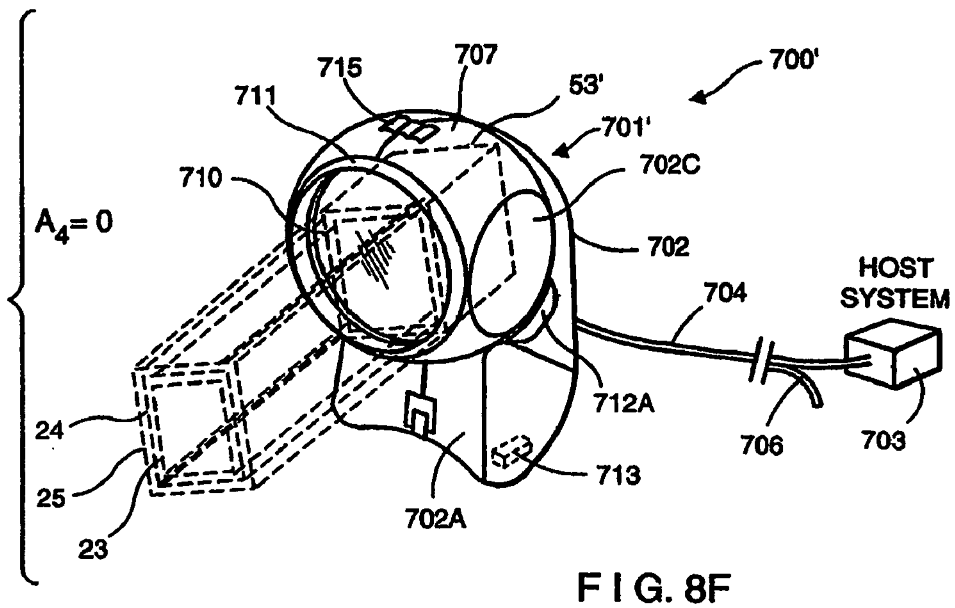
F I G. 8F
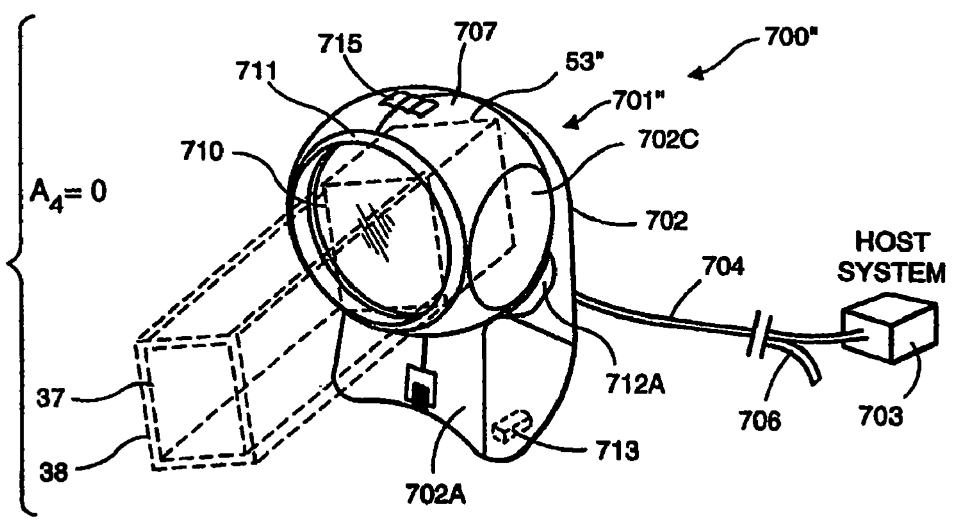
F I G. 8G

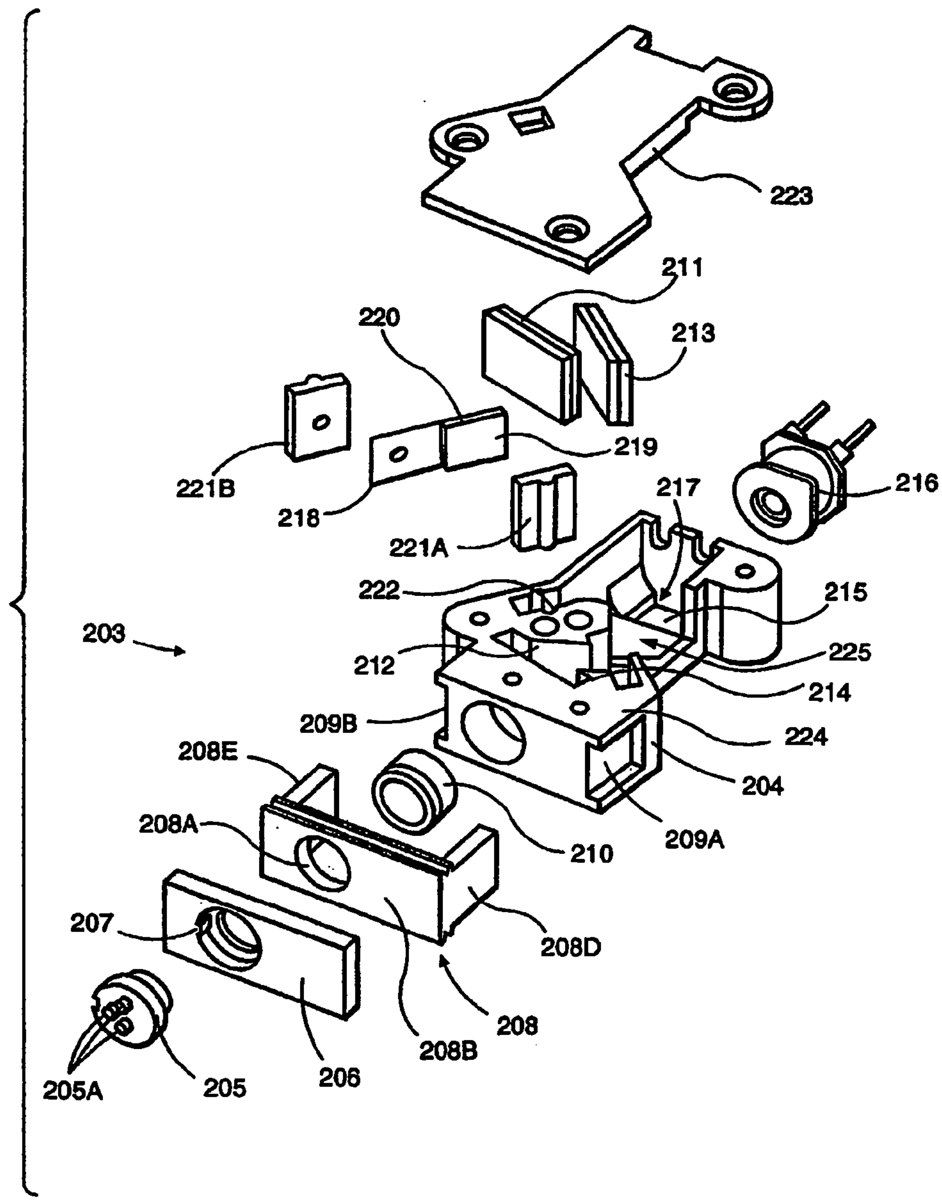
F I G. 9C

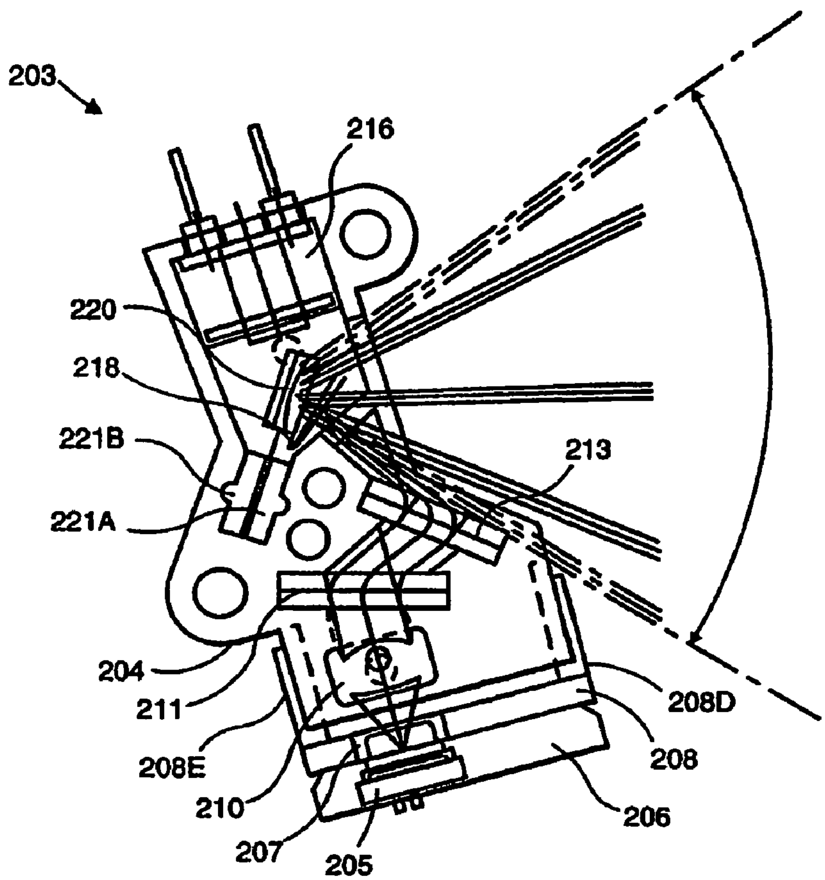
F I G. 9D

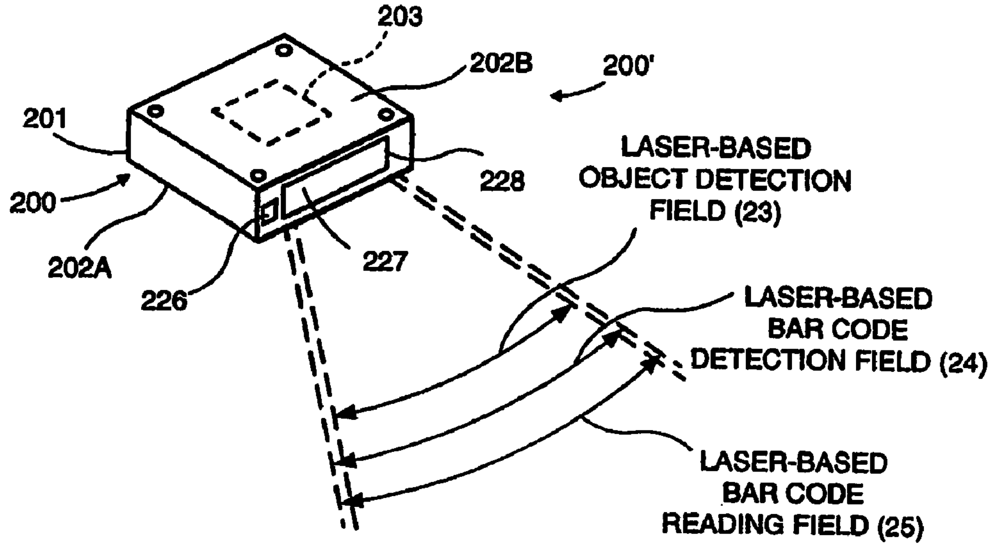
F I G. 9E
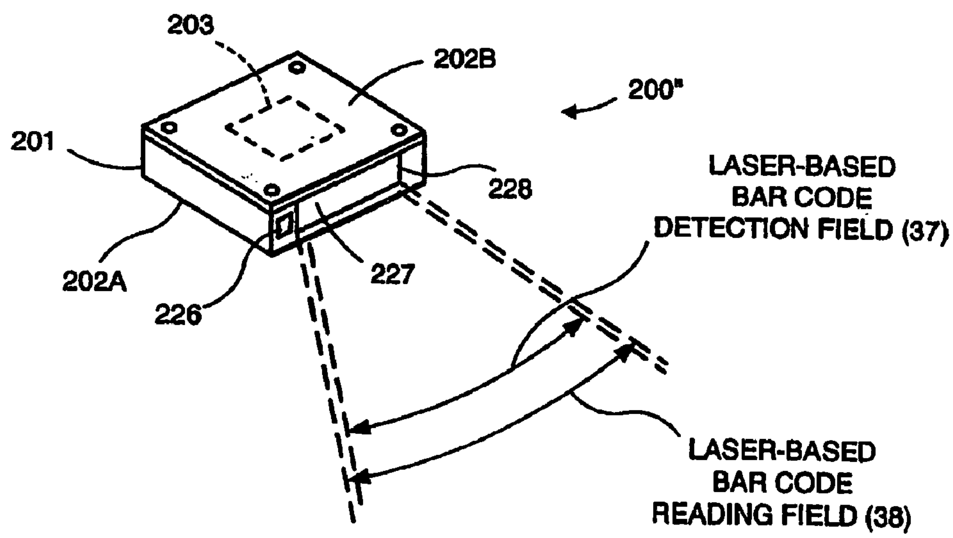
F I G. 9F

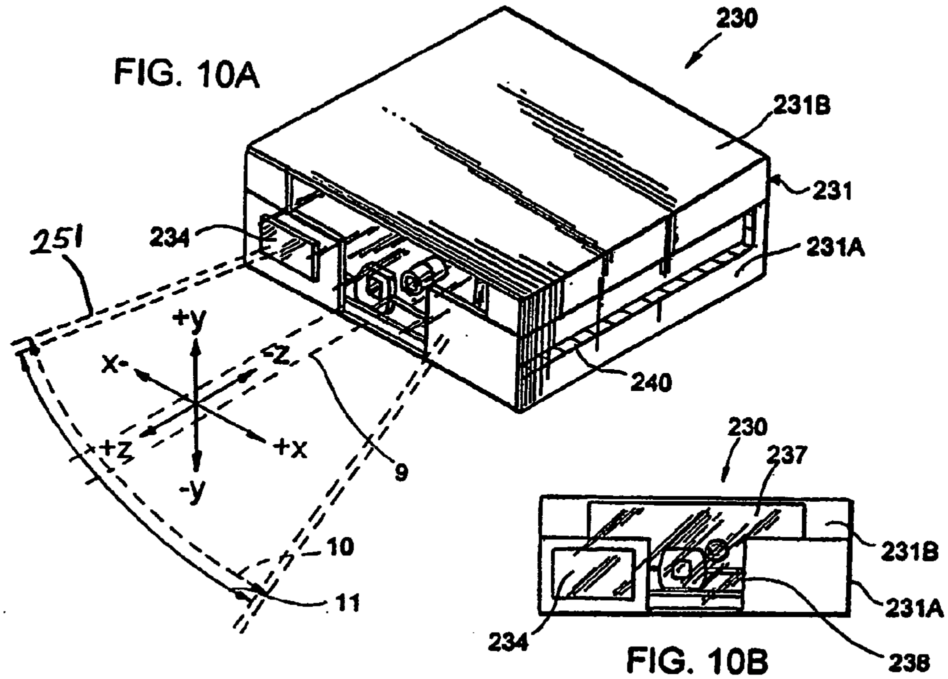
FIG. 10A
FIG. 10B
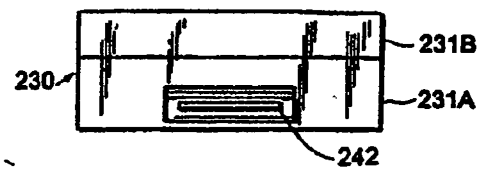
FIG. 10C
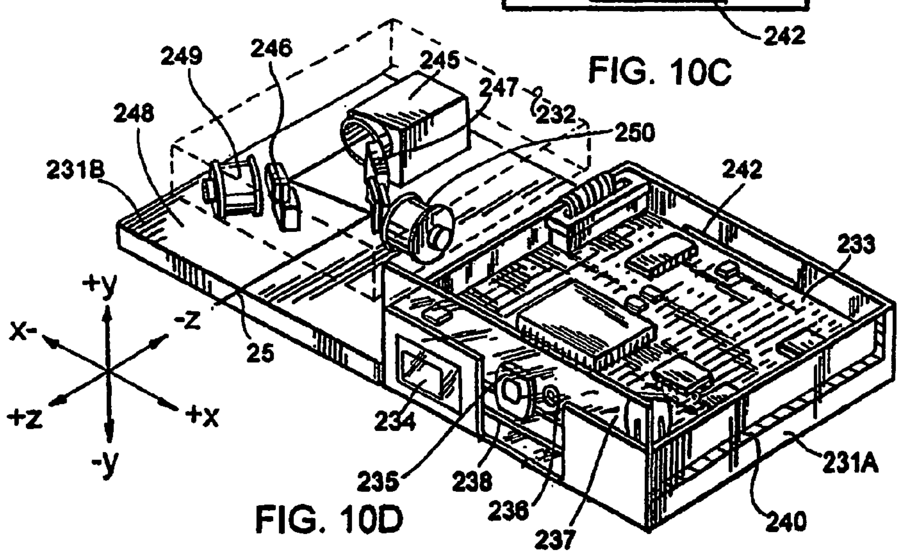
FIG. 10D

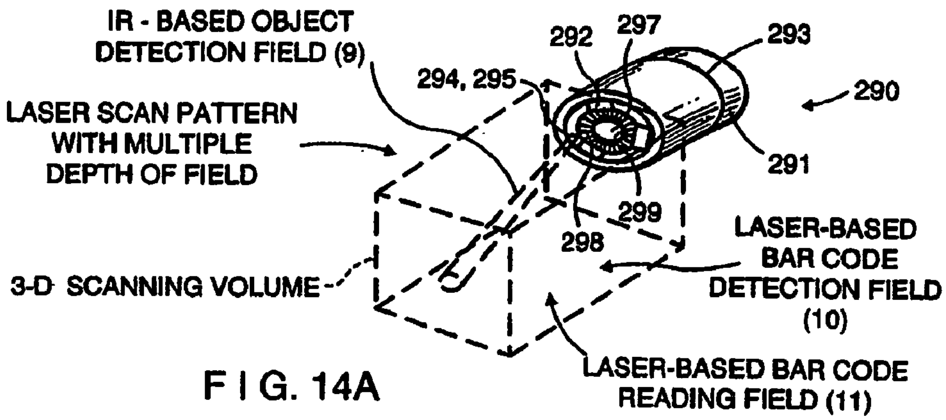
F I G. 14A
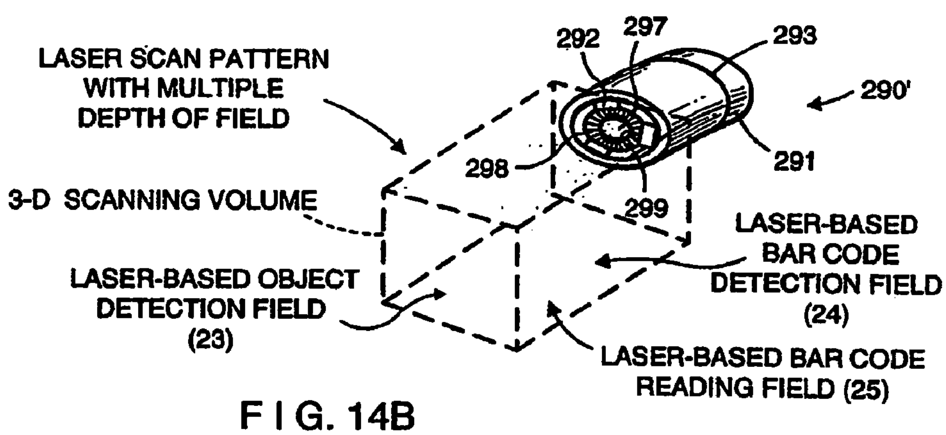
F I G. 14B
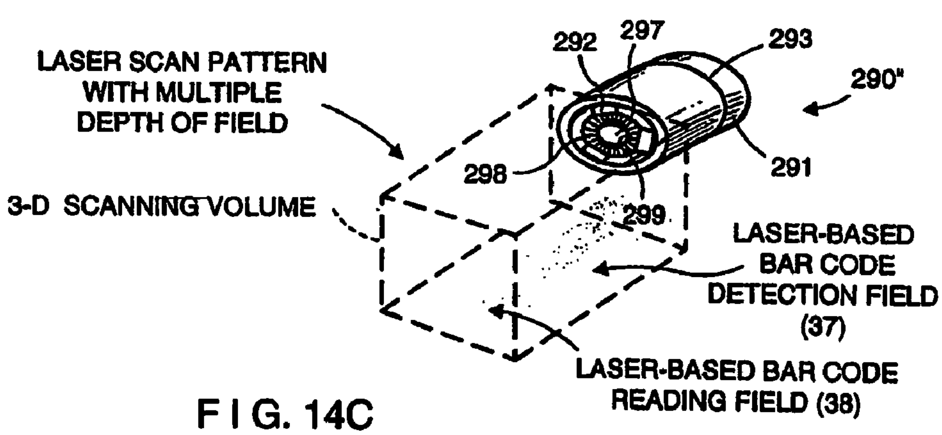
F I G. 14C

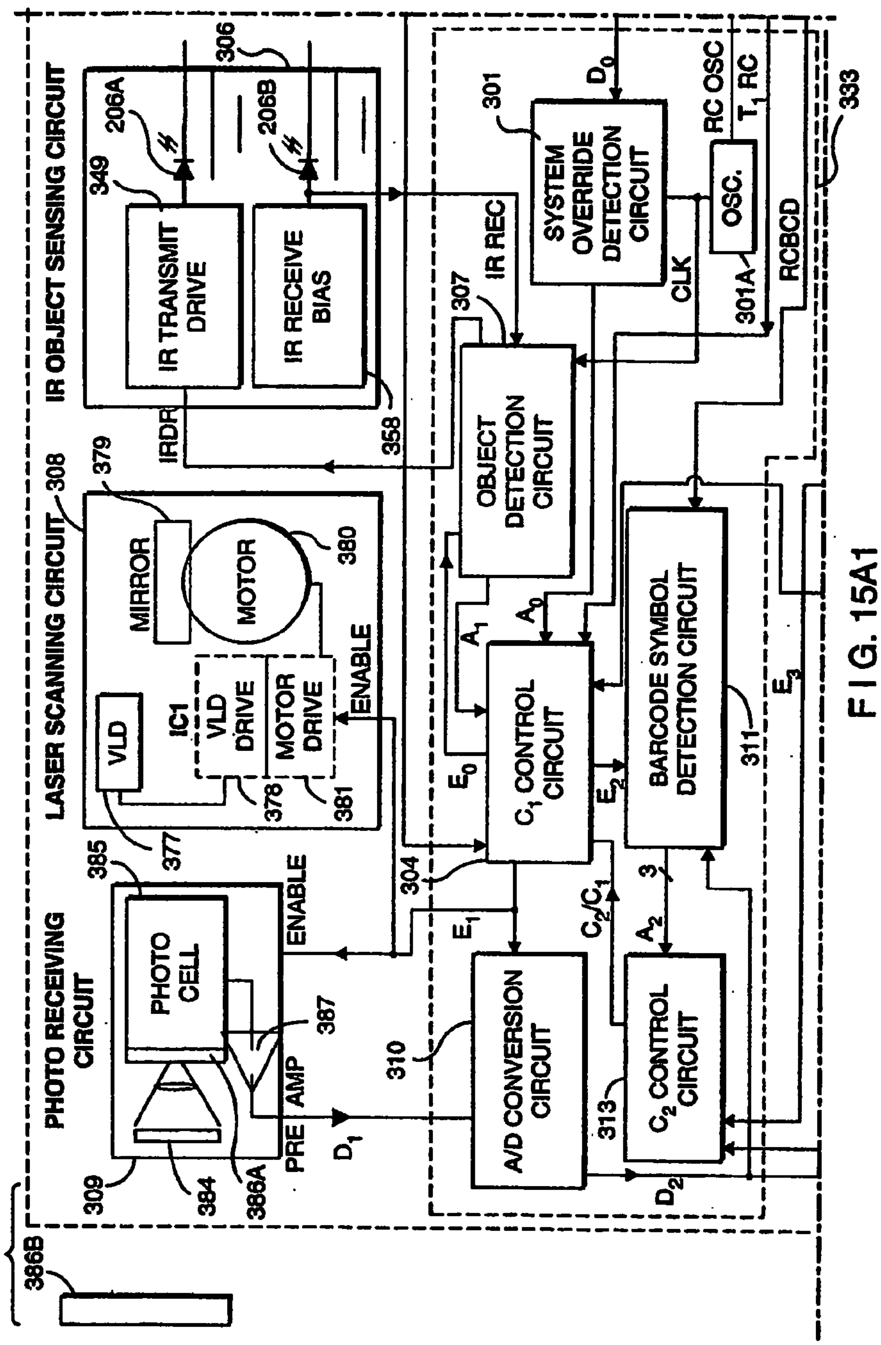
FIG. 15A1

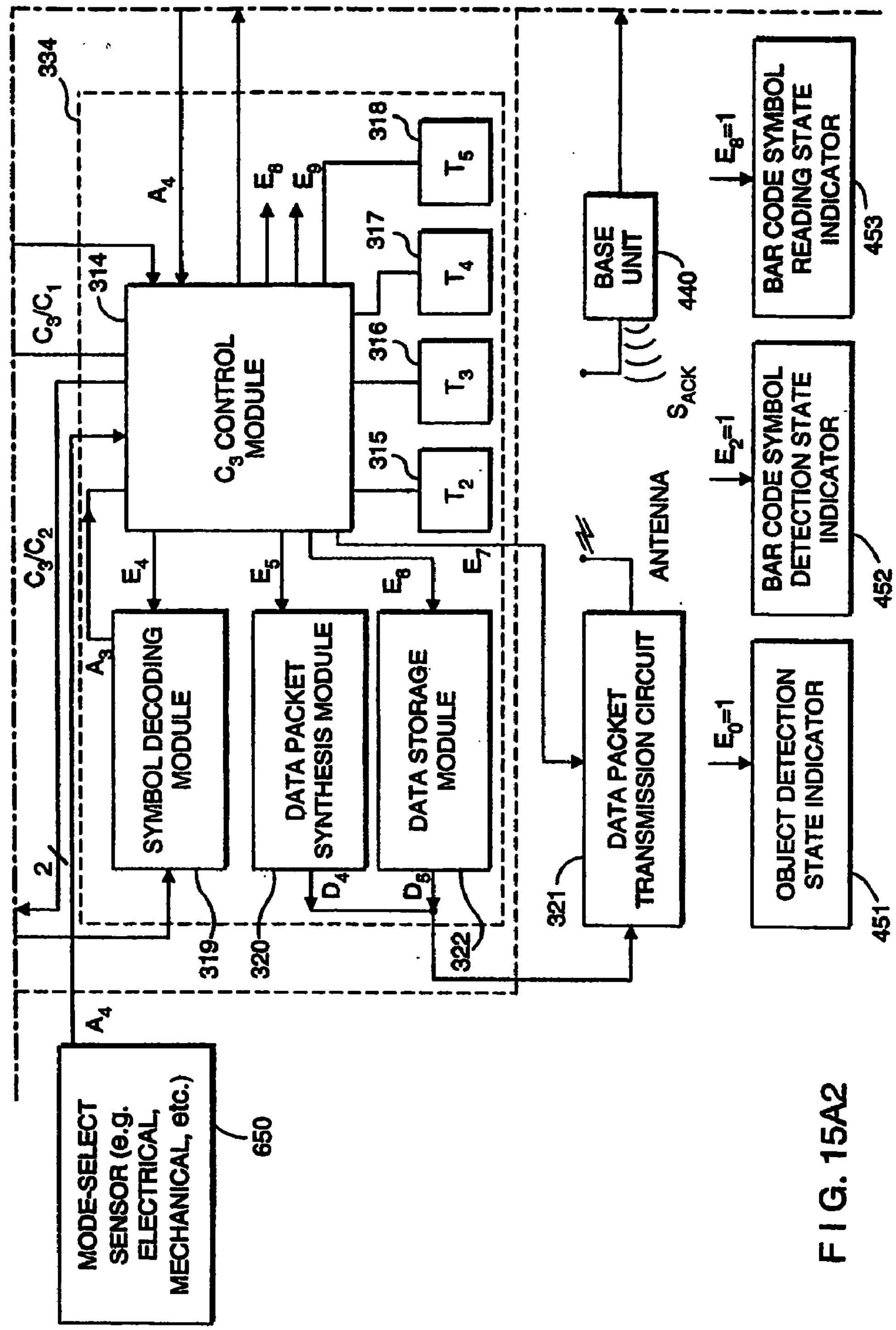
FIG. 15A2

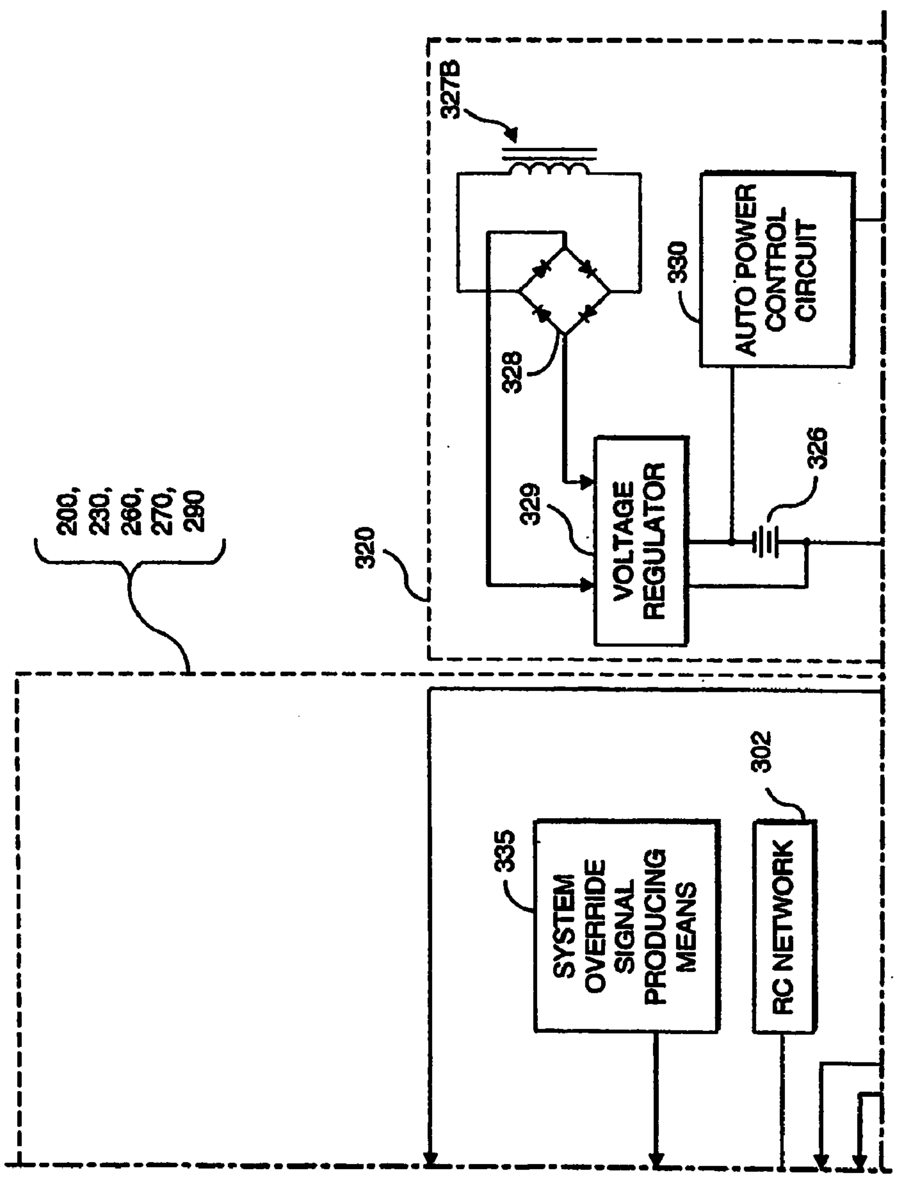
FIG. 15A3

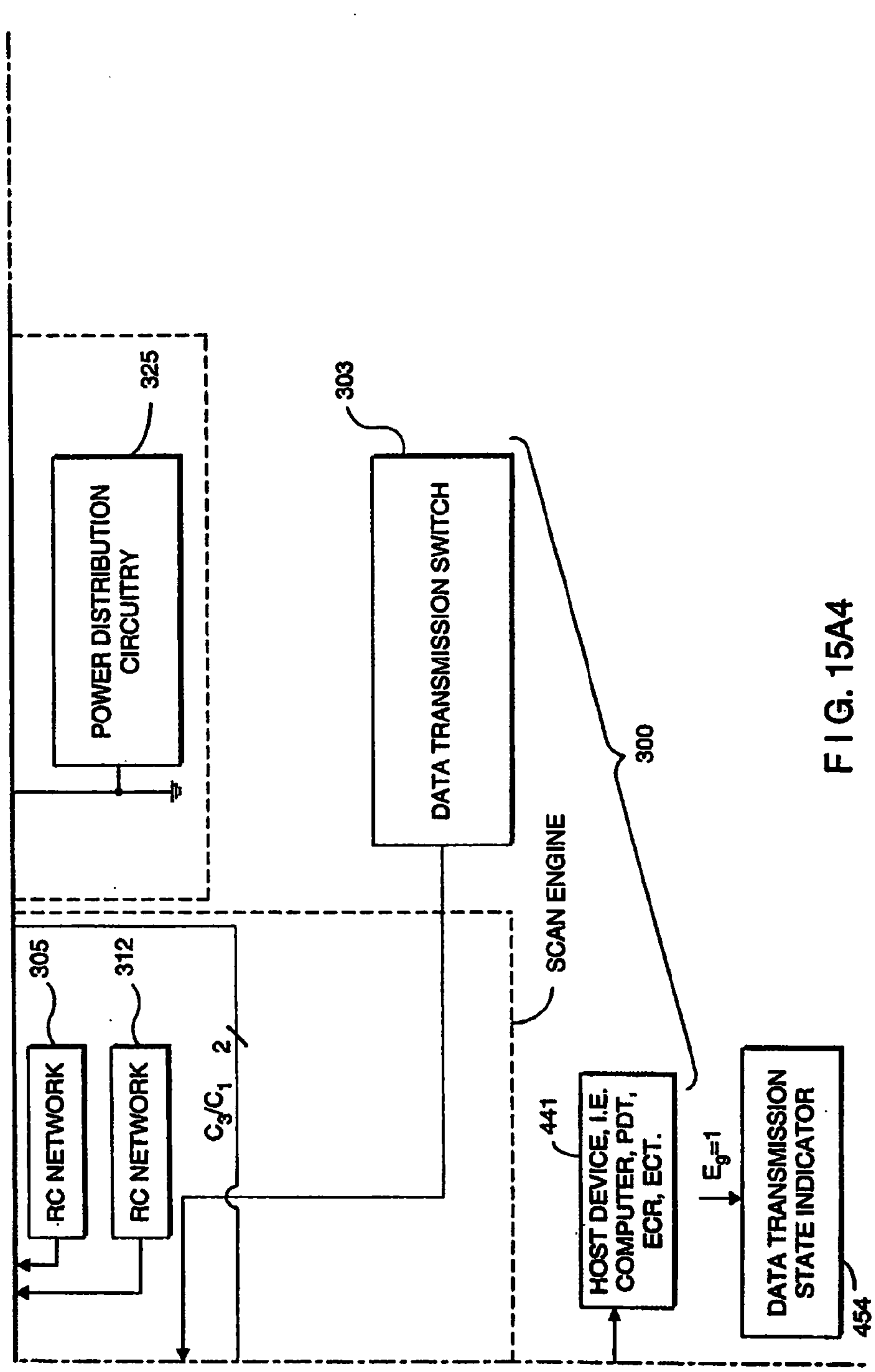
FIG. 15A4

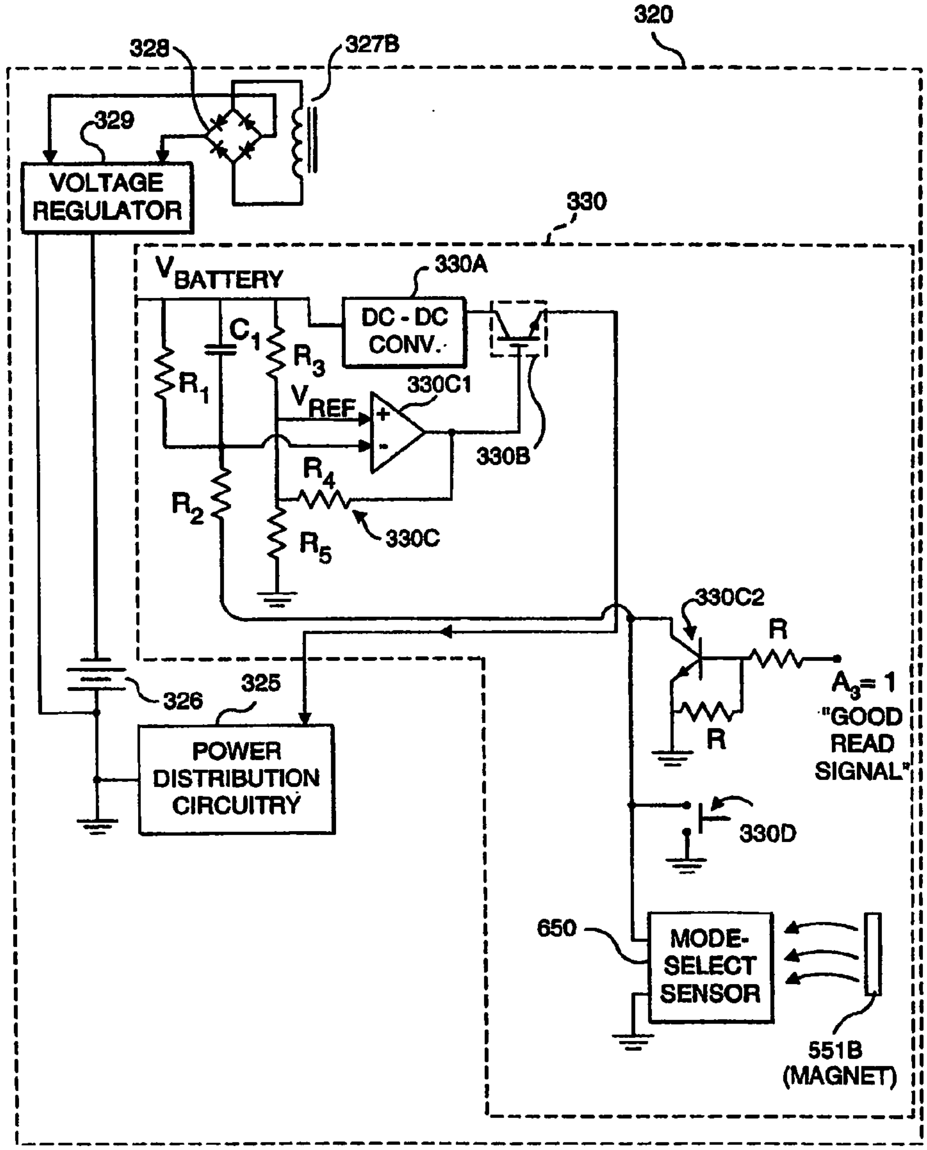
F I G. 15B1

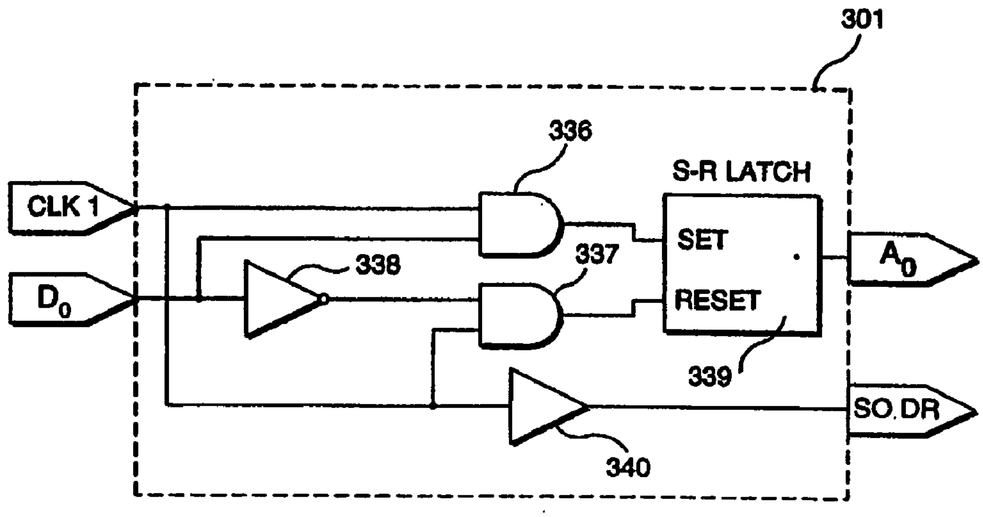
FIG. 15B2
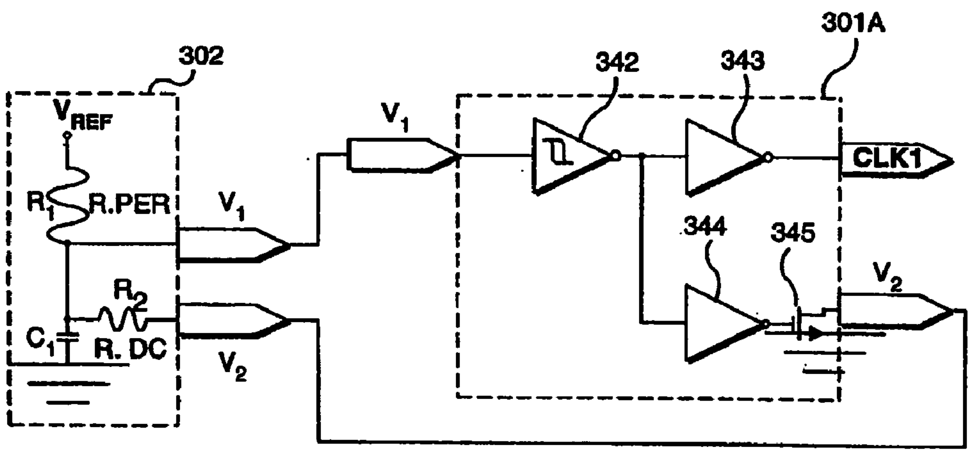
FIG. 15C

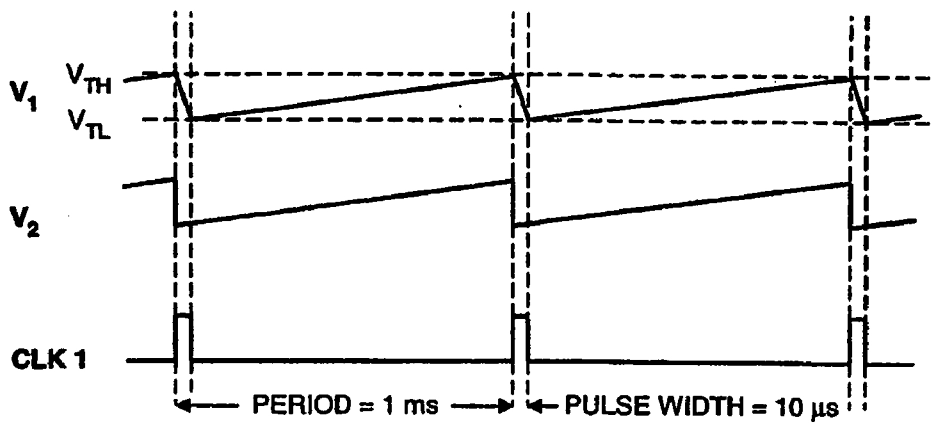
F I G. 15D
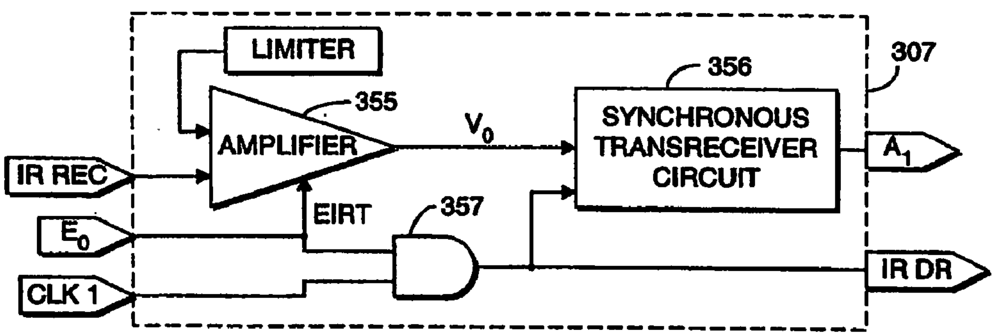
F I G. 15E

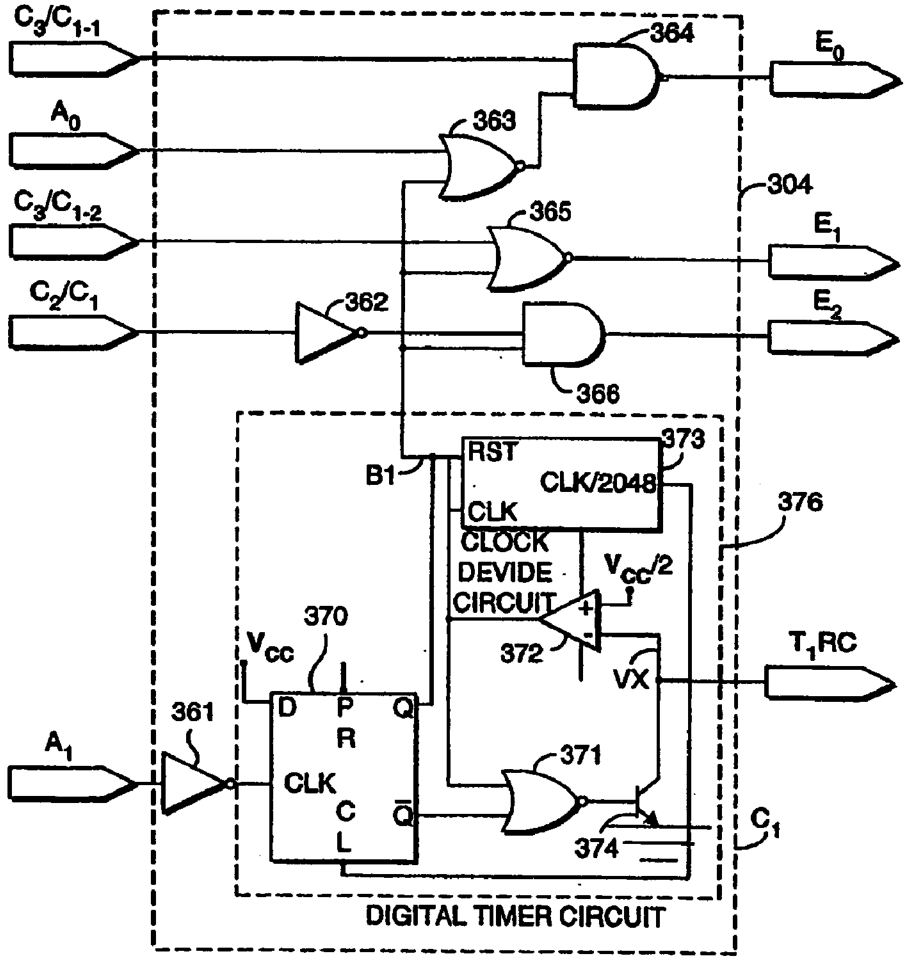
F I G. 15F

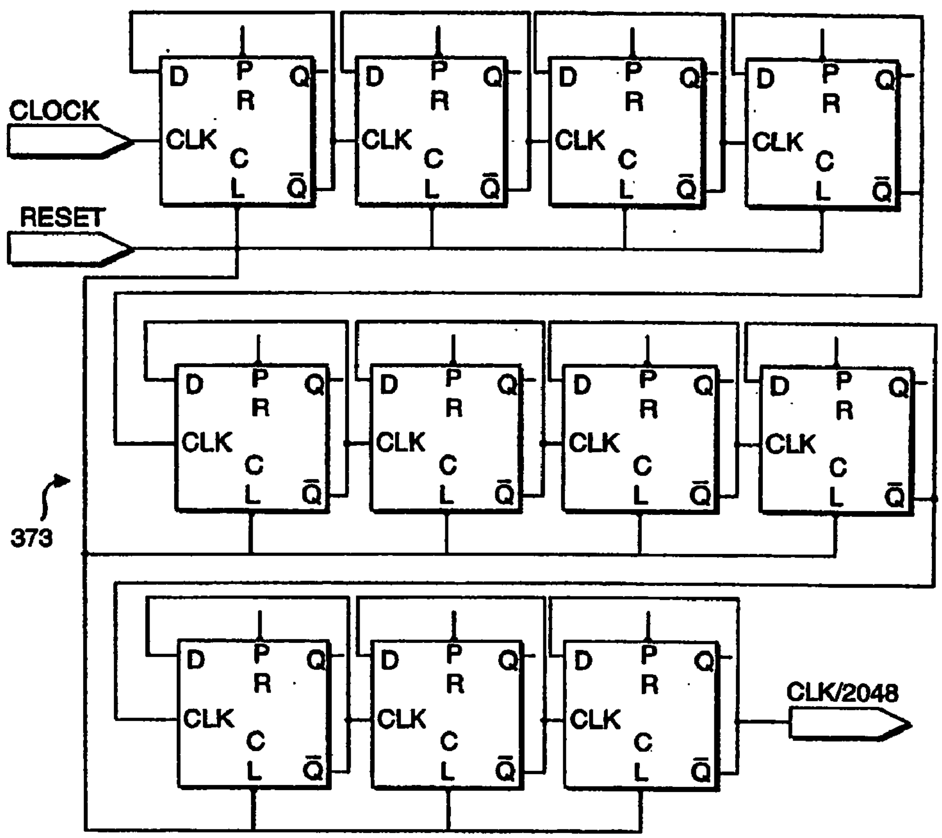
F I G. 15G $$\left.\begin{aligned} E_0 &= \overline{(B1 + A_0)(C_3/C_{1-1})} \\ E_1 &= (C_3/C_{1-2}) + B1 \\ E_2 &= (C_2/C_1)(T_1) \end{aligned}\right\}$$

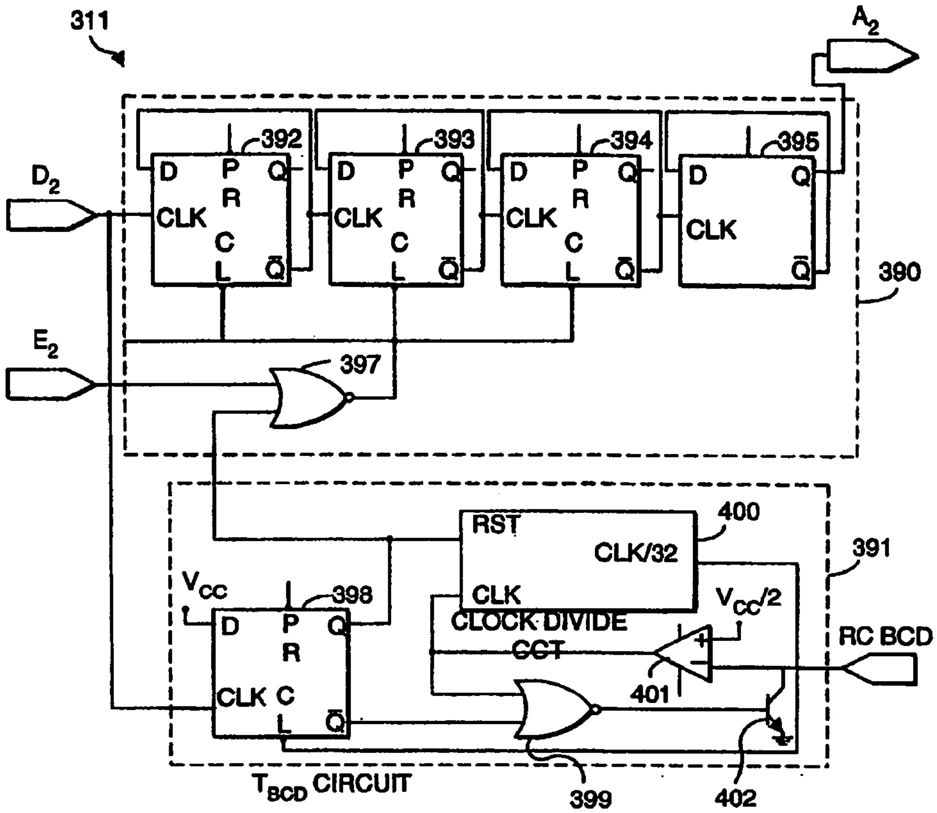
F I G. 15J
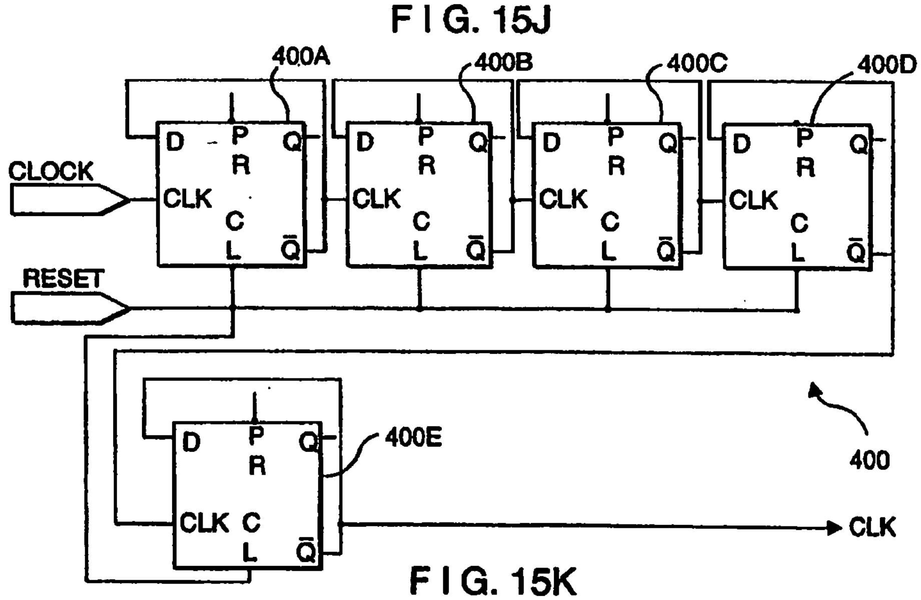
F I G. 15K

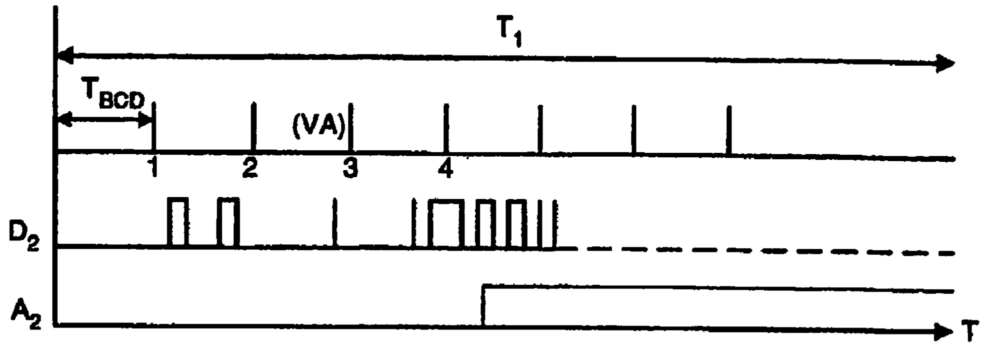
FIG. 15L
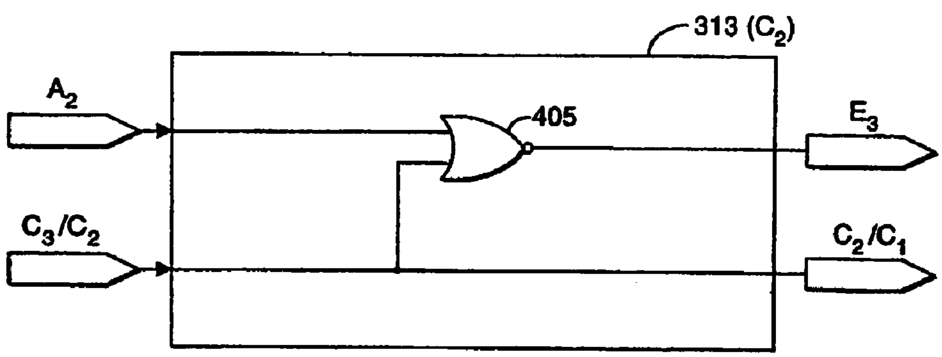
FIG. 15M
| $C_3 / C_2$ | $A_2$ | $E_3$ | $C_2 / C_1$ |
|---|---|---|---|
| 0 | 0 | 0 | 0 |
| 0 | 1 | 1 | 0 |
| 1 | X | 1 | 1 |
X: DON'T CARE (I.E. $C_3 / C_2$ OVERRIDES $A_2$)
FIG. 15N

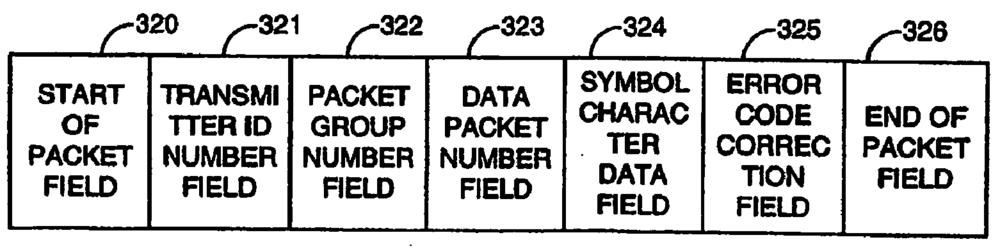
F I G. 15O
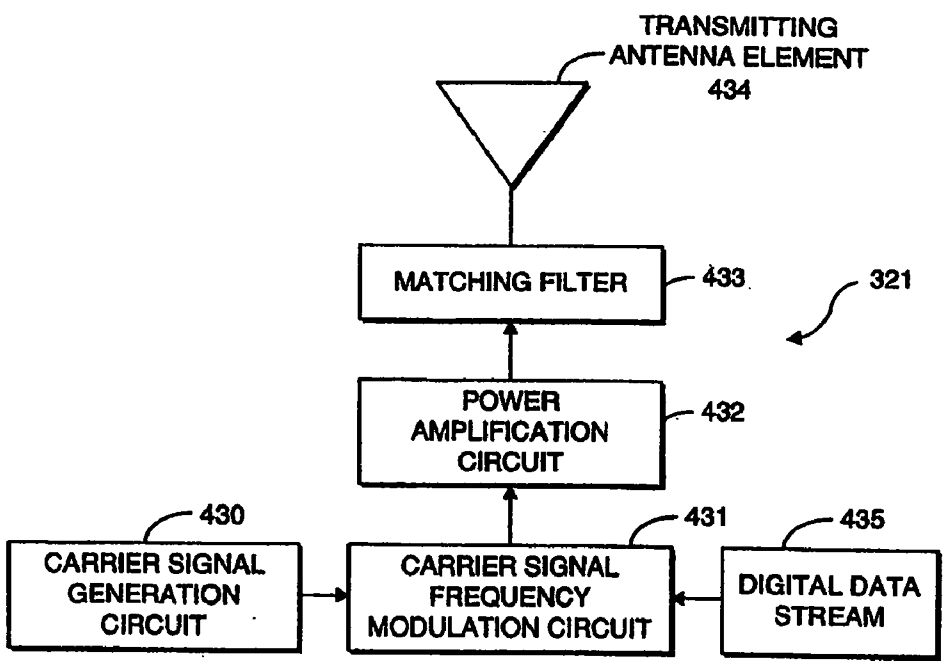
F I G. 16

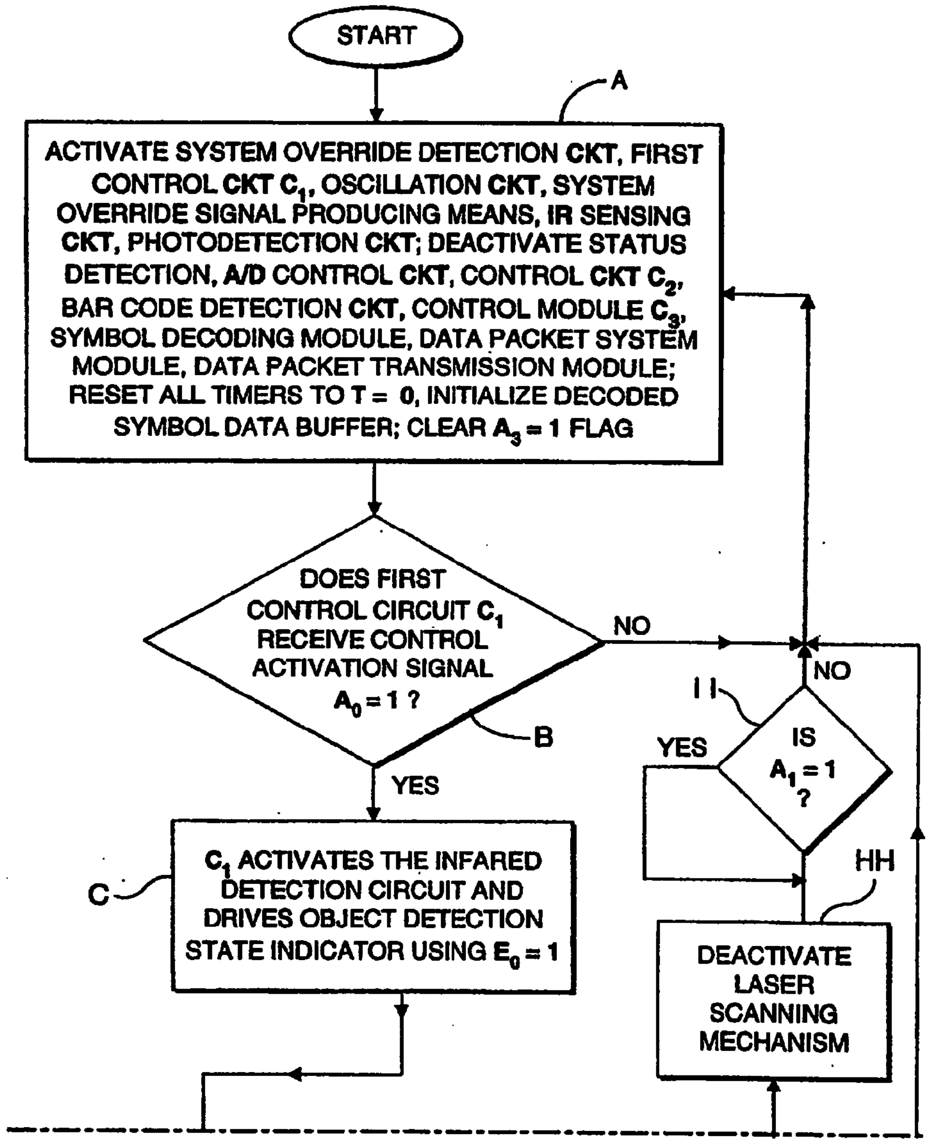
F I G. 20A1

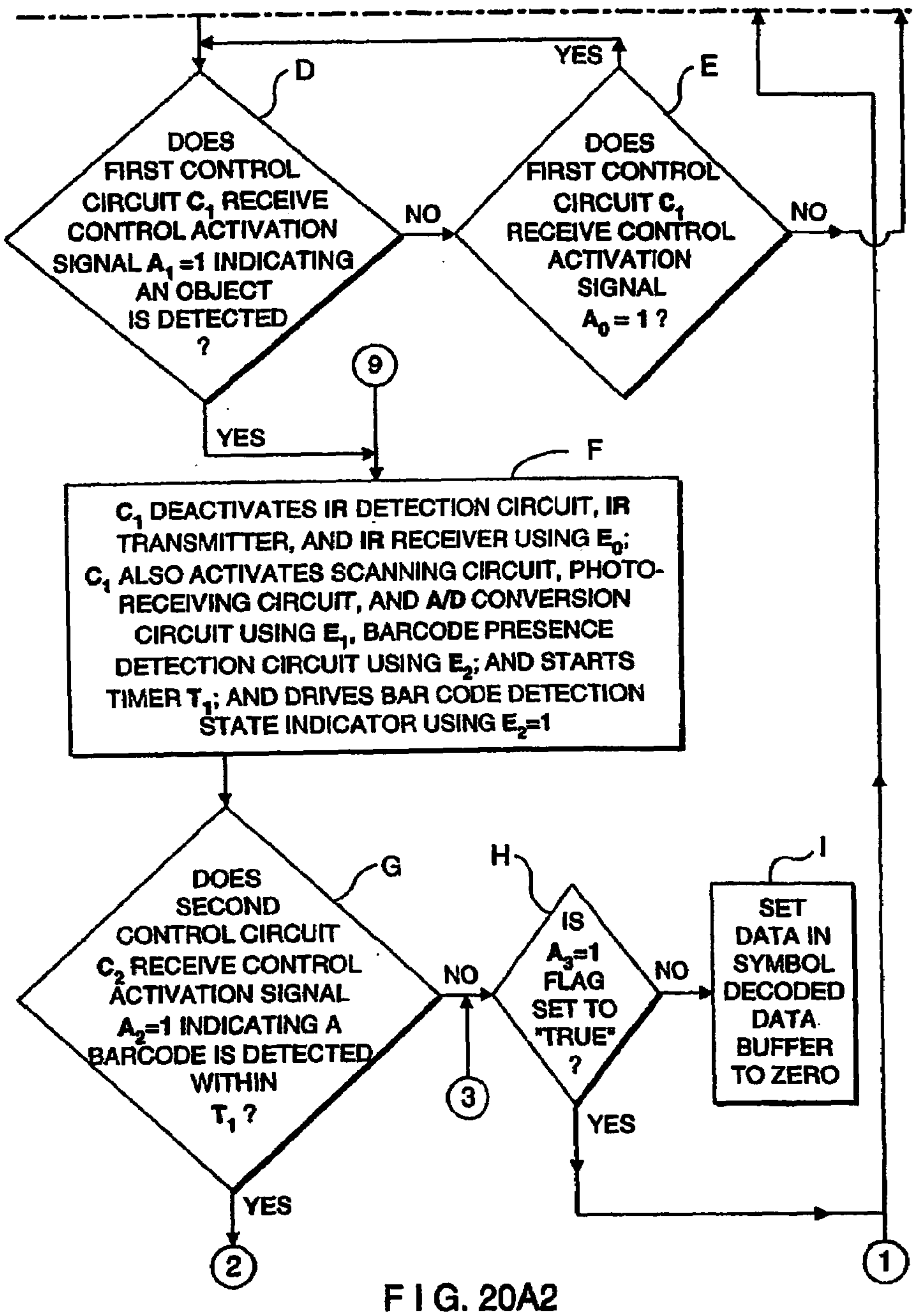
F I G. 20A2

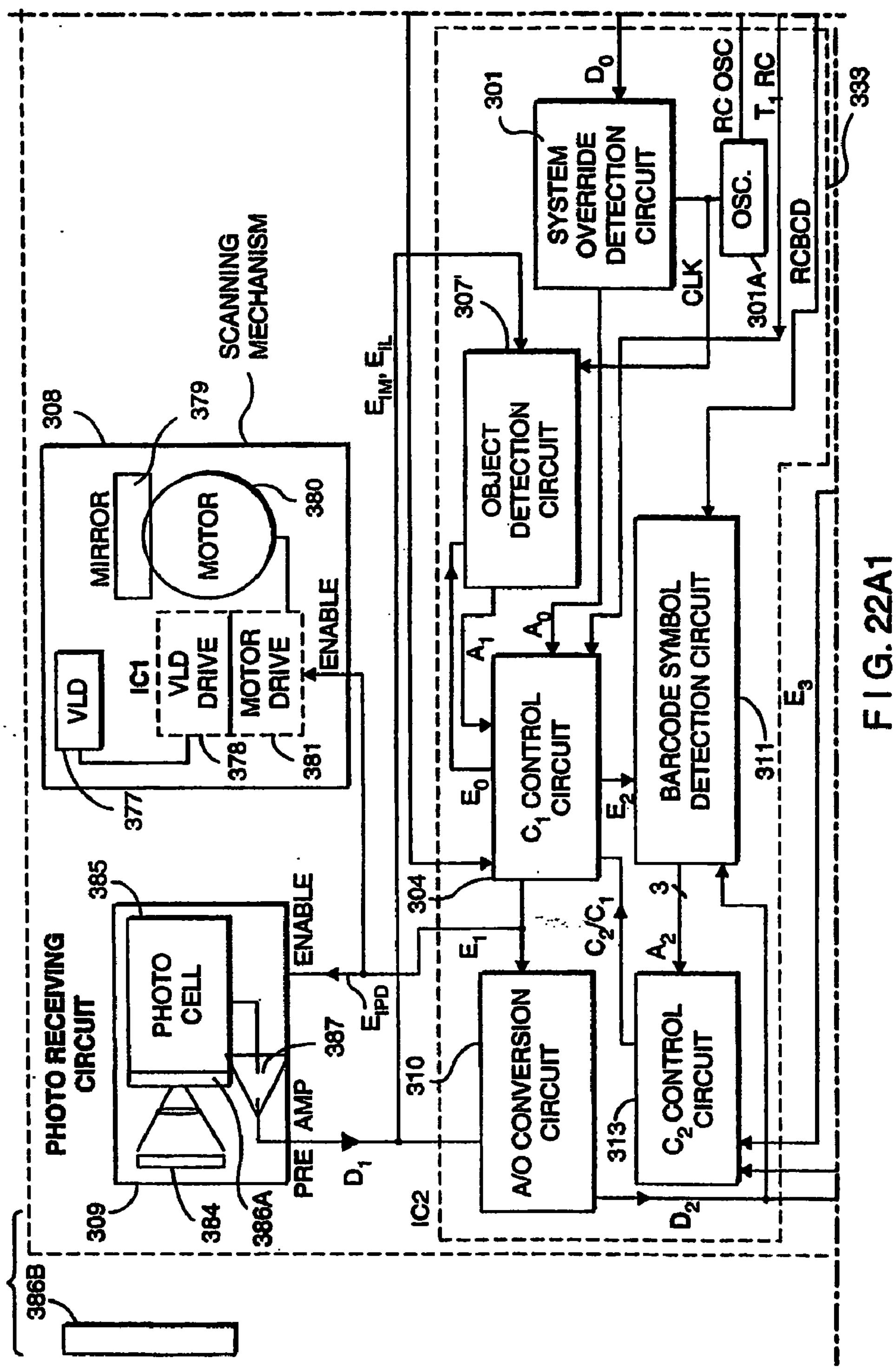
F I G. 22A1

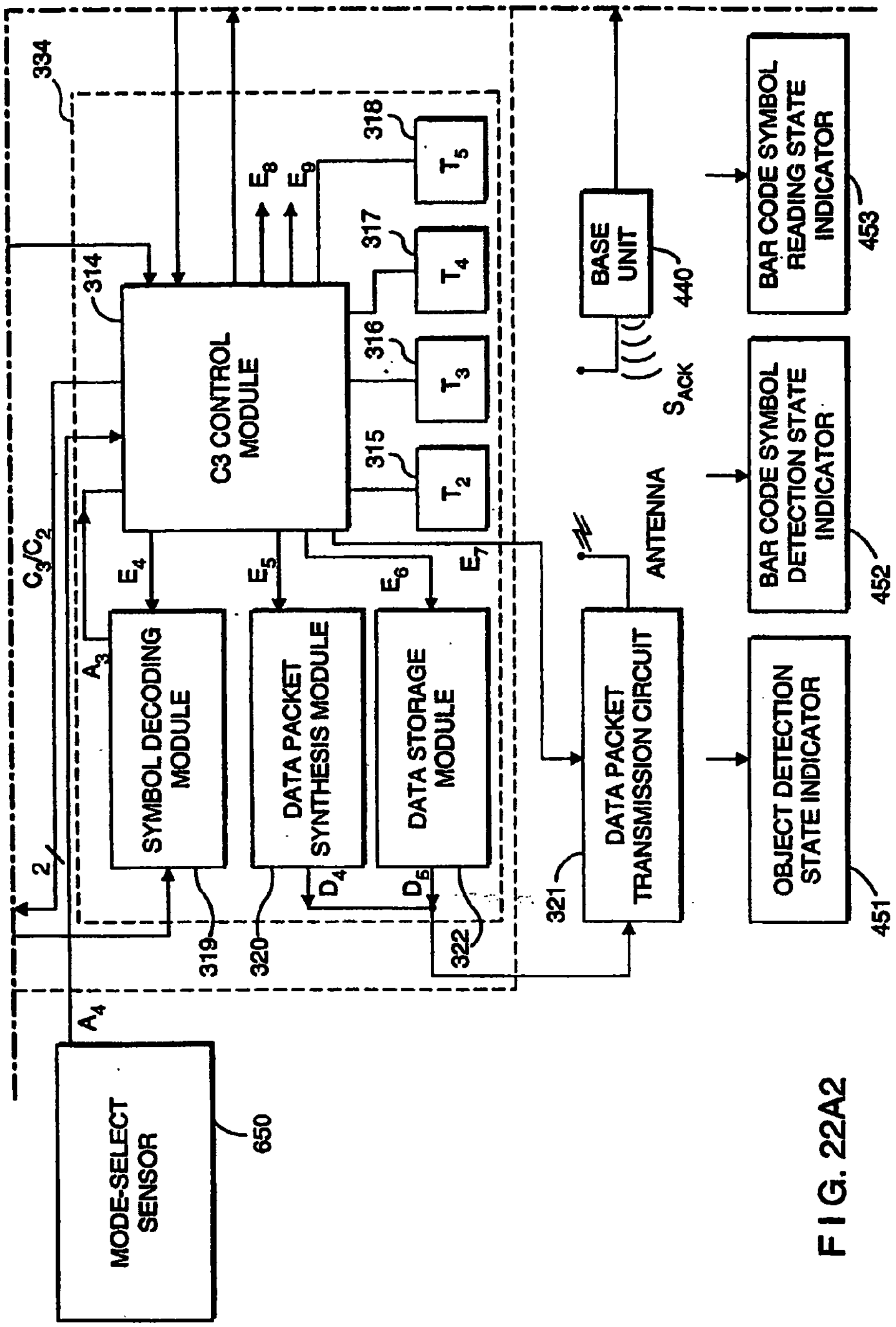
FIG. 22A2

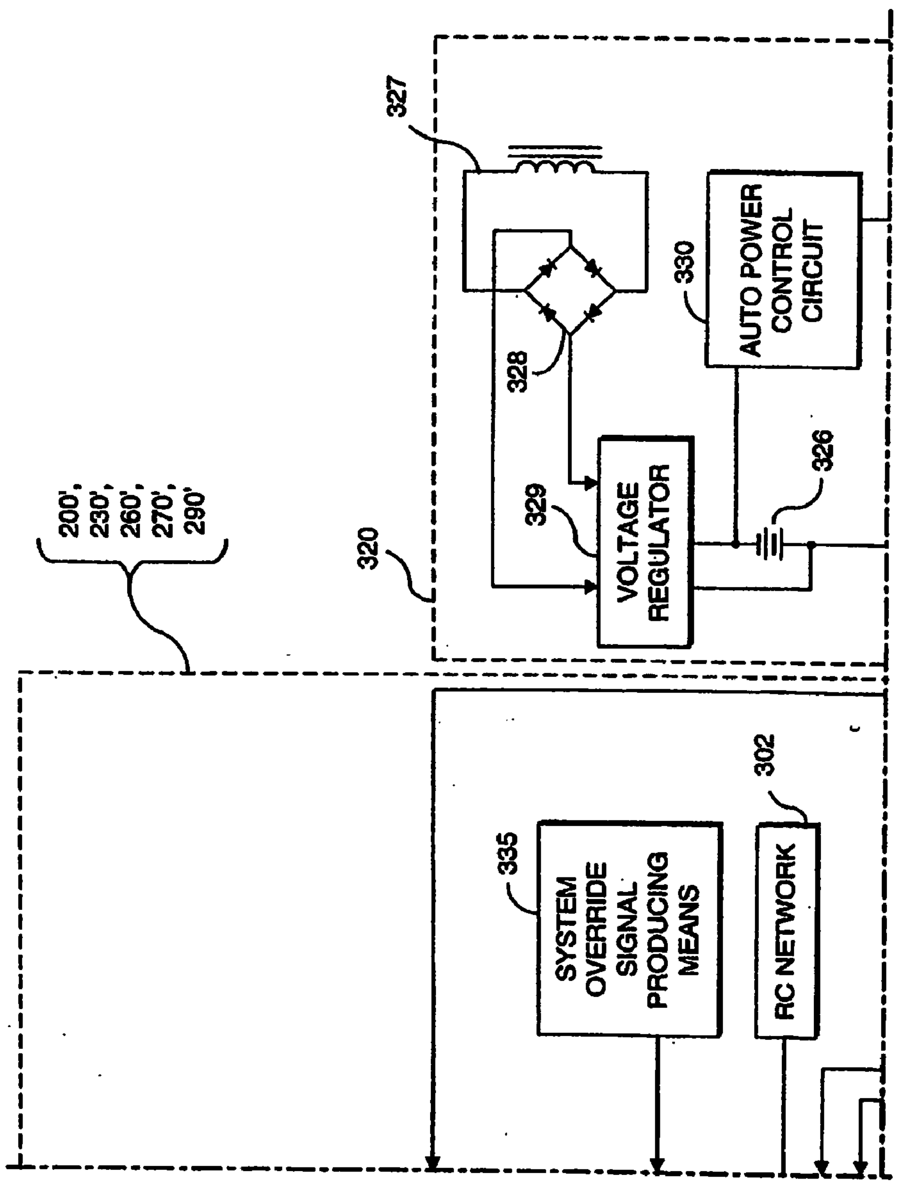
FIG. 22A3

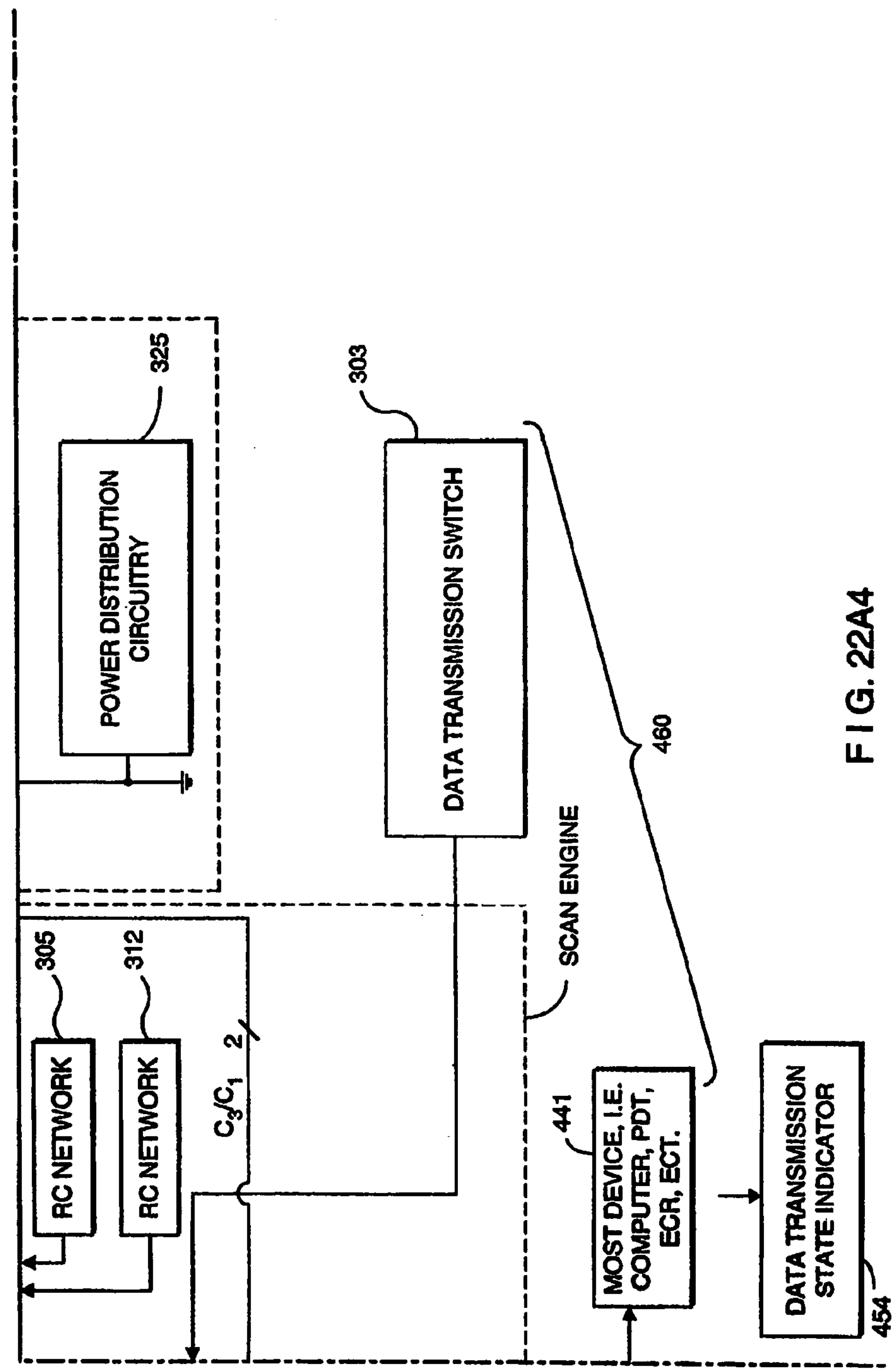
FIG. 22A4

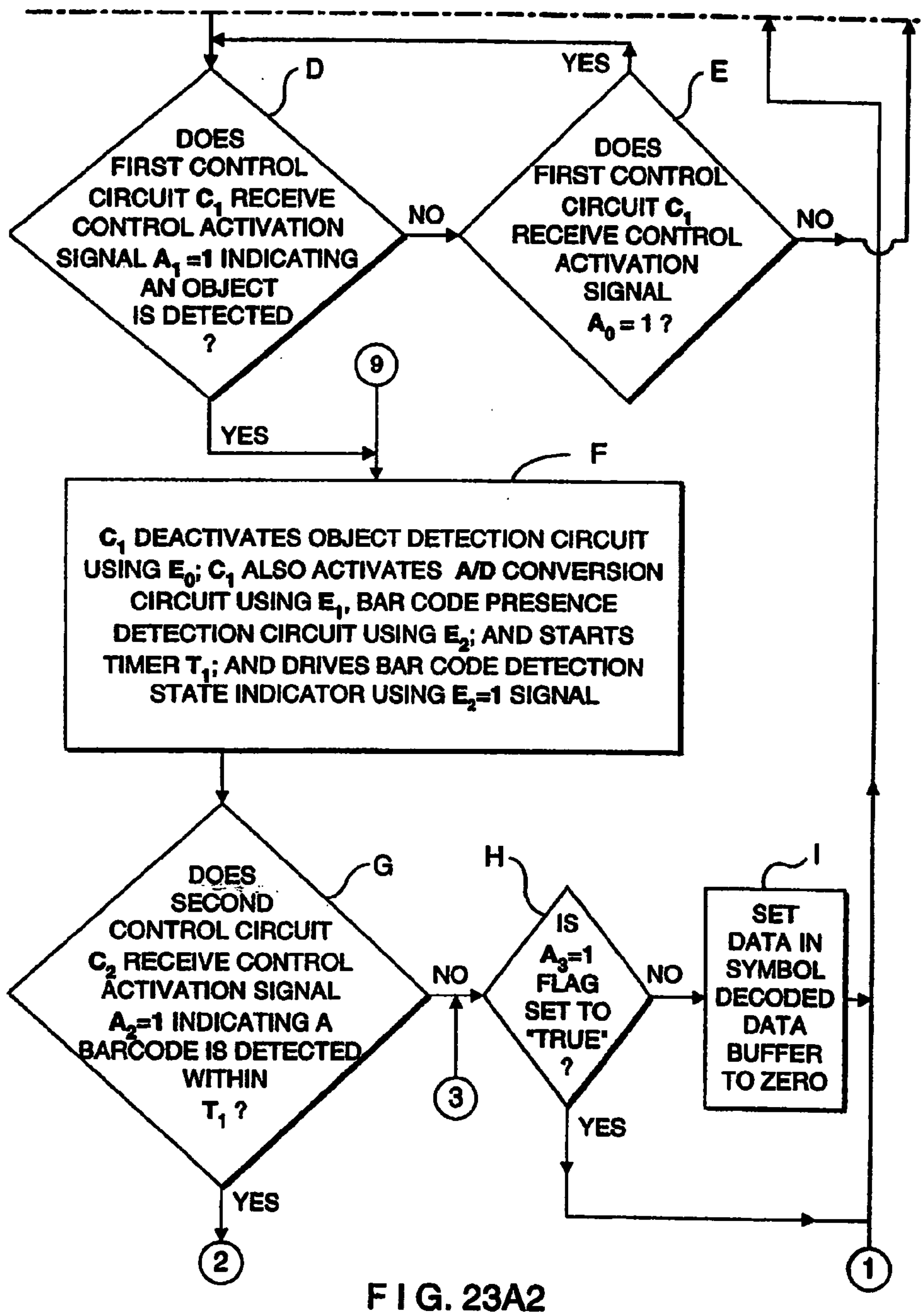
F I G. 23A2

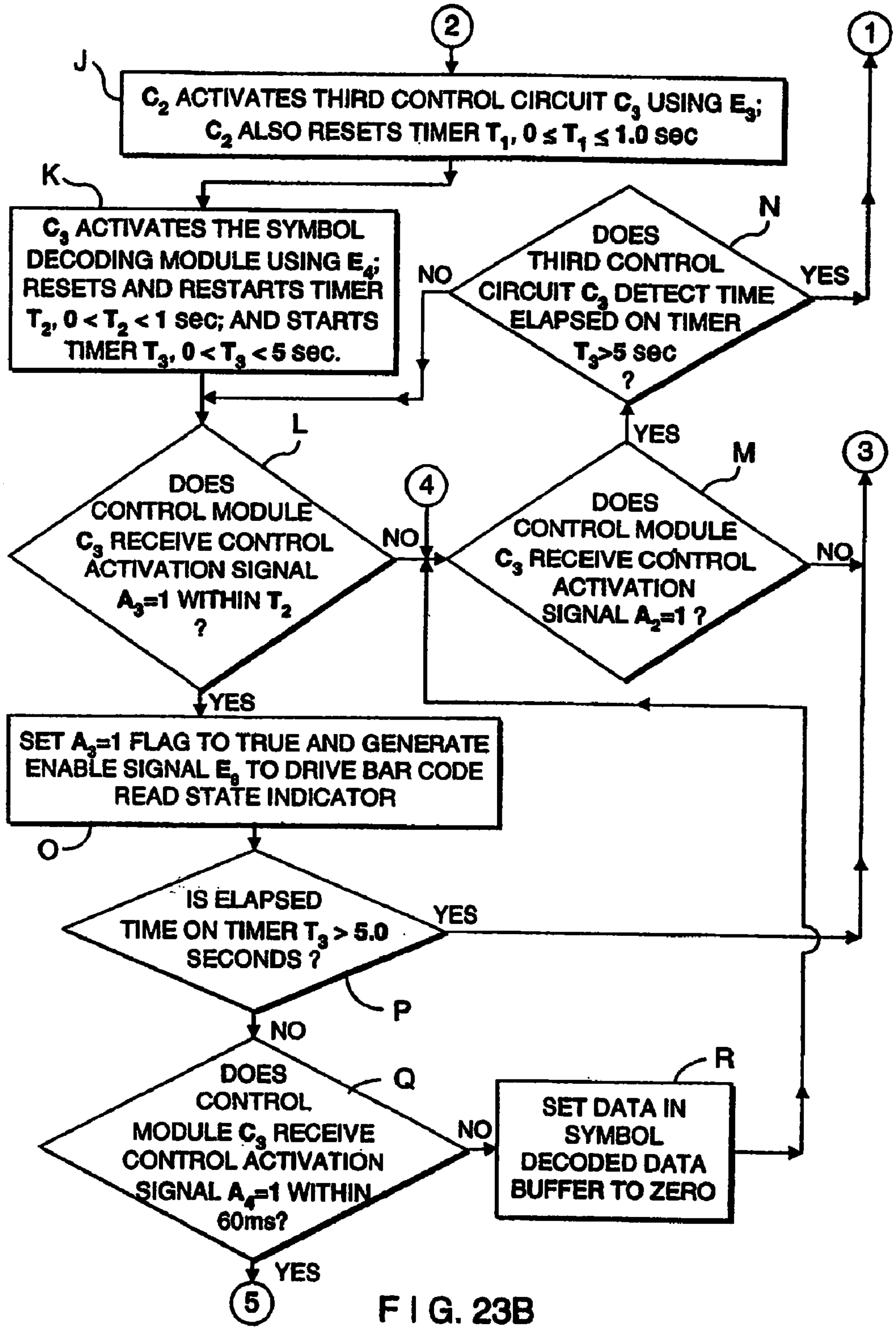
F I G. 23B

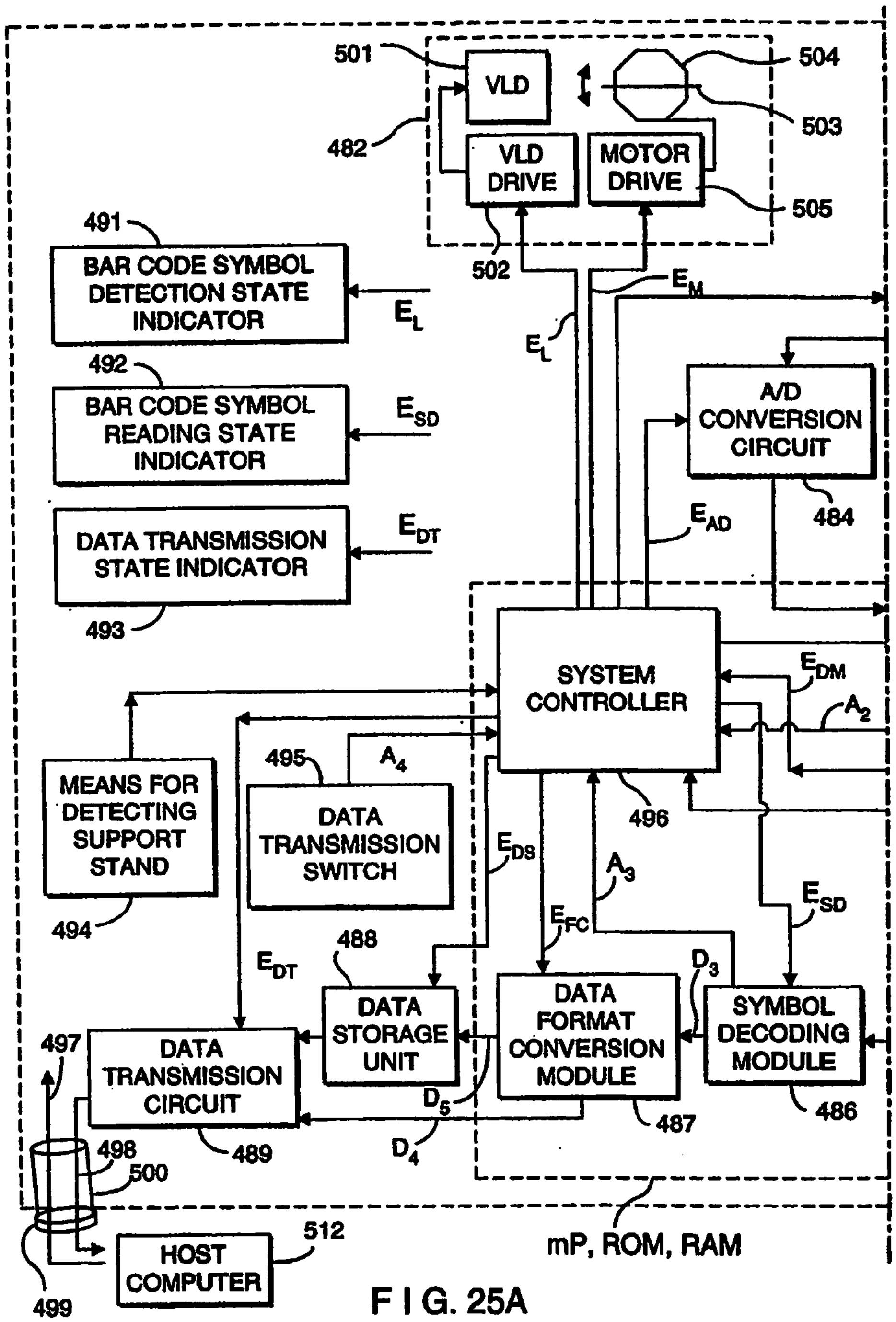
F I G. 25A

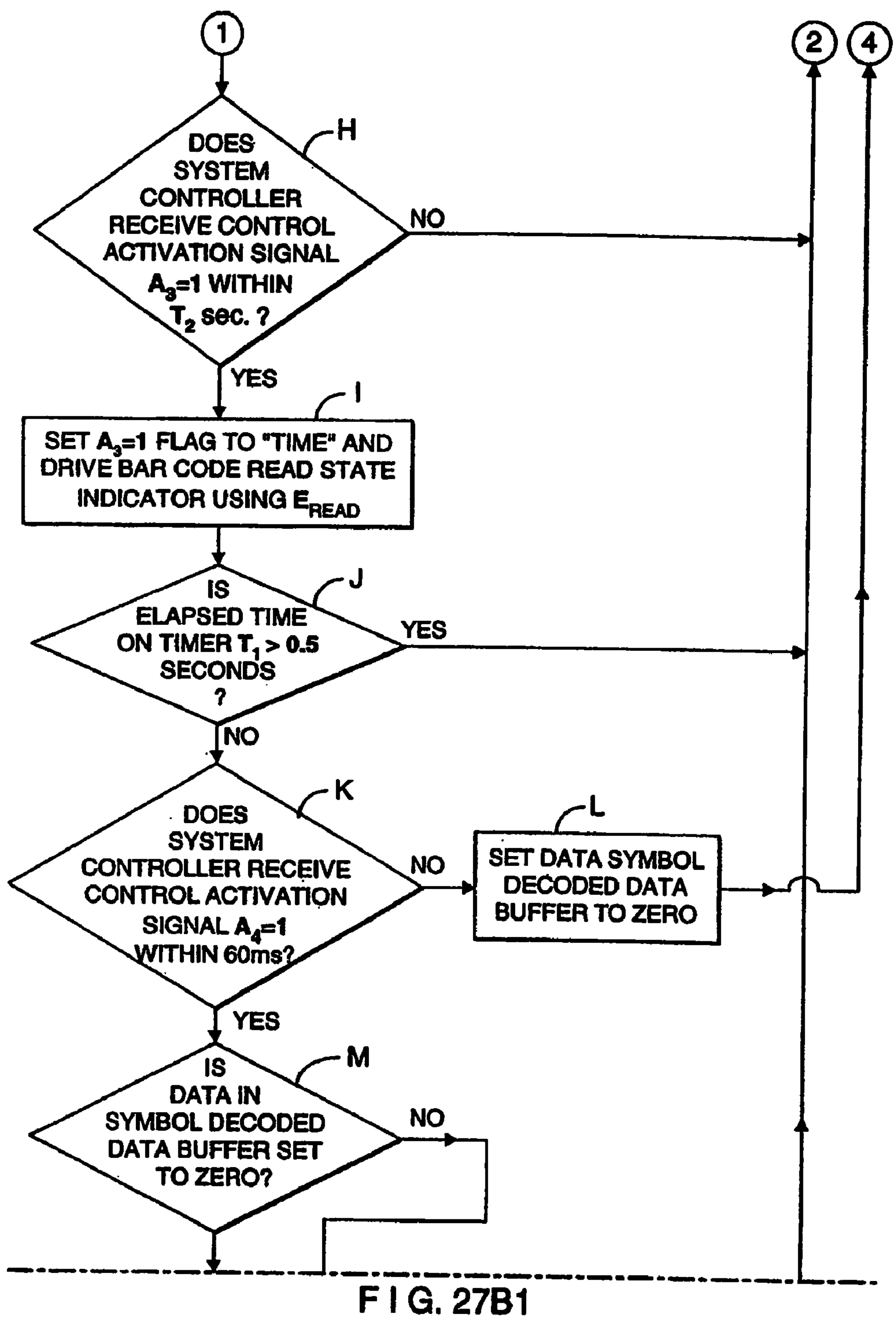
F I G. 27B1

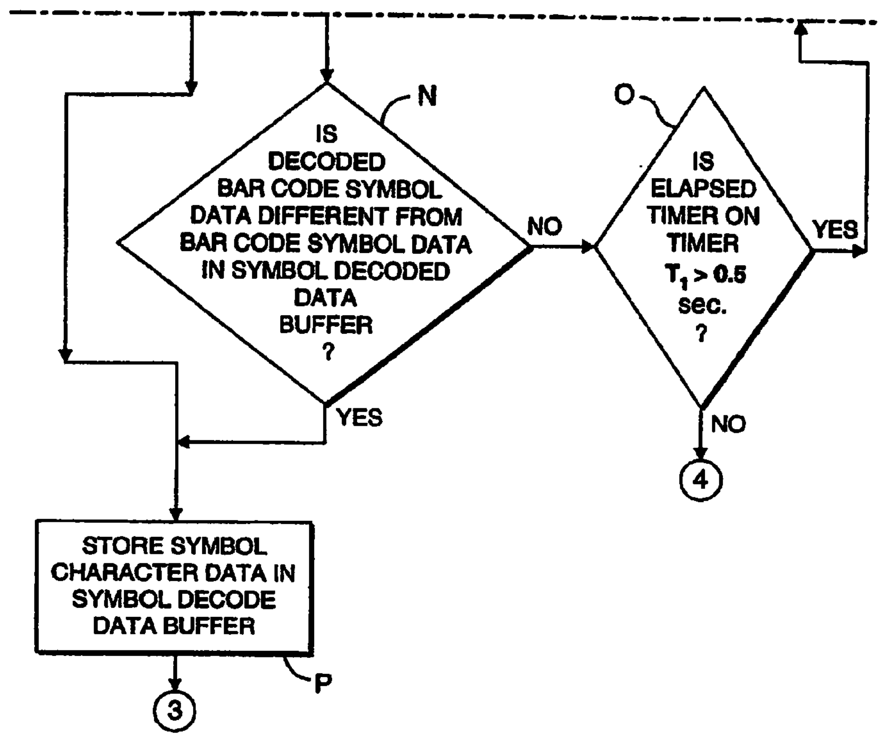
F I G. 27B2

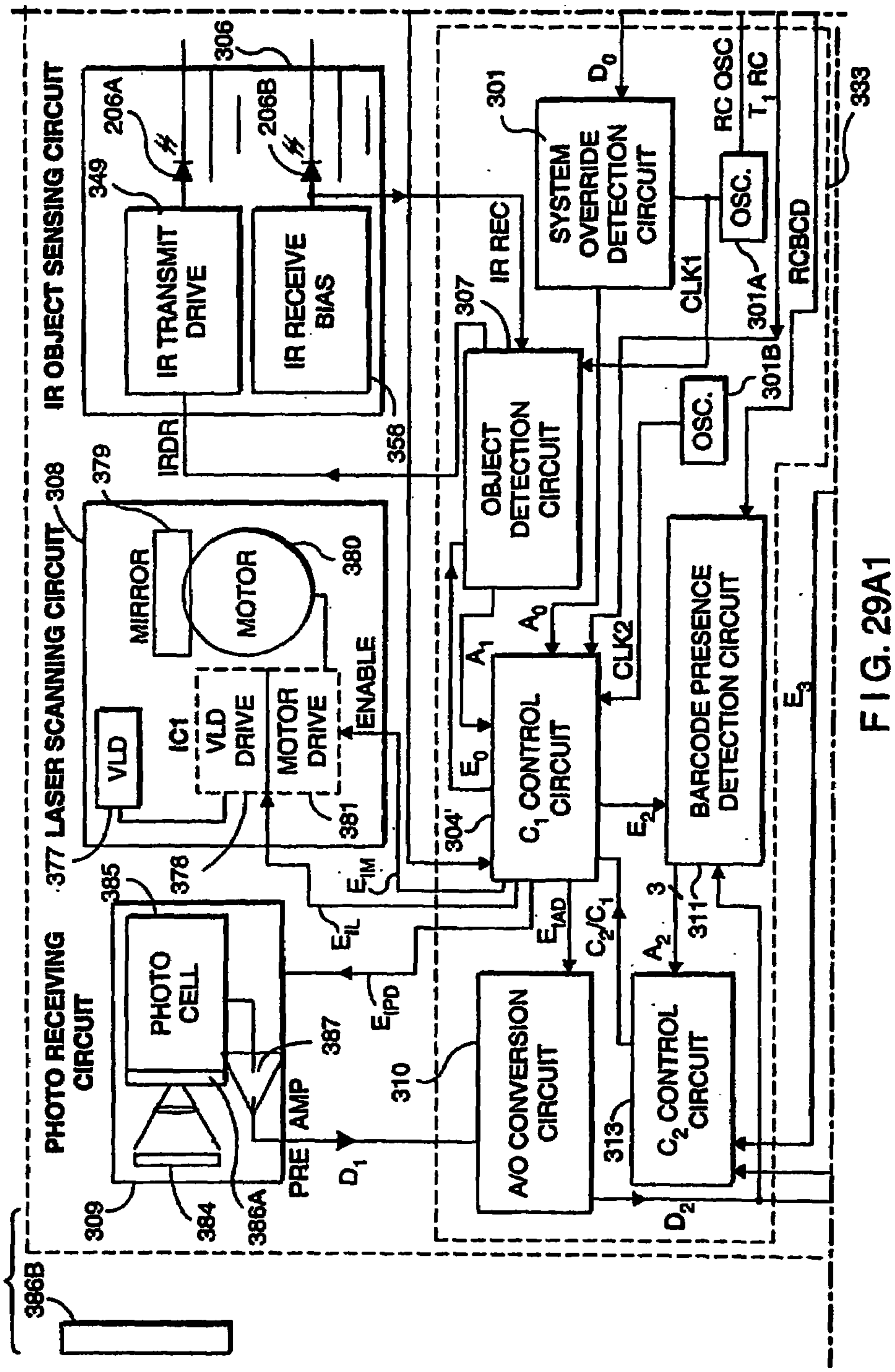
FIG. 29A1

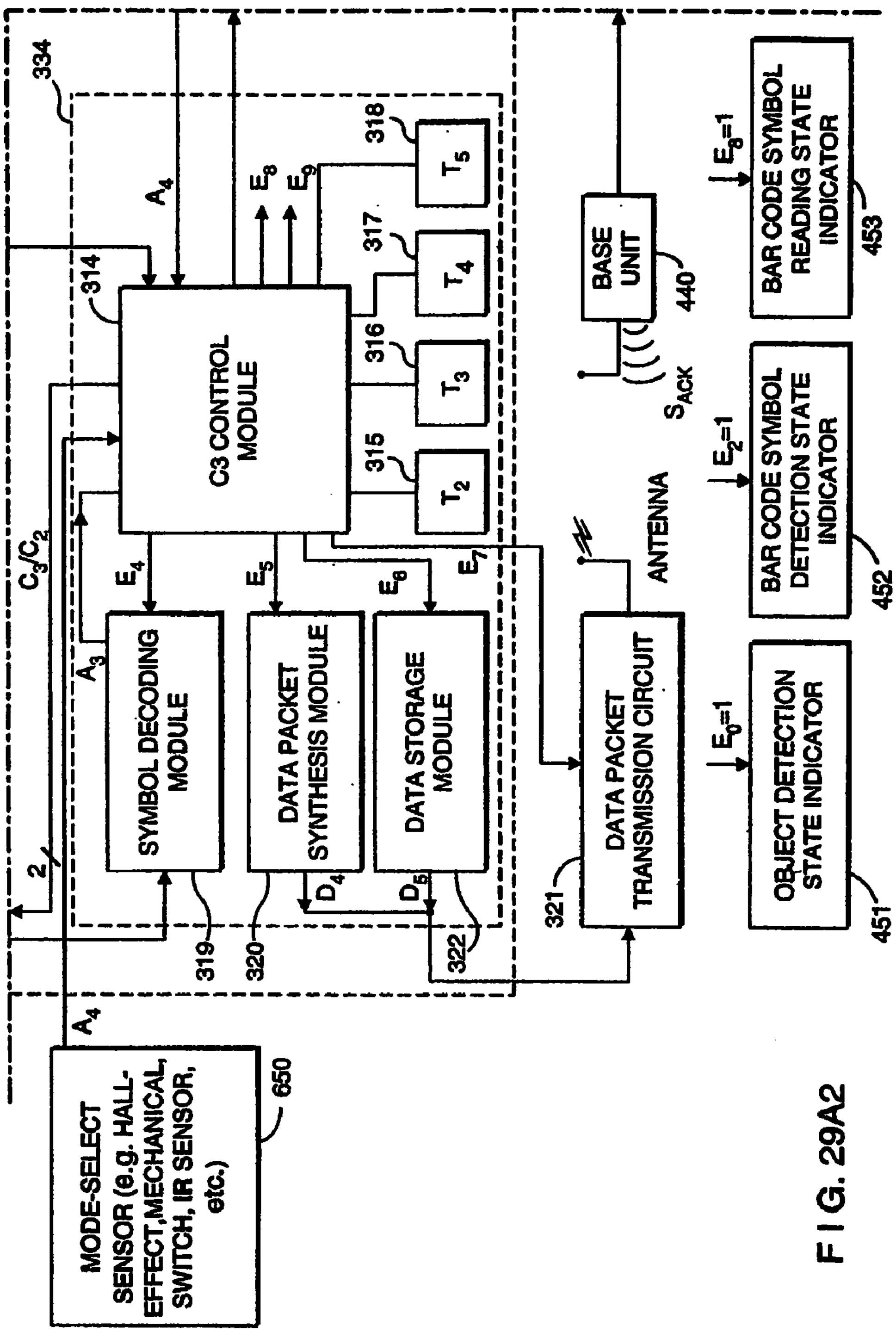
F I G. 29A2

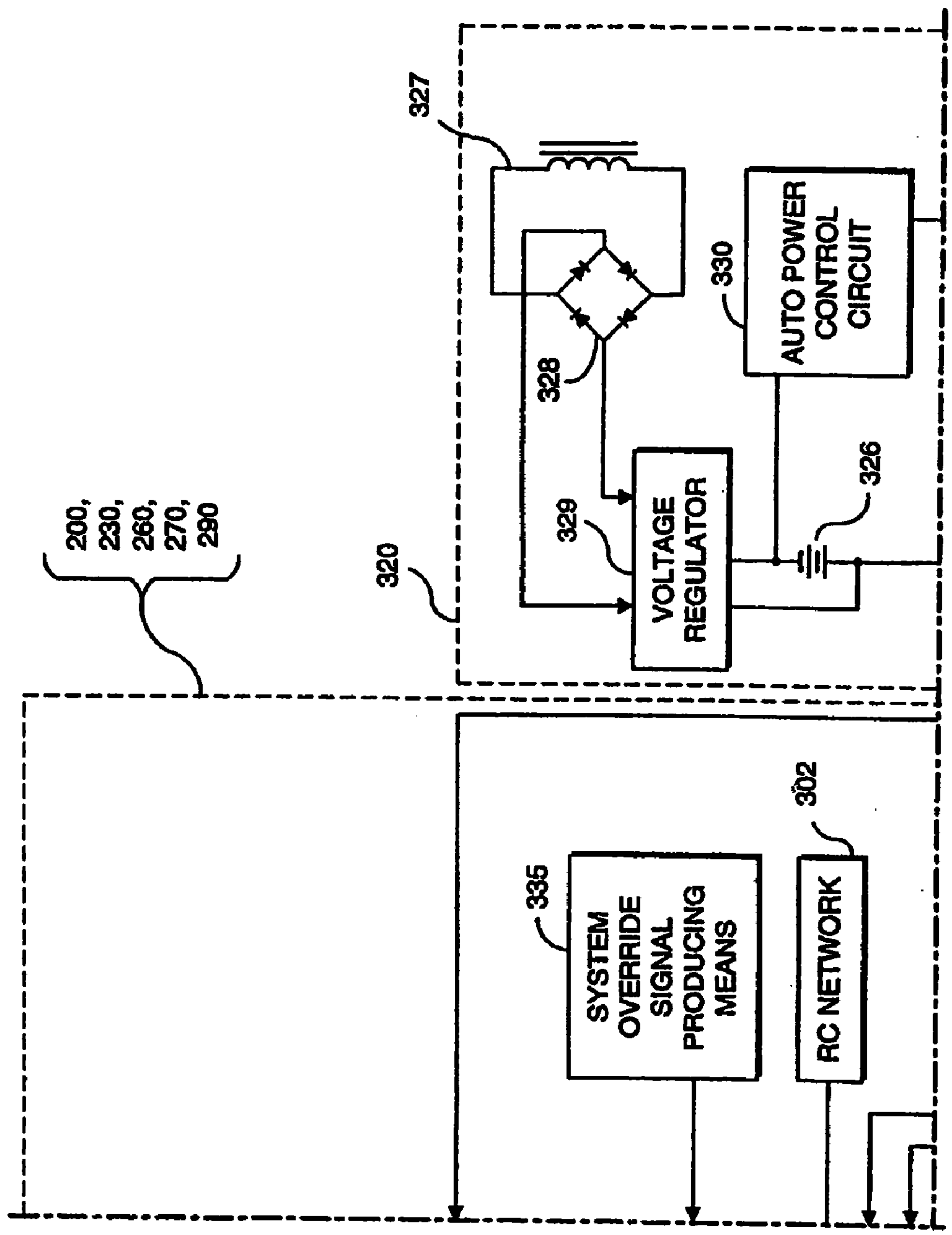
FIG. 29A3

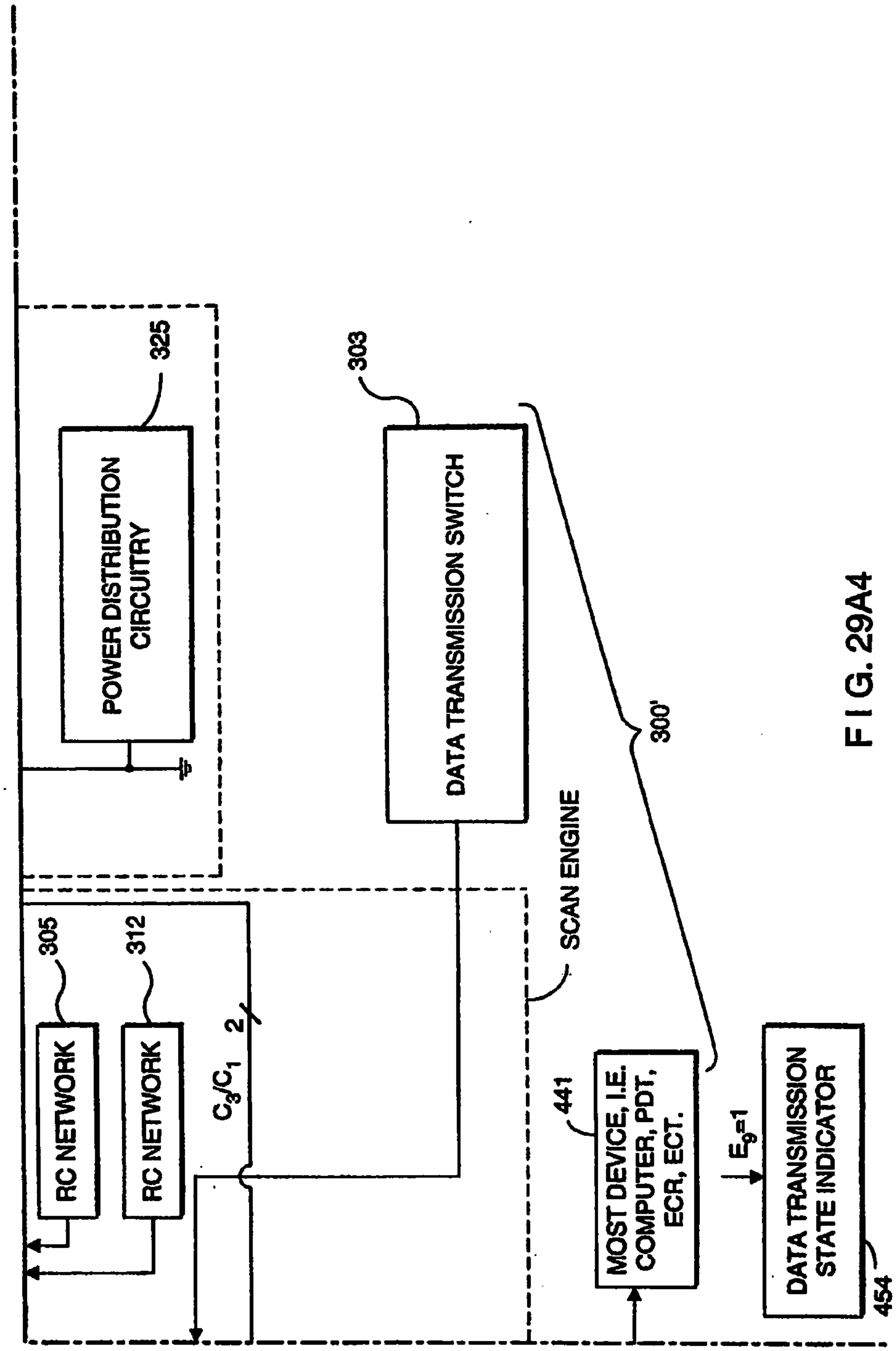
FIG. 29A4

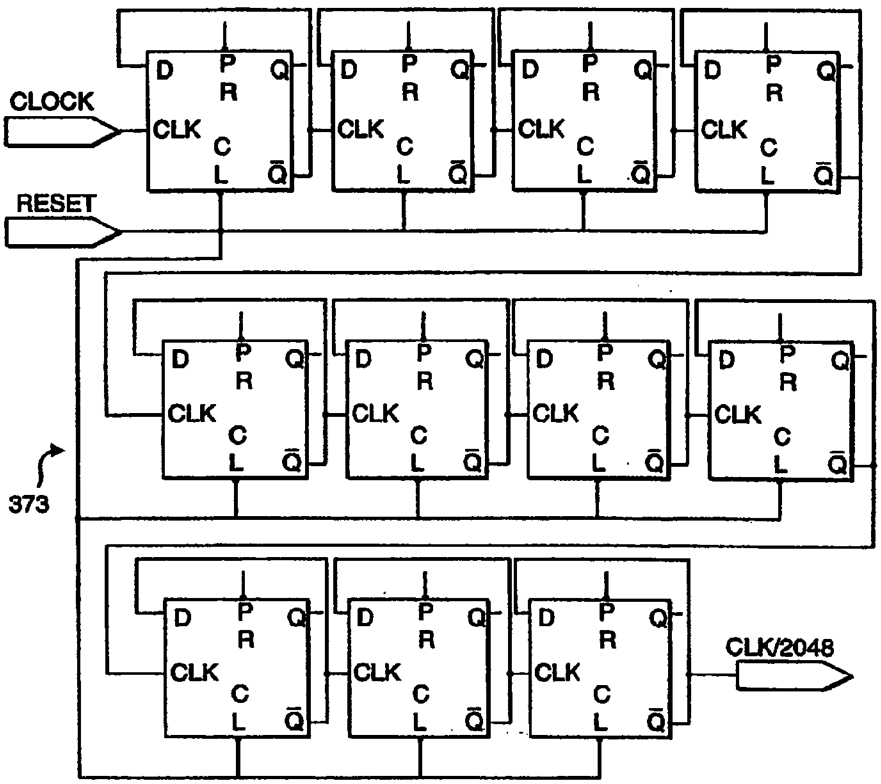
F I G. 29C $$\begin{cases} E_0 = \overline{(B1 + A_0)(C_3 / C_{1\text{-}1}}) \\ E_{IM} = E_{IPD} = E_{IAD} = \overline{(C_3 / C_{1\text{-}2}) + B1} \\ E_L = [\overline{(C_3 / C_{1\text{-}1}) + B1}][B2] \\ E_2 = \overline{(C_2 / C_1})(B1) \end{cases}$$

F I G. 29D

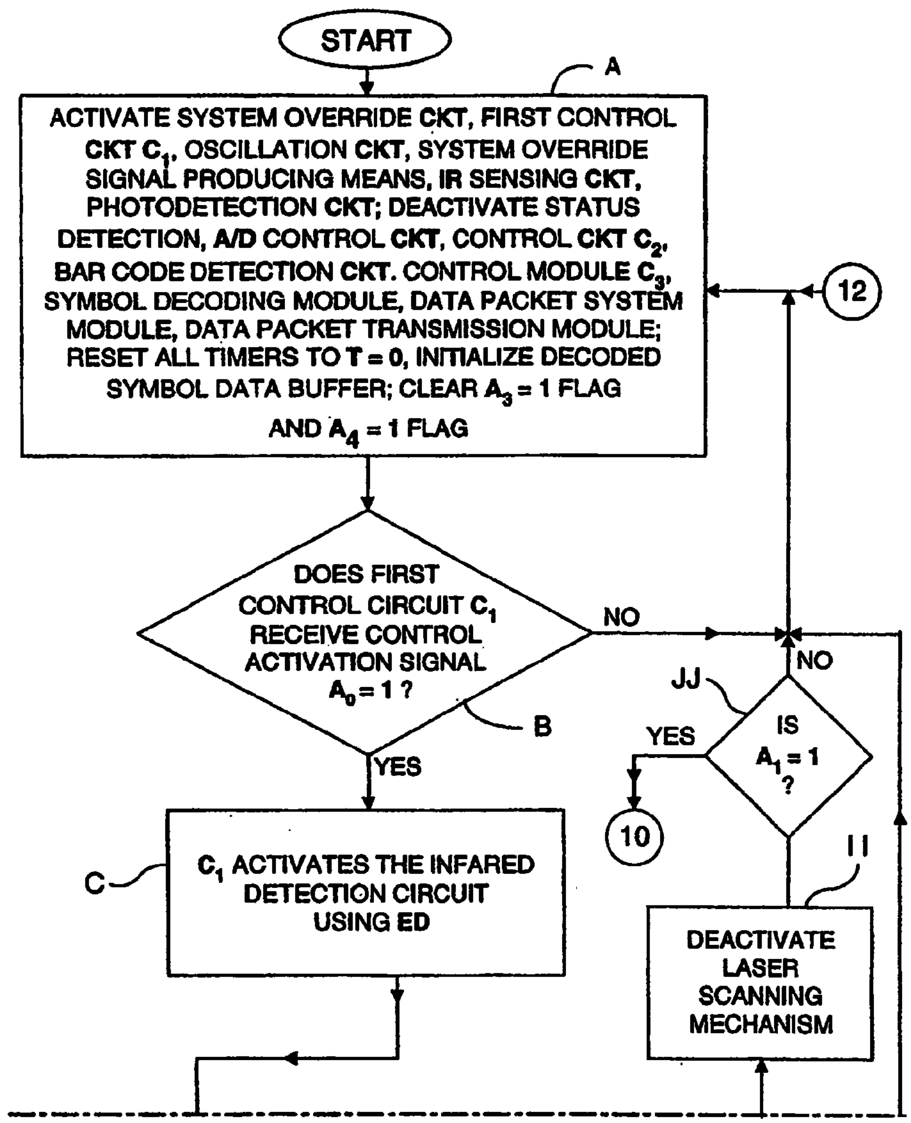
F I G. 30A1

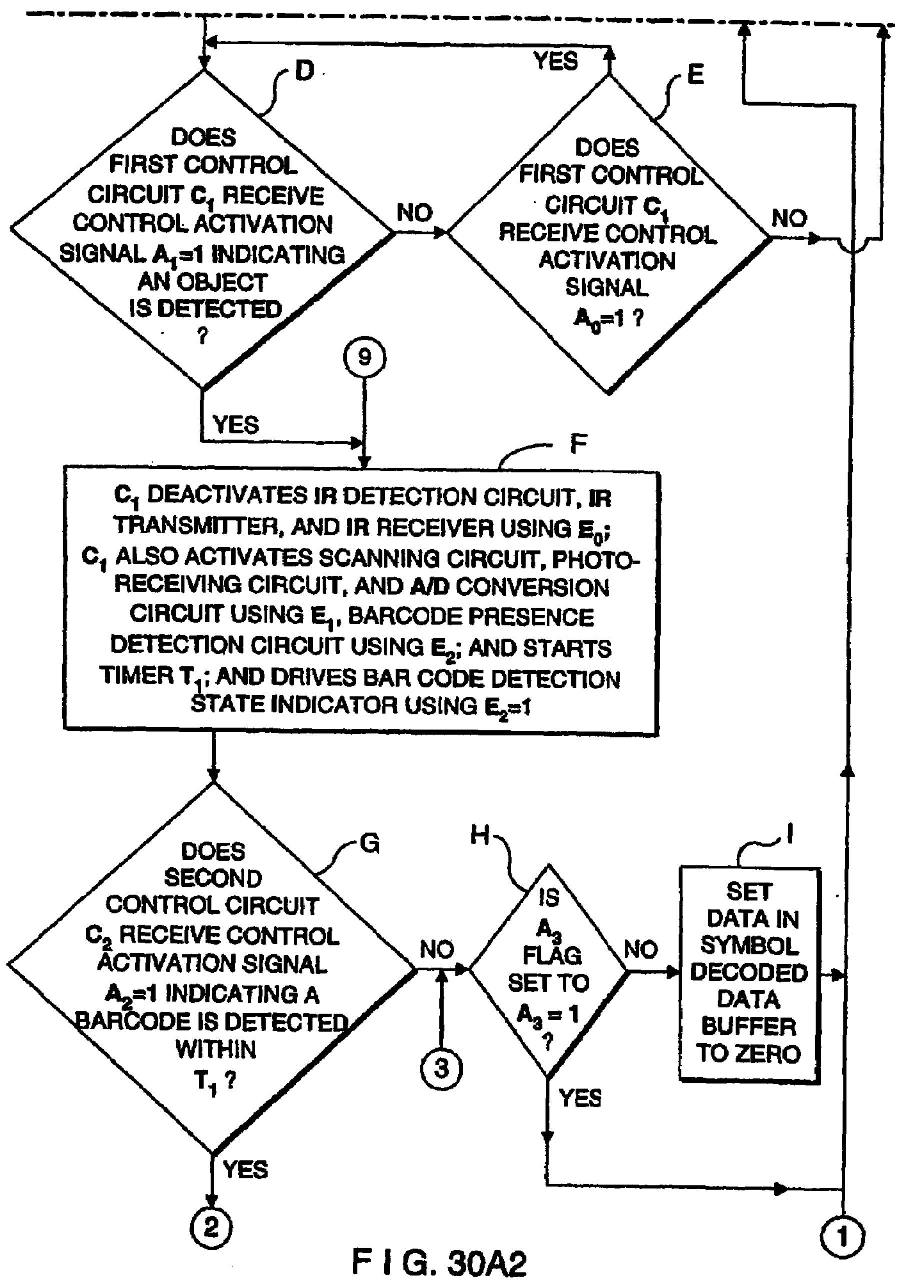
FIG. 30A2

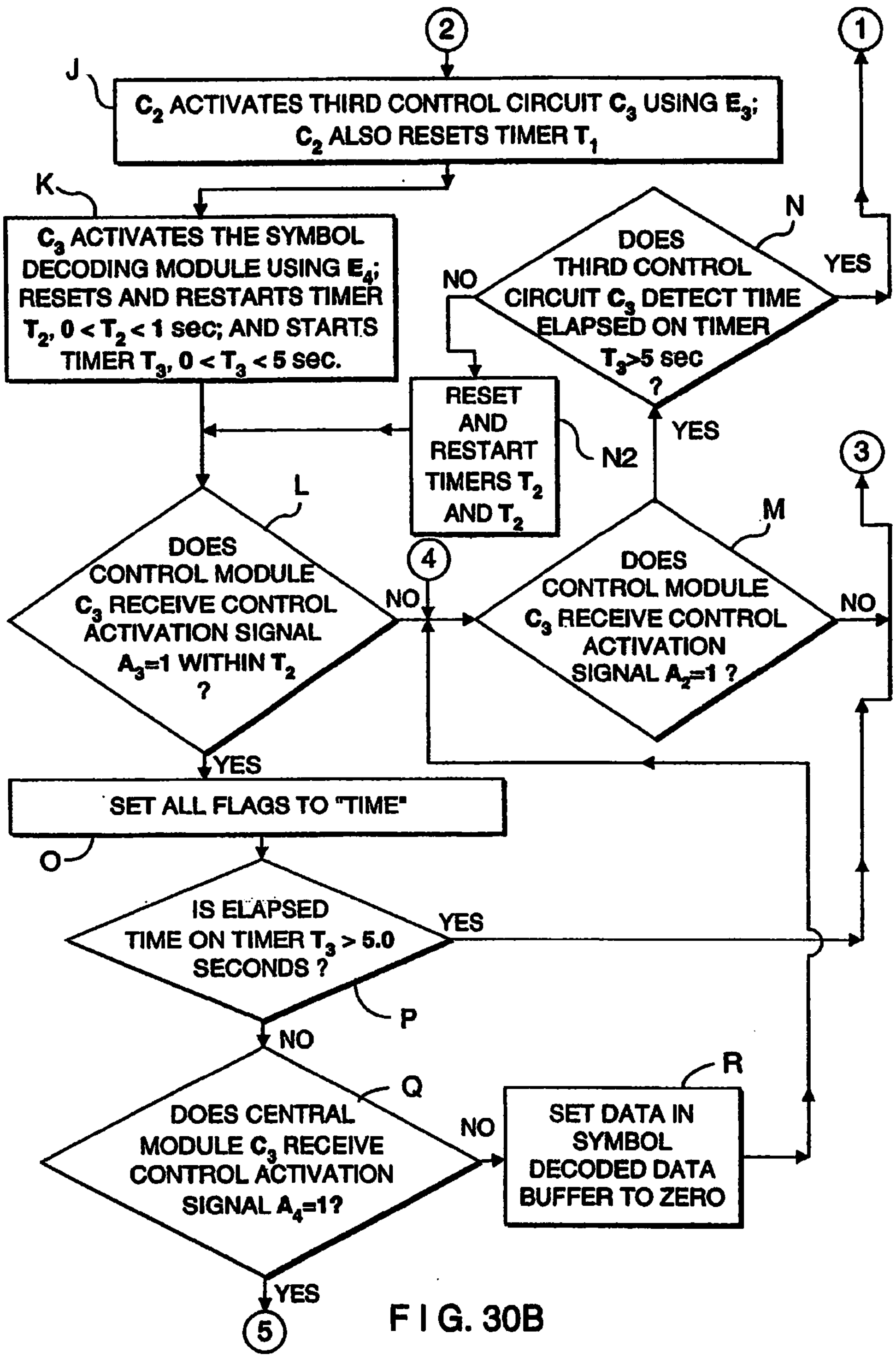
F I G. 30B

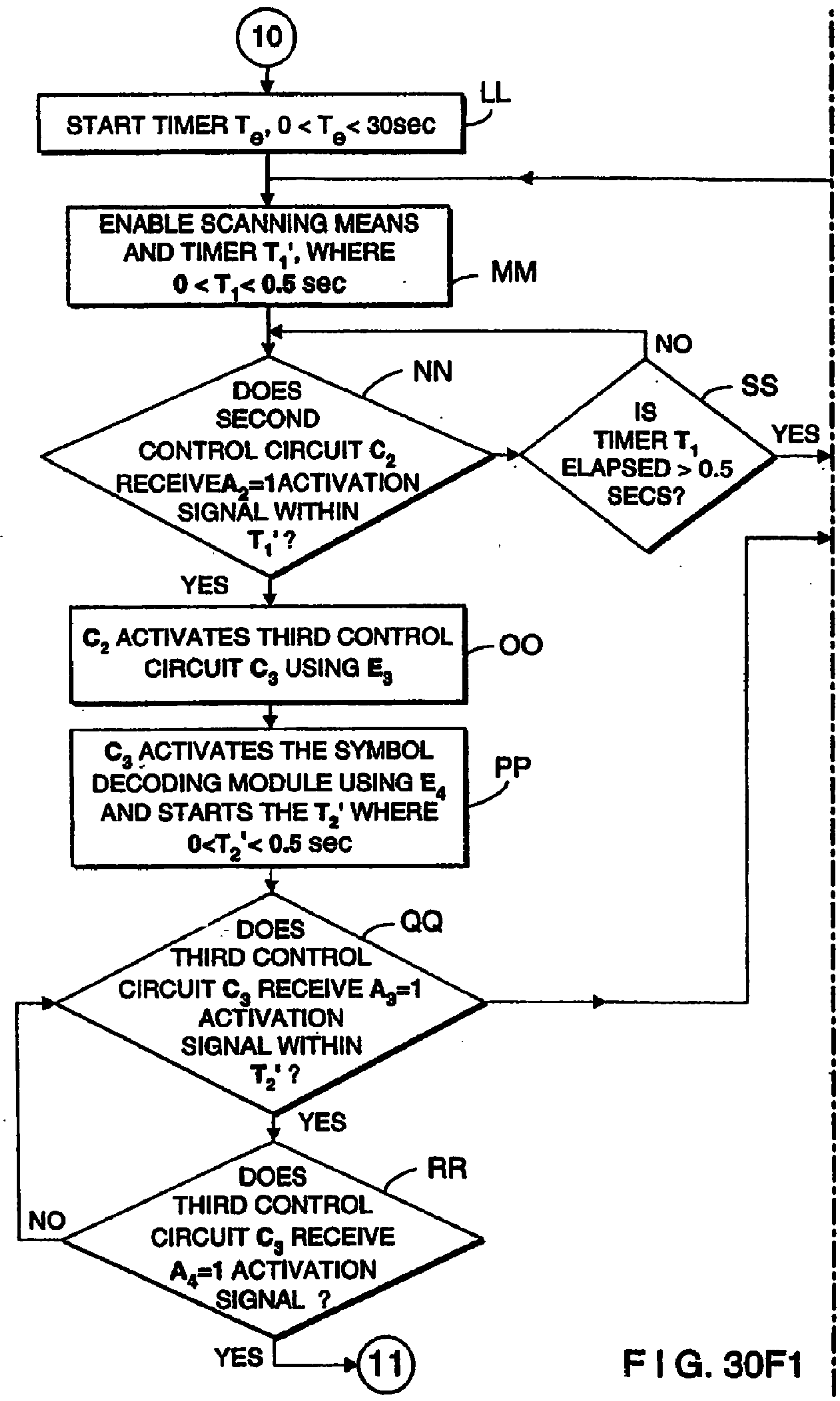
FIG. 30F1

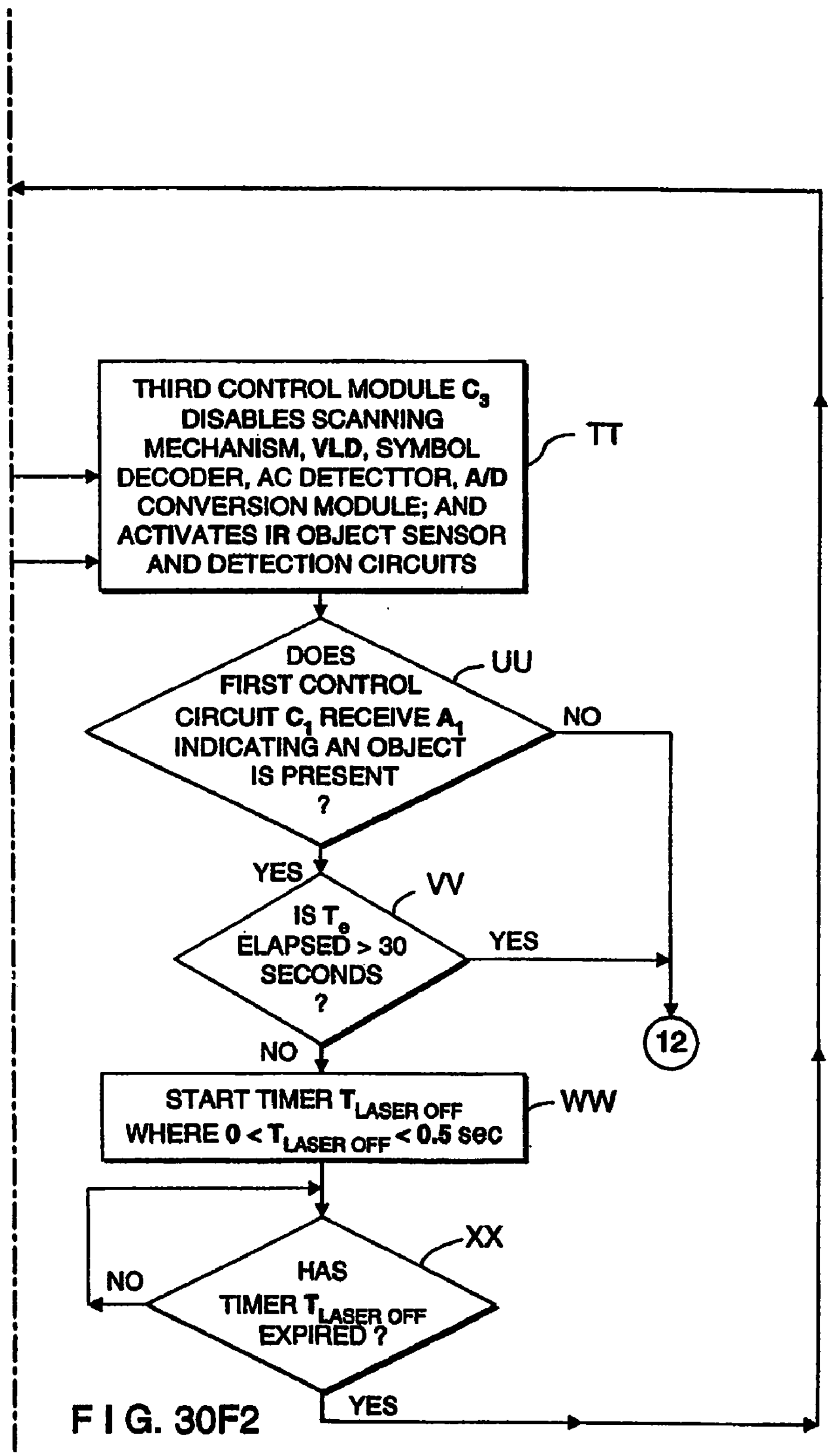
F I G. 30F2

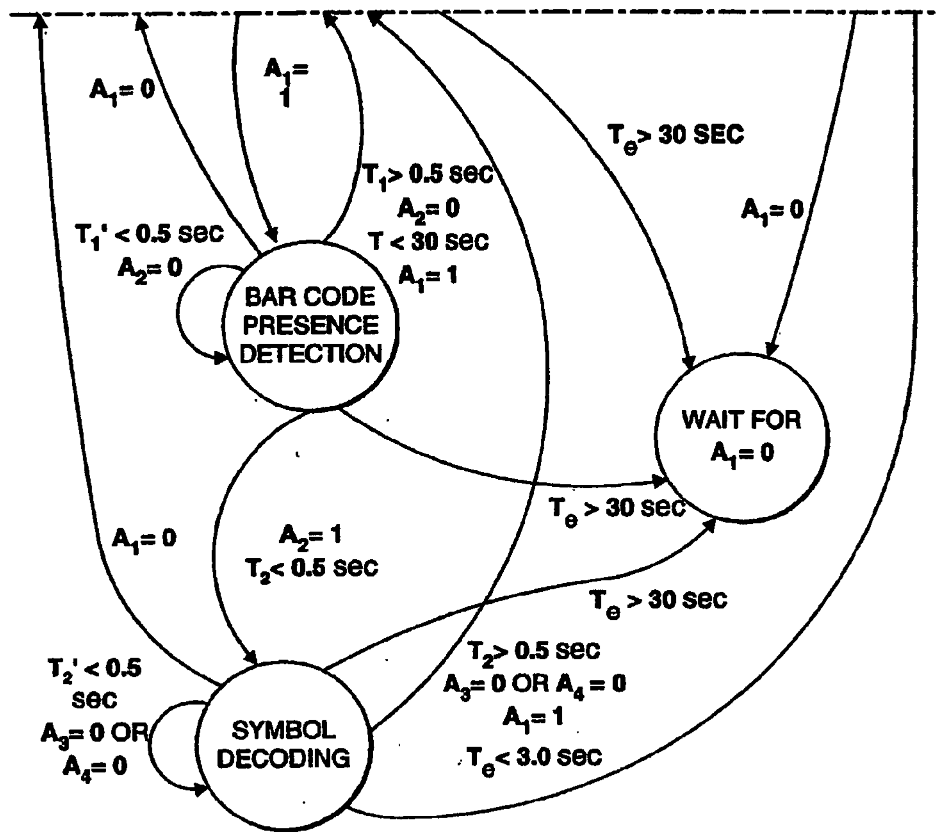
F I G. 31B

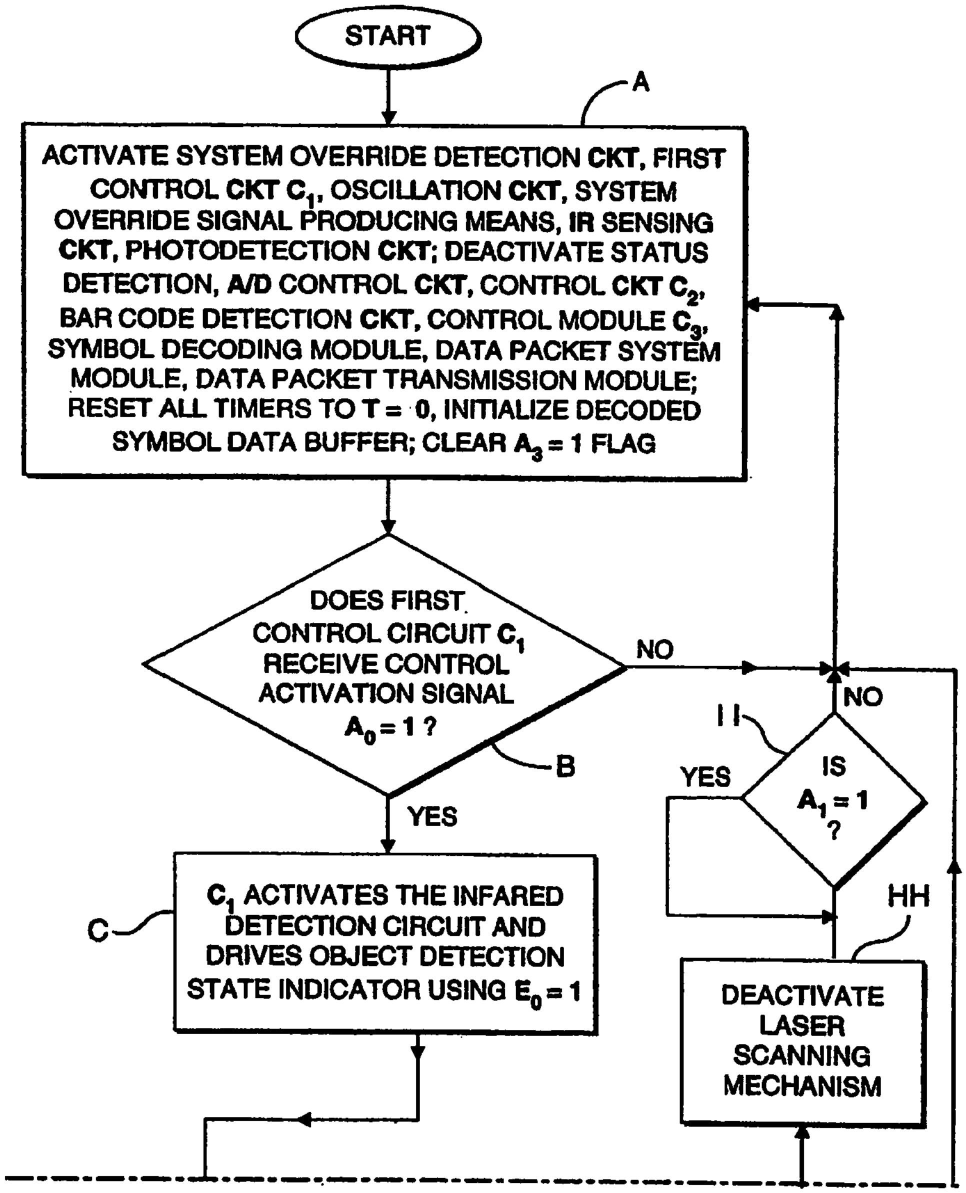
F I G. 32A1

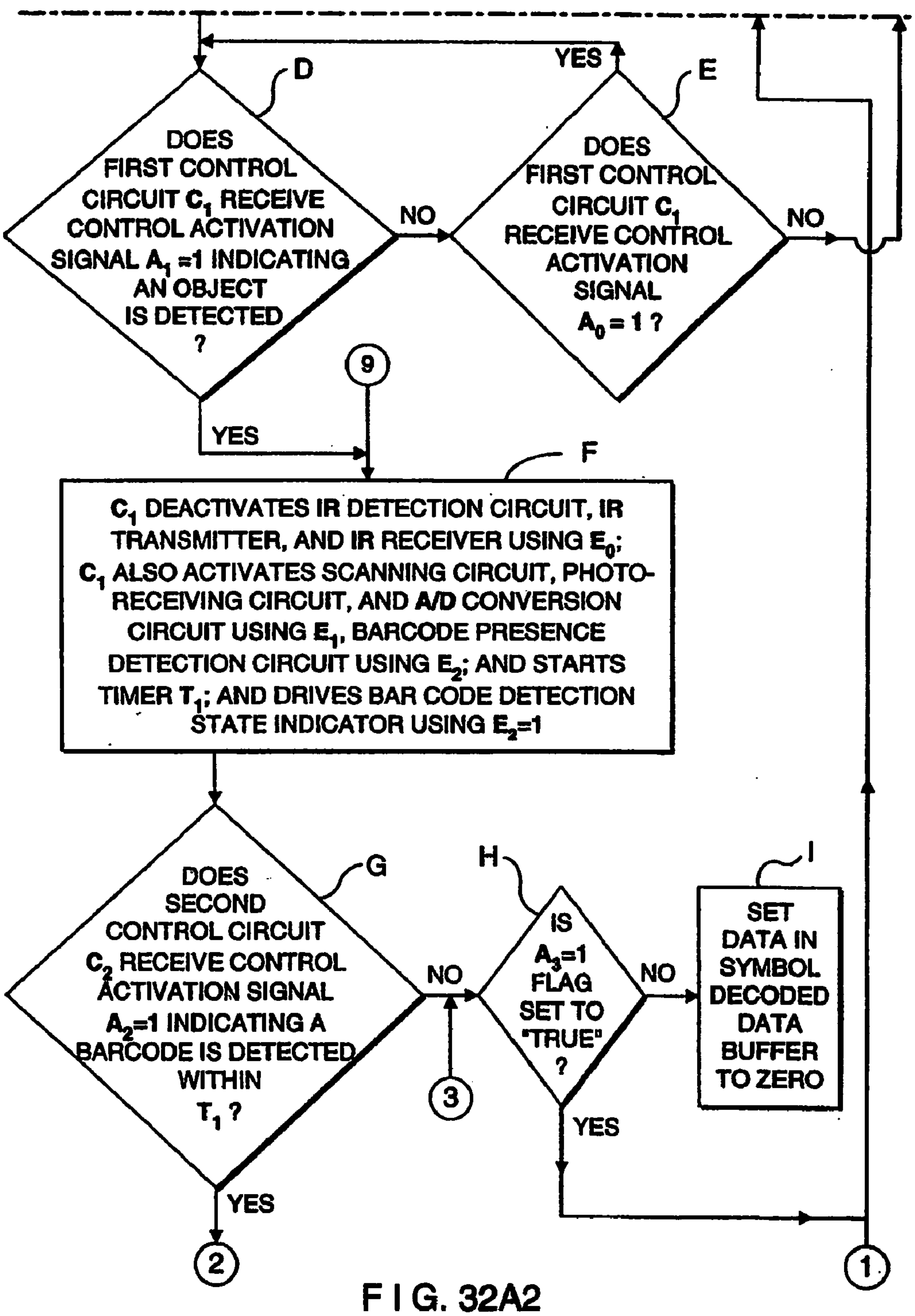
FIG. 32A2

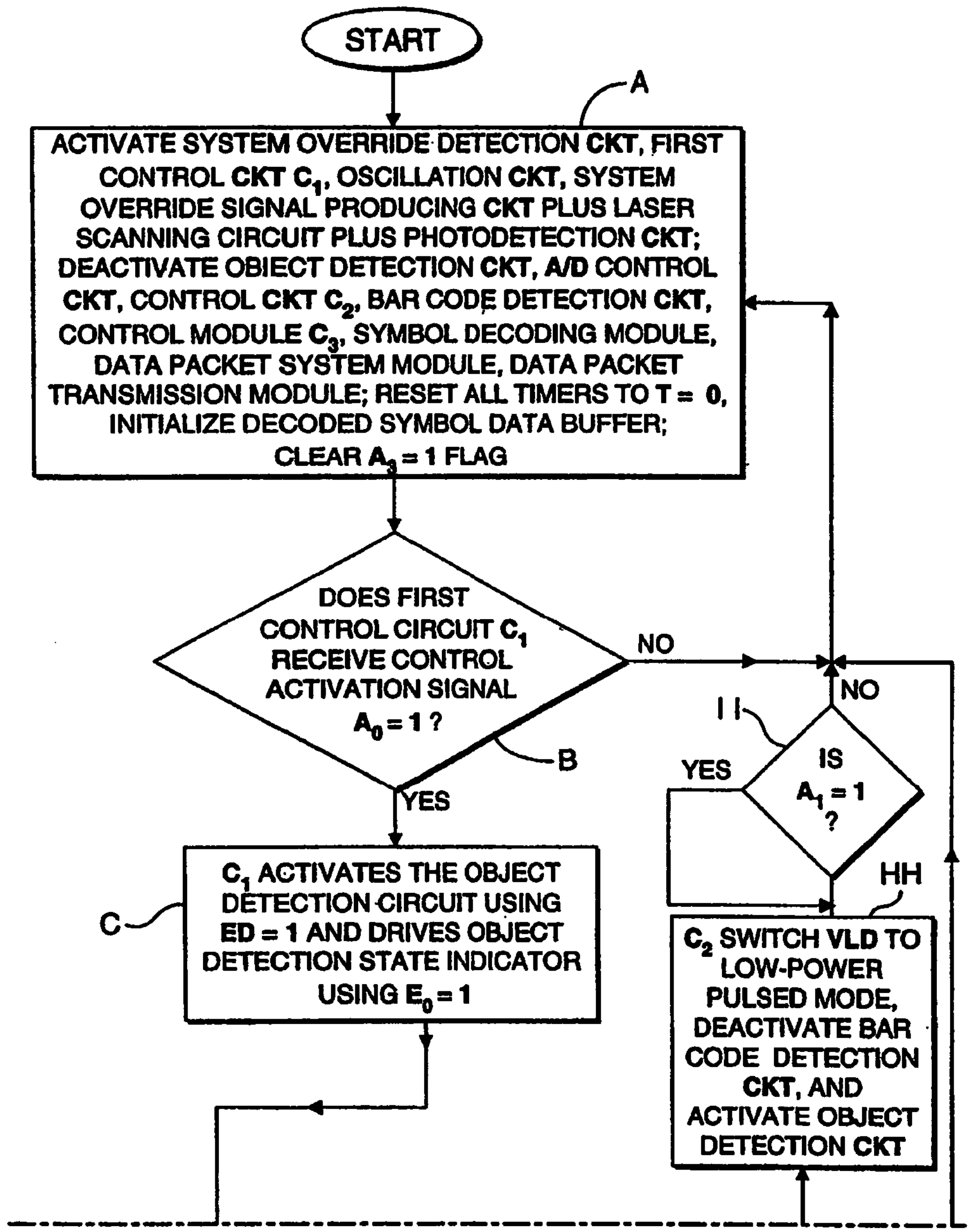
F I G. 33A1

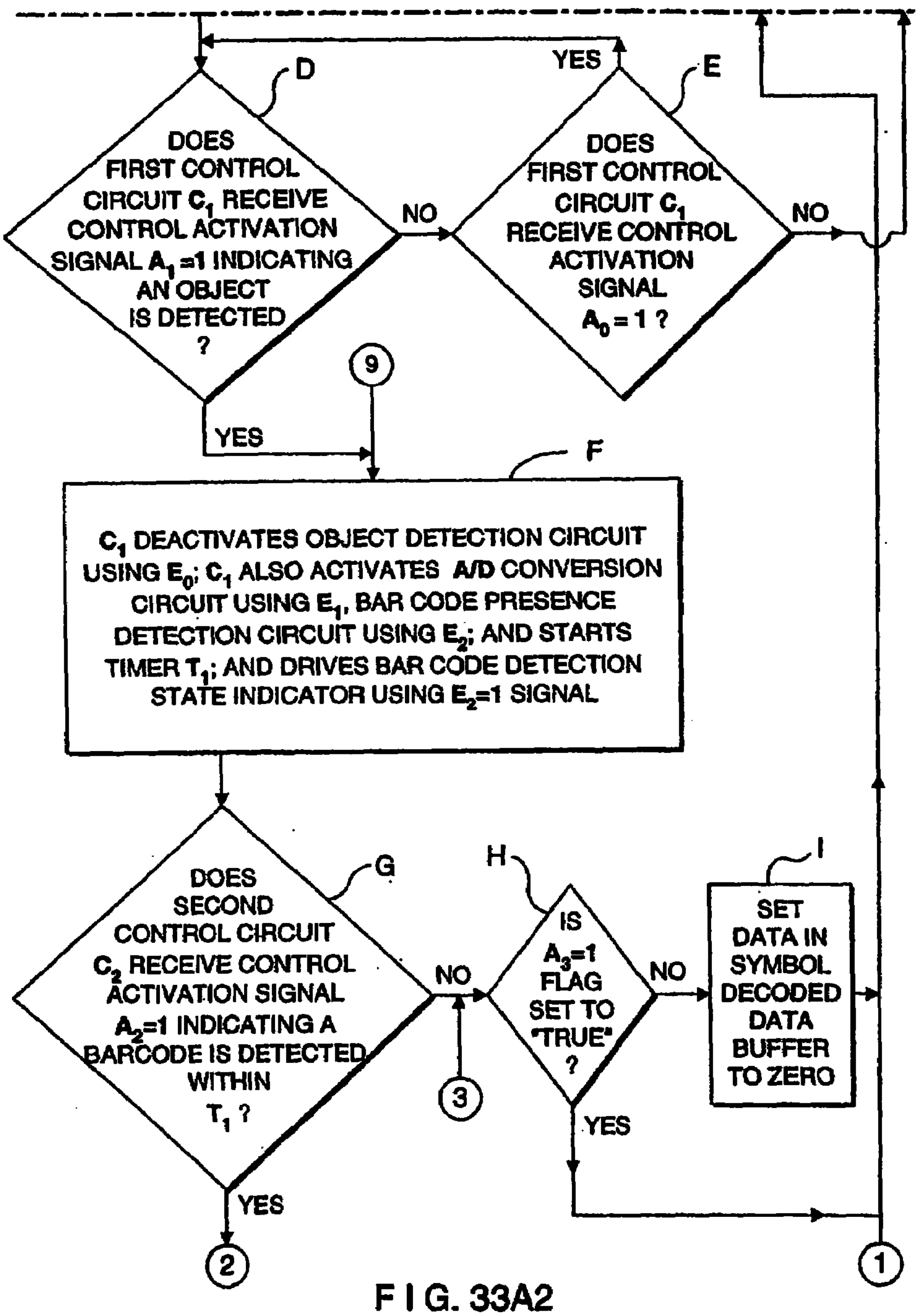
FIG. 33A2

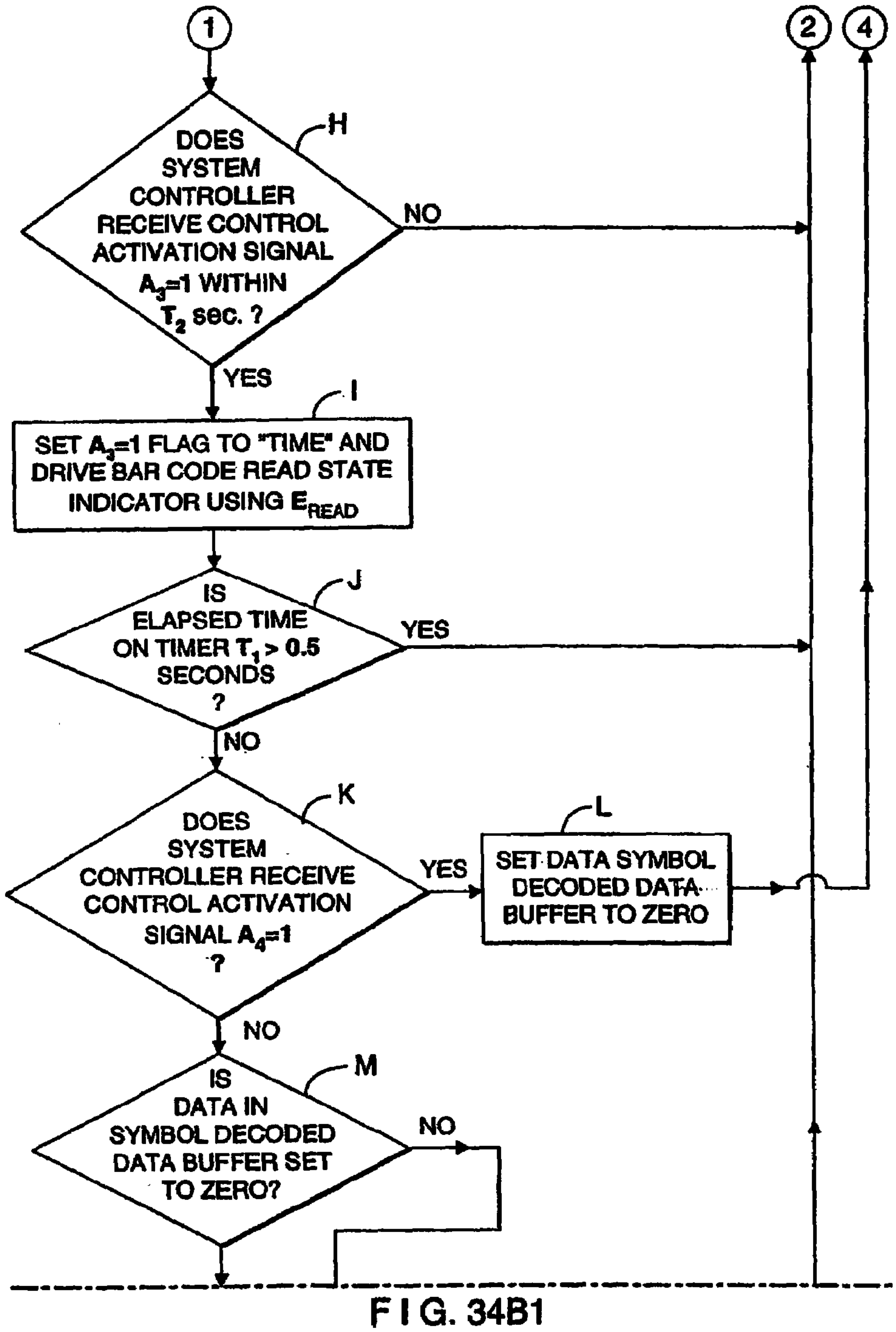
FIG. 34B1

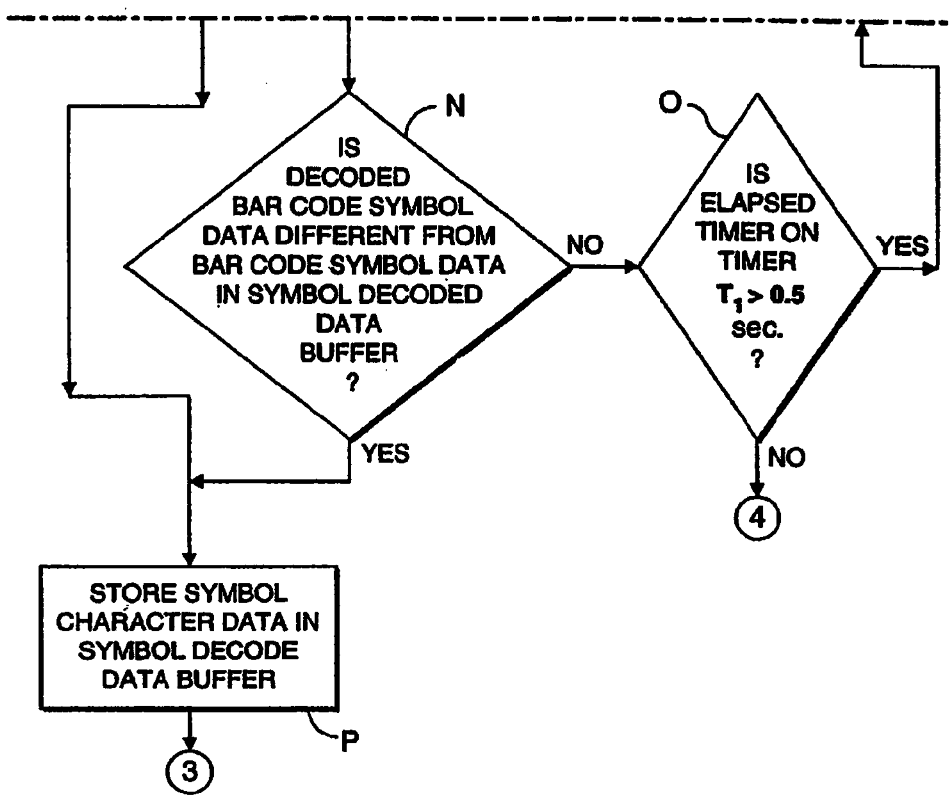
F I G. 34B2

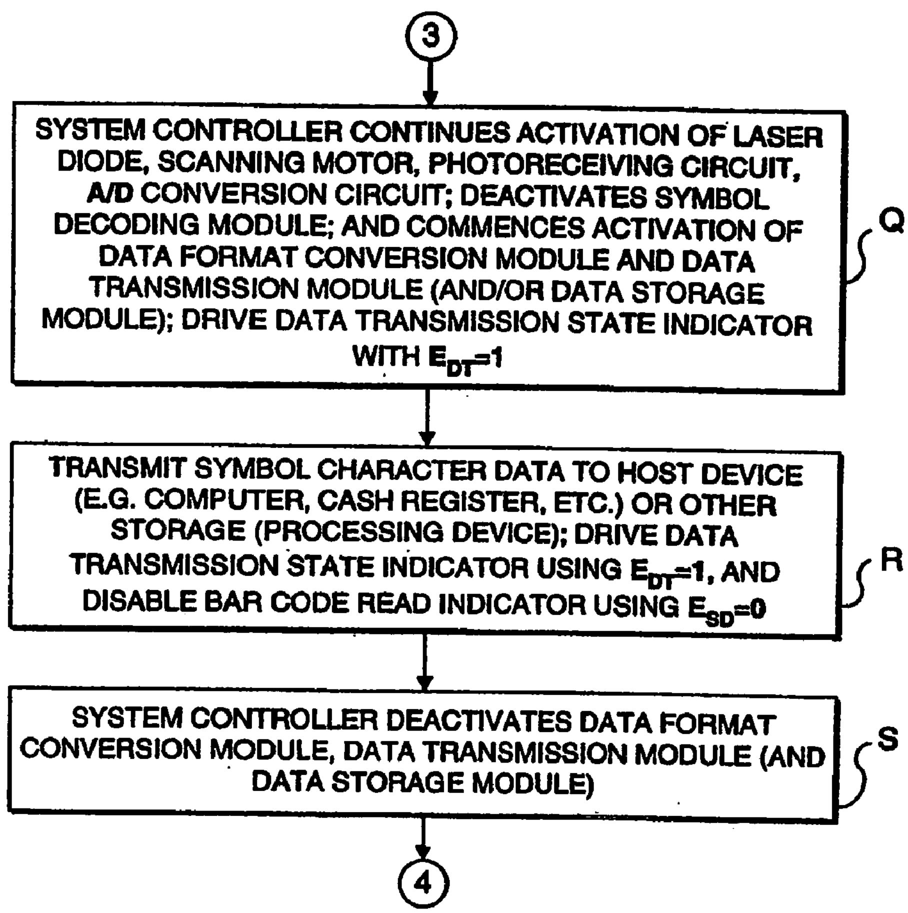
F I G. 34C

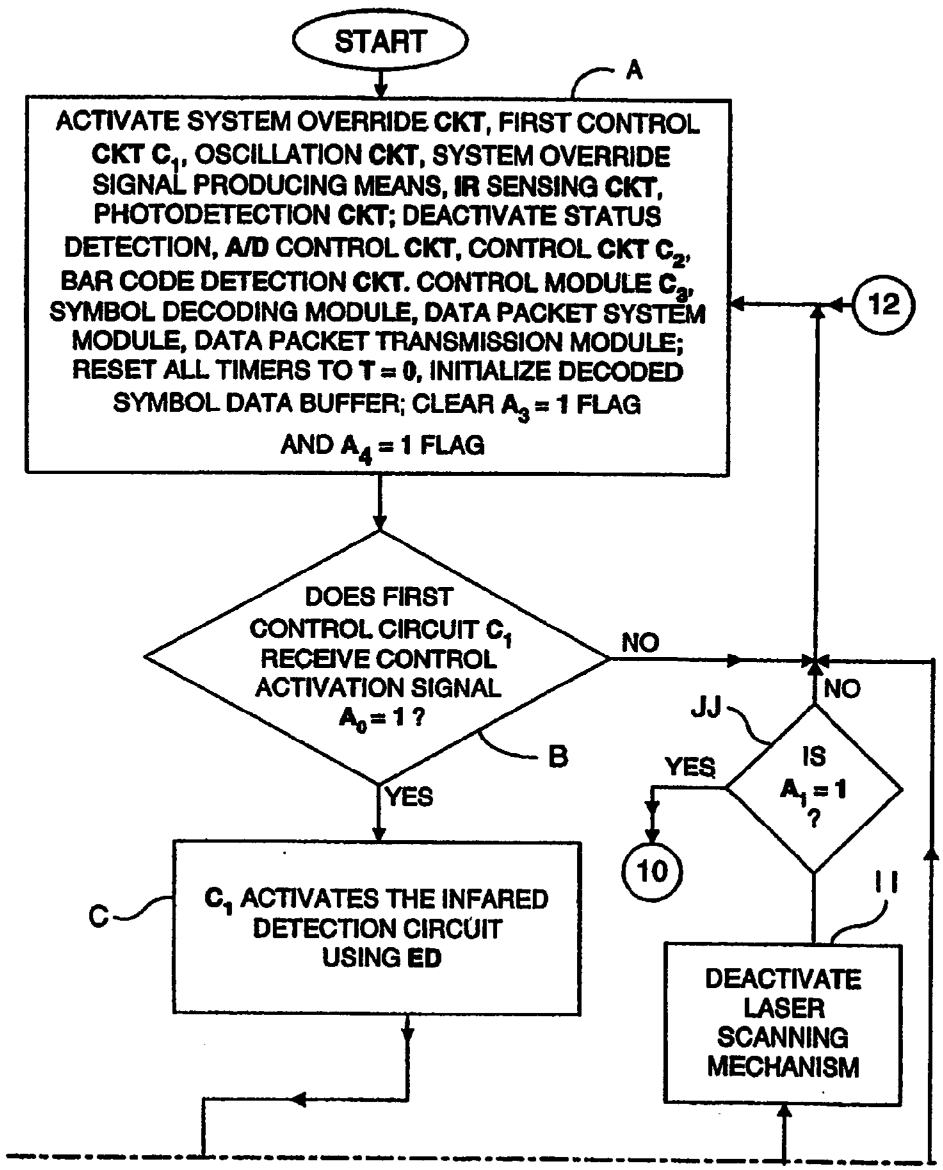
FIG. 35A1

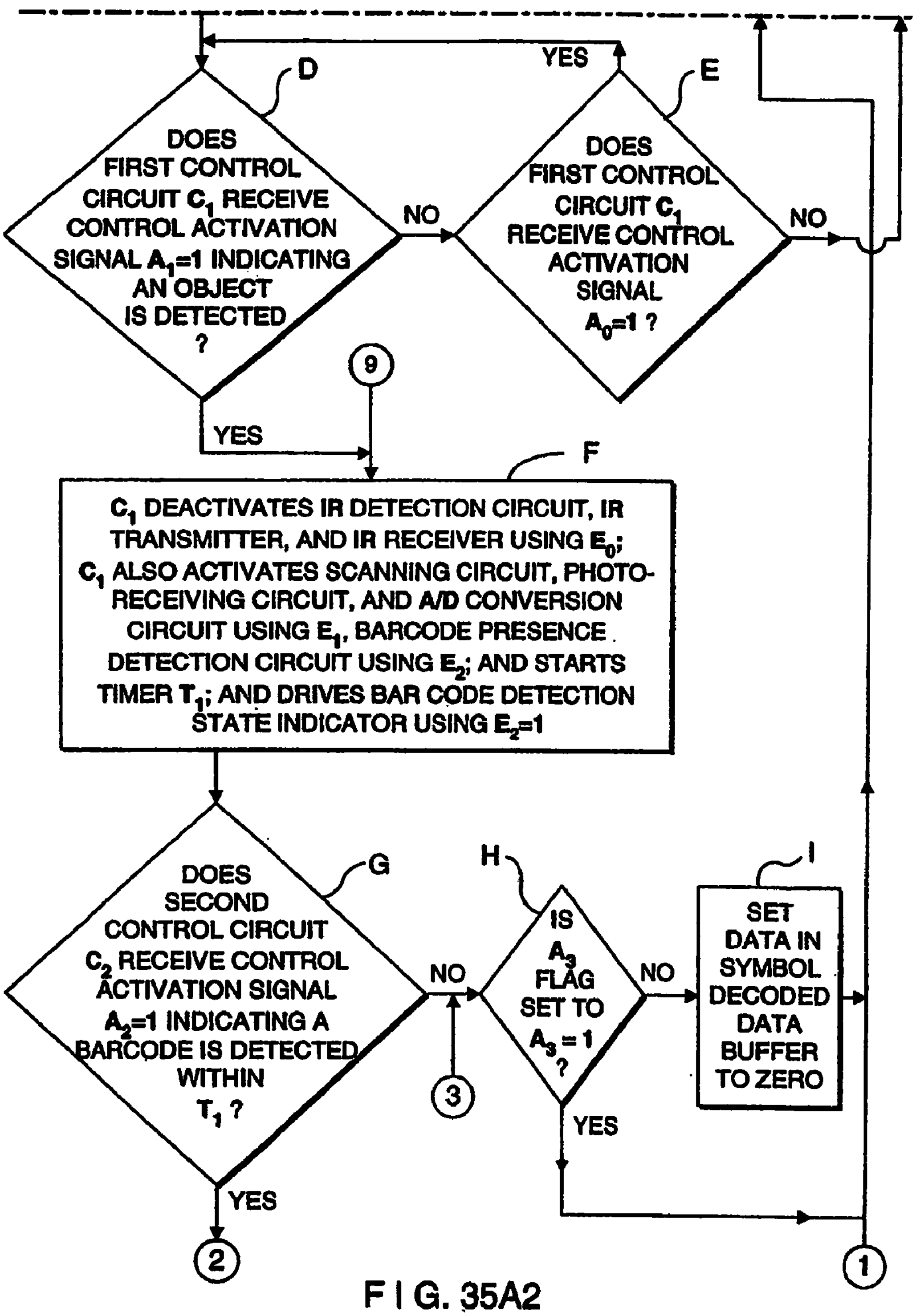
FIG. 35A2

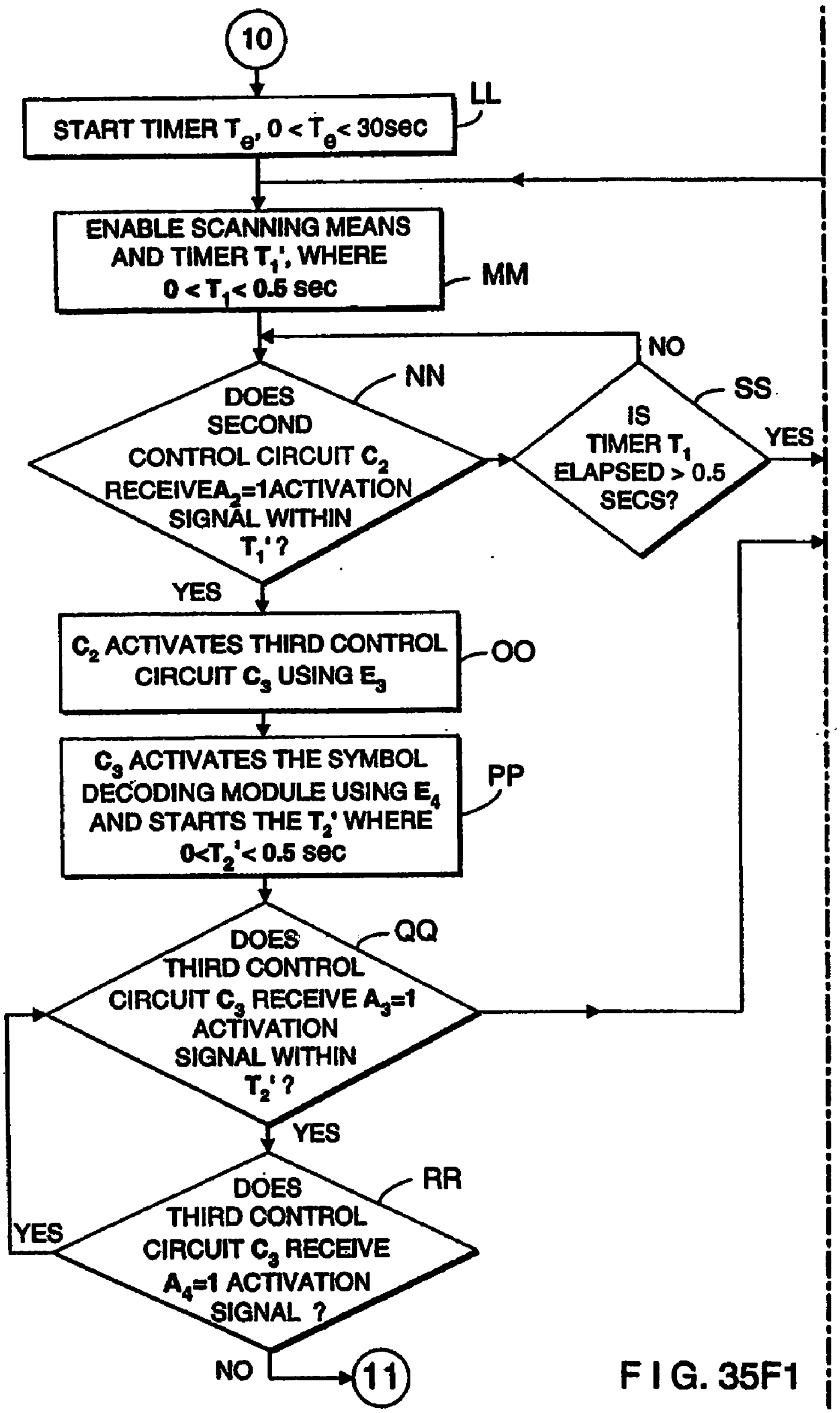
FIG. 35F1

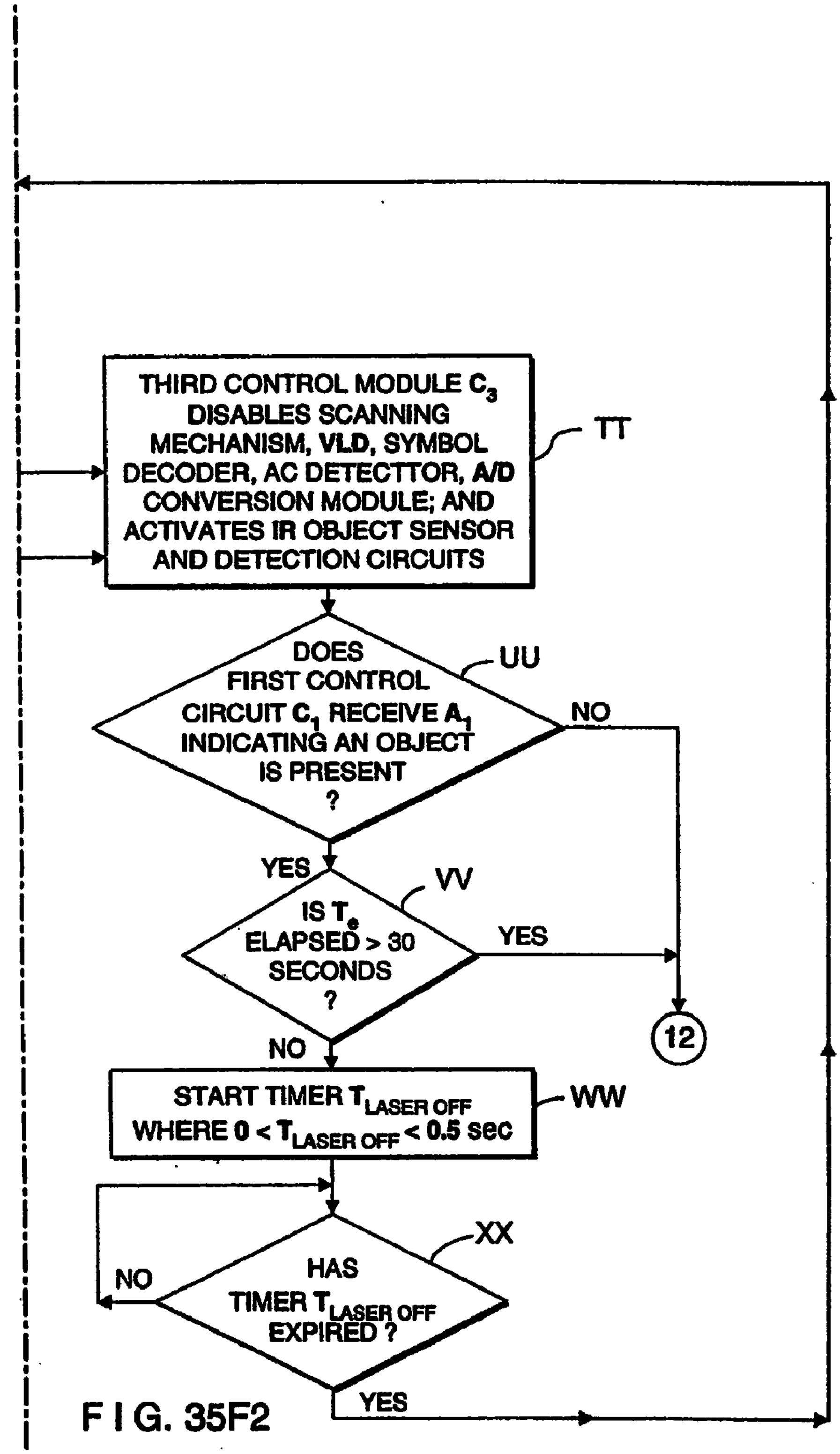
F I G. 35F2

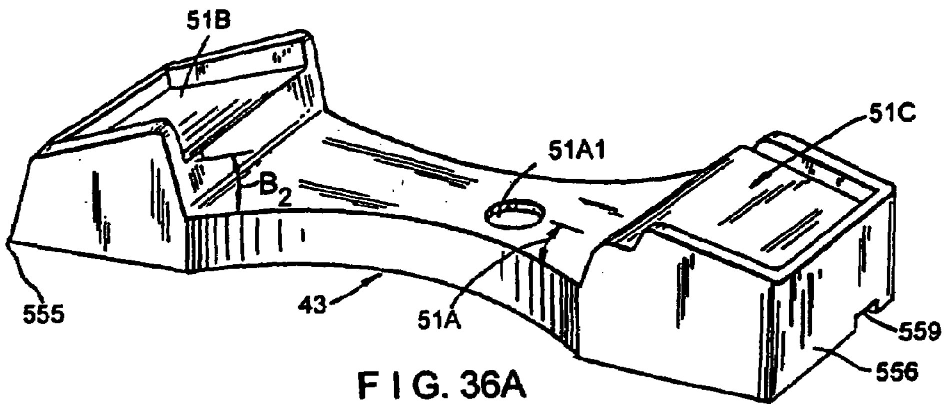
F I G. 36A
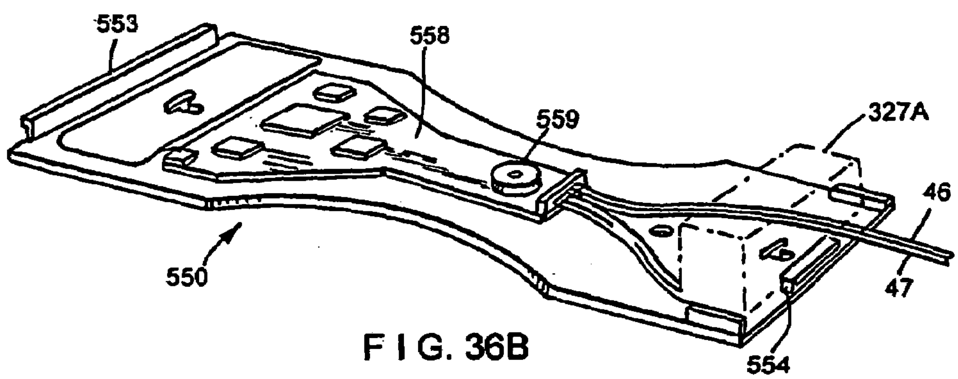
F I G. 36B
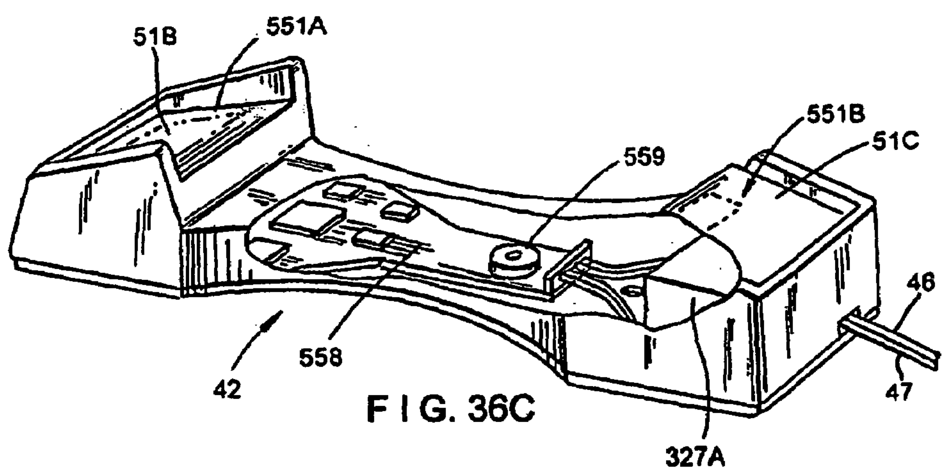
F I G. 36C

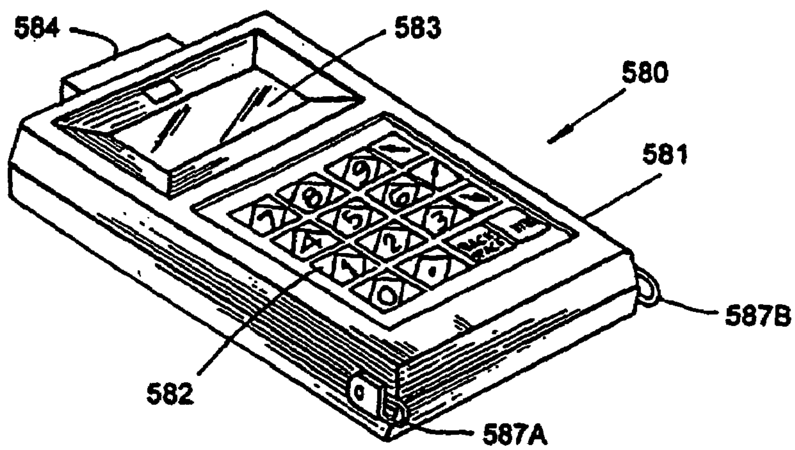
F I G. 38A
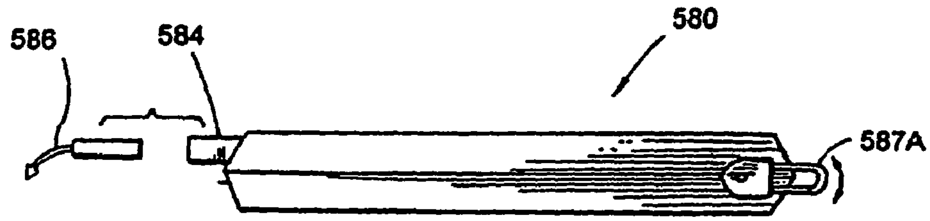
F I G. 38B
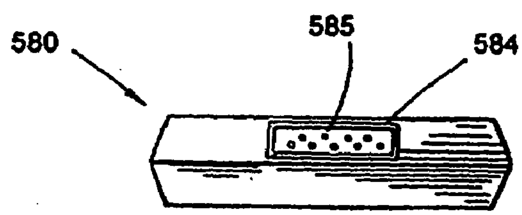
F I G. 38C

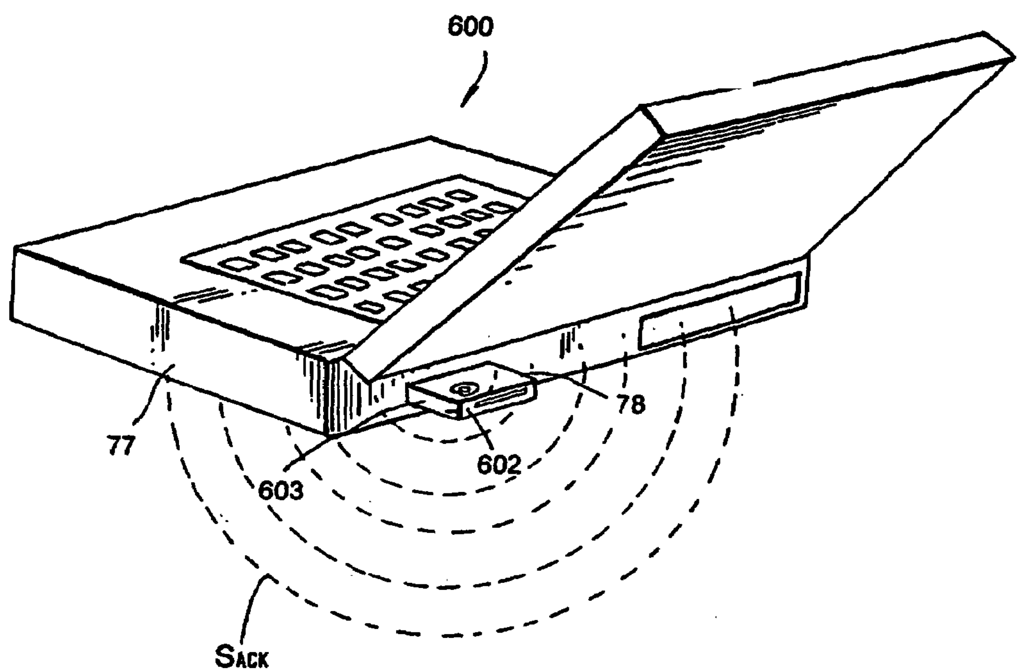
F I G. 39

Automatic Bar Code Reading System With 2-Way RF Communication Link

Protracted Configuration

Protracted Configuration

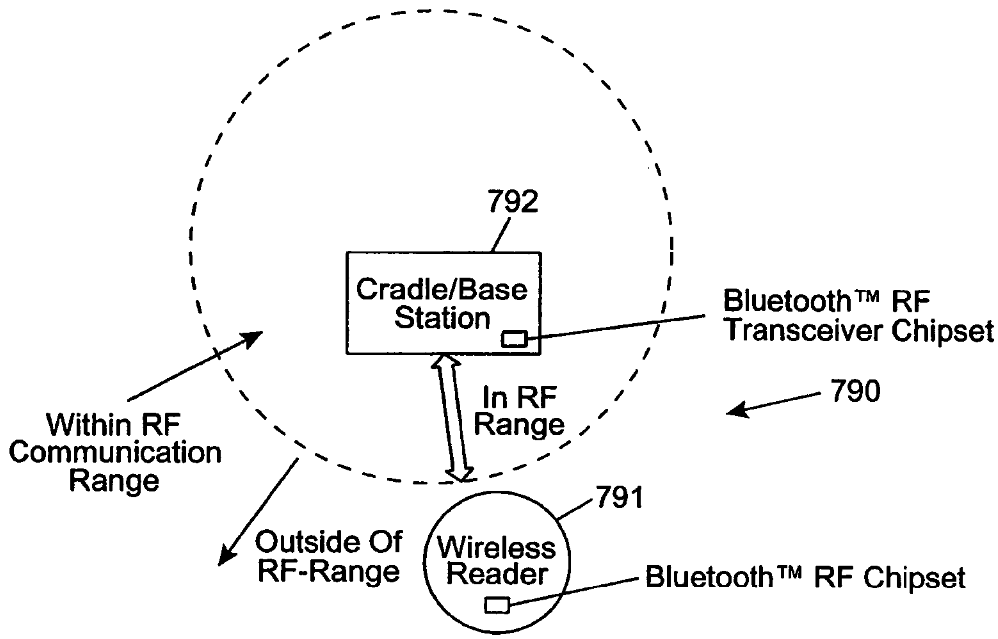
FIG. 44A1
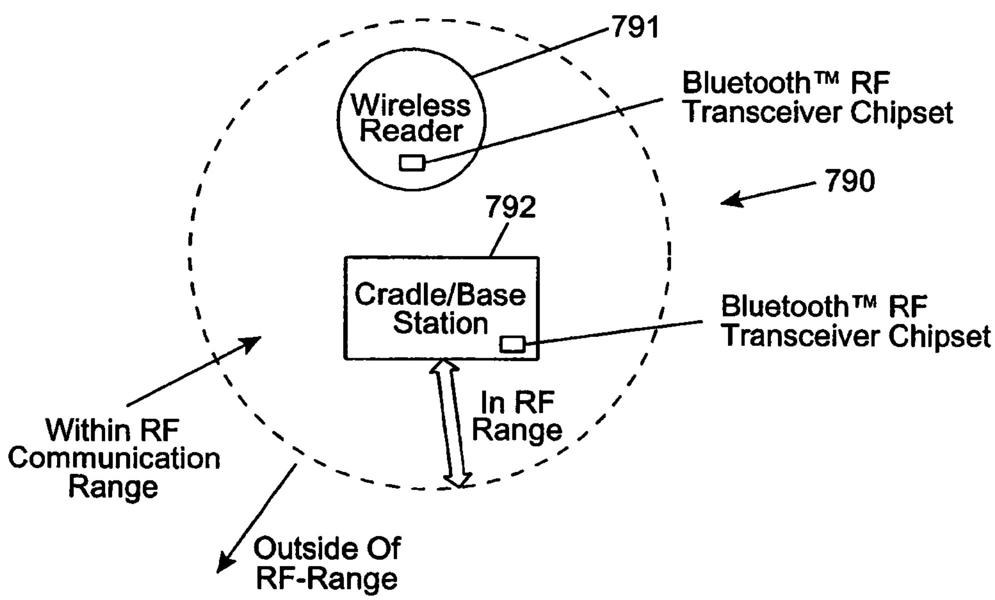
FIG. 44A2

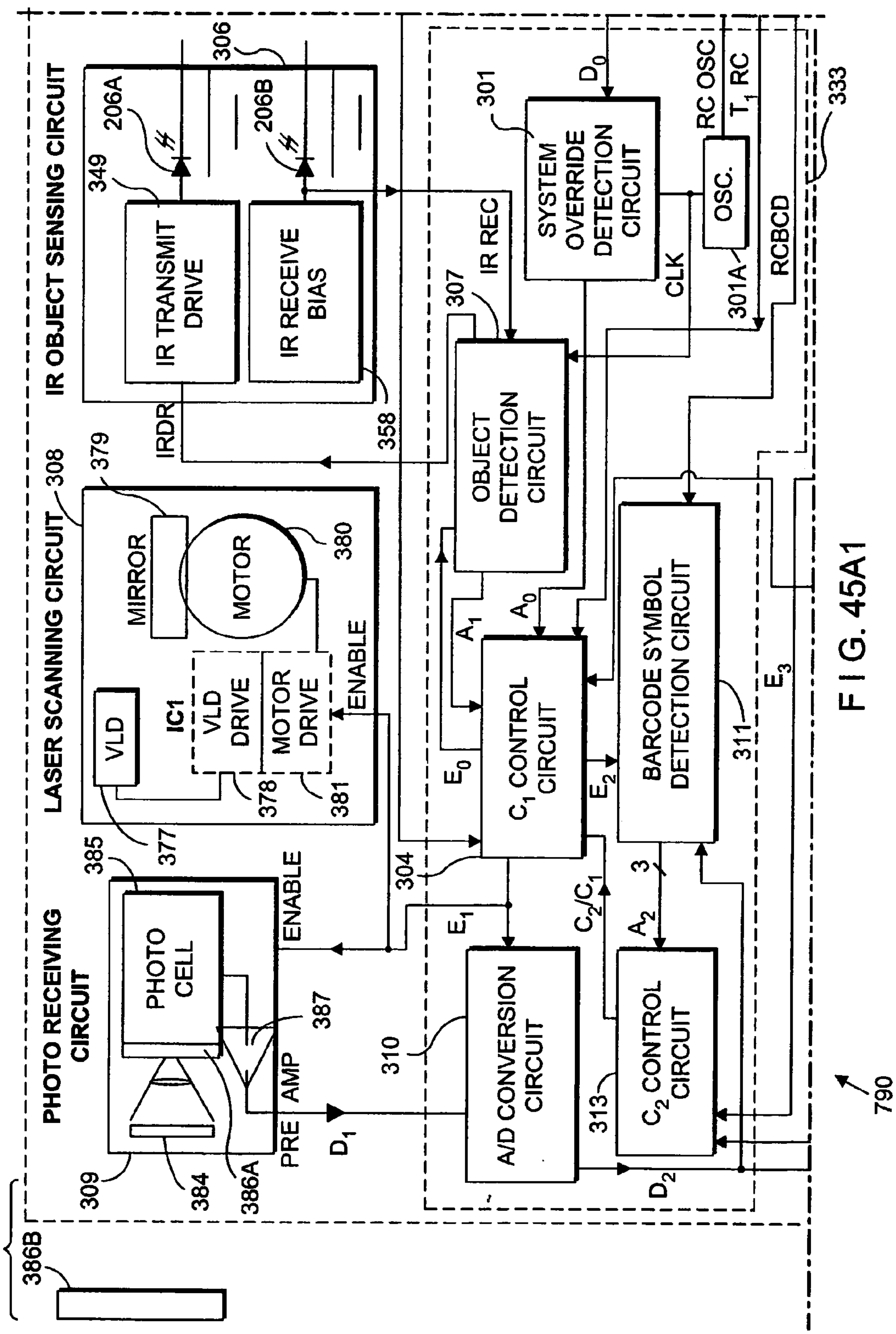
FIG. 45A1

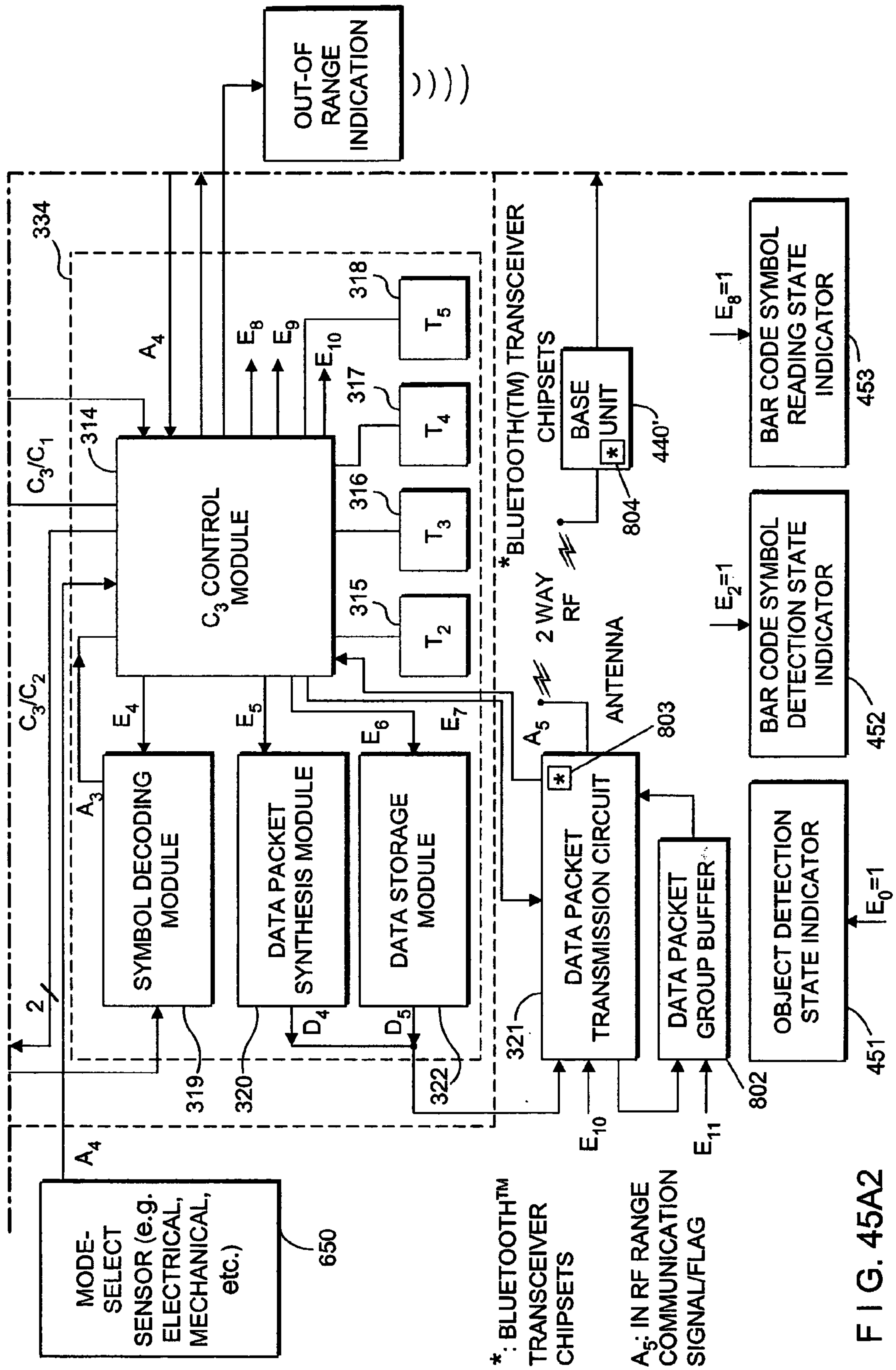
FIG. 45A2

FIG. 45A3
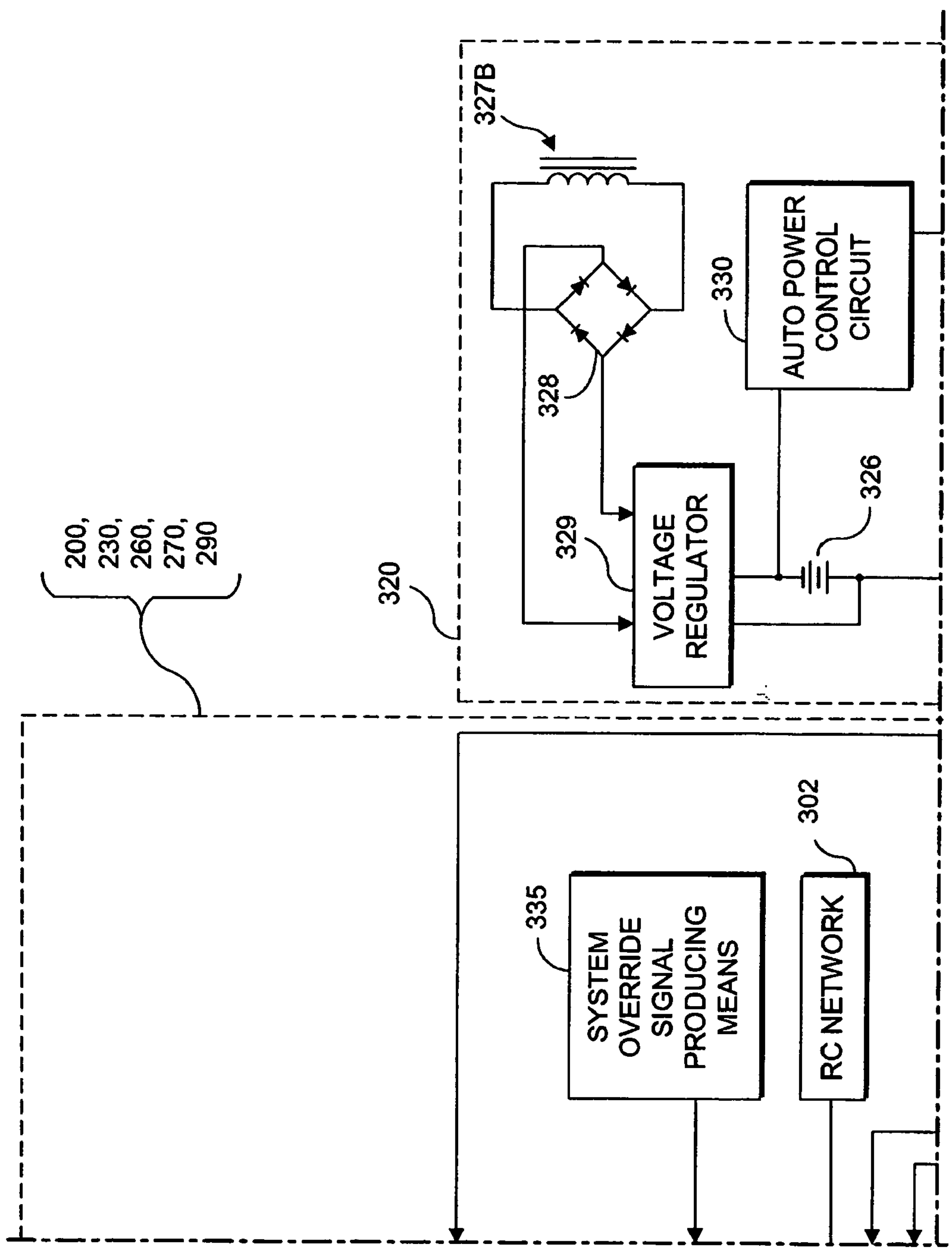

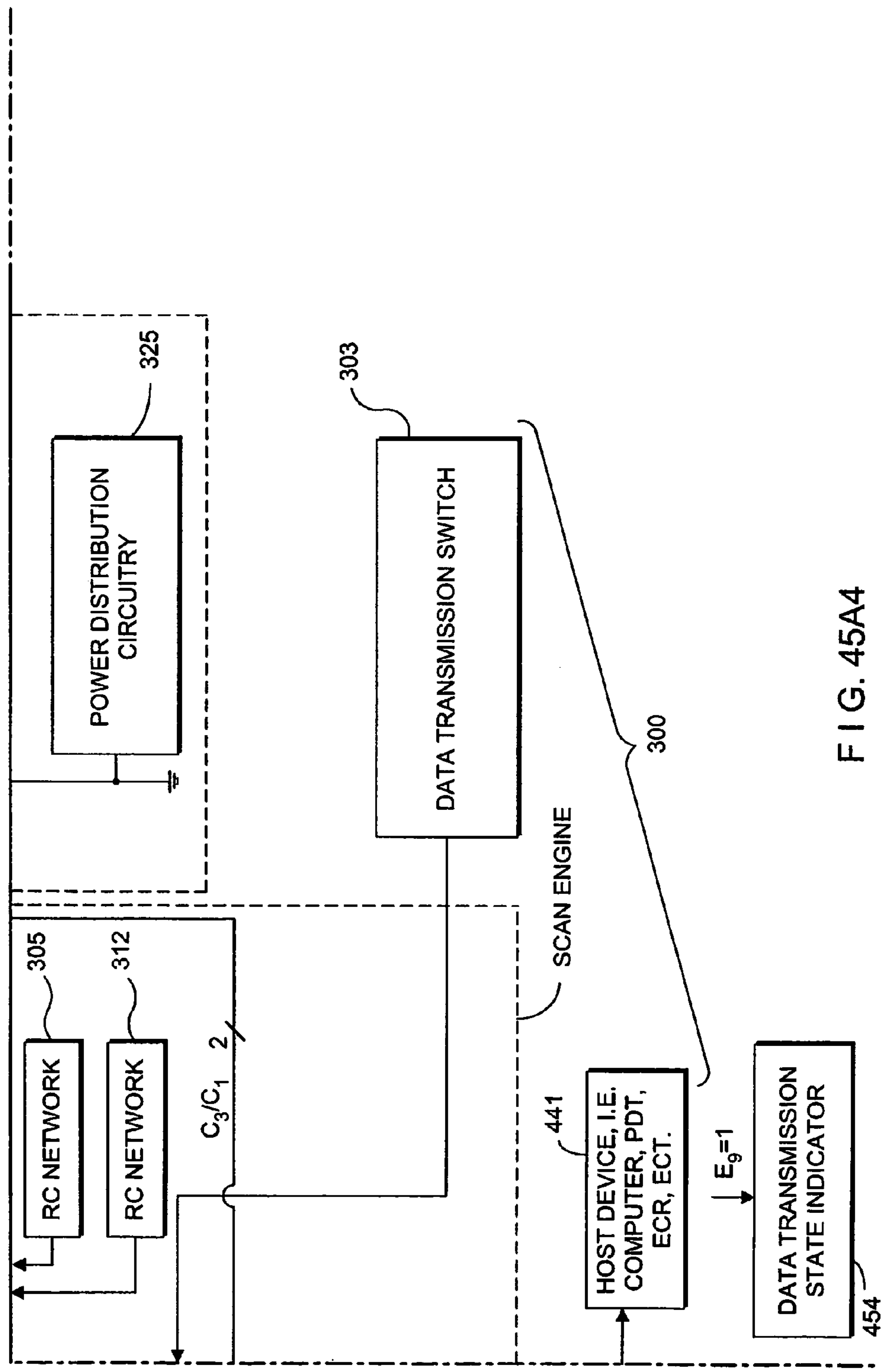
FIG. 45A4

"Direct-Contact Charge Technique"

DATA PACKET TRANSMISSION VIA 2-WAY RF WITH AUTOMATIC RF-RANGE DEPENDENT CONTROL
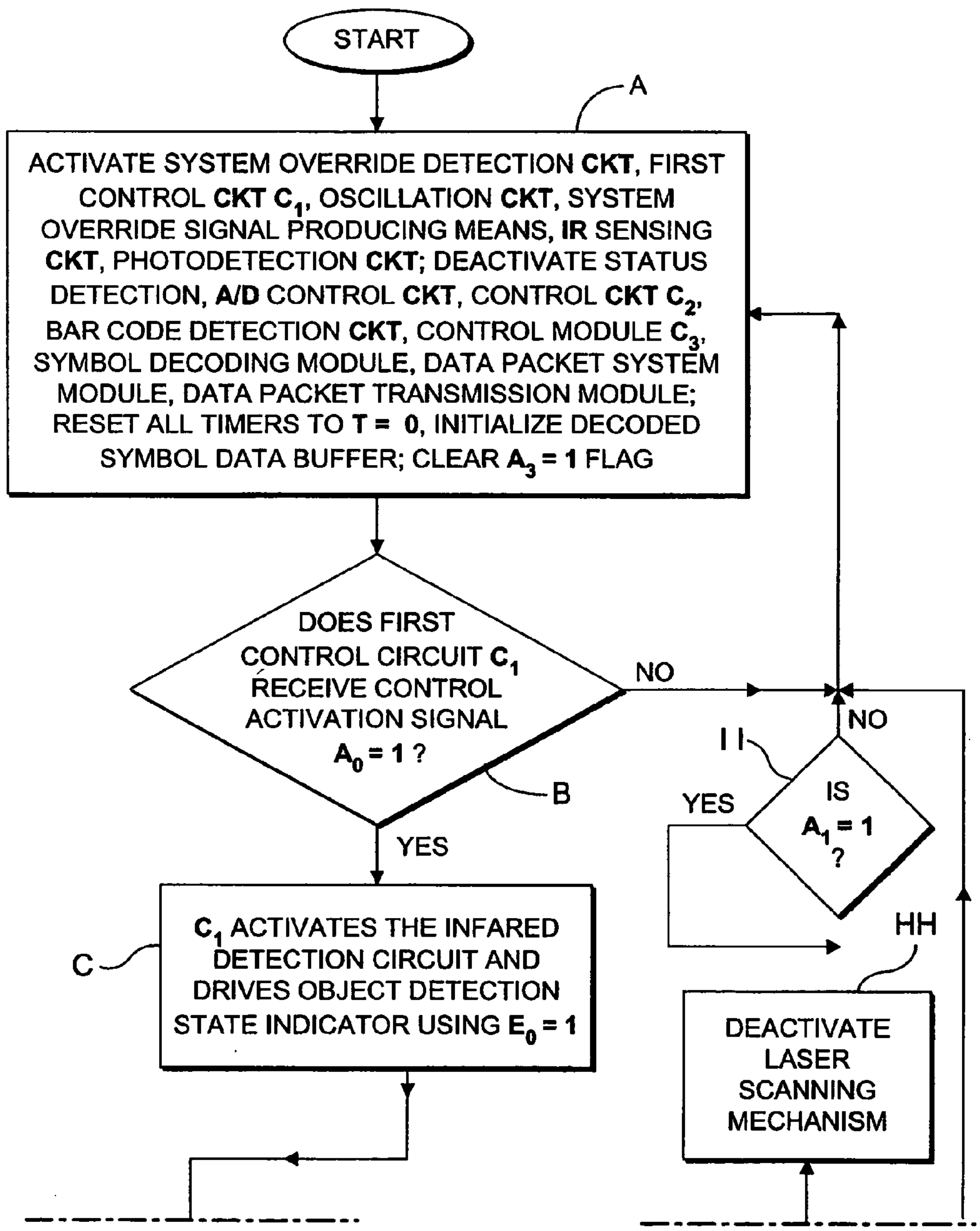
F I G. 46A1

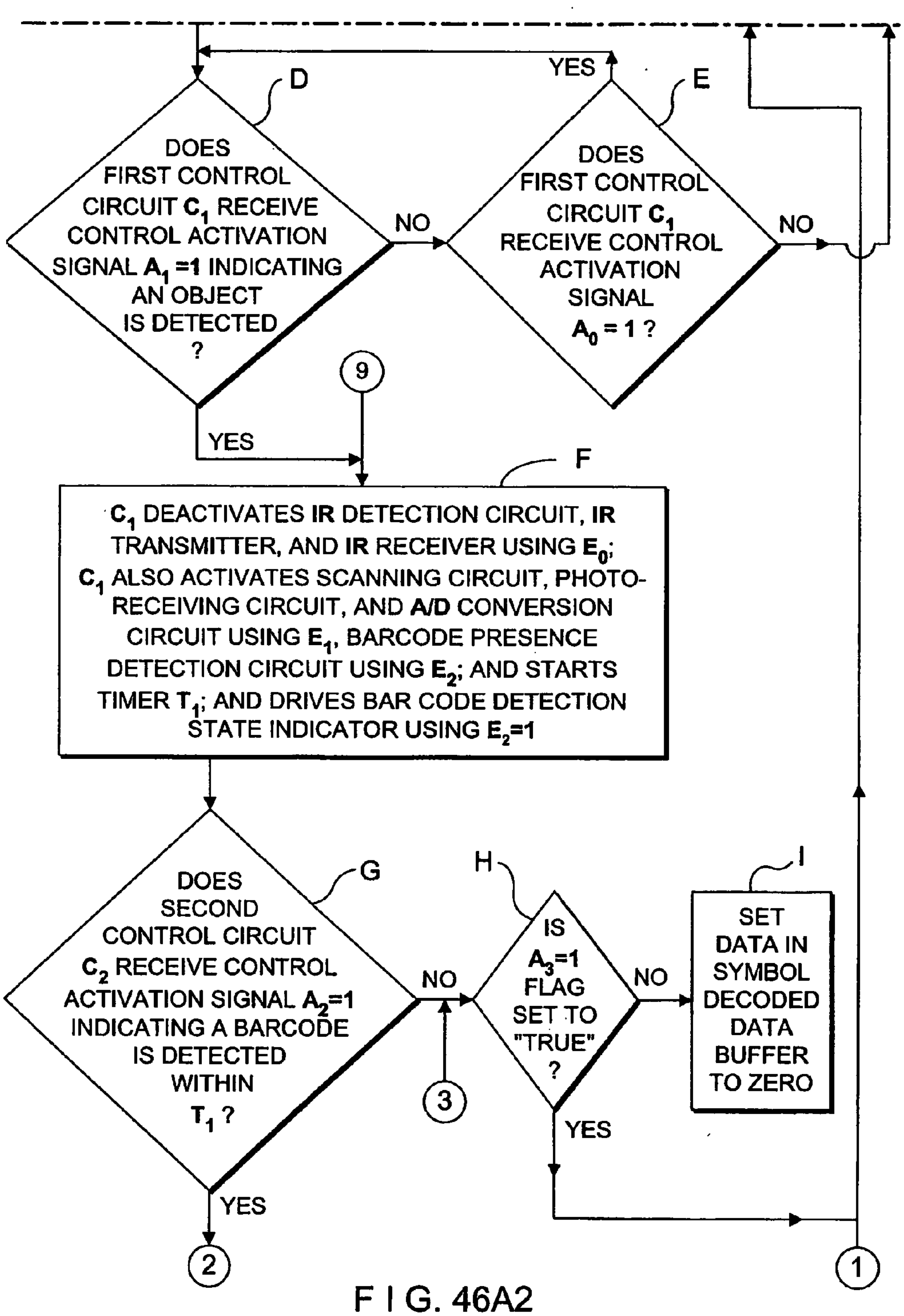
F I G. 46A2

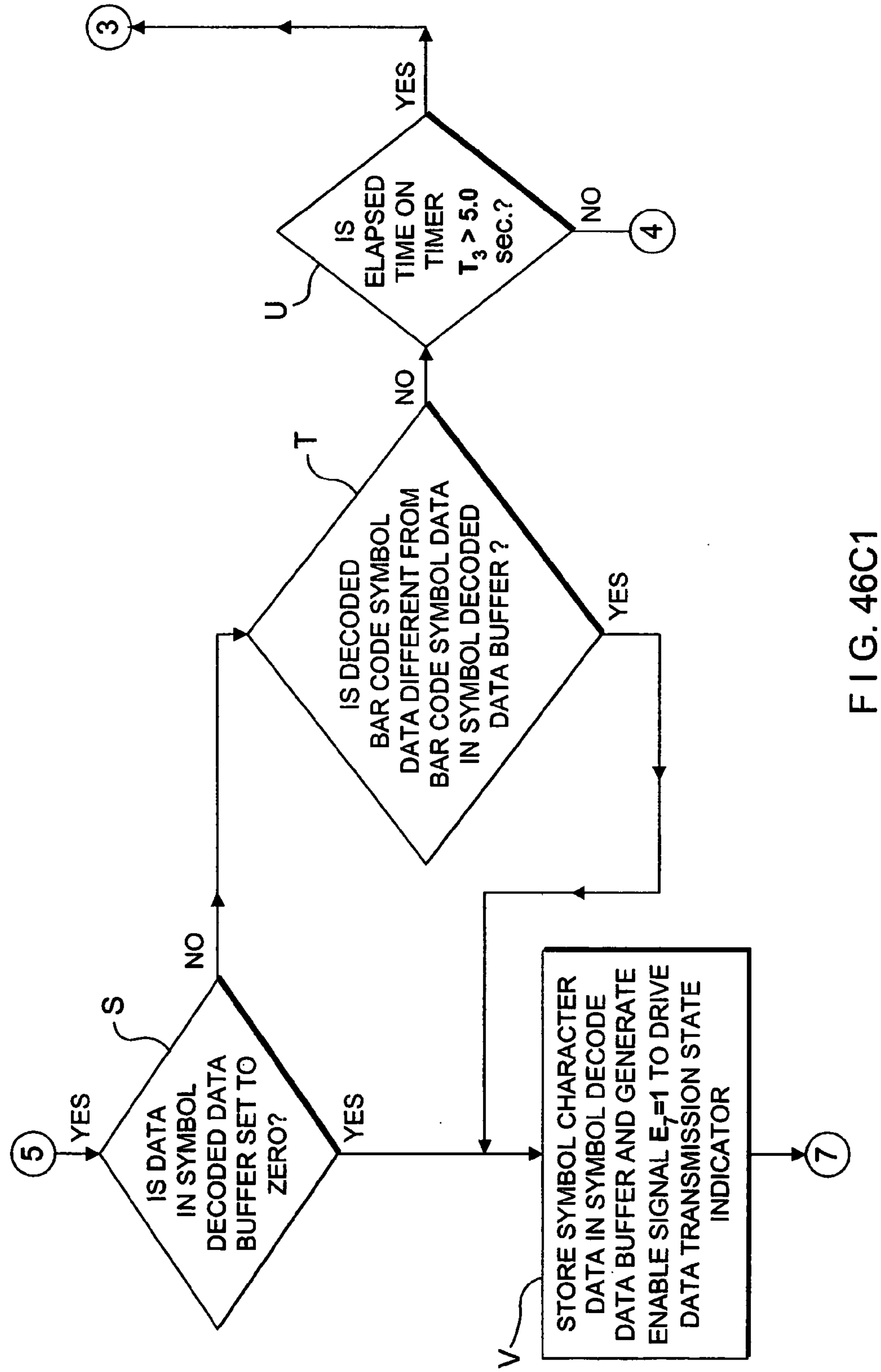
FIG. 46C1

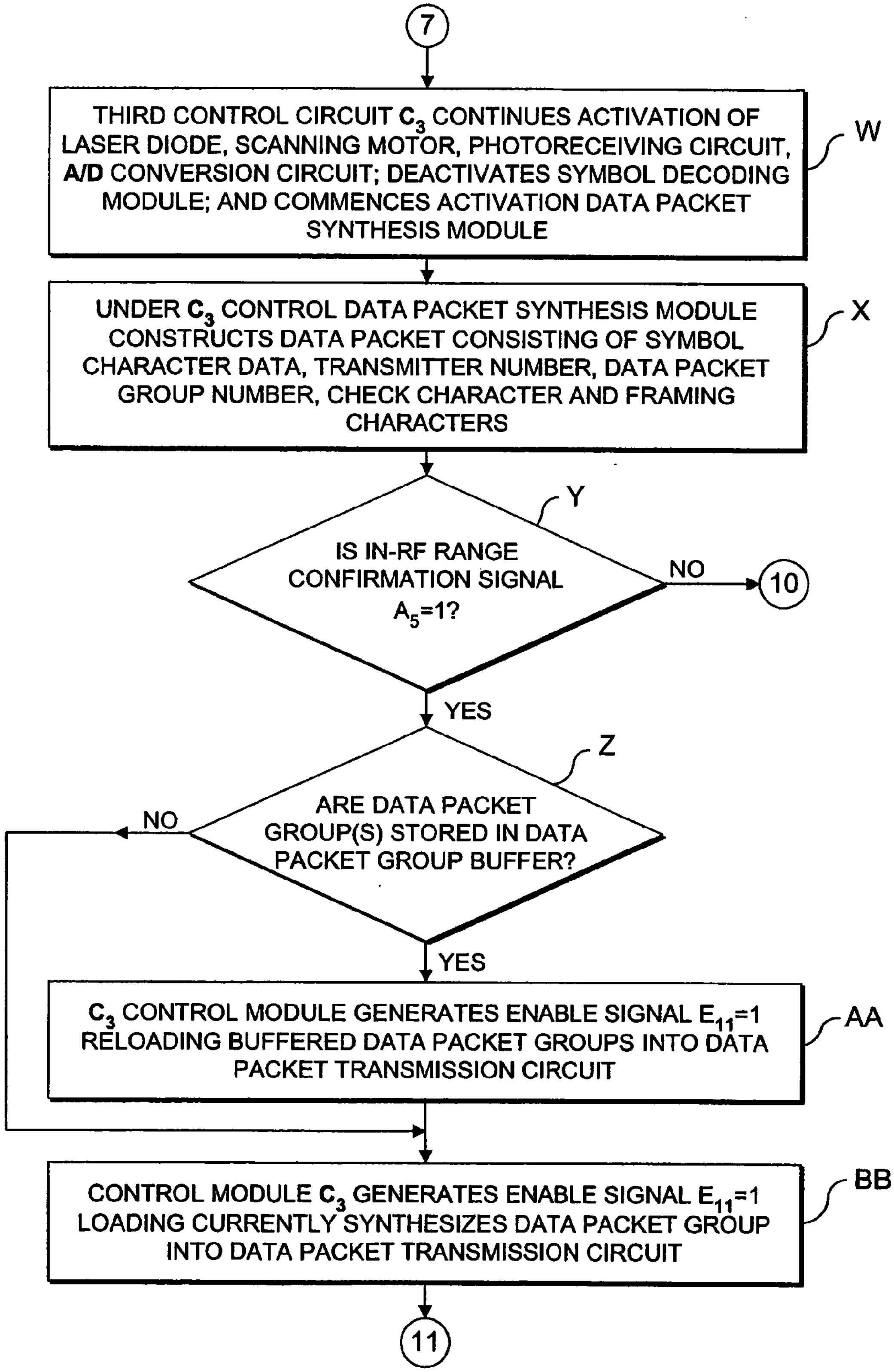
F I G. 46C2

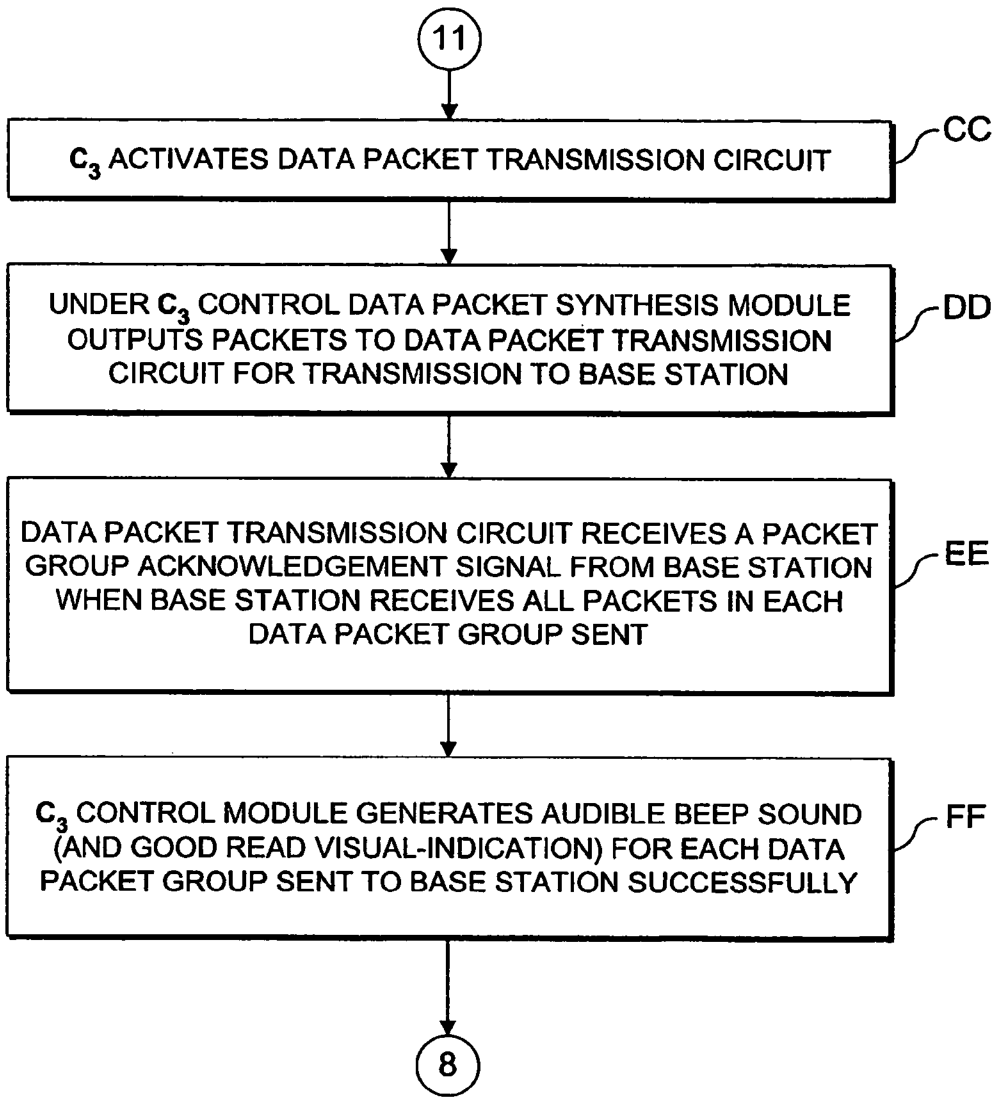
FIG. 46C3

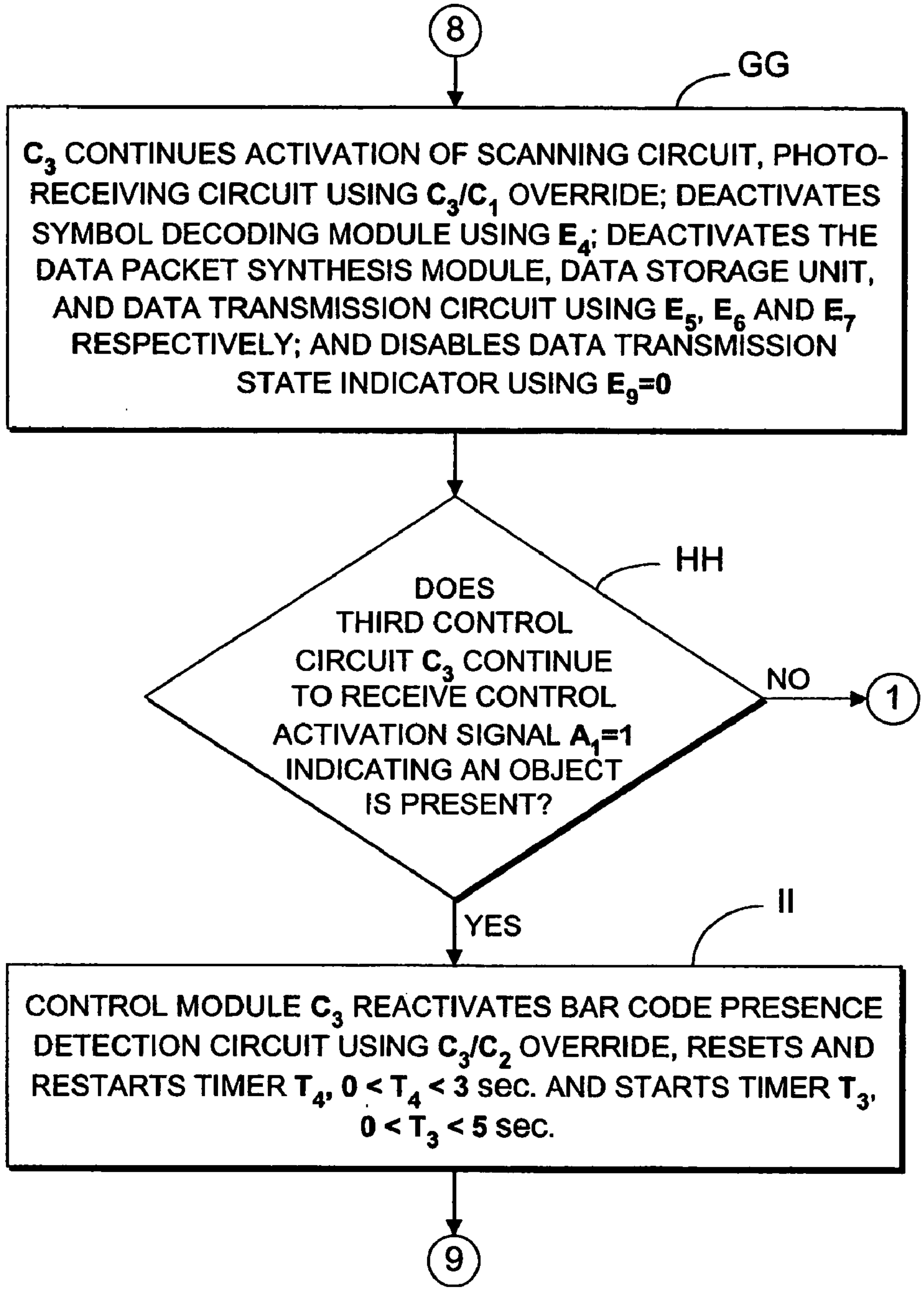
FIG. 46C4

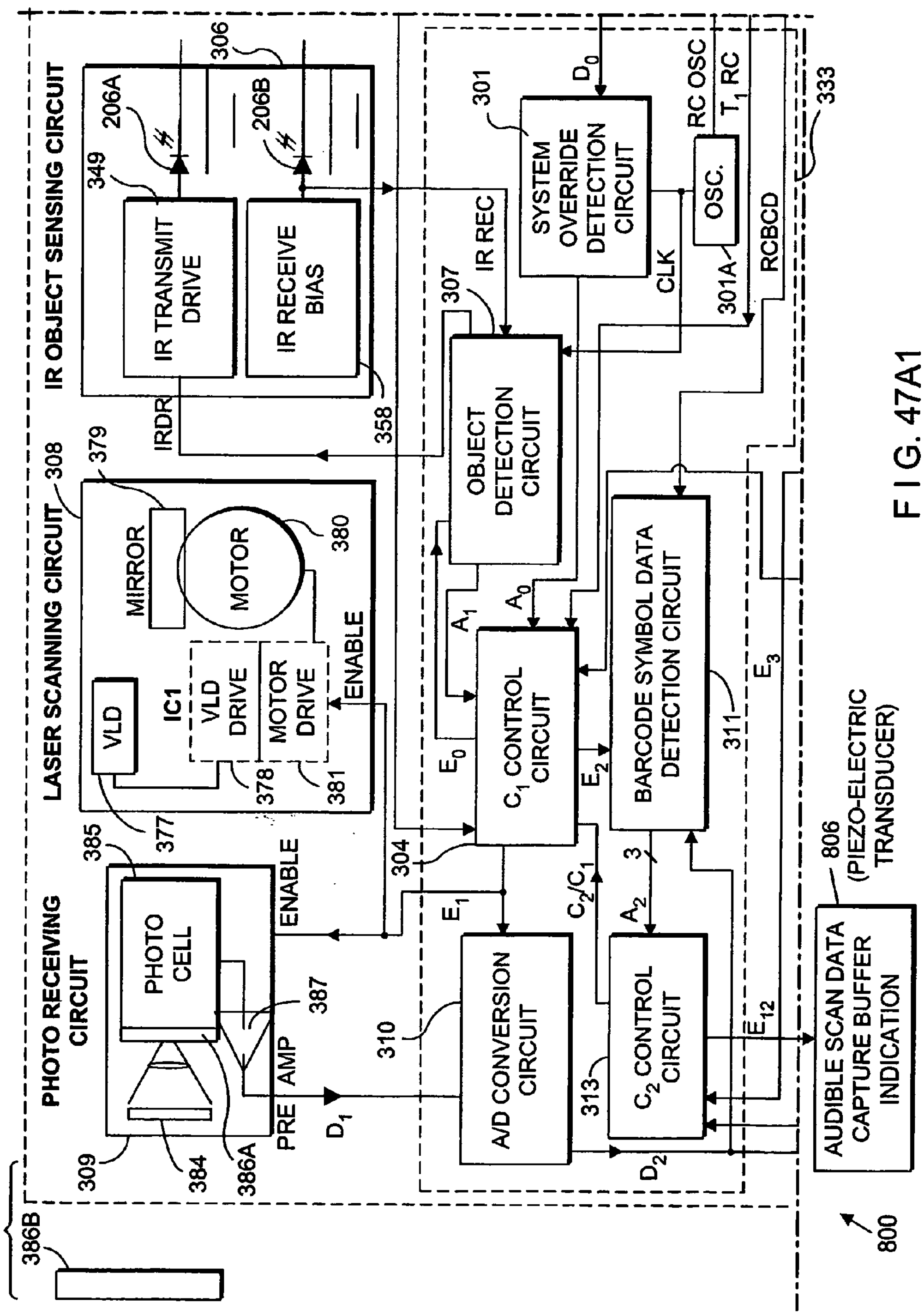
F I G. 47A1

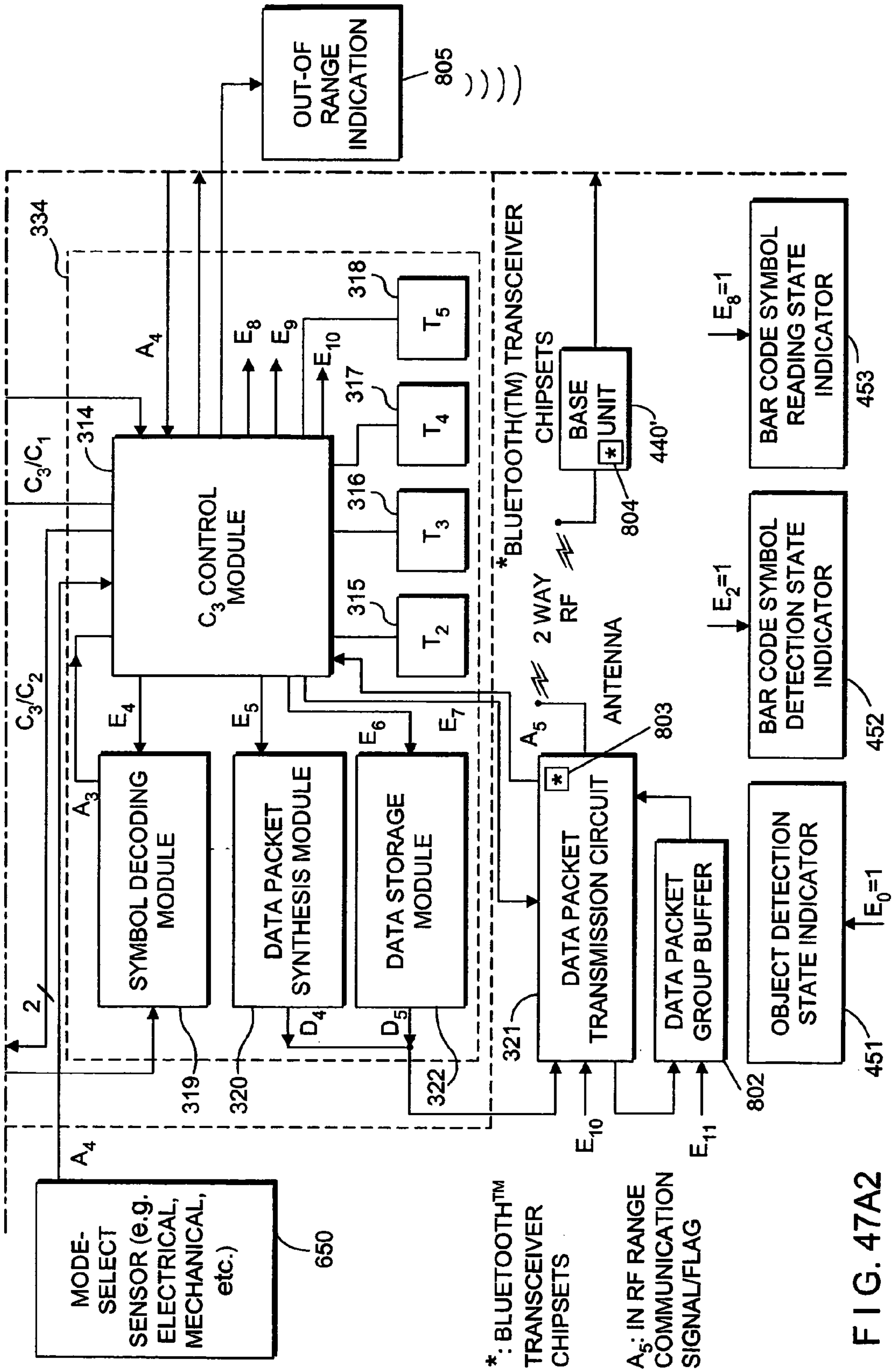
FIG. 47A2

FIG. 47A3
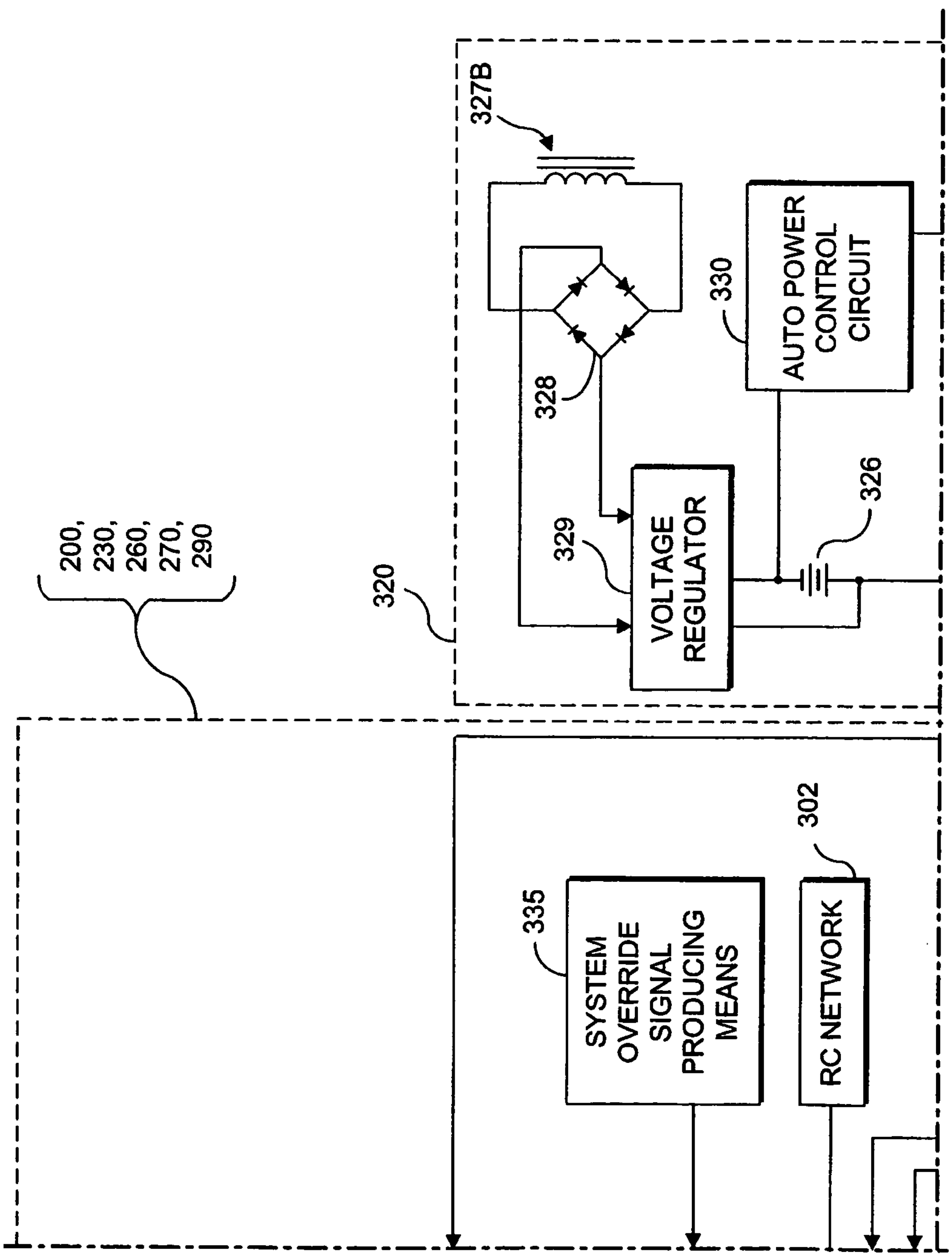

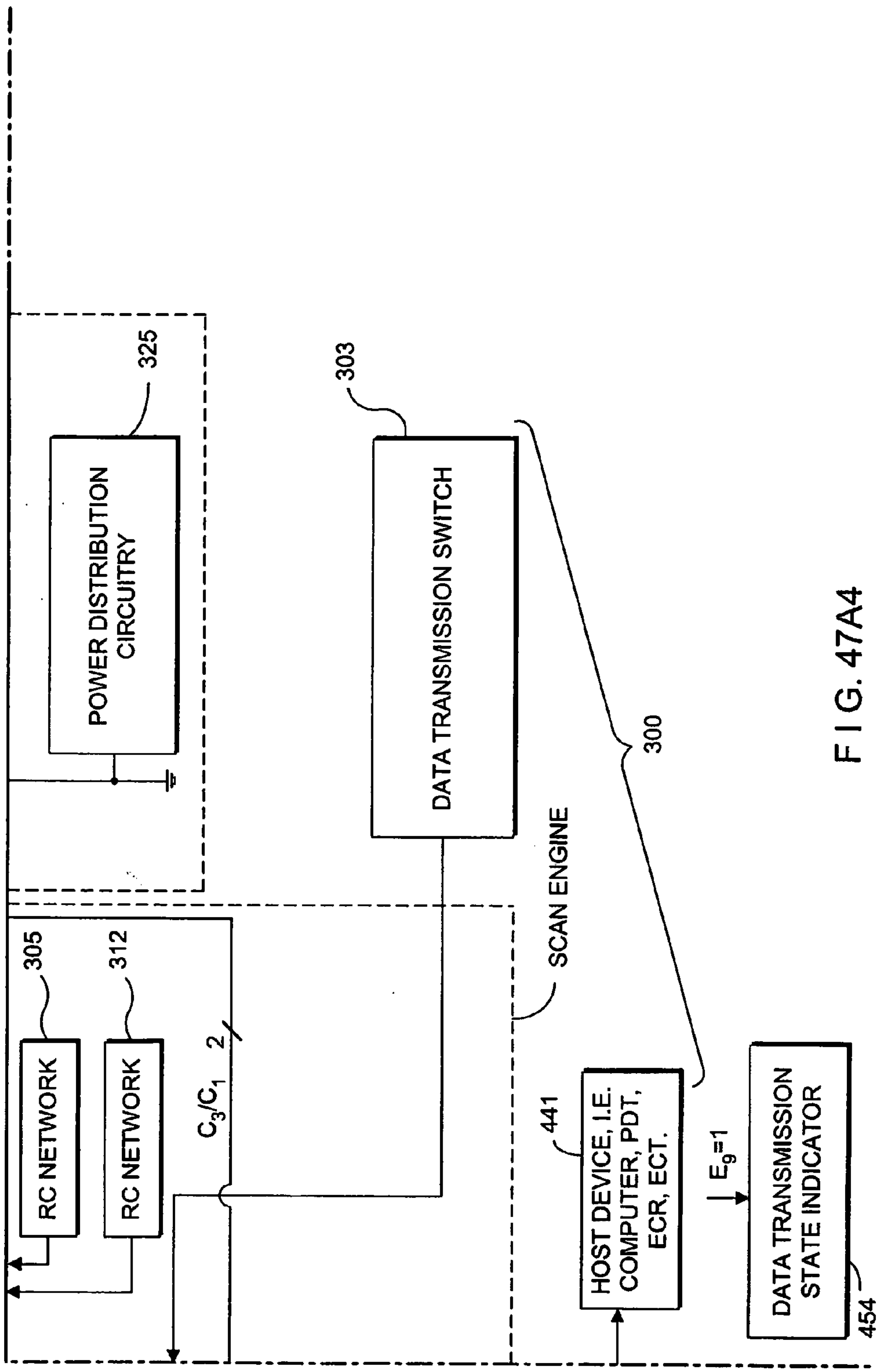
F I G. 47A4

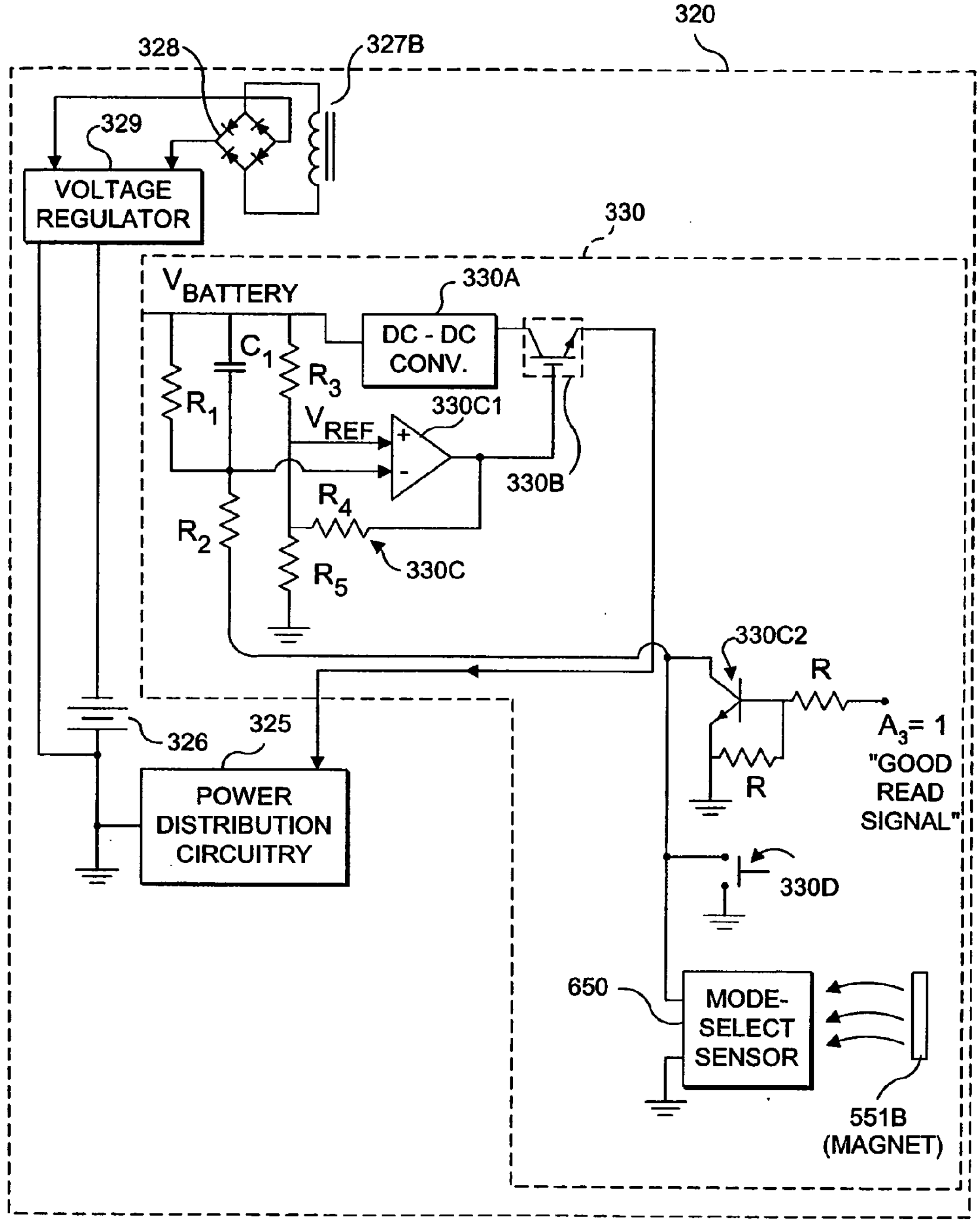
F I G. 47B

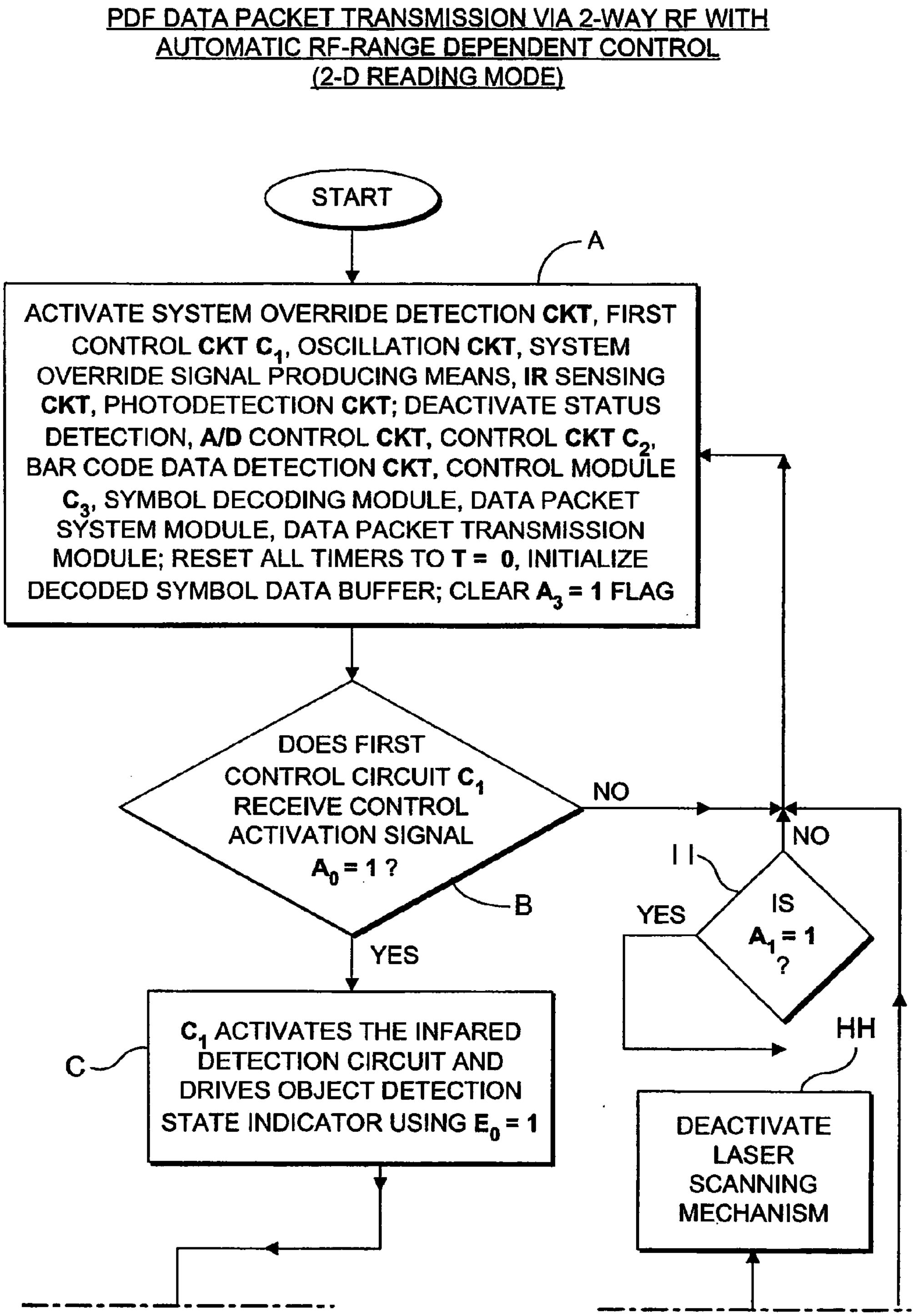
F I G. 48A1

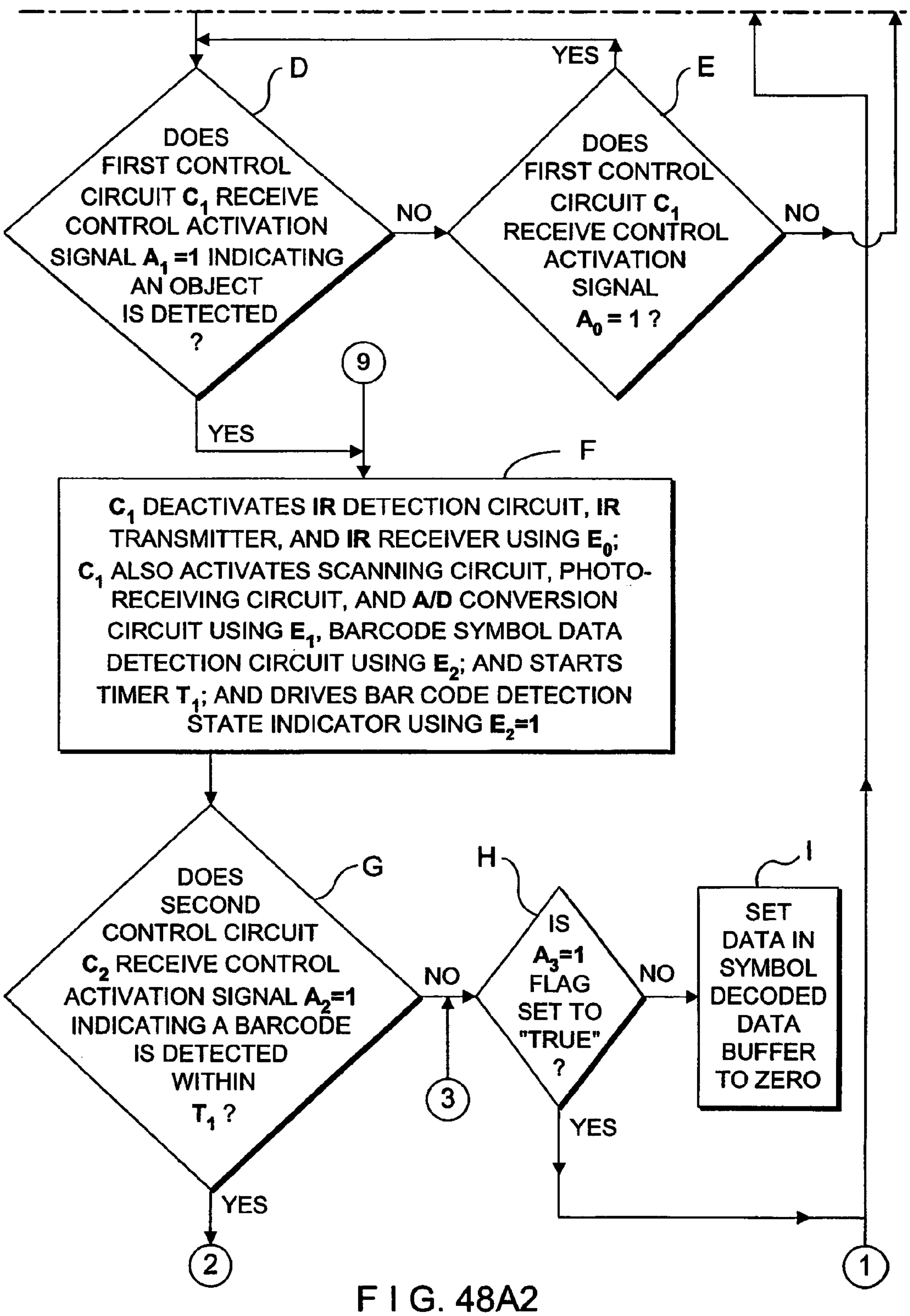
F I G. 48A2

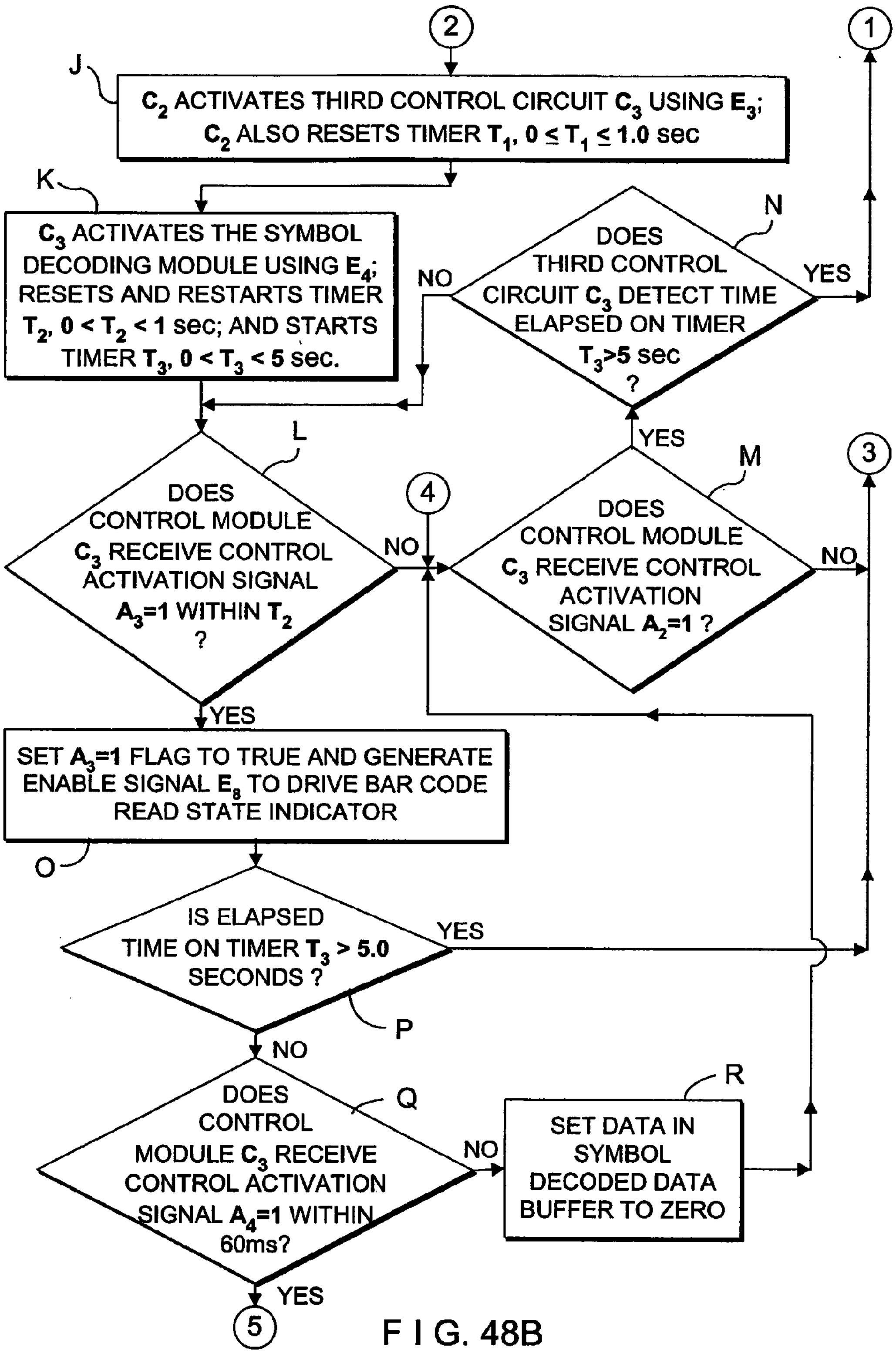
F I G. 48B

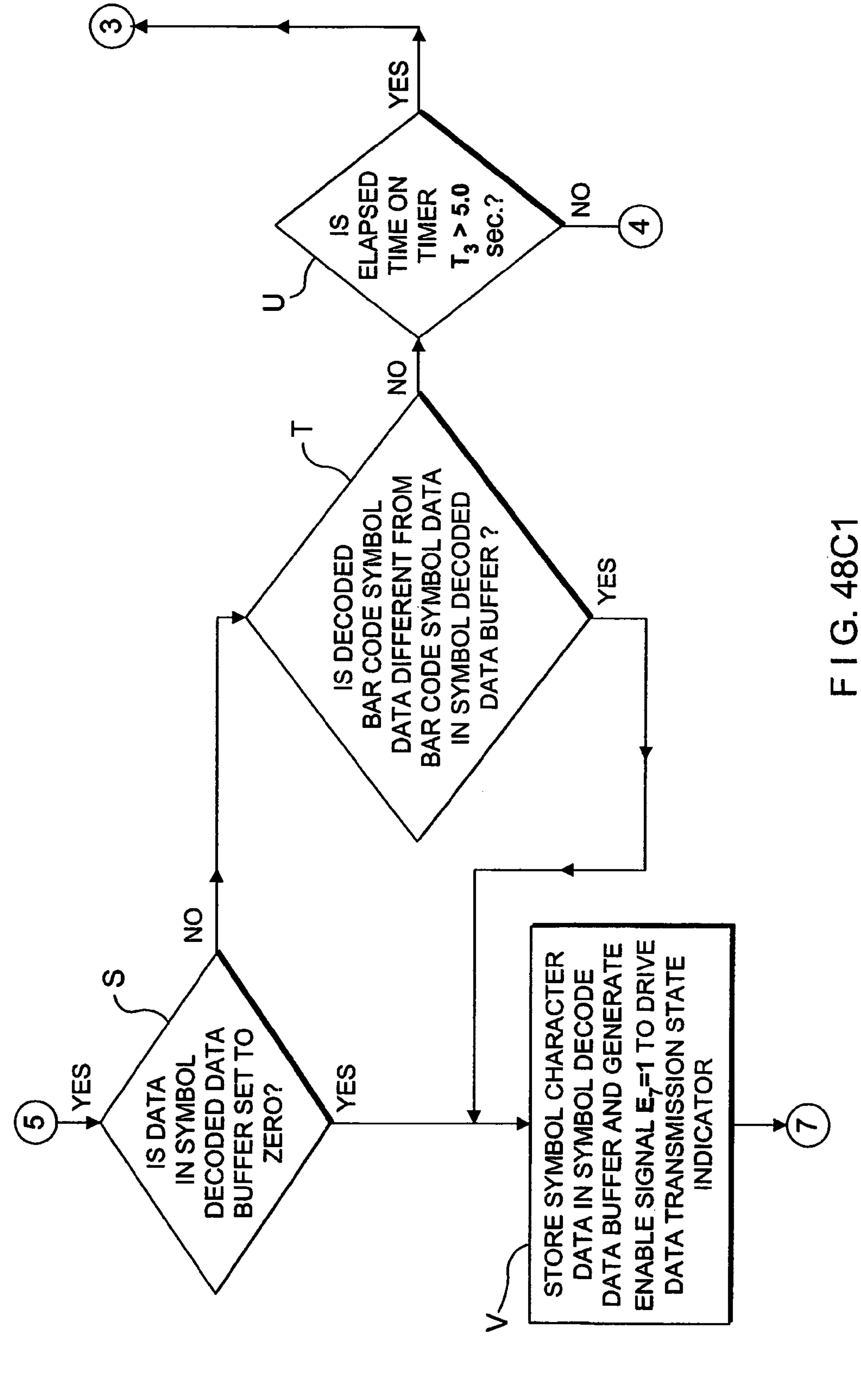
FIG. 48C1

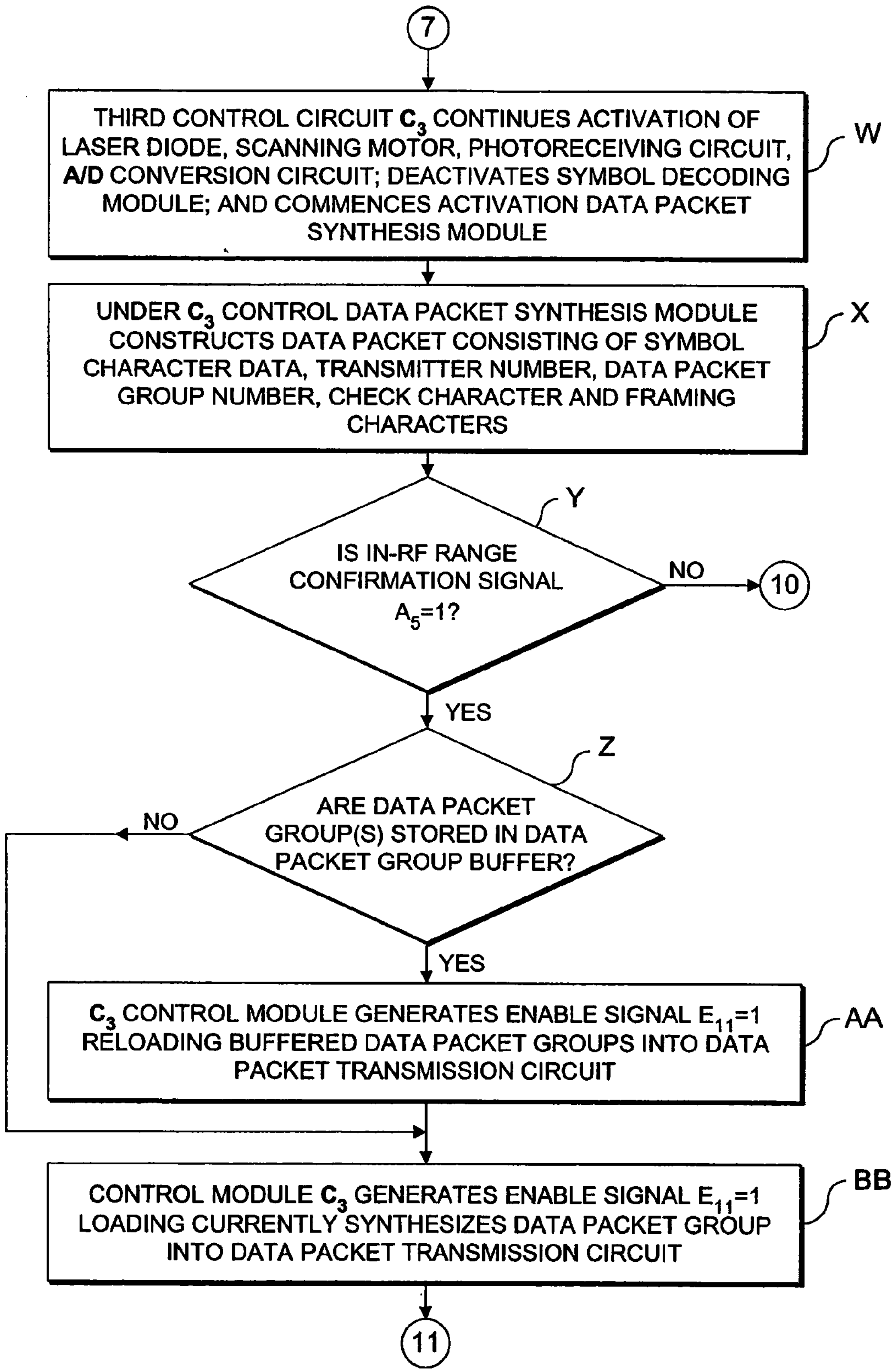
FIG. 48C2

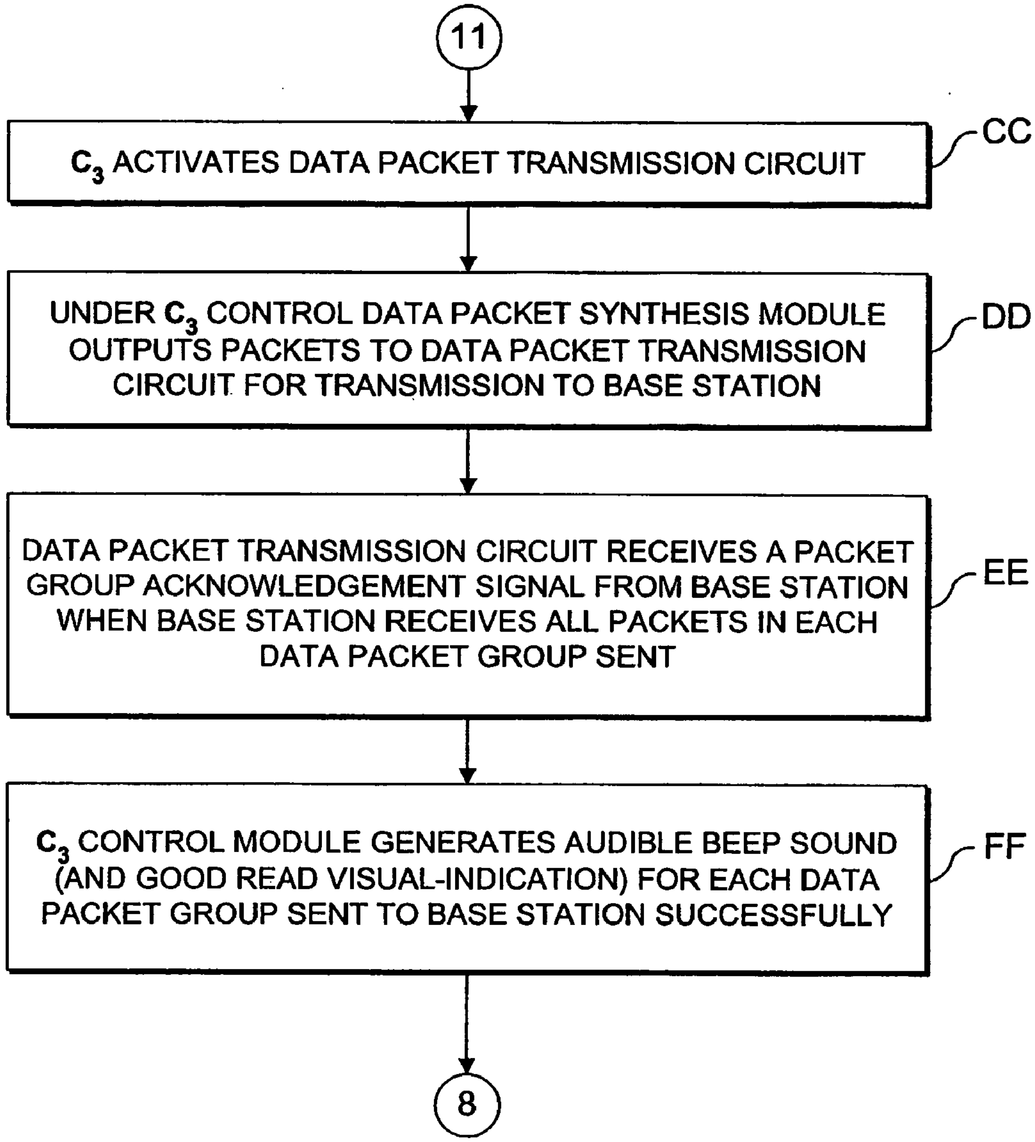
FIG. 48C3

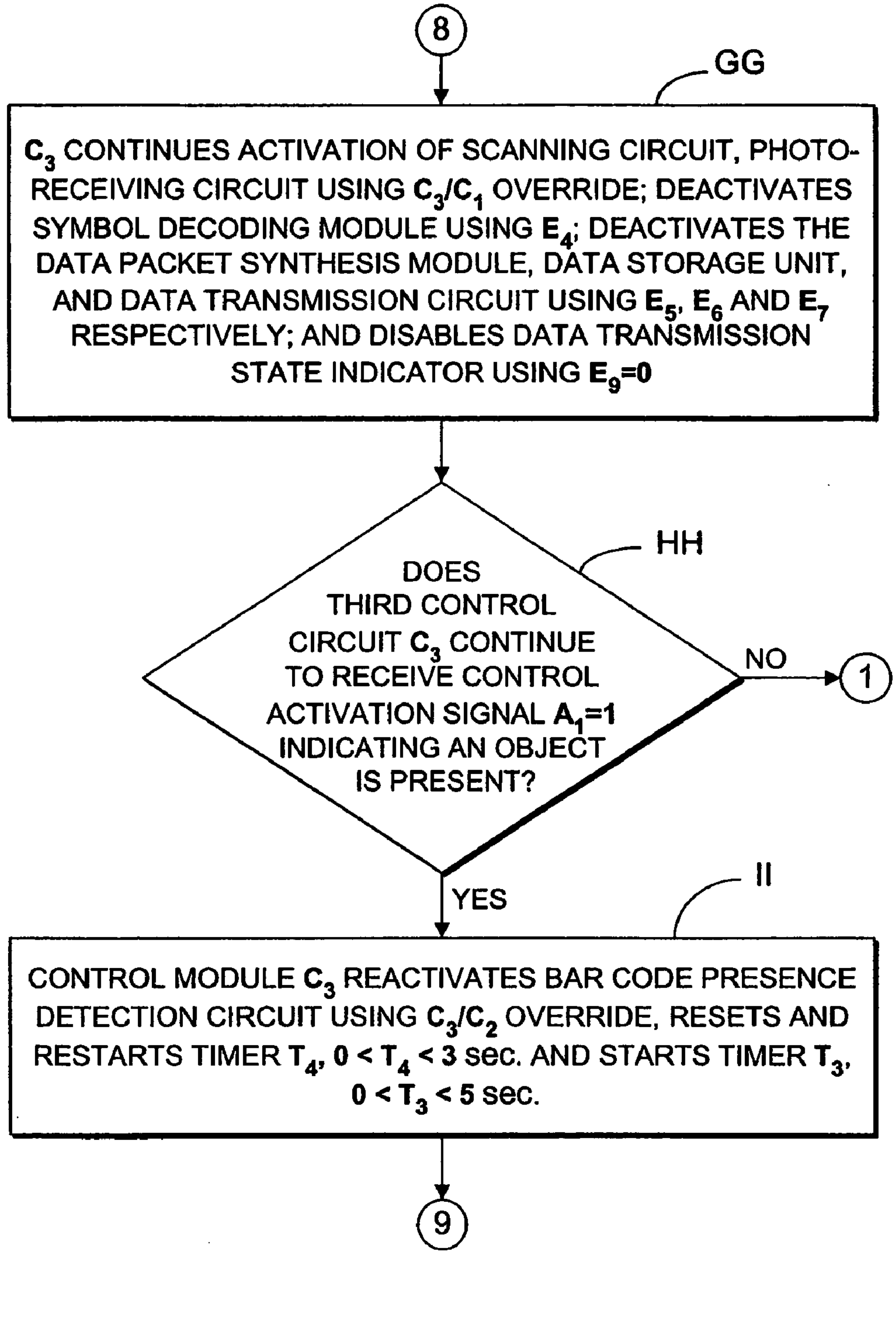
FIG. 48C4

WIRELESS AUTOMATIC LASER SCANNING BAR CODE SYMBOL READING SYSTEM, WHEREIN THE RF-BASED TRANSCEIVER CHIPSETS WITHIN THE WIRELESS HAND-SUPPORTABLE UNIT AND BASE STATION THEREOF ARE AUTOMATICALLY DEACTIVATED AND SAID RF DATA COMMUNICATION LINK THEREBETWEEN TERMINATED WHEN SAID SYSTEM ENTERS ITS POWER-SAVING SLEEP MODE, AND REACTIVATED AND RE-ESTABLISHED WHEN RE-ENTERING ITS OPERATIONAL MODE

RELATED CASES

The present application is a Continuation of application Ser. No. 10/342,433 filed Jan. 12, 2003 now U.S. Pat. No. 7,028,904 which is a continuation-in-part (CIP) of: application Ser. No. 09/452,976 filed Dec. 2, 1999; now U.S. Pat. No. 6,595,420; and application Ser. No. 09/204,176, filed Dec. 3, 1998, now U.S. Pat. No. 6,283,375. Each said patent application is assigned to and commonly owned by Metrologic Instruments, Inc. of Blackwood, N.J., and is incorporated herein by reference in its entirety.

BACKGROUND OF THE INVENTION

1. Field of the Invention

The present invention relates generally to improvements in automatic laser scanning bar code symbol reading systems, wherein laser scanning and bar code symbol reading operations are automatically initiated in response to the automatic detection of objects and/or bar code symbols present thereon.

2. Brief Description of the Prior Art

Bar code symbols have become widely used in many environments such as, for example, point-of-sale (POS) stations in retail stores and supermarkets, inventory management document tracking, and diverse data control applications. To meet the growing demands of this technological innovation, bar code symbol readers of various types have been developed for sending bar code symbols and producing symbol character data for use as input in automated data processing systems.

In general, prior art hand-held bar code symbol readers using laser scanning mechanisms can be classified into two major categories.

The first category of hand-held laser-based bar code symbol readers includes lightweight hand-held laser scanners having manually-activated trigger mechanisms for initiating laser scanning and bar code symbol reading operations. The user positions the hand-held laser scanner at a specified distance from the object bearing the bar code symbol, manually activates the scanner to initiate reading, and then moves the scanner over other objects bearing bar code symbols to be read. Prior art bar code symbol readers illustrative of this first category are disclosed in U.S. Pat. Nos. 4,575,625; 4,845,349; 4,825,057; 4,903,848; 5,107, 100; 5,080,456; 5,047,617; 4,387,297; 4,806,742; 5,021, 641; 5,468,949; 5,180,904; 5,206,492; 4,593,186; 5,247, 162; 4,897,532; 5,250,792; 5,047,617; 4,835,374; 5,017, 765; 5,600,121; 5,149,950; and 4,409,470.

The second category of hand-held laser-based bar code symbol readers includes lightweight hand-held laser scanners having automatically-activated (i.e. triggerless) mechanisms for initiating laser scanning and bar code symbol reading operations. The user positions the hand-held laser scanner at a specified distance from an object bearing a bar code symbol, the presence of the object is automatically detected using an infrared (IR) light beam or a low-power laser light beam, the presence of the bar code symbol on the object is detected using a visible laser light beam, and thereafter the detected bar code symbol is automatically scanned and decoded (i.e. read) to produce symbol character data representative of the read bar code symbol. Prior art illustrative of this second category of laser-based bar code symbol reading systems are disclosed in U.S. Pat. Nos. 4,639,606; 4,933,538; 5,828,048; 5,828,049; 5,825,012; 5,808,285; 5,796,091; 5,789,730; 5,789,731; 5,777,315; 5,767,501; 5,736,982; 5,742,043; 5,528,024; 5,525,789; D-385,265; 5,484,992; 5,661,292; 5,637,852; 5,468,951; 5,627,359; 5,424,525; 5,616,908; 5,591,953; 5,340,971; 5,340,973; 5,557,093; 5,260,553.

Automatically-activated laser scanning bar code symbol readers of the type disclosed in the above-referenced U.S. Letters Patents enable the reading of bar code symbols without the shortcomings and drawbacks of manually-activated hand-held bar code symbol readers. However, automatically-activated bar code symbol readers can at times aggressively read bar code symbols that are not desired to be read by the user as, for example, when attempting to read a particular bar code from a list of bar code symbols closely printed on a bar code menu or like structure. This is caused by the laser scanline within the scanning field scanning across two or more bar code symbols at the same time, which is likely to occur when the bar code scanner is positioned at a large distance from the object and the laser scanline is large due to the scanning geometry of the scanner. Oftentimes inadvertent bar code symbol reading errors must be corrected at their time of occurrence, wasting valuable time and resources of the user.

Notably, the use of the short-range CCD-emulsion mode taught in U.S. Pat. No. 5,558,024 provides a solution to the problem of inadvertently reading undesired bar code symbols closely printed on bar code menus. However, even when using this short-range CCD emulation mode, it is possible for the automatically-generated laser scanning pattern to inadvertently read an undesired bar code from the bar code menu as the operator moves the head portion of the hand-held reader into position over the bar code symbol to be read. This is due to the width the of laser scanning plane intersecting the object plane bearing the bar code symbol to be read. While it is possible in theory to operate the IR-based object detector in a short-range mode of operation, cost considerations make this difficult to achieve in practice.

Also, in order to enjoy the benefits of the short-range CCD-emulation mode, the laser scanning bar code symbol reader must be induced into this mode of operation either by reading a presignated (function-programming) bar code symbol, or by manually actuating a switch on the exterior of the scanner housing. Then, after reading the bar code symbol from the menu while the device is in its short-range CCD-emulation mode, the user is required to reconfigure the scanner back into its long-range mode of operation so that it can be used to read bar codes within a large depth of field of the reader. Until steps are taken to reconfigure the bar code symbol reader into its long range mode of operation, the user is forced to read bar code symbols in its CCD-emulsion mode which can be inconvenient in many types of scanning applications, thus reducing worker productivity.

When using the above-described system to read bar code symbols on products that have been placed among a set of previously “scanned” products at a check-out counter, there is a high likelihood that previously scanned products will be accidentally re-read, creating an error in check-out operations. Notably, the structure of this problem is quite similar to the bar code menu reading problem described above.

Thus, there is a great need in the art for an improved system and method of reading bar code symbols using automatically-activated laser scanning mechanisms while overcoming the above described shortcomings and drawbacks of prior art systems and methods.

Preferably, the improved system and method should provide the user with a greater degree of control over the disposition of the bar code symbol process, whenever it is automatically-initiated to read bar code symbols printed on diverse types of objects including, but not limited to, printed bar code symbol menus.

OBJECTS AND SUMMARY OF THE PRESENT INVENTION

Accordingly, it is a primary object of the present invention to provide an improved system and method of reading bar code symbols using an automatically-activated laser scanning mechanism while overcoming the above described shortcomings and drawbacks of prior art devices and techniques.

Another object of the present invention is to provide an automatically-activated laser scanning bar code symbol reading system and method which provides the user with a greater degree of control over the disposition of bar code symbol reading processes automatically initiated to read bar code symbols printed on diverse types of objects including, but not limited to, printed bar code symbol menus.

Another object of the present invention is to provide an automatically-activated code symbol reading system comprising a bar code symbol reading mechanism contained within a hand-supportable housing having a manually-activatable data transmission control (activation) switch, and wherein the bar code symbol reading mechanism automatically generates a visible laser scanning pattern for repeatedly reading one or more bar code symbols on an object during a bar code symbol reading cycle, and automatically generating a new symbol character data string in response to each bar code symbol read thereby.

Another object of the present invention is to provide such an automatically-activated code symbol reading system, wherein during a bar code symbol reading cycle, the user visually aligns the visible laser scanning pattern with a particular bar code symbol on an object (e.g. product, document, bar code menu, etc.) so that the bar code symbol is scanned, detected and decoded in a cyclical manner.

Another object of the present invention is to provide such an automatically-activated code symbol reading system, wherein each time the scanned bar code symbol is successfully read during a bar code symbol reading cycle, a new bar code symbol character string is produced, while an indicator light on the hand-supportable housing is actively driven, and upon activation of the data transmission control switch during the bar code symbol reading cycle, a data transmission control activation signal is produced, enabling a subsequently produced symbol character data string to be selected and transmitted to the host system in an automatic manner.

Another object of the present invention is to provide such an automatically-activated laser scanning bar code symbol reading system, wherein the control subsystem thereof enables the transmission of produced symbol character data to the associated host system or data storage device, only when the data transmission control switch provided on the exterior of the scanner housing is manually activated by the user during a bar code symbol reading cycle.

Another object of the present invention is to provide such an automatically-activated laser scanning bar code symbol reading system, wherein the bar code symbol reading cycle is visually signaled to the user by a bar code symbol reading state indicator provided on the scanner housing.

Another object of the present invention is to provide an automatically-activated bar code symbol reading system which comprises an automatically-activated laser scanning bar code symbol reading device having (i) a hand-supportable, body-wearable or surface-supportable housing, (ii) a preprogrammed set of operational states wherethrough the system automatically passes during each bar code symbol reading operation, without requiring manual activation of a switch, trigger or like component within the system, and (iii) a preprogrammed symbol character data transmission state of operation into which the system is automatically induced in response to manual-activation of a data transmission control switch provided on the exterior of the housing of the bar code symbol reader.

Another object of the present invention is to provide such an automatically-activated bar code symbol reading system, wherein the preprogrammed set of operational states include an object detection state of operation, a bar code presence detection state of operation, and a bar code symbol reading state of operation, wherein each of these states of operation are automatically activated in response to the automatic detection of predetermined conditions in the object detection field, bar code symbol detection field and/or bar code reading field of the system.

Another object of the present invention is to provide such an automatically-activated bar code symbol reading system, wherein the objection detection is carried out using either infrared (IR) signal transmission/receiving technology, or low-power non-visible laser beam signaling technology, which automatically generates an object detection field that is spatially-coincident with, or spatially encompasses at least a portion of the bar code symbol detection and reading fields during the object detection state of system operation.

Another object of the present invention is to provide an automatically-activated bar code symbol reading system comprising a set of color-encoded light sources provided on the exterior of the system housing for sequentially generating a set of visually-perceptible state indication signals that visually indicate to the user the various states of operation, wherethrough the system automatically passes during each bar code symbol reading cycle.

Another object of the present invention is to provide such an automatically-activated bar code symbol reading system, wherein the set of color-encoded state indicating light sources on the exterior of the housing sequentially generate a visually-perceptible object detection indication signal when the system is automatically induced into the object detection state of operation, a visually-perceptible bar code symbol presence detection indication signal when the system is automatically induced into its bar code symbol detection state of operation, and a visually-perceptible bar code symbol read indication signal when the system is automatically induced into its bar code symbol reading state of operation.

Another object of the present invention is to provide an automatically-activated bar code symbol reading system which is programmed for carrying out a novel method of automatically reading bar code symbols and handling produced symbol character data, and wherein the transmission of an automatically-generated symbol character data string to a host system is enabled by the manual-activation of a data transmission control switch, button or other means (i) provided on the exterior of the housing of the bar code symbol reading device, or (ii) realized on the graphical user interface (GUI) or display screen of the bar code symbol reading device using touch-screen or like technology.

Another object of the present invention is to provide such a method of automatically reading bar code symbols, wherein: the system automatically generates a visually-perceptible object detection indication signal when the system detects the object with its object detection field; the system automatically generates a visually-perceptible bar code detection indication signal when the system detects a bar code symbol in its bar code detection field; the system automatically generates a visually-perceptible bar code reading indication signal when the system reads a detected bar code symbol in its bar code symbol reading field; and the system automatically generates a visually-perceptible symbol character data transmission indication signal when the user manually-actuates the data transmission control switch on the exterior of the scanner housing so as to enable transmission of automatically produced bar code symbol character data to the host processor and/or internal or external data storage device of the system.

Another object of the present invention is to provide such an automatically-activated bar code symbol reading system, wherein the visible laser scanning beam is scanned along a one-dimensional, two-dimensional or omni-directional scanning pattern within the bar code detection field and bar code reading field of the system.

A further object of the present invention is to provide such an automatically-activated bar code symbol reading system, wherein the hand-supportable bar code symbol reading device can be used as either a portable hand-supported laser scanner in an automatic hands-on mode of operation having a manually-activated data transmission state of operation, or as a stationary laser projection scanner in an automatic hands-free mode of operation having an automatically-activated data transmission state of operation.

A further object of the present invention is to provide such an automatically-activated bar code reading system, wherein a base unit is provided for supporting the hand-supportable bar code symbol reading device in its automatic hands-free mode of operation and automatically generating a data transmission control activation signal to enable the automatically-activated data transmission state in this operational mode.

It is another object of the present invention to provide such an automatically-activated bar code symbol reading system with a mode of operation that permits the user to automatically read one or more bar code symbols on an object in a consecutive manner.

A further object of the present invention is to provide such an automatically-activated bar code symbol reading system, wherein a wireless data packet transmission and reception scheme is used to transmit symbol character data to the host system.

A further object of the present invention is to provide an automatically-activated hand-supportable bar code reading device which prevents multiple reading of the same bar code symbol due to dwelling of the laser scanning beam upon a bar code symbol for an extended period of time.

A further object of the present invention is to provide a point-of-sale station incorporating the automatically-activated bar code symbol reading system of the present invention.

A further object of the present invention to provide an automatically-activated hand-supportable bar code reading device comprising a control system which has (i) several automatically-activated states through which the system passes during each automatically-controlled bar code symbol reading operation in response to diverse conditions automatically detected by the device, and also (ii) a manually-activated data transmission state initiated by the user depressing or manually actuating a switch, button or like structure provided on the exterior of the housing in response to the automatic generation of a bar code symbol read indication signal produced by the system.

Another object of the present invention is to provide such an automatically-activated bar code symbol reading system, which includes a set of color-encoded light sources provided on the exterior of the housing for sequentially generating a set of visually-perceptible state indication signals which visually indicate to the user the various states of operation, wherethrough the system automatically passes during each bar code symbol reading cycle.

Another object of the present invention is to provide such an automatically-activated bar code symbol reading system, wherein the set of color-encoded state indicating light sources on the exterior of the housing sequentially generate a visually-perceptible bar code symbol detection indication signal when the system is automatically induced into its bar code symbol detection state of operation, and a visually-perceptible bar code symbol reading indication signal when the system is automatically induced into its bar code symbol reading state of operation, during each automatic bar code symbol reading cycle carried out by the system of the present invention.

Another object of the present invention is to provide such an automatically-activated bar code symbol reading system programmed for wearing out a novel method of automatically reading bar code symbols, and wherein the transmission of Automatically-generated symbol character data is enabled by manual-activation of a data transmission switch, button or other means realized (i) on the exterior of the housing of the bar code symbol reading device using mechanical, electrical or electro-mechanical switch technology, or (ii) on the graphical user interface (GUI) or display screen of the bar code symbol reading device using touch-screen or like technology.

Another object of the present invention is to provide such a novel method of automatically reading bar code symbols, wherein: when the user presents an object bearing a bar code symbol within the bar code symbol detection field of the system, the system automatically generates a visually-perceptible bar code symbol detection indication signal: and when the visible laser scanning beam is aligned with the bar code symbol, the system automatically detects the presence of the scanned bar code symbol and automatically enters its bar code reading state of operation while continuing generation of the bar code presence detection indication signal; and after automatically reading the detected bar code symbol within the bar code symbol reading field and generating symbol character data representative of the read (i.e. detected and decoded) bar code symbol, the system automatically generates a visually-perceptible symbol character data transmission indication signal, informing the user that symbol character data representative of the automatically detected bar code symbol has been generated and that this generated symbol character data is ready for transmission to the host processor and/or internal or external data storage device of the system upon manual-activation of the data transmission activation switch provided on the exterior of the housing of the bar code symbol reading device.

A further object of the present invention is to provide such an automatically-activated bar code reading system, wherein a base unit is provided for supporting the hand-supportable bar code symbol reading device in its automatic hands-free mode of operation and automatically generating a data transmission control activation signal to enable the automatically-activated data transmission state in this operational mode.

Another object of the present invention to provide such an automatically-activated bar code symbol reading system with a mode of operation that permits the user to automatically read one or more bar code symbols on an object in a consecutive manner.

Another object of the present invention is to provide such an automatically-activated bar code symbol reading system, wherein its data packet transmission and reception scheme is initiated in response to manual-activation of the data transmission activation switch or button provided on the exterior of the bar code reading device of the present invention.

Another object of the present invention is to provide an automatically-activated hand-supportable bar code reading device which has a hands-free mode of operation that is automatically selectable by placing the hand-supportable device within its support stand, or on a countertop or like surface, and a hands-on mode of operation that is automatically selectable by removing it from the support stand, or lifting it off the countertop surface.

A further object of the present invention is to provide a point-of-sale (POS) station incorporating the automatically-activated bar code symbol reading system of the present invention.

A further object of the present invention to provide an automatically-activated hand-supportable bar code reading device having a control system which has (i) several automatically-activated states through which the system may pass during each automatically-controlled bar code symbol reading operation in response to diverse conditions automatically detected within the scanning fields of the device, and also (ii) a manually-activated data transmission state initiated by the user depressing or manually actuating a switch, button or other structure provided on the exterior of the housing in response to the automatic generation of a bar code symbol reading indication signal by the system.

Another object of the present invention is to provide a novel method of handling bar code symbol character data automatically-generated within an automatically-activated bar code symbol reading system.

Another object of the present invention is to provide an automatically-activated bar code symbol reading system, wherein the user can retransmit symbol character data, associated with a particular bar code symbol, to the host system without requiring reactivation of the laser beam source or scanning mechanism, thereby increasing the throughput of the system as well as worker productivity in comparison to that achievable using manually-activated bar code symbol readers in which the laser source and scanning motor are deactivated after each successful reading of a bar code symbol.

Another object of the present invention is to provide a novel method of transmitting automatically-generated bar code symbol character data within a hand-supportable unit, to a selected information storage and/or processing device located aboard the hand-supportable unit itself, or at a remote location as in the case of a host computer system.

Another object of the present invention is to provide a wireless automatic hand-supportable bar code symbol reading system with automatic range-dependent data transmission control.

Another object of the present invention is to provide a wireless laser scanning bar code symbol reading system employing a 2-way RF-based data communication link between its cradle-providing base station and its wireless hand-supportable code symbol reading device employing a manually-operated data transmission activation switch that is controlled by automatically detecting whether or not the hand-supportable wireless device is located within the RF communication range of the RF-based data communication link.

Another object of the present invention is to provide such a system, wherein the range-dependent condition is detected by detecting the strength of "heartbeat" signals automatically transmitted from the base station to the wireless hand-supportable device.

Another object of the present invention is to provide such as system, wherein if the hand-supportable scanning device is located out-side of the predetermined 2-way RF communication range, then an audible and/or visual indicator is generated and packaged symbol character data is automatically buffered within the memory storage of device until the device moves into its communication range at a later time, during the next requested data transmission to the host computer system.

Another object of the present invention is to provide such as system designed for use in point-of-sale environments or light warehousing applications. This system design offers operators convenience and freedom of mobility.

Another object of the present invention is to provide a wireless laser scanning bar code symbol reading system, wherein wireless reader is programmed to require the user to press the data transmission activation button another time to transmit the barcode after it has just established a new communication link with its base station. This feature would allow user to rescan a different code to overwrite data before it is sent to the host system via the base station.

Another object of the present invention is to provide a wireless laser scanning bar code symbol reading system, wherein its system control process is programmed to enables multiple reads to be stored before data transmission is to occur to the base station after depressing the data transmission activation switch.

Another object of the present invention is to provide a wireless laser scanning bar code symbol reading system, wherein its control system is programmed so that all three LEDs illuminate to indicate that wireless reader is out of range, as well as so that all three LEDs illuminate to indicate that there is stored data in a Data Packet Group Buffer waiting to be transmitted to the base station.

Another object of the present invention is to provide a wireless laser scanning bar code symbol reading system, wherein its control system is programmed so that stored data can be cleared by holding down the data transmission activation switch for programmed duration (i.e. 3 sec.).

Another object of the present invention is to provide a wireless laser scanning bar code symbol reading system, wherein its control system can be programmed so that it tests its data communication link before transmission of data packets buffered in memory. With this feature, the systems can avoid losing barcode caused by the disconnection of the reader and its base station.

Another object of the present invention is to provide a wireless laser scanning bar code symbol reading system, wherein a mechanical vibrator is provided within the hand-supportable housing of the wireless device so that when scan data transmission from the reader to the base station is successful, then the reader automatically vibrates. In noisy environments, this feature should provide a clear signal to the operator that the transmission status has been successful.

Another object of the present invention is to provide a wireless laser scanning bar code symbol reading system, wherein a low battery protection circuit is provided within the wireless hand-supportable reader for (i) automatically monitoring battery voltage; (ii) razzing/vibrating the reader if the battery voltage is low, and turning off laser diode within the device, and causing the system to enter its sleep mode. This circuit can protect the battery from over-discharge and data errors, because the current drawn from the battery will be much higher when its voltage is too low.

Another object of the present invention is to provide a wireless laser scanning bar code symbol reading system, wherein the RF transceiver chip set and associated microcontrollers aboard the wireless reader and base station are automatically driven into a low power mode when the data communication link between the wireless reader and its base station is disconnected or terminated. When the wireless reader is waked up, these microcontrollers are also woken up at the same time, and the RF transceivers automatically activated and the communication link reestablished.

Another object of the present invention is to provide a wireless laser scanning bar code symbol reading system, wherein a system power switch is located at the rear end of reader's housing, and accessible by way of a small pin hole. With this feature, the operator can disconnect the battery using the power switch at the rear of the reader. This feature provides a simple way to save electrical power and will protect the battery aboard the wireless reader. In addition, this switch can serve as a hardware reset button when something is wrong with the reader.

Another object of the present invention is to provide a wireless laser scanning bar code symbol reading system, wherein the cradle portion of the base station is provided with protractable/retractable support hooks for supporting the hand-held reader in vertical and horizontal orientations alike.

Another object of the present invention is to provide a wireless laser scanning bar code symbol reading system, wherein the firmware of wireless bar code reader's firmware is updated by a host computer.

Another object of the present invention is to provide a wireless laser scanning bar code symbol reading system, capable of reading 2-D bar code symbologies such as PDF 417, and the like.

Another object of the present invention is to provide a portable, fully automatic bar code symbol reading system which is compact, simple to use and versatile.

Yet a further object of the present invention is to provide a novel method of reading bar code symbols using the automatically-activated bar code symbol reading system of the present invention.

These and further objects of the present invention will become apparent hereinafter and in the claims to Invention.

BRIEF DESCRIPTION OF THE DRAWINGS

For a fuller understanding of the Objects of the Present Invention, the Detailed Description of the Illustrated Embodiments of the Present Invention should be read in conjunction with the accompanying drawings, wherein:

FIG. 5D is a perspective view of the automatically-activated bar code symbol reading device of FIG. 5A, shown being used to read bar code symbols in an inventory application;

FIG. 6A is a perspective view of the thirteenth illustrative embodiment of the automatically-activated bar code symbol reading device of the present invention, comprising an integrated WWW browser program for client-side HTTP support, a touch-screen LCD panel for manual data entry and visual data display, an integrated laser scanning bar code symbol reading engine for producing an IR-based object detection field and 1-D or 2-D laser-based bar code symbol detection and reading fields, and a wireless communication link established with an Internet Service Provider (ISP) connected with the Internet, for mobile usage within diverse application environments;

FIG. 7B is a perspective view of the seventeenth illustrative embodiment of the automatically-activatable bar code symbol reading device of the present invention, comprising an integrated laser scanning engine for producing a laser-based object detection field and a laser-based omni-directional laser scanning field, and a wireless communication link established with its base station adapted for battery recharging and hands-free mode of operation within diverse application environments;

FIG. 8A is a perspective view of the nineteenth illustrative embodiment of the automatically-activated bar code symbol reading device of the present invention, comprising an automatically-activated laser scanning bar code symbol reading engine having an IR-based object detection field and a 1-D or 2-D laser-based bar code symbol detection and reading field, shown mounted on the back of the hand of an operator and having an external data terminal mounted on the arm thereof;

FIG. 8D is a perspective view of the automatically-activated bar code symbol reading device of FIG. 8A, 8B or 8C, being used to read bar code symbols in an inventory application;

FIG. 8E1 is a perspective view of the twenty-second illustrative embodiment of the automatically-activated bar code symbol reading system of the present invention, comprising an automatically-activated laser scanning bar code symbol reading engine having an IR-based object detection field, a 2-D laser based bar code detection field, and a 2-D laser-based bar code symbol reading field, shown supported above a countertop surface and induced into its automatic hands-on mode of operation.

FIG. 8E2 is a sideview of the system of FIG. 8E1 positioned on a countertop surface and induced into its automatic hands-free mode of operation;

FIG. 8F is a perspective view of the twenty-third illustrative embodiment of the automatically-activated bar code symbol reading system of the present invention, comprising an automatically-activated laser scanning bar code symbol reading engine having a laser-based object detection field, a 2-D laser-based bar code symbol detection field, and a 2-D laser-based bar code symbol reading field, shown supported above a countertop surface and induced into its automatic hands-on mode of operation;

FIG. 8G is a perspective view of the twenty-fourth illustrative embodiment of the automatically-activated bar code symbol reading system of the present invention, comprising an automatically-activated laser scanning bar code symbol reading engine having a 2-D laser-based scanning field, shown supported above a countertop surface and induced into its automatic hands-on mode of operation;

FIG. 9C is a perspective view of the holographic-based laser scanning module employed within the laser scanning engine of FIG. 9A;

FIG. 9D is a plan view of the laser scanning module employed within the laser scanning engine of FIG. 9A, showing the operation of its holographic optical elements during beam shaping and the electromagnetically-driven scanning element during laser scanning operations;

FIG. 9E is a perspective view of a second illustrative embodiment of the automatically-activated laser scanning bar code symbol reading engine of the present invention shown completely assembled and adapted for incorporation into any one of the bar code symbol reading devices of the present invention, and programmed for automatically reading bar code symbols using its laser-based object detection field and its 1-D laser-based scanning (i.e. bar code detection and reading) field;

FIG. 9F is a perspective view of a third illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its 1-D laser-based scanning (i.e. bar code detecting and reading) field, without automatic object detection;

FIG. 10A is a perspective view of a fourth illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its IR-based object detection field and its 2-D laser-based scanning (i.e. bar code detecting and reading) field;

FIG. 10B is an elevated front view of the automatically-activated laser scanning bar code symbol reading engine of FIG. 10A, showing the geometrical characteristics of its light transmission window;

FIG. 10C is an elevated rear view of the automatically-activated laser scanning bar code symbol reading engine of FIG. 10A, showing its input/output signal port;

FIG. 10D is a perspective view of the automatically-activated laser scanning bar code symbol reading engine of FIG. 10A, shown with the upper cover portion of the miniature housing removed off from the lower housing portion thereof, revealing the optical layout of the laser beam scanning optics of the device;

FIG. 14A is a perspective view of a thirteenth illustrative embodiment of the automatically-activated laser scanning bar code symbol reading engine of the present invention shown completely assembled, adapted for incorporation into any one of the bar code symbol reading devices of the present invention, and programmed for reading bar code symbols using its IR-based object detection field and its 3-D omni-directional multi-focal plane laser scanning (i.e. detecting and reading) field projected within a well-defined 3-D scanning volume in an automatic manner;

FIG. 14B is a perspective view of a fourteenth illustrative embodiment of the automatically-activated laser scanning bar code symbol reading engine of the present invention shown completely assembled, adapted for incorporation into any one of the bar code symbol reading devices of the present invention, and programmed for reading bar code symbols using its laser-based object detection field and its 3-D omni-directional/multi-focal plane laser scanning (i.e. detecting and reading) field projected within a well-defined 3-D scanning volume in an automatic manner;

FIG. 14C is a perspective view of a fifteenth illustrative embodiment of the automatically-activated laser scanning bar code symbol reading engine of the present invention shown completely assembled, adapted for incorporation into any one of the bar code symbol reading devices of the present invention, and programmed for reading bar code symbols using its 3-D omni-directional/multi-focal plane laser scanning (i.e. detecting and reading) field projected within a well-defined 3-D scanning volume in an automatic manner, without using automatic object detection;

FIGS. 15A1 through 15A4, taken together, is a system block functional diagram of the first general operating system design for the automatically-activated laser scanning bar code symbol reading system of the present invention, wherein automatic IR-based object detection is employed during system operation;

FIG. 15B1 is a schematic diagram of the system override signal detection circuit employed in the Application Specific Integrated Circuit (ASIC) chip within the automatically-activated bar code symbol reading system of FIGS. 15A1 through 15A4;

FIG. 15B2 is a functional logic diagram of the system override detection circuit of the present invention;

FIG. 15C is a functional logic diagram of the oscillator circuit in the ASIC chip in the bar code symbol reading system of FIGS. 15A1 through 15A4;

FIG. 15D is a timing diagram for the oscillator circuit of FIG. 15C;

FIG. 15E is a block functional diagram of the IR-based object detection circuit in the bar code symbol reading system of FIGS. 15A1 through 15A4;

FIG. 15F is a functional logic diagram of the first control circuit ($C_1$) of the control subsystem of FIGS. 15A1 through 15A4;

FIG. 15G is a functional logic diagram of the clock divide circuit in the first control circuit $C_1$ of FIG. 15F;

FIG. 15J is a functional logic diagram of the bar code symbol (presence) detection circuit in the ASIC chip in the bar code symbol reading system of FIGS. 15A1 through 15A4;

FIG. 15K is a functional logic diagram of the clock divide circuit in the bar code symbol detection circuit of FIG. 15J;

FIG. 15L is a schematic representation of the time window and subintervals maintained by the bar code symbol detection circuit shown in FIGS. 15A1 through 15A4 during the bar code symbol detection process, FIG. 15M is a functional logic diagram of the second control circuit ($C_2$) in the ASIC chip in the automatic bar code symbol reading system of FIGS. 15A1 through 15A4;

FIG. 15N is Boolean logic table defining the functional relationships among the input and output signals into and out from the second control circuit $C_2$ shown in FIG. 15M;

FIG. 15O is a schematic representation of the format of each data packet transmitted from the data packet transmission circuit shown in FIGS. 15A1 through 15A4;

FIG. 16 is a functional block diagram of the data packet transmission circuit employed in the bar code symbol reading system of FIGS. 15A1 through 15A4;

FIGS. 20A1 to 20E, taken together, show a high level flow chart of the control process carried out by the control subsystem of the bar code symbol reading system of FIGS. 15A1 through 15A4;

FIGS. 22A1 through 22A4, taken together, is a system block functional diagram of the second general system design for the automatically-activated laser scanning bar code symbol reading system of the present invention, wherein automatic low-power laser-based object detection is employed during system operation;

FIGS. 23A1 to 23E, taken together, show a high level flow chart of the control process carried out by the control subsystem of the bar code symbol reading system of FIGS. 22A1 through 22A4, illustrating various modes of object detection, bar code presence detection, bar code symbol reading, and symbol character data transmission;

FIGS. 25A and 25B, taken together, is a system block functional diagram of the third general system design for the automatically-activated laser scanning bar code symbol reading system of the present invention, wherein bar code symbol presence detection and bar code symbol reading are employed during system operation, without employment of object detection;

FIGS. 27A to 27C, taken together, show a high level flow chart of the control process performed by the control subsystem of the bar code symbol reading system of FIGS. 25A and 25B, illustrating its various modes of bar code presence detection, bar code symbol reading and symbol character data transmission;

FIGS. 29A1 through 29A4, taken together, is a system block functional diagram of the fourth general system design for the automatically-activated laser scanning bar code symbol reading system of the present invention, wherein functionalities of the first-generalized system design are combined with the functionalities of the third generalized system design;

FIG. 29C is a functional logic diagram of the clock divide circuit in the first control circuit $C_1$ of FIG. 29B;

FIG. 29D is a table setting forth Boolean logic expressions for the enabling signals produced by the first control circuit $C_1$ shown in FIGS. 29A1 through 29A4;

FIGS. 30A1 to 30F2, taken together, show a high level flow chart of the control process carried out by the control subsystem of the bar code symbol reading system of FIGS. 29A1 through 29A4, illustrating various modes of object detection, bar code presence detection, bar code symbol reading, and symbol character data transmission;

FIGS. 31A and 31B, taken together, is a state diagram illustrating the various states that the automatically-activated bar code symbol reading system of FIGS. 29A1 through 29A4 may undergo during the course of its programmed operation;

FIGS. 32A1 through 32E set forth a flow chart for an alternative system control process that can be used in connection with the first generalized system design shown in FIGS. 15A1–15A4;

FIGS. 33A1 through 33E set forth a flow chart for an alternative system control process that can be used in conjunction with the second generalized system design shown in FIGS. 22A1 and 22A2;

FIGS. 34A through 34C set forth a flow chart for an alternative system control process that can be used in conjunction with the third generalized system design shown in FIGS. 25A and 25B;

FIGS. 35A1 through 35F2 set forth a flow chart for an alternative system control process that can be used in conjunction with the fourth generalized system design shown in FIGS. 29A1 and 29A2;

FIG. 36A is a perspective view of the scanner support stand housing of the countertop base unit for use with the bar code symbol reading device shown in FIG. 2D;

FIG. 36B is a perspective view of the base plate portion of the countertop base unit shown in FIG. 36A;

FIG. 36C is a perspective, partially broken away view of the assembled countertop base unit shown in FIG. 2D;

FIG. 38A is a perspective view of the portable data collection base unit shown in FIG. 3A, interfaceable with a host computer system for transferring symbol character data collected from an automatically-activated bar code symbol reading device of the present invention as shown, for example, in FIGS. 2A, 2I, 2J, 3A, 3D, 3E, 7A, 7B, and 7C;

FIG. 38B is an elevated side view of the portable data collection base unit shown in FIG. 38A;

FIG. 38C is an elevated end view of the portable data collection base unit shown in FIG. 38A;

FIG. 39 is a perspective view of a PCMCIA card base unit shown installed within the PCMCIA slot of a portable laptop computer system, for use in establishing a data transmission link between the laptop computer system and an automatically-activated bar code symbol reading device of the present invention;

Figure 1:
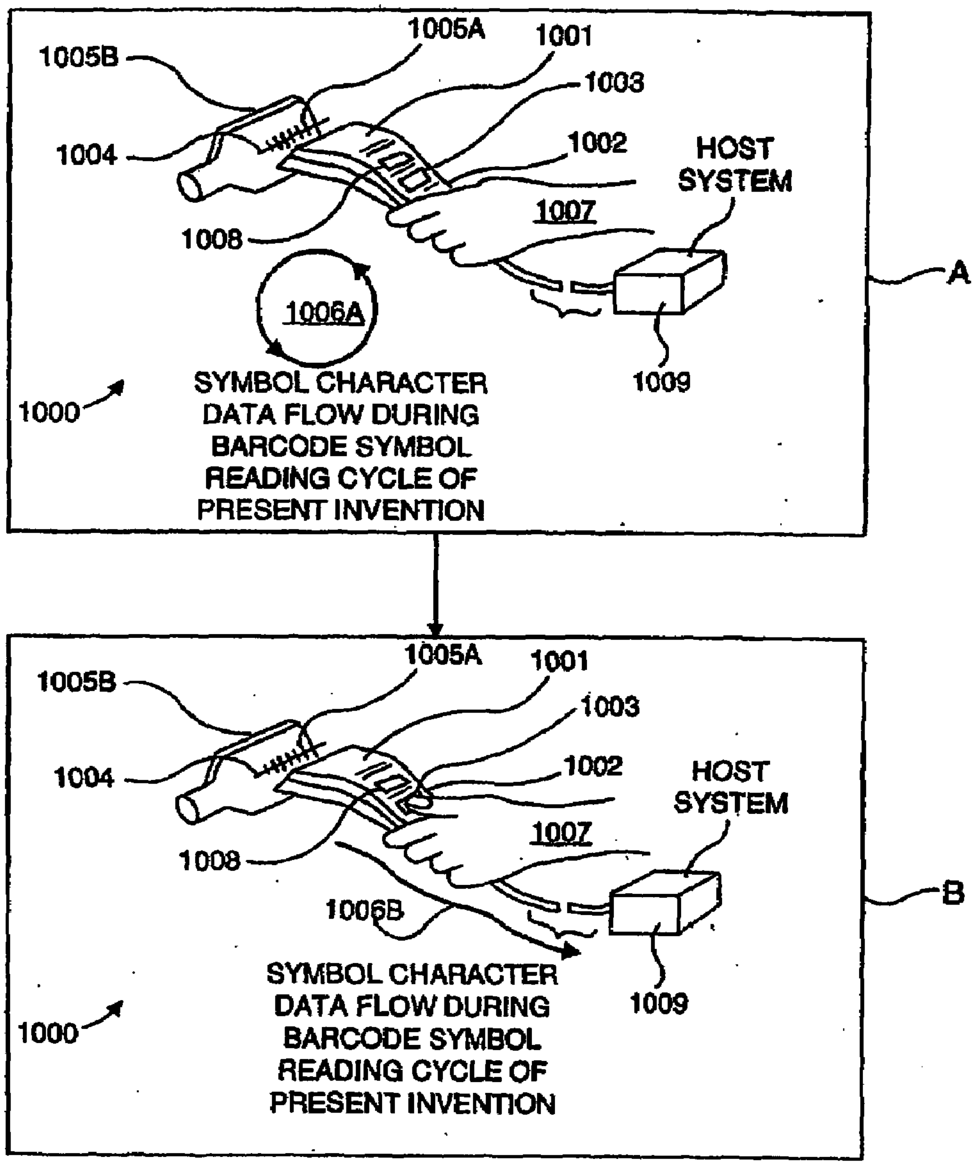
FIG. 1 is a flow-chart type schematic diagram illustrating the steps involved in carrying out the bar code symbol reading method of the present invention when using an automatically-activated bar code symbol reading system constructed in accordance therewith.
Figure 43A:
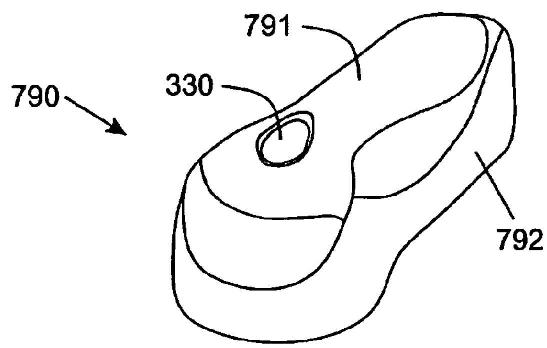
FIGS. 43A through 43D are perspective views of an alternative embodiment of the automatic wireless laser scanning bar code symbol reading system of the present invention employing a 2-way RF-based data communication link between its cradle-providing base station and its hand-supportable code symbol reading device employing a manually-operated data transmission activation switch, wherein the operation of the data transmission activation switch is controlled by the automatic detection that the hand-supportable wireless device is located within the RF communication range of the RF-based data communication link by way of detecting the strength of "heartbeat" signals transmitted from the base station to the wireless hand-supportable device.
Figure 43B:
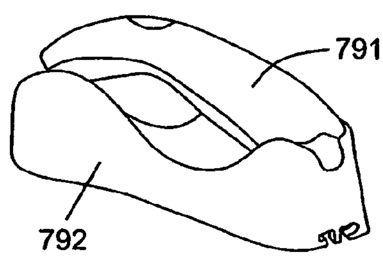
Figure 43C:
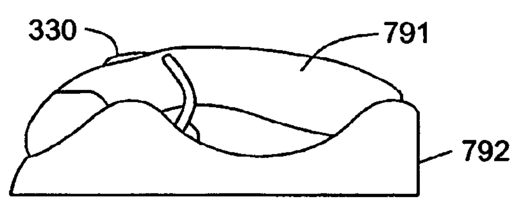
Figure 43D:
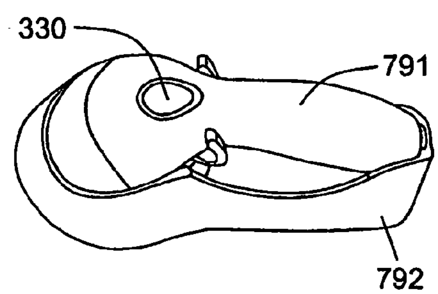
Figure 43E:
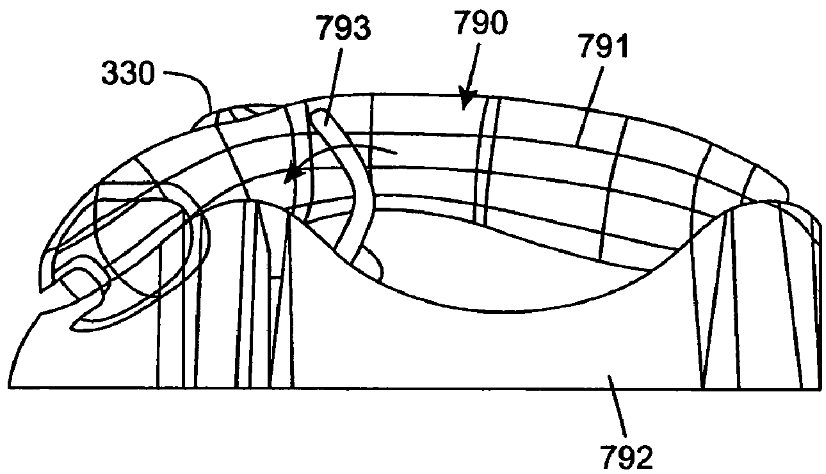
Figure 43F:
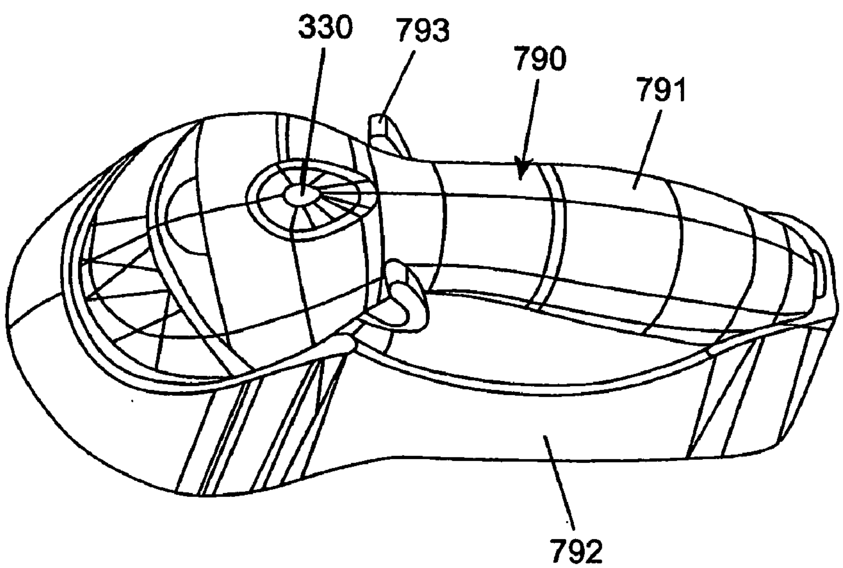
Figure 43G:
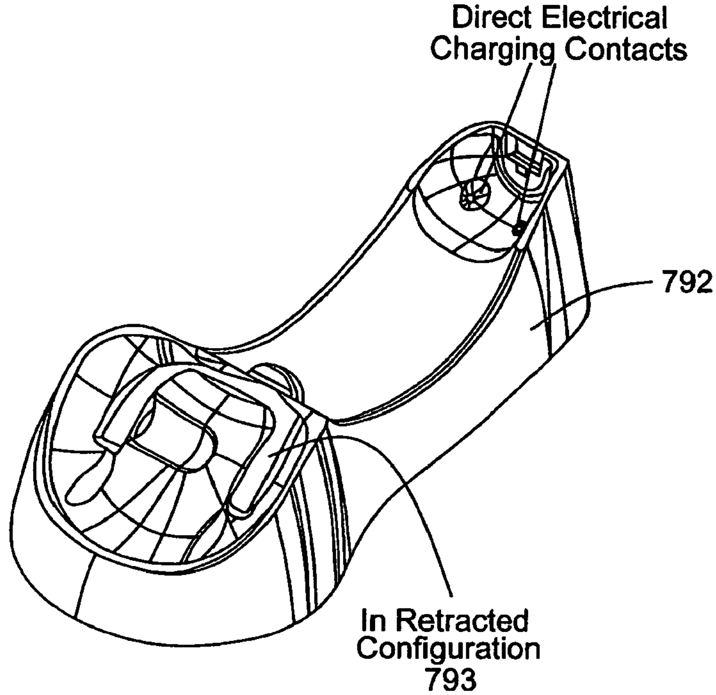
Figure 43H:
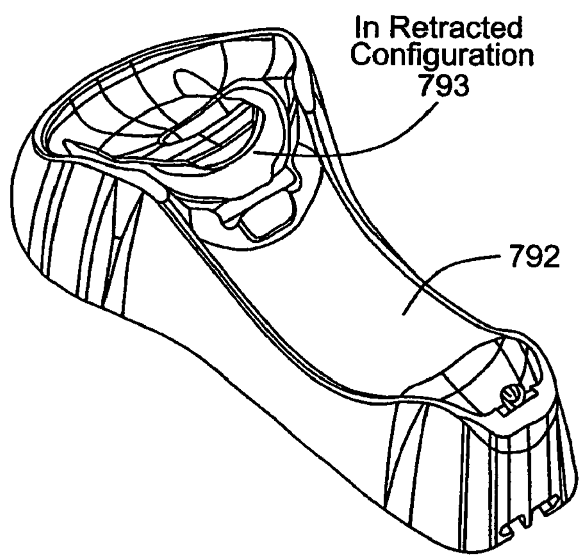
Figure 43I:
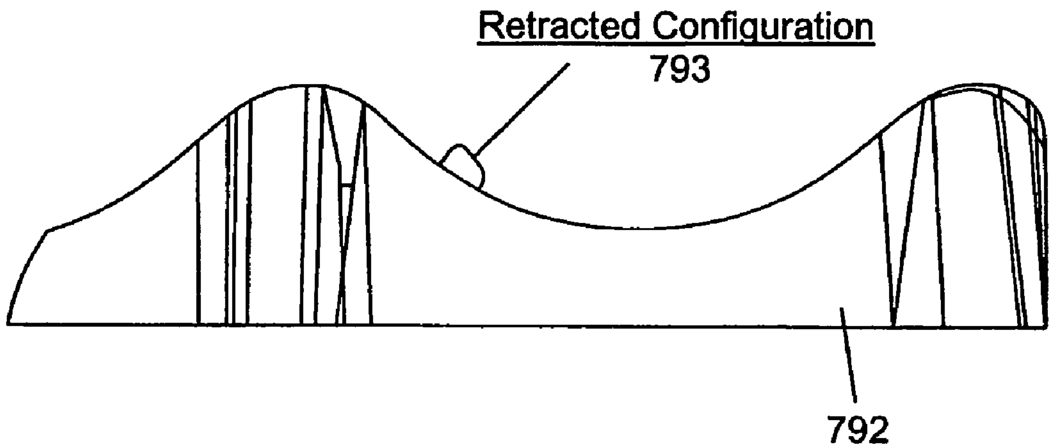
Figure 43J:
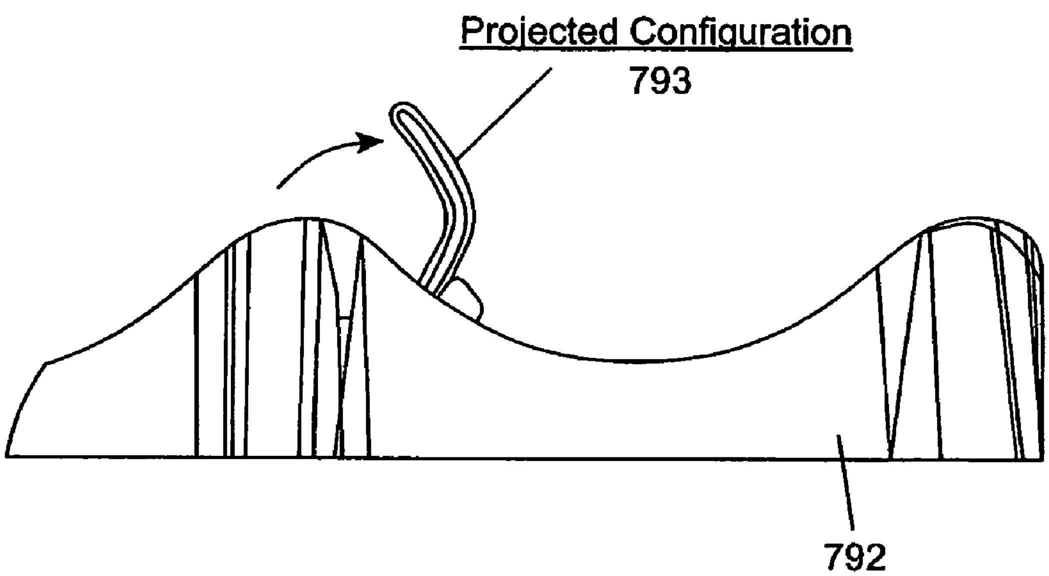
Figure 45B:
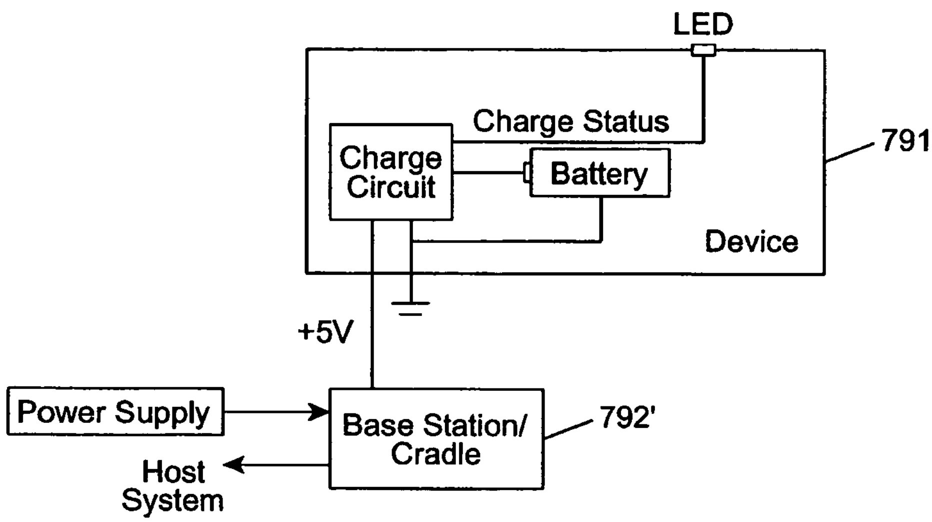
Figure 46B:
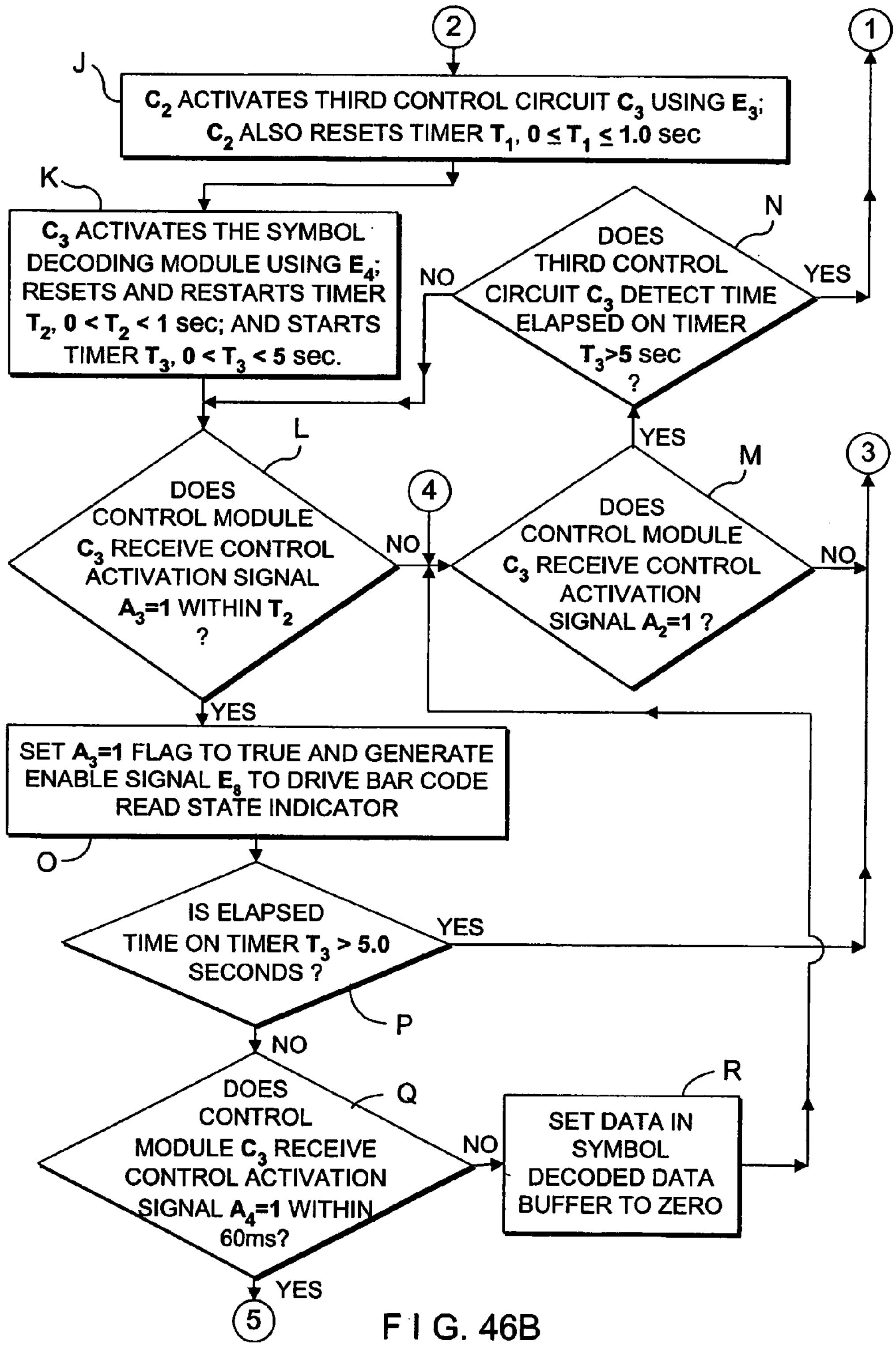
Figure 47:
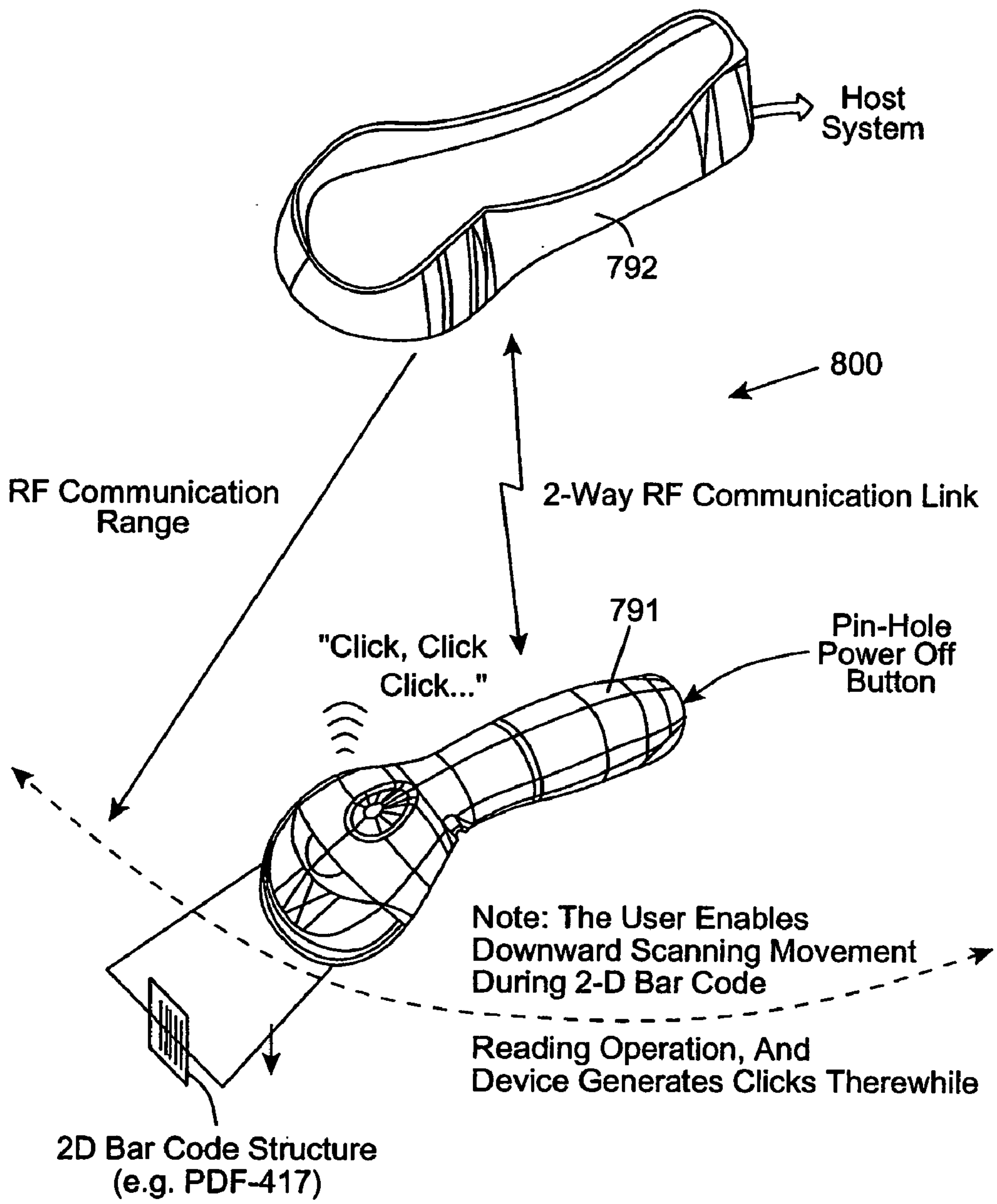

FIGS. 43E through 43H show in greater detail the retractable/protractable support hook integrated within the cradle-providing base station for (i) supporting the automatic hand-supportable wireless laser scanning bar code symbol reading device in a vertical position when the hinged support hook is arranged in its protracted configuration as shown in FIGS. 43E1 and 43F, and (ii) supporting the automatic hand-supportable wireless laser scanning bar code symbol reading device in a horizontal position when the hinged support hook is arranged in its retracted configuration as shown in FIGS. 43G and 43H;

FIG. 43I shows an elevated side view of the cradle-supporting base station employed in the system of FIGS. 43A through 43D, with its support hook arranged in its retracted configuration;

FIG. 43J shows an elevated side view of the cradle-supporting base station employed in the system of FIGS. 43A through 43D, with its support hook arranged in its protracted configuration;

FIG. 44A1 is a schematic representation of the system shown in FIGS. 43A through 43D, wherein the wireless automatic bar code reading device is moved within the predetermined communication range of the systems's 2-way RF data communication link, and wherein the heartbeat signal automatically transmitted from RF transceiver chip set in the cradle-providing base station is being longer received and detected by the RF transceiver chip set in the wireless automatic bar code reading device, automatically causing the data transmission subsystem in the hand-supportable device to generate an "in-range activation signal", $A_5=1$ for use by the control subsystem thereof during data packet transmission operations;

FIG. 44A2 is a schematic representation of the system shown in FIGS. 43A through 43D, wherein the wireless automatic bar code reading device is moved outside the predetermined communication range of the systems's 2-way RF data communication link, and wherein the heartbeat signal automatically transmitted from RF transceiver chip set in the cradle-providing base station is no longer received and detected by the RF transceiver chip set in the wireless automatic bar code reading device, automatically causing the data transmission subsystem in the hand-supportable device to generate an "out-of-range activation signal", $A_5=0$ for use by the control subsystem thereof during data packet transmission operations;

FIGS. 45A1 through 45A4, taken together, is a system block functional diagram of the operating system design for the automatically-activated laser scanning bar code symbol reading system shown in FIGS. 43A through 44A2, wherein automatic IR-based object detection is employed during system operation;

FIG. 45B is a schematic diagram of an alternative battery charging circuit which can be used in the system shown in FIGS. 43A through 45A4, wherein direct electrical contacts are provided on the wireless hand-supportable device and on the cradle-providing base station to establish electrical connectivity therebetween and supply a regulated DC supply voltage to the hand-supportable device to charge the battery pack contained therein;

FIGS. 46A1 through 46C4, taken together, show a high level flow chart of the control process carried out by the control subsystem of the bar code symbol reading system of FIGS. 45A1 through 45A4;

FIG. 47 is a perspective views of an alternative embodiment of the automatic wireless laser scanning bar code symbol reading system of the present invention shown in FIGS. 43A–46C4, modified to support the reading of 2-D bar code symbols (e.g. such as the PDF 417 symbology) and the novel 2-way RF-based data communication link interface illustrated in FIGS. 43A–46C4, by way of the user manually moving the linear laser scanning pattern generated therefrom in a downward direction along the height dimension of the 2-D bar code structure, and therewhile, the Bar Code Symbol Data Detector (311') employed therein automatically activating the generation of audible sounds (e.g. clicks) as each line of bar code symbol data is detected thereby prior to 2-D symbol decoding and data packet transmission to the remote base station;

FIGS. 47A1 through 47A4, taken together, is a system block functional diagram of the operating system design for the automatically-activated laser scanning bar code symbol reading system shown in FIG. 47, wherein automatic IR-based object detection is employed during system operation; and FIG. 47B is a schematic diagram of the battery power supply unit contained within the housing of the bar code reading system shown in FIGS. 43A and 44A2.

FIGS. 48A1 through 48C4, taken together, show a high level flow chart of the control process carried out by the control subsystem of the bar code symbol reading system of FIGS. 47A1 through 47A4.

DETAILED DESCRIPTION OF THE ILLUSTRATIVE EMBODIMENTS OF THE PRESENT INVENTION

Referring to the figures in the accompanying Drawings, the various illustrative embodiments of the automatically-activated laser scanning bar code symbol reading system of the present invention will be described in great detail, wherein like elements will be indicated using like reference numerals.

Prior to detailing the various illustrative embodiments of the present invention, it will be helpful to first provide a brief overview of the system and method thereof.

As illustrated in Blocks A and B of FIG. 1, the present invention teaches an automatically-activated bar code symbol reading system 1000 comprising a bar code symbol reading mechanism 1001 contained within a hand-supportable housing 1002 having a manually-activatable data transmission switch 1003. During symbol reading operations, the bar code symbol reading mechanism 1001 automatically generates a visible laser scanning pattern 1004 for repeatedly reading one or more bar code symbols 1005 on an object 1005B within a bar code symbol reading cycle, and automatically generating a new symbol character data string 1006A, or 1006B, respectively, in response to each bar code symbol read thereby. In general, each bar code symbol reading cycle has a predetermined time extent controlled by one or more timers that are periodically monitored during system operation.

During the first step of the bar code symbol reading method of the present invention illustrated at Block A of FIG. 1, the user 1007 visually aligns the visible laser scanning pattern 1004 with a particular bar code symbol 1005A on an object (e.g. product, bar code menu, etc.) 1005B so that the bar code symbol is scanned, detected and decoded in a cyclical manner during each bar code symbol reading cycle. Each time the scanned bar code symbol is successfully read during a bar code symbol reading cycle, a new bar code symbol character string, schematically depicted as a circulating-arrow structure 1006A, is produced while an indicator light 1008 on the hand-supportable housing 1002 is actively driven.

As indicated at Block B in FIG. 1, upon actuation of the data transmission switch 1003 during the bar code symbol reading cycle which, in general, can be achieved by changing the state of the switch, a data transmission control activation signal is internally produced, thereby enabling a (currently or subsequently) produced symbol character data string, schematically depicted as a directional-arrow structure 1006B, to be selected and transmitted to the host system 1009.

By virtue of the present invention, automatically-activated hand-supportable bar code symbol readers are now able to accurately read, in an unprecedented manner, diverse types of bar code symbols on bar code menus, consumer products positioned in crowded POS environments, and other objects requiring automatic identification and/or information access and processing.

Figure 1A:
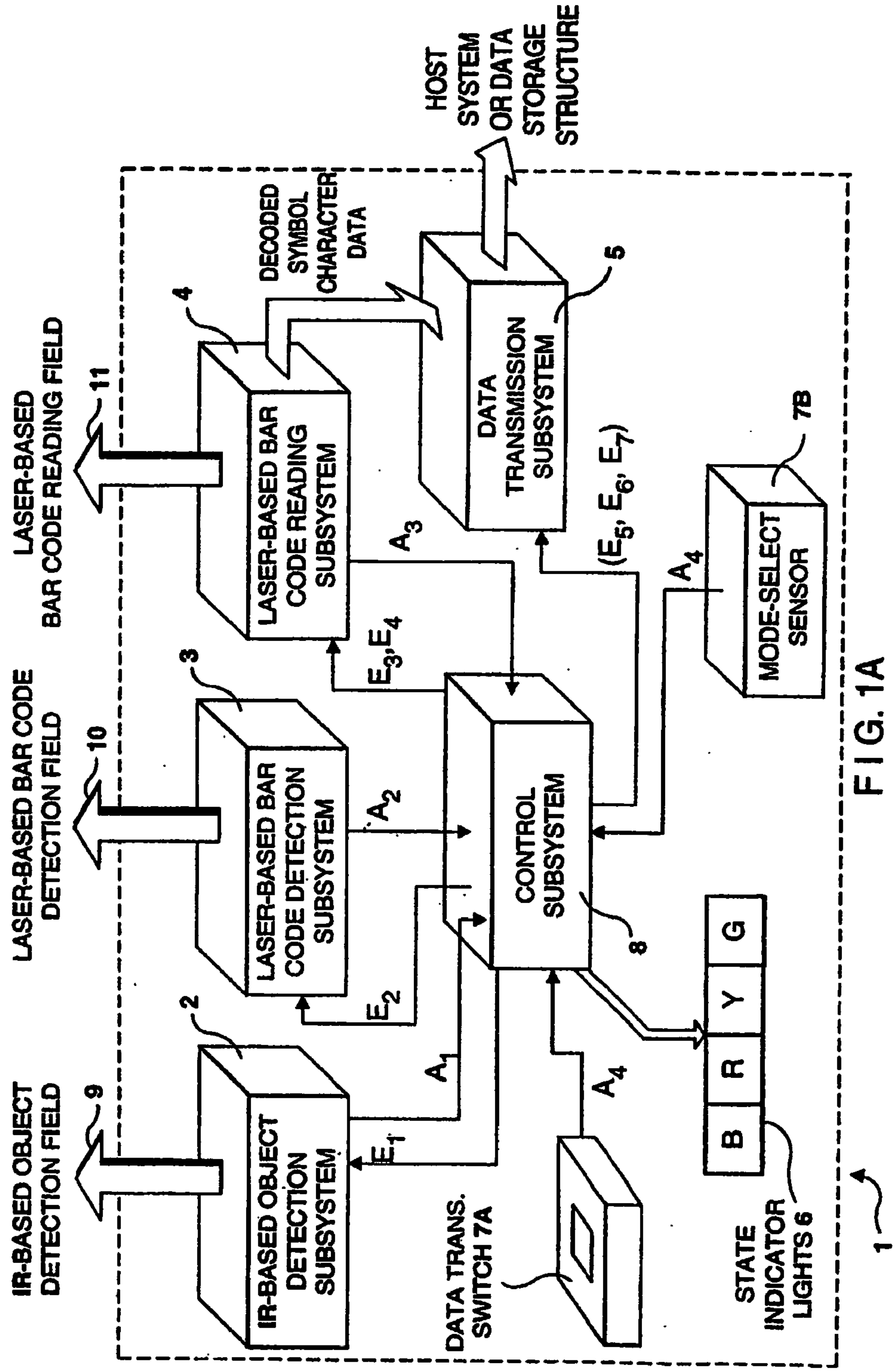
FIG. 1A is a schematic representation of the first illustrative embodiment of the automatically-activated bar code symbol reading device of the present invention, showing the major subsystem components thereof as comprising an IR-based object detection subsystem, a laser-based bar code symbol detection subsystem, a laser-based bar code symbol reading subsystem, a data transmission subsystem, and a system control subsystem.
Figure 1B:
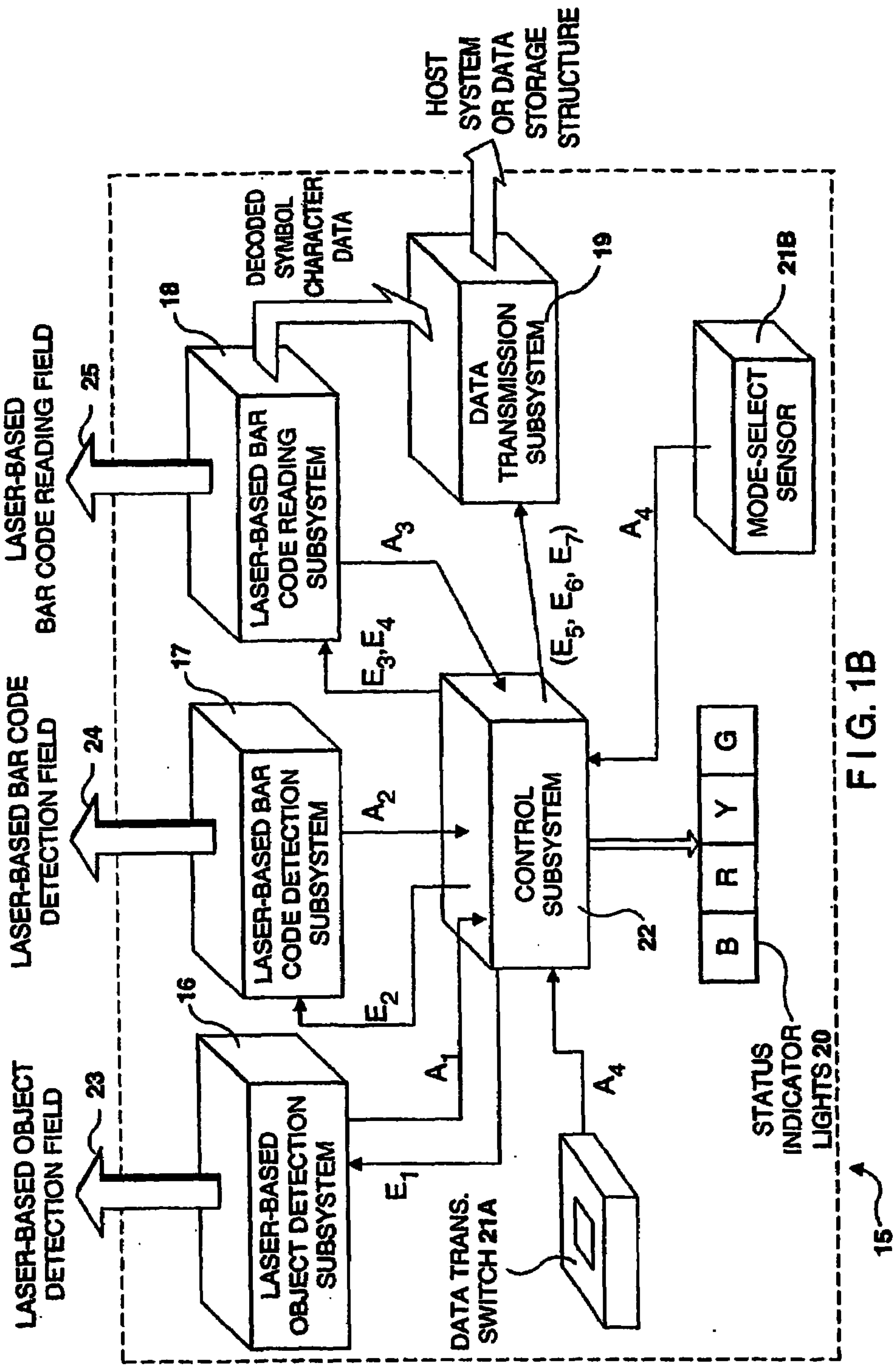
FIG. 1B is a schematic representation of the second illustrative embodiment of the automatically-activated bar code symbol reading device of the present invention, showing the major subsystem components thereof as comprising a laser-based object detection subsystem, a laser-based bar code symbol detection subsystem, a laser-based bar code symbol reading subsystem, a data transmission subsystem, and a system control subsystem.
Figure 1C:
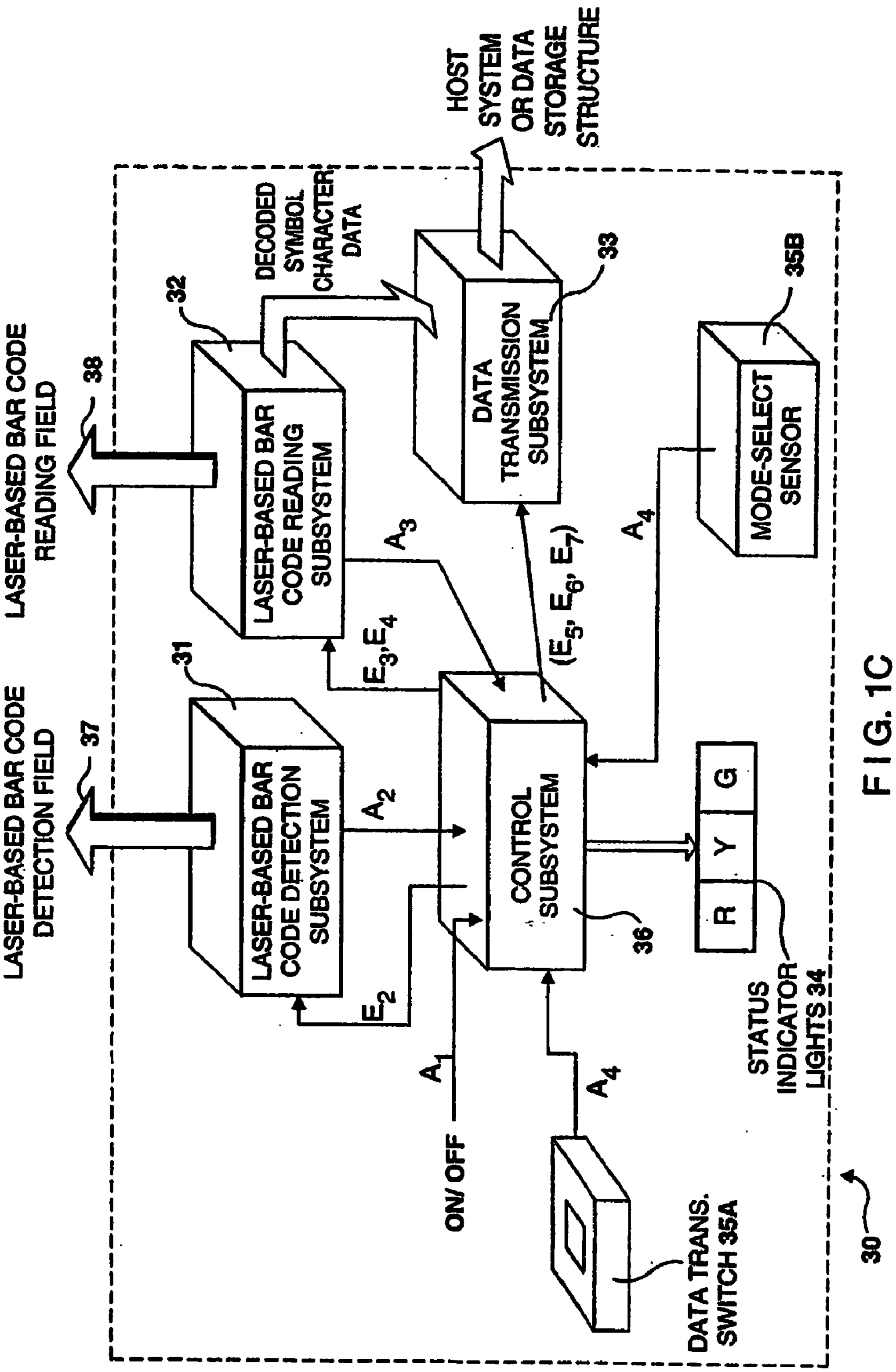
FIG. 1C is a schematic representation of the third illustrative embodiment of the automatically-activated bar code symbol reading device of the present invention, showing the major subsystem components thereof as comprising a laser-based bar code symbol detection subsystem, a laser-based bar code symbol reading subsystem, a data transmission subsystem, and a system control subsystem.

In FIGS. 1 to 8D, twenty-one different embodiments of the automatically-activated bar code symbol reading system of the present invention are shown. These twenty-one different embodiments can be classified into three different types of generalized system designs, each based on the general manner in which its underlying laser scanning mechanism is automatically-activated and controlled during the bar code symbol reading process of the present invention. These three different system designs are illustrated in FIGS. 1A, 1B and 1C. In each of these generalized system designs, activation of the bar code symbol detection and bar code symbol reading operations is carried out in a fully automatic manner, without the use of a manually-activated trigger or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798, 5,484,992; 5,468,951; 5,425,525; 5,240,971; 5,340,973; 5,260,553; incorporated herein by reference. Prior to describing each of the illustrative embodiments of the present invention in detail, it will be helpful at this juncture to briefly describe each of the three generalized system designs of the present invention.

First Generalized System Design for the Automatically-Activated Bar Code Symbol Reading Device of the Present Invention The first generalized system design of the present invention is shown in FIG. 1A. Eight illustrative embodiments of this first generalized system design are represented by the first (2A), fourth (3A), seventh (4A), tenth (5A), thirteenth (6A), sixteenth (7A), nineteenth (8A) and twenty-second (8E1) embodiments shown in FIGS. 2A to 2H, 3A to 3C, 4A to 4D, 5A, 6A, 7A, 8A, and 8E1, respectively. In each such illustrative embodiment of the present invention, the hand-supportable, body-wearable or desktop-supportable bar code symbol reading device (hereinafter referred to as "hand-supportable bar code symbol reading device") includes an automatically-activated bar code symbol scanning engine, embedded within the housing of the device. While hand-held, finger-supported, desktop-supported and body-wearable housings will be disclosed hereinafter for the bar code symbol reading device of the present invention, the term "hand-supportable housing" as used hereinafter and in the claims to Invention shall be deemed to include all such housing designs, as well as an infinite array of variations on the form factors thereof. In general, any of the automatically-activated laser scanning bar code symbol reading engines shown in FIGS. 9A to 9D, 10A to 10D, 11A, 13A and 14A can be embodied within the scanner housing of the bar code symbol reading device. In the illustrative embodiments, particular laser scanning engine designs have been incorporated into the scanner housing of the bar code symbol reading device for illustrative purposes. It is understood, however, that other laser scanning engine designs can be integrated into the scanner housings of such bar code symbol reading devices.

As indicated in FIG. 1A, the automatically-activated bar code symbol scanning device of the first general system design 1 comprises a number of subsystems, namely: an IR-based object detection subsystem 2 as taught in prior U.S. Pat. Nos. 5,260,553 and 5,808,285, incorporated herein by reference; a laser-based bar code symbol detection subsystem 3; a laser-based bar code symbol reading subsystem 4; a data transmission subsystem 5; a state indication subsystem 6; a data transmission activation switch or control device 7A integrated with the scanner housing in part or whole; a mode-selection sensor 7B integrated with the scanner housing in part or whole; and a system control subsystem 8 operably connected to the other subsystems described above. In general, system 1 has a number of preprogrammed operational states, namely: an Object Detection State; a Bar Code Symbol Detection State; a Bar Code Symbol Reading State; and a Data Transmission State.

Within the context of the system design shown in FIG. 1A, the IR-based object detection subsystem 2 performs the following primary functions during the object detection state: (i) automatically and synchronously transmitting and receiving pulse infrared (1R) signals within an IR-based object detection field 9 defined relative to the hand-supportable scanner housing (not shown) (ii) automatically detecting an object in at least a portion of the IR-based object detection field 9 by analysis of the received IR pulse signals; and (iii) in response thereto, automatically generating a first control activation signal $A_1$ indicative of such automatic detection of the object within the object detection field. As shown in FIG. 1A, the first control activation signal $A_1=1$ is provided to the system control subsystem 8 for detection, analysis and programmed response.

As shown in the figures hereof, object detection, bar code detection and bar code reading fields 9, 10 and 11, respectively, have been schematically represented only in terms of their general geometrical boundaries. For purposes of clarity, the geometrical characteristics of these fields have not been shown. Notably, however, such characteristics can be ascertained from the various references relating thereto which are identified and incorporated herein by reference.

Within the context of the system design shown in FIG. 1A, the laser-based bar code symbol detection subsystem 3 performs the following primary functions during the bar code symbol detection state: (i) automatically generating a visible laser scanning pattern of predetermined characteristics within the laser-based bar code (symbol) detection field 10, defined relative to the scanner housing (not shown), to enable scanning of a bar code symbol on the detected object; (ii) automatically processing scan data collected from the bar code symbol detection field 10 and detecting the presence of the bar code symbol thereon; and (iii) automatically generating a control activation signal $A_2=1$ indicative thereof in response to the automatic detection of the bar code symbol. As shown in FIG. 1A, the second control activation signal $A_2$ is provided to the system control subsystem 8 for detection, analysis and programmed response.

Within the context of the system design shown in FIG. 1A, the laser-based bar code symbol reading subsystem 4 performs the following functions during the bar code symbol reading state: (i) automatically generating a visible laser scanning pattern of predetermined characteristics within the laser-based bar code (symbol) reading field 11 defined relative to the scanner housing, to enable scanning of the detected bar code symbol therein; (ii) automatically decode processing scan data collected from the bar code symbol reading field 11 so as to detect the bar code symbol on the object; (iii) automatically generating a third control activation signal $A_3=1$ indicative of a successful decoding operation, and producing decoded symbol character data representative of the detected and read bar code symbol. As shown in FIG. 1A, the third control activation signal $A_3$ is provided to the system control subsystem 8 for detection, analysis and programmed response.

Within the context of the system design shown in FIG. 1A, the data transmission subsystem 5 during the Data Transmission State automatically transmits produced symbol character data to the host system (to which the bar code reading device is connected) or to some other data storage and/or processing device, only when the system control subsystem 8 detects the following conditions: (1) generation of third control activation signal $A_3=1$ within a predetermined time period, indicative that the bar code symbol has been read; and (ii) generation of data transmission activation control signal $A_4=1$ (e.g. produced from manually-activatable switch 7A) within a predetermined time frame, indicative that the user desires the produced bar code symbol character data to be transmitted to the host system or intended device.

Within the context of the system design shown in FIG. 1A, the state-selection sensor 7B has two primary functions: (i) to automatically generate the fourth control activation signal $A_4=1$ whenever the scanner housing has been placed within its support stand, or placed on a countertop or like surface in those instances where it has been designed to do so, so that the system is automatically induced into its automatic hands-free mode of operation; and (ii) to automatically generate the fourth control activation signal $A_4=0$ whenever the scanner housing has been removed from its support stand, or lifted off of a countertop or like surface in those instances where it has been designed to do so, so that the system is automatically induced into its automatic hands-on mode of operation. In the automatic hands-free mode of operation, the mode-select sensor 7B effectively overrides the data transmission switch 7A. In the automatic hands-on mode of operation, the data transmission switch 7A effectively overrides the mode-select sensor 7B.

Within the context of the system design shown in FIG. 1A, the state indication subsystem 6 performs the following functions: automatically monitors the state of operation of the system at each instant of time; and automatically produces visual indication (e.g. color-coded light) signals from the scanner housing designed to inform the user of the current state of operation of the system (e.g. "blue" to indicate the object detection state, "red" to indicate the bar code detection state, "yellow" to indicate the bar code reading state, and "green" to indicate the symbol character data transmission state). As will be described in greater detail hereinafter, such state indication signals provide the user with visual feedback on the states of operation of the system, thereby improving the intuitiveness and facility of operation of the system in diverse application environments.

Within the context of the system design shown in FIG. 1A, the system control subsystem 8 performs the following primary functions: (i) automatically receiving control activation signals $A_1$, $A_2$, $A_3$ and $A_4$; (ii) automatically generating enable signals $E_1$, $E_2$, $E_3$, $E_4$, $E_5$, $E_6$, and $E_7$; and (iii) automatically controlling the operation of the other subsystems in accordance with a system control program carried out by the system control subsystem 8 during the various modes of system operation.

In general, the geometrical and optical characteristics of laser scanning patterns generated by the laser-based bar code symbol detection subsystem 3 and the laser-based bar code symbol reading subsystem 4 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field 11 spatially-overlaps the bar code symbol detection field 10 to improve the scanning efficiency of the system. Also, the IR-based object detection field 9 will be arranged relative to the bar code detection field 10 so that it spatially-encompasses the same along the operative scanning range of the system defined by the geometrical characteristics of the bar code reading field 11 thereof.

In general, detected energy reflected from an object during object detection can be optical radiation or acoustical energy, either sensible or non-sensible by the user, and may be either generated from the automatic bar code reading device or an external ambient source. However, the provision of such energy is preferably achieved by transmitting a wide beam of pulsed infrared (IR) light away from transmission aperture of the scanner, as taught herein. In the preferred embodiment, the object detection field 9, from which such reflected energy is collected, is designed to have a narrowly diverging pencil-like geometry of three-dimensional volumetric expanse, which is spatially coincident with at least a portion of the transmitted infrared light beam. This feature of the present invention ensures that an object residing within the object detection field 9 will be illuminated by the infrared light beam, and that infrared light reflected therefrom will be directed generally towards the transmission aperture of the housing where it can be automatically detected to indicate the presence of the object within the object detection field 9.

Initially, system control subsystem 8 provides enable signal $E_1$=1 to the IR-based object detection subsystem 2. When an object is presented within the IR-based object detection field 9, the object is automatically detected by the IR-based object detection subsystem 2. In response thereto, the IR-based object detection system automatically generates a control activation signal $A_1$=1. When control activation signal $A_1$=1 is detected by the system control subsystem 8, it automatically activates the laser-based bar code symbol detection subsystem 3 by producing enable signal $E_2$. This causes the laser-based bar code detection subsystem 3 to generate a laser scanning pattern of predetermined characteristics within the laser-based bar code detection field 10. When the laser scanning pattern scans a bar code symbol on the detected object, scan data signals are produced therefrom, collected, detected and processed to determine whether a bar code symbol has been scanned within the bar code symbol detection field 10. If the scanned bar code symbol is detected, then the system control subsystem 8 automatically generates enable signal $E_3$ and $E_4$ so as to activate the bar code symbol reading subsystem 4. In response thereto, the laser-based bar code reading subsystem 4 automatically generates a laser scanning pattern within the laser-based bar code reading field 11, scans the detected bar code symbol disposed therewithin, collects scan data therefrom, decodes the detected bar code symbol, generates symbol character data representative of the decoded bar code symbol, and buffers the symbol character data in memory. If the detected bar code symbol is read within a predetermined period of time, and the manually-activated data transmission switch 7A is depressed within a predetermined time frame established by the system control subsystem 8, then the system control subsystem 8 automatically activates the data transmission subsystem 5. In response thereto, the data transmission subsystem 5 automatically transmits the produced/buffered symbol character data to the host system (to which the bar code symbol reader is connected), a data storage buffer (e.g. disposed in a portable data collection device connected to the bar code symbol reader), or other data storage/processing device.

By virtue of the novel system control architecture, the user is permitted to read bar code symbols in a highly intuitive manner, wherein object detection, bar code detection, and bar code symbol reading are carried out in an automatic manner while data transmission of decoded symbol character data to the host device is enabled by manual-activation of a switch, button or like device located on the exterior of the hand-supportable scanner housing. In the preferred embodiment, a visual state indicator is provided on the scanner housing for visually indicating that a bar code symbol has been successfully read in a fully-automatic manner, and that the system is ready for data transmission enablement to the host system or like device. When the visual indicator indicates that a bar code symbol is being read and decoded symbol character data is being generated, the user need only depress the data transmission activation switch on the scanner housing to send subsequently produced symbol character data to the host system or like device. Failure to depress the data transmission switch 7A within the preallotted time frame during automatic bar code symbol reading results in there not being any symbol character data transmission to the host system.

The structure and functionalities of the first general system design of FIG. 1A described above are shown in greater detail in the system embodiment of FIGS. 15A1 through 16, and FIGS. 20A1 through 21. In this system embodiment, the IR-based object detection subsystem 2 is realized from various electro-optical and electro-mechanical components assembled together as shown in FIGS. 15A1 through 15A4, so as to enable automatic detection of objects within the IR-based object detection field 9 of the system. Likewise, the laser-based bar code symbol detection subsystem 3 is realized from various electro-optical and electro-mechanical components assembled together as shown in FIG. 15A1 to 15A4, so as to enable automatic detection of bar code symbols on detected objects within the laser-based bar code detection field of the system. Also, the laser-based bar code symbol reading subsystem 4 is realized from various electro-optical and electro-mechanical components assembled together so as to enable automatic reading of detected bar code symbols within the laser-based bar code reading field 11 of the system. As will be described in greater detail hereinafter, this system embodiment requires a complex control subsystem architecture, but offers a significant improvement in power conservation which can be very important in portable and mobile data acquisition applications.

Second Generalized System Design for the Automatically-Activated Bar Code Symbol Reading Device of the Present Invention The second generalized system design of the present invention is shown in FIG. 1B. Eight illustrative embodiments of this second generalized system design are represented by the second, fifth, eighth, eleventh, fourteenth, seventeenth, twentieth and twenty-third embodiments shown in FIGS. 2I, 3D, 4E, 5B, 6B, 7B, 8B, and 8F, respectively. In each such illustrative embodiment of the present invention, the hand-supportable, body-wearable or desktop-supportable bar code symbol reading device includes an automatically-activated bar code symbol scanning engine, embedded within the scanner housing. In general, any of the automatically-activated laser scanning bar code symbol reading engines shown in FIGS. 9E, 10E, 11B, 13B and 14B can be embodied within the scanner housing of the bar code symbol reading device. In the illustrative embodiments, particular laser scanning engine designs have been incorporated into the scanner housing of the bar code symbol reading device for illustrative purposes. It is understood, however, that other laser scanning engine designs can be integrated into the scanner housings of such bar code symbol reading devices.

As indicated in FIG. 1B, the automatically-activated bar code symbol scanning engine of the second general system design 15 comprises a number of subsystems, namely: a laser-based object detection subsystem 16 as taught in prior U.S. Pat. No. 4,933,538 to Heiman, et al., incorporated herein by reference; a laser-based bar code symbol detection subsystem 17; a laser-based bar code symbol reading subsystem 18; a data transmission subsystem 19; a state indication subsystem 20; and a data transmission activation switch or control device 21A integrated with the scanner housing in part or whole; a mode-selection sensor 21B integrated with the scanner housing it part or whole; and a system control subsystem 22 operably connected to the other subsystems described above. In general, system 15 has a number of preprogrammed states of operation, namely: an Object Detection State; a Bar code Symbol Detection State; a Bar code Symbol Reading State; and a Data Transmission State.

Within the context of the system design shown in FIG. 1B, the laser-based object detection subsystem 16 performs the following primary functions: (i) automatically generates and scans a low-power pulsed (invisible) laser scanning beam across an object within a laser-based object detection field 23 defined relative to the hand-supportable scanner housing (not shown); (ii) automatically detects an object in at least a portion of the laser-based object detection field by analysis of collected scan data; and (iii) in response thereto, automatically generating a first control activation signal $A_1$ indicative of such automatic detection of the object within the object detection field 23. As shown in FIG. 1B, the first control activation signal $A_1$ is provided to the system control subsystem 22 for detection, analysis and programmed response.

Within the context of the system design shown in FIG. 1B, the laser-based bar code symbol detection subsystem 17 performs the following primary functions during the Bar Code Symbol Detection State: (i) automatically generating a laser scanning pattern of predetermined characteristics within the laser-based bar code (symbol) detection field 24, defined relative to the scanner housing, to enable scanning of a bar code symbol on the detected object; (ii) automatically processing scan data collected from the bar code symbol detection field 24 and detecting the presence of the bar code symbol thereon; and (iii) automatically generating a control activation signal $A_2$ indicative thereof in response to the automatic detection of the bar code symbol. As shown in FIG. 1B, the second control activation signal $A_2$ is provided to the system control subsystem 22 for detection, analysis and programmed response.

Within the context of the system design shown in FIG. 1B, the laser-based bar code symbol reading subsystem 18 performs the following functions during the Bar Code Symbol State: (i) automatically generating a visible laser scanning pattern of predetermined characteristics within the laser-based bar code (symbol) reading field 25 defined relative to the scanner housing, to enable scanning of the detected bar code symbol therein; (ii) automatically decode processing scan data collected from the bar code symbol reading field 25 so as to detect the bar code symbol on the detected object; (iii) automatically generating a third control activation signal $A_3=1$ indicative of a successful decoding operation, and producing decoded symbol character data representative of the detected and read bar code symbol. As shown in FIG. 1B, the third control activation signal $A_3$ is provided to the system control subsystem 22 for detection, analysis and programmed response.

As shown in the figures hereof, object detection, bar code detection and bar code reading fields 23, 24 and 25, respectively, have been schematically represented only in terms of their general geometrical boundaries. For purposes of clarity, the geometrical characteristics of these fields have not been shown. Notably, however, such characteristics can be ascertained from the various references relating thereto which are identified and incorporated herein by reference.

Within the context of the system design shown in FIG. 1B, the data transmission subsystem 19 during the Data Transmission State, automatically transmits produced symbol character data to the host system (to which the bar code reading device is connected) or to some other data storage and/or processing device, only when the system control subsystem detects at least the following conditions: (1) generation of third control activation signal $A_3=1$ within a predetermined time period, indicative that the bar code symbol has been read; and (ii) generation of data transmission control activation signal $A_4=1$ (e.g. produced from manually-activatable switch 21A) within a predetermined time frame, indicative that user desires the produced bar code symbol character data to be transmitted to the host system or intended device.

Within the context of the system design shown in FIG. 1B, the state-selection sensor 21B has two primary functions: (i) to automatically generate the fourth control activation signal $A_4=1$ whenever the scanner housing has been placed within its support stand, or placed on a countertop or like surface in those instances where it has been designed to do so, so that the system is automatically induced into its automatic hands-free mode of operation; and (ii) to automatically generate the fourth control activation signal $A_4=0$ whenever the scanner housing has been removed from its support stand, or lifted off of a countertop or like surface in those instances where it has been designed to do so, so that the system is automatically induced into its automatic hands-on mode of operation. In the automatic hands-free mode of operation, the mode-select sensor 21B effectively overrides the data transmission switch 21A. In the automatic hands-on mode of operation, the data transmission switch 21A effectively overrides the mode-select sensor 21B.

Within the context of the system design shown in FIG. 1B, the state indication subsystem performs the following functions: automatically monitor the state of operation of the system at each instant of time; and automatically produce visual indication (e.g. color-coded light) signals from the scanner housing designed to inform the user of the current state of operation of the system (e.g. "blue" to indicate the object detection state, "red" to indicate the bar code detection state, "yellow" to indicate the bar code reading state, and "green" to indicate the symbol character data transmission state). As will be described in greater detail hereinafter, such state indication signals provide the user with visual feedback on the states of operation of the system, thereby improving the intuitiveness and facility of operation of the system in diverse application environments.

Within the context of the system design shown in FIG. 1B, the system control subsystem 22 performs the following primary functions: (i) automatically receiving control activation signals $A_1$, $A_2$, $A_3$ and $A_4$; (ii) automatically generating enable signals $E_1$, $E_2$, $E_3$, $E_4$, $E_5$, $E_6$, and $E_7$; and (iii) automatically controlling the operation of the other subsystems in accordance with a system control program carried out by the system control subsystem 22 during the various modes of system operation.

In general, the geometrical and optical characteristics of laser scanning patterns generated by the laser-based bar code symbol detection subsystem 17 and the laser-based bar code symbol reading subsystem 18 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field spatially-overlaps the bar code symbol detection field to improve the scanning efficiency of the system. Also, the laser-based object detection field will be arranged relative to the bar code detection field so that it spatially-encompasses the same along the operative scanning range of the system defined by the geometrical characteristics of the bar code reading field thereof.

Initially, system control subsystem 22 provides enable signal $E_1=1$ to the laser-based object detection subsystem 16. When an object is presented within the laser-based object detection field 23, the object is automatically detected by the laser-based object detection subsystem 16. In response thereto, the laser-based object detection system 16 automatically generates a control activation signal $A_1=1$. When control activation signal $A_1=1$ is detected by the control system subsystem 22, the system control subsystem automatically activates the laser-based bar code symbol detection subsystem 17 by producing enable signal $E_2$. This causes the laser-based bar code detection subsystem 17 to generate a visible laser scanning pattern of predetermined characteristics within the laser-based bar code detection field 24. When the laser scanning pattern scans a bar code symbol on the detected object, scan data signals are produced therefrom, collected, detected and processed to determine whether a bar code symbol has been detected within the bar code symbol detection field 24. If the scanned bar code symbol is detected, then the system control subsystem 22 automatically generates enable signal $E_3$ and $E_4$ so as to activate the bar code symbol reading subsystem 18. In response thereto, the laser-based bar code reading subsystem 18 automatically generates a visible laser scanning pattern within the laser-based bar code reading field 25, scans the detected bar code symbol disposed therewithin, collects scan data therefrom, decodes the detected bar code symbol, generates symbol character data representative of the decoded bar code symbol, and buffers the symbol character data in memory. If the detected bar code symbol is read within a predetermined period of time, and the manually-activated data transmission switch 21A is depressed within a predetermined time frame, then the system control subsystem 22 automatically activates the data transmission subsystem 19. In response thereto, the data transmission subsystem 19 automatically transmits the produced/buffered symbol character data to the host system (to which the bar code symbol reader is connected), a data storage buffer (e.g. disposed in a portable data collection device connected to the bar code symbol reader), or other data storage/processing device.

By virtue of the novel system control architecture, the user is permitted to read bar code symbols in a highly intuitive manner, wherein object detection, bar code detection, and bar code symbol reading are carried out in an automatic manner while data transmission of decoded symbol character data to the host device is enabled by manual-activation of a switch, button or like device located on the exterior of the hand-supportable scanner housing. In the preferred embodiment, a visual indicator is provided on the scanner housing for visually indicating that a bar code symbol has been successfully read in a fully-automatic manner, and that the system is ready for data transmission to the host system or like device. When the visual indicator indicates that a bar code symbol is being read and decoded symbol character data is being generated, the user need only depress the data transmission control activation switch 21A on the scanner housing to send subsequently produced symbol character data to the host system or like device.

The structure and functionalities of the second general system design of FIG. 1B described above is shown in greater detail in the system embodiment of FIGS. 22A1 through 24, wherein a lower-power laser-based object detection subsystem is provided for automatic detection of objects within the object detection field of the system. Likewise, the laser-based bar code symbol detection subsystem 17 is realized from various electro-optical and electro-mechanical components assembled together as shown in FIGS. 22A1 through 22A4 so as to enable automatic detection of bar code symbols on detected objects within the laser-based bar code detection field of the system. Also, the laser-based bar code symbol reading subsystem 18 is realized from various electro-optical and electro-mechanical components assembled together as shown in FIGS. 22A1 through 22A4 so as to enable automatic reading of detected bar code symbols within the laser-based bar code reading field of the system. As will be described in greater detail hereinafter, this system design requires a less complex control subsystem architecture, but does not enjoy the power conservation advantages of system designs employing IR-based object detection.

Third Generalized System Design for the Automatically-Activated Bar Code Symbol Reading Device of the Present Invention The third generalized system design of the present invention is shown in FIG. 1C. Eight illustrative embodiments of this third generalized system design are represented by the third, sixth, ninth, twelfth, fifteenth, eighteenth, twenty-first and twenty-fourth embodiments shown in FIGS. 2J, 3E, 4F, 5C, 6C, 7C, 8C, and 8G, respectively. In each such illustrative embodiment of the present invention, the hand-supportable, body-wearable or desktop-supportable bar code symbol reading device includes an automatically-activated bar code symbol scanning engine, embedded within the scanner housing. In general, any of the automatically-activated laser scanning bar code symbol reading engines shown in FIGS. 9F, 10F, 11C, 13C and 14C can be embodied within the scanner housing of the bar code symbol reading device. In the illustrative embodiments, particular laser scanning engine designs have been incorporated into the scanner housing of the bar code symbol reading device for illustrative purposes. It is understood, however, that other laser scanning engine designs can be integrated into the scanner housings of such bar code symbol reading devices.

As indicated in FIG. 1C, the automatically-activated bar code symbol scanning engine of the third general system design 30 comprises a number of subsystems, namely: a laser-based bar code symbol detection subsystem 31; a laser-based bar code symbol reading subsystem 32; a data transmission subsystem 33; a state indication subsystem 34; a data transmission activation switch or control device 35A integrated with the scanner housing (not shown) in part or whole; a mode-selection sensor 35B integrated with the scanner housing it part or whole; and a system control subsystem 36 operably connected to the other subsystems described above. In general, the system 30 has a number of preprogrammed states of operation, namely: a Bar Code Symbol Detection State; a Bar code Symbol Reading State; and a Data Transmission State.

Within the context of the system design shown in FIG. 1C, the laser-based bar code symbol detection subsystem 31 performs the following primary functions during the Bar Code Symbol Detection State: (i) automatically generates a pulsed visible laser scanning pattern of predetermined characteristics within a laser-based bar code (symbol) detection field 37, defined relative to the scanner housing, to enable scanning of a bar code symbol on the detected object; (ii) automatically processes scan data collected from the bar code symbol detection field 37 and detects the presence of the bar code symbol thereon; and (iii) automatically generates a control activation signal $A_2=1$ indicative thereof in response to the automatic detection of the bar code symbol. As shown in FIG. 1C, the second control activation signal $A_2$ is provided to the system control subsystem 36 for detection, analysis and programmed response.

Within the context of the system design shown in FIG. 1C, the laser-based bar code symbol reading subsystem 32 performs the following functions during the Bar Code Symbol Reading State: (i) automatically generates a visible laser scanning pattern of predetermined characteristics within a laser-based bar code (symbol) reading field 38 defined relative to the scanner housing, to enable scanning of the detected bar code symbol therein; (ii) automatically decode-processes scan data collected from the bar code symbol reading field 38 so as to detect the bar code symbol on the detected object; (iii) automatically generates a third control activation signal $A_3=1$ indicative of a successful decoding operation, and produces decoded symbol character data representative of the detected and read bar code symbol. As shown in FIG. 1C, the third control activation signal $A_3$ is provided to the system control subsystem 36 for detection, analysis and programmed response.

Within the context of the system design shown in FIG. 1C, the data transmission subsystem 33 during the Data Transmission State automatically transmits produced symbol character data to the host system (to which the bar code reading device is connected) or to some other data storage and/or processing device, only when the system control subsystem 36 detects the following conditions: (1) generation of third control activation signal $A_3=1$ within a predetermined time period, indicative that the bar code symbol has been read; and (ii) generation of data transmission control activation signal $A_4=1$ (e.g. produced from manually-activatable switch 35A) within a predetermined time frame, indicative that user desires the produced bar code symbol character data to be transmitted to the host system or intended device.

Within the context of the system design shown in FIG. 1C, the state-selection sensor 35B has two primary functions: (i) to automatically generate the fourth control activation signal $A_4=1$ whenever the scanner housing has been placed within its support stand, or placed on a countertop or like surface in those instances where it has been designed to do so, so that the system is automatically induced into its automatic hands-free mode of operation; and (ii) to automatically generate the fourth control activation signal $A_4=0$ whenever the scanner housing has been removed from its support stand, or lifted off of a countertop or like surface in those instances where it has been designed to do so, so that the system is automatically induced into its automatic hands-on mode of operation. In the automatic hands-free mode of operation, the mode-select sensor 35B effectively overrides the data transmission switch 35A. In the automatic hands-on mode of operation, the data transmission switch 35A effectively overrides the mode-select sensor 35B.

Within the context of the system design shown in FIG. 1C, the state indication subsystem 34 performs the following functions: automatically monitors the state of operation of the system at each instant of time; and automatically produces visual indication (e.g. color-coded light) signals from the scanner housing designed to inform the user of the current state of operation of the system (e.g. "red" to indicate the bar code detection state, "yellow" to indicate the bar code reading state, and "green" to indicate the symbol character data transmission state). As will be described in greater detail hereinafter, such state indication signals provide the user with visual feedback on the states of operation of the system, thereby improving the intuitiveness and facility of operation of the system in diverse application environments.

Within the context of the system design shown in FIG. 1C, the system control subsystem 36 performs the following primary functions: (i) automatically receiving control activation signals $A_1$, $A_2$, $A_3$ and $A_4$; (ii) automatically generating enable signals $E_2$, $E_3$, $E_4$, $E_5$, $E_6$, and $E_7$; and (iii) automatically controlling the operation of the other subsystems in accordance with a system control program carried out by the system control subsystem 36 during the various modes of system operation.

In general, the geometrical and optical characteristics of laser scanning patterns generated by the laser-based bar code symbol detection subsystem 31 and the laser-based bar code symbol reading subsystem 32 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field spatially-overlaps the bar code symbol detection field to improve the scanning efficiency of the system.

Figure 26:
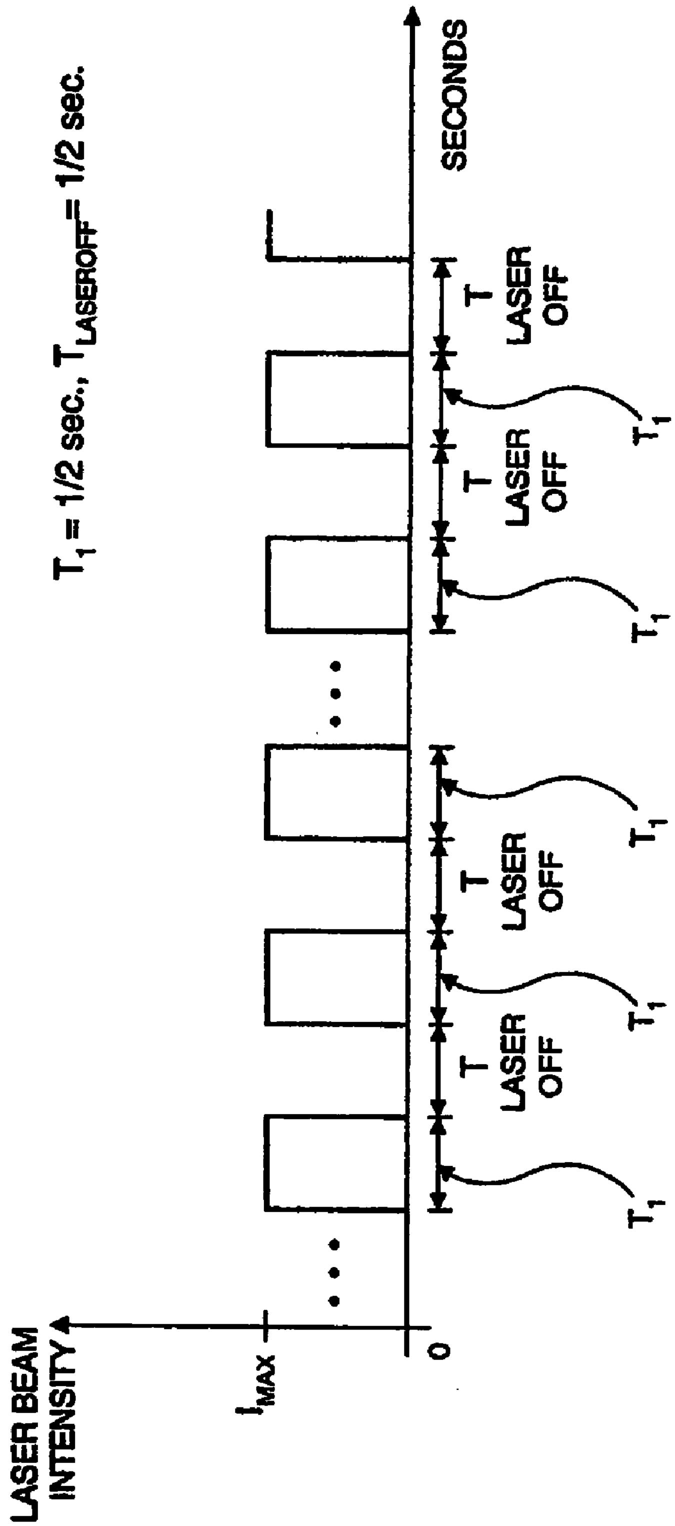
FIG. 26 is a schematic representation of the pulse characteristics of the laser beam produced from the automatically-activated laser scanning bar code symbol reading system of FIGS. 25A and 25B during its various modes of operation.

Initially, system control subsystem 36 provides enable signal $E_2=1$ to the laser-based bar code detection subsystem 31. This causes the laser-based bar code detection subsystem 31 to generate a pulsed laser scanning pattern of predetermined characteristics within the laser-based bar code detection field 37. As shown in FIG. 26, the pulse-on duration of the laser signal is about 50%, while the pulse-off duration is also about 50%. When the laser scanning pattern scans a bar code symbol on the detected object, scan data signals are produced therefrom, collected, detected and processed to determine whether a bar code symbol has been detected within the bar code symbol detection field 37. If the scanned bar code symbol is detected, then the system control subsystem 36 automatically generates enable signal $E_4=1$ so as to activate the bar code symbol reading subsystem 32. In response thereto, the laser-based bar code reading subsystem 32 automatically generates a visible laser scanning pattern within the laser-based bar code reading field 38, scans the detected bar code symbol disposed therewithin, collects scan data therefrom, decodes the detected bar code symbol, generates symbol character data representative of the decoded bar code symbol, and buffers the symbol character data in memory. If the detected bar code symbol is read within a predetermined period of time, and the manually-actuated data transmission switch 35A is depressed within a predetermined time frame established by the system control subsystem 36, then the system control subsystem 36 automatically activates the data transmission subsystem 33. In response thereto, the data transmission subsystem automatically transmits the produced/buffered symbol character data to the host system (to which the bar code symbol reader is connected), a data storage buffer (e.g. disposed in a portable data collection device connected to the bar code symbol reader), or other data storage/processing device.

By virtue of the novel system control architecture, the user is permitted to read bar code symbols in a highly intuitive manner, wherein bar code detection and bar code symbol reading are carried out in an automatic manner while data transmission of decoded symbol character data to the host device is enabled by manual-activation of a switch, button or like device located on the exterior of the hand-supportable scanner housing. In the preferred embodiment, a visual indicator is provided on the scanner housing for visually indicating that a bar code symbol has been successfully read in a fully-automatic manner, and that the system is ready for data transmission enablement to the host system or like device. When the visual indicator indicates that a bar code symbol is being read and decoded symbol character data is being generated, the user need only depress the data transmission enabling switch on the scanner housing to send the subsequently produced data to the host system or like device.

The structure and functionalities of the third general system design of FIG. 1C described above are shown in greater detail in the system embodiment of FIGS. 25A through 28, wherein there is no provision for automatic object detection within the system, but simply a continuously-operating bar code symbol presence detection subsystem is provided for automatic detection of bar codes within the scanning field of the system.

Figure 25B:
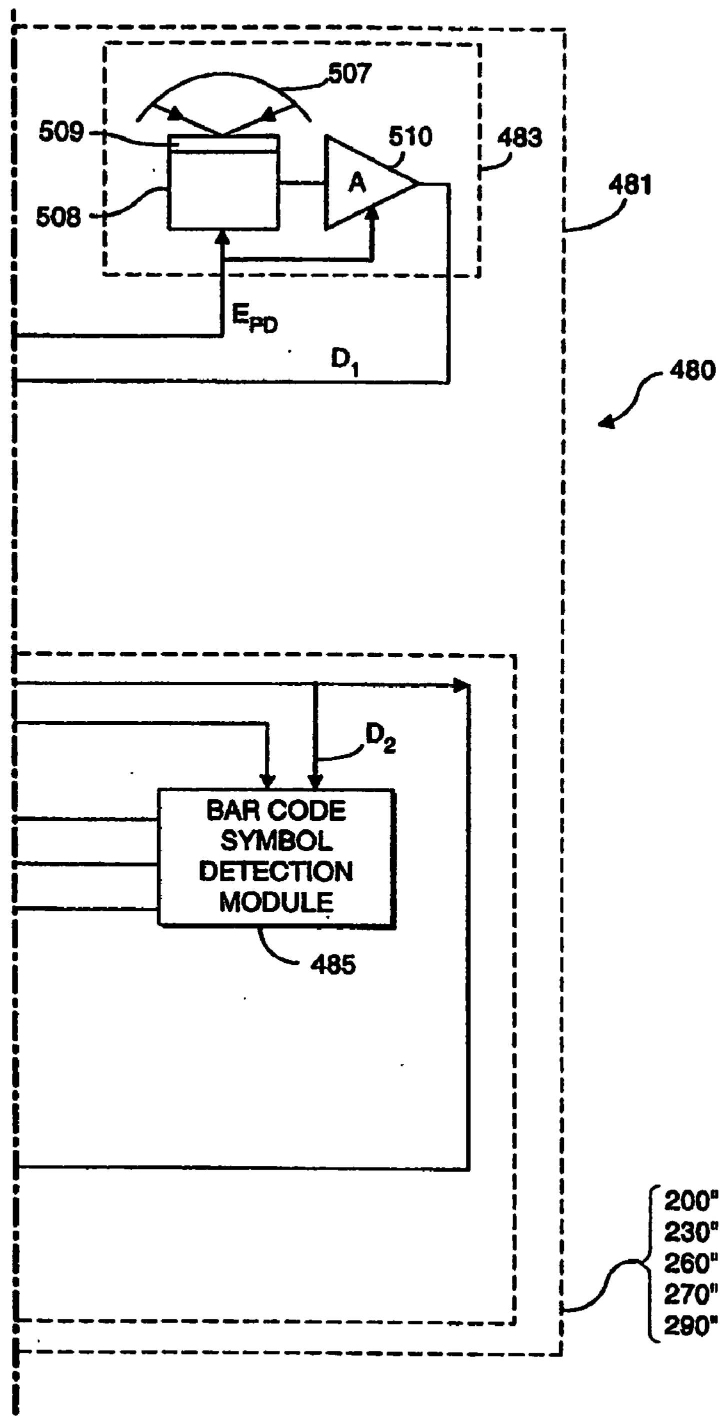

The laser-based bar code symbol detection subsystem 31 is realized from various electro-optical and electro-mechanical components assembled together, as shown in FIGS. 25A and 25B, so as to enable automatic detection of bar code symbols on detected objects within the laser-based bar code detection field of the system. Also, the laser-based bar code symbol reading subsystem is realized from various electro-optical and electro-mechanical components assembled together as shown in FIGS. 25A and 25B, so as to enable automatic reading of detected bar code symbols within the laser-based bar code reading field of the system. As will be described in greater detail hereinafter, this system design requires an even simpler control subsystem architecture than system designs employing automatic object detection. However, this system design requires that a low-power (non-visible) laser beam be continuously or periodically generated within the bar code symbol detection field during system operation, thus consuming electrical power which can be significant in portable and mobile scanning applications where battery power is used.

While each of the three generalized bar code symbol reading systems described hereinabove can be connected to its base unit, host computer, data processor, data storage device, or like device by way of wires wrapped in a flexible cord-like structure, it will be preferred in many embodiments to connect the bar code symbol reading system of the present invention to its base unit, host computer, data processor or data storage device or like device by way of wireless data communication link. In general, the wireless data communication link can be realized in a variety of different ways, namely: using the two-way RF communication link of the type disclosed in U.S. Pat. Nos. 4,460,120; 5,321,246 and 5,142,550 or using the one-way data transmission link as disclosed in U.S. Pat. No. 5,808,285 to Rockstein, et al; etc. Each of these U.S. Patents are incorporated herein by reference in its entirety.

First Illustrative Embodiment of Automatically-Activated Bar Code Symbol Reading System of the Present Invention As shown in FIGS. 2A to 2H, the bar code symbol reading system of the first illustrative embodiment 40 comprises an automatically-activated portable bar code symbol reading device 41 operably associated with a base unit 42 having a scanner support stand 43. Bar code symbol reading device 41 is operably connected with its the base unit 42 by way of a one-way or two-way electromagnetic link established between bar code symbol reading device 41 and its mated base unit 42. After each successful reading of a bar code symbol by the bar code symbol reading device 41, symbol character data (representative of the read bar code symbol) is generated, and if timely activated, then subsequently produces symbol character data collected from the same read bar code symbol which is automatically transmitted to the host device. Operable interconnection between the base unit 42 and a host system (e.g. electronic cash register system, data collection device, etc.) 45 is achieved by a flexible multiwire communications cable 46 extending from the base unit and plugged directly into the said data-input communications port of the host computer system 45.

In the illustrative embodiment, electrical power from a low voltage direct current (DC) power supply (not shown) is provided to the base unit by way of a flexible power cable 47. Notably, this DC power supply can be realized in host computer system 45 or as a separate DC power supply adapter pluggable into a conventional 3-prong electrical socket. As will be described in greater detail hereinafter, a rechargeable battery power supply unit 55 is contained within bar code symbol reading device 41 in order to energize the electrical and electro-optical components within the device.

Figure 2A:
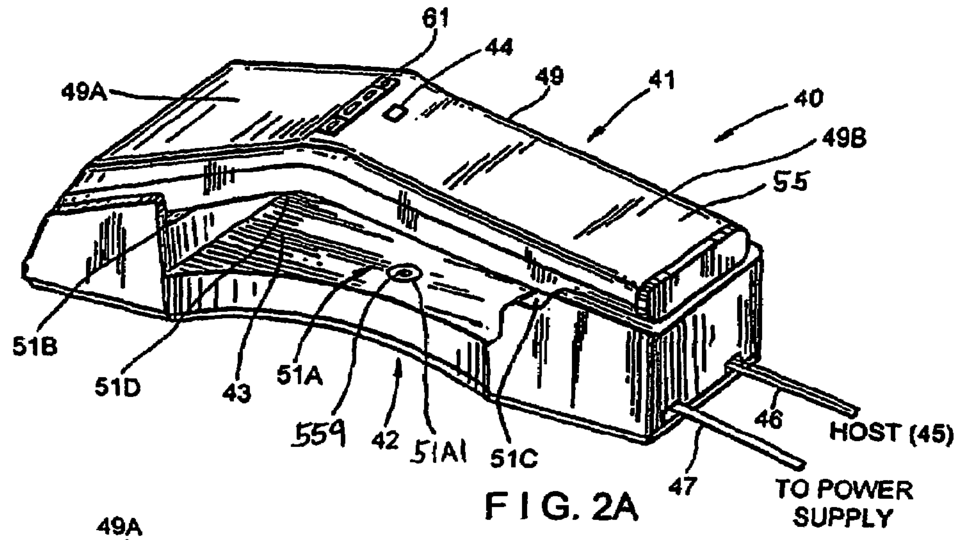
FIG. 2A is a perspective view of the first illustrative embodiment of the automatically-activated bar code symbol reading device of the present invention, shown supported within the scanner support stand portion of its matching base unit, for automatic hands-free operation at a POS-station.
Figure 2B:
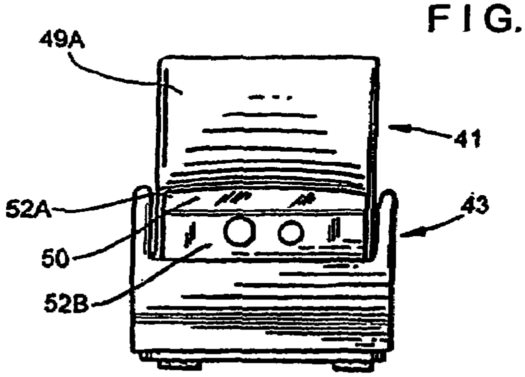
FIG. 2B is an elevated front view of the automatically-activated bar code symbol reading device of FIG. 2A, shown supported within the scanner support stand portion of its base unit for automatic hands-free operation.

As illustrated in FIGS. 2A and 2B, scanner support stand 43 is particularly adapted for receiving and supporting portable bar code symbol reading device 41 in a selected position without user support, thus providing a stationary, automatic hands-free mode of operation. In general, portable bar code reading device 41 includes an ultra-light weight hand-supportable housing 49 having a contoured head portion 49A and a handle portion 49B. As will be described in greater detail hereinafter, head portion 49A encloses electro-optical components which are used to generate and project a visible laser beam through light transmissive window 50 in housing head portion 49A, and to repeatedly scan the projected laser beam across its bar code detecting scanning field 10 and bar code reading field 11, both defined external to the hand-supportable housing.

As illustrated in FIGS. 2A and 2B, the scanner support stand portion 43 includes a support frame which comprises a base portion 51A, a head portion support structure 51B, handle portion support structure 51C and a finger accommodating recess 51D. As shown, base portion 51A has a longitudinal extent and is adapted for selective positioning with respect to a support surface, e.g. countertop surface, counter wall surface, etc. An aperture 51A1 is formed in the base portion 51A to allow an piezo-electric transducer 559 to generate acoustical acknowledgement signals therethrough upon successful data transmission to the base unit. Head portion support structure 51B is connected to base portion 51A, for receiving and supporting the head portion of bar code symbol reading device 41. Similarly, handle portion support structure 51C is connected to base portion 51A, for receiving and supporting the handle portion of the code symbol reading device. In order that the user's hand can completely grasp the handle portion of the hand-supportable bar code reading device, (i.e. prior to removing it off and away from the scanner support stand), finger-accommodating recess 51D is disposed between head and handle portion support structures 51B and 51C and base portion 51A of the support frame. In this way, finger-accommodating recess 51D is laterally accessible so that when the head and handle portions 49A and 49B are received within and supported by head portion support structure 51B and handle portion support structure 51C, respectively, the fingers of a user's hand can be easily inserted through finger accommodating recess 51D and completely encircle the handle portion of the hand-supportable device.

Figure 2C:
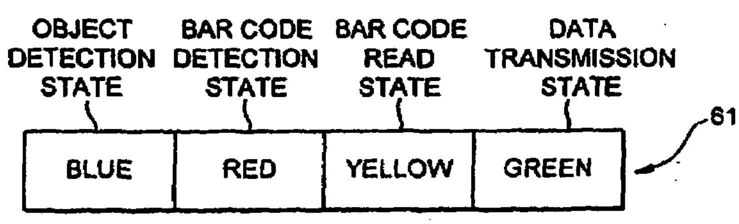
FIG. 2C is a schematic diagram of the color-coded state indicating light sources provided on the exterior of the housing of the automatically-activated bar code symbol reading device of FIGS. 2A and 2B, as well as all other automatically-activated bar code symbol reading devices of the present invention.
Figure 2D:
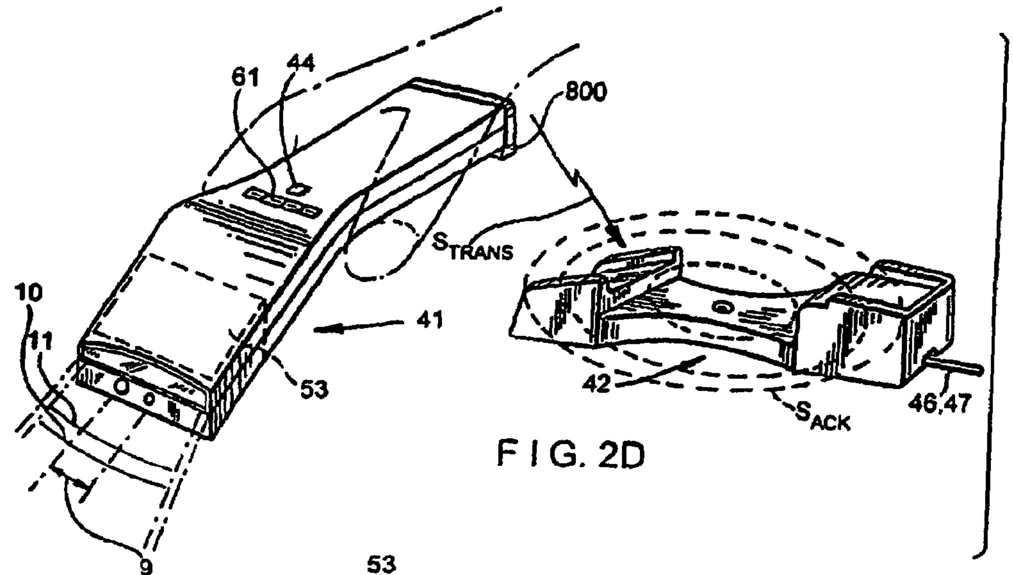
FIG. 2D is a perspective view of the automatically-activated bar code symbol reading device of FIG. 1A, shown being used in the automatic hands-on mode of operation.
Figure 2E:
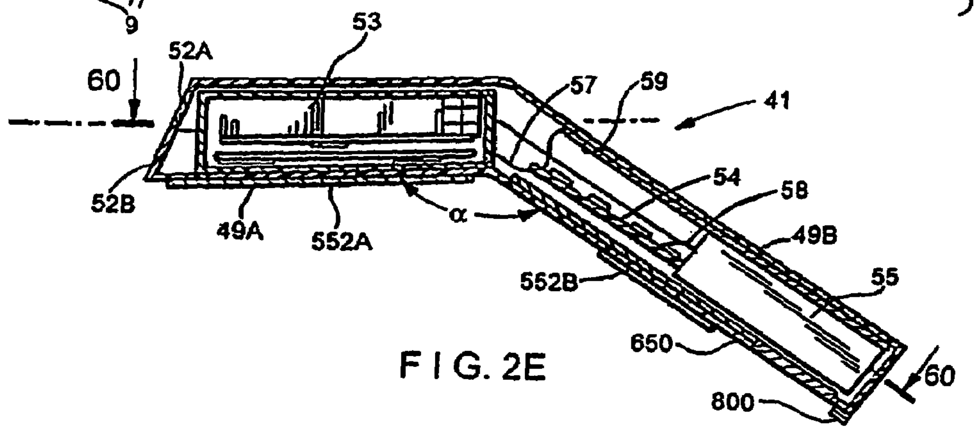
FIG. 2E is an elevated, cross-sectional side view taken along the longitudinal extent of the automatically-activated bar code symbol reading device of FIGS. 2A and 2B, showing the various components contained therein.

As shown in FIG. 2E, bar code symbol reading device 41 includes a mode-selector sensor 800 (e.g. electronic of electrical/mechanical sensor) located on the end portion of the hand-supportable housing. When the housing is placed in its stand, the mode select sensor 800 automatically senses the stand (or countertop surface) and generates a data transmission control activation signal $A_4=1$, which overrides the data transmission activation switch 44 on the housing during the hands-free mode of operation when the bar code symbol reading device is picked up out of the housing, the mode-select sensor 800 generates $A_4=0$, which is overridden by the date transmission activation switch 44 in the hands-on mode of operation.

As illustrated in FIGS. 2E in particular, head portion 49A continuously extends into contoured handle portion 49B at an obtuse angle which, in the illustrative embodiment, is about 146 degrees. It is understood, however, that in other embodiments the obtuse angle may be in the range of about 135 to about 180 degrees. As this ergonomic housing design is sculptured (i.e. form-fitted) to the human hand, automatic hands-on scanning is rendered as easy and effortless as waving one's hand.

As illustrated in FIGS. 2A through 2D, the head portion of housing 49A has a light transmission aperture 50 formed in upper portion of the front panel 52A, to permit visible laser light to exit and enter the housing, as will be described in greater detail hereinafter. The lower portion of front panel 52B is optically opaque, as are all other surfaces of the hand supportable housing.

Figure 2F:
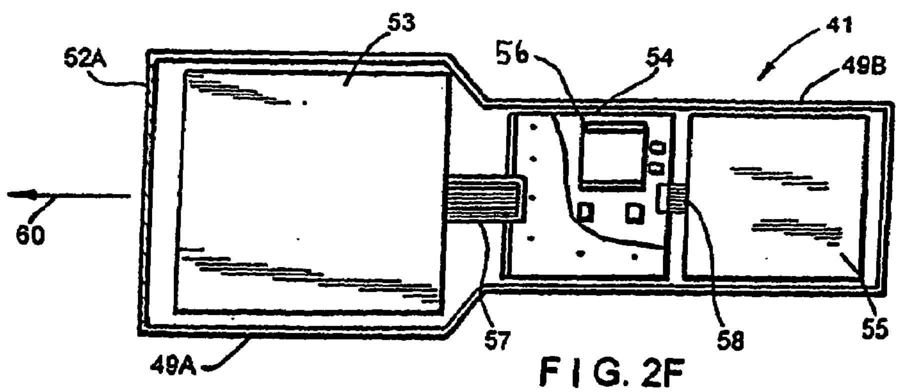
FIG. 2F is a cross-sectional plan view of the automatically-activated bar code symbol reading device of FIGS. 2A and 2B taken along line 2F—2F of FIG. 2E, showing the various components contained therein.
Figure 2G:
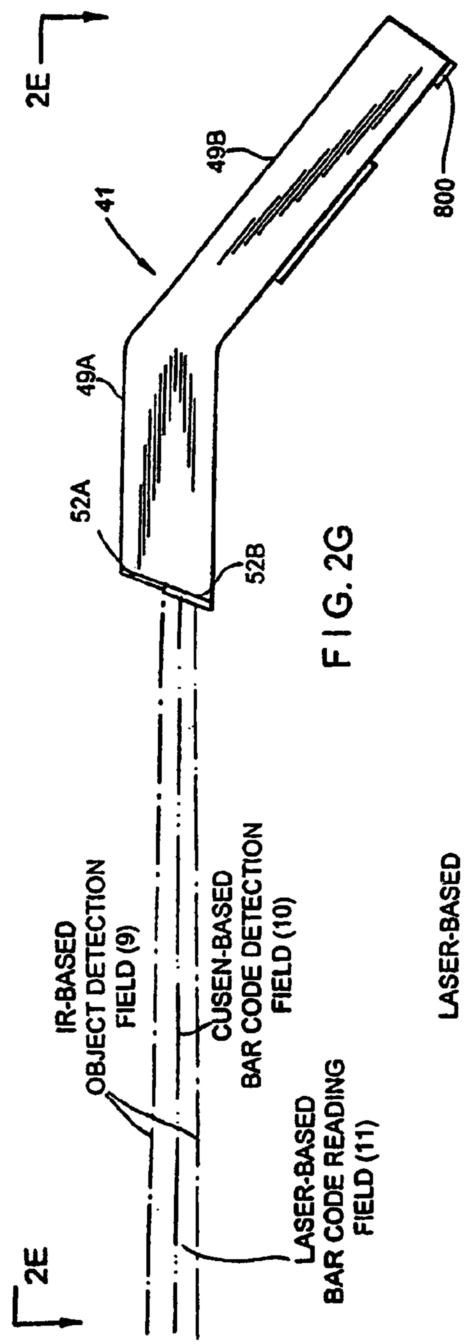
FIG. 2G is an elevated side view of the automatically-activated bar code symbol reading device of FIGS. 2A and 2B, illustrating in greater detail the spatial relationship between the IR-based object detection field and the laser-based bar code symbol detection and reading fields of the device shown in FIG. 2A.

As best shown in FIGS. 2E and 2F, an automatically-activated laser-scanning bar code symbol reading engine 53 is securely mounted within the head portion of hand-supportable housing 49A, while a printed circuit (PC) board 54 and a rechargeable battery supply unit 55 are mounted within the handle portion of the hand-supportable housing portion 49B. A data packet transmission circuit 56 is realized on PC board 54 in housing 49B and is operably connected to bar code symbol reading engine 53 contained therein by way of a first flexible wire harness 57. Electrical power is supplied from rechargeable battery 55 to the data packet transmission circuit 56 and the bar code symbol reading engine 53 by way of a second flexible wire harness 58. As shown, a transmitting antenna 59 is operably connected to the data packet transmission circuit 56 on PC board 54 and is mounted within hand-supportable housing portion 49B for transmission of a data packet modulated RF carrier signal to a base unit associated with the automatic bar code symbol reading device. The structure and the functionalities of the different types of automatic bar code symbol reading engines that can be incorporated into the device of FIG. 2A will be described in greater detail hereinafter.

Figure 2H:
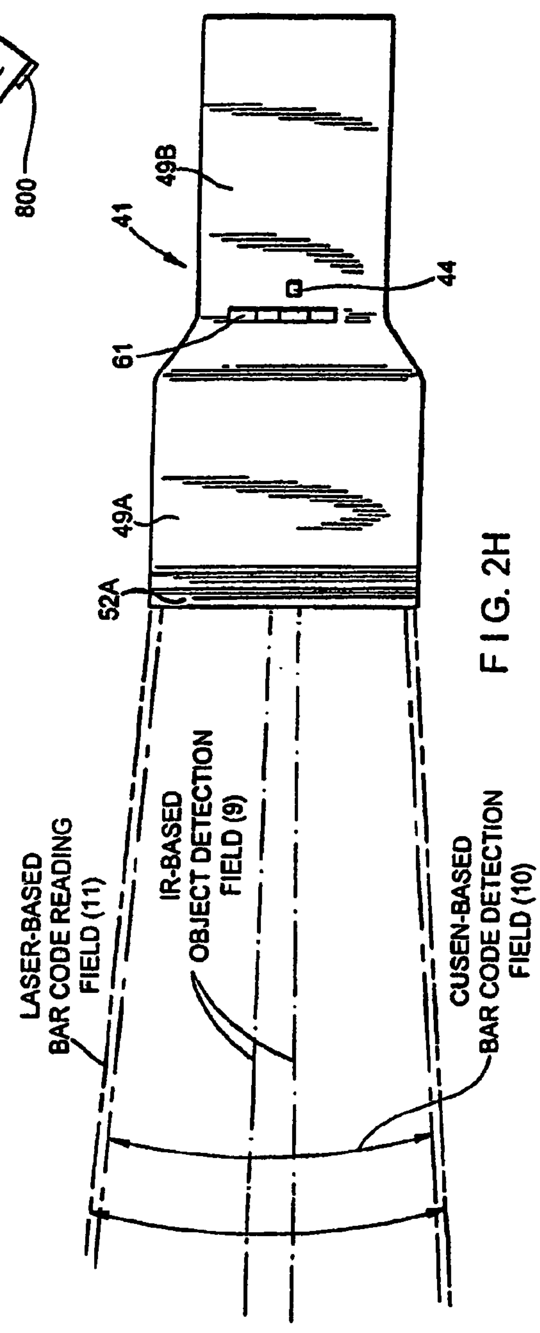
FIG. 2H is a plan view of the automatically-activated bar code symbol reading device of FIGS. 2A and 2B.

In general, any of the bar code symbol reading engines disclosed in FIGS. 9A through 9D, 10A through 10D, 11A, 13A, and 14A can be incorporated within the hand-supportable housing of the bar code symbol reading system 40 shown in FIGS. 2A through 2H, with little or no modifications to the form factor thereof. When incorporated into the hand-supportable housing 49 as shown, each of these laser scanning engines, indicated by reference numeral 53 in FIGS. 2A–2H, will enable the automatic generation of: an IR-based object detection field 9 projected along the longitudinal scanning axis 60 of the device housing in response to the powering-up of the engine; a laser-based bar code symbol detection field 10, in response to automatic detection of objects within the IR-based object detection field 9; and a laser-based bar code symbol reading field 11 in response to automatic detection of bar code symbols within the laser-based bar code symbol detection field 10 consistent with the structure and functions depicted in the schematic diagram of FIG. 1A. During system operations, the system states are visually indicated by the state indicator light strip 61 mounted on the exterior of the scanner housing, as shown in FIGS. 2A and 2H. As will be described in greater detail hereinafter, laser scanning bar code symbol reading engine 53 has a similar system architecture schematically illustrated in FIGS. 15 through 19. The system control process underlying this generalized system design is illustrated in the flow chart set forth in FIGS. 20A1 through 20E. The states of operation of this generalized system design are described in the state transition diagram of FIG. 21.

Figure 2I:
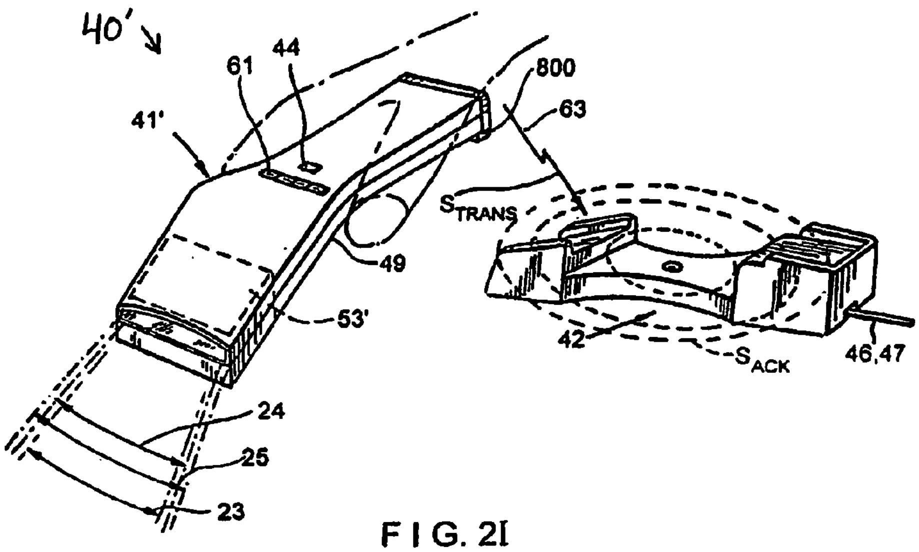
FIG. 2I is a perspective view of the second automatically-activated bar code symbol reading device of the present invention, wherein a laser-based object detection field and laser-based bar code symbol detection and reading field are provided for automatically detecting objects and reading bar code symbols, respectively while the device is operated in its hands-on and hands-free modes of operation.

Second Illustrative Embodiment of Automatically-Activated Bar Code Symbol Reading System of the Present Invention In FIG. 2I, the second illustrative embodiment of the automatically-activated bar code symbol reading system hereof 40' is shown comprising a hand-supportable automatically-activated bar code symbol reading device 41' and a base unit 42 in communication therewith achieved using a one-way or two way data communication link 63. As shown, this automatically-activated bar code symbol reading system 40' is similar to bar code symbol reading system 40 shown in FIGS. 2A through 2H, in all but a few respects. In particular, the bar code symbol reading device of FIG. 21 may incorporate within its hand-supportable housing 49, any of the laser scanning engines disclosed in FIGS. 9E, 10E, 11B, 13B, and 14B, with little or no modifications to the form factor thereof. When incorporated into hand-supportable housing 49 as shown in FIG. 2I, each of these laser scanning engines indicated by reference numeral 53', will enable automatic generation of: a low-power laser-based object detection field 23 in response to the powering-up of the laser scanning engine; a laser-based bar code symbol detection field 24 generated in response to automatic object detection within the laser-based object detection field 23; and a laser-based bar code symbol reading field 25 generated in response to automatic bar code symbol detection within the laser-based bar code symbol detection field 24 consistent with the structure and functions depicted in the schematic diagram of FIG. 1B. As will be described in greater detail hereinafter, each of these laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Figure 2J:
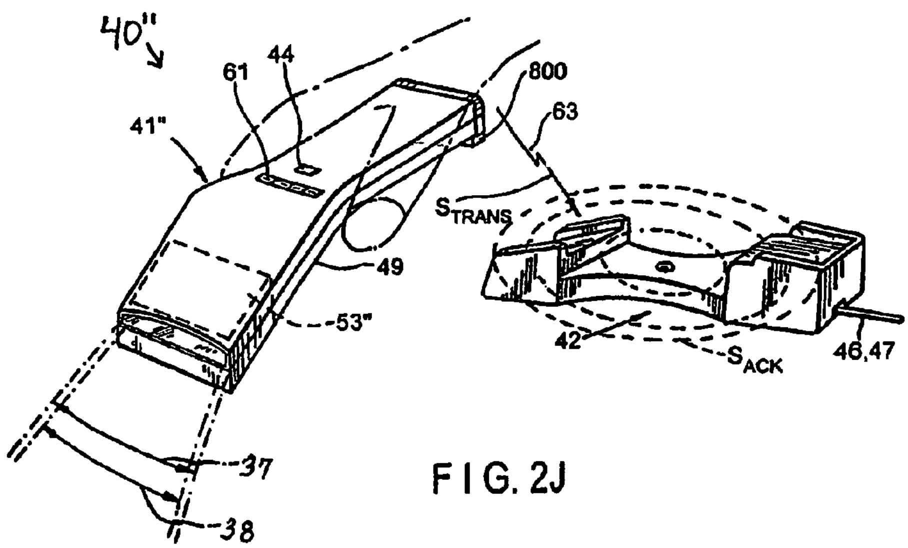
FIG. 2J is a perspective view of the third automatically-activated bar code symbol reading device of the present invention, wherein a laser-based bar code detection field and laser-based bar code symbol detection and reading field are provided for automatically detecting and reading bar code symbols while the device is operated in its hands-on and hands-free modes of operation.

Third Illustrative Embodiment of Automatically-Activated Bar Code Symbol Reading System of the Present Invention In FIG. 2J, the third illustrative embodiment of the automatically-activated bar code symbol reading system hereof 40" is shown comprising a hand-supportable automatically-activated bar code symbol reading device 41" and a base unit in communication therewith achieved using a one-way or two way data communication link 63. As shown, this automatically-activated bar code symbol reading system 40" is similar to the bar code symbol reading system 40 shown in FIGS. 2A through 2H, in all but a few respects. In particular, any of the laser scanning engines disclosed in FIGS. 9F, 10F, 11C, 13C, and 14C can be incorporated into the bar code symbol reading device of FIG. 2J, with little or no modifications to the form factor thereof.

When incorporated into hand-supportable housing 49 each of these laser scanning engines indicated by 53" in FIG. 2J, will enable automatic generation of: a laser-based bar code symbol detection field 37 in response to the powering-up of the laser scanning engine, and a laser-based bar code symbol reading field 38 in response to automatic bar code symbol detection within the laser-based bar code symbol detection field 37, consistent with the structures and functions depicted in the schematic diagram of FIG. 1C. In this illustrative embodiment, there is no form of automatic object detection provided with the bar code symbol reading device 41", as it is presumed that the bar code symbol reading device is not to be used in portable scanning applications, remote from its base unit or host system, but rather is tethered to its host system (e.g. cash register/computer) by way of a flexible cord carrying both data and power lines between the bar code symbol reading device and the host computer. As will be described in greater detail hereinafter, each of these laser scanning bar code symbol reading engines have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

Figure 3A:
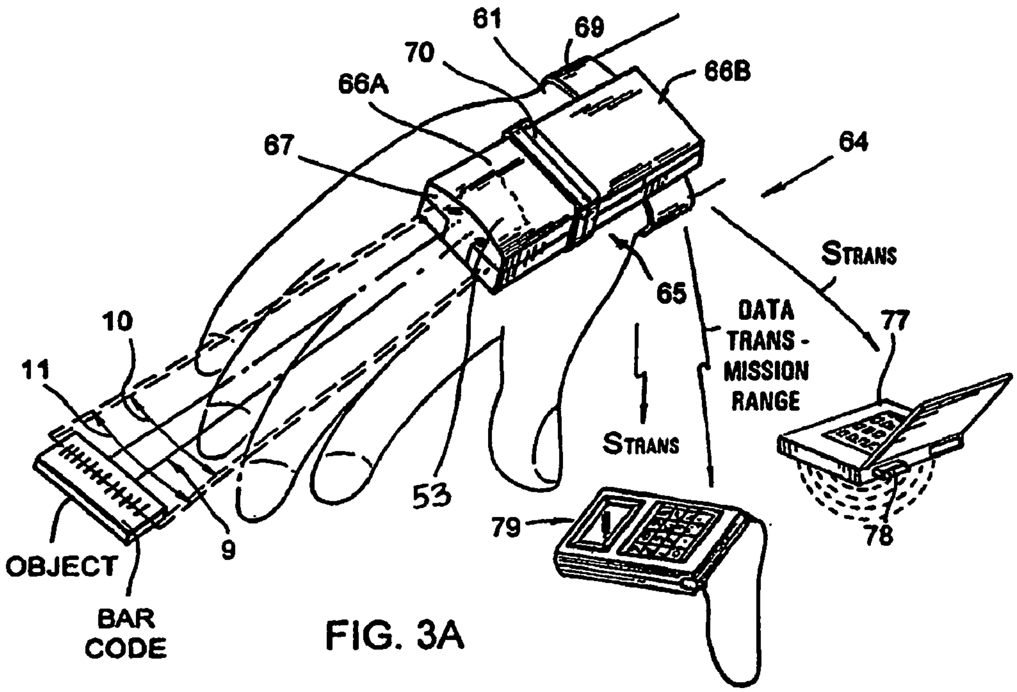
FIG. 3A is a perspective view of the fourth illustrative embodiment of the automatically-activated bar code symbol reading device of the present invention, shown mounted on the wrist of an operator with its IR-based object detection field and its laser-based bar code symbol detection and reading field each extending along the pointing direction of the operator's hand during its mode of automatic hands-free operation.
Figure 3B:
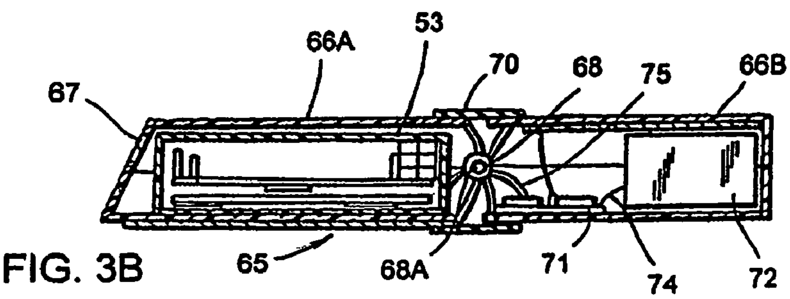
FIG. 3B is an elevated, cross-sectional side view of the automatically-activated bar code symbol reading device of FIG. 3A, taken along the longitudinal extent thereof, while configured in its reading configuration, showing the various components contained therein.
Figure 3C:
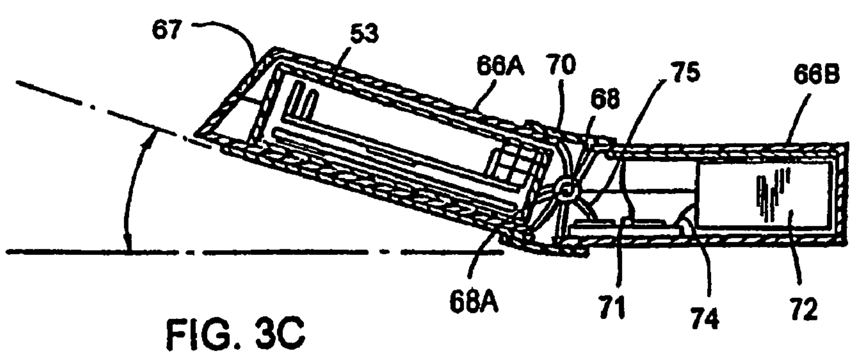
FIG. 3C is an elevated, cross-sectional side view of the automatically-activated bar code symbol reading device of FIG. 3A, taken along the longitudinal extent thereof, while configured in its non-reading configuration, showing the various components contained therein.

Fourth Illustrative Embodiment of Automatically-Activated Bar Code Symbol Reading System of the Present Invention In FIGS. 3A to 3C, the fourth illustrative embodiment of the automatically-activated bar code symbol reading system hereof 64 is shown comprising: a wrist-mounted automatically-activated bar code symbol reading device 65 including a wrist-mountable housing having a head portion 66A with a light transmission window 67, and a tail portion 66B that is hingedly connected to the head portion 66A by way of a hinge mechanism 68. As shown, housing tail portion 66B is mountable to the wrist of its user by way of a wrist band or strap 69 that may be made from one or more different types of material. Also, an elastic gasket 70 is disposed about the physical interface of the housing head portion 66A and the housing tail portion 66B in order to seal off the housing interior from environmental debris, such as dust, moisture and the like.

As shown in FIGS. 3B and 3C, an automatically-activated bar code symbol reading engine 53 is mounted within the head portion of the housing 66A, whereas a small PC board 71 and a miniature rechargeable battery supply unit 72 are mounted within the tail portion of the housing 66B. The data packet transmission circuit used in the bar code symbol reading system 65 is realized on PC board 71, shown in FIGS. 3B and 3C. Electrical power is provided from the battery supply unit 72 to PC board 71 by way of a first flexible wire harness 74, and from PC board 71 to bar code symbol reading engine 53 by way of a second flexible wire harness 75, as shown.

In order to selectively produce a data transmission control activation signal from bar code symbol reading engine 53, a rotatable-type data transmission (activation) switch 68A associated with hinge mechanism 68 is connected in series with the electrical power lines extending along the second wire harness 75. In this way, when housing head portion 66A and housing tail portion 66B are both configured to extend in the same plane as shown in FIG. 3A, data transmission switch 68A is closed and electrical power is permitted to flow so as to produce a data transmission control activation signal (i.e. $A_4=1$) for supply to circuitry within the bar code symbol reading engine 53. When the housing head portion and housing tail portion are configured in slightly different planes, as shown in FIG. 3C, then data transmission switch 68A is opened and the data transmission control activation signal ($A_4=1$) is not produced and provides circuitry within the bar code symbol reading engine.

As will be described in greater detail hereinafter, after the bar code symbol reading device automatically reads a bar code symbol, and generates symbol character data representative thereof and driving the bar code read state indicator light, the user of the device is provided a time frame in which to manually activate the data transmission switch 68A and enable the transmission of subsequently produced symbol character from the read bar code symbol, to the host system.

In general, bar code symbol reading device 65 can be used in conjunction with any one of the base units of the present invention. However, in the preferred embodiment shown in FIG. 3A, bar code symbol reading device 65 is used in conjunction with a portable computer system 77 i.e. the host computer systems, equipped with PCMCIA-card base unit 78, as well as with a hand-held portable data collection device 79. As will be described in greater detail hereinafter, both the PCMCIA-card base unit 78 as well as the data collection device 79 are capable of receiving data packets transmitted from device 65 upon the successful reading of each bar code symbol. The method of data packet transmission and reception between bar code symbol reading device 65 and base units 78 and 79 will be described in detail hereinafter.

In general, any of the laser scanning bar code symbol reading engines disclosed in FIGS. 9A through 9D, 10A through 10D, 11A, 13A, and 14A can be incorporated within the wrist-supportable housing 66A of the bar code symbol reading system shown in FIGS. 3A through 3C, with little or no modifications to the form factor thereof. When incorporated into wrist-supportable housing 66A as shown, each of these laser scanning engines, indicated by reference numeral 53 in FIGS. 3A–3C, will enable the automatic generation of: an IR-based object detection field 9 in response to powering-up of the laser scanning engine; a laser-based bar code-symbol detection field 10 in response to automatic detection of objects within the IR-based object detection field 9; and a laser-based bar code symbol reading field 11 in response to automatic detection of bar code symbols within the laser-based bar code symbol detection field 10, consistent with the structure and function depicted in the schematic diagram of FIG. 1A. As will be described in greater detail hereinafter, each of these laser scanning bar code symbol reading engines have the same general system architecture schematically illustrated in FIGS. 15A1 through 16. The system control process underlying this generalized system design is illustrated in the flow chart set forth in FIGS. 20A1 through 20E. The states of operation of this generalized system design are described in the state transition diagram of FIG. 21.

Figure 3D:
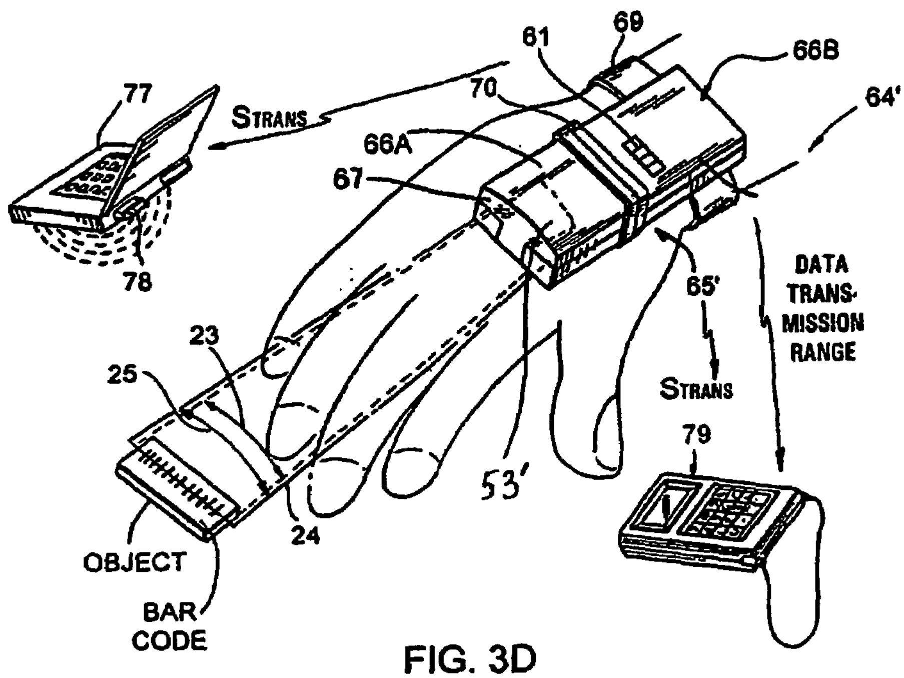
FIG. 3D is a perspective view of the fifth illustrative embodiment of the automatically-activated bar code symbol reading device of the present invention, shown mounted on the wrist of an operator with its laser-based object detection field and its laser-based bar code symbol detection and reading field each extending along the pointing direction of the operator's hand during its mode of automatic hands-free operation.

Fifth Illustrative Embodiment of Automatically-Activated Bar Code Symbol Reading System of the Present Invention In FIG. 3D, the fifth illustrative embodiment of the automatically-activated bar code symbol reading system hereof 64' is shown comprising a wrist-supportable automatically-activated bar code symbol reading device 65' and a portable base unit 77 and 79 in communication therewith achieved using a one-way (or two way) data communication link as the application may require. As shown, this automatically-activated bar code symbol reading system 64' is similar to the bar code symbol reading system 64 shown in FIGS. 3A through 3C, in all but a few respects. In particular, any of the laser scanning engines disclosed in FIGS. 9E, 10E, 11B, 13B, and 14B can be incorporated into the hand-operated housing of the bar code reading device shown in FIG. 3D, with little or no modifications to the form factor thereof.

When incorporated into wrist-supportable housing 66A as shown, each of these laser scanning engines, indicated by reference number 53' in FIG. 3D, enable automatic generation of: a low-power laser-based object detection field 23 in response to powering-up the laser scanning engine; a laser-based bar code symbol detection field 24 in response to automatic object detection within the laser-based object detection field 23; and a laser-based bar code symbol reading field 25 in response to automatic bar code symbol detection within the laser-based bar code symbol detection field 24, consistent with the structures and function depicted in the schematic illustration of FIG. 1B. As will be described in greater detail hereinafter, each of these laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Figure 3E:
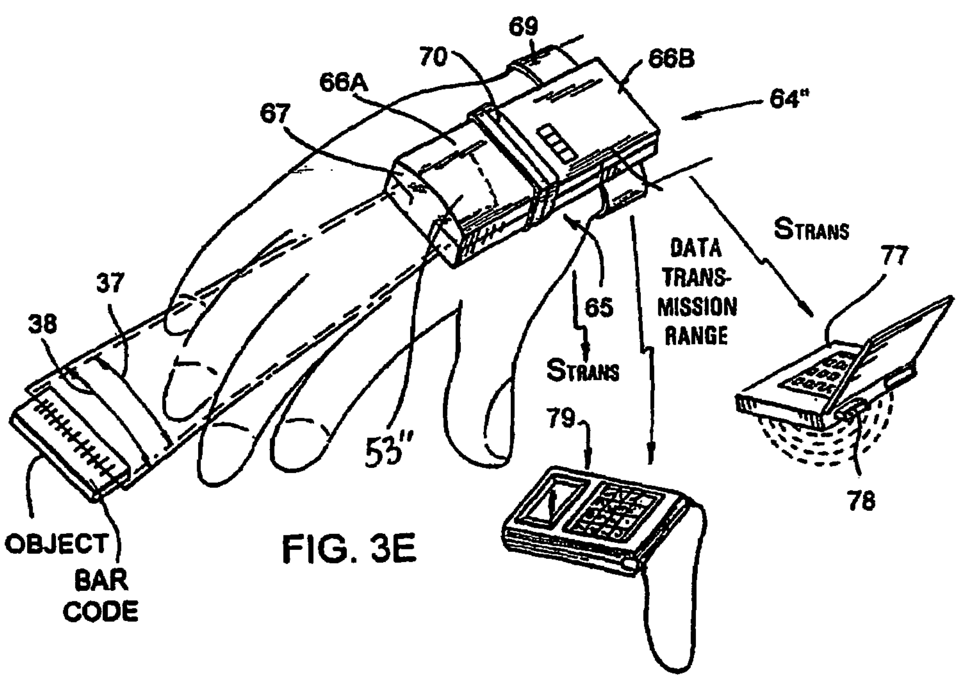
FIG. 3E is a perspective view of the sixth illustrative embodiment of the automatically-activated bar code symbol reading device of the present invention, shown mounted on the wrist of an operator with its laser-based bar code symbol detection field and laser-based bar code symbol reading field each extending along the pointing direction of the operator's hand during automatic hands-free operation.

Sixth Illustrative Embodiment of Automatically-Activated Bar Code Symbol Reading System of the Present Invention In FIG. 3E, the sixth illustrative embodiment of the automatically-activated bar code symbol reading system hereof 64" is shown comprising a wrist-supportable automatically-activated bar code symbol reading device 65" and a base unit 77 and 79 in communication therewith achieved using a one-way (or two way) data communication link as the application demands. As shown, this automatically-activated bar code symbol reading system 64" is similar to the bar code symbol reading system 64 shown in FIGS. 3A through 3C, in all but a few respects. The bar code symbol reading device of FIG. 3E can incorporate within its hand-supportable housing 66A, any of the laser scanning engines disclosed in FIGS. 9F, 10F, 11C, 13C, and 14C, with little or no modification to the form factor thereof. When incorporated into hand-supportable housing 66A as shown, each of these laser scanning engines, indicated by reference number 53" in FIG. 3F, enable automatic generation of: a laser-based bar code symbol detection field 37 in response to powering-up of the laser scanning engine; and a laser-based bar code symbol reading field 37 in response to automatic bar code symbol detection within the laser-based bar code symbol detection field 37, consistent with the schematic diagram of FIG. 1C.

In this illustrative embodiment, there is no form of automatic object detection provided with the bar code symbol reading device 65", as it is presumed that the bar code symbol reading device is not to be used in portable scanning applications, remote from its base unit host system (e.g. cash register/computer), but rather is tethered to its host system by way of a flexible cord carrying both data and power lines between the bar code symbol reading device and the host computer.

As will be described in greater detail hereinafter, each of the laser scanning bar code symbol reading engines shown in FIGS. 9F, 10F, 11C, 13C and 14C have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

Seventh Illustrative Embodiment of Automatically-Activated Bar Code Symbol Reading System of the Present Invention In FIGS. 4A through 4D, the seventh illustrative embodiment of the bar code symbol reading system hereof 80 comprises: a hand/desktop supportable laser scanning bar code symbol reading device 81 having a compact hand-supportable housing 82 with a planar support surface 82A designed for sliding freely over a bar code symbol 83 printed on a sheet of paper disposed on a desktop or like surface; and a base unit 84 in communication therewith achieved using a one-way or two way data communication link; a bar code symbol printing engine 85 operably connected to the base unit 84. As shown, system 80 is interfaced with a host computer system (e.g. desk-top computer) 86 by way of a serial data communications cable 87 known in the art.

Figure 4A:
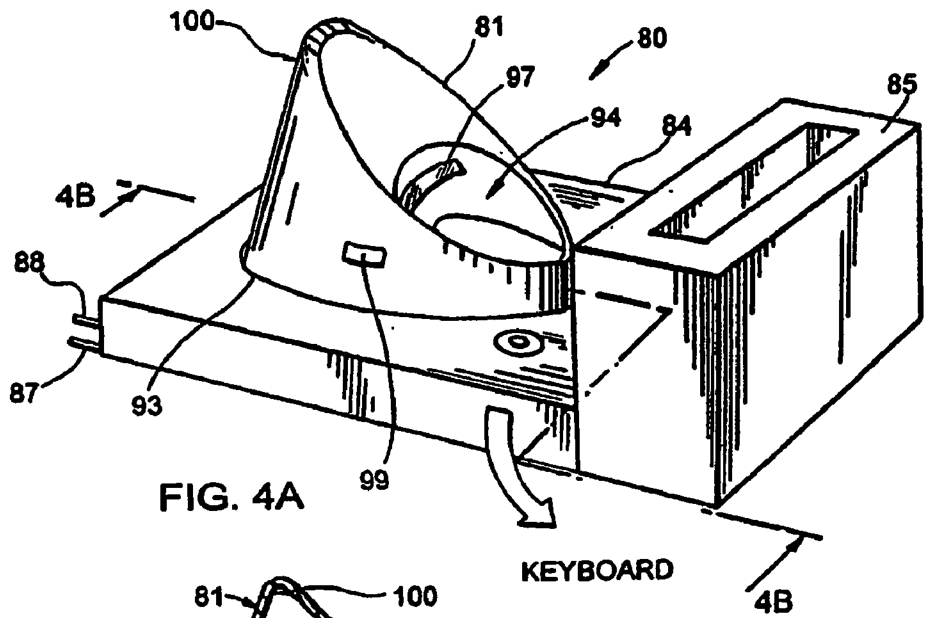
FIG. 4A is a perspective view of the seventh illustrative embodiment of the automatic bar code symbol reading device of the present invention, shown supported in its rechargeable base unit, equipped with a bar code symbol printing engine connected thereto, and having an IR-based object detection field and laser-based bar code symbol detection and reading field.
Figure 4B:
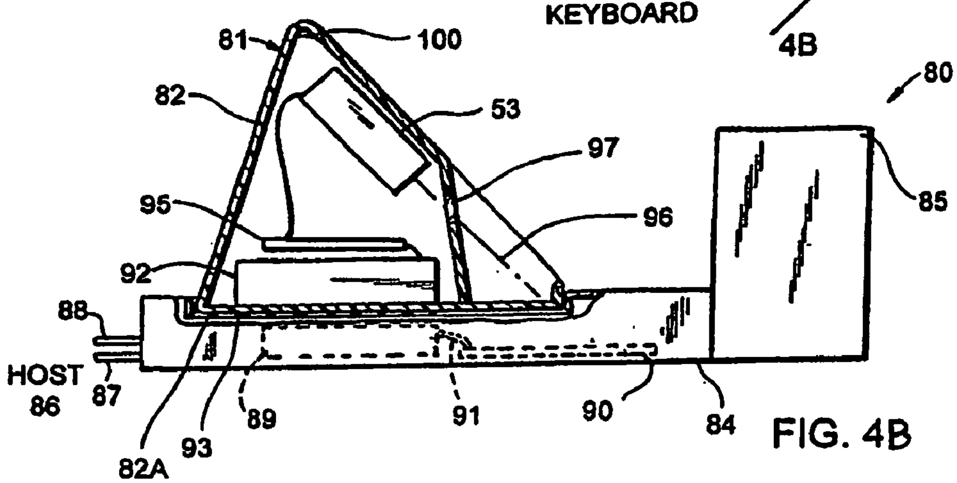
FIG. 4B is a cross-sectional view of the seventh illustrative embodiment of the bar code symbol reading device, taken along line 4B—4B of FIG. 4A, showing the device resting in its base unit during a battery recharging operation.

As shown in FIGS. 4A and 4B, an electrical power signal is provided to the base unit 84 by way of power cable 88, and is supplied to a primary transformer 89, by way of PC board 90 and wires 91. The function of primary transformer (inductive coil) 89 is to inductively transfer electrical power to a rechargeable battery 92 contained within the compact housing of the bar code reading device 81 when the base portion thereof is placed within matched recess 93 formed in the top portion of the housing of the base unit. Bar code symbol printing engine 85 is provided so that the user can easily print bar code symbols on adhesive labels or the like, as desired, using a conventional bar code application program executed by the processor in the host computer system and a suitable print driver program executed by the processor within the base unit. The internal structure and functionalities of base unit 84 will be described in greater detail hereinafter.

Figure 4C:
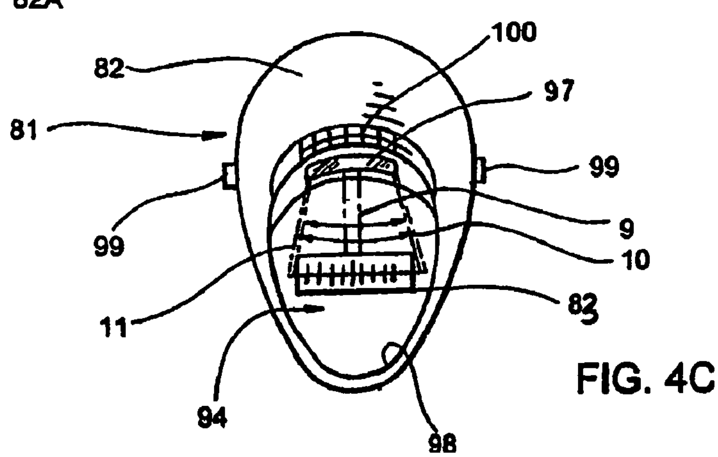
FIG. 4C is a plan view of the seventh illustrative embodiment of the bar code symbol reading device of the present invention, shown reading a bar code symbol printed on a sheet of paper.
Figure 4D:
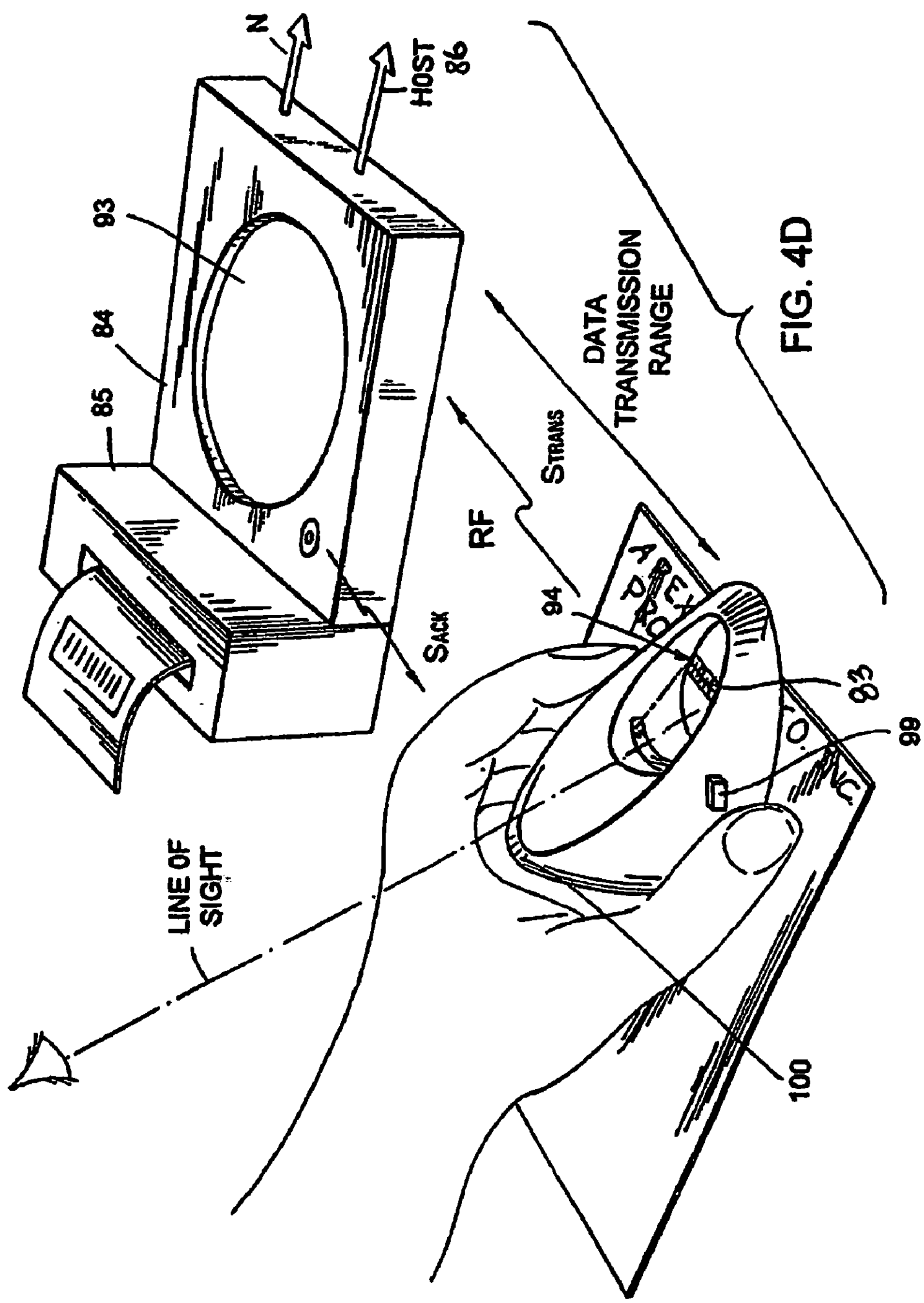
FIG. 4D is a perspective view of the seventh illustrative embodiment of the bar code symbol reading device of the present invention, shown reading a bar code symbol printed on a sheet of paper while in proximity to its mated base unit.

As shown in FIG. 4B, the compact housing 82 of bar code symbol reading device 81 has a wedge-like geometry when observed from its side view and an oval-like geometry when observed along its plan view. As shown in FIGS. 4A to 4D, a large eccentrically located "viewing aperture" 94 is formed through the entire housing of the device. As best illustrated in FIG. 4D, the function of the viewing aperture is to permit the user to encircle a bar code symbol 83 within the viewing aperture while the bar code symbol is being viewed along the line of sight of the user as shown in FIG. 4D. As shown in FIG. 4B, bar code symbol reading device 81 is disposed at an angle of about 45 to 60 degrees from the planar base 82A of the housing. A PC board 95 supporting a data packet transmission circuit and the like is disposed below the engine 53 and above rechargeable battery unit 92. As such, the laser scanning plane 96 projected from light transmission window 97 in housing 82 (during bar code symbol detection and reading states of operation) bisects the oval opening 98 formed through the base of the housing, as shown in FIG. 4C. This permits the user to easily align the visible laser beam across the bar code symbol 83 encircled within and along the viewing aperture 94 of the bar code symbol reading device. Thus, to read a bar code symbol, all the user has to do is encircle the bar code symbol to be read through the viewing aperture, align the projected visible laser beam with the encircled bar code symbol, and automatically the bar code symbol is detected, scanned, and decoded by the bar code symbol reading engine 53, thereby producing bar code symbol data representative of the decoded symbol and driving the bar code symbol reading state indicator. If the user manually actuates the data transmission activation switch 99 provided on the exterior of the housing 82, then subsequently produced symbol character data (from the same bar code symbol) is transmitted to the host system 86 (e.g. via base unit 84). A set of state indication lights 100, as illustrated in FIG. 2C, are provided at the top of the scanner housing 82 for viewing by the user of the device.

Preferably, a one-way data transmission link as described in U.S. Pat. No. 5,808,285 is provided between bar code symbol reading device 81 and base unit 84. When the transmitted symbol character data is received by the base unit 84 and retransmitted to the host computer system 86, an acoustical acknowledgement signal $S_{ACK}$ is emitted to the ambient environment for the user to hear. Thereafter, the user may leave the bar code symbol reading device 81 to rest anywhere on the desktop, or may place it within recess 93 in base unit 84 in order to automatically recharge the battery unit 92 within the bar code symbol reading device 81.

In general, any of the laser scanning engines disclosed in FIGS. 9A through 9D, 10A through 10D, 11A, 13A, and 14A can be incorporated within the desktop-supportable housing 82 of the bar code symbol reading system 80 shown in FIGS. 4A through 4D, with little or no modification to the form factor thereof. When incorporated into wrist-supportable housing 82 as shown, each of these laser scanning engines, indicated by reference numeral 53 in FIGS. 4A–4D, will enable the automatic generation of: an IR-based object detection field 9 in response to powering-up of the laser scanning engine; a laser-based bar code symbol detection field 10 in response to automatic detection of objects within the IR-based object detection field 9; and a laser-based bar code symbol reading field 11 in response to automatic detection of bar code symbols within the laser-based bar code symbol detection field 10, consistent with the structure and function of the schematic diagram of FIG. 1A. As will be described in greater detail hereinafter, each of the laser scanning bar code symbol reading engines shown in FIGS. 9A–9D, 10A–10D, 11A, 13A, and 14A have the same general system architecture schematically illustrated in FIGS. 15A1 through 16. The system control process underlying this first generalized system design is illustrated in the flow chart set forth in FIGS. 20A1 through 20E. The states of operation of this generalized system design are described in the state transition diagram of FIG. 21.

Figure 4E:
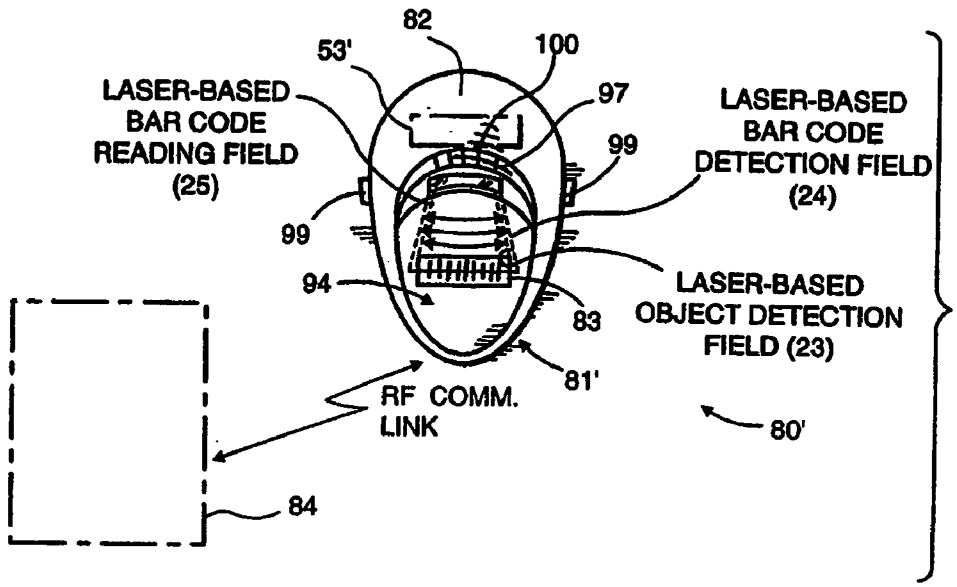
FIG. 4E is a perspective view of the eighth illustrative embodiment of the bar code symbol reading device of the present invention, shown reading a bar code symbol printed on a sheet of paper using its laser-based object detection field and its laser-based bar code symbol detection and reading fields.

Eighth Illustrative Embodiment of Automatically-Activated Bar Code Symbol Reading System of the Present Invention In FIG. 4E, the eighth illustrative embodiment of the automatically-activated bar code symbol reading system hereof 80' is shown comprising a hand/desktop-supportable automatically-activated bar code symbol reading device 81' and a portable base unit 84 in communication therewith achieved using a one-way or two way data communication link as the particular application requires. As shown, this automatically-activated bar code symbol reading system 80' is similar to the bar code symbol reading system 80 shown in FIGS. 4A through 4D, in all but a few respects. The bar code symbol reading device 81' of FIG. 4E may incorporate within its hand-supportable housing 82, any of the laser scanning engines disclosed in FIGS. 9E, 10E, 11B, 13B, and 14B, with little or no modification to the form factor thereof.

When incorporated into housing 82 as shown, each of the laser scanning engines shown in FIGS. 9E, 10E, 11B, 13B and 14B enable automatic generation of: a low-power laser-based object detection field 23 in response to powering-up of the laser scanning engine; a laser-based bar code symbol detection field 24 in response to automatic object detection within the laser-based object detection field 23; and a laser-based bar code symbol reading field 25 in response to automatic bar code symbol detection within the laser-based bar code symbol detection field 24, consistent with the structure and functions depicted in the schematic diagram of FIG. 1B.

As will be described in greater detail hereinafter, each of these laser scanning bar code symbol reading engines 53' have the same general system architecture schematically illustrated in FIGS. 22A1 through 22C. The system control process underlying this second generalized system design is illustrated in the flow chart set forth in FIGS. 23A1 through 23E. The states of operation of this generalized system design are described in the state transition diagram of FIG. 24.

Figure 4F:
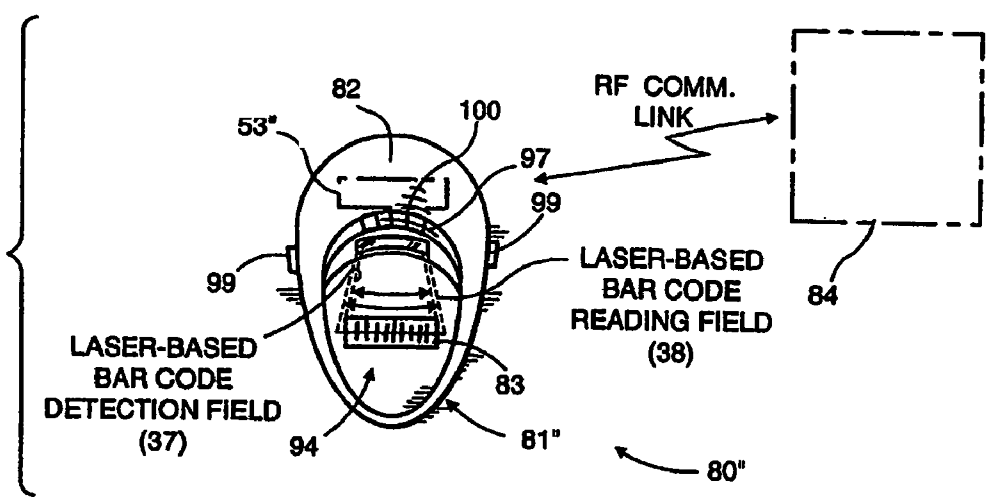
FIG. 4F is a perspective view of the ninth illustrative embodiment of the bar code symbol reading device of the present invention, shown reading a bar code symbol printed on a sheet of paper using its laser-based bar code symbol detection and reading fields.

Ninth Illustrative Embodiment of Automatically-Activated Bar Code Symbol Reading System of the Present Invention In FIG. 4F, the ninth illustrative embodiment of the automatically-activated bar code symbol reading system hereof 80" is shown comprising a hand/desktop-supportable automatically-activated bar code symbol reading device 81" and a base unit 84 in communication therewith achieved using a one-way or two way data communication link. As shown, this automatically-activated bar code symbol reading system 80" is similar to the bar code symbol reading system 80 shown in FIGS. 3A through 3D, in all but a few ways. Also, the bar code symbol reading device of FIG. 4F can incorporate within its hand-supportable housing 82, any of the laser scanning engines disclosed in FIGS. 9F, 10F, 11C, 13C, and 14C, with little or no modification to the form factor thereof.

When incorporated into housing 82 as shown, each of the laser scanning engines shown in FIGS. 9F, 10F, 11C, 13C and 14C and indicated by reference numeral 53" in FIG. 4F, enable automatic generation of: a laser-based bar code symbol detection field 37 in response to powering-up the laser scanning engine, and a laser-based bar code symbol reading field 38 in response to automatic bar code symbol detection within the laser-based bar code symbol detection field 37, consistent with the schematic diagram of FIG. 1C. In this illustrative embodiment, there is no form of automatic object detection provided with the bar code symbol reading device 81", as it is presumed that the bar code symbol reading device is not to be used in portable scanning applications, remote from its base unit 84 or host systems (e.g. cash register/computer), but rather is tethered to its host system by way of a flexible cord carrying both data and power lines between the bar code symbol reading device and the host computer, in lieu of the RF communication link schematically depicted in FIG. 4F.

As will be described in greater detail hereinafter, each of these laser scanning bar code symbol reading engines have the same general system architecture schematically illustrated in FIGS. 25A and 26. The system control process underlying this third generalized system design is illustrated in the flow chart set forth in FIGS. 27A through 27C. The states of operation of this generalized system design are described in the state transition diagram of FIG. 28

Figure 5A:
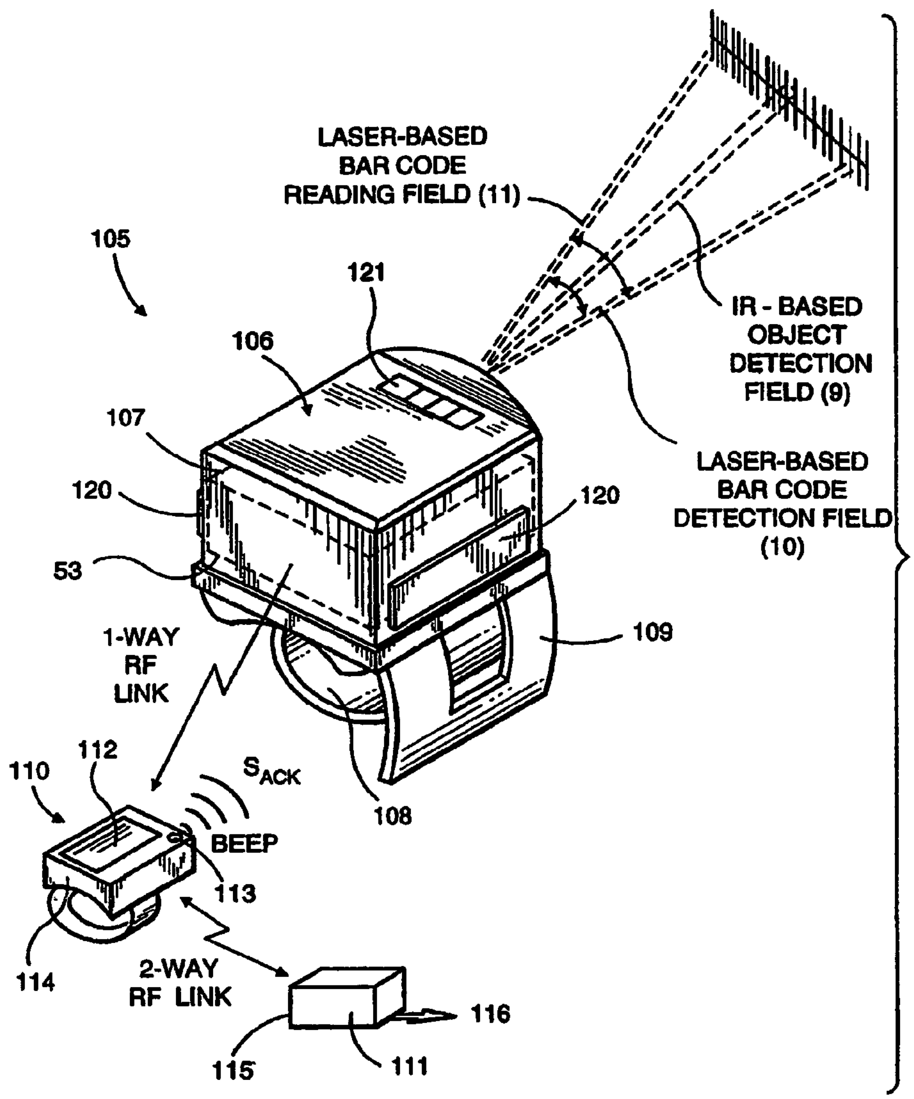
FIG. 5A is a perspective view of the tenth illustrative embodiment of the finger-mounted bar code symbol reading device of the present invention, shown reading a bar code symbol while in proximity to its mated base unit using its IR-based object detection field and its laser-based bar code symbol detection and reading fields.

Tenth Illustrative Embodiment of Automatically-Activated Bar Code Symbol Reading System of the Present Invention In FIG. 5A, the tenth illustrative embodiment of the bar code symbol reading system hereof 105 comprising: a finger-supportable laser scanning bar code symbol reading device 106 having a miniature finger-supportable housing 107 with a break-away type finger mounting structure 108, 109, disclosed in U.S. Pat. No. 5,610,386, incorporated herein by reference, for supporting housing 107 upon the finger of its user's hand; an arm-mounted computer terminal/base unit 110 adapted for support upon the arm of its user, and arranged in data communication with the finger-supportable bar code reading device 106 using a one-way data communication link of the type disclosed in U.S. Pat. No. 5,808,285, and arranged in data communication with the stationary base unit 111 using a two way serial data communication link. The arm-mounted computer-terminal 110 includes a touch-type display screen 112 for data entry by pen (e.g. stylus) input operation, and an acoustical signal generator 113 for producing an acoustical acknowledgement signal SACK for the user to hear. The arm-mounted computer-terminal 110 includes an RF transceiver 114 for establishing two-way digital communication with an RF receiver 115 disposed in stationary base unit 111. The stationary base unit 111 includes a serial data communications cable or other communication medium for establishing communication with the host-computer system 116. In this embodiment, when symbol character data is automatically generated, the bar code symbol reading state indicator is driven.

If the user manually activates either of the data transmission activation switches 120 on housing 107, then subsequently produced symbol character data (from the same bar code symbol) is transmitted to the arm-mounted computer terminal 110. When transmitted symbol character data is received by the arm-mounted computer-terminal 110 and retransmitted to the stationary base unit 111, an acoustical acknowledgement signal $S_{ACK}$ is emitted to the ambient environment for the user to hear. As shown, bar code symbol reading device 106 includes a set of state indicators 121 for optically signaling the various states to the user.

In general, any of the laser scanning engines disclosed in FIGS. 9A through 9D, 10A through 10D, 11A, 13A, and 14A can be incorporated within the finger-supportable housing 107 of the bar code symbol reading system shown in FIG. 5A, with little or no modifications to the form factor thereof. When incorporated into finger-supportable housing 107 as shown, each of these laser scanning engines, indicated by reference numeral 53, in FIG. 5A, will enable the automatic generation of: an IR-based object detection field 9 in response to powering-up the laser scanning engine; a laser-based bar code symbol detection field 10 in response to automatic detection of objects within the IR-based object detection field 9; and a laser-based bar code symbol reading field 11 in response to automatic detection of bar code symbols within the laser-based bar code symbol detection field 10, consistent with the structure and function depicted in the schematic diagram of FIG. 1A. As will be described in greater detail hereinafter, each of these laser scanning bar code symbol reading engines shown in FIGS. 9A–9D, 10A–10D, 11A, 13A and 14A have the same general system architecture schematically illustrated in FIGS. 15A1 through 16. The system control process underlying this generalized system design is illustrated in the flow chart set forth in FIGS. 20A1 through 20E. The states of operation of this generalized system design are described in the state transition diagram of FIG. 21.

Figure 5B:
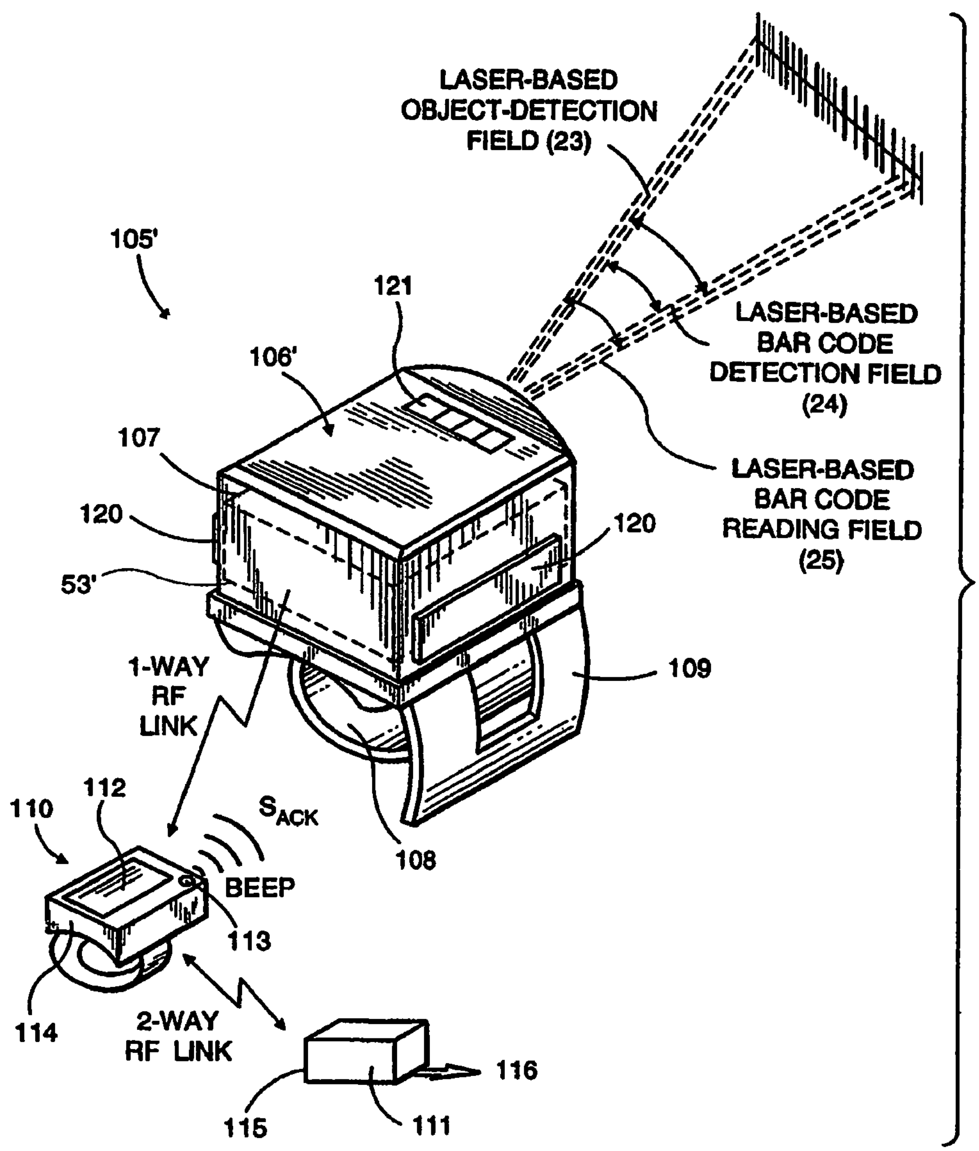
FIG. 5B is a perspective view of the eleventh illustrative embodiment of the finger-mounted bar code symbol reading device of the present invention, shown reading a bar code symbol while in proximity to its mated base unit using its laser-based object detection field and laser-based bar code symbol detection and reading fields.

Eleventh Illustrative Embodiment of Automatically-Activated Bar Code Symbol Reading System of the Present Invention In FIG. 5B, the eleventh illustrative embodiment of the automatically-activated bar code symbol reading system hereof 105' is shown comprising: a finger-supportable laser scanning bar code symbol reading device 106' having a miniature finger-supportable housing 107 with a finger support structure 108, 109 particularly adapted for supporting housing 107 upon the finger of its user's hand; an arm-mounted computer terminal/base unit 110 adapted for support upon the arm of its user, and arranged in data communication with the finger-supportable bar code reading device 106' using a one-way data communication link of the type disclosed in U.S. Pat. Nos. 4,460,120 and 5,321,246 and arranged in data communication with the stationary base unit 111 using a two way serial data communication link.

As shown, this automatically-activated bar code symbol reading system 105' is similar to the bar code symbol reading system 105 shown in FIG. 5A, in all but a few respects. The bar code symbol reading device of FIG. 5B may incorporate within its hand-supportable housing 107, any of the laser scanning engines disclosed in FIGS. 9E, 10E, 11B, 13B, and 14B, with little or no modifications to the form factor thereof. When incorporated into hand-supportable housing 107 as shown, each of these laser scanning engines indicated by reference numeral 53' of FIG. 5B, will enable automatic generation of: a low-power laser-based object detection field 23 in response to powering-up the laser scanning engine; a laser-based bar code symbol detection field 24 generated in response to automatic object detection within the laser-based object detection field 23; and a laser-based bar code symbol reading field 25 generated in response to automatic bar code symbol detection within the laser-based bar code symbol detection field 24, consistent with the structures and functions depicted in the schematic diagram of FIG. 1B.

As will be described in greater detail hereinafter, each of these laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Figure 5C:
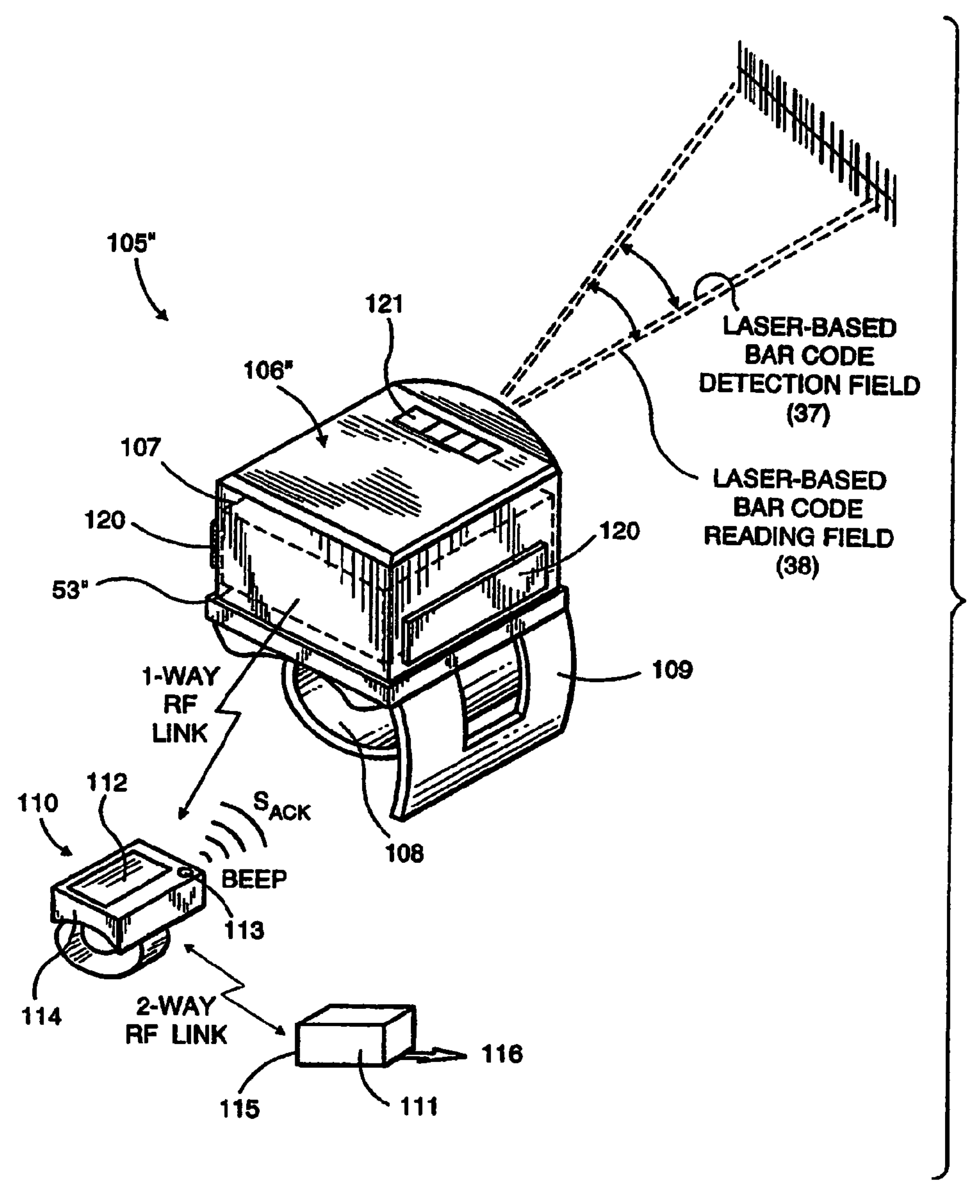
FIG. 5C is a perspective view of the twelfth illustrative embodiment of the finger-mounted bar code symbol reading device of the present invention, shown reading a bar code symbol while in proximity with its mated base unit using its laser-based bar code detection field and laser-based bar code symbol reading field.

Twelfth Illustrative Embodiment of Automatically-Activated Bar Code Symbol Reading System of the Present Invention In FIG. 5C, the twelfth illustrative embodiment of the automatically-activated bar code symbol reading system hereof 105" is shown comprising a finger-supportable automatically-activated bar code symbol reading device 106" and a base unit 110 in communication therewith achieved using a one-way data communication link as taught in U.S. Pat. No. 4,808,285, and a stationary base unit 111 in communication with base unit 110 by way of a 2-way RF communication link as taught in U.S. Pat. Nos. 4,460,120 and 5,321,246. As shown, this automatically-activated bar code symbol reading system 105" is similar to the bar code symbol reading system 105 shown in FIGS. 5A, in all but a few ways.

The bar code symbol reading device of FIG. 5C can incorporate within its hand-supportable housing 107, any of the laser scanning engines disclosed in FIGS. 9F, 10F, 11C, 13C, and 14C, with little or no modification to the form factor thereof. In FIG. 5C, the laser scanning engine 53' has the general form factor shown in FIGS. 9F and 10F so that it can be installed directly within the head portion of the bar code symbol reading device 106" without requiring modification thereto. When incorporated into hand-supportable housing 107 as shown, each of the laser scanning engines shown in FIGS. 9F, 10F, 11C, 13C and 14C enable automatic generation of: a laser-based bar code symbol detection field 37 for automatically detecting objects therewithin; and a laser-based bar code symbol reading field 38 in response to automatic bar code symbol detection within the laser-based bar code symbol detection field 37, consistent with the schematic diagram of FIG. 1C.

In this illustrative embodiment, there is no form of automatic object detection provided with the bar code symbol reading device 106", as it is presumed that the bar code symbol reading device is not to be used in portable scanning applications, remote from its base unit or host system (e.g. cash register/computer), but rather is tethered to its host system by way of a flexible cord carrying both data and power lines between the bar code symbol reading device and the host computer, in lieu of RF communication link. As will be described in greater detail hereinafter, each of these laser scanning bar code symbol reading engines have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

FIG. 5D shows a user 127 wearing the finger-supported automatically-activated bar code symbol reading device 106 (106', 106") of either FIG. 5A, 5B or 5C. As shown, the arm-mounted computer terminal 110 is supported on the arm of the user and is arranged in one-way communication with the finger-supported bar code symbol reading device, and also in one-way or two-way communication with the stationary base unit 111 described hereinabove. Optionally, as shown, the user can wear a head-mounted LCD panel 124 operably connected to the arm-mounted computer terminal 110 for displaying information and graphics displayed on the LCD panel 112 of the computer terminal 110 in a mirrored manner. Also, the user may use a microphone 125, supported by head set 126, for inputting information to the computer-terminal 110 using continuous or discrete speech recognition programs (e.g. by Dragon Systems, Inc., of Newton, Mass.) running on its computing platform in a real-time manner.

In FIG. 5D, the operator 127 is shown using the bar code symbol reading device of FIG. 5A to carry out an inventory management operation. When the user, wearing the finger-supported bar code symbol reading device 106, points to a bar code symbol 128 printed on or applied to a package, the IR-based object detection field 9 automatically detects the object and device automatically generates its laser-based bar code symbol detection field 10 for automatic bar code symbol detection. When the laser-based bar code symbol detection field 10 automatically detects the bar code symbol on the detected object, the device automatically generates its laser-based bar code symbol reading field 11 for automatic bar code symbol reading. When the laser-based bar code symbol reading field 11 successfully reads the detected bar code symbol, then the device automatically generates a bar code symbol read indication signal for driving the "bar code symbol read" state indicator. If, within the prespecified time frame allotted by the system, the operator manually actuates the data transmission activation switch 120 provided on the exterior of the finger-supported housing 107, then subsequently produced symbol character data (from the same bar code symbol) is automatically transmitted to the computer-terminal 110, whereupon an acoustical acknowledgment signal is automatically generated. Thereafter, the symbol character data is transmitted from computer terminal 110 to the stationary base unit 111 in a conventional manner. Notably, the finger-supported bar code symbol reading device 106 can be used in diverse applications involving reading 1-D and 2-D bar code symbols.

Thirteenth Illustrative Embodiment of Automatically-Activated Bar Code Symbol Reading System of the Present Invention In FIG. 6A, the thirteenth illustrative embodiment of the bar code symbol reading system hereof 130 is shown in the form of a hand-held integrated bar code symbol scanning terminal ("Integrated Scanning Terminal") 131 embodying any one or more of the generalized Internet access methods described in copending application Ser. No. 08/846,219 filed Apr. 25, 1997; Ser. No. 08/869,164 filed Jun. 4, 1997; and Ser. No. 08/916,694 filed Aug. 22, 1997, each being incorporated herein by reference. As shown in FIG. 6A, the Integrated Scanning Terminal 131 is connected to an ISP 132 by way of a radio-based station 133 and wireless links 134 and 135. The hand-held Internet Scanning Terminal 131 has an integrated GUI-based web browser program, display panel 136, touch-screen type keypad 137, and programmed automatic laser scanning bar code symbol reading engine 53. The function of bar code symbol reading engine 53 is to read a 1-D or 2-D bar code symbol 138 that is encoded with information of a specified data type. Such information can represent: (i) the URL of a Web page to be accessed by the Internet Scanning Terminal; (ii) the identity of a product or object; or (iii) any type of information that serves to identify an object, specify a process, or specify the location of an object, on an information network or in a system.

In the illustrative embodiment, the Internet Scanning Terminal 131 is realized as a transportable computer, such as the Newton® Model 130 Messagepad from Apple Computer, Inc. of Cupertino, Calif.; the Palm III/Pilot portable data terminal from 3Com, Inc; or like device. In the illustrative embodiment, the Newton Model-130 Messagepad 131 is provided with NetHopper™ (2.0) brand Internet Access Software from AllPen Software, Inc. which supports the TCP/IP networking protocol within the Newton MessagePad operating system. The Newton Messagepad 131 is also equipped with a Motorola PCMCIA-based modem card 138 having a RF transceiver for establishing a wireless digital communication link with either (i) a cellular base station, or (ii) one or more satellite-based stations connected to the Internet 139 by way of an ISP 132 in a manner well known in the global information networking art. While it is understood that, in some instances, it may be desired to connect a pen or wand device to the serial port of the Newton MessagePad to provide bar code symbol reading capabilities thereto, it is preferred that automatic laser scanning engine 53 be interfaced with the serial communications port of the Newton MessagePad so as to realize the Internet-based Transaction-Enabling System of the illustrative embodiment hereof.

As shown in FIG. 6A, the entire Newton MessagePad, bar code symbol reading engine 53 (or other scanning engine) and auxiliary battery supply are intensified and completely housed within a rubberized shock-proof housing 141, in order to provide a hand-supportable unitary device. Once the object (e.g. transaction card) 142 is detected by the object detection field 9, a laser beam is automatically projected within the bar code symbol detection field 10, and swept across the bar code symbol 138 present therewithin, and upon detection, the laser beam is automatically swept across the bar code symbol reading field 11 in order to collect scan data therefrom, and decode the same and produce symbol character data representative of the read bar code symbol. Thereupon, the Internet Scanning Terminal 131 automatically produces a bar code symbol read indication signal (e.g. in the form of a graphical icon or message 144 on the LCD panel 136) for the user to perceive. If and when the user manually-actuates in a timely manner the data transmission activation switch 145 provided on the side of the rubber housing 141, or emulated on the display surface of the LCD panel 136 in the form of a graphical icon 145', then the Internet Scanning Terminal 131 automatically transmits subsequently produced symbol character data for the same bar code symbol to the intended host system (e.g. located at an IP address on the Internet 139), or to on-board data storage memory located within the Internet Scanning Terminal, or to another storage device in communication with the terminal 131.

As shown in FIG. 6A, the bar code symbol reading engines shown in FIGS. 9A through 9D, 10A through 10D, can be installed within the head portion of the bar code symbol reading device 130 without requiring any modification thereto. When incorporated into hand-supportable housing 141 as shown, each of these laser scanning engines indicated by reference to numeral 53 in FIG. 6A, will enable the automatic generation of: an IR-based object detection field 9 for automatically detecting objects presented therewithin; a laser-based bar code symbol detection field 10 in response to automatic detection of objects within the IR-based object detection field 9; and a laser-based bar code symbol reading field 11 in response to automatic detection of bar code symbols within the laser-based bar code symbol detection field 10, consistent with the structure and functions depicted in the schematic diagram of FIG. 1A.

As will be described in greater detail hereinafter, each of these laser scanning bar code symbol reading engines have the same general system architecture schematically illustrated in FIGS. 15A1 through 16. The system control process underlying this generalized system design is illustrated in the flow chart set forth in FIGS. 20A1 through 20E. The states of operation of this generalized system design are described in the state transition diagram of FIG. 21.

Figure 6B:
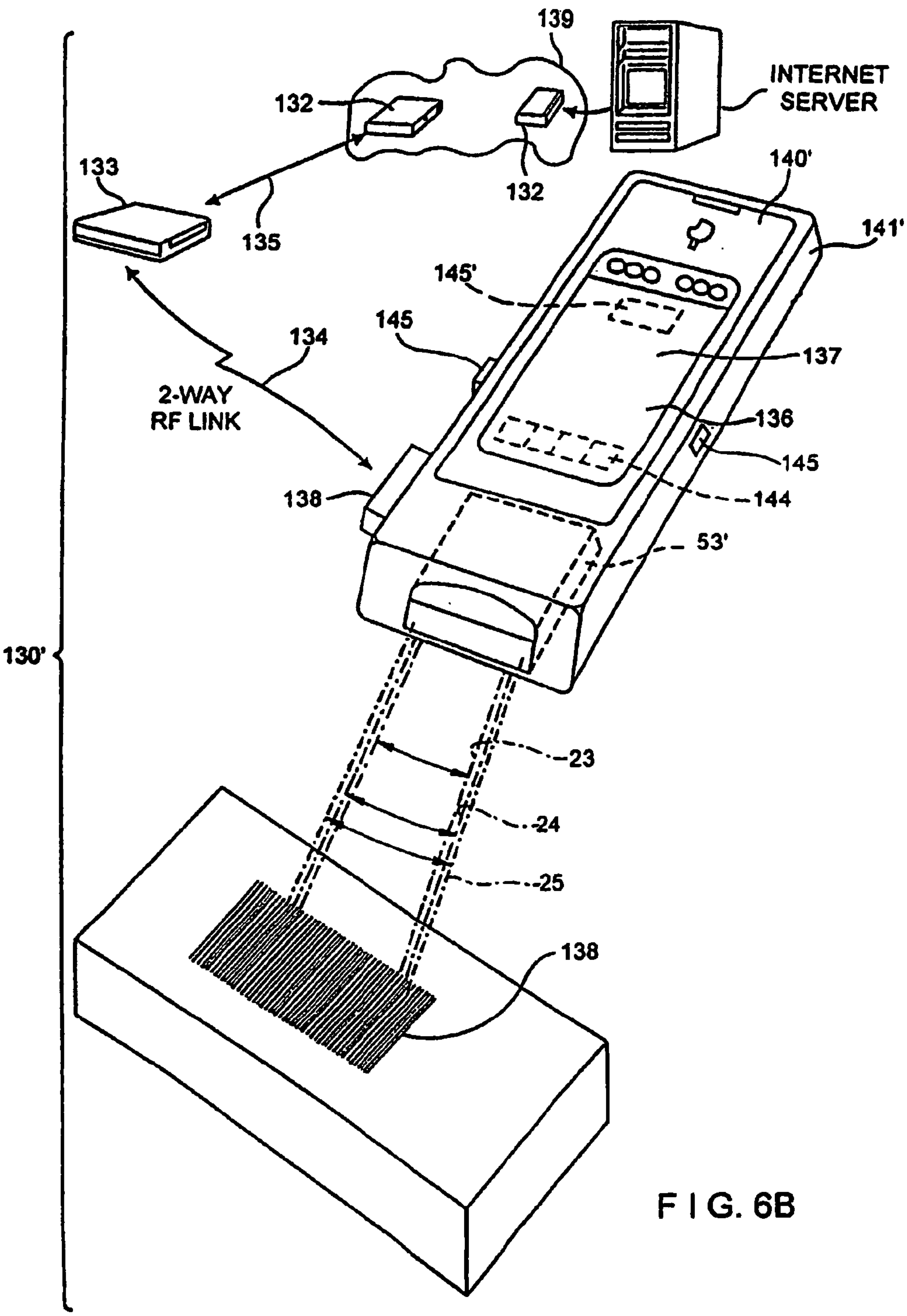
FIG. 6B is a perspective view of the fourteenth illustrative embodiment of the automatically-activated bar code symbol reading device of the present invention, comprising, an integrated WWW browser program for client-side HTTP support, a touch-screen LCD panel for manual data entry and visual data display, an integrated laser scanning bar code symbol reading engine for producing a laser-based object detection field and 1 or 2-D laser-based bar code symbol detection and reading fields, and a wireless communication link established with an Internet Service Provider (ISP) connected with the Internet, for mobile usage within diverse application environments.

Fourteenth Illustrative Embodiment of Automatically-Activated Bar Code Symbol Reading System of the Present Invention In FIG. 6B, the fourteenth illustrative embodiment of the automatically-activated bar code symbol reading system hereof 130' is shown comprising: a hand-supportable laser scanning bar code symbol reading device 140' adapted for support within a user's hand; and a base station 133 in data communication with the hand-supportable bar code reading device 140' using a two-way data communication link 134 of the type disclosed in U.S. Pat. Nos. 4,460,120; 5,321,246, incorporated herein by reference, and in communication with the Internet Information Server maintained by the ISP 132 using a two-way data communication link 135. As shown, this automatically-activated bar code symbol reading system 130' is similar to the bar code symbol reading system 130 shown in FIG. 6A, in all but a few respects. The bar code symbol reading device of FIG. 6B may incorporate within its hand-supportable housing 141', any of the laser scanning engines disclosed in FIGS. 9E, 10E, 11B, 13B, and 14B, with little or no modifications to the form factor thereof.

When incorporated into the hand-supportable housing as shown in FIG. 6B, each of the laser scanning engines, indicated by reference numeral 53' in FIG. 6B, will enable automatic generation of: a low-power laser-based object detection field 23 in response to powering-up of the laser scanning engine; a laser-based bar code symbol detection field 24 generated in response to automatic object detection within the laser-based object detection field 23; and a laser-based bar code symbol reading field 25 generated in response to automatic bar code symbol detection within the laser-based bar code symbol detection field 24, consistent with the structure and function indicated in the schematic design shown in FIG. 1B.

As will be described in greater detail hereinafter, each of the laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Figure 6C:
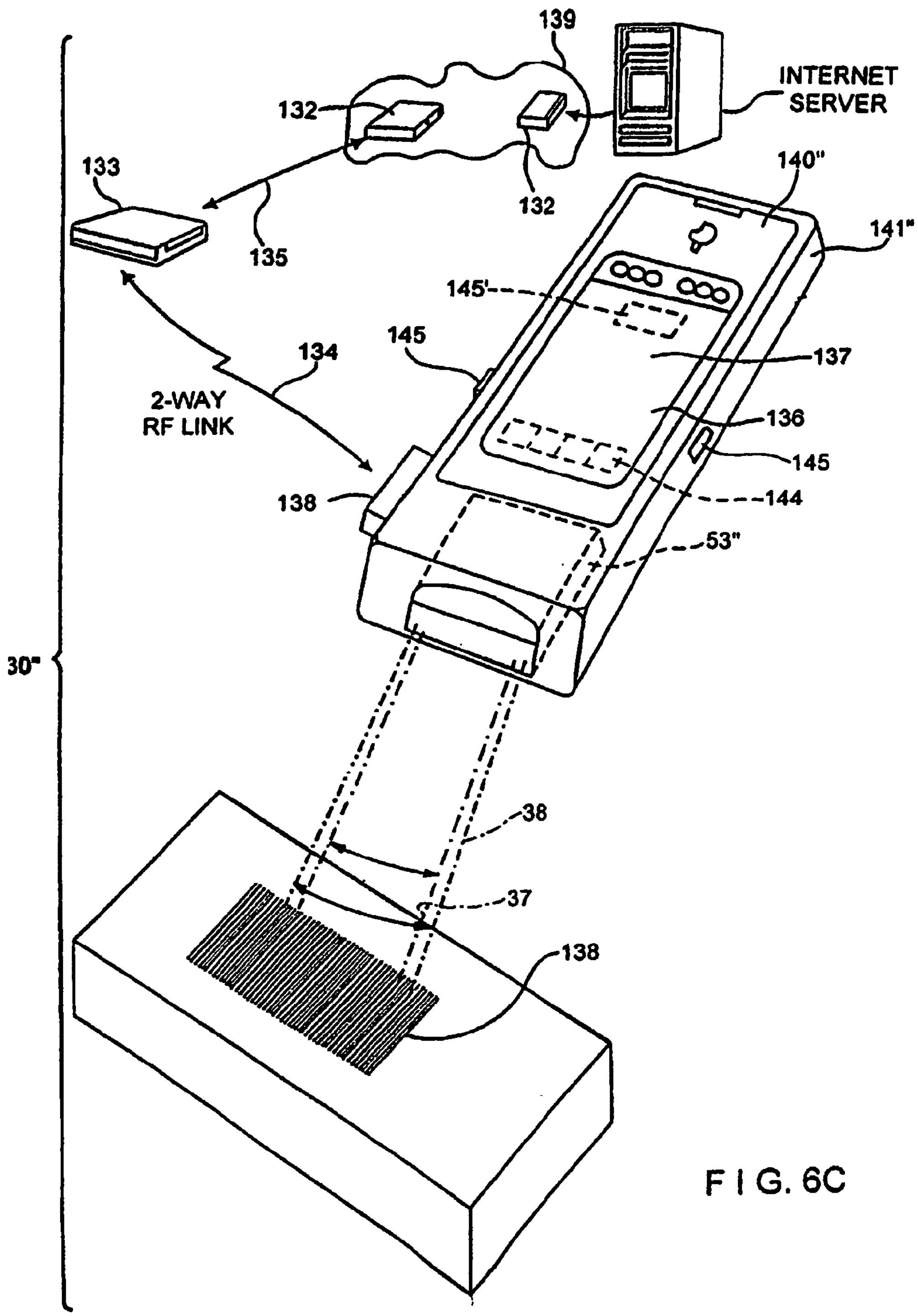
FIG. 6C is a perspective view of the fifteenth illustrative embodiment of the automatically-activated bar code symbol reading device of the present invention, comprising an integrated WWW browser program for client-side HTTP support, a touch-screen LCD panel for manual data entry and visual data display, an integrated laser scanning bar code symbol reading engine for producing a laser-based bar code detection field and 1 or 2-D laser-based bar code symbol detection and reading fields, and a wireless communication link established with an Internet Service Provider (ISP) connected with the Internet, for mobile usage within diverse application environments.

Fifteenth Illustrative Embodiment of Automatically-Activated Bar Code Symbol Reading System of the Present Invention In FIG. 6C, the fifteenth illustrative embodiment of the automatically-activated bar code symbol reading system hereof 130" is shown comprising: a hand-supportable laser scanning bar code symbol reading device 140" adapted for support within a user's hand; and a base station 133 in data communication with the hand-supportable bar code reading device 140" using a two-way data communication link 134 of the type disclosed in U.S. Pat. Nos. 4,460,120; and 5,321,246, incorporated herein by reference, and in communication with the Internet Information Server maintained by the ISP 132 using a two-way data communication link 135. As shown, this automatically-activated bar code symbol reading system is similar to the bar code symbol reading system 130 shown in FIG. 6A, in all but a few ways. The bar code symbol reading device of FIG. 6C can incorporate within its hand-supportable housing, any of the laser scanning engines disclosed in FIGS. 11C, 13C, and 14C, with little or no modification to the form factor thereof.

When incorporated into hand-supportable housing as shown in FIG. 6C, each of these laser scanning engines, indicated by reference numeral 53" in FIG. 6C, enable automatic generation of: a laser-based bar code symbol detection field 37 in response to powering-up the laser scanning engine; and a laser-based bar code symbol reading field 38 in response to automatic bar code symbol detection within the laser-based bar code symbol detection field 37. In this illustrative embodiment, there is no form of automatic object detection provided with the bar code symbol reading device 140", as it is presumed that the bar code symbol reading device is not to be used in portable scanning applications, remote from its base unit or host system (e.g. cash register/computer), but rather is tethered to its host system by way of a flexible cord carrying both data and power lines between the bar code symbol reading device and the host computer.

As will be described in greater detail hereinafter, each of these laser scanning bar code symbol reading engines have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

Figure 7A:
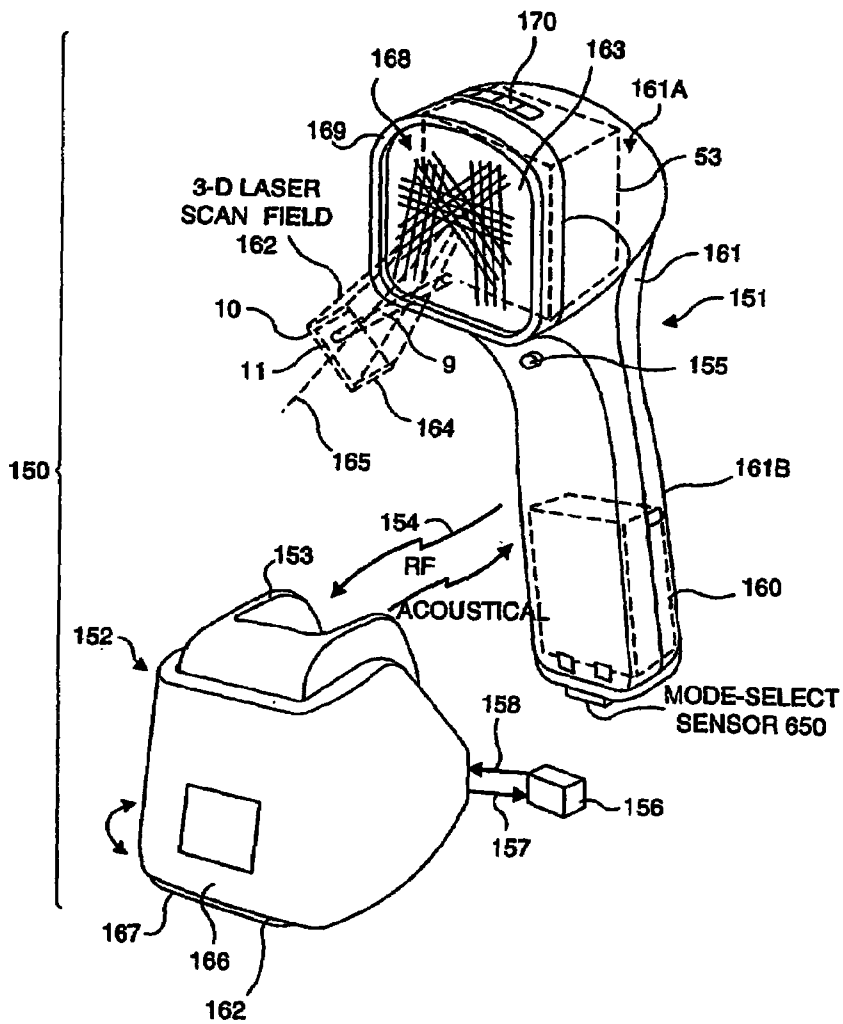
FIG. 7A is a perspective view of the sixteenth illustrative embodiment of the automatically-activatable bar code symbol reading device of the present invention, comprising an integrated laser scanning bar code symbol reading engine for producing an IR-based object detection field and a laser-based omni-directional bar code symbol reading field, and a wireless communication link established with its base station adapted for battery recharging and hands-free mode of operation within diverse application environments.

Sixteenth Illustrative Embodiment of Automatically-Activated Bar Code Symbol Reading System of the Present Invention In FIG. 7A, the sixteenth illustrative embodiment of the bar code symbol reading system hereof 150 is shown comprising: an automatically-activated portable bar code symbol reading device 151 operably associated with a base unit 152 having a scanner support stand 153 pivotally connected thereto, for releaseably supporting the automatic bar code symbol reading device 151 at any one of a number of positions above of a counter surface at a Point of Sale (POS) station. In the preferred embodiment, the bar code symbol reading device 151 is operably connected with its the base unit 152 by way of a one way electromagnetic link 154 between bar code symbol reading device 151 and its mated base unit 152. After the successful reading of each bar code symbol by the bar code symbol reading device and the timely activation of data transmission activation switch 155, subsequently produced symbol character data (from the same bar code symbol) is transmitted to the base unit and thence to the host system (e.g. electronic cash register system, data collection device, etc.) 156 by way of a flexible multiwire communications cable 157 extending from the base unit 152 and plugged directly into the data-input communications port of the host computer system 156.

In the illustrative embodiment, electrical power from a low voltage direct current (DC) power supply (not shown) is provided to the base unit by way of a flexible power cable 159. Notably, this DC power supply can be realized in host computer system 156 or as a separate DC power supply adapter pluggable into a conventional 3-prong electrical socket. In other embodiments of the present invention, cables 157 and 158 can be integrated to provide a single flexible, multi-wire cable for transmission of power to the base unit and data to the host system. As will be described in greater detail hereinafter, a rechargeable battery power supply unit 160 is contained primarily within the handle portion of the bar code symbol reading device 151 in order to energize the electrical and electro-optical components within the device.

As illustrated in FIG. 7A, scanner support stand 153 is particularly adapted for receiving and supporting portable bar code symbol reading device 151 without user support, thus providing a stationary, automatic hands-free mode of operation. In general, portable bar code symbol reading device 151 includes an ultra-light weight hand-supportable housing 161 having a head portion 161A and a contoured handle portion 161B. As will be described in greater detail hereinafter, head portion 161A encloses a laser scanning bar code symbol reading engine 53 capable of producing a highly collimated scanning pattern 162 through light transmission window 168 for the purpose of scanning bar code symbols on objects within a narrowly confined-scanning (i.e. 3-D scanning field) volume 164, while preventing unintentional scanning of bar code symbols on objects located outside thereof at point of sale (POS) stations. Thus, by minimizing the amount of counter-space that must be clear (i.e. free) of bar coded items at POS stations, the omnidirectional bar code symbol reader 151 provides retailers with greater counter-space availability for displaying merchandise and the like, yet without sacrificing the increase in check-out performance and worker productivity associated with the use of bar code symbol scanners at POS stations.

As illustrated in FIG. 7A, the base unit 152 includes a base portion 162 which can be realized in a variety of different ways. For example, the base portion 162 can be realized as a compact stand for support upon a countertop surface as shown in FIG. 7A, or it can be realized as a support mount for vertical wall-mounting. In either embodiment, the function of the scanner stand 153 is to support the device 151 in any one of a plurality of positions above a workspace which may be a counter surface in POS applications. With this arrangement, the highly-collimated laser scanning pattern 162 can be projected about the projection axis 165 above the counter surface in any one of a plurality of orientations corresponding to the plurality of positions above the workspace.

As described in greater detail in Applicant's U.S. Pat. No. 5,796,091, base portion 162 contains electronic circuitry realized on a PC board for carrying out various types of functions, namely: reception of electrical power from the host system and coupling electrical power to the rechargeable battery contained within the hand-supportable housing; reception of data packets transmitted from the automatic bar code symbol reading device, and processing the same for data recovery; generation of acoustical and/or optical acknowledgement signals; and transmission of symbol character data to the host system.

As illustrated in FIG. 7A, the head portion 161A of the bar code reading device continuously extends into contoured handle portion 161B at an obtuse angle which, in the illustrative embodiment, is about 115 degrees. It is understood, however, that in other embodiments this obtuse angle may be in the range of about 100 to about 150 degrees. The mass balance of the device is particularly designed so that when the device is held within the user's hand, the index finger of the user is disposed beneath the head portion of the housing, and provides a pivot point about which there is substantially zero torque acting upon the device, preventing it from rotating in either direction about the index finger. Instead, the resultant force distribution acting upon the user's hand is aligned in the direction of gravitational forces. The effect of this mass-balanced scanner design is to minimize the torque imposed on the user's wrists and forearms while using the bar code symbol reading device in the hands-on mode of operation. This, in turn, minimizes the amount of energy which the user must expend during hands-on scanning operations, thereby reducing wrist and arm fatigue and increasing worker productivity. In addition to the above advantages, the hand-supportable housing hereof is sculptured (i.e. form-fitted) to the human hand so that automatic hands-on scanning is rendered easy and effortless.

Preferably, the stand portion 153 of the base unit 152 is pivotally supported with respect to the base portion 162 by way of pivot pins mounted within the base portion. In order to releaseably hold the stand portion of the base unit relative to the base portion thereof in any one of a number of provided scanning positions, a releasable stand-locking mechanism is provided within the base portion. The locking mechanism can be realized as a set of projections formed on the inside surface of the support arms of the stand portion of the base unit, and a projection-catch formed on the adjacent surface of the base portion. In addition, to allow the base unit to easily rotate relative to its support surface, the bottom of the base portion can be realized as a turntable structure that allows its bottom section 166 to be stationary relative to the support surface (i.e. countertop), while the upper section is fixed relative to the balance of the base portion of the base unit 152. Preferably, pivot is used to pivotally connect the upper and lower sections 166 and 167 together for easy rotation of the base unit relative to the support surface.

As illustrated in FIG. 7A, the head portion 161A of the hand-supportable housing has a light transmission window 168 mounted over the entire light transmission aperture 163. A rubber bumper 169 protects the edge of the housing when dropped or set down. In the preferred embodiment, the spectral transmission characteristics of the light transmission window are such that all wavelengths greater (i.e. longer) than slightly less than 670 nm (e.g. longer than 665 nm) are permitted to exit and enter the interior volume of the housing with minimum attenuation. As a result of such characteristics, the visible laser line at 670 nanometers and the infra-red (IR) spectral line at 870 nm (produced from the object sensing circuitry hereof) are allowed to propagate through the transmission window, out of the head portion of the housing, reflect from an object/bar code surface, and return through the transmission window. Notably, all other surfaces of the hand-supportable housing are opaque to electromagnetic radiation in the visible band.

As shown in FIG. 7A, a set of color-coded state indicator lights 170 are mounted on the head portion of the device housing 161A, for visually displaying the particular state in which the system resides at any instant of time. Notably, the color-coding scheme shown in FIG. 2C can be used.

In general, any of the laser scanning engines disclosed in FIGS. 9A through 9D, 10A through 10D, 11A, 13A, and 14A can be incorporated within the hand-supportable housing of the bar code symbol reading system shown in FIG. 7A, with little or no modifications to the form factor thereof. When incorporated into hand-supportable housing 161 as shown, each of these laser scanning engines, indicated by reference numeral 53 in FIG. 7A, will enable the automatic generation of: an IR-based object detection field 9 in response to powering-up the laser scanning engine; a laser-based bar code symbol detection field 10 containing an omni-directional laser scanning pattern generated in response to automatic detection of objects within the IR-based object detection field 9; and a laser-based bar code symbol reading field 11 containing an omni-directional laser scanning pattern, generated in response to automatic detection of bar code symbols within the laser-based bar code symbol detection field 10. Notably, for clarity of exposition, the geometrical characteristics of the laser scanning pattern in each of the scanning fields have not been graphically depicted. Only the geometrical boundaries of the laser scanning fields have been graphically depicted in the figures hereof.

As will be described in greater detail hereinafter, each of these laser scanning bar code symbol reading engines have the same general system architecture schematically illustrated in FIGS. 15A1 through 16. The system control process underlying this generalized system design is illustrated in the flow chart set forth in FIGS. 20A1 through 20E. The states of operation of this generalized system design are described in the state transition diagram of FIG. 21.

Seventeenth Illustrative Embodiment of Automatically-Activated Bar Code Symbol Reading System of the Present Invention In FIG. 7B, the seventeenth illustrative embodiment of the automatically-activated bar code symbol reading system hereof 150' is shown comprising: a hand-supportable laser scanning bar code symbol reading device 151' adapted for support within a user's hand; and a base station 152 in data communication with the hand-supportable bar code reading device 151' using a one-way data communication link 154 of the type disclosed in U.S. Pat. No. 5,808,285, or two-way data communication link of the type disclosed in U.S. Pat. Nos. 4,460,120; and 5,321,246 incorporated herein by reference. As shown, this automatically-activated bar code symbol reading system 150' is similar to the bar code symbol reading system 150 shown in FIG. 7A, in all but a few respects. Any of the laser scanning engines disclosed in FIGS. 11B, 13B, and 14B can be installed directly within the head portion of the bar code symbol reading device shown in FIG. 7B without requiring any modification thereto.

When incorporated into hand-supportable housing 161 as shown, each of these laser scanning engines, indicated by reference numeral 53' in FIG. 7B, will enable automatic generation of: a low-power laser-based object detection field 23 in response to powering-up of the laser scanning engine; a laser-based bar code symbol detection field 24 containing an omni-directional (visible) laser scanning pattern, generated in response to automatic object detection within the laser-based object detection field 23; and a laser-based bar code symbol reading field 25, containing an omni-directional visible laser scanning pattern, generated in response to automatic bar code symbol detection within the laser-based bar code symbol detection field 24, consistent with the structure and functions depicted in the schematic diagram of FIG. 1B.

As will be described in greater detail hereinafter, each of these laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Figure 7C:
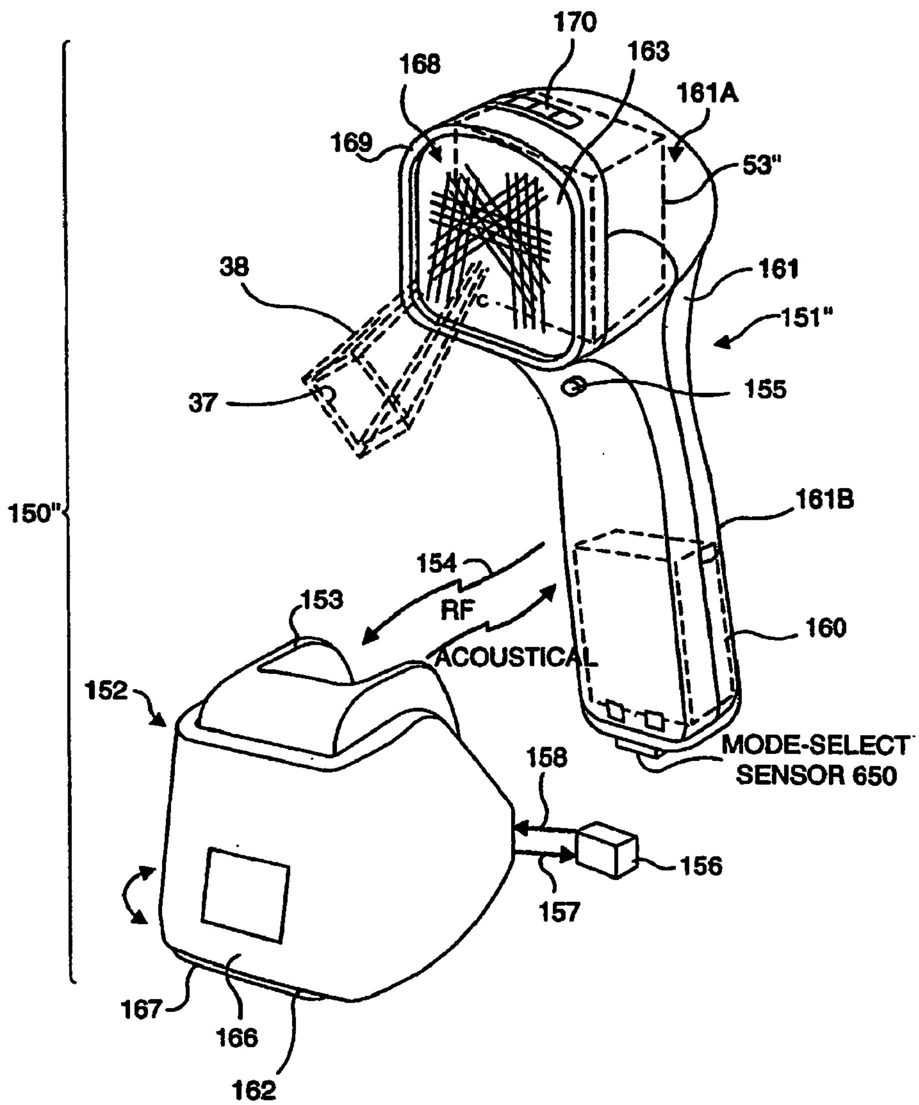
FIG. 7C is a perspective view of the eighteenth illustrative embodiment of the automatically-activatable bar code symbol reading device of the present invention, comprising an integrated laser scanning bar code symbol reading engine for producing a laser-based bar code detection field and a laser-based omni-directional bar code symbol reading field, and a wireless communication link established with its base station adapted for battery recharging and hands-free mode of operation within diverse application environments.

Eighteenth Illustrative Embodiment of Automatically-Activated Bar Code Symbol Reading System of the Present Invention In FIG. 7C, the eighteenth illustrative embodiment of the automatically-activated bar code symbol reading system hereof 150" is shown comprising: a hand-supportable laser scanning bar code symbol reading device 151" adapted for support within a user's hand; and a base station 152 in data communication with the hand-supportable bar code reading device 151" using a one-way data communication link 154" of the type disclosed in U.S. Pat. No. 5,808,285 or two-way data communication link of the type disclosed in U.S. Pat. Nos. 4,460,120; and 5,321,246, incorporated herein by reference. As shown, this automatically-activated bar code symbol reading system 150" is similar to the bar code symbol reading system 150 shown in FIG. 7A, in all but a few respects. In particular, the bar code symbol reading device of FIG. 7C can incorporate within its hand-supportable housing 161A, any of the laser scanning engines disclosed in FIGS. 11C, 13C, and 14C, with little or no modification to the form factor thereof.

When incorporated into hand-supportable housing 161, each of these laser scanning engines, indicated by reference numeral 53" in FIG. 7C, enable automatic generation of: a laser-based bar code symbol detection field 37 in response to powering-up of the laser scanning engine; and a laser-based bar code symbol reading field 38 containing an omni-directional visible laser scanning pattern generated in response to automatic bar code symbol detection within the laser-based bar code symbol detection field 37, consistent with the structure and functions depicted in FIG. 1C. In this illustrative embodiment, there is no form of automatic object detection provided with the bar code symbol reading device 151", as it is presumed that the bar code symbol reading device is not to be used in portable scanning applications, remote from its base unit or host system (e.g. cash register/computer), but rather is to be tethered to its host system by way of a flexible cord carrying both data and power lines between the bar code symbol reading device and the host computer.

As will be described in greater detail hereinafter, each of these laser scanning bar code symbol reading engines shown in FIGS. 11C, 13C and 14C have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

Nineteenth Illustrative Embodiment of Automatically-Activated Bar Code Symbol Reading System of the Present Invention In FIG. 8A, the nineteenth illustrative embodiment of the bar code symbol reading system hereof 180 is realized in the form of a body-wearable Internet-based Transaction-Enabling System, comprising: a bar code symbol reading unit 181 designed to be worn on the back of the operator's hand; and a remote unit 182 (i.e. realized as a body-wearable RF-based Internet access terminal) designed to be worn about the forearm or foreleg of the operator by fastening thereto using, for example, flexible straps 182A or like fastening technology.

In the illustrative embodiment, hand-mounted bar code reading unit 181 comprises: a light transmission window 181A for exit and entry of light used to scan bar code symbols 183; a glove 184 without finger receiving sheaths, worn by the operator for releaseably mounting the bar code reading unit 181 to the back of his or her hand; a laser scanning bar code symbol reading engine 53, as described hereinabove; a set of state indicator lights 185A provided on the exterior of the housing for visually displaying the system state to the operator during system operation, and thumb-activatable data-transmission activation switch 185B for producing a data transmission control activation control signal ($A_4=1$) in response to a bar code symbol read state indication on state indicator lights 185A.

In the illustrative embodiment, the remote unit 182 comprises: an LCD touch-screen type panel 186; an audio-speaker 187; a RISC-based microcomputing system or platform 188 for supporting various computing functions including, for example, TCP/IP, HTTP, and other Internet protocols (e.g. E-mail, FTP, etc.) associated with the use of an Internet browser or communicator program (e.g. Netscape Navigator or Communicator, or MicroSoft Explorer programs) provided by the remote unit; a telecommunication modem 189 interfaced with the microcomputing system 188; an RF transceiver 190 (e.g. employing DFSK or spread-spectrum modulation techniques) also interfaced with the telecommunication modem for supporting a 2-way telecommunication protocol (e.g. PPP) known in the art, between the microcomputing system and remote transceiver 191 (described hereinabove) which is interfaced with ISP 192 connected to the Internet or other digital data communication network; a set of state indicator lights 185A' which mirror the state indicator lights 185A on the bar code symbol reading device; a rechargeable battery power supply 193 aboard the remote housing, for providing electrical power to the components therein as well as to the bar code symbol reader 181; and a flexible cable 194, for supporting communication between the bar code symbol reader 181 and the microcomputing platform 188, and electrical power transfer from the power supply to the bar code symbol reader.

Notably, the remote unit 182 will embody at least one of the Internet access methods described in copending application Ser. No. 08/846,219 filed Apr. 25, 1997; Ser. No. 08/869,164 filed Jun. 4, 1997; and Ser. No. 08/916,694 filed Aug. 22, 1997. The method used by remote unit 182 (i.e. the Internet access terminal) will depend on the information that is encoded within the URL-encoded bar code symbol scanned by the bar code symbol reader 181. Optionally, a laser scanning bar code symbol scanning engine (without a digitizer or decoder) can be contained within hand-mounted unit 181, and the necessary digitizing and scan-data processing can be carried out by the microcomputing system within the remote unit 182 using techniques known in the art, or using special-purpose ASIC-type devices contained within remote unit 182 also known in the art.

Preferably, the remote unit 182 is worn on the forearm of the operator so that the touch-type LCD panel 186 integrated therewith can be easily viewed during use of the body-wearable system of the present invention. Thus, when a bar code symbol 183 is automatically read by the hand-mounted (or finger-mounted) bar code symbol reader 181, bar code symbol character data, representative of the read bar code symbol, will be automatically produced and the bar code symbol reading state indicator driver. If the operator manually activates the thumb-activatable data transmission switch 185B in a timely manner, then subsequently produced symbol character data (produced from the same bar code symbol) transmitted to the remote unit 182 (e.g. host device). If so, and the bar code is a URL-encoded bar code symbol, then the transaction-enabling Web page associated with the scanned bar code symbol is automatically accessed by the remote unit 182 and displayed on the LCD panel 186 for viewing by and interaction with the operator. Also, in response to reading a URL-encoded bar code symbol, the operator may be required to manually enter information to the Web page being displayed, using the touch-screen display panel 186 and pen-computing software, well known in the art. In an alternative embodiment of the present invention, a large-vocabulary speech recognition subsystem may be integrated within the remote housing 182 so that the user can enter information to the Internet browser by speaking rather than through manual keystroke, or pen computing techniques well known in the art and supported by the microcomputing platform contained within the remote housing.

In some applications, it may be desirable to provide, as shown in FIG. 8D, a lightweight headset 196 supporting a miniature LCD display screen 197, a microphone 198, and earphones 200. Also, as shown, the remote unit 182 is provided with audio and video input/output ports 201 for supplying audio input to the microcomputing platform (within the remote unit) 182 and audio and video output therefrom using a flexible communication cable 202 for driving the headset components worn by the operator during in-field use of the system. The function of the head-supported microphone 198 would be to provide speech input to the microcomputing system for processing by a speech recognition subsystem realized thereaboard using commercially available speech-recognition software (e.g. from Dragon Systems, Inc. Newton Mass.). The function of the head-mounted video-panel 197 would be to provide a convenient way of displaying HTML-encoded information pages accessed from the Internet in response to reading URL-encoded bar code symbols bar coded symbol reader 181. The function of earphones 200 would be to provide a convenient way of supplying audio information encoded within HTML-encoded information pages accessed from the Internet using bar coded symbol reader 181. Such auxiliary devices 197, 198 and 200, interfaced with the forearm-supported remote unit 182 (enabling Internet access), will provide the operator with additional freedom to carry out operations in diverse environments.

In general, any of the laser scanning engines disclosed in FIGS. 9A through 9D, 10A through 10D, 11A, 13A, and 14A can be incorporated within the hand-supportable housing of the bar code symbol reading device 181 shown in FIG. 8A, with little or no modifications to the form factor thereof. When incorporated into the hand-supportable housing thereof as shown, each of these laser scanning engines, indicated by reference numeral 53 depicted in FIG. 8A, will enable the automatic generation of: an IR-based object detection field 9 in response to powering-up the laser scanning engine; a laser-based bar code symbol detection field 10 in response to automatic detection of objects within the IR-based object detection field 9; and a laser-based bar code symbol reading field 11 in response to automatic detection of bar code symbols within the laser-based bar code symbol detection field 10, consistent with the structure and functions depicted in the systematic diagram of 1A. As will be described in greater detail hereinafter, each of these laser scanning bar code symbol reading engines shown in FIGS. 9A through 9D, 10A through 10D, 11A, 13A and 14A have the same general system architecture schematically illustrated in FIGS. 15A1 through 16. The system control process underlying this generalized system design is illustrated in the flow chart set forth in FIGS. 20A1 through 20E. The states of operation of this generalized system design are described in the state transition diagram of FIG. 21.

Figure 8B:
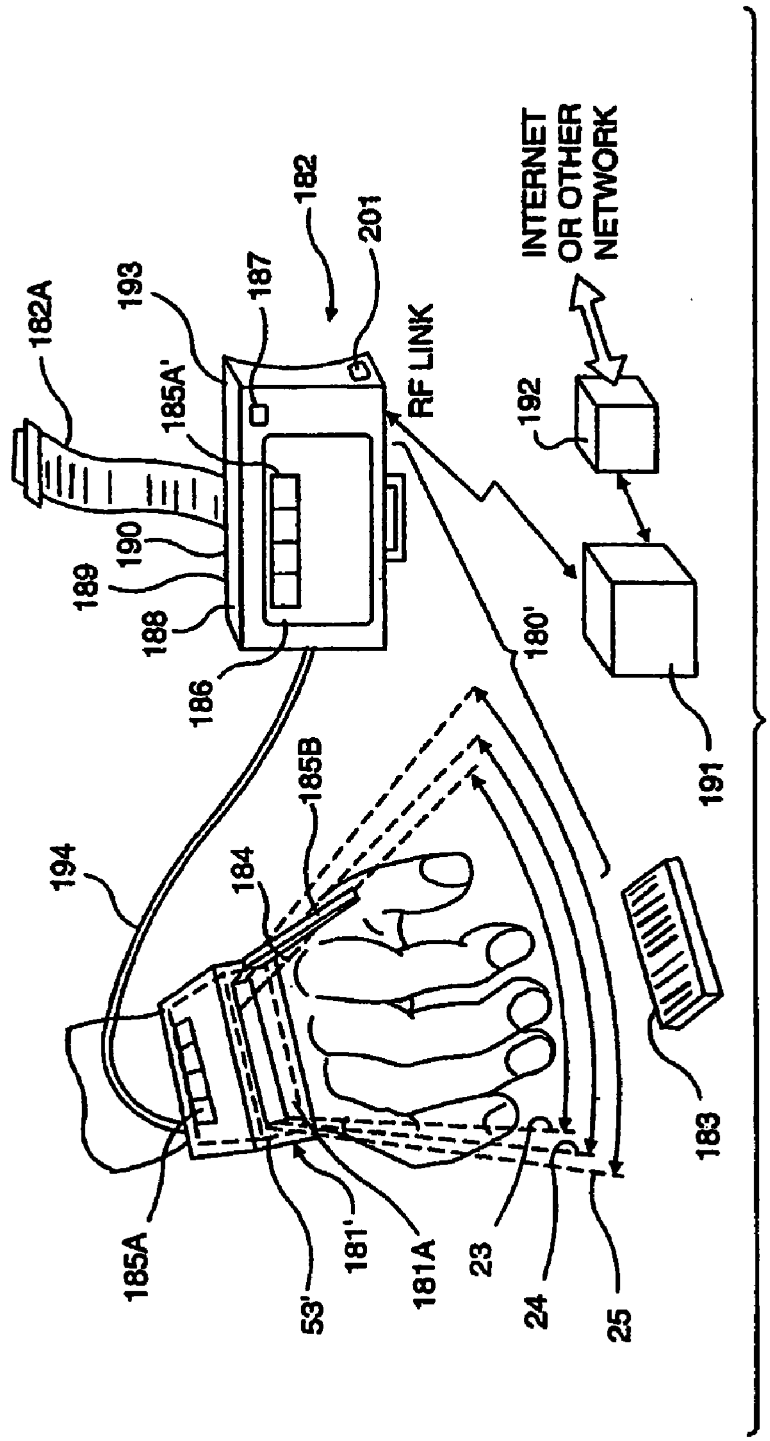
FIG. 8B is a perspective view of the twentieth illustrative embodiment of the automatically-activated bar code symbol reading device of the present invention, comprising an automatically-activated laser scanning bar code symbol reading engine having a laser-based object detection field and a 1-D or 2-D laser-based bar code symbol detection and reading field, shown mounted on the back of the hand of an operator and having an external data terminal mounted on the arm thereof.

Twentieth Illustrative Embodiment of Automatically-Activated Bar Code Symbol Reading System of the Present Invention In FIG. 8B, the twentieth illustrative embodiment of the bar code symbol reading system hereof 180' is realized in the form of a body-wearable Internet-based Transaction-Enabling System comprising: a bar code symbol reading unit 181' designed to be worn on the back of the hand; and a remote unit 182 (i.e. realized as a body-wearable RF-based Internet access terminal) designed to be worn about the forearm or foreleg of the operator, as described hereinabove. As shown in FIG. 8B, this automatically-activated bar code symbol reading system 180' is similar to the bar code symbol reading system 180 shown in FIG. 8A, in all but a few respects. In particular, any of the bar code symbol reading engines disclosed in FIGS. 9E, 10E, 11B, 13B, and 14B may incorporated within hand-supportable housing of device 181', with little or no modifications to the form factor thereof.

When incorporated into the hand-supportable housing of device 181' as shown in FIG. 8B, each of the laser scanning engines, indicated by reference numeral 53' in FIG. 8B, will enable automatic generation of: a low-power laser-based object detection field 23 in response to powering-up the laser scanning engine; a laser-based bar code symbol detection field 24 generated in response to automatic object detection within the laser-based object detection field 23; and a laser-based bar code symbol reading field 25 generated in response to automatic bar code symbol detection within the laser-based bar code symbol detection field 24, consistent with the structure and functions depicted in the schematic diagram of FIG. 1B.

As will be described in greater detail hereinafter, each of these laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Figure 8C:
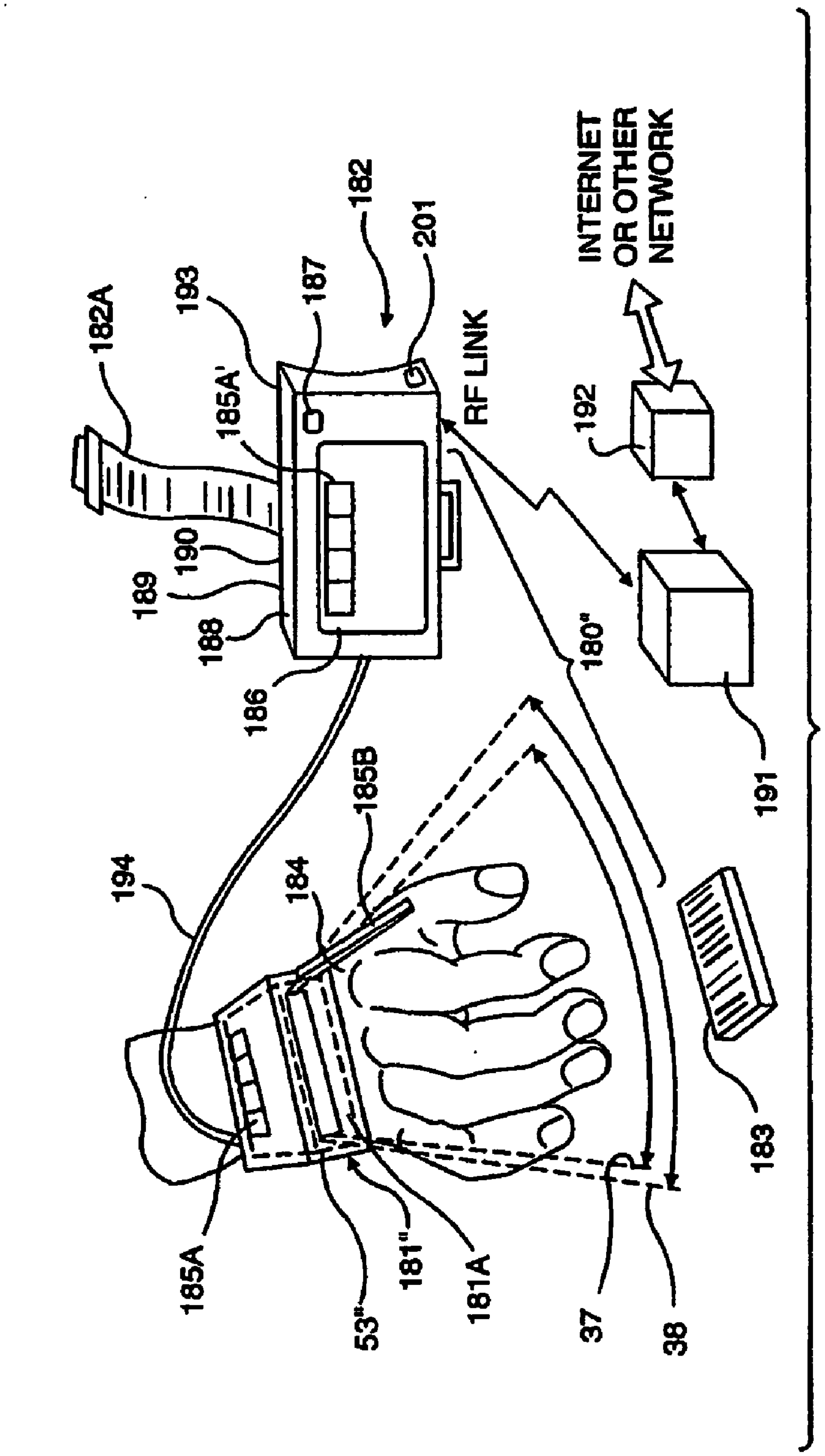
FIG. 8C is a perspective view of the twenty-first illustrative embodiment of the automatically-activated bar code symbol reading device of the present invention, comprising an automatically-activated laser scanning bar code symbol reading engine having a 1-D or 2-D laser-based bar code symbol detection and reading field, shown mounted on the back of the hand of an operator and having an external data terminal mounted on the arm thereof.

Twenty-First Illustrative Embodiment of Automatically-Activated Bar Code Symbol Reading System of the Present Invention In FIG. 8C, the twenty-first embodiment of the bar code symbol reading system hereof 180" is realized in the form of a body-wearable Internet-based Transaction-Enabling System comprising: a bar code symbol reading unit 181" designed to be worn on the back of the hand; and a remote unit 182 (i.e. realized as a body-wearable RF-based Internet access terminal) designed to be worn about the forearm or foreleg of the operator as described hereinabove. As shown, this automatically-activated bar code symbol reading system 180" is similar to the bar code symbol reading system 180 shown in FIG. 8A, in all but a few respects. Any of the laser scanning engines disclosed in FIGS. 9F, 10F, 11C, 13C and 14C can be incorporated within the hand-supportable housing of the device with little or no modification to the form factor thereof.

When incorporated into hand-supportable housing thereof as shown in FIG. 8C, each of these laser scanning engines indicated by reference numeral 53" in FIG. 8C, enable automatic generation of: a laser-based bar code symbol detection field 37, for automatically detecting objects therewithin; and a laser-based bar code symbol reading field 38 in response to automatic bar code symbol detection within the laser-based bar code symbol detection field 37, consistent with the structure and functions depicted in the schematic diagram of FIG. 1C. In this illustrative embodiment, there is no form of automatic object detection provided with the bar code symbol reading device 181", as it is presumed that the bar code symbol reading device is not to be used in portable scanning applications, remote from its base unit or host system (e.g. cash register/computer), but rather is tethered to its host system by way of a flexible cord carrying both data and power lines between the bar code symbol reading device and the host computer.

As will be described in greater detail hereinafter, each of these laser scanning bar code symbol reading engines have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

FIG. 8D shows an operator wearing the hand-supported automatically-activated bar code symbol reading device 181 (181', 181") of either FIG. 8A, 8B or 8C. As shown, the arm-mounted computer terminal 182 is supported on the arm of the operator and is arranged in one-way communication with the hand-supported bar code symbol reading device 181, and also in two-way communication with the stationary base unit 191 described hereinabove. Optionally, as shown, the user can wear the head-mounted LCD panel 197 operably connected to the arm-mounted computer terminal 182 for displaying information and graphics displayed on the LCD panel thereof in a mirrored manner. Also, the user may use microphone 198 for inputting information to the computer-terminal 182 by way of continuous or discrete speech recognition programs (e.g. by Dragon Systems, Inc. of Newton, Mass.) running on computer-terminal 182 in a real-time manner.

In FIG. 8D, an operator/user is shown using the bar code symbol reading device of FIG. 8A to carry out an inventory management operation. When the operator, wearing the hand-supported bar code symbol reading device 181, points to a bar code symbol 183 printed or applied to a package, the IR-based object detection field 9 automatically detects the object and the device 181 automatically generates its laser-based bar code symbol detection field 10 for automatic bar code symbol detection. When the laser-based bar code symbol detection field 10 automatically detects a bar code symbol on the detected object, the device 181 automatically generates its laser-based bar code symbol reading field 11 for automatic bar code symbol reading. When the laser-based bar code symbol reading field 11 successfully reads the detected bar code symbol, the device 181 automatically generates symbol character data representative of the read bar code symbol, and then drives the bar code symbol read indication signal (e.g. via indicator light array 185A or 185A' on LCD panel 186 of computer-terminal 182). If the user manually actuates the data transmission activation switch 185B in a timely manner established by the system controller of the system, the subsequently produced symbol character data (from the same bar code symbol) is automatically transmitted to the computer-terminal 182, whereupon an acoustical acknowledgment signal is automatically generated for the operator to hear and the data transmission state indicator is driven. Thereafter, the symbol character data is transmitted from the stationary base unit 182 to the host system in a conventional manner. Notably, the hand-supported bar code symbol reading device 181 can be used in diverse applications including bar code symbol menu reading applications involving reading 1-D and 2-D bar code symbols.

Twenty-Second Illustrative Embodiment of Automatically-Activated Bar Code Symbol Reading System of the Present Invention In FIGS. 8E1 and 8E2, the twenty-second illustrative embodiment of the bar code symbol reading system hereof 700 is shown comprising: an automatically-activated portable bar code symbol reading device 701 having a hand-supportable housing 702 provided with an integrated base 702A which enables the laser-based bar code symbol detection and reading fields 10 and 11 projected from the housing 702 to be supported at any one of a number of positions above a counter surface at a POS station during the automatic hands-free mode of operation, shown in FIG. 8E2.

In the illustrative embodiment, the bar code symbol reading device 701 is operably connected to a host system 703 (e.g. electronic cash register system, data collection device, etc.) by a flexible multiwire communications cable 704 that extends from the integrated base portion 702A of the housing and is plugged directly into the data-input communications port of the host computer system 703. In the illustrative embodiment, electrical power from a low voltage direct current (DC) power supply (not shown) is provided to the device 701 by way of flexible power cable 706. Notably, this DC power supply can be realized in host computer system 703 or as a separate DC power supply adapter pluggable into a conventional 3-prong electrical socket. In an alternative embodiment of the present invention, cables 704 and 706 can be integrated to provide a single flexible, multi-wire cable for transmission of power to the device and data to the host system. In another embodiment of the present invention, the data communications cable 704 can be replaced with a wireless data packet transmission link, as described in detail hereinabove. Also, the power supply cord 706 and associated components can be replaced by providing a rechargeable battery within the hand-supportable housing 702, and optionally, a base unit can be provided for receiving a portion of the housing sufficient to enable battery recharging operations to take place in a safe and convenient manner.

As shown in FIG. 8E1, the head portion 707 supports and encloses a laser scanning bar code symbol reading engine 53 capable of producing a highly-collimated laser scanning pattern (not shown) through the light transmission window 710. The function of this scanning pattern is to scan bar code symbols 716 on objects 717 within a narrowly confined scanning (i.e. 3-D scanning field) volume 709, while preventing unintentional scanning of bar code symbols on objects located outside thereof at POS stations. Thus, by minimizing the amount of counter-space that must be clear (i.e. free) of bar coded items at point of sale POS stations, the omnidirectional bar code symbol reader 701 provides retailers with greater counter-space availability for displaying merchandise and the like, yet without sacrificing the increase in check-out performance and worker productivity associated with the use of bar code symbol scanners at POS stations.

As illustrated in FIG. 8E1, the head portion 707 of the hand-supportable housing has a light transmission window 710 mounted over the entire light transmission aperture 708. A rubber bumper 711 retains the light transmission window 710 and protects the circular edge of the housing when accidentally dropped or set down. In the preferred embodiment, the spectral transmission characteristics of the light transmission window 710 are such that all wavelengths greater (i.e. longer) than slightly less than 670 nm (e.g. longer than 665 nm) are permitted to exit and enter the interior volume of the housing with minimum attenuation. As a result of such characteristics, the visible laser line at 670 nanometers and the infra-red (IR) spectral line at 870 nm (produced from the object sensing circuitry hereof) are allowed to propagate through the transmission window, out of the head portion of the housing, and to reflect from an object/bar code surface, and then return through the transmission window. Notably, all other surfaces of the hand-supportable housing are opaque to electromagnetic radiation in the visible band.

As shown, manually activatable data transmission switches 712A and 712B are integrated on opposite sides of the housing below planar surfaces 702C and 702D in order to enable the user of the device to generate a data transmission control activation signal ($A_4=1$) whenever one of these data transmission switches 712A and 712B is depressed during system operation. Also, as shown in FIGS. 8E1 and 8E2, the base portion 702A of the device housing 702 has an integrated mode selection sensor 713 (e.g. electronic IR-based switch or mechanical switch) for detecting that the housing 702 has been placed upon a countertop or like surface 714, and thus the system should be automatically induced into its hands-free mode of operation by setting the control activation signal $A_4$ equal to $A_4=1$. When the hand-supportable housing is placed upon a countertop surface 714, mode selection sensor 713 automatically detects the presence of the countertop surface 714 and generates control activation signal $A_4=1$ in order to enable automatic data transmission in the hands-free mode of operation. When the hand-supportable housing 702 is picked-up from the countertop surface 714, mode selection sensor 713 automatically detects the absence of the countertop surface 714 and generates control activation signal $A_4=0$ in order to enable manually-activated data transmission in the hands-on mode of operation. As shown in FIG. 8E1, a set of color-coded state indicator lights 715 are mounted on the head portion of the housing 702, for visually displaying the particular state in which the system resides at any instant of time.

Figure 11A:
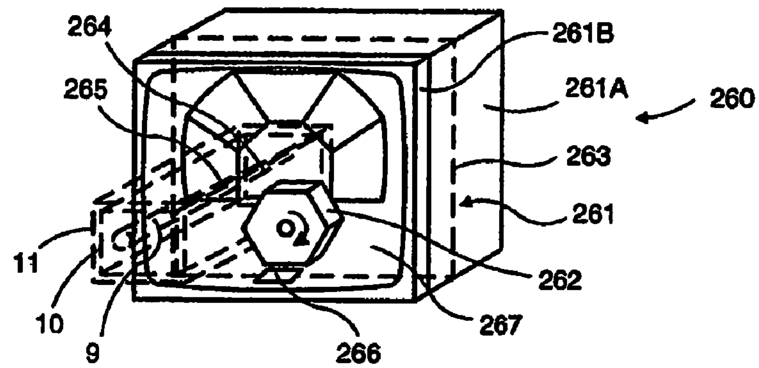
FIG. 11A is a perspective view of a seventh illustrative embodiment of the automatically-activated laser scanning bar code symbol reading engine of the present invention shown completely assembled and adapted for incorporation into any one of the bar code symbol reading devices of the present invention, and programmed for automatically reading bar code symbols using its IR-based object detection field, and its 2-D omnidirectional-type laser scanning (i.e. bar code detecting and reading) field in an automatic manner.
Figure 13A:
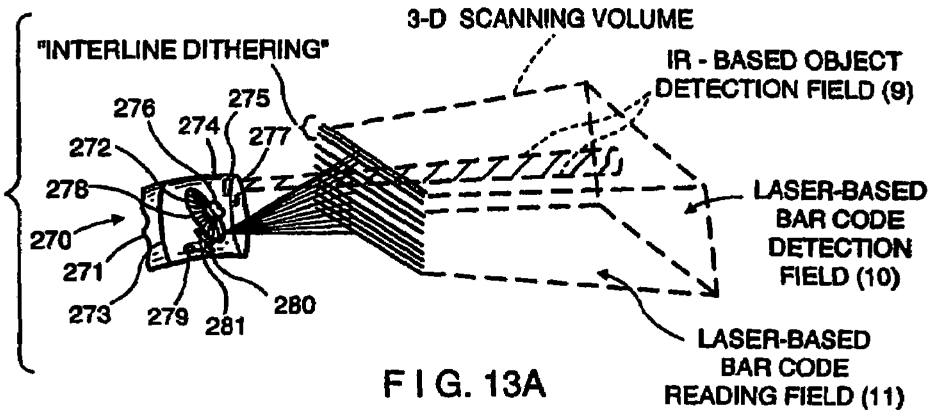
FIG. 13A is a perspective view of a tenth illustrative embodiment of the automatically-activated laser scanning bar code symbol reading engine of the present invention shown completely assembled, adapted for incorporation into any one of the bar code symbol reading devices of the present invention, and programmed for reading bar code symbols using its IR-based object detection field and its 2-D raster-type laser scanning (i.e. detecting and reading) field projected within a 3-D scanning volume in an automatic manner.

In general, any of the laser scanning engines disclosed in FIGS. 11A, 13A, and 14A can be incorporated within the hand-supportable housing of the bar code symbol reading system shown in FIG. 8E1, with little or no modification to the form factor thereof. When incorporated into hand-supportable housing 702 as shown, each of these laser scanning engines, indicated by reference numerical 53 shown in FIG. 8E1, will enable the automatic generation of: an IR-based object detection field 9 in response to powering-up of the laser scanning engine; containing a laser-based bar code symbol detection field 10 an omni-directional laser scanning pattern generated in response to automatic detection of objects within the IR-based object detection field 9; and a laser-based bar code symbol reading field 11 containing an omni-directional laser scanning pattern, generated in response to automatic detection of bar code symbols within the laser-based bar code symbol detection field 10, consistent with the structure and functions depicted in the schematic diagram of FIG. 1A.

As will be described in greater detail hereinafter, each of these laser scanning bar code symbol reading engines have the same general system architecture schematically illustrated in FIGS. 15A1 through 16. The system control process underlying this generalized system design is illustrated in the flow chart set forth in FIGS. 20A1 through 20E. The states of operation of this generalized system design are described in the state transition diagram of FIG. 21.

Twenty-Third Illustrative Embodiment of Automatically-Activated Bar Code Symbol Reading System of the Present Invention In FIG. 8F, the twenty-third illustrative embodiment of the automatically-activated bar code symbol reading system hereof 700' is shown comprising: a hand-supportable laser scanning bar code symbol reading device 701' adapted for support within a user's hand in the automatic hands-on mode of operation, and support upon a countertop or like surface in its automatic hands-free mode of operation. As shown, this automatically-activated bar code symbol reading system 700' is similar to the bar code symbol reading system 700 shown in FIGS. 8E1 and 8E2, in all but a few respects. Any of the laser scanning engines disclosed in FIGS. 11B, 13B, and 14B can be installed directly within the head portion of the bar code symbol reading device shown in FIG. 8F without requiring any modification thereto.

When incorporated into hand-supportable housing 702 as shown, each of these laser scanning engines, indicated by reference numerical 53' in FIG. 8F will enable automatic generation of: a low-power laser-based object detection field 23 in response to powering-up the laser scanning engine; a laser-based bar code symbol detection field 24 containing an omni-directional (visible) laser scanning pattern, generated in response to automatic object detection within the laser-based object detection field 23; and a laser-based bar code symbol reading field 25, containing an omni-directional visible laser scanning pattern, generated in response to automatic bar code symbol detection within the laser-based bar code symbol detection field 24, consistent with the structures and functions depicted in the schematic diagram of FIG. 1B.

As will be described in greater detail hereinafter, each of these laser scanning bar code symbol reading engines have the same general system architecture schematically illustrated in FIGS. 22A1 through 22C. The system control process underlying this generalized system design is illustrated in the flow chart set forth in FIGS. 23A1 through 23E. The states of operation of this generalized system design are described in the state transition diagram of FIG. 24.

Twenty-Fourth Illustrative Embodiment of Automatically-Activated Bar Code Symbol Reading System of the Present Invention In FIG. 8G, the twenty-fourth illustrative embodiment of the automatically-activated bar code symbol reading system hereof 700" is shown comprising: a hand-supportable laser scanning bar code symbol reading device 701" adapted for support within a user's hand in the automatic hands-on mode of operation, and support upon a countertop or like surface in its automatic hands-free mode of operation. As shown, this automatically-activated bar code symbol reading system 700" is similar to the bar code symbol reading system 700 shown in FIGS. 8E1 and 8E2, in all but a few respects. In particular, the bar code symbol reading device of FIG. 8G can incorporate within its hand-supportable housing 702, any of the laser scanning engines disclosed in FIGS. 11C, 13C, and 14C, with little or no modification to the form factor thereof. When incorporated into hand-supportable housing 702 as shown in FIG. 8G, each of these laser scanning engines (designated by 53" in FIG. 8G) enable automatic generation of: a laser-based bar code symbol detection field 37 containing an omni-directional visible laser scanning pattern, generated in response to powering-up the laser scanning engine; and a laser-based bar code symbol reading field 38 containing an omni-directional visible laser scanning pattern generated in response to automatic bar code symbol detection within the laser-based bar code symbol detection field 37, consistent with the structures and functions depicted in the schematic diagram of FIG. 1C.

In this illustrative embodiment, there is no form of automatic object detection provided with the bar code symbol reading device 700", as it is presumed that the bar code symbol reading device is not to be used in portable scanning applications, remote from its base unit or host system (e.g. cash register/computer), but rather is to be tethered to its host system by way of a flexible cord carrying both data and power lines between the bar code symbol reading device and the host computer. As will be described in greater detail hereinafter, each of these laser scanning bar code symbol reading engines shown in FIGS. 11C, 13C and 14C have the same general system architecture schematically illustrated in FIGS. 25A through 26. The system control process underlying this generalized system design is illustrated in the flow chart set forth in FIGS. 27A through 27C. The states of operation of this generalized system design are described in the state transition diagram of FIG. 28.

Having described the illustrative embodiments of the bar code symbol reading system of the present invention in great detail above, it is appropriate at this juncture to now describe in greater detail, each of the fifteen illustrative embodiments of the automatically-activated laser scanning engines of the illustrative embodiments hereof that can be incorporated into the above-described embodiments of the bar code symbol reading systems of the present invention.

Automatically-Activated Laser Scanning Engine for Producing IR-Based Object Detection Field, One-Dimensional Laser-Based Bar Code Symbol Detection Field, and One-Dimensional Laser-Based Bar Code Symbol Reading Field As shown in FIGS. 9A to 9D, the first illustrative embodiment of the automatically-activated bar code symbol reading engine hereof 200 comprises: a miniature engine housing 201 realized as small as a sugar-cube using presently available enabling technology, having a lower housing (i.e. base) portion 202A and an upper housing (i.e. cover) portion 202B; a HOE-based laser scanning module 203 as disclosed in copending application Ser. No. 09/071,512 entitled "DOE-Based System and Devices For Producing Laser Beams Having Modified Beam Characteristics" filed May 1, 1998, incorporated hereby reference, for producing and scanning a laser beam across a scanning field (i.e. bar code symbol detection field, and bar code symbol reading field); a PC board 204 for supporting electronic circuits used to realize the subsystems and subcomponents thereof shown in FIGS. 15A1 through 15A4, including a photodetector 226 coupled to analog and digital signal processing circuits and an infra-red transmitter 206A and an infrared receiver 206B coupled to the object detection subsystem realized on PC board, as taught in copending application Ser. No. 08/292,237 filed on Aug. 17, 1994; and a scanning window 227 for covering the transmission aperture 228 of the engine housing, and providing the optical functions taught in U.S. Pat. No. 5,789,731 incorporated herein by reference. Notably, the bar code symbol reading engine of FIG. 9A embodies the system architecture shown in FIGS. 15A1 through 16, carries out the control process illustrated in FIGS. 20A1 through 20E, and described by the state transition diagram of FIG. 21.

Figure 9A:
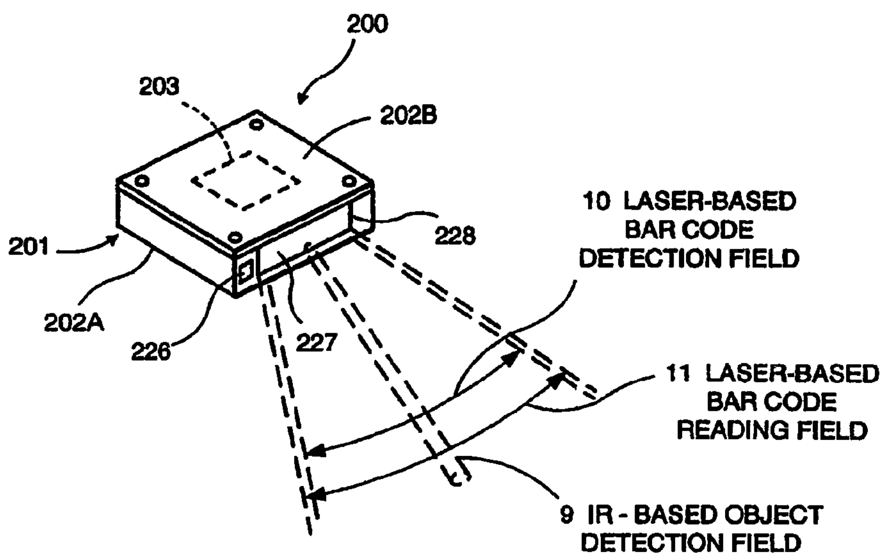
FIG. 9A is a perspective view of a first illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its IR-based object detection field and its 1-D laser-based scanning (i.e. bar code detection and reading) field.
Figure 9B:
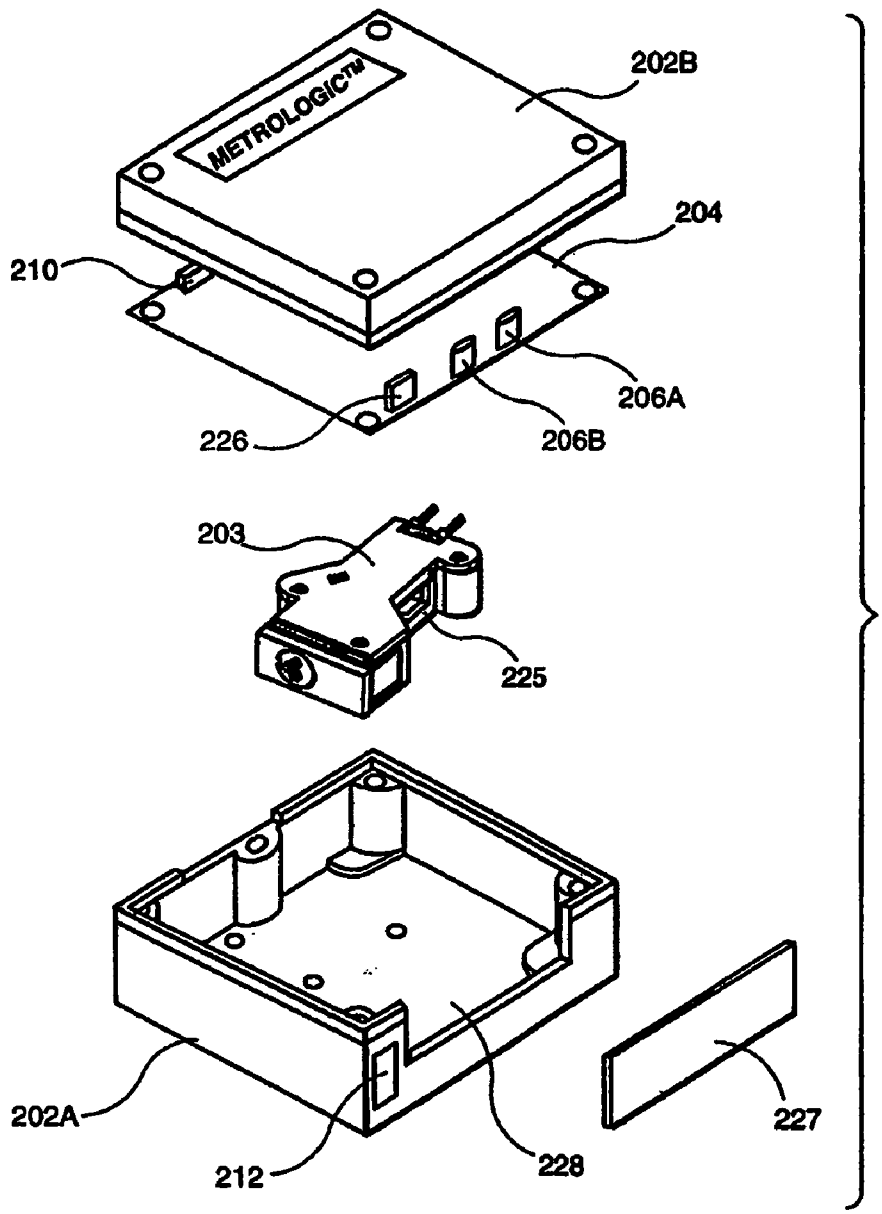
FIG. 9B is a perspective, exploded view of the automatically-activated laser-based bar code symbol reading engine shown in FIG. 9A.

As shown in FIG. 9B, the inside surface of the lower housing portion 202A functions as an optical bench (i.e. platform) whereupon the majority of optical and electro-optical components of the engine are mounted. As shown in FIG. 9B, the inside surface of the lower housing portion 202A supports PC board 204 on which the circuits of FIGS. 15A1 through 15A4 are realized using surface-mount componentry and like technology known in the art. Optionally, the data transmission circuit of the system can be realized on PC board 204 and the transmitting antenna 209, connected to PC board 204, mounted onto the exterior of engine housing. Notably, the produced output from this bar code symbol reading engine is an RF carrier signal modulated by a serial data stream in response to (i) the automatic reading of a bar code symbol by the engine 200, and (ii) the manual actuation of the data transmission switch mounted on the exterior of the scanner housing.

As shown in FIGS. 9A and 9B, light transmission aperture 228 is formed in the side of the lower housing portion 202A of the engine housing to allow the laser beam produced therewithin to exit the housing. Another aperture 212, coincident with photodetector 205, is formed in the front side lower surface of housing portion 202A, to allow return laser light to be detected by photodetector 226. In the illustrative embodiment, light transmission aperture 228 permits IR light to exit and enter the lower housing portion 202A, as shown. To permit a flexible wire harness to interconnect with the circuitry on PC board 204 by way of a conventional connector 210, an input/output aperture (not shown) is formed in the rear side panel of the lower housing portion 202A. With PC boards 204 installed within the interior of the lower housing portion 202A, the upper housing portion 202B is snap-fitted with the lower housing portion 202A and fastened thereto using a set of machine screws (not shown). Additional details regarding the optical layout and construction details of the preferred embodiment of bar code reading engine 200 will be described hereinafter.

As shown in FIG. 9C, the integrated holographic scanning device 203 comprises an assembly of subcomponents, namely: a module housing 204 made of lightweight plastic and serving as an optical bench for the optical components within the laser beam producing and scanning systems alike; a VLD 205 mounted to a VLD heat-sinking plate 206 through aperture 207 and producing a visible laser beam having elliptical, eccentric, divergent, and astigmatic beam characteristics in response to a voltage source applied to terminals 205A by way of a flexible circuit or other conductive structures well known in the art; a mounting bracket 208 having an aperture 208A for receiving a portion of the casing of the VLD 205 and a planar surface 208B affixing the associated heat-sinking plate 206 thereto, and also having side projections 208D and 208E for slidable receipt within spaced apart recesses 209A and 209B formed in the rear portion of the module housing 204; a collimating lens (L1) 210 for focusing the laser beam produced from the VLD; fixed spatial-frequency HOE (H1) 211, securely mounted within a first mounting slot 212 formed in the module housing 204, for modifying the beam characteristics of the laser beam output from collimating lens (L1) 210; fixed spatial-frequency HOE (H2) 213, securely mounted within a second mounting slot 214 formed in the module housing 204, for modifying the beam characteristics of the laser beam produced from HOE (H1) to produce the output laser beam; a radiation-absorbing wall surface 215 formed in the module housing 204, aligned with the zeroeth-order diffraction beam from HOE H1, and absorbing the zeroeth-order diffraction beam produced from HOE H1; electromagnetic (i.e. coil) 216 mounted within recess 217 in the module housing 204, for producing a magnetic force field in response to electrical current supplied to the input terminals thereof; scanning element 218 supporting light deflecting element (e.g. mirror, hologram, refractive element, etc.) 219 on the front surface of its free end, and permanent magnetic element 220 on the rear surface of its free end; mounting plates 221A and 221B for clamping the base portion of the scanning element 218, and mounting the same within recess 222 formed within the module housing 204; and a housing cover plate 223 for attachment to the top surface 224 of the module housing 204, and securing the laser beam producing and scanning mechanism components therewithin, while forming a scanning window 225 through which a scanned laser beam can be projected out into a scan field (e.g. bar code symbol detection field or bar code symbol reading field) for scanning.

In FIG. 9D, the integrated scanning module 203 of FIG. 9C is shown completely assembled. As illustrated, the output laser beam is scanned over its scan field which serves as the bar code symbol detection field and bar code symbol reading field, during bar code symbol detection and reading modes of operation, respectively. For greater details regarding the integrated scanning module of FIG. 9A through 9D, reference can be made to U.S. application Ser. No. 09/071,512 filed May 1, 1998, incorporated herein by reference.

Automatically-Activated Laser Scanning Engine for Producing Laser-Based Object Detection Field. One-Dimensional Laser-Based Bar Code Detection Field, and One-Dimensional Laser-Based Bar Code Reading Field In FIG. 9E, the second illustrative embodiment of the automatically-activated bar code symbol reading engine hereof 200' comprises: a miniature engine housing 201 realized as small as a sugar-cube using presently available enabling technology, having a lower housing (i.e. base) portion 202A and an upper housing (i.e. cover) portion 202B; a HOE-based laser scanning module 203 as disclosed in copending application Ser. No. 09/071,512 filed May 1, 1998, incorporated hereby reference, for producing and scanning a laser beam across a scanning field; a PC board 204 (similar to that shown in FIG. 9B) for supporting electronic circuits used to realize the subsystems shown in FIGS. 22A1 through 22C, including a photodetector 226 coupled to analog and digital signal processing circuits realized on PC board 204, as taught in copending application Ser. No. 08/292,237 filed on Aug. 17, 1994; and a scanning window 227 for covering the transmission aperture 228 of the engine housing, and providing the optical functions taught in U.S. Pat. No. 5,789,731 incorporated herein by reference. In all but a few respects, the bar code symbol reading engine 200' is similar to the bar code symbol engine 200 of FIG. 9A, except that the engine 200' shown in FIG. 9E generates a laser-based object detection field (23), rather than an IR-based object detection field 9.

Figure 22B:
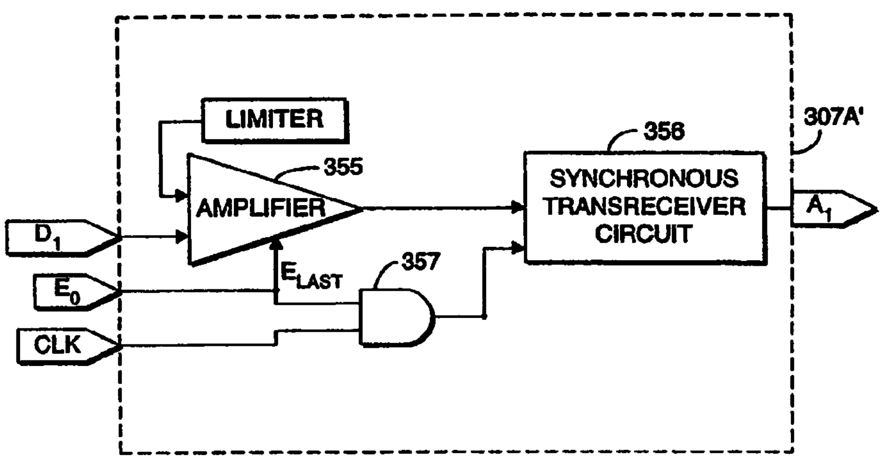
FIG. 22B is a block functional diagram of the laser-based object detection circuit in the bar code symbol reading system of FIGS. 22A1 through 22A4.
Figure 23A:
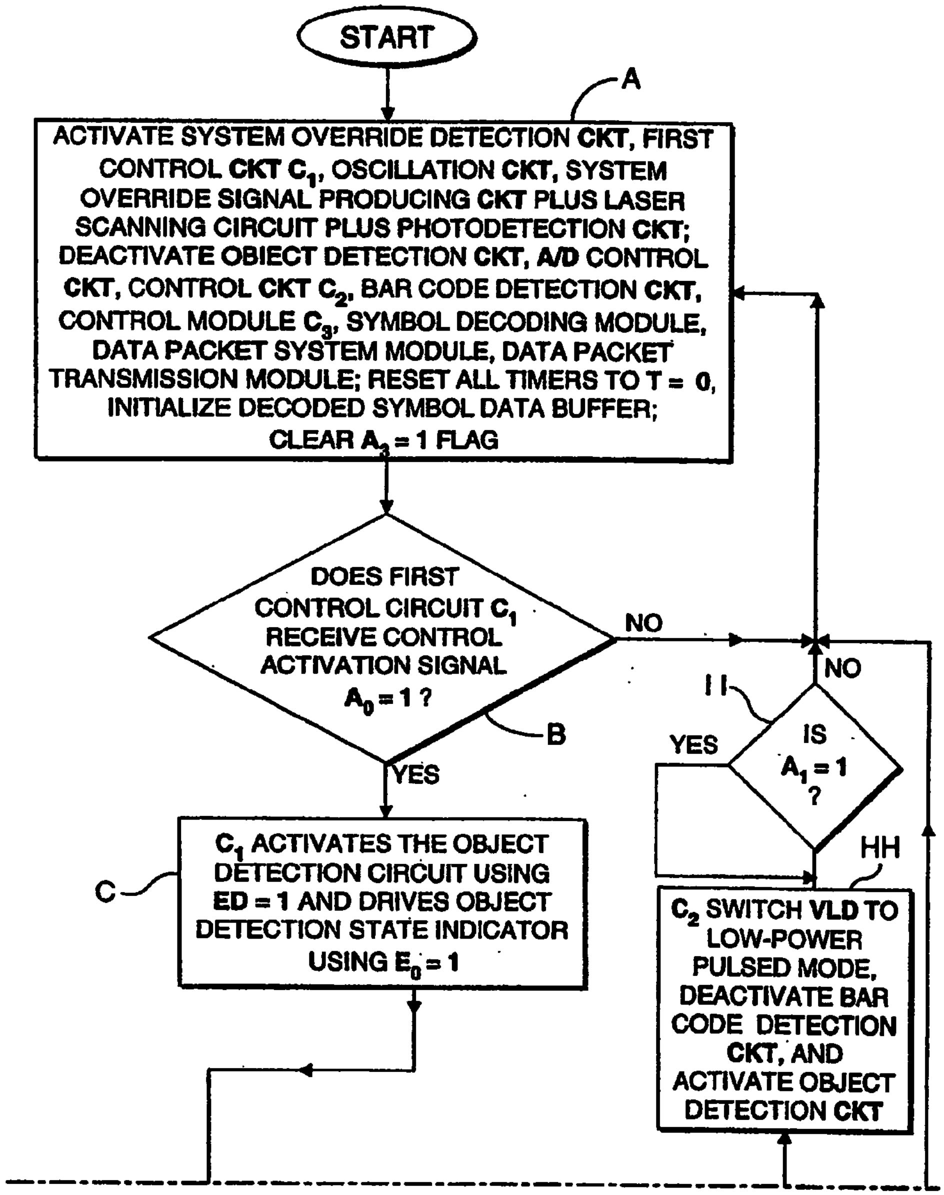
Figure 23C:
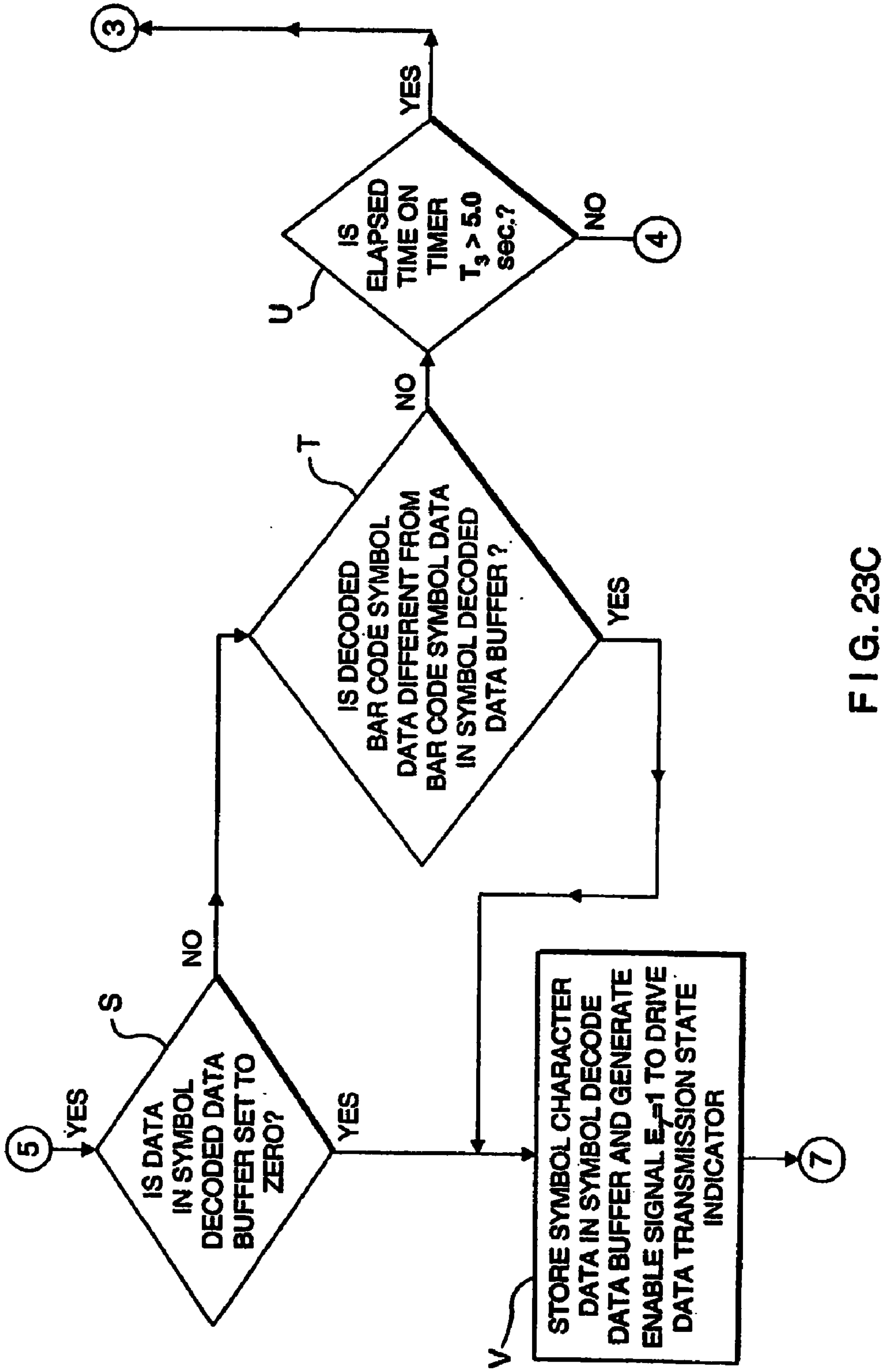
Figure 23D:
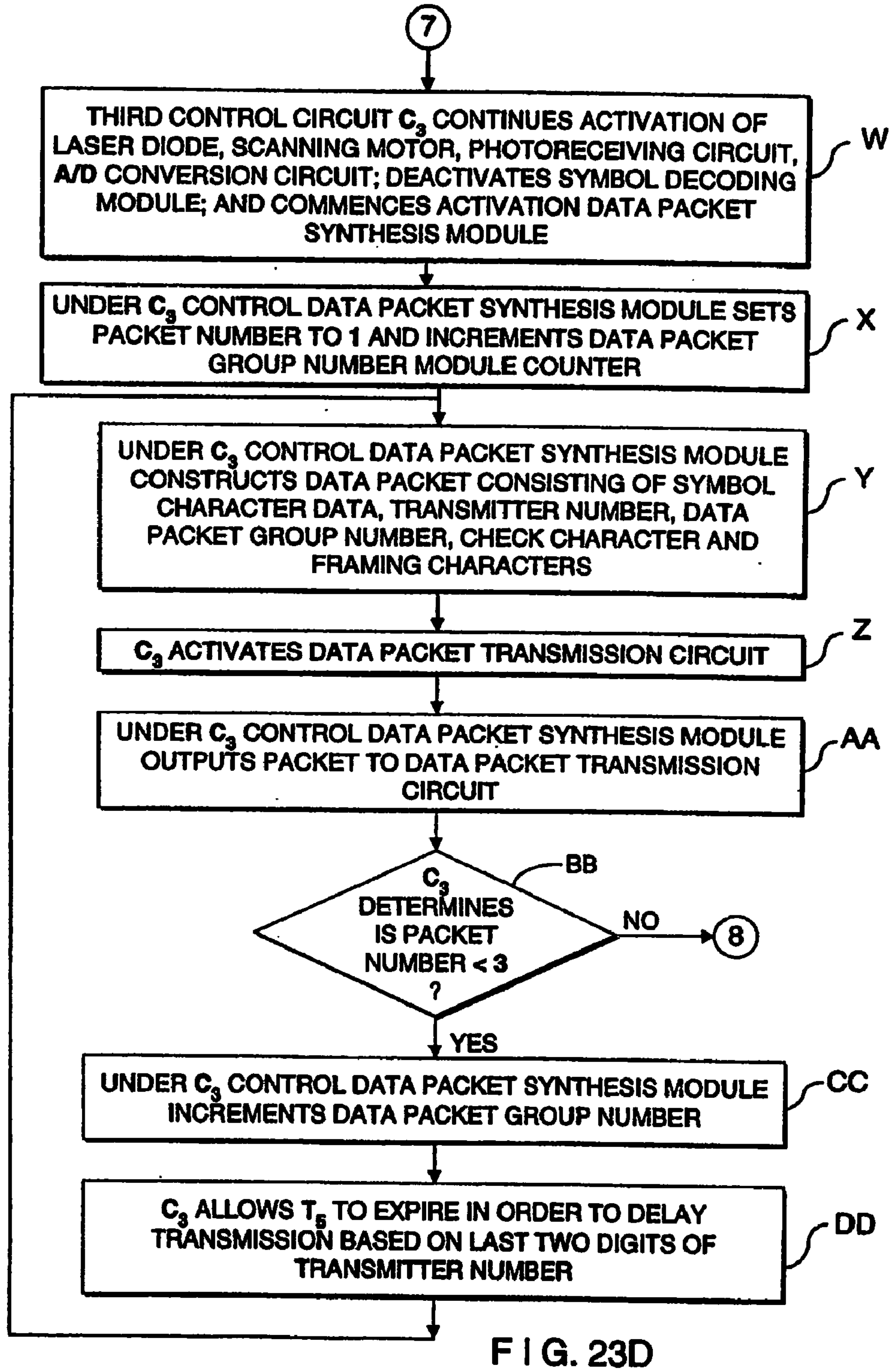
Figure 23E:
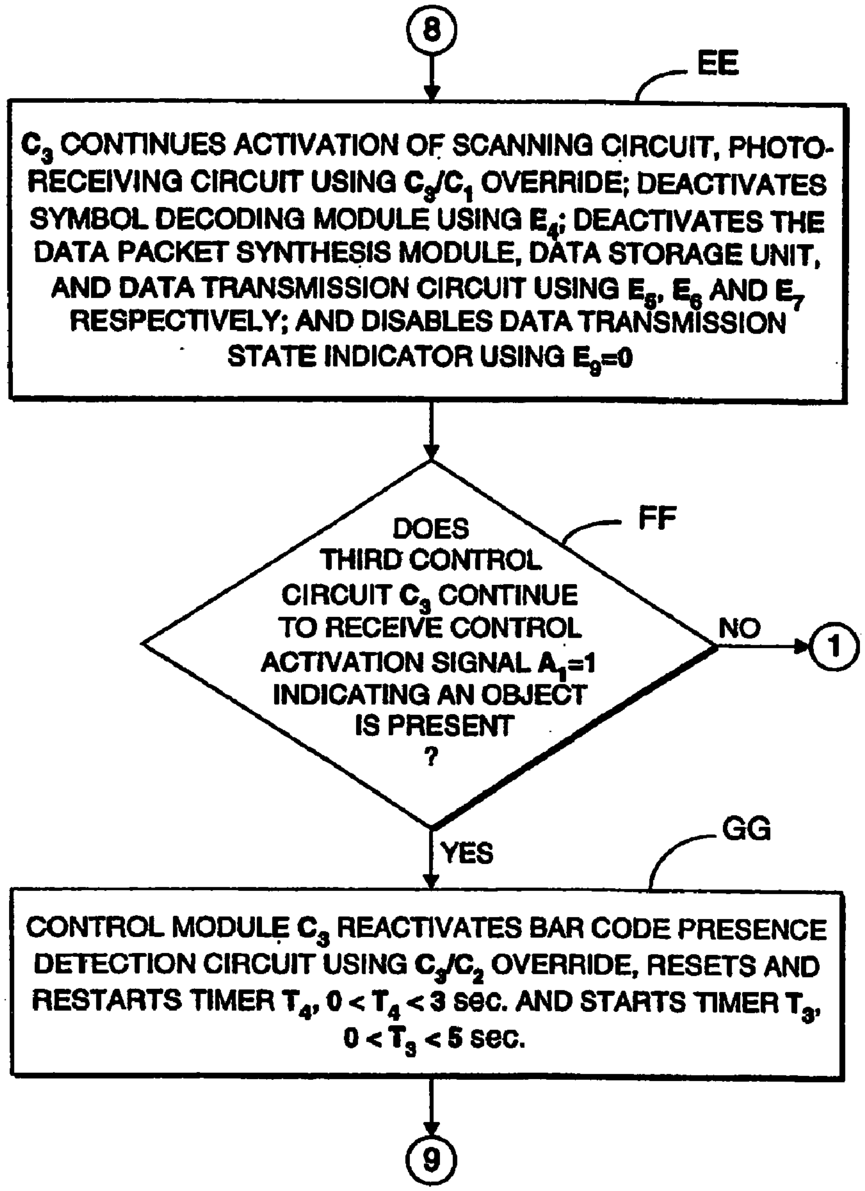
Figure 24:
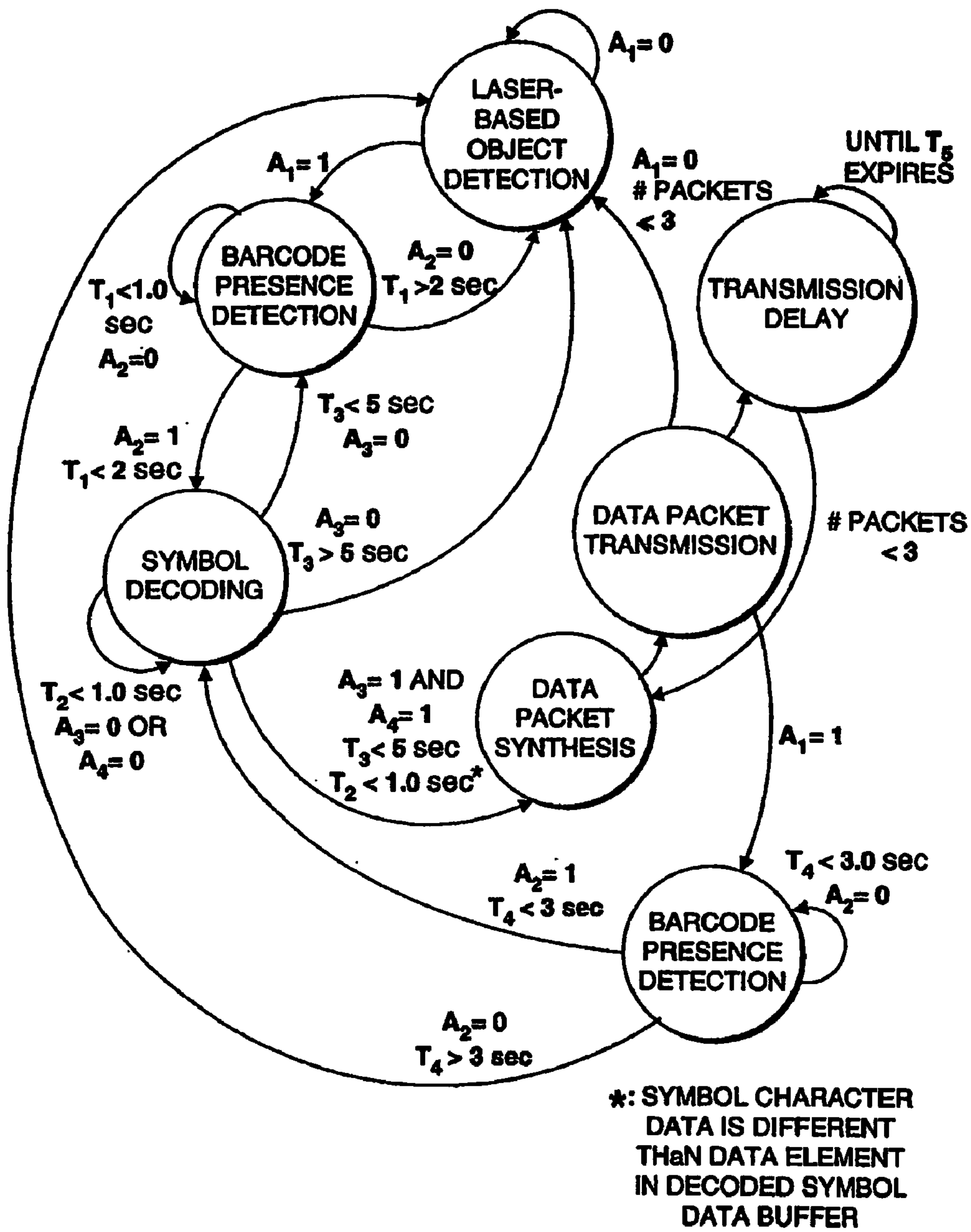
FIG. 24 is a state diagram illustrating the various states that the automatically-activated bar code symbol reading system of FIGS. 22A1 through 22A4 may undergo during the course of its programmed operation.

Notably, the bar code symbol reading engine of FIG. 9E embodies the system architecture shown in FIGS. 22A1–22C, and carries out the control process illustrated in FIGS. 23A1 through 23E, and bounded by the state transition diagram of FIG. 24. As will be described in greater detail hereinafter, the laser-based objection detection field 23 can be generated by driving a conventional VLD so as to produce a low-power, nonvisible (or otherwise imperceptible) pulsed laser beam during the object detection mode of operation, as taught in U.S. Pat. No. 4,933,538, incorporated herein by reference. In this mode of operation, the same photodetector 226 used to detect reflected laser light, during the laser-based bar code symbol and reading modes of operation, can be used to detect the nonvisible laser return signal during the object detection mode of operation. In this illustrative embodiment, the nonvisible pulsed laser signal, reflected off an object present in the laser-based object detection field 23, and detected by photodetector 226, is processed so as to detect the presence of the object located therewithin and automatically generate a control activation signal $A_1=1$, indicative of such automatic object detection. In all other respects, the bar code symbol reading engine of FIG. 9E is substantially similar to the bar code symbol reading engine of FIG. 9A.

Automatically-Activated Laser Scanning Engine for Producing One-Dimensional Laser-Based Bar Code Detection Field, and One-Dimensional Laser-Based Bar Code Reading. Without Object Detection Field In FIG. 9F, the third illustrative embodiment of the automatically-activated laser scanning engine 200" is shown comprising: a miniature engine housing 201 realized as small as a sugar-cube using presently available enabling technology, having a lower housing (i.e. base) portion 202A and an upper housing (i.e. cover) portion 202B; a HOE-based laser scanning module 203 as disclosed in copending application Ser. No. 09/071,512 filed May 1, 1998, incorporated hereby reference, for producing and scanning a laser beam across a scanning field; a PC board 204 (similar to that shown in FIG. 9B) for supporting electronic circuits used to realize the subsystems shown in FIGS. 25A through 26, including a photodetector 226 coupled to analog and digital signal processing circuits realized on PC board 204, as taught in copending application Ser. No. 08/292, 237 filed on Aug. 17, 1994; and a scanning window 227 for covering the transmission aperture 228 of the engine housing, and providing the optical functions taught in U.S. Pat. No. 5,789, 731 incorporated herein by reference.

Figure 27A:
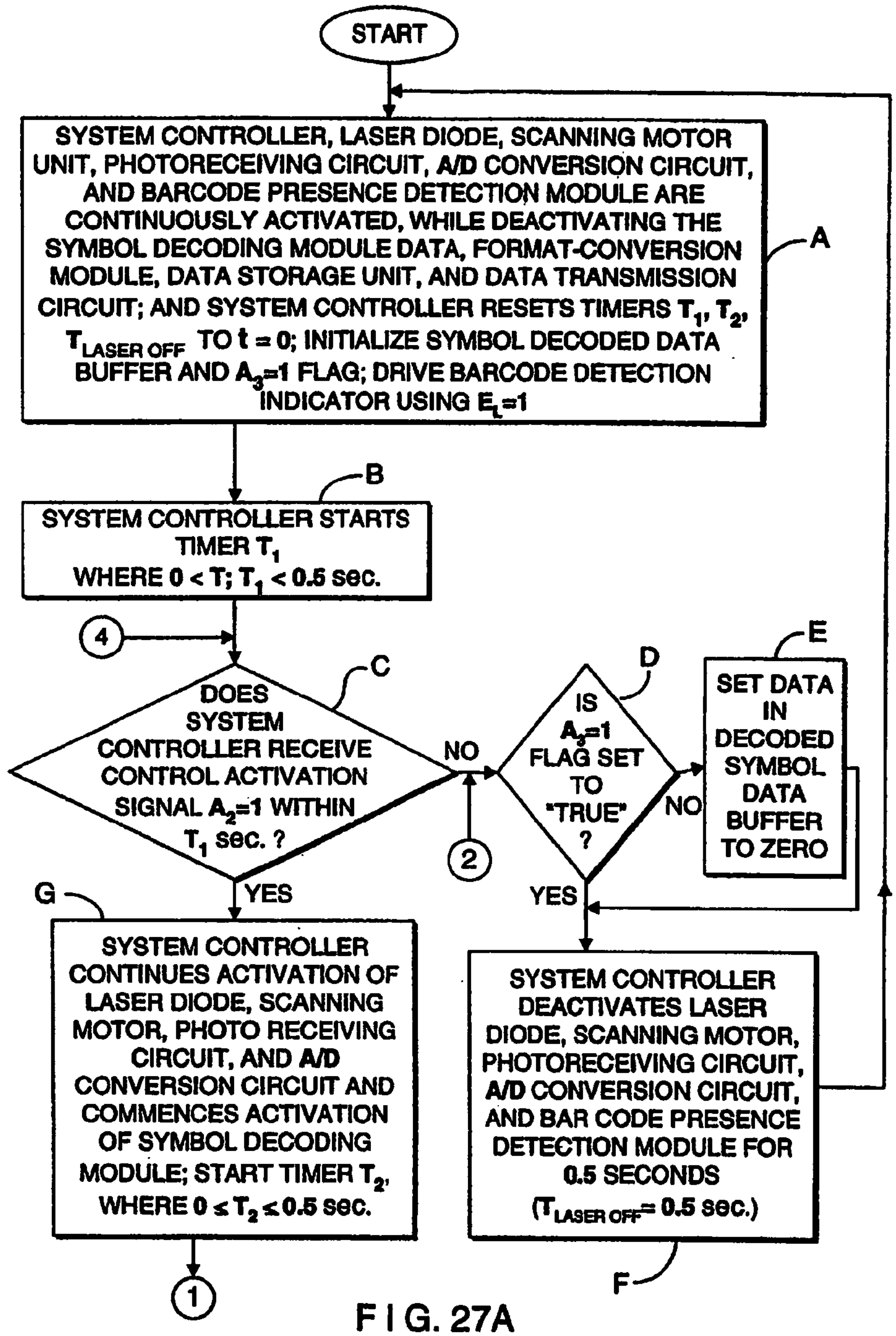
Figure 27C:
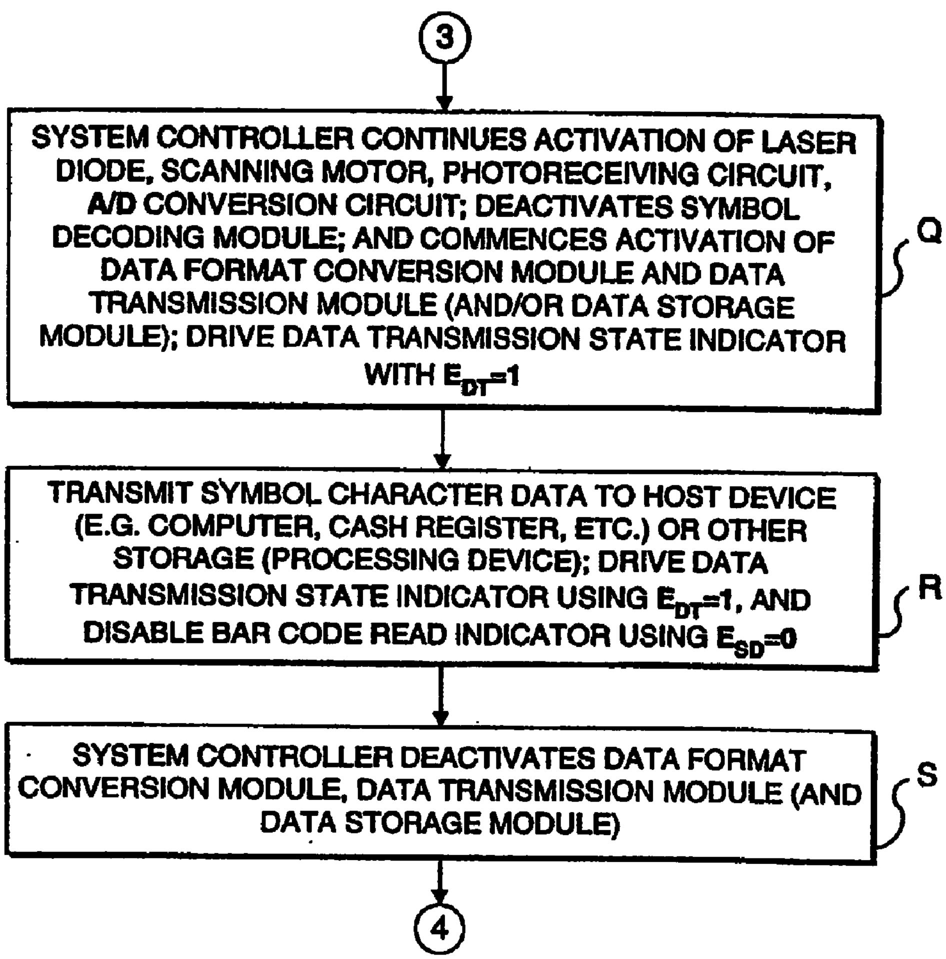
Figure 28:
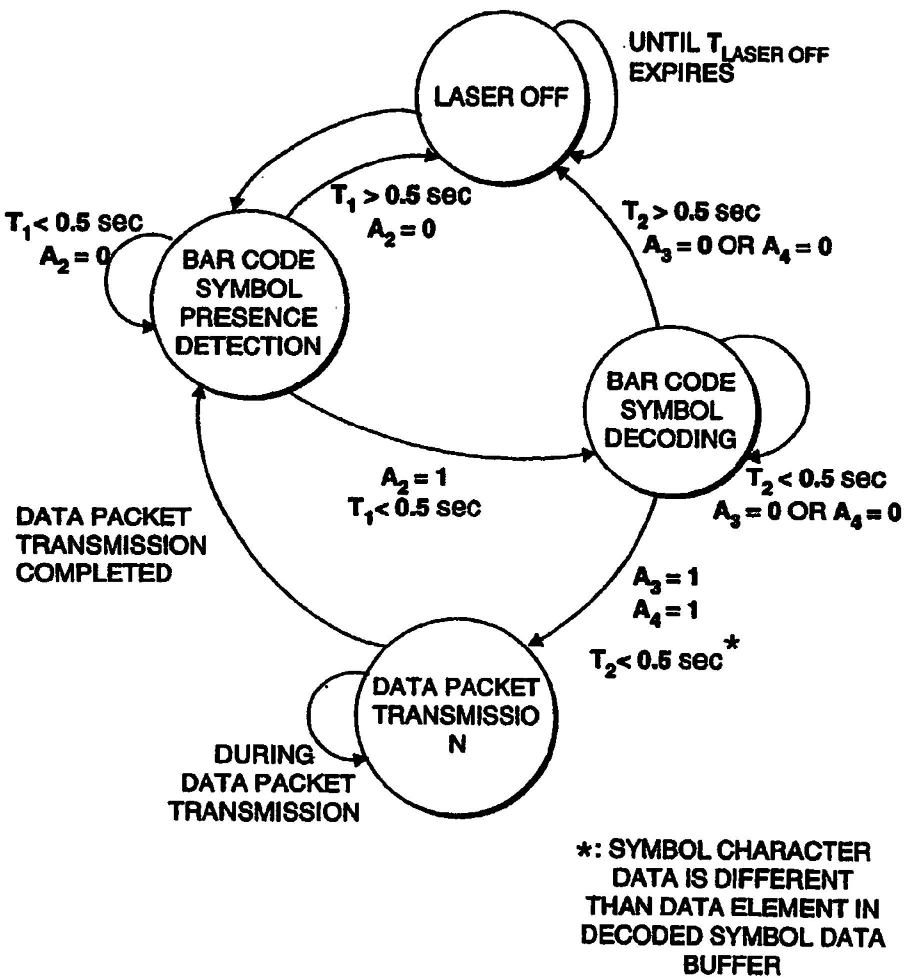
FIG. 28 is a state diagram illustrating the various states that the automatically-activated bar code symbol reading system of FIGS. 25A and 25B may undergo during the course of its programmed operation.

Notably, the bar code symbol reading engine of FIG. 9F embodies the system architecture shown in FIGS. 25A through 26, and carries out the control process illustrated in FIGS. 27A through 27C, and bounded by the state transition diagram of FIG. 28. In all but a few respects, the bar code symbol reading engine 200" of FIG. 9F is similar to the bar code symbol engines of FIGS. 9A and 9E, except that the bar code symbol reading engine of FIG. 9F does not generate any sort of object detection field. Instead, it generates a laser-based bar code symbol detection field 37 in a cyclical manner detecting the presence of bar code symbols present and automatically generating a control activation signal ($A_2=1$) indicative of such bar code symbol detection. In response to the generation of this control activation signals, the bar code symbol reading engine 200" automatically generates a laser-based bar code symbol reading field 38 for scanning the detected bar code symbol, collecting the scan data generated therefrom, and decode processing the same. Upon each successful decode processing of collected scan data, bar code symbol character data and control activation signal $A_3=1$ are automatically generated. If the data transmission control activation signal $A_4=1$ is provided to the engine within a predetermined time frame, then the engine automatically transmits subsequently produced symbol character data (from the same bar code symbol) to the host system, or intended data storage and/or processing device that is associated with the bar code symbol reading system, within which the engine 200" is embedded.

Automatically-Activated Laser Scanning Engine for Producing IR-Based Object Detection Field, Two-Dimensional Laser-Based Bar Code Detection Field, and Two-Dimensional Laser-Based Bar Code Detection Field In FIGS. 10A through 10D, the fourth illustrated embodiment of the automatically-activated laser scanning engine hereof 230 is shown comprising: a miniature engine housing 231 realized as small as a sugar-cube using presently available enabling technology, having a lower housing (i.e. base) portion 231A and an upper housing (i.e. cover) portion 231B; a HOE-based x-y laser scanning module 232 as disclosed in copending application Ser. No. 09/071,512 entitled "DOE-Based System and Devices For Producing Laser Beams Having Modified Beam Characteristics" filed May 1, 1998, incorporated hereby reference presented on the inside surface of housing cover portion 231B, for producing and scanning a laser beam across a scanning field; a PC board 233 for supporting electronic circuits used to realize the subsystems and subcomponents thereof shown in FIGS. 15A1–16, including a photodetector 234 coupled to analog and digital signal processing circuits on the PC board 233, and an infra-red transmitter 235 and an infrared receiver 236 coupled to the IR-based object detection circuit of the engine realized on PC board 233, as taught in copending application Ser. No. 08/292,237 filed on Aug. 17, 1994; and a scanning window 237 for covering the transmission aperture 238 of the engine housing, and providing the optical functions taught in U.S. Pat. No. 5,789,731 incorporated herein by reference. Notably, the bar code symbol reading engine of FIG. 10A embodies the system architecture shown in FIGS. 15*a*! through 16, and carries out the control process illustrated in FIGS. 20A1 through 20E, and bounded by the state transition diagram of FIG. 21.

As shown in FIG. 10D, the underside surface of the upper housing portion 213B functions as an optical bench (i.e. platform) whereupon the majority of optical and electro-optical components of the x-y laser scanning mechanism are strategically mounted. As shown in FIG. 10D, the lower housing portion 231A supports PC board 233, on which the circuits of FIG. 15A1 through 15A4 are realized using surface-mount componentry and like technology known in the art. Optionally, the data transmission subsystem can be realized on PC board 233 while the transmitting antenna 240, connected to PC board 233, is mounted onto the exterior of engine housing. Notably, the produced output from this embodiment of the bar code symbol reading engine is a RF carrier signal modulated by a serial data stream in response to the occurrence of the following two events: (i) the automatic reading of a bar code symbol by the engine 230, and (ii) the manual actuation of the data transmission switch on the exterior of the scanner housing within the predefined time window maintained and monitored by the control process in the engine.

As shown in FIGS. 10B and 10C, light transmission aperture 238 permits IR light to exit and enter the lower housing portion 231A, as shown. To permit a flexible wire harness e.g. (between the bar code symbol reading engine and a data packet transmission circuit on an external PC board to interconnect with the circuitry on PC board 233 by way of a conventional connector, an input/output aperture 242 is formed in the rear side panel of the lower housing portion 231A, as shown FIG. 10C. With PC board 233 installed within the interior of the lower housing portion, the upper housing portion 231B is snap-fitted with the lower housing portion 231A and fastened thereto in a conventional manner.

In FIG. 10D, the integrated scanning module 232 embodied within engine 230 is shown comprising a CLD 245, a pair of spread apart scanning elements 246 and 247 mounted on optical band 248, and driven by electromagnetic coil 249 and 250, respectively. Notably, x and y direction scanning elements 247 and 246 are constructed and driven in a damped, off-resonant mode of operation, as detailed in Applicant's copending U.S. application Ser. No. 08/931,691 filed Sep. 16, 1997 and International Application No. PCT/US98/19488 filed Sep. 16, 1998, both Applications being incorporated herein by reference. During the bar code symbol detection mode, the laser beam is scanned throughout a 2-D bar code symbol detection field. During the bar code symbol reading mode of operation, the laser beam is scanned throughout a 2-D bar code symbol reading field.

As illustrated in FIGS. 10A and 10D, the output laser beam 251 is scanned over the x and y direction of its 2D laser scanning field which functions as the bar code symbol detection field during bar code symbol detection mode of operation, and the bar code symbol reading field during the bar code symbol reading mode of operation.

Figure 10E:
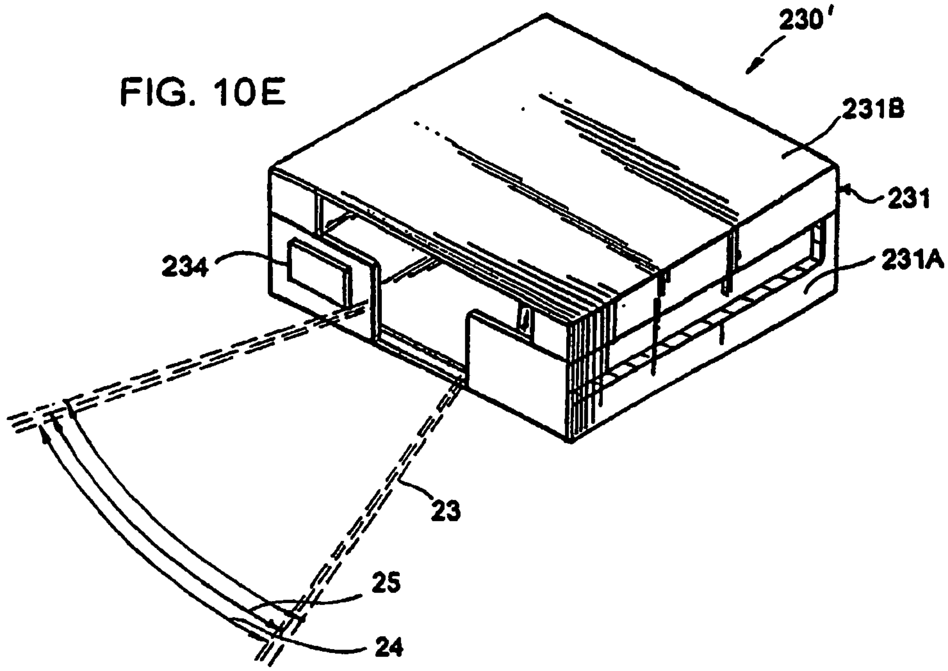
FIG. 10E is a perspective view of a fifth illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its laser-based object detection field and its 2-D laser-based scanning (i.e. bar code detecting and reading) field in an automatic manner.

Automatically-Activated Laser Scanning Engine for Producing Laser-Based Object Detection Field, Two-Dimensional Laser-Based Bar Code Detection Field, and Two-Dimensional Laser-Based Bar Code Detection Field In FIG. 10E, the fifth illustrative embodiment of the automatically-activated laser scanning engine hereof 230' is shown. In nearly all but a few respects, the bar code symbol reading engine of FIG. 10E is substantially similar to the bar code symbol reading engine of FIG. 10A, except that the engine of FIG. 10E produces a laser-based detection field similar, in principle, to the one produced by the engine of FIG. 9E. Notably, the bar code symbol reading engine of FIG. 10E embodies the system architecture shown in FIGS. 22A1 through 22C, and carries out the control process illustrated in FIGS. 23A1 through 23E, and bounded by the state transition diagram of FIG. 24. The same techniques described in connection with the engine of FIG. 9E can be used to generate the laser-based object detection field from the laser scanning engine of FIG. 10E. Also, during the bar code symbol detection and reading modes of operation, the engine of FIG. 10E is capable of producing 2-D raster-type laser scanning patterns for carrying out bar code symbol detection and reading operations. Advantageously, the use of a raster-type (2-D) laser scanning pattern during these modes of operation enable more aggressive bar code symbol detection and reading of Postnet and PDF type bar code symbols.

Figure 10F:
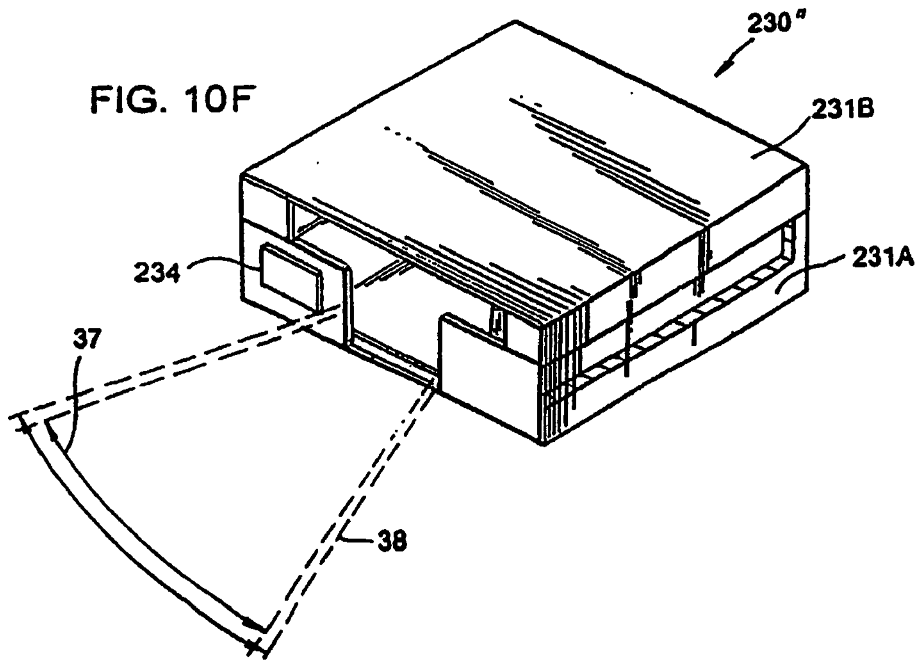
FIG. 10F is a perspective view of a sixth illustrative embodiment of the automatically-activated laser scanning bar code symbol reading engine of the present invention, shown completely assembled, adapted for incorporation into any one of the bar code symbol reading devices of the present invention, and programmed for automatically reading bar code symbols using its 2-D laser-based scanning (i.e. bar code detecting and scanning) field, without automatic object detection.

Automatically-Activated Laser Scanning Engine for Producing Two-Dimensional Laser-Based Bar Code Detection Field, and Two-Dimensional Laser-Based Bar Code Detection Field. Without An Object Detection Field In FIG. 10F, the sixth illustrative embodiment of the automatically-activated laser scanning engine hereof 230" is shown. In nearly all but a few respects, the bar code symbol reading engine of FIG. 10F is substantially similar to the bar code symbol reading engine of FIG. 10A, except that the engine of FIG. 10F does not produce any sort of objection detection field. Instead, the engine shown in FIG. 10F relies on the use of automatic laser-based bar code symbol detection in which a visible laser beam is operated in a pulse mode of operation (e.g. housing about a 50% duty cycle). Notably, the bar code symbol reading engine of FIG. 10F embodies the system architecture shown in FIG. 25, and carries out the control process illustrated in FIGS. 27A through 27C, and bounded by the state transition diagram of FIG. 28. As in the case of FIG. 10E, the engine of FIG. 10F is capable of producing 2-D raster-type laser scanning patterns for carrying out bar code symbol detection and reading operations during the bar code symbol detection and reading modes of operation, respectively. Advantageously, the use of a raster-type laser scanning pattern during these modes of operation enables more aggressive bar code symbol detection and reading of Postnet and PDF type bar code symbols.

Automatically-Activated Laser Scanning Engine for Producing IR-Based Object Detection Field, Omni-Dimensional Laser-Based Bar Code Detection Field, and Omni-Dimensional Laser-Based Bar Code Detection Field In FIG. 11A, a seventh automatically-activated laser scanning engine hereof 260 is shown comprising: an ultra-compact engine housing 261 having a lower housing (i.e. base) portion 261A and an upper housing (i.e. cover) portion 261B; a polygon-based laser scanning module or mechanism 262, as disclosed in U.S. Pat. No. 5,796,091, incorporated here by reference, having an optical bench with optical and electro-optical components mounted thereon, for producing and scanning a laser beam across an omnidirectional scanning field; a PC board 263 for supporting electronic circuits used to realize the subsystems shown in FIGS. 15A1 and 16, including an IR transmitter and receiver 264 and 265 coupled to an object detection circuit realized on PC board 263, and a photodetector 266 coupled to analog and digital signal processing circuits realized on a PC board 263, as taught in U.S. Pat. No. 5,976,091; and a scanning window 267 for covering the transmission aperture of the engine housing, and providing the optical functions taught in U.S. Pat. No. 5,789,731 incorporated herein by reference.

Figure 20B:
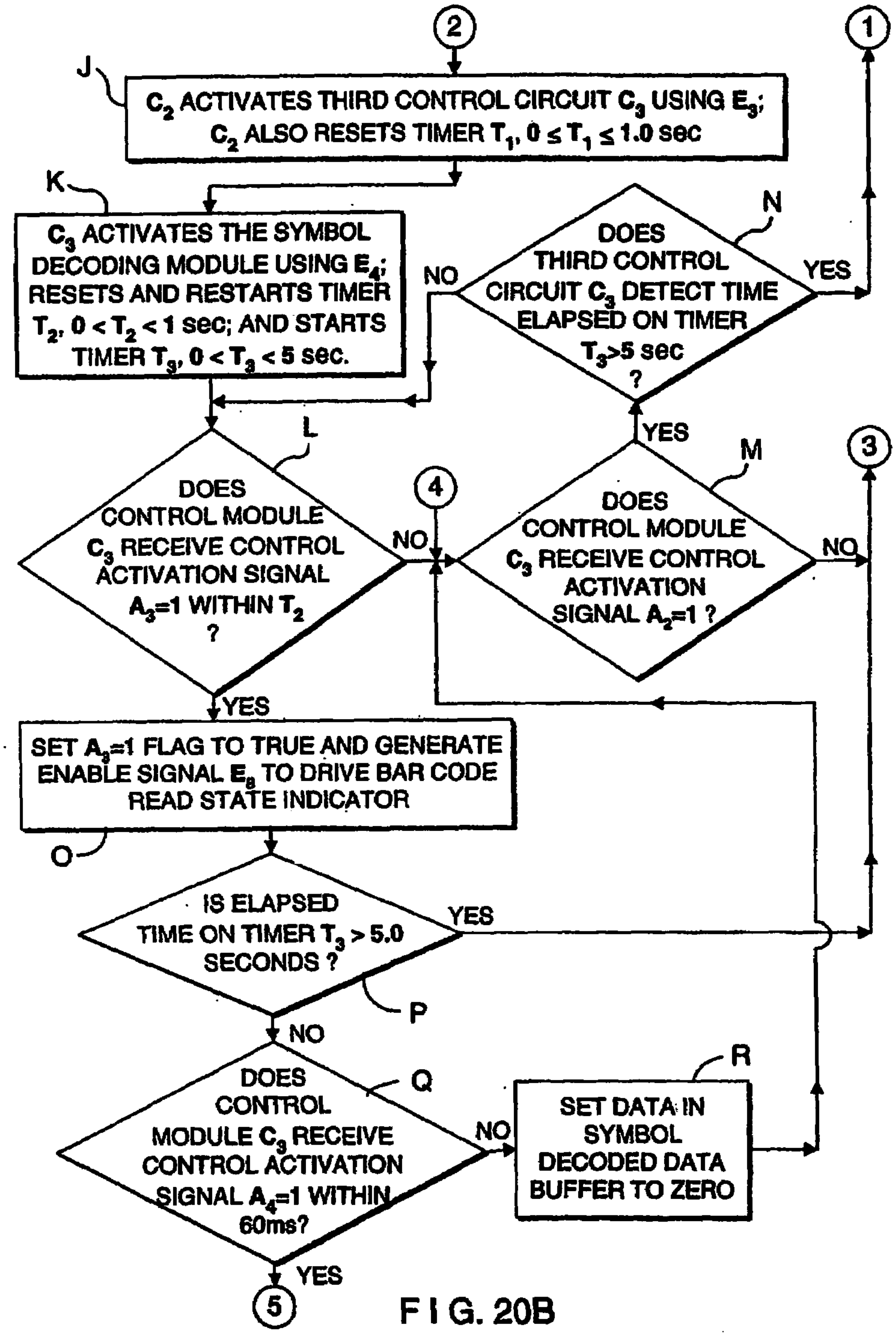
Figure 20C:
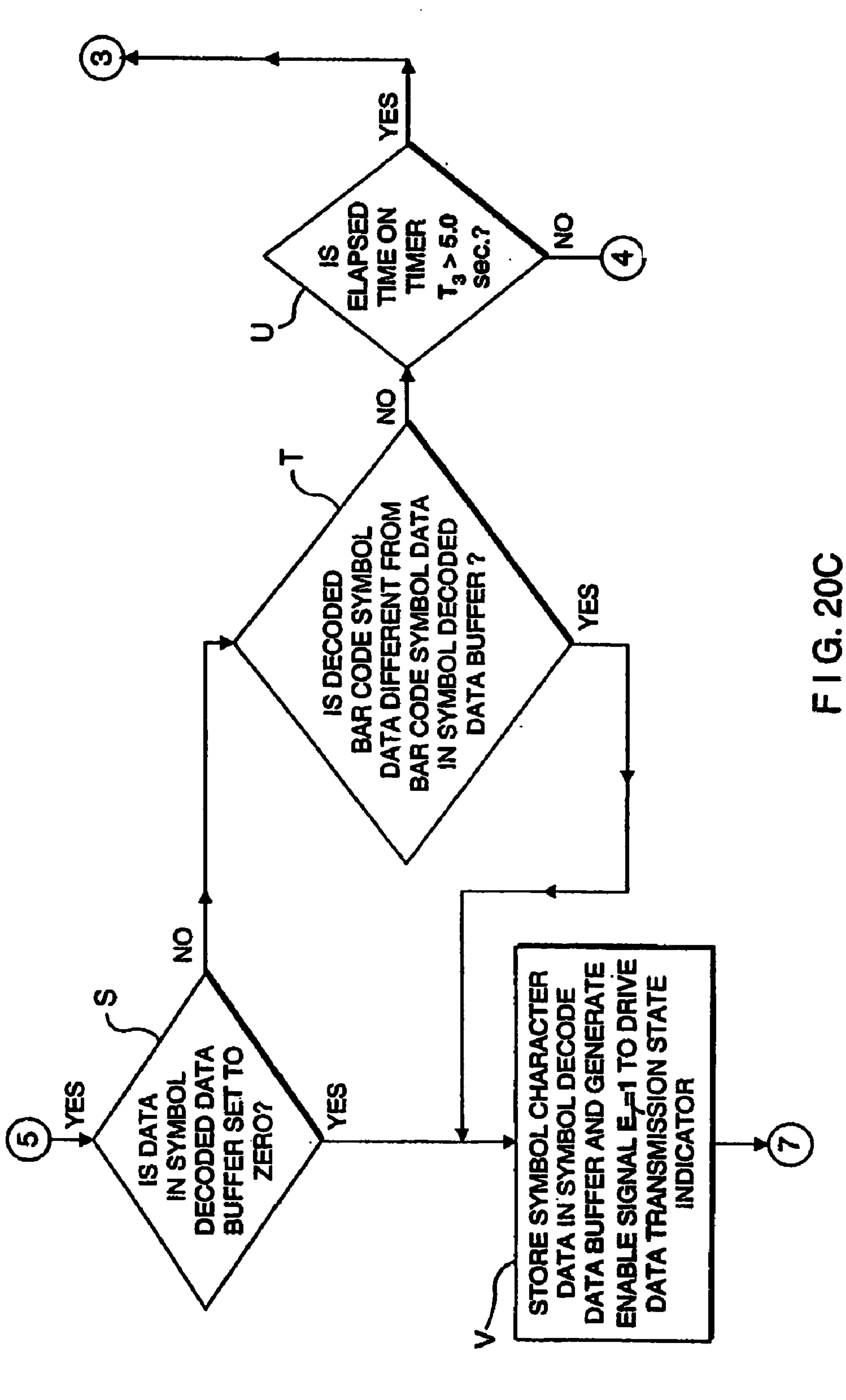
Figure 20D:
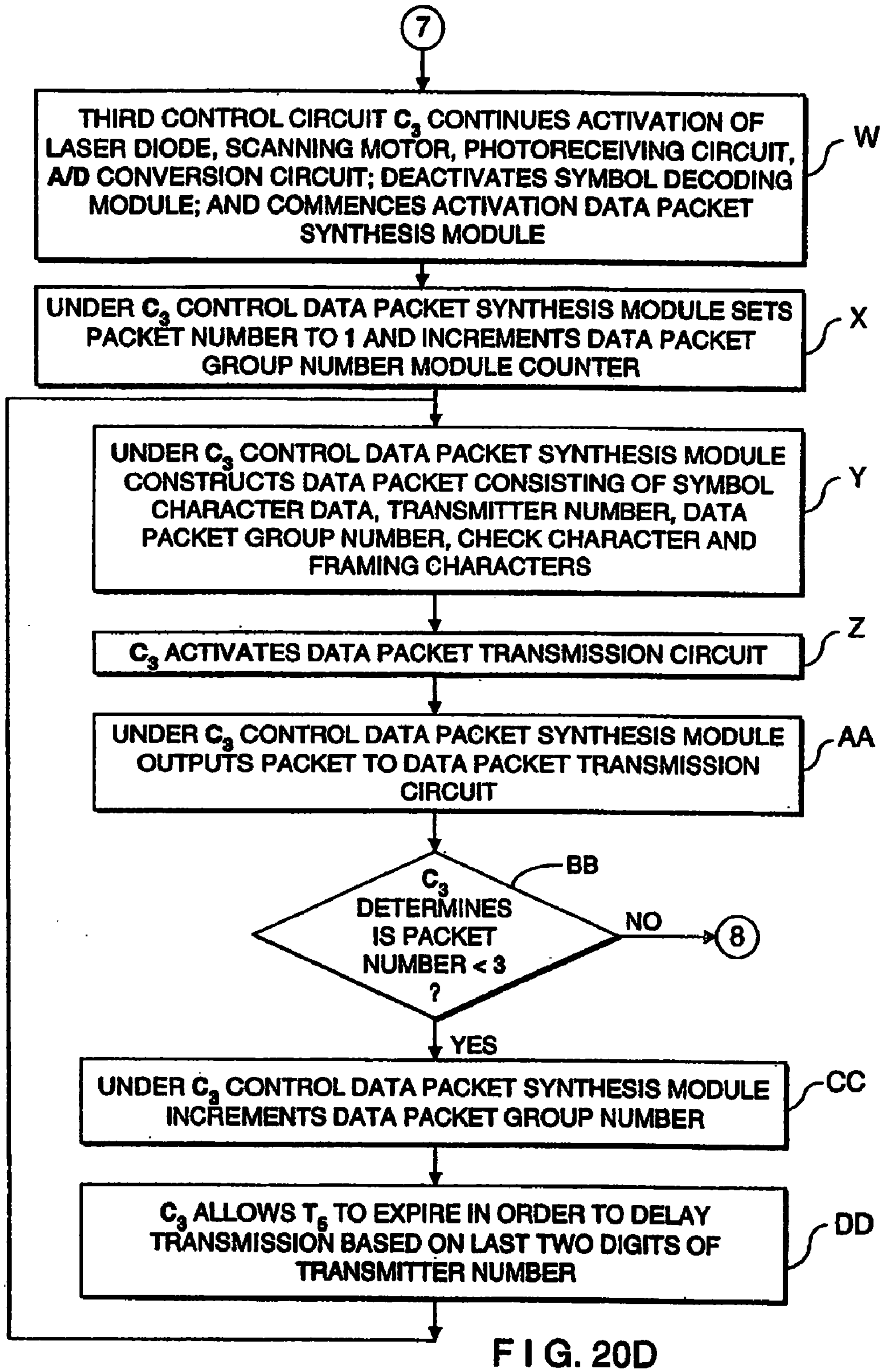
Figure 20E:
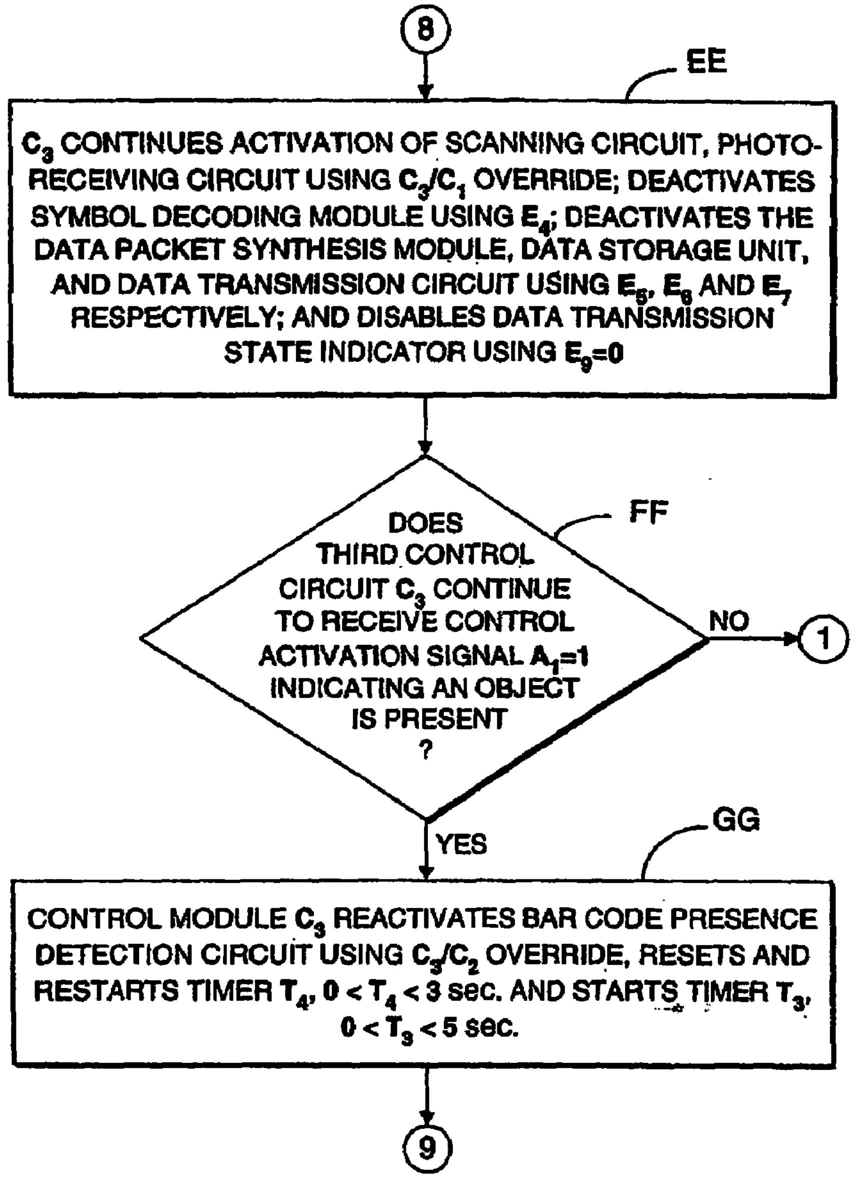
Figure 21:
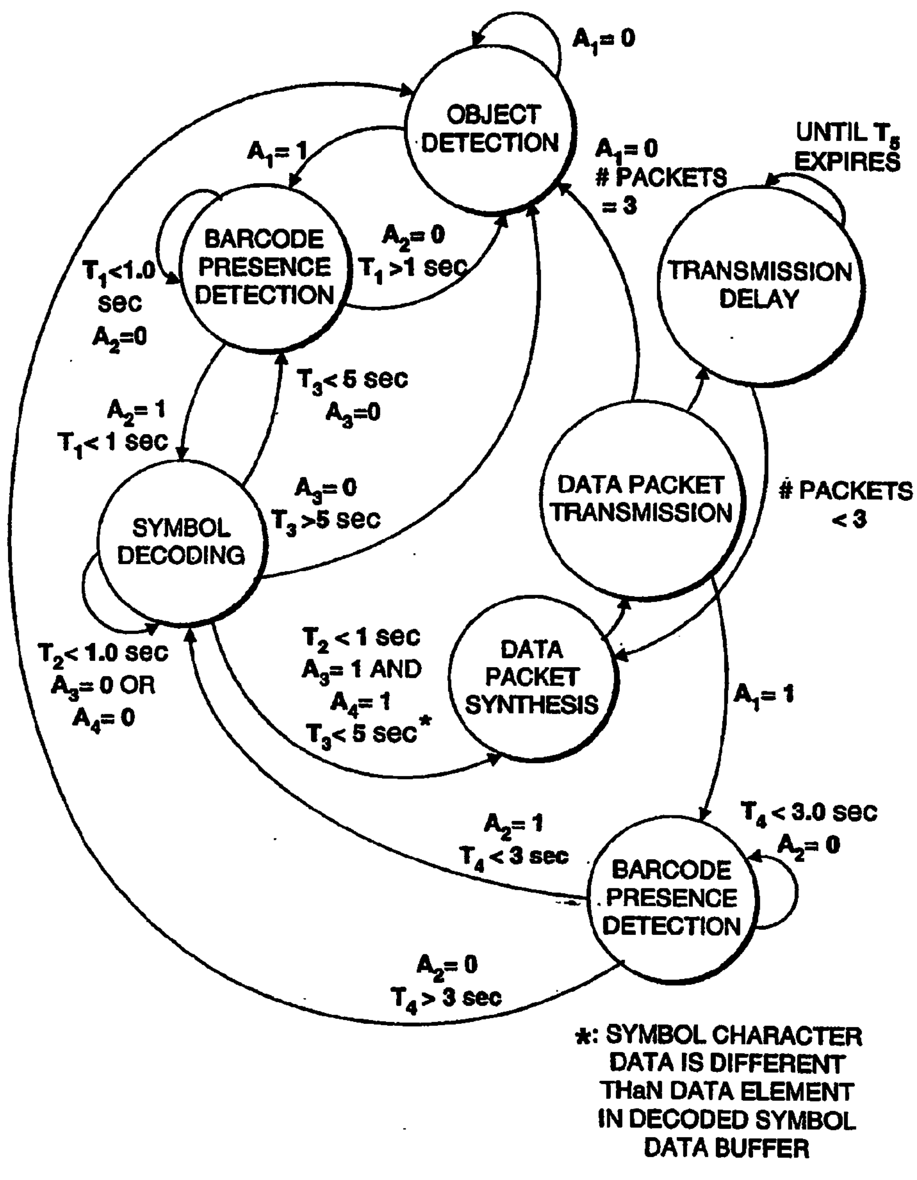
FIG. 21 is a state diagram illustrating the various states that the automatically-activated bar code symbol reading system of FIGS. 15A1 through 15A4 may undergo during the course of its programmed operation.

Notably, the bar code symbol reading engine of FIG. 11A embodies the system architecture shown in FIGS. 15A1–16, and carries out the control process illustrated in FIGS. 20A1 through 20E, and bounded by the state transition diagram of FIG. 21. During the bar code symbol detection mode, the engine automatically generates an omni-directional laser scanning pattern within its bar code symbol detection field 10, for collecting scan data for use in bar code symbol detection processing operations. Also, During the bar code symbol reading mode, the engine automatically generates an omni-directional laser scanning pattern within its bar code symbol reading field 11, for collecting scan data for use in bar code symbol detection processing operations.

Figure 12A:
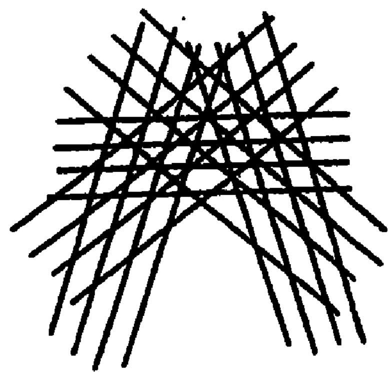
FIGS. 12A and 12B are schematic cross-sectional views of the 3-D laser scanning volume generated from the laser scanning engines of FIGS. 11A, 11B and 11C, taken parallel to the light transmissive window at about 1.0" and 5.0" therefrom.
Figure 12B:
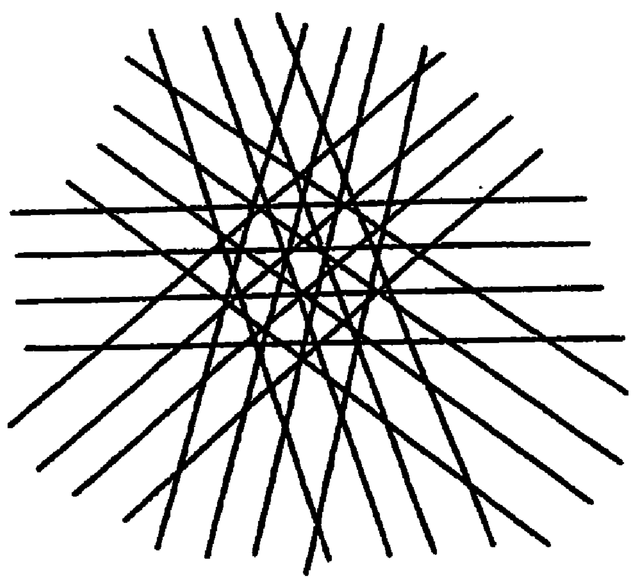

In FIGS. 12A and 12B, cross-sectional views of the omnidirectional and laser scanning pattern projected within fields 10 and 11 are shown. Further details regarding the laser scanning pattern are disclosed in U.S. Pat. No. 5,796,091, incorporated herein by reference.

Figure 11B:
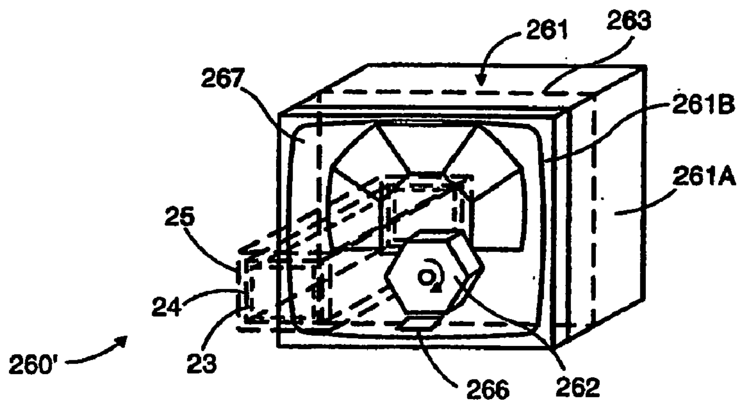
FIG. 11B is a perspective view of an eighth illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its laser-based object detection field and its laser-based omnidirectional scanning (i.e. bar code detecting and reading) field in an automatic manner.

Automatically-Activated Laser Scanning Engine for Producing Laser-Based Object Detection Field, Omni-Dimensional Laser-Based Bar Code Detection Field, and Omni-Dimensional Laser-Based Bar Code Detection Field In FIG. 11B, the eighth illustrative embodiment of the automatically-activated laser scanning engine hereof 260' is shown comprising: an ultra-compact engine housing 261 having a lower housing (i.e. base) portion 261B and an upper housing (i.e. cover) portion 261A; a polygon-based laser scanning module 262 as disclosed in U.S. Pat. No. 5,796,091, incorporated here by reference, having an optical bench with optical and electro-optical components mounted thereon, for producing and scanning a laser beam across an omnidirectional scanning field; a PC board 263 for supporting electronic circuits used to realize the subsystems shown in FIGS. 22A1–22C, including a photodetector 266 coupled to analog and digital signal processing circuits realized on PC board 263, as taught in U.S. Pat. No. 5,796,091; and a scanning window 267 for covering the transmission aperture of the engine housing, and providing the spectral filtering functions taught in U.S. Pat. No. 5,789,731, incorporated herein by reference.

Notably, the bar code symbol reading engine of FIG. 11B embodies the system architecture shown in FIGS. 22A1–22C, and carries out the control process illustrated in FIGS. 23A1 through 23E and is generally governed by the state transition diagram shown in FIG. 24. In nearly all respects, but a few, the engine of FIG. 11B is similar to the engine of FIG. 11A, except that a laser-based object detection field 23 is automatically generated from the engine in FIG. 11B during its object detection mode of operation. The same techniques described in connection with the engine of FIG. 9E can be used to generate the laser-based object detection field 23 produced from the laser scanning engine of FIG. 11B.

Automatically-Activated Laser Scanning Engine for Producing Omni-Dimensional Laser-Based Bar Code Detection Field, and Omni-Dimensional Laser-Based Bar Code Detection Field. Without An Object Detection Field In FIG. 11C, the ninth illustrative embodiment of the automatically activated laser scanning engine hereof 260" is shown comprising: an ultra-compact engine housing 261 having a lower housing (i.e. base) portion 261A and an upper housing (i.e. cover) portion 261B; a polygon-based laser scanning module 262 as disclosed in U.S. Pat. No. 5,796,091, incorporated herein by reference, having an optical bench with optical and electro-optical components mounted thereon, for producing and scanning a laser beam across an omnidirectional scanning field; a PC board 263 for supporting electronic circuits used to realize the subsystems shown in FIGS. 25A–26, including a photodetector 266 coupled to analog and digital signal processing circuit realized on PC board 263, as taught in U.S. Pat. No. 5,796,091; and a scanning window 267 for covering the transmission aperture of the engine housing, and providing the spectral-filtering functions taught in U.S. Pat. No. 5,789,731, incorporated herein by reference.

Figure 11C:
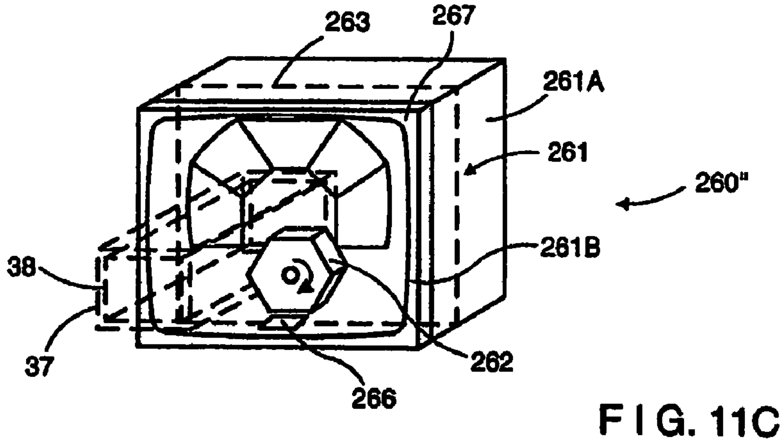
FIG. 11C is a perspective view of a ninth illustrative embodiment of the automatically-activated laser scanning bar code symbol reading engine of the present invention shown completely assembled, adapted for incorporation into any one of the bar code symbol reading devices of the present invention, and programmed for reading bar code symbols using its laser-based omnidirectional-type scanning (i.e. bar code symbol detecting and reading) field without using automatic object detection.

Notably, the bar code symbol reading engine of FIG. 11C embodies the system architecture shown in FIGS. 25A–26, carries out the control process illustrated in FIGS. 27A through 27C and is generally governed by the state transition diagram shown in FIG. 28. In nearly all respects, but a few, the engine of FIG. 11C is similar to the engine of FIG. 11B, except that the laser scanning engine of FIG. 11C does not generate any form of object detection field during its system operation.

Automatically-Activated Laser Scanning Engine for Producing IR-Based Object Detection Field, Raster-Type Laser-Based Bar Code Detection Field, and Raster-Type Laser-Based Bar Code Detection Field In FIG. 13A, the tenth illustrative embodiment of the automatically-activated laser scanning engine hereof 270 is shown comprising: an ultra-compact engine housing 271 having a light transmission aperture permitting light to exit from and enter into the interior of the housing; a holographic scanning module 272 as disclosed in copending U.S. application Ser. No. 08/573,949 filed Dec. 18, 1995, incorporated hereby reference is its entirety, having an optical bench with optical and electro-optical components mounted thereon, for producing and scanning a focused laser beam across an omnidirectional scanning field; a PC board 273 for supporting electronic circuits used to realize the subsystems shown in FIGS. 15A1–16, including an IR transmitter and receiver 274 and 275 coupled to a bar code symbol detection circuit realized on PC board 273, and a photodetector 276 coupled to analog and digital signal processing circuits realized on PC board 273, as taught in U.S. Pat. No. 5,796,091; and a scanning window 277 for covering the transmission aperture of the engine housing, and providing the spectral-filtering functions taught in U.S. Pat. No. 5,789,731 incorporated herein by reference. Notably, the bar code symbol reading engine of FIG. 13A embodies the system architecture shown in FIGS. 15A1–16, and carries out the control process illustrated in FIGS. 20A1 through 20E, and bounded by the state transition diagram of FIG. 21.

During the object detection mode, the holographic scanning engine of FIG. 13A generates a pulsed IR beam within a pencil-shaped object detection field 9, for detecting the presence of an object therein and a control activation signal in response thereto. During the bar code symbol detection mode, the holographic scanning engine of FIG. 13A generates a 2-D raster-type scanning pattern within a bar code detection field 10 extending from about 2" to about 10" from the scanning window of the scanner. As illustrated in FIG. 13A, the holographic scanning module 272 further comprises a volume-transmission scanning disc 278 rotated by a small battery-operated motor supported within the interior of the scanner housing. The holographic scanning disc 278 has about twenty holographic facets HOEs), each designed to produce one of the twenty scanlines (i.e. scanplanes) in the 2-D raster scanning pattern within the 3-D scanning volume $V_{scanning}$. As shown, a miniaturized laser beam production module 279, as described in copending U.S. application Ser. No. 08/573,949, supra, is used to produce an incident laser beam free of astigmatism and having a circularized or aspect-ratio controlled beam cross section. In the preferred embodiment, this laser beam is transmitted through a piezoelectric controlled Bragg Cell 280 which directs the laser beam incident onto the underside of the holographic scanning disc at any one of a very small range of incident angles determined by the scanning disc design process of the present invention described in great detail hereinabove. The function of the Bragg cell 280 is to modulate the incidence angle of the laser beam about a center, or nominal angle of incidence. The microprocessor based system controller realized in PC board 273, aboard the scanner generates control signals for the Bragg Cell 280 during scanner operation. When the laser beam is directed at the scanning disc at the nominal incidence angle, it produces each one of the twenty principal scanning lines in the twenty-line raster scanning pattern as the laser beam is diffracted by the twenty different holographic scanning facets. However, when the incidence angle is modulated about the nominal incidence angle, the diffracted laser beam is swept about an infinite, but small range of scanlines about its principal scanline causing "inter-scanline dithering". If the deviation about the nominal incidence angle is symmetric, then the deviation in the diffracted scanlines will also be symmetric within the resulting raster scanning pattern. Similarly, if the deviation about the nominal incidence angle is asymmetric, then the deviation in the diffracted scanlines will also be asymmetric within the resulting raster scanning pattern.

Each scanning facet along scanning disc 278 also functions to collect reflected laser light towards a small parabolic mirror 281 having a focal point above the scanning disc near the motor, at which photodetector 276 is located. Intensity signals produced by the photodetector 276 are provided to the microprocessor for decode-processing in a conventional manner. The infra-red light based object detection transceivers 274, 275 mounted adjacent to the scanning window produce the object detection field 9 which spatially overlap the scanning volume (i.e. bar code detection and reading fields) over its operative scanning range, as shown. In this particular illustrative embodiment, the laser scanning engine of FIG. 13A embodies the following functionalities: the spatially overlapping object detection and laser scan fields taught in U.S. Pat. No. 5,468,951; the long-range/short-range modes of programmable scanning operation taught in U.S. Pat. No. 5,340,971; the power-conserving system-control architecture taught in U.S. Pat. No. 5,424,525; and the RF signal transmission functionalities and acoustical acknowledgement signaling taught in copending U.S. Pat. No. 5,808,285, each of which is commonly owned by Metrologic Instruments, Inc. of Blackwood, N.J., and is incorporated herein by reference in its entirety.

Figure 13B:
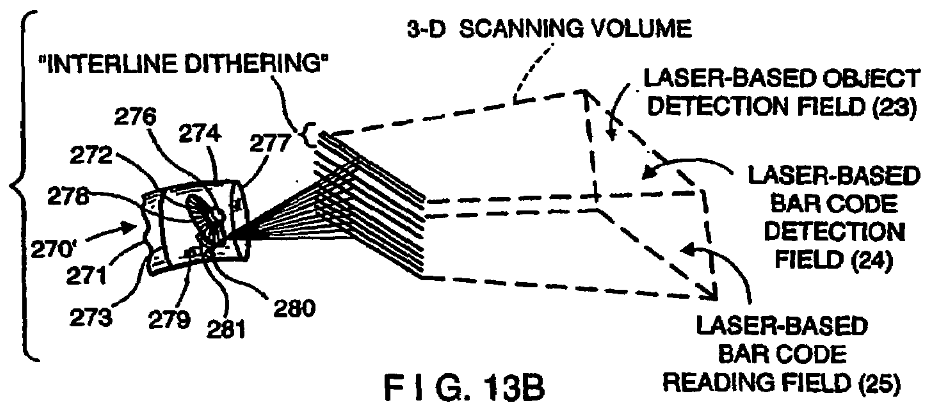
FIG. 13B is a perspective view of an eleventh illustrative embodiment of the automatically-activated laser scanning bar code symbol reading engine of the present invention shown completely assembled, adapted for incorporation into any one of the bar code symbol reading devices of the present invention, and programmed for reading bar code symbols using its laser-based object detection field and its 2-D raster-type laser scanning (i.e. detecting and reading) field projected within a 3-D scanning volume in an automatic manner.

Automatically-Activated Laser Scanning Engine For Producing Laser-Based Object Detection Field, Raster-Type Laser-Based Bar Code Detection Field, and Raster-Type Laser-Based Bar Code Detection Field In FIG. 13B, the eleventh illustrative embodiment of the automatically-activated laser scanning engine hereof 270' is shown comprising: an ultra-compact engine housing 271 having a light transmission aperture permitting light to exit from and enter into the interior of the housing; a holographic laser scanning module 272 as disclosed in U.S. application Ser. No. 09/071,512, incorporated hereby reference, having an optical bench with optical and electro-optical components mounted thereon, for producing and scanning a laser beam across an omnidirectional scanning field; a PC board 273 for supporting electronic circuits used to realize the subsystems shown in FIGS. 22A1–22C, including a photodetector 276 coupled to analog and digital signal processing circuits realized on PC board 273, as taught in U.S. Pat. No. 5,789,730; and a scanning window 277 for covering the transmission aperture of the engine housing, and providing the spectral-filtering functions taught in U.S. Pat. No. 5,789,731, incorporated herein by reference. Notably, the bar code symbol reading engine of FIG. 13B embodies the system architecture shown in FIGS. 22A1–22C, and carries out the control process illustrated in FIGS. 23A1 through 23E and is generally governed by the state transition diagram shown in FIG. 24. In nearly all but a few respects, the engine of FIG. 13B is similar to the engine of FIG. 13A, except that a laser-based object detection field 23 is automatically generated from the engine in FIG. 13B during its object detection mode of operation. Substantially, the same techniques described in connection with the engine of FIG. 9E can be used to generate the laser-based object detection field 23 produced from the laser scanning engine of FIG. 13B.

Figure 13C:
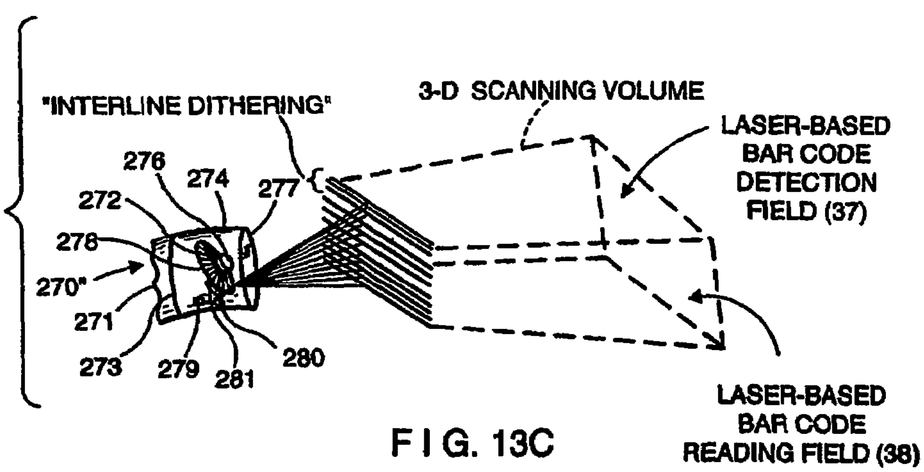
FIG. 13C is a perspective view of a twelfth illustrative embodiment of the automatically-activated laser scanning bar code symbol reading engine of the present invention shown completely assembled, adapted for incorporation into any one of the bar code symbol reading devices of the present invention, and programmed for reading bar code symbols using its laser-based scanning (i.e. bar code detecting and reading) field projected within a 3-D scanning volume without using automatic object detection.

Automatically-Activated Laser Scanning Engine For Producing Raster-Type Laser-Based Bar Code Detection Field, and Raster-Type Laser-Based Bar Code Detection Field, Without Object Detection Field In FIG. 13C, the twelfth illustrative embodiment of the automatically-activated laser scanning engine 270" is shown comprising: an ultra-compact engine housing 271 having a light transmission aperture permitting exit of light from and exit of light into the interior of the housing; a holographic laser scanning module 272 as disclosed in U.S. application Ser. No. 09/071,512, incorporated hereby reference, having an optical bench with optical and electro-optical components mounted thereon, for producing and scanning a laser beam across an omnidirectional scanning field; a PC board 273 for supporting electronic circuits used to realize the subsystems shown in FIGS. 25A–26, including a photodetector 276 coupled to analog and digital signal processing circuits realized on PC board 273, as taught in U.S. Pat. No. 5,796,091; and a scanning window 277 for covering the transmission aperture of the engine housing, and providing the optical functions taught in U.S. Pat. No. 5,789,731, incorporated herein by reference. Notably, the bar code symbol reading engine of FIG. 13C embodies the system architecture shown in FIGS. 25A–26, and carries out the control process illustrated in FIGS. 27A through 27C and is generally governed by the state transition diagram shown in FIG. 28. In nearly all respects, but a few, the engine of FIG. 13C is similar to the engine of FIG. 13B, except that the laser scanning engine of FIG. 13C does not generate any form of objection detection field during its system operation.

Automatically-Activated Laser Scanning Engine For Producing IR-Based Object Detection Field, 3-D Omnidirectional Laser-Based Bar Code Detection Field, and 3-D Omni-Dimensional Laser-Based Bar Code Detection Field In FIG. 14A, the thirteenth illustrative embodiment of the automatically-activated laser scanning engine hereof 290 is shown comprising: an ultra-compact engine housing 291 having a light transmission aperture permitting light to exit from and into the interior of the housing; a holographic scanning module 292 as disclosed in copending U.S. application Ser. No. 08/573,949, filed Dec. 18, 1995, incorporated hereby reference, having an optical bench with optical and electro-optical components mounted thereon, for producing and scanning a laser beam across an omnidirectional scanning (i.e. bar code detector and/or reading) field; a PC board 293 for supporting electronic circuits used to realize the subsystems shown in FIGS. 15A1–16, including an IR transmitter and receiver 294 and 295 coupled to a bar code symbol detection circuit realized on PC board 299, and a photodetector 296 coupled to analog and digital signal processing circuits realized on PC board 293, as taught in U.S. Pat. No. 5,796,091; and a scanning window 297 for covering the transmission aperture of the engine housing, and providing the spectral-filtering functions taught in U.S. Pat. No. 5,789,731, incorporated herein by reference. Notably, the bar code symbol reading engine of FIG. 14A embodies the system architecture shown in FIGS. 15A1–16, and carries out the control process illustrated in FIGS. 20A1 through 20E, and bounded by the state transition diagram of FIG. 21.

During the object detection mode, the holographic scanning engine of FIG. 14A generates a pulsed IR beam within a pencil-shaped object detection field 9, for detecting the presence of an object therein and a control activation signal (A1=1) in response thereto. During the bar code symbol detection mode, the holographic scanning engine of FIG. 14A generates a 3-D omnidirectional laser scanning pattern within a bar code detection field 10 extending from about 2" to about 10" from the scanning window of the scanner. As illustrated in FIG. 14A, the laser scanning mechanism comprises a volume-transmission scanning disc 298 rotated by a small battery-operated motor supported within the interior of the scanner housing. The scanning disc has about twenty holographic facets, each designed to produce one of the twenty scanlines (i.e. scanplanes) in the 2-D raster scanning pattern within the 3-D scanning volume $V_{scanning}$. As shown, a miniaturized laser beam production module 292, as described in copending U.S. application Ser. No. 08/573,949, is used to produce an incident laser beam free of astigmatism and having a circularized or aspect-ratio controlled beam cross section. This laser beam is transmitted through the underside of the holographic scanning disc at a predetermined incident angle determined by the scanning disc design process of the present invention described in great detail in application Ser. No. 08/573,949, supra. When the laser beam is directed at the scanning disc at the incidence angle, it produces twenty principal scanning lines in the twenty-line scanning pattern as the laser beam is diffracted by the twenty different holographic scanning facets on the scanning disc.

Each scanning facet along the scanning disc 298 also functions to collect reflected laser light towards a small parabolic mirror having a focal point above the scanning disc near the motor, at which photodetector 299 is located. Intensity signals produced by the photodetector 299 are provided to the microprocessor for decode-processing in a conventional manner. The infra-red light based object detection transceiver 294, 295 is mounted adjacent the scanning window 297 to produce the object detection field 9 which spatially overlaps the bar code detection and reading fields 10 and 11 (i.e. scanning volume) over its operative scanning range, as shown. In this particular illustrative embodiment, the laser scanning engine of FIG. 14A embody both of the following functionalities: the spatially overlapping object detection and laser scan fields taught in U.S. Pat. No. 5,468,951; the long-range/short-range modes of programmable scanning operation taught in U.S. Pat. No. 5,340,971; the power-conserving system-control architecture taught in U.S. Pat. No. 5,424,525; and the RF signal transmission functionalities and acoustical acknowledgement signaling taught in copending U.S. patent application Ser. No. 08/292,237, each of which is commonly owned by Metrologic Instruments, Inc. of Blackwood, N.J., and is incorporated herein by reference in its entirety.

Automatically-Activated Laser Scanning Engine For Producing Laser-Based Object Detection Field, 3-D Omnidirectional Laser-Based Bar Code Detection Field, and 3-D Omnidirectional Laser-Based Bar Code Detection Field In FIG. 14B, the eleventh illustrative embodiment of the automatically-activated laser scanning engine hereof 290' is shown comprising: an ultra-compact engine housing 291 having a light transmission aperture permitting light to exit from and enter into the interior of the housing; a holographic laser scanning module 292 as disclosed in U.S. application Ser. No. 09/071,512, incorporated herein by reference, having an optical bench with optical and electro-optical components mounted thereon, for producing and scanning a laser beam across an omnidirectional scanning field; a PC board 293 for supporting electronic circuits used to realize the subsystems shown in FIGS. 22A1–22C, including a photodetector 299 coupled to analog and digital signal processing circuits realized on PC board 293, as taught in U.S. Pat. No. 5,796,091; and a scanning window 297 for covering the transmission aperture of the engine housing, and providing the spectral-filtering functions taught in U.S. Pat. No. 5,789,731, incorporated herein by reference. Notably, the bar code symbol reading engine of FIG. 14B embodies the system architecture shown in FIGS. 22A1–22C, carries out the control process illustrated in FIGS. 23A1 through 23E and is generally governed by the state transition diagram shown in FIG. 24. In nearly all respects but a few, the engine of FIG. 14B is similar to the engine of FIG. 14A, except that a laser-based object detection field 23 is automatically generated from the engine in FIG. 14B during its object detection mode of operation. The same techniques described in connection with the engine of FIG. 9E can be used to generate the laser-based object detection field 23 produced from the laser scanning engine of FIG. 14B.

Automatically-Activated Laser Scanning Engine For Producing 3-D Omnidirectional Laser-Based Bar Code Detection Field, and 3-D Omnidirectional Laser-Based Bar Code Detection Field, Without Object Detection Field In FIG. 14C, the fifteenth illustrative embodiment of the automatically-activated laser scanning engine 290" is shown comprising: an ultra-compact engine housing 291 having a light transmission aperture permitting exit of light from and exit of light into the interior of the housing; a holographic laser scanning module 292 as disclosed in U.S. application Ser. No. 09/071,512, incorporated herein by reference, having an optical bench with optical and electro-optical components mounted thereon, for producing and scanning a laser beam across an omnidirectional scanning field; a PC board 293 for supporting electronic circuits used to realize the subsystems shown in FIGS. 25A–26, including a photodetector 299 coupled to analog and digital signal processing circuits realized on PC board 293, as taught in U.S. Pat. No. 5,796,091; and a scanning window 297 for covering the transmission aperture of the engine housing, and providing the spectral-filtering functions taught in U.S. Pat. No. 5,789,931, incorporated herein by reference. Notably, the bar code symbol reading engine of FIG. 14C embodies the system architecture shown in FIGS. 25A–26, carries out the control process illustrated in FIGS. 27A through 27C and is generally governed by the state transition diagram shown in FIG. 28. In nearly all respects but a few, the engine of FIG. 14C is similar to the engine of FIG. 14B, except that the laser scanning engine of FIG. 14C does not generate any form of objection detection field during its system operation.

Automatically-Activated Laser Scanning Bar Code Symbol System Comprising IR-Based Object Detection Subsystem, Laser-Based Bar Code Symbol Detection Subsystem, Laser-Based Bar Code Symbol Reading Subsystem, and Manually-Activated Symbol Character Data Transmission Subsystem Referring to FIGS. 15A1 through 16, and 20A1 through 21, the first generalized system design will now be described in greater detail. Notably, the structure and functions of the first generalized system design are provided within each of illustrative embodiments of the present invention described above relating to automatically-activated bar code symbol reading systems comprising an IR-based object detection subsystem, a laser-based bar code presence detection subsystem, a laser-based bar code symbol reading subsystem and data transmission activation subsystem, as illustrated in FIG. 1A.

As shown in FIGS. 15A1–15A4, automatically-activated bar code symbol reading system 300 comprising a number of cooperating components, namely: a system override signal detection circuit 301 for detecting the production of a system override signal and producing in the presence thereof control activation signal $A_0=1$; a primary oscillator circuit 301A for producing a primary clock signal CLK for use by the system override signal detection circuit 301 and object detection circuit 307; a first RC timing network 302 for setting the oscillation frequency of the primary oscillator circuit; means (e.g. Hall-effect sensor) 335 for producing a system override signal; a manually-activatable data transmission switch 303 for generating control activation signal $A_4=1$ in response to activation of the switch; first control means 304, realized as a first control circuit $C_1$, for performing localized system control functions; a second RC timing network 305 for setting a timer $T_1$ in control circuit $C_1$; means (e.g. an object sensing circuit 306 and an object detection circuit 307) for producing a first activation control signal $A_1=1$ upon the detection of an object bearing a bar code in at least a portion of the object detection field 9; a laser beam scanning mechanism 308 for producing and scanning a visible laser beam across the bar code symbol on the detected object; photoreceiving circuit 309 for detecting laser light reflected off the scanned bar code symbol and producing an electrical signal $D_1$ indicative of the detected intensity; an analog-to-digital (A/D) conversion circuit 310 for converting analog scan data signal $D_1$ into a corresponding digital scan data signal $D_2$; a bar code symbol (presence) detection circuit 311 for processing digital scan data signal $D_2$ in order to automatically detect the digital data pattern of a bar code symbol on the detected object and produce control activation signal $A_2=1$; a third RC timing network 312 for setting a timer $T_{BCD}$ in the bar code symbol detection circuit 311; second control means 313, realized as a second control circuit $C_2$, for performing local system control operations in response to the detection of the bar code symbol; third control means 314, realized as third control module $C_3$; timers $T_2$, $T_3$, $T_4$, and $T_5$ identified by reference numerals 315, 316, 317 and 318, respectively; a symbol decoding module 319 for processing digital scan data signal $D_2$ so as to determine the data represented by the detected bar code symbol, generate symbol character data representative thereof, and produce activation control signal $A_3$ for use by third control module $C_3$; a data packet synthesis module 320 for synthesizing a group of formatted data packets for transmission to its mated base unit 440; and a data packet transmission circuit 321 for transmitting the group of data packets synthesized by the data packet synthesis module 319; an object detection state indicator (e.g. LED) 451 a bar code symbol detection state indicator 452 driven by enable signal $E_2$ and control activation signal $A_2=1$, a bar code symbol reading state indicator (e.g. LED) 453 driven by enable signal $E_8=1$; and a data transmission state indicator 454 (e.g. LED) driven by signal $E_9=1$.

As will be described in greater detail hereinafter, second control circuit $C_2$ is capable of "overriding" (i.e. inhibit and/or enable) first control circuit $C_1$, whereas third control circuit $C_3$ is capable of overriding first and second control circuits $C_1$ and $C_2$, respectively. As shown in FIGS. 15A1–15A4, such control override functions are carried out by the generation of control override signals (i.e. $C_2/C_1$, $C_3/C_2$ and $C_3/C_1$) transmitted between respective control structures during system operation. Owing to the unique architecture of the control subsystem hereof, the automatically activated bar code symbol reading device hereof is capable of versatile performance and ultra-low power operation. The structure, function and advantages of this control subsystem architecture will become apparent hereinafter.

As shown in FIGS. 15A1–15A4, electrical power is provided to the components of the bar code reading device by battery power supply unit 320 contained within the housing of the device. As shown in the schematic diagram of FIG. 15B1, battery power supply unit 320 contained within the housing of the code symbol reading device provides electrical power to the components therewithin in accordance with a programmed mode of intelligent operation. In the illustrative embodiment, battery power supply unit 320 comprises a power supply distribution circuit 325, replaceable or rechargeable batteries 326, and an automatic power control circuit 330. In the illustrative embodiment, where rechargeable batteries are employed, the power supply circuit 320 further includes a secondary inductive coil 327B, bridge rectifier 328 and voltage regulation circuit 329. Preferably, all of these subcomponents are contained within the hand-supportable housing of the device, and configured together as shown in FIG. 15B1.

As illustrated in FIG. 15B1, the function of secondary inductive coil 327 is to establish an electromagnetic coupling with the primary inductive coil contained, for example, in the base unit 440 associated with the bar code reading device. In those embodiments of the bar code symbol reading system having a base unit 440 with an integrated recharging unit, the rechargeable batteries 326 therein are automatically recharged whenever the bar code symbol reading device is supported in the recharging portion of the base unit. More specifically, when arranged in this configuration, electrical power is inductively transferred from the primary inductive coil 327A in the base unit 440 to secondary inductive coil 327B in the bar code symbol reading device, as shown in FIGS. 15A1–15A4. The inductively coupled AC power signal is then rectified by bridge rectifier 320, and ultimately filtered by voltage regulation circuit 329 to provide a regulated DC power supply signal for recharging rechargeable batteries 326.

As shown in FIG. 15B1, automatic power control circuit 330 is connected in series between rechargeable battery 326 and power distribution circuit 325. The function of automatic power control circuit 330 is to automatically control (i.e. manage) the availability of battery power to electrically-active components within the bar code symbol reading device when the device is operated in its hands-on mode of operation (i.e. removed from the scanner support stand) under a predefined set of operating conditions. Notably, while power distribution circuit 325 distributes electrical power throughout the bar code symbol reading device by way of a power distribution bus, automatic power control circuit 330 globally enables consumption of electrical power (i.e. the product of voltage and direct current) by the system components only when the power control circuit 330 is activated.

As shown in FIG. 15B1, the automatic power control circuit 330 comprises a number of subcomponents, namely: a DC-to-DC voltage converter 330A; a power commutation switch 330B; and a resettable timer circuit 330C. The function of the DC-to-DC voltage converter 330A is to convert the voltage from battery power source 326 to +5 Volts, whereas the function of the power commutation switch 330B is to selectively commute electrical power from the DC-to-DC converter 330A to the input port of the power distribution circuit 325. The function of the resettable timer circuit 330C is to control the power commutation circuit so that battery power is provided to the power distribution circuit 325 in a power conserving manner without compromising the performance of the bar code symbol reading system in its various modes of operation.

In the illustrative embodiment, DC-to-DC converter 330A is realized by configuring a low-voltage input, adjustable output step-up DC-DC converter (e.g. the MAX777 IC chip by MAXIM Integrated Products) with an inductor (e.g. 22.0 micro-Henries) and two capacitors, to produce a 5.0 Volt output voltage for use in the bar code symbol reading device. As shown, resettable timer circuit 330C is realized by configuring a comparitor circuit 330C1 (e.g. as provided in the LM2903 IC chip by National Semiconductor) with external resistors $R_1$, $R_2$, $R_3$, $R_4$ and $R_5$ and charging capacitor $C_1$. The function of the resistors $R_3$ and $R_5$ is to provide to one input of the comparitor a positive reference voltage (i.e. $V_{ref}$) which is close in magnitude to the battery voltage $V_{BATTERY}$, with resistor R4 being connected to the output of the comparator for hysteresis. The power control switch 330B is realized by a N-channel field effect transistor (FET), wherein the source terminal is connected to the output port of the DC-to-DC converter 330A, the drain terminal is connected to the input port of the power distribution circuitry 325, and the gate terminal is connected to the output port of the comparator 330C1.

In the illustrative embodiment, there are three different power switching events which will reset the resettable timer circuit 330C, cause the comparator thereof 330C1 to produce a high output level, and drive the N-channel FET 330B into conduction. The first power switching event comprises activation of manually-actuable power-reset switch 330D (e.g. spring-biased push-type button/switch or mechanical/electromechanical/electronic sensor) mounted on the exterior of the scanner housing. The second power switching event comprises placing the handle portion of the scanner housing within the recess of the scanner support stand hereof, whereby mode-select sensor (e.g. Hall-effect sensor) 650 disposed within the handle of the housing detects magnetic flux produced from permanent magnet 551B mounted within the scanner support stand recess, as shown in FIGS. 2E and 36C. The third power switching event comprises successfully reading a bar code symbol and producing control activation signal $A_3=1$.

In order that such power switching events will effectively reset the resettable timer circuit 330C, a number of electrical devices are connected to the input port of the resettable timer circuit 330C. In particular, the "good read" activation signal $A_3=1$ produced by symbol decoding module 319 is provided to the base of a NPN-type transistor 330C2, which has its collector terminal connected to one end of resistor $R_2$ and its emitter terminal connected to electrical ground. As shown, one terminal of power reset switch 330D is connected to the same end of resistor $R_2$, to which the collector of NPN-type transistor 330C2 is connected, while the other terminal of power set button 330D is connected to electrical ground. Also, one terminal of mode-select sensor (e.g. Hall-effect sensor) 650 is connected to the same end of resistor $R_2$, to which the collector of NPN-type transistor 330C2 is connected, while the other terminal of the mode-Select sensor 650 is connected to electrical ground, as shown in FIG. 15B1.

In general, there are numerous ways in which to realize the power reset switch 330D employed in the power supply unit 320 shown in FIGS. 15A1 through 15B1. In practice, however, the particular manner in which this subcomponent is realized will depend on the particular embodiment of the bar code symbol reading system, as well as its particular application. For example, consider the bar code symbol reading system illustrated in FIG. 2A. In this particular embodiment of the present invention, it would advantageous to realize the power reset switch 330D as a spring-biased switch provided on one of the support surfaces of the hand-supportable housing thereof. In this arrangement, the power reset switch 330D would generate a power reset signal when the hand-supportable housing is picked-up out of its stand, or off a countertop surface, upon which it was supported while in its power-off/saving mode of operation.

In the illustrative embodiments of FIGS. 3A and 8A, it would be advantageous to realize power-reset switch 330D as a small spring-based button on the exterior of the scanner housing, for the operator to depress as needed to reset the power supply unit 320. In the embodiment in FIG. 6A, power-reset switch can be realized as a small button on the housing of the hand held device. In other embodiments of the present invention, such as shown in FIG. 5A, the power reset-switch 330D can be realized as a button provided on the exterior of the finger-supported housing of the scanning device. Upon depressing the power-reset button, power to the system is automatically restored. Alternatively, the switching function associated with the power-reset button can be integrated into the data transmission activation switch 44, 99, 120, 145, 155, 185A/185B, 712A/712B associated with the bar code symbol reading system 105 (105', 105").

Various types of electronic switching circuitry and technology can be used to realize such a multi-function switch.

As shown in FIGS. 15A1 through 15A4, battery supply 326 aboard each bar code symbol reading device is automatically charged to its normal output voltage (i.e. $V_{BATTERY}$) by way of battery recharging apparatus 327A/327B, 328 and 329. A predetermined time duration ΔT (e.g. greater than 1 minute, preferably 5 minutes) after the occurrence of a power switching event, power supply unit 320 attains its steady-state condition. At this state, capacitor $C_1$ charges through resistor $R_1$, to a voltage above Vref. This causes the output voltage of the capacitor C1 to drop to a level which disables FET 330B, thereby disabling the supply of battery power to power distribution circuit 325, and ultimately disabling the bar code symbol reading device. Upon the occurrence of any of the above three "power switching" events described above, capacitor $C_1$ quickly discharges through resistor $R_2$ (i.e. $R_1$>>$R_1$), causing the output voltage of capacitor C1 to go to a level which enables FET 330B to supply battery power to the power distribution circuitry 325, and thereby enabling the bar code reading device for the predetermined time period (e.g. ΔT greater than 1 minute, preferably 5 minutes). This programmed duration of power supply provides a time window ΔT, within which the object detection circuit of the system can automatically detect an object within its object detection field 9. This power resetting operation does not, however, initiate or otherwise cause laser scanning or bar code symbol reading operations to commence or cease. Only the introduction of an object into the object detection field 9 (i.e. when the resettable timer circuit 330C has been reset) can initiate or otherwise cause laser scanning or bar code symbol reading operations to commence.

A principal advantage of the power control scheme of the present invention is that it provides automatic power conservation in automatic code symbol reading applications employing IR-based object detection as shown in FIGS. 15A1 through 15A4, or laser-based object detection as shown in FIGS. 22A1 through 22A4, while minimally impacting upon the diverse modes of automatic operation provided by the system hereof. In particular, provided that the user reads at least one bar code symbol within the predetermined time duration ΔT programmed into the bar code symbol reading device, there is no need to reset the power control circuit hereof. Also, when the hand-supportable housing of the bar code reading device is placed (i.e. supported) within the support recess of scanner support portion of its base unit, mode-select sensor (e.g. Hall-effect sensor) 650, sensing magnetic flux generated by permanent magnet 551B, produces a signal (e.g. $A_4$=1) which continuously activates power control circuit 330, causing battery power to be supplied from recharging battery 326 to the power distribution circuit 325, and thereby enabling continuous scanner operation in the hands-free mode of operation. Simultaneously, mode-select sensor 650 also causes data transmission control activation signal $A_4$=1 to be generated when the hand-supportable bar code reading device is placed within the scanner support portion of the base unit 440.

In the illustrative embodiment of the present invention, system override signal detection circuit 301, primary oscillator circuit 301A, object detection circuit 307, first control circuit $C_1$, analog-to-digital conversion circuit 310, bar code symbol detection circuit 311, and second control circuit $C_2$ are all realized on a single Application Specific Integrated Circuit (ASIC) chip 333 using microelectronic circuit fabrication techniques known in the art. In the illustrative embodiment, the ASIC chip and associated circuits for laser scanning and light detection and processing functions, are mounted on a PC board with the housing of the bar code symbol reading device. Symbol decoding module 319, data packet synthesis module 320, timers $T_2$, $T_3$, $T_4$, and $T_5$ and third control module $C_3$ are realized using a single programmable device, such as a microprocessor having accessible program and buffer memory, and external timing circuitry, collectively depicted by reference numeral 334 in FIG. 15A2. In the illustrative embodiment, these components and devices are mounted on the PC board with the bar code symbol reading device.

In the illustrative embodiment, when automatic power control circuit 330 is activated (i.e. upon the occurrence of a particular switching condition), electrical power from battery power unit 326 is automatically provided to first control circuit $C_1$, system override detection circuit 301, primary oscillator circuit 301A, IR object sensing circuit 306 and object detection circuit 307. This enables the operation of these components, while providing only biasing voltages to all other system components so that they are each initially disabled from operation. In accordance with the principles of the present invention, the distribution of electrical power to all other system components occurs under the management of the control architecture formed by the interaction of distributed control centers $C_1$, $C_2$ and $C_3$.

In some embodiments, it may be desired to override (i.e. disable) the entire system from operation such as, for example, when: (i) the hand-supportable bar code symbol reading device is placed in a holster or like structure worn on the user's belt; (ii) the device is carried on the user's person; or (iii) the device is configured for disabled operation. In such instances, the bar code symbol reading device of the present invention can be disabled simply by activating the system override signal producing device 335 (e.g. a Hall-effect sensor detecting the presence of a magnetic field) mounted within the hand-supportable housing. As shown in FIG. 15A2, system override signal detection circuit 301 comprises AND gates 336 and 337, an invertor 338, an S-R latch circuit 339 and a logical driver 340, configured as shown. As illustrated, the clock oscillator signal CLK1 (i.e. a periodic pulsed signal with binary logic signal levels) is provided as one input of AND gate 336, one input of AND gate 337, and the input of logic driver 340. The system override signal $D_0$ from the override signal producing device (e.g. Hall-effect sensor) 335 is provided to the input of invertor 338 and the second input of AND gate 336. The output of invertor 338 is provided to the input of AND gate 337. As shown, the output of AND gate 337 is provided to the RESET input of S-R latch 339, whereas the output of AND gate 336 is provided to the SET input of S-R latch 339. The output of S-R latch 339 is activation signal $A_0$ provided to first control circuit $C_1$, whereas the output of logic driver 340 is the driver signal SO DR which is used to drive (i.e. provide the supply voltage for) the Hall-effect sensor 650 mounted within the hand-supportable housing of the device.

As shown in FIG. 15C, primary clock oscillator circuit 301A supplies a periodic pulsed signal CLK1 to the system override signal detection circuit 301 and the object detection circuit 307. In the illustrative embodiment, the primary oscillation circuit 301A is designed to operate at a low frequency (e.g. about 1.0 Khz) and a very low duty cycle (e.g., about 1.0%). The "ON" time for the system override signal producing device 335 and the IR object sensing circuit 306 is proportional to the duty cycle of the primary oscillation circuit 301A. This feature allows for minimal operating current when the bar code symbol reading engine is in its object detection mode and also when the system override signal producing device 335 is activated (i.e. produces a system override signal $D_0$=1).

As shown in FIG. 15C, primary oscillation circuit 301A comprises a Schmidtt trigger 342, invertors 343 and 344, and a NMOS Field-Effect Transistor (FET) 345. As shown, the output of Schmidtt trigger 342 is connected to the inputs of invertors 343 and 344. The output of invertor 343 produces clock signal CLK1 which is provided to system override signal detection circuit 301 and object detection circuit 307. As shown in FIG. 15C, the primary oscillation circuit 301A is connected to first RC network 302 which comprises resistors $R_1$ and $R_2$, and capacitor $C_1$ configured as shown therein. The function of the RC network 302 is to establish the duty cycle and the oscillation period of the primary oscillator circuit 301A. As shown, the two time constants in the network are established using capacitor $C_1$ and resistors $R_1$ and $R_2$. The RC combination of $R_1$ and $C_1$ establishes the period of the oscillator 301A. The ratio of the $R_2$ to $R_1$ provides the duty cycle of the oscillator 301A. The value of $R_2$ is approximately 100 times smaller than $R_1$ to establish a 1.0% duty cycle. As shown in the timing diagram of FIG. 15D, the clock signal CLK1 remains low while the $V_1$ signal ramps up. During this ramp up process, the object detection circuit 307 is activated (i.e. enabled) by enabling signal $E_0$ supplied from first control circuit $C_1$, and the object detection circuit 307 provides the first control circuit $C_1$ with first control activation signal $A_1$=1 when an object residing in the scanning field is detected.

In accordance with the present invention, the purpose of object detection circuit 307 is to produce a first control activation signal $A_1$=1 upon determining that an object (e.g. product, document, etc.) is present within the object detection field 9 of the bar code symbol reading device, and thus at least a portion of the bar code detection field 10. In the illustrative embodiment automatic object detection is employed. It is understood, however, that "passive" techniques may be used with acceptable results. As shown in FIG. 15, the object detection circuit 307 comprises two major subcomponents, namely object sensing circuit 306 and object detection circuit 307, both of which are locally controlled by control circuit $C_1$. In the illustrative embodiment, object sensing circuit 306 comprises an IR LED 206A driven by an IR transmitter drive circuit 349, and an IR phototransistor (or photodiode) 206B activated by an IR receive biasing circuit 358. These components are arranged and mounted on the PC board so as to provide an object detection field 9 that spatially encompasses the laser scanning plane, as described above. As shown in FIGS. 15A1–15A4, the object detection circuit 307 produces an enable signal IR DR which is provided to the IR transmitter drive circuit 349. The signal produced from IR phototransistor 206B, identified as IR REC, is provided as input signal to the object detection circuit 307 for signal processing in a manner which will be described in detail below. In the illustrative embodiment, IR LED 206A generates a 900 nanometer signal that is pulsed at the rate of the primary oscillation circuit 301A (e.g. 1.0 KHZ) when the object detection circuit 307 is enabled by enable signal $E_0$ produced from the first control circuit $C_1$. Preferably, the duty cycle of the primary oscillation circuit 301A is less than 1.0% in order to keep the average current consumption very low.

As illustrated in FIG. 9B, for example, this pulsed optical signal is transmitted from infrared LED 206A to broadly illuminate the object detection field 9, spatially-defined by the pick-up characteristics of photodiode 206B. When an object is present within the object detection field 9, a reflected optical pulse signal is produced and focused through 9 focusing lens disposed before photodiode 206B. The function of photodiode 206B is to receive (i.e. sense) the reflected optical pulse signal and, in response thereto, produce a current signal IR REC.

As shown in FIG. 15E, produced current signal IR REC is provided as input to the current-to-voltage amplifier (e.g. transconductance amplifier) 355 in the object detection circuit 307, and is converted into a voltage signal $V_0$. Within the object detection circuit 307, IR LED drive signal (IR DR) is produced as the output of AND gate 357, whose inputs are enabling signal $E_0$ supplied from the first control circuit $C_1$ and the pulsed clock signal CLK1 supplied from the primary oscillation circuit 301A.

As shown in FIG. 15E, enabling signal $E_0$ is also provided to current-to-voltage amplifier circuit 355, and the output voltage signal from AND gate 357 is provided as the second input to the synchronous transmitter/receiver circuit 356. Notably, the output voltage signal from AND gate 357 and the output voltage signal $V_0$ from the current-to-voltage amplifier 355 correspond to the IR pulse signal transmitted from and received by object sensing circuit 306. The function of the synchronous transmitter/receiver circuit 356 is to cyclically compare the output voltage signal from AND gate 357 and the output voltage signal $V_0$ from the current-to-voltage amplifier 365, and if these voltage signals synchronously match each other for a minimum of three (3) consecutive cycles of the primary oscillation circuit 301A, then synchronous transmitter/receiver circuit 356 produces as output, a first control activation signal $A_1$=1, indicating that an object is present in the object detection field (9) of the bar code symbol reading device. Conversely, whenever first control activation signal $A_1$=0 is produced, then this condition indicates that an object is not present in the object detection field.

Alternatively, the automatic bar code reading device of the present invention can be readily adapted to sense ultrasonic energy reflected off an object present within the object detection field 9. In such an alternative embodiment, object sensing circuit 306 is realized as an ultrasonic energy transmitting/receiving mechanism. In the housing of the bar code reading engine, an ultrasonic energy signal is generated and transmitted forwardly into the object detection field 9. Then, ultrasonic energy reflected off an object within the object detection field 9 is detected adjacent to the transmission window using an ultrasonic energy detector (integrated with the housing) producing an analog electrical signal (i.e. UE REC) indicative of the detected intensity of received ultrasonic energy. Preferably, a focusing element is disposed in front of the energy detector in order to effectively maximize the collection of ultrasonic energy reflected off objects in the object detection field. In such instances, the focusing element essentially determines the geometrical characteristics of the object detection field of the device. Consequently, the energy focusing (i.e. collecting) characteristics of the focusing element will be selected to provide an object detection field which spatially encompasses at least a portion of the laser-based bar code symbol detecting and readings fields. The electrical signal produced from the ultrasonic-energy based object sensing circuit is provided to the object detection circuit 307 for processing in the manner described above.

Figures 15H, 15I:
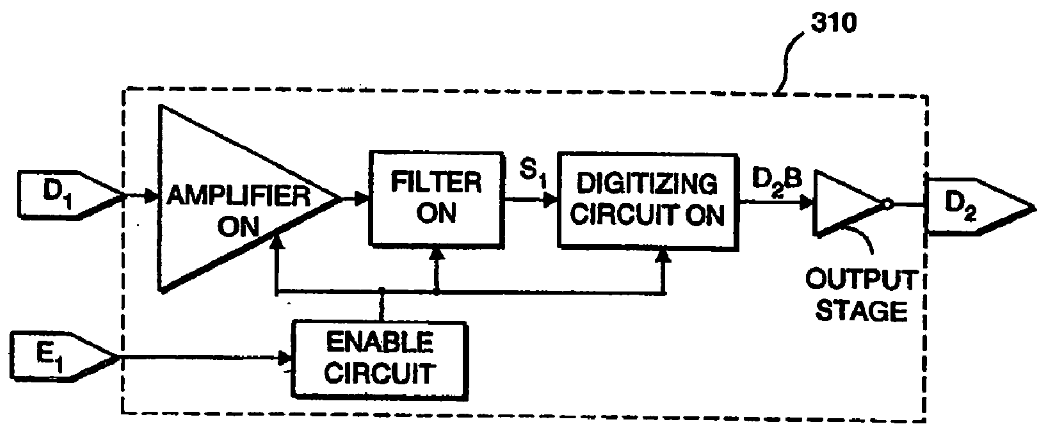
FIG. 15H is table setting forth Boolean logic expressions for the enabling signals produced by the first control circuit $C_1$.
FIG. 15I is a functional block diagram of the analog to digital (A/D) signal conversion circuit in the ASIC chip in the bar code symbol reading system of FIGS. 15A1 through 15A4.

Referring to FIG. 15F, the first control logic block $C_1$ will be described in greater detail. In general, the function of the first control logic block $C_1$ is to provide the first level of system control. This control circuit activates the object detection circuit 307 by generating enable signal $E_0$=1, it activates laser beam scanning circuit 308, photoreceiving circuit 309 and A/D conversion circuit 310 by generating enable signal $E_1$=1; it also activates bar code symbol detection circuit 311 by generating enable signal $E_2$=1. In addition, the first control circuit $C_1$ provides control lines and signals in order to control these functions, and provides a system override function for the low power standby mode in the bar code symbol reading engine. In the illustrative embodiment, the specific operation of first control circuit $C_1$ is dependent on the state of several sets of input signals (i.e. activation control signal $A_0$ and $A_1$, and override signals $C_2/C_1$, $C_3/C_{1\text{-}1}$ and $C_3/C_{1\text{-}2}$) and an internally generated digital timer signal B1. A preferred logic implementation of the first control circuit $C_1$ is set forth in FIGS. 15F and 15G. The functional dependencies among the digital signals in this circuit are represented by the Boolean logic expressions set forth in the Table of FIG. 15H, and therefore are sufficient to uniquely characterize the operation of first control circuit $C_1$.

As shown in FIG. 15F, first control circuit $C_1$ comprises a pair of logic invertors 361 and 362, an OR gate 363, a NAND gate 364, a NOR gate 365, an AND gate 366, and a digital timer circuit 376 which produces as output, a digital output signal B1. As shown, digital timer circuit 376 comprises a flip-flop circuit 370, a NOR gate 371, a clock divide circuit 373, a comparator (i.e. differential) amplifier 372, and a NPN transistor 374. As illustrated, activation control signal $A_1$ is provided to the CLK input of flip-flop 370 by way of invertor 361. The QNOT output of the flip-flop 370 is provided as one input to NOR gate 371, whereas the other input thereof is connected to the CLK input of clock divide circuit 373 and the output of comparator amplifier 372. The output of the NOR gate is connected to the base of transistor 374, while the emitter thereof is connected to electrical ground and the collector is connected to the negative input of comparator amplifier 372 as well as the second timing network 305, in a manner similar to the interconnection of first timing network 302 to primary oscillation circuit 301A. Also, the divided clock output (i.e. CLK/2048) produced from clock divide circuit 373 is provided to the CL input of flip-flop 370. As shown, the Q output of flip-flop 370 is connected to the reset (RST) input of the clock divide circuit 373 as well as to one input of OR gate 363, one input of NOR gate 365, and one input of AND gate 366. Notably, the Q output of the flip-flop 370 is the digital output signal B1 indicated in each of the Boolean expressions set forth in the Table of FIG. 15H.

As shown in FIG. 15F, enable signal $A_0$ from the system override signal detection circuit 301 is provided as the second input to OR gate 363, and the output thereof is provided as input to NAND gate 364. The override signal $C_2/C_1$ from second control circuit $C_2$ is provided as the input to invertor 362, whereas the output thereof is provided as the second input to AND gate 366. The override signal $C_3/C_{1\text{-}1}$ from third control module $C_3$ is provided as the second input to NAND gate 364, whereas the output thereof produces enable signal $E_0$ for activating the object detection circuit 307. The override signal $C_3/C_{1\text{-}2}$ is provided to the second input to NOR gate 365, whereas the output thereof produces enable signal $E_1$ for activating laser scanning and photoreceiving circuits 308 and 309 and A/D conversion circuit 310. The output of AND gate 366 produces enable signal $E_2$ for activating bar code symbol detection circuit 311.

Referring to FIG. 15F, the operation of digital timer circuit 376 will be described. The output voltage of comparator amplifier 372 keeps transistor 374 in its nonconducting state (i.e. OFF), via NOR gate 371, thus allowing the external RC network 305 to charge to capacity. When comparator input voltage $V_x$ exceeds reference voltage $V_{cc}/$2, the comparator output voltage biases (i.e. switches ON) transistor 374 so as to begin discharging the RC timing network 305, until input voltage $V_x$ falls below reference voltage $V_{cc}/$2 upon which the process repeats, thus generating a digital clock oscillation at the comparator output. The timing cycle of digital output signal B1 is initiated by a transition on the activation control signal $A_1$ which toggles flip-flop 370. This toggling action sets the digital output signal B1 to its logical HIGH state, resetting clock divide circuit 373 and starting the digital clock oscillator described above by toggling the Q output of flip-flop 370. As shown in FIG. 15G, clock divide circuit 373 is constructed by cascading eleven flip-flop circuits together in a conventional manner. Each stage of the clock divider circuit divides the frequency of the input clock signal (clock) by the factor 2. Thus the clock divider circuit 373 provides an overall frequency division factor of 2048. When the clock output CLK/2048 toggles, the flip-flop circuit is cleared thus setting the digital signal B1 to logical LOW until the next pulse of the activation control signal $A_1$.

As reflected in the Boolean expressions of FIG. 15H, the state of each of the enable signals $E_0$, $E_1$ and $E_2$ produced by the first control circuit $C_1$ is dependent on whether the bar code symbol reading system is in its override state of operation. To better understand the operation of control circuit $C_1$, it is helpful to consider a few control strategies performed thereby.

In the override state of operation of the system, enable signal $E_0$ can be unconditionally set to $E_0$=1 by the third control circuit $C_3$ setting override signal $C_3/C_{1\text{-}1}$=0. Under such conditions, the object detection circuit 301 is enabled. Also, when the system override signal detection circuit 307 is activated (i.e. $A_0$=1) or the laser scanning and photoreceiving circuits 308 and 309 activated (i.e. B1=1) and override signal $C_3/C_{1\text{-}1}$=1, then enable signal $E_0$=0 and therefore the object detection circuit 307 is automatically deactivated. The advantage of this control strategy is that it is generally not desirable to have both the laser scanning circuit 308 and photoreceiving circuit 309 and the object sensing circuit 306 active at the same time, as the wavelength of the infrared LED 206B typically falls within the optical input spectrum of the photoreceiving circuit 309. In addition, less power is consumed when the object detection circuit 307 is inactive (i.e. disabled).

As illustrated in FIGS. 15A1–15A4, laser scanning circuit 308 comprises a light source 377 which, in general, may be any source of intense light suitably selected for maximizing the reflectivity from the object bearing a bar code symbol. In the preferred embodiment, light source 377 comprises a solid-state visible laser diode (VLD) which is driven by a conventional driver circuit 378. In the illustrative embodiment, the wavelength of visible laser light produced from the laser diode is preferably about 670 nanometers. In order to repeatedly scan the produced laser beam over the scanning field (having a predetermined spatial extent in front the light transmission window), any number of laser beam scanning mechanisms can be used, as shown in FIGS. 9C, 10D, 11A, 13A and 14A. In FIGS. 15A1–15A4, the scanner driver air unit is schematically depicted by reference numeral 381. As the scanning mechanism can be realized in a variety of different ways, as illustrated herein above, a scanner motor 380 is used to represent this structure in the system. Notably, this scanning motor 380 need not be electro-mechanical in nature, but may be based on electro-optical beam scanning/ steering principles employing, for example, cholesteric liquid crystal (CLC) Laser Beam Steering Arrays disclosed in U.S. Pat. No. 5,459,591, incorporated herein by reference. Thus, the term "scanning motor" as used herein is understood as any means for moving, steering, swinging or directing the path of a light beam through space during system operation for the purpose of obtaining information relating to an object and/or a bar code symbol.

As shown in the generalized system diagram of FIGS. 15A1–15A4, laser diode 377 and scanning motor 380 are enabled by enable signal $E_1$ provided as input to driver circuits 378 and 381. When enable signal $E_1$ is a logical "high" level (i.e. $E_1=1$), a laser beam is generated and projected through the light transmissive window, and repeatedly scanned across the bar code symbol detection field, and an optical scan data signal is thereby produced off the object (and bar code) residing within the bar code symbol detection field 10. When laser diode and scanning motor enable signal $E_1$ is a logical "low" (i.e. $E_1=0$), there is no laser beam produced, projected, or scanned across the bar code symbol detection field 10.

When a bar code symbol is present on the detected object at the time of scanning, the user visually aligns the visible laser beam across the bar code symbol, and incident laser light on the bar code will be scattered/reflected (typically according to Lambert's Law). This scattering/reflection process produces a laser light return signal of variable intensity which represents a spatial variation of light reflectivity characteristics of the pattern of bars and spaces comprising the scanned bar code symbol. Photoreceiving circuit 309 detects at least a portion of the reflected laser light of variable intensity and produces an analog scan data signal $D_1$ indicative of the detected light intensity.

In the illustrative embodiment, photoreceiving circuit 309 generally comprises a number of components, namely: laser light collection optics (e.g. planar or parabolic mirror 379, focusing lens 384) for focusing reflected laser light for subsequent detection; a photoreceiver 385 (e.g. a silicon photosensor) for detecting laser light focused by the light collection optics; and a frequency-selective filter 386A, mounted in front of photoreceiver 385, for transmitting thereto only optical radiation having wavelengths up to a small band above 670 nanometers. In order to prevent optical radiation slightly below 670 nanometers from passing through light transmission aperture and entering the housing, the light transmissive window disposed over the light transmission aperture) is realized as a plastic filter lens 386B is installed over the light transmission aperture of the housing. This plastic filter lens has optical characteristics which transmit only optical radiation from slightly below 670 nanometers. In this way, the combination of plastic filter lens 386B at the transmission aperture and frequency-selective filter 386A before photoreceiver 385 cooperate to form a narrow band-pass optical filter having a center frequency $f_c=670$ nanometers. By permitting only optical radiation associated with the visible laser beam to enter the housing, this optical arrangement provides improved signal-to-noise ratio for detected scan data signals $D_1$, as described in greater detail in U.S. Pat. No. 5,789,731.

In response to reflected laser light focused onto photoreceiver 385, the photoreceiver produces an analog electrical signal which is proportional to the intensity of the detected laser light. This analog signal is subsequently amplified by preamplifier 387 to produce analog scan data signal $D_1$. In short, laser scanning circuit 308 and photoreceiving circuit 309 cooperate to generate analog scan data signals $D_1$ from the scanning field (i.e. bar code detection and reading fields), over time intervals specified by first and second control circuits $C_1$ and $C_2$ during normal modes of operation, and by third control module $C_3$ during "control override" modes of operation.

As illustrated in FIG. 15I, analog scan data signal $D_1$ is provided as input to A/D conversion circuit 310. In a manner well known in the art, A/D conversion circuit 310 processes analog scan data signal $D_1$ to provide a digital scan data signal $D_2$ which has a waveform that resembles a pulse width modulated signal, where the logical "1" signal levels represent spaces of the scanned bar code symbol and the logical "0" signal levels represent bars of the scanned bar code symbol. The A/D conversion circuit 310 can be realized using any conventional A/D conversion technique well known in the art. Digitized scan data signal $D_2$ is then provided as input to bar code symbol detection circuit 311 and symbol decoding module 319 for use in performing particular functions required during the bar code symbol reading process of the present invention.

In FIG. 15J, the bar code symbol detection circuit 311 of the illustrative embodiment is shown in greater detail. The primary purpose of bar code symbol detection circuit 311 is to determine whether a bar code is present in or absent from the bar code symbol detection field 10, over time intervals specified by first control circuit $C_1$ during normal modes of operation, and by third control module $C_3$ during control override modes of operation. In the illustrative embodiment, bar code symbol detection circuit 311 indirectly detects the presence of a bar code in the bar code symbol detection field 10 by detecting its bar code symbol "envelope". In the illustrative embodiment, a bar code symbol envelope is deemed present in the bar code symbol detection field 10 upon detecting a corresponding digital pulse sequence in digital signal $D_2$ which A/D conversion circuit 310 produces when photoreceiving circuit 309 detects laser light reflected off a bar code symbol in the bar code symbol detection field 10. This digital pulse sequence detection process is achieved by counting the number of digital pulse transitions (i.e. falling pulse edges) that occur in digital-scan data signal $D_2$ within a predetermined time period $T_1$ clocked by the bar code symbol detection circuit. According to the laws of physics governing the laser scanning mechanism employed within the implementation of the system, the number of digital (pulse-width modulated) pulses detectable at photoreceiver 385 during time period $T_1$ is a function of the distance of the bar code from the light transmission window 311 at the time of scanning. Thus, a bar code symbol scanned at 6" from the light transmission window will produce a larger number of digital pulses (i.e. digital count) at photoreceiver 385 during time period $T_1$ than will the same bar code symbol scanned at 3" from the light transmission window.

In the illustrative embodiment, bar code symbol detection circuit 311 comprises a digital pulse transition counter 390 for counting digital pulse transitions during time period $T_1$, and a digital clock circuit (i.e. $T_{BCD}$ circuit) 391 for measuring (i.e. counting) time period $T_{BCD}$ and producing a count reset signal CNT RESET at the end of each such time period, as shown in FIG. 15K. As shown in FIG. 15L, the function of digital clock circuit 391 is to provide a time period $T_{BCD}$ (i.e. time window subdivision) within which the bar code symbol detection circuit 311 attempts, repeatedly during time period $T_1$, to detect a bar code symbol in the bar code symbol detection field 10. In the preferred embodiment, $T_{BCD}$ is about 0.1 seconds, whereas $T_1$ is about 1.0 second. As shown in FIG. 15J, in order to establish such "bar code search" time subintervals within time period $T_1$, the digital clock circuit 391 generates the first count reset pulse signal CNT RESET upon the detection of the first pulse transition in digital scan data signal $D_2$. The effect of this reset signal is to clear or reset the digital pulse transition (falling edge) counter. Then at the end of each time sub-interval $T_{BCD}$, digital clock circuit 391 generates another count reset pulse CNT RESET to reset the digital pulse transition counter. If during time window $T_1$, a sufficient number of pulse transitions in signal $D_2$ are counted over a subinterval $T_{BCD}$, then control activation signal $A_2$ will be set to "1". In response to the detection of this condition, second control circuit $C_2$ automatically enables control module $C_3$ in order to initiate a transition from the bar code symbol detection state of operation to the bar code symbol reading state of operation.

As shown in FIG. 15J, digital pulse transition counter circuit 390 is formed by wiring together a series of four flip-flop circuits 392, 393, 394 and 395 such that each flip flop divides the clock signal frequency of the previous stage by a factor of 2. As indicated in the drawing of FIG. 15J, the Q output of flip flops 392 to 395 represent the binary digits 2, 4, 8, and 16 respectively, of a binary number (i.e. counting) system. As shown, enable signal $E_2$ from first control circuit $C_1$ is provided as input to NOR gate 397, while the second input thereto is the counter reset signal CNT RESET provided from the TBCD digital timer counter circuit 391. In order to reset or clear the pulse transition counter circuit 390 upon the generation of each CNT RESET pulse, the output of the NOR gate 397 is connected to the clear line (CL) of each flip flop 392 to 395, as shown.

As illustrated in FIG. 15J, digital clock circuit 391 comprises a flip-flop circuit 398, a NOR gate 399, a clock divide circuit 400, a comparator 401, and a NPN transistor 402. As illustrated, digital scan data signal $D_2$ is directly provided to the CLK input of flip-flop 398. The QNOT output of the flip-flop circuit 398 is provided as one input to NOR gate 399, whereas the Q output thereof is connected to the CLK input of clock divide circuit 400 and the second input of NOR gate 397. The other input of NOR gate 399 is connected to the input line CLK of clock divide circuit 400 and to the output of comparator 401, as shown. The output of the NOR gate 399 is connected to the base of transistor 402, while the emitter thereof is connected to electrical ground and the collector of transistor 402 is connected to the negative input of comparator 401 as well as to the third timing network 312, in a manner similar to the interconnection of the first timing network 302 to primary oscillation circuit 301A. As shown in FIG. 15K, clock divide circuit 400 is realized as series of five flip-flops 400A to 400E wired together so as to divide the frequency of the digital clock input signal CLOCK by a factor of 32, and be resettable by pulsing reset line RESET in a conventional manner.

When an object is detected in the object detection field 9, first control circuit $C_1$ produces enable signal $E_2$=1 so as to enable digital pulse transition counter 390 for a time duration of $T_1$. As shown, the digital scan data signal $D_2$ (representing the bars and spaces of the scanned bar code) drives the clock line of first flip flop 392, as well as the CLK line of flip flop circuit 398 in the $T_{BCD}$ digital timer circuit 391. The first pulse transition in digital scan data signal $D_2$ starts digital timer circuit 391. The production of each count reset pulse CNT RESET from digital timer circuit 391 automatically clears the digital pulse transition counter circuit 390, resetting it once again to count the number of pulse transitions present in the incoming digital scan data signal $D_2$ over a new time subinterval $T_{BCD}$. The Q output corresponding to eight pulse transitions counted during time period $T_{BCD}$, provides control activation signal $A_2$. When the presence of a bar code in the bar code symbol detection field 10 is detected, the second activation control signal $A_2$ is generated, the third control circuit $C_3$ is activated and second control circuit $C_2$ is overridden by the third control circuit $C_3$ through the transmission of control override signals (i.e. $C_3/C_2$ inhibit and $C_3/C_1$ enable signals) from the third control circuit $C_3$.

As illustrated in FIG. 15M, the second control circuit $C_2$ is realized as a simple logic circuit consisting of an OR gate 405. As shown, the second control activation signal $A_2$ is provided to the first input of OR gate 405, while the $C_3/C_2$ override signal from the third control module $C_3$ is provided to the second input of the OR gate 405, and also to the $C_2/C_1$ terminal. The output of the OR gate 405 is connected directly to the $E_3$ enable/disable terminal in order to provide enable signal $E_3$ for enabling third control module $C_3$. So configured, the combinational logic of the second control circuit $C_2$ maps its input signals to its output signals in accordance with the logic table of FIG. 15N.

Upon entering the bar code symbol reading state, the third control module $C_3$ provides override control signal $C_3/C_{1-2}$ to the first control circuit $C_1$. In response to control signal $C_3/C_{1-2}$, the first control circuit $C_1$ produces enable signal $E_1$=1 which enables the laser scanning circuit 308, photo-receiving circuit 309 and A/D conversion circuit 310. In response to control signal $C_3/C_2$, the first control circuit $C_1$ produces enable signal $E_2$=0, which disables bar code symbol detector circuit 311. Thereafter, the third control module $C_3$ produces enable signal $E_4$=1 to enable symbol decoding module 319. In response to the production of such signals, the symbol decoding module 319 decode processes, scan line by scan line, the stream of digitized scan data contained in signal $D_2$ in an attempt to decode the detected bar code symbol within the second predetermined time period $T_2$ established and monitored by the third control module $C_3$. If the symbol decoding module 319 successfully decodes the detected bar code symbol within time period $T_2$, then symbol character data $D_3$ (representative of the decoded bar code symbol and typically in ASCII code format) is produced. Thereupon symbol decoding module 319 produces and provides the third control activation signal $A_3$ to the third control module $C_3$.

If the data transmission control activation signal $A_4$=1 has been produced by manually-activatable switch 303 within a predetermined time duration (i.e. time frame) set by a timer within the third control module $C_3$, then the third control module $C_3$ automatically induces a state transition from the bar code symbol reading state to the data (packet) transmission state. In response thereto, three distinct events are programmed to occur. Firstly, the third control module $C_3$ automatically produces and provides enable signal $E_5$ to data packet synthesis module 320. Secondly, symbol decoding module 319 stores symbol character data $D_3$ in a memory buffer associated with data packet synthesis module 320. Thirdly, the third control module $C_3$ produces and provides enable signal $E_7$ to the data packet transmission circuit 321. These enabling events activate the data (packet) transmission subsystem shown in FIGS. 15A1–15A4. Upon activation of the data packet transmission subsystem, the subsequently produced symbol character data string is transmitted to the base unit 440 and therefrom to the host computer 441.

Alternatively, upon generation of control activation signals $A_3$=1 and $A_4$=1 within the time period established by the third system control module $C_3$, a different set of events can be programmed to occur. For example, the third control module $C_3$ can produce and provide enable signal $E_6$ to the data storage module, and thereafter produce and provide enable signal $E_7$ to the data transmission circuit 321. These enabling events activate the data (packet) transmission subsystem of the system shown in FIG. 15. Upon activation of the data packet transmission subsystem, the subsequently produced symbol character data string is transmitted to the base unit 440, and therefrom to the host computer 441.

In the illustrated embodiment, symbol decoding module 319, data packet synthesis module 320, and timers $T_2$, $T_3$, $T_4$ and $T_5$ are each realized using programmed microprocessor and accessible memory 334. Similarly, the third control module $C_3$ and the control functions which it performs at Blocks I to GG in FIGS. 20A1 through 20E, for example, are realized as a programming implementation using techniques well known in the art.

The function of data packet synthesis module 320 is to use the produced symbol character data to synthesize a group of data packets for subsequent transmission to its mated base unit 440 by way of data packet transmission circuit 321. The construction of the data packet transmission circuit 321 will vary from embodiment to embodiment, depending on the type of data communication protocol being used in the particular embodiment of the bar code symbol reading system.

Figure 17:
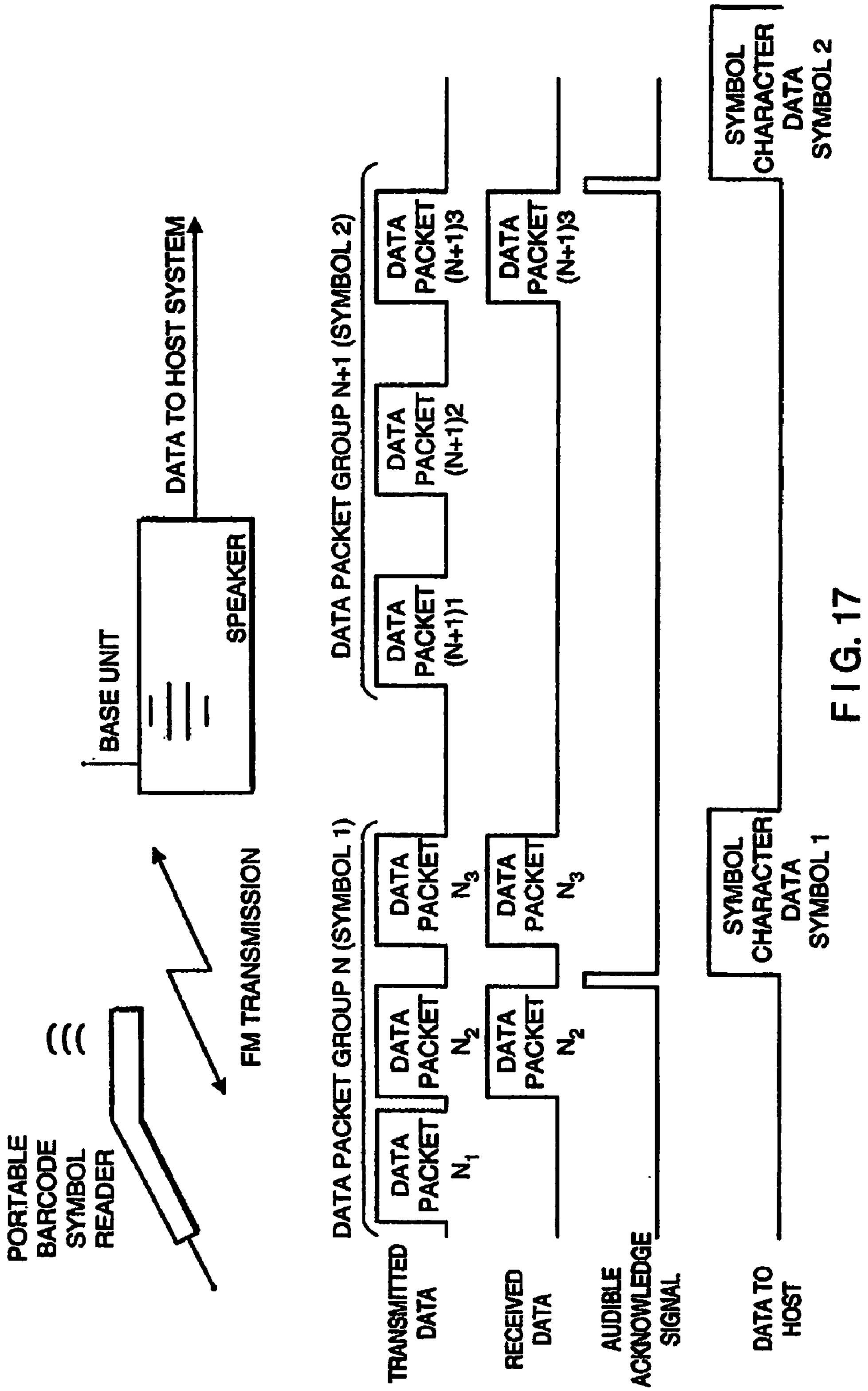
FIG. 17 is a schematic representation illustrating a first communication method that can be used to link a bar code symbol reader hereof to a remote base unit, wherein the bar code symbol reader employs one-way wireless data packet transmission to a base unit employing condition-dependent acoustical signaling for data packet reception acknowledgment.

In the case when the system employs a one-way RF data communication protocol, using condition dependent acoustical acknowledgment signal feedback as shown in FIG. 17 and described in U.S. Pat. No. 5,808,285, each synthesized data packet is formatted as shown in FIG. 15O. In particular, each data packet in each data packet group comprises a number of data fields, namely: a Start of Packet Field 420 for containing a digital code indicating the beginning of the transmitted data packet; a Transmitter Identification Number Field 421 for containing a digital code representative of the Transmitting Bar Code Symbol Reader; Data Packet Group Number Field 422 for containing a digital code (i.e. a first module number) assigned to each particular data packet group being transmitted; a Data Packet Transmission No. Field 423 for containing a digital code (i.e. a second module number) assigned to each data packet in each data packet group being transmitted; a Symbol Character Data Field 424 for containing digital code representative of the symbol character data being transmitted to the base unit; an Error Correction Code Field 425 for containing a digital error correction code for use by the receiving base unit to determine if an error in data packet transmission has occurred; and an End of Packet Field for 426 for containing a digital code indicating the end of the transmitted data packet.

As illustrated in FIGS. 15A1–15A4, the data packet transmission circuit 321 comprises a carrier signal generation circuit 430, a carrier signal frequency modulation circuit 431, a power amplifier 432, a matching filter 433, and a quarterwave (¼) transmitting antenna element 434. The function of the carrier signal generation circuit 430 is to generate a carrier signal having a frequency in the RF region of the electromagnetic spectrum. In the illustrative embodiment, the carrier frequency is about 912 Mhz, although it is understood that this frequency may vary from one embodiment of the present invention, to another embodiment thereof. As the carrier signal is being transmitted from transmitting antenna 434, frequency modulation circuitry 431 modulates the instantaneous frequency of the carrier signal using the digital data sequence (i.e. digital data stream) 435 constituting the group of data packets synthesized by the data packet synthesis module 320. The function of the power amplifier 432 is to amplify the power of the transmitted modulated carrier signal so that it may be received by a base unit 440 located within a predetermined data transmission range (e.g. from about 0 to about 30 feet), illustrated in FIGS. 2D and 3D, in particular.

In general, each base unit of the one-way RF embodiment performs a number of functions. First, the base unit receives the modulated carrier signal transmitted from a hand-supportable bar code symbol reading device within the data reception range of the base unit. Secondly, the base unit demodulates the received carrier signal to recover the data packet modulated thereunto during signal transmission. Thirdly, the base unit analyzes each of the recovered data packets to determine whether the received carrier signal was transmitted from a hand-supportable bar code symbol reading device preassigned to the receiving base unit. Fourthly, the base unit recovers the symbol character data from at least one data packet in a transmitted group of data packets, and ascertaining the reliability of the recovered symbol character data. Fifthly, the base unit generates an acoustical acknowledgement signal SACK that can be audibly perceived by the operator of the transmitting bar code symbol reading device while located in the data reception range of the base unit. Finally, the base unit transmits the received symbol character data to a host computer system or like device. Each of these functions will be described in greater detail during the detailed description of the Main System Control Routine set forth in FIGS. 20A1 to 20E.

In order to better understand the functions performed by the bar code symbol reading device and base unit of the present invention, it will be helpful to first describe the principles underlying the data communication method of the present invention, and thereafter discuss the role that the base unit plays in carrying out this communication method.

In a typical application of the present invention, a (resultant) system of bar code symbol reading subsystems are installed in physical proximity with each other. Typically each system is a point of sale (POS) station including a host computer system interfaced with a base unit of the present invention and an automatic hand-supportable bar code symbol reading device preassigned to one of the base units. To register (i.e. associate) each bar code symbol reading device with a preassigned base unit, each bar code symbol reading device is preassigned a unique "Transmitter Identification Code" which is stored in a memory in the assigned base unit during a set-up procedure.

In the illustrative embodiment, the carrier frequency of the data packet transmitter in each bar code symbol reading device is substantially the same for all bar code symbol reading devices in the resultant system. Also, the data packet transmission range of each bar code symbol reading device will be substantially greater than the distance between each bar code symbol reading device and a neighboring base unit to which the bar code symbol reading unit is not assigned. Consequently, under such operating conditions, at any instance in time, any base station in the resultant system may simultaneously receive two or more packet modulated carrier signals which have been transmitted from two or more bar code symbol reading devices being used in the resultant system. These bar code symbol reading devices may include the bar code symbol reading device preassigned to the particular base unit as well as neighboring bar code symbol reading devices. Thus, due to the principles of data packet transmission of present invention, there exists the possibility that any particular base unit may simultaneously receive two or more different data packets at any instant in time, thereby creating a "packet interference" situation.

In order to ensure that each base unit in the resultant system is capable of receiving at least one data packet from a data packet group transmitted by its preassigned bar code symbol reading device (i.e. without risk of interference from neighboring bar code symbol reading device transmitters), the unique "data packet group" transmission scheme shown in FIG. 17 is employed. As shown, upon the successful reading of a first bar code symbol and the production of its symbol character data $D_3$, data packet synthesis module 320 aboard the bar code symbol reading device automatically produces a first (i.e. N=1) group of (three) data packets, each having the packet format shown in FIG. 15O. When enabled by data transmission control activation signal $A_4=1$, the data packet transmission circuit 321 uses the digital data bit stream, representative of the synthesized data packet group, to modulate a carrier signal transmitted from the hand-supportable bar code symbol reading device.

In the illustrative example shown in FIG. 17, only the second and third data packets of the group sent over the modulated carrier signal are shown as being received by the preassigned base unit. As shown in this drawing, the base unit transmits the recovered symbol character data $D_3$ to its host computer system upon receiving the second data packet in the transmitted group of data packets. Thereafter, the base unit produces an acoustical acknowledgement signal $S_{ACK}$ of sufficient intensity that can be easily heard by the operator of the bar code symbol reading device which transmitted the received data packet. The function of the acoustical acknowledgment signal is to provide the operator with an audible acknowledgement that the symbol character data $D_3$ (associated with the recently read bar code symbol) has been received by the base unit and transmitted to its host computer system for processing and/or subsequent storage. Notably, while the third data packet $N_3$ is also received by the base unit, the available acknowledgement signal $S_{ACK}$ and symbol character data transmission is not produced as packet $N_3$ contains redundant information already received by the second packet $N_2$ of the same group.

In the preferred embodiment, the pitch of the transmitted acoustical acknowledgement signal $S_{ACK}$ is uniquely specified and assigned to a particular bar code symbol reading unit. This way the operator of each bar code symbol reading (sub)system can easily recognize (i.e. discern) the audible acoustical acknowledgement signal produced from the base unit preassigned to his or her bar code symbol reading device. At the same time, this pitch assignment scheme allows each operator to ignore audible acoustical acknowledgment signals produced from neighboring base units not mated with his or her portable bar code symbol reading device. If after reading a bar code symbol, the operator does not see the visual "good read" indication light "flash" or "blink," and immediately thereafter hear its preassigned acoustical acknowledgement signal emanate from its base unit, then the operator is implicitly informed that the symbol character data of the read bar code symbol was not successfully received by the base unit. In response to such an event, the operator simply rereads the bar code symbol and awaits to hear the acoustical acknowledgment signal emanating from the base unit.

Notably, it may even be desirable in some operating environments to produce acoustical acknowledgement signals in the form of a unique sequence of notes, preassigned to a bar code symbol reading device and its "mated" base unit. The pitch or note sequence assigned to each mated base unit and bar code symbol reading device can be stored in a memory (e.g. EPROM) realized in the base unit, and can be programmed at the time of system set-up and modified as required. Preferably, each pitch and each note sequence is selected so that it can be readily distinguished and recognized by the operator to which it is uniquely directed.

Also shown in FIG. 17 is the case where the bar code symbol reading device reads a second bar code symbol and then transmits a second (N=2) group of data packets. However, due to interference, only the third data packet in the second transmitted group of data packets is received at the respective base unit. Despite such group transmission errors (e.g. due to channel corruption or non-radio transmissive obstructions), the base unit as shown is nevertheless able to recover the transmitted symbol character data. Upon receiving the third data packet, recovering the packaged symbol character data and transmitting the same to the host computer system, the bar code symbol reading device generates an acoustical acknowledgement signal having a pitch or note sequence that the operator can hear and recognize as an indication that the data packet reception was successful.

In the above-described data packet transmission scheme, data packet interference is minimized by the random presence of interference-free time slots, during which a transmitted data packet can be received at its respective base unit without neighboring packet interference. However, additional measures are employed by the transmission scheme to further reduce the likelihood of data packet interference. Such measures are described in great detail in U.S. Pat. No. 5,808,285, incorporated herein by reference.

Figure 18:
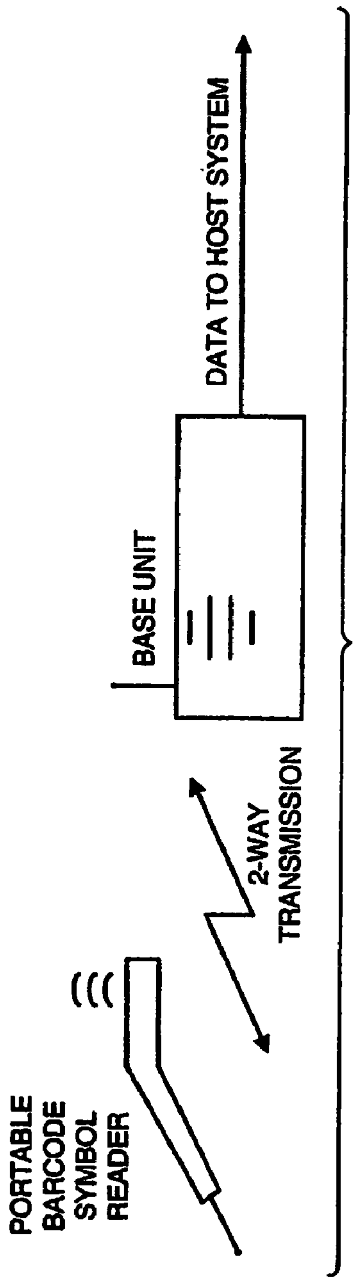
FIG. 18 is a schematic representation illustrating a second communication method that can be used to link a bar code symbol reader hereof to a remote base unit, wherein the bar code symbol reader employs two-way wireless data packet transmission to a base unit employing DFSK modulation technique.

In FIG. 18, an alternative technique is shown for establishing data communication between the automatically-activated bar code symbol reading device and its mated base unit by way of a 2-way RF-based data communication protocol using digital frequency shift keying (DFSK) modulation techniques, as described in U.S. Pat. Nos. 4,460,120 and 5,3221,246, incorporated herein by reference.

Figure 19:
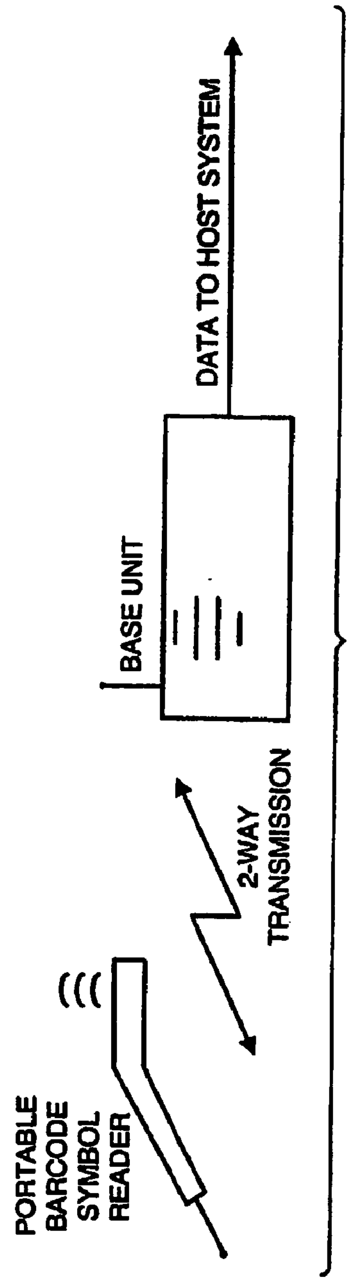
FIG. 19 is a schematic representation illustrating a third communication method that can be used to link a bar code symbol reader hereof to a remote base unit, wherein the bar code symbol reader employs two-way wireless data packet transmission to a base unit employing spread-spectrum signaling technique.

In FIG. 19, an alternative technique is shown for establishing data communication between the automatically-activated bar code symbol reading device and its mated base unit by way of a 2-way spread-spectrum signaling techniques, as described in U.S. Pat. Nos. 5,418,812; 5,029,183; 5,280,498; 5,142,550; 5,528,621; and 5,479,441, each incorporated herein by reference.

Having described the detailed structure and internal functions of automatic bar code symbol reading device of the first generalized system design, the operation of the control system thereof will now be described while referring to the system block diagram shown in FIGS. 15A1–15A4 and control Blocks A to GG shown in FIGS. 20A1 to 20E.

Beginning at the START block of Main System Control Routine and proceeding to Block A of FIG. 20A1, the bar code symbol reading system is "initialized". This initialization step involves: activating (i.e. enabling) system override detection circuit 301, first control circuit $C_1$ (304), oscillator circuit 301, the system override signal producing means 333, and IR-based object sensing circuit 306; and deactivating (i.e. disabling) laser scanning circuit 308, photoreceiving circuit 309, and all subcircuits aboard ASIC chip 333 shown in FIGS. 15A1–15A4 that are not associated with the system override detection circuit 301, i.e. object detection circuit 307, A/D conversion circuitry 310, second control circuit $C_2$ (313), bar code presence detection circuit 311, third control module $C_3$ (314), symbol decoding module 319, data packet synthesis module 320, and data packet transmission circuit 321. During this initialization step, all timers $T_1$, $T_2$, $T_3$, $T_4$, and $T_5$ are reset to t=0, the Decoded Symbol Data Buffer (maintained within the symbol decoding module 319) is initialized, and the "$A_3$=1 Flag" (monitored within the third control module $C_3$) is cleared.

Proceeding to Block B in FIG. 20A1, the first control circuit $C_1$ checks to determine whether it has received control activation signal $A_0$=1 from system override detection circuit 301. If this signal is not received, then the first control circuit $C_1$ returns to Block A. If control activation signal $A_0$=1 is received, then at Block C the first control circuit $C_1$ activates (i.e. enables) the object detection circuit 307 by producing enable signal $E_0$, and drives the object detection state indicator 451 also using enable signal $E_0$. At Block D, the first control circuit $C_1$, determines whether it has received control activation signal $A_1$=1, indicating that an object has been detected within the object detection field 9 of the system. If control activation signal $A_1$=1 is not received at Block D, then at Block E the first control circuit $C_1$ determines whether it has received control activation signal $A_0$=1. If the first control circuit $C_1$ has not received control activation signal $A_0$=1 at Block E, then the system control process returns to Block A in FIG. 20A1, as shown.

If the first control circuit $C_1$ has received control activation signal $A_0$=1, then the control system returns to Block D, as shown in FIG. 20A2. If at Block D the first control circuit $C_1$ has received first control activation signal $A_1$=1, then at Block F the first control circuit $C_1$ (i) deactivates (i.e. disables) the object sensing circuit 306 and the object detection circuit 307 using disabling signal $E_0$=0, (ii) activates (i.e. enables) laser scanning circuit 308, photoreceiving circuit 309 and A/D signal conversion circuit 310 using enable signal $E_1$=1, (iii) activates bar code detection circuit 311 and second control circuit $C_2$ using enable signal $E_2$=1, (iv) starts timer $T_1$ maintained in the first control circuit $C_1$ (i.e. $0 \leqq T_1 \leqq$sec., and (v) drives bar code symbol detection state indicator 452 using enable signal $E_2$=1, and ceases driving object detection state indicator 951 using disable signal $E_0$=0. Notably, the activation of these system components permits the bar code symbol reading device to collect and analyze scan data signals for the purpose of determining whether or not a bar code is within the bar code symbol detection field.

Thereafter, the system control process moves to Block G where the second control circuit $C_2$ determines whether it has received control activation signal $A_2$=1 within $T_1$ seconds, indicating that the bar code has been detected in the bar code symbol detection field 10 within the duration of this time period. If at Block G the second control circuit $C_2$ does not receive control activation signal $A_2$=1 from the bar code detection circuit 311 within time period $T_1$, indicating that a bar code symbol is detected in the bar code symbol detecting field 10, then the control system advances to Block H, at which the second control circuit $C_2$ checks if the $A_3$=1 flag has been set to "true." If the $A_3$=1 flag has been set to $A_3$=1, then the system proceeds to Block A, returning system control to the first control unit $C_1$, as shown in FIG. 20A1. If at Block H the $A_3$=1 flag has been not been set to "true," then the system control process hereof proceeds to Block I, at which the data element stored in the Decoded Symbol Data Buffer (e.g. in the second control circuit $C_2$ and/or third control module $C_3$) is set to zero, and then the system control process returns back to Block A via Blocks HH and II. At Block HH, the laser scanning mechanism 308 and 309 and its subcomponents are deactivated for laser emission control reasons, and then at Block II the system controller determines whether control activation signal $A_1$=1 has changed to $A_1$=0, indicating that the object has been moved out of the object detection field 9. So long as the object remains in the object detection field 9, the system control process will reside at Block II, thereby preventing the laser scanning mechanism and associated subsystems from being activated while the bar code symbol reading device is placed on a counter or like surface.

If at Block G, the bar code symbol detection circuit 111 provides the second control circuit $C_2$ with control activation signal $A_2$=1, then at Block J the second control circuit $C_2$ activates (i.e. enables) third control module $C_3$ (i.e. microprocessor 334) using enable signal $E_3$=1, and also resets the timer T1. Then at Block K, the third system control module $C_3$ activates the symbol decoding module using signal $E_4$=1, resets and restarts timer $T_2$ permitting it to run for a second predetermined time period (e.g. $0 \leqq T_2 \leqq 1$ second), and resets and restarts timer $T_3$ permitting it to run for a third predetermined time period (e.g. $0 \leqq T_3 \leqq 5.0$ seconds).

At Block L, the third control module $C_3$ checks to determine whether control activation signal $A_3$=1 is received from the symbol decoding module 119 within $T_2$=1 seconds, indicating that a bar code symbol has been successfully read (i.e. scanned and decoded) within the allotted time period. If control activation signal $A_3$=1 is not received within the time period $T_2$=1 second, then at Block M third control module $C_3$ checks to determine whether control activation signal $A_2$=1 is received. If a bar code symbol is not detected (e.g. $A_2$=0), then the control system returns to Block H, to determine if the $A_3$=1 flag has been set to "true" (which it would not have been) and then onto Block I and then back to Block A. However, if at Block M the third control module $C_3$ receives control activation signal $A_2$=1, indicating that a bar code once again is within the bar code symbol detection field 10, then at Block N the third control module $C_3$ checks to determine whether time period $T_3$ has elapsed (i.e. $A_3$>5 seconds). If at Block N the $T_3$ timer has lapsed, then the control system returns to Block A. If, however, at Block N it is determined that timer $T_3$ has not elapsed, then the system control process returns to Block L, at which the third control module $C_3$ determines whether control activation signal $A_3$=1 has been received. If not, then the system control process returns to Block M. During typical bar code reading applications, the control system may progress through the control loop defined by Blocks L-M-N-L several times before a bar code symbol in the laser-based bar code symbol reading field 11 is read within the time period allotted by timer $T_3$. In the illustrative embodiment, the allotted time period is 5.0 seconds. However, it is understood that in other embodiments of the present invention, the time period may be greater or lesser than this exemplary time period without departing from the principles of the present invention.

Upon receiving control activation signal $A_3$=1 from symbol decoding module 319 at Block L, indicating that a bar code symbol has been successfully read, the control system proceeds to Block 0 where the third control module $C_3$ sets the $A_3$=1 flag to "true" and generates enable signal $E_8$=1 which drives the bar code read state indicator 452 (signaling the operator to depress the data transmission switch 303) and ceases driving bar code detection state indicated 452 using disable signal $E_2$=0. Thereafter, the system control process proceeds to Block P where the third system control module $C_3$ determines whether the Timer $T_3$ has elapsed. If Timer $T_3$ has elapsed, then the system control process returns to Block A. If the Timer $T_3$ has not elapsed, then the system control process advances to Block Q, at which the control module $C_3$ determines whether data transmission control activation signal $A_4$=1 has been received within the $T_3$ time frame. If the third control module $C_3$ determines that the $A_4$=0, indicating that the data transmission activation switch 303 has not been depressed within the $T_3$ time frame, then the control module $C_3$ sets the data in the Decoded Symbol Data Module to zero value, and then the system control process returns back to Block M. If at Block Q the control module $C_3$ determines that control activation signal $A_4=1$ has been generated within a short predetermined time period (e.g. 60 milliseconds), then the system control process advances to Block S in FIG. 20C. Notably, this 60 millisecond time period has been selected in the illustrative embodiments as it has been found to complement the manual response characteristics of most human beings. It is understood, however, that other time durations may be used with acceptable results.

At Block S in FIG. 20C, the control module $C_3$ determines whether the data within the Decoded Symbol Data Buffer has been set to zero value. If this data has not been set to zero value, then the system control process advances to Block T, at which the control module $C_3$ determines whether the bar code symbol character data produced by the symbol decoding module is different than the symbol character data stored in the Decoded Symbol Data Buffer. If these data elements are not the same, then the system control process advances to Block U, where the control module determines whether Timer T3 has elapsed. If Timer T3 has elapsed, then the system control process returns to Block H, as shown in FIG. 20A2. If, however, the Timer T3 has not elapsed at Block U, then the system control process returns to Block M, as shown in FIG. 20B.

If at Block S in FIG. 20C, the control module $C_3$ has determined that the data set in the Decoded Symbol Data Buffer is not zero value, then the system control process advances to Block V, at which the control module $C_3$ stores the symbol character data (produced by the symbol decoding module 319) into the Decoded Symbol Data Module. Thereafter, the system control process proceeds to Block W, at which the third control module $C_3$ continues activation of laser scanning circuit 308, photoreceiving circuit 309, and A/D conversion circuit 310, while deactivating symbol decoding module 319 and commencing activation of data packet synthesis module 320. While the laser beam is being continuously scanned during the data transmission state of operation, the operations at Blocks X to DD described below, are carried out in a high speed manner under the orchestration of control module $C_3$.

As indicated at Block X in FIG. 20D, under the control of module $C_3$, the data packet synthesis module 320 first sets the Packet Number to "1", and increments the Packet Group Number from the previous number. Preferably, the data packet synthesis module keeps track of (i.e. manages) the "Packet Number" using a first module-N counter realized by programmable microprocessor 334, while it manages the "Packet Group Number" using a second modulo-M counter also realized by programmed microprocessor 334. In the illustrative embodiment, the first modulo counter has a cyclical count range of N=2 (i.e. 0,1,2,0,1,2, . . . ), whereas the second modulo counter has a cyclical count range of M=10 (i.e. 0,1,2,3,4,5,6,7,8,9,0,1,2, . . . ).

At Block Y in FIG. 20D, the data packet synthesis module 320 synthesizes or constructs a data packet having a packet format as shown in FIG. 150, i.e. consisting of symbol character data, a Transmitter Identification Number, a Packet Number, a Packet Group Number, check character, and Packet Start and End (i.e. framing) Characters. After the data packet has been formed and the digital data sequence constituting the same is buffered, the third control module $C_3$ activates at Block Z the data packet transmission circuit 321. Thereafter at Block AA, the data packet synthesis module 320 outputs the buffered digital data sequence (of the first synthesized data packet of the group) to the data packet transmission circuit, which uses the digital data sequence to modulate the frequency of the carrier signal as it is being transmitted from the bar code symbol reading device, to its mated base unit 440, as described hereinabove, and then automatically deactivates itself to conserve power.

At Block BB, the third control module $C_3$ determines whether the Packet Number counted by the first module counter is less than "3". If the Packet Number of the recently transmitted data packet is less than "3", indicating that at most only two data packets in a specific group have been transmitted, then at Block CC the data packet synthesis module 320 increments the Packet Number by +1. At Block DD, the third control module then waits for a time delay $T_5$ maintained by Timer $T_5$ to lapse prior to the control system returning to Block Y, as shown in FIG. 20D. Notably, the occurrence of time delay $T_5$ causes a delay in transmission of the next data packet in the data packet group. As illustrated in FIG. 17, the duration of time delay $T_5$ is a function of the (last two digits of the) Transmitter Number of the current data packet group, and thus is a function of the bar code symbol reading device transmitting symbol character data to its mated base unit. For the case of three data packet groups, time delay $T_5$ will occur between the transmission of the first and second data packets in a packet group and between the transmission of the second and third data packets in the same packet group.

Returning to Block Y, the data packet synthesis module 320 synthesizes or constructs the second data packet in the same data packet group. After the second data packet has been formed and the digital data sequence constituting the same is buffered, the third control module $C_3$ reactivates, at Block Z, the data packet transmission circuit 321. Thereafter at Block AA, the data packet synthesis module outputs the buffered digital data sequence (of the second synthesized data packet) to the data packet transmission circuit (34), which uses the digital data sequence to modulate the frequency of the carrier signal as it is being transmitted from the bar code symbol reading device, to its mated base unit 440, and thereafter automatically deactivates itself. When at Block BB third control module $C_3$ determines that the Packet Number is equal to "3", the control system advances to Block EE in FIG. 20E.

At Block EE in FIG. 20E, the third control module $C_3$ continues activation of laser scanning circuit 308, photoreceiving circuit 309, and A/D conversion circuit 310 using control override signals $C_3/C_1$, and deactivates symbol decoding module 319, data packet synthesis module, 320 the data packet transmission circuit 321 using disable signals $E_4=0$, $E_5=0$, $E_6=0$, and $E_9=0$, respectively. Then at Block FF the third control module $C_3$ determines whether control activation signal $A_1=1$, indicating that an object is present in the object detection field 9. If this control activation signal is not provided to the third control module $C_3$, then the control system returns to Block A, as shown. If control activation signal $A_1=_1$ is received, then at Block GG the third control module $C_3$ reactivates the bar code symbol detection circuit 311 using override signal $C_3/C_2$, and resets and restarts timer $T_3$ to start running over its predetermined time period, i.e. $0<T_3<5$ seconds, and resets and restart timer $T_4$ for a predetermined time period $0<T_4<3$ seconds. Thereafter, the system control process returns to Block F in FIG. 20A2 in order to attempt to read another bar code symbol.

As illustrated in FIG. 21, the automatic hand-supportable bar code reading device of the present invention has four basic states of operation, namely: object detection, bar code symbol presence detection, bar code symbol reading, and symbol character data transmission/storage. The nature of each of these states has been described above in great detail.

Transitions between the various states are indicated by directional arrows. Besides each set of directional arrows are transition conditions expressed in terms of control activation signals (e.g. $A_1$, $A_2$, $A_3$ and $A_4$) and where appropriate, state time intervals (e.g. $T_1$, $T_2$, $T_3$, $T_4$, and $T_5$). Conveniently, the state diagram of FIG. 21 expresses most simply the four basic operations occurring during the control flow within the system control program of FIGS. 20A1 to 20E. Significantly, the control activation signals $A_1$, $A_2$, $A_3$ and $A_4$ shown in FIG. 21 indicate which events within the object detection field 9, the bar code detection field 10 and/or the bar code reading fields 11 can operate to affect a state transition within the allotted time frame(s), where prescribed.

Automatically-Activated Laser Scanning Bar Code Symbol System Comprising Laser-Based Object Detection Subsystem, Laser-Based Bar Code Symbol Presence Detection Subsystem, Laser-Based Bar Code Symbol Reading Subsystem, and Manually-Activated Symbol Character Data Transmission Subsystem In FIGS. 22A1 through 24, an automatically-activated laser scanning bar code symbol reading system 460 is shown having a laser-based automatic objection detection subsystem 307. In general, this system design can employ any of the laser scanning engines shown in FIGS. 9E, 10E, 11B, 13B, and 14B. In general, the system 460 shown in FIGS. 22A1–22A4 is similar in many ways to the system 300 shown in FIGS. 15A1–15A4, but there are differences, as shown in FIGS. 22A1–22C. For example, the system of FIGS. 22A1–22A4 does not include an IR-based object sensing circuit 306 or IR-based object detection circuit 307 shown in FIGS. 15A1–15A4, but instead includes a laser-based scanning mechanism 308 for both object serving and bar code scanning, a laser-based object detection circuit 307' as shown in FIG. 22B, and a modified first control circuit ($C_1$) 304' shown in FIG. 22C which enables the VLD to be driven the VLD in its low-power non-visible emission mode.

Figure 22C:
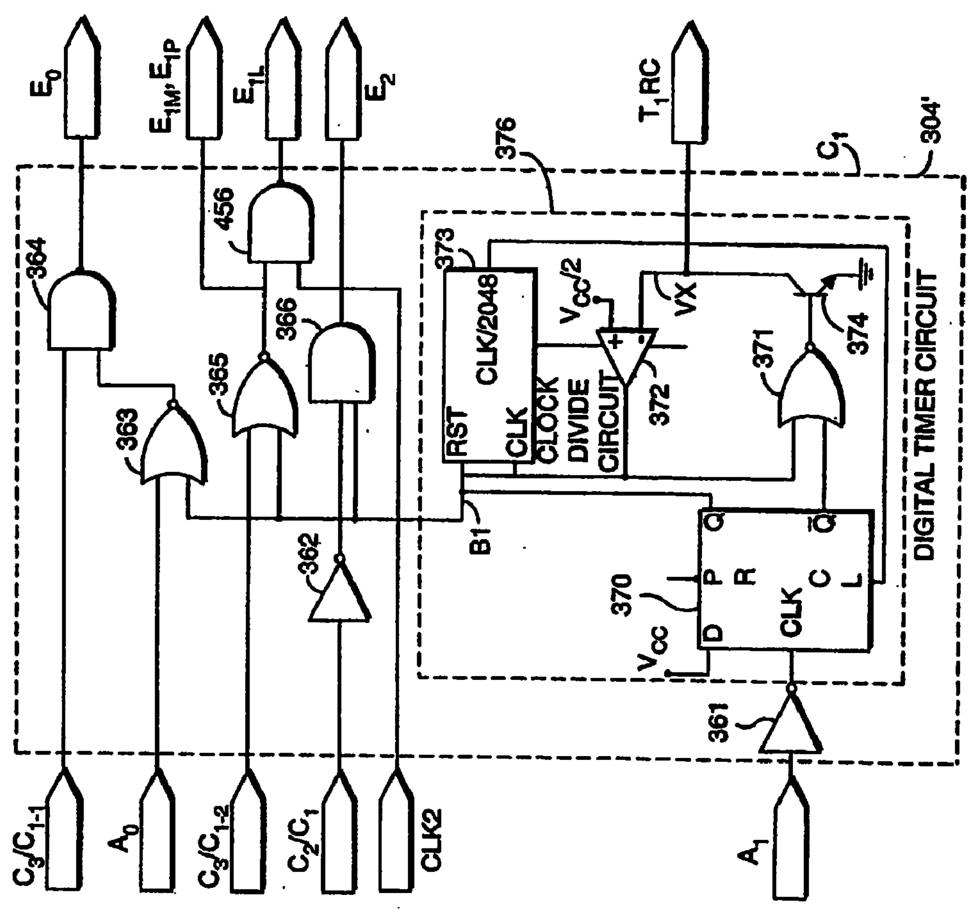
FIG. 22C is a functional logic diagram of the first control circuit (C1) of the control subsystem of FIGS. 22A1 through 22A4.

The function of the first control circuit $C_1$ (304') shown in FIG. 22C is to provide suitable drive/enable signals to the VLD in order to produce, during the object detection mode, a low-power invisible laser beam having a particular duty cycle, as disclosed in U.S. Pat. No. 4,933,538 incorporated herein by reference. During bar code symbol detection and reading modes of operation, the first control circuit $C_1$ provides suitable drive/enable signals to the VLD so that it generates a higher-power visible laser beam for scanning across the bar code symbol detection and bar code symbol reading fields of the system. The first control circuit C, (304) shown in FIG. 22C is similar to the first control circuit C, (304) shown in FIG. 15F except that control circuit 304' includes a NAND gate 456, having a first input terminal that is connected to the output of NOR gate 365, and a second input terminal that is connected to the output of an oscillator (CLK2). As shown, the output terminal of AND gate 456 terminal produces a pulse enable signal $E_{1L}$ for driving the VLD during the object detection mode. The output of NOR gate 365 produces enable signals $E_{lm}$ and $E_{lp}$ for enabling the scanning motor of the system, and the photo-receiving circuit thereof, respectively. By generating several different enabling signals, the laser scanning mechanism 308 and photoreviewing mechanism 309 can be operated in either of two possible warp, namely: as a laser-based object scanner or as a laser-based bar code scanner for bar code symbol detector and reading operations.

The function of the laser-based object detection circuit 307' shown in FIG. 22B is to process (i.e. correlate) the low-power pulsed laser signal $D_1$ (returned to the unit), synchronously with the low-power pulsed laser signal (transmitted from the unit), and generate control activation signal $A_1$=1 when the circuit detects an object based on a real-time analysis of the pulsed laser return signals. In all other respects, the system of FIGS. 22A1–22A4 is similar in structure and function to the system of FIGS. 15A1–15A4.

Having described the detailed structure and internal functions of automatic bar code symbol reading device of the present invention, the operation of the control system thereof will now be described while referring to the system block diagram shown in FIGS. 22A1–22A4 and control Blocks A to GG in FIGS. 23A1 to 23E. Notably, in system control process shown in Blocks A to GG, it has been assumed that the system employs a one-way RF data communication link between the bar code symbol reading device and its associated base unit, as shown in FIG. 17. It is understood that alternative data communication links, based on 1-way and 2-way RF principles alike, can be used with excellent results.

Beginning at the START block of Main System Control Routine and proceeding to Block A of FIG. 23A1, the bar code symbol reading system is "initialized". This initialization step involves several steps, including: activating (i.e. enabling) system override detection circuit 301', first control circuit $C_1$ (304'), oscillator circuit 301, the system override signal producing means 303, laser scanning circuit 308, and photoreceiving circuit 308; and deactivating (i.e. disabling) all subcircuits aboard ASIC chip 333 shown in FIGS. 22A1 to 22A4 that are not associated with the system override circuit 301, i.e. laser-based object detection circuit 307', A/D conversion circuitry 310, second control circuit $C_2$, bar code presence detection circuit 311, third control module 314, symbol decoding module 319, data packet synthesis module 320, and data packet transmission circuit 321. During this initialization step, all timers $T_1$, $T_2$, $T_3$, $T_4$, and $T_5$ are reset to t=0, the Decoded Symbol Data Buffer (e.g. maintained within the symbol decoding module 319) is initialized, and the "$A_3$=1 Flag" (monitored within the third control module $C_3$) is cleared.

Proceeding to Block B in FIG. 23A1, the first control circuit $C_1$ checks to determine whether it has received control activation signal $A_0$=1 from system override detection circuit 301. If this signal is not received, then the first control circuit $C_1$ returns to Block A. If control activation signal $A_0$=1 is received, then at Block C the first control circuit $C_1$ activates (i.e. enables) the object detection circuit 307' by producing $E_0$ and drives the object detection state indicator 451 with enable signal $E_0$=1. At Block D, the first control circuit $C_1$ determines whether it has received control activation signal $A_1$=1, indicating that an object has been detected within the object detection field 23 of the system. If control activation signal $A_1$=1 is not received at Block D, then at Block E the first control circuit $C_1$ determines whether it has received control activation signal $A_0$=1. If the first control circuit $C_1$ has not received control activation signal $A_0$=1 at Block E, then the system control process returns to Block A in FIG. 23A1, as shown.

If the first control circuit $C_1$ has received control activation signal $A_0$=1 at Block E, then the control system returns to Block D, as shown in FIG. 23A2. If at Block D the first control circuit $C_1$ has received first control activation signal $A_1$=1, then at Block F the first control circuit $C_1$ (i) deactivates (i.e. disables) the object detection circuit 307' using disabling signal $E_0$=0, (ii) activates (i.e. enables) A/D signal conversion circuit 310 using enable signal $E_1$=1, (iii) activates bar code detection circuit 311 and second control circuit $C_2$ using enable signal $E_2$=1, and (iv) starts timer $T_1$ maintained in the first control circuit $C_1$ (e.g. $0 \leqq T_1 \leqq 1.0$ second). Also at this stage of the control process, the first control circuit $C_1$ will activate the object detection state indicator light 451 using enable signal $E_2$=1. Notably, the activation of these system components permits the bar code symbol reading device to collect and analyze scan data signals for the purpose of determining whether or not a bar code is within the scanning field.

Thereafter, the system control process moves to Block G where the second control circuit $C_2$ determines whether it has received control activation signal $A_2$=1 within $T_1$ seconds, indicating that the bar code has been detected in the laser-based bar code symbol detection field 24 within the duration of this time period. If at Block G the second control circuit $C_2$ does not receive control activation signal $A_2$=1 from the bar code detection circuit 34 within time period $T_1$, indicating that a bar code symbol is detected in the bar code symbol detecting field 24, then the control system advances to Block H, at which the second control circuit $C_2$ checks if the $A_3$=1 flag has been set to "true." If the $A_3$=1 flag has been set to true, then the system proceeds to Block A, returning system control to the first control unit $C_1$, as shown in FIG. 23A1. If at Block H the $A_3$ flag has been not been set to $A_3$=1, then the system control process hereof proceeds to Block I, at which the data element stored in the Decoded Symbol Data Buffer is set to zero, and then the system control process returns back to Block A via Blocks HH and II. At Block HH, the second control circuit $C_2$ switches the VLD to its low-power pulsed invisible emission mode for object detection, while deactivating the bar code symbol detection circuit 311 and A/D conversion circuit 310 and activating the object detection circuit 307'. Then at Block II the second control circuit $C_2$ determines whether control activation signal $A_1$=1 has changed to $A_1$=0, indicating that the object has been moved out of the object detection field 23. So long as the object remains in the object detection field 23, the system control process will reside at Block II.

If at Block G in FIG. 23A2, the bar code symbol detection circuit 311 provides the second control circuit $C_2$ with control activation signal $A_2$=1, then at Block J the second control circuit $C_2$ activates (i.e. enables) third control module $C_3$ (i.e. programmed microprocessor 334) using enable signal $E_3$=1, and also resets the timer $T_1$. Then at Block K, the third system control module $C_3$ activates the symbol decoding module 349 using signal $E_4$=1, resets and restarts timer $T_2$ permitting it to run for a second predetermined time period (e.g. $0<T_2<1$ second), and resets and restarts timer $T_3$ permitting it to run for a third predetermined time period (e.g. $0<T_3<5$ seconds).

At Block L in FIG. 23B, the third control module $C_3$ checks to determine whether control activation signal $A_3$=1 is received from the symbol decoding module 319 within $T_2$=1 seconds, indicating that a bar code symbol has been successfully read (i.e. scanned and decoded) within the allotted time period. If control activation signal $A_3$=1 is not received within the time period $T_2$=1 second, then at Block M third control module $C_3$ checks to determine whether control activation signal $A_2$=1 is received. If a bar code symbol is not detected (e.g. $A_2$=0), then the control system returns to Block H, to determine if the $A_3$=1 flag has been set and then advances to Block I and then back to Block A. However, if at Block M the third control module $C_3$ receives control activation signal $A_2$=1, indicating that a bar code symbol once again is within the bar code detection field 24, then at Block N the third control module $C_3$ checks to determine whether time period $T_3$ has elapsed (i.e. $T_3$>5.0 seconds). If at Block N the $T_3$ timer has lapsed, then the system control process returns to Block A. If, however, at Block N it is determined that timer $T_3$ has not elapsed, then the system control process returns to Block L, at which the third control module $C_3$ determines whether control activation signal $A_3$=1 has been received. If the signal $A_3$=1 is not received, then the system control process returns to Block M. During typical bar code reading applications, the control system may progress through the control loop defined by Blocks L-M-N-L several times before a bar code symbol in the bar code symbol reading field 25 is detected and read within the time period allotted by timer $T_3$. In the illustrative embodiment, the allotted time period is 5.0 seconds. However, it is understood that in other embodiments of the present invention the time period may be greater or lesser than this exemplary time period without departing from the scope and spirit of the present invention.

Upon receiving control activation signal $A_3$=1 from symbol decoding module 319 at Block L, indicating that a bar code symbol has been successfully read, the system control process proceeds to Block 0 where the third control module $C_3$ sets the $A_3$=1 flag equal to "true," and generates enable signal $E_8$=1 to drive the bar code symbol read indicator 453. Thereafter, the system control process proceeds to Block P where the third control module $C_3$ determines whether the Timer $T_3$ has elapsed. If Timer $T_3$ has elapsed, then the system control process returns to Block A. If the Timer $T_3$ has not elapsed, then the system control process advances to Block Q, at which the control module $C_3$ determines whether data transmission control activation signal $A_4$=1 (produced by data transmission activation switch 303) within the predefined time frame. If the third control module $C_3$ determines that $A_4$=0, indicating that the data transmission activation switch 303 has not been depressed within the above-specified time frame, then at Block R, the control module $C_3$ sets the data in the Decoded Symbol Data Module to zero value, and then the system control process returns back to Block M. If at Block Q the third control module $C_3$ determines that $A_4$=1 has been generated and received with a short predetermined time period (e.g. 60 milliseconds), then the system control process advances to Block S in FIG. 23C.

At Block S in FIG. 23C, the control module $C_3$ determines whether the data within the Decoded Symbol Data Buffer has been set to zero value. If this data has not been set to zero value, then the system control process advances to Block T, at which the control module $C_3$ determines whether the bar code symbol character data produced by the symbol decoding module is different than the symbol character data stored in the Decoded Symbol Data Buffer. If such data elements are not the same, then the system control process advances to Block U, where the control module $C_3$ determines whether Timer $T_3$ has elapsed. If Timer $T_3$ has elapsed, then the system control process returns to Block H, as shown in FIG. 23A2. If, however, the Timer $T_3$ has not elapsed at Block U, then the system control process returns to Block M, as shown in FIG. 23B.

If at Block S in FIG. 23C, the control module $C_3$ has determined that the data set in the Decoded Symbol Data Buffer is not zero value, then the system control process advances to Block V, at which the control module $C_3$ stores the symbol character data (produced by the symbol decoding module 319) into the Decoded Symbol Data Module, and then generates enable signal $E_9$=1 to drive the data transmission state indicator 454 on the bar-code symbol reading device. Thereafter, the system control process proceeds to Block W, at which the third control module $C_3$ continues activation of laser scanning circuit 308, photoreceiving circuit 109 and A/D conversion circuit 310, while deactivating symbol decoding module 319 and commencing activation of data packet synthesis module 320. While the laser beam is continuously scanned across the bar code reading (or detection) fields, the operations at Blocks X to DD described below, are carried out in a high speed manner under the orchestration of third control module $C_3$.

As indicated at Block X in FIG. 23D, under the control of module $C_3$, the data packet synthesis module 320 first sets the Packet Number to "1", and increments the Packet Group Number from the previous number. Preferably, the data packet synthesis module keeps track of (i.e. manages) the "Packet Number" using a first module counter realized by programmable microprocessor 334, while it manages the "Packet Group Number" using a second modulo-M counter also realized by programmed microprocessor 334. In the illustrative embodiment, the first modulo counter has a cyclical count range of N=2 (i.e. 0,1,2,0,1,2, . . . ), whereas the second modulo counter has a cyclical count range of M=10 (i.e. 0,1,2,3,4,5,6,7,8,9,0,1,2, . . . ).

At Block Y in FIG. 23D, the data packet synthesis module synthesizes or constructs a data packet having a packet format as shown in FIG. 15O, i.e. consisting of Symbol Character Data, a Transmitter Identification Number, a Packet Number, a Packet Group Number, Error Check Character, and Packet Start and End (i.e. framing) Characters. After the data packet has been formed and the digital data sequence constituting the same is buffered, the third control module $C_3$ activates the data packet transmission circuit 321 at Block Z. Thereafter at Block AA, the data packet synthesis module outputs 320 the buffered digital data sequence (of the first synthesized data packet of the group) to the data packet transmission circuit 321, which uses the digital data sequence to modulate the frequency of the (RF) carrier signal as it is being transmitted from the bar code symbol reading device, to its mated base unit 440, as described hereinabove, and then automatically deactivates itself to conserve power.

At Block BB, the third control module $C_3$ determines whether the Packet Number counted by the first module counter is less than "3". If the Packet Number of the recently transmitted data packet is less than "3", indicating that at most only two data packets in a specific group have been transmitted, then at Block CC the data packet synthesis module 320 increments the Packet Number by +1. At Block DD, the third control module then waits for a time delay $T_5$ to lapse prior to the control system process returning to Block Y, as shown in FIG. 23D. Notably, the occurrence of time delay $T_5$ causes a delay in transmission of the next data packet in the data packet group.

Returning to Block Y in FIG. 23D, the data packet synthesis module 320 synthesizes or constructs the second data packet in the same data packet group. After the second data packet has been formed and the digital data sequence constituting the same is buffered, the third control module $C_3$ reactivates at Block Z the data packet transmission circuit. Thereafter, at Block SS, the data packet synthesis module 320 outputs the buffered digital data sequence (of the second synthesized data packet) to the data packet transmission circuit 321, which uses the digital data sequence to modulate the frequency of the carrier signal as it is being transmitted from the bar code symbol reading device, to its mated base unit 440, and thereafter automatically deactivates itself.

When at Block BB, the third control module $C_3$ determines that the Packet Number is equal to "3", the control system process advances to Block EE in FIG. 23E.

At Block EE in FIG. 23E, the third control module $C_3$ generates enable signal $E_{1L}$ to drive the VLD in its low-power pulsed emission mode (for object detection) activates the object detection circuit 307', and continues activation of laser scanning circuit 308, photoreceiving circuit 309, and A/D conversion circuit 310 using control override signals $C_3/C_1$, and deactivates symbol decoding module 319, data packet synthesis module 320 and the data packet transmission circuit 321 using disable signals $E_4=0$, $E_5=0$ and $E_6=0$, respectively. Then at Block FF the third control module $C_3$ determines whether control activation signal $A_1=1$, indicating that an object is present in the object detection field 23. If this control activation signal is not provided to the third control module $C_3$, then the system control process returns to Block A, as shown. If control activation signal $A_1=1$ is received, then at Block GG the third control module $C_3$ reactivates the bar code symbol detection circuit 311 using override signal $C_3/C_2$, and resets and restarts timer $T_3$ to start running over its predetermined time period (i.e. $0 \leqq T_3 \leqq 5$ seconds), and resets and restart timer $T_4$ for a predetermined time period (i.e. $0 \leqq T_4 \leqq 3$ seconds). Thereafter, the system control process returns to Block F in FIG. 23A2 in order to attempt to read another bar code symbol.

Having described the operation of the automatic hand-supportable bar code reading system of the second generalized system embodiment 460, it will be helpful to describe at this juncture the various conditions which cause state transitions to occur during its operation. In this regard, reference is made to FIG. 24 which provides a state transition diagram for the illustrative embodiment.

As illustrated in FIG. 24, the automatic hand-supportable bar code reading device of the present invention has four basic states of operation namely: object detection, bar code symbol presence detection, bar code symbol reading, and symbol character data transmission/storage. The nature of each of these states has been described above in great detail.

Transitions between the various states are indicated by directional arrows. Besides each set of directional arrows are transition conditions expressed in terms of control activation signals (e.g. $A_1$, $A_2$, $A_3$ and $A_4$) and where appropriate, state time intervals (e.g. $T_1$, $T_2$, $T_3$, $T_4$, and $T_5$). Conveniently, the state diagram of FIG. 24 expresses most simply the four basic operations occurring during the control flow within the system control program of FIGS. 23A1 to 23E. Significantly, the control activation signals $A_1$, $A_2$, $A_3$ and $A_4$ in FIG. 24 indicate which events within the object detection and/or bar code detection/reading fields can operate to effect a state transition within the allotted time frame(s), where prescribed.

Automatically-Activated Laser Scanning Bar Code Symbol System Having Pulsed Laser-Based Bar Code Symbol Presence Detection Subsystem, Laser-Based Bar Code Symbol Reading Subsystem, and Manually-Activated Symbol Character Data Transmission Subsystem In FIG. 25A through 28, automatic bar code reading system 480 comprises a number of system components, namely: a hand supportable, body-wearable of otherwise portable housing 481 for compactly containing the subcomponents within the system; a laser scanning mechanism 482, photoreceiving circuit 483, analog-to-digital (A/D) conversion circuit 484, bar code presence detection module 485; symbol decoding character data storage unit 488, data transmission circuit 489 module 486; a data format conversion module 487; a bar code symbol detection state-indicator 491, a bar code reading state indicator 492; a data transmission state indicator 493, support-stand detection means (e.g. Hall-effect sensor) 494; and a manually-activatable data transmissions switch 495 for activating the data transmission mode of the system. As illustrated, these components are operably associated with a programmable system controller 496 which programmed to carry out a system control process in accordance with the present invention.

In the illustrated embodiment, system controller 496, bar code presence detection module 485, symbol decoding module 486, and data format conversion module 487 are realized using a single programmable device, such as a microprocessor, having accessible program and buffer memory, and external timing circuitry. It is understood, however, that any of these elements may be realized using separate discrete components as will be readily apparent to those with ordinary skill in the art.

Automatic hand-supportable bar code reading system 480 also includes power receiving lines 497 which lead to conventional power distribution circuitry (not shown) for providing requisite power to each of the system components, when and for time prescribed by the system controller 496. As illustrated, power receiving lines 497 run alongside data communication lines 498 and are physically associated with multi-pin connector plug 499 at the end of flexible scanner cable 500. An on/off power switch or functionally equivalent device (not shown) may be provided external to the hand-supportable housing to permit the user to selectively energize and deenergize the device. In the illustrative embodiment, power delivered through flexible scanner cable 500 to the bar code symbol reading device is continuously provided to system controller 446 so as to continuously enable its operation, while only biasing voltages and the like are provided to all other system components. In this way, each system component must be activated (i.e. enabled) by the system controller in accordance with its preprogrammed system control routine to be described in detail hereinafter.

As illustrated in FIGS. 25A and 25B, laser scanning mechanism 482 comprises a light source 501 which, in general, may be any source of intense light suitably selected for maximizing the reflectively from the object's surface bearing the bar code symbol. In the illustrative embodiment, light source 501 comprises a solid-state visible laser diode (VLD) which is driven by a conventional laser diode driver circuit 502. The wavelength of visible laser light produced from the laser diode is preferably about 670 nanometers. In order to repeatedly scan the produced laser beam over bar code symbol detection and reading fields (37 and 38), each such field has a predetermined spatial extent in front of the engine or scanner housing, as illustrated in the figures hereof. A planar scanning mirror, flipper-type scanning element, or other scanning element 503, based on principles of reflection, diffraction and/or refraction, is moved by an electrically-powered scanning motor 504 driven by a driver circuit 505. While one suitable flipper-type scanning element is disclosed in copending application Ser. No. 09/154,020, filed Sep. 16, 1998, it is understood that other types of scanning mechanism, known in the art or to be developed in the future, may be used to practice this generalized embodiment of the present invention. Thus, one of a variety of conventional laser scanning mechanisms may be alternatively used with excellent results.

To selectively activate laser light source 501 and scanning motor 504, the system controller 496 provides laser diode scanner enable signal $E_L$, and scanning motor enable signal $E_M$, as input to driver circuits 502 and 505 respectively. When enable signal $E_L$ is a logical "high" level (i.e. $E_L=1$) a laser beam is generated from VLD 504 and projected through the light transmission window of the scanner housing 481, and when $E_M$ is a logical high level the laser beam is repeatedly scanned across the bar code symbol detection and reading fields 37 and 38 respectively, depending on the mode of operation of the system.

When a bar code symbol on an object is within the bar code symbol detection field 37 at the time of scanning, the incident laser light on the bar code will be scattered and reflected. This scattering/reflection process produces a laser light return signal of variable intensity which represents a spatial variation of light reflectivity characteristic of the spaced apart pattern of bars comprising the bar code symbol. Photoreceiving circuit 483 detects at least a portion of the reflected laser light of variable intensity. Upon detection of this reflected laser light, photoreceiving circuit 483 produces an analog scan data signal $D_1$ indicative of the detected light intensity.

In the illustrative embodiment, photoreceiving circuit 483 generally comprises laser light collection optics 507, which focus reflected laser light for subsequent detection by a photoreceiver 508 having, mounted in front of its sensor, a frequency selective filter 509 which only transmits optical radiation of wavelengths up to a small band above 670 nanometers. Photoreceiver 508, in turn, produces an analog signal which is subsequently amplified by preamplifier 510 to produce analog scan data signal $D_1$. In combination with laser scanning mechanism 482 and photoreceiving circuit 483 cooperate to generate analog scan data signals $D_1$ from the scanning field over time intervals specified by the system controller 496. As will be illustrated hereinafter, these scan data signals are used by bar code symbol detection module 485, and symbol decoding module 486, to perform particular functions. As illustrated in FIGS. 25A and 25B, analog scan data signal $D_1$ is provided as input to A/D conversion circuit 484. As is well known in the art, A/D conversion circuit 484 processes analog scan data signal $D_1$ to provide a digital scan data signal $D_2$ which resembles, in form, a pulse width modulated signal, where logical "1" signal levels represent spaces of the scanned bar code and logical "O" signal levels represent bars of the scanned bar code. A/D conversion circuit 484 can be realized by any conventional A/D circuit well known to those with ordinary skill in the art. Digitized scan data signal $D_2$ is then provided as input to bar code symbol detection module 485, and symbol decoding module 486.

The purpose and function of bar code symbol detection module 485 is to determine whether a bar code is present in or absent from the bar code detection field 37 over particular intervals specified by the system controller 496. When a bar code symbol is detected in the bar code detection field 37, bar code detection module 485 generates second control activation signal $A_2$ (i.e. $A_1$) which is provided as input to the system controller, as shown in FIGS. 25A and 25B. Preferably, bar code symbol detection module 485 is realized as a microcode program carried out by the microprocessor and associated program and buffer memory, described hereinbefore. The function of the bar code detection module 485 is not to carry out a decoding process, but rather to rapidly determine whether the received scan data signals represent a bar code symbol residing within the bar code detection field 37.

There are a number of ways in which to achieve bar code symbol detection through a programming implementation. For example, in the preferred embodiment, bar code symbol detection module 485 detects the first and second borders of the bar code symbol "envelope." This is achieved by first processing a digital scan data signal $D_2$ to produce digital "count" and "sign" data. The digital count data is representative of the measured time interval (i.e. duration) of each signal level occurring between detected signal level transitions which occur in digitized scan data signal $D_2$. The digital sign data, on the other hand, indicates whether the signal level between detected signal level transitions is either a logical "1," representative of a space, or a logical "0," representative of a bar within a bar code symbol. Using the digital count and sign data, the bar code presence detection 485 module identifies the first and second borders of the bar code envelope, and thereby determines whether or not the envelope of a bar code symbol is represented by the scan data collected from the bar code detection field 37. When a bar code symbol envelope is detected, the bar code symbol detection module 485 provides second control activation signal $A_2$=1 to the system controller. As will be described in greater detail hereinafter, second control activation signal $A_2$=1 causes the system to undergo a transition from bar code presence detection state to bar code symbol reading state.

Returning to FIGS. 25A and 25B, the function of symbol decoding module 486 is to process, scan line by scan line, the stream of digitized scan data $D_2$, in an attempt to decode a valid bar code symbol within a predetermined time period allowed by the system controller. In general, when symbol decoding module 486 successfully decodes a bar code symbol within the predetermined time period, symbol character data $D_3$ (typically in ASCII code format) corresponding to the decoded bar code symbol is produced. Thereupon, a third control activation signal $A_3$=1 is produced by the symbol decoding module and is provided to the system controller in order to perform its system control functions. When the data activation switch 495 is manually activated during a bar code symbol reading cycle, in response to the generation of activation signal $A_3$=1, and all other conditions are satisfied (i.e. $A_4$=1, $T_2$<0.5 seconds, and the symbol character data is different than the data element in the Decoded Symbol Data Buffer), then the system controller 496 automatically generates data transmission enable signal $E_{DT}$=1.

As will be illustrated in greater detail hereinafter, the system controller 496 provides enable signals $E_{FC}$, $E_{DS}$, $E_{DT}$, $E_{DM}$, $E_{AD}$, $E_{PD}$, $E_L$, and $E_m$ to data format conversion module 487, data storage unit 488 and data transmission circuit 489, bar code detection module 485, A/D conversion circuit 484, photoreceiving circuit 483, VLD drive circuit 502 and scanning motor drive circuit 505, respectively, at particular stages of its control program. As illustrated in FIGS. 25A and 25B, symbol decoding module 486 provides symbol character data $D_3$ to data format module 487 to convert data $D_3$ into two differently formatted types of symbol character data, namely $D_4$ and $D_5$. Format-converted symbol character data $D_5$ is of the "packed data" format, particularly adapted for efficient storage in data storage unit 488. Format-converted symbol character data $D_5$ is particularly adapted for data transmission to host computer system 52 (e.g. an electronic cash register). When symbol character data $D_4$ is to be converted into the format of the user's choice (based on a selected option mode), the system controller 496 provides enable signal $E_{DS}$ to data storage unit 488, as shown in FIGS. 25A and 25B. Format-converted data symbol character $D_5$ is transmitted to host device 512 only when data transmission control switch 495 has been activated during a bar code symbol reading cycle and all preconditions for data transmission have been satisfied within the system. Thereupon, data transmission circuit 512 transmits format-converted symbol character data $D_5$ to host computer system 512, via the data transmission lines 498 of the flexible scanner connector cable 500.

Having described the detailed structure and internal functions of the automatic bar code reading device of the third generalized system embodiment, the operation of its system controller will now be described with reference to system block diagram shown in FIGS. 25A and 25B, the intensity versus time characteristic shown in FIG. 26 and Blocks A to S shown in FIGS. 27A through 27C.

Beginning at the START block of Main System Control Routine of FIG. 27A and proceeding to Block A, the bar code reading system 480 is initialized. This involves continuously activating the system controller 496, visible laser diode (VLD) 501, scanning motor 504, photoreceiving circuit 483, A/D conversion circuit 484, bar code detection module 485. The system controller 496, on the other hand, deactivates (i.e. disables) the remainder of activatable system components, e.g. bar code symbol decoding module 486, data format conversion module 486, data storage unit 488, and data transmission circuit 489. Timers, T1 (e.g. 0≦T1≦0.5 seconds) and $T_{laser\ off}$ (e.g. $0 \leqq T_{laser\ off} \leqq 0.5$ seconds), are maintained by the system controller, and as indicated at Block A, are reset to t=0 seconds. At Block A, the system controller also initializes the Decoded Symbol Data Buffer (maintained by the system controller) and clears the $A_3$=1 flag which is used during the system control process to be detailed hereinbelow, and drives the bar code symbol state indicator 491 using enable signals $E_L$=1 and $E_M$=1.

At Block B, the system controller starts timer T1 and permits it to run for a preset time period 0≦$T_1$≦0.5 seconds. Notably, timer T1 may be implemented in a variety of ways well known in art. Proceeding to Block C, the system controller checks to determine whether control activation signal $A_2$=1 is received from bar code detection module 485 within time period T1. If activation control signal $A_2$=1 is not received within this time period, indicating that a bar code has not been detected in the bar code detection field 37, then the system control process proceeds to Block D. At Block D, the system controller determines whether the $A_3$=1 flag has been set to "true." If this flag has not been set to this value at this stage of the system control process, then the system control process proceeds to Block E, at which it sets the data element in the Decoded Symbol Data Buffer to zero, and then advances to Block F. At Block F, the system controller starts timer $T_{laser\ off}$ defined above, and then deactivates the VLD 501, the laser scanning motor 504, the photoreceiving circuit 483, the A/D conversion circuit 484, and the bar code detection module 485 for using disable signals $E_L$=0, $E_M$=0, $E_{PD}$=0, $E_{AD}$=0, and $E_{DM}$=0 respectively, the time duration of this timer. After Timer $T_{laser\ off}$ has lapsed, the system control process returns to Block A, as indicated in FIG. 27A. If, however, at Block D, the system controller determines that the $A_3$=1 flag has been set to "true," then the system control process proceeds to Block F, and thereafter to Block A, in the manner described hereinabove.

If at Block C in FIG. 27A, the system controller determines that it has not received control activation signal $A_2$=1 within the timer period of T1, the system control process proceeds to Block G, at which it continues activation of the VLD 501, the scanning mechanism (i.e. motor 505), the photoreceiving circuit 483, and the A/D conversion circuit 484, then commences activation of the symbol decoding module 486 using enable signal $E_{SD}$=1 and thereafter, starts timer $T_2$, where $0 \leqq T_2 \leqq 1.0$ seconds. Thereafter, the system control process proceeds to Block H, at which the system controller determines whether control activation signal $A_3=1$ has been received within the time duration of timer $T_2$. If at Block H, control activation signal $A_3=1$ is not received within $T_2$, indicating that no bar code symbol has been read in the bar code reading field 38, then the system control process returns to Block D, as indicated in FIGS. 27A and 27B1. If, however, at Block H the control activation signal $A_3=1$ is received, then the system controller advances to Block I, at which the $A_3=1$ flag is set to "true." Then, at Block J, the system controller determines whether the timer $T_1$ has elapsed. If timer $T_1$ has elapsed, then the system control process returns once again to Block D, as shown in FIG. 27A. If the system controller determines that timer $T_1$ has not elapsed at this time instant in the system control flow, then the system control process proceeds to Block K. At Block K, the system controller determines whether it has received data transmission (activation) control signal $A_4=1$, indicating that the user or operator of the system has manually depressed or otherwise switched the data activation switch 495 on the exterior of the scanner housing 481. If control activation signal $A_4=1$ has not been received, then the system control process proceeds to Block L, at which the system controller sets the data element in the Decoded Symbol Data Buffer to zero, and then returns to Block C, as indicated in FIGS. 27A and 27B1.

If at Block K the system controller receives data transmission control activation signal $A_4=1$ with a short predetermined time period (e.g. 60 milliseconds), then the system control process advances to Block M, at which the system controller determines whether the data element in the Decoded Symbol Data Buffer is set to zero. If the data element in the Decoded Symbol Data Buffer has not been set to zero, then the system control process advances to Block N, at which the system controller determines whether the decoded symbol character data element from the symbol decoding module 486 is different from the data element stored in the Decoded Symbol Data Buffer. If these data elements are different, then the system control process advances to Block O where the system controller determines whether the timer $T_1$ has elapsed. If this timer has elapsed, then the system control process returns to Block D, as indicated in FIG. 27A. If the timer $T_1$ has not elapsed at Block O, then the system control process returns to Block C, as indicated in FIG. 27A.

If, at Block N in FIG. 27B2, the system controller determines that the decoded symbol character data element from the symbol decoding module is different from the data element stored in the Decoded Symbol Data Buffer, then the system control process advances to Block P, at which the system controller stores the symbol character data (from the symbol decoding module) into the Decoded Symbol Character Data. Thereafter, the system control process advances to Block Q, at which the system controller deactivates the symbol decoding module 486, continues activation of the VLD 501, the scanning mechanism (i.e. motor) 504, the photoreceiving circuit 483, and the A/D conversion circuit 484, and commences activation of the data format conversion module 487, and the data transmission circuit 489, and optionally the data storage module 488. Then at Block R in FIG. 27C, the activated data transmission circuit 499 transmits the symbol character data ($D_4$ or $D_5$) to host computer system 512 operably connected to the bar code reading system 480 by way of data transmission cable 500. Then, at Block S, the system controller deactivates the data format conversion module 487, the data transmission circuit 489, and optionally the data storage module 488. Thereafter, the system control process returns to Block C, as indicated in FIG. 27A.

By virtue of the control process of the present invention and the structure of timers $T_1$ and $T_{laser\ off}$, the VLD produces a visible laser beam from VLD 50 comprising a plane of pulsed laser light which "flickers" or "blinks" at a flicker sensitivity rate $R_{flicker}$ equal to $1/T_{flicker}$ where $T_{flicker}$ equals $T_1+T_{laseroff}$. During bar code symbol detection and reading states, the flickering nature of the laser scanning beam significantly improves the user's visual perceptibility thereof as it is scanned across the detected object while the user attempts to visually register (i.e. align) the laser beam with the bars and spaces of a bar code symbol on the object. The improvement in the visual perceptibility of the flickering laser scanning beam is manifested by the fact that the flickering laser scanning beam is more visually conspicuous that a like laser beam of constant luminosity or intensity. This psychophysiological phenomenon is due to the low frequency pulsed nature of the laser scanning beam. While it is understood in the opthalomological art that the human visual system is more sensitive to light flickering below about 16 Hz than light of constant luminosity (i.e. intensity), no one in the bar code symbol scanning art has ever recognized or appreciated that this principle could be utilized to solve the visual perceptibility problem occurring in automatic hand-held laser bar code symbol scanners.

The automatically-activated bar code symbol reading system of the present invention solves the laser scanning beam perceptibility problem in a highly effective manner by applying the principle of "psychophysiological flicker sensitivity" to the construction of the automatic laser bar code symbol scanner. Specifically, by causing the intensity of the visible laser scanning beam to flicker at a rate $R_{flicker}$ greater than about 0.10 Hz and less than about 16 Hz, the visual conspicuousness of the laser scanning beam can be significantly improved, while advantageously decreasing the output power of VLD 501. In any particular embodiment of the present invention, the flicker frequency of the visible laser scanning beam can be selected using the following procedure. First, a value will be selected for time period $T_{laser\ on}$ which provides sufficient time for the bar code symbol reader to capture multiple lines of scan data from the bar code symbol. This selection will depend on the scanning velocity of the laser beam, the collection optics and data processing consideration. Then, for any selected value of $T_1$, the laser-off time period $T_{laser\ off}$ can be selected so that a desired value of $R_{flicker}$ within the range of about 0.1 to about 16 Hz, is obtained. Then by setting parameters $T_1$ and $T_{laser\ off}$ in the system controller, the desired flicker frequency will automatically be set within the automatic bar code symbol reader.

Having described the operation of the third generalized system control process of the present invention, it will be helpful to describe at this juncture the various conditions which cause state transitions to occur during its operation. In this regard, reference is made to FIG. 28 which provides a state transition diagram for the illustrative embodiment.

As illustrated in FIG. 28, the automatic hand-supportable bar code reading device of the present invention has three basic states of operation, namely: bar code symbol presence detection, bar code symbol reading, and symbol character data transmission/storage. The nature of each of these states has been described above in great detail. These three states are schematically illustrated as A, B, and C, respectively, in the state transition diagram of FIG. 28.

As shown in FIG. 28, transitions between the various states are indicated by directional arrows. Besides each set of directional arrows are transition conditions expressed in terms of control activation signals (e.g. $A_1$, $A_2$, $A_3$ and $A_4$ and where appropriate, state time intervals (e.g. $T_{laser\ off}$ $T_1$, and $T_2$). Conveniently, the state diagram of FIG. 28 expresses most simply the three basic operations occurring during the control flow within the system control program of FIGS. 27A through 27C. Significantly, the control activation signals $A_1$, $A_2$, $A_3$ and $A_4$ shown in FIG. 28 indicate which events within the bar code symbol detection and reading fields can operate to effect a state transition within the allotted time frame(s), where prescribed.

Hybrid-Type Automatically-Activated Laser Scanning Bar Code Symbol System Having Pulsed Laser-Based Bar Code Symbol Presence Detection Subsystem, Laser-Based Bar Code Symbol Reading Subsystem, and Manually-Activated Symbol Character Data Transmission Subsystem Referring to FIGS. 29A1 through 31B, a fourth generalized system design will now be described in greater detail. Notably, the structure and functions of the fourth generalized system design can be realized within any automatically-activated bar code symbol reading system having an IR-based or laser-based object detection subsystem, a laser-based bar code symbol detection subsystem, a laser-based bar code symbol reading subsystem, and manually-activated data transmission subsystem as shown, for example, in FIGS. 1A and 1B.

In general, the primary difference between the bar code symbol reading system 300' shown in FIG. 29A1 and the bar code reading system 300 shown in FIG. 15 is that system 300' includes modifications to certain components in the system in order to enter "Time-Extended States of Operation" which provides the user with an extended time period (e.g. 20 seconds) within which to (i) read (detect and decode) a bar code symbol on the detected object and (ii) manually-enable the transmission of its symbol character data to the associated host computer system. The system enters this Time-Extended States of Operation whenever a detected object remains within the object detection field of the system whenever a timer, set to run, "times out" within the system control process. Examples of when a timer may "time out" in the system control process include, for example: when the system fails to read (i.e. detect and decode) a bar code symbol on the detected object within the prescribed time periods established by the control subsystem; and/or when the user fails to manually enable the transmission of produced symbol character data (representative of a read bar code symbol) to the host system, upon manual activation of the data transmission switch 303 within the preallotted time frame established by the control subsystem.

When the system enters the Time-Extended Object Detection State, the laser beam is pulsed (i.e. flickered) at the flicker-frequency rate during both bar code detection and reading modes of operation. Also, additional control structures (i.e. Blocks LL through XX in FIGS. 30F1 and 30F2) are invoked within the Main System Control Routine (i.e. System Control Process) to ensure that the system operates in its Time-Extended States of Operation under the above-described conditions. As will become apparent hereinafter, the fourth generalized system design as well as the fifth generalized system design (i.e. based on a modification of the second generalized system design) offer many important advantages to the user while reading bar coded objects of various sorts. For example, when a user brings a bar coded object within the IR-based object detection field of the system and automatically detects the object, but the system does not read (i.e. detect and decode) the bar code symbol thereon and/or the user fails to transmit produced symbol character data to the host system by manual-activation of the data transmission switch 303, the system automatically enters the Time-Extended States of Operation and is provided an additional time period (e.g. 20 seconds) to allow the system to automatically read the bar code symbol on the detected object and the user manually-activate the data transmission subsystem so that produced symbol character data is transmitted to the host system or device.

As shown in FIGS. 29A1 through 29A4, system 300' is substantially similar to the system 300 shown in FIGS. 15A1–15A4, except in the following respects.

For example, as shown in FIGS. 29A1–29A4, an additional oscillator 301B has been provided for use by modified first control circuit $C_1$ 304' to generate a pulsed laser diode enable signal $E_{1L}$. As shown in FIGS. 29A1–29A4, the first control circuit $C_1$ generates four separate enable/disable signals, namely: $E_{1L}$ for enabling and disabling the VLD 377 in the photoreceiving circuit 308; $E_{1AD}$ for enabling and disabling the A/D conversion circuit 310; $E_{1M}$ for enabling and disabling the scanning motor 379; and $E_{1PD}$ for enabling and disabling the photodetector 385.

Figure 29B:
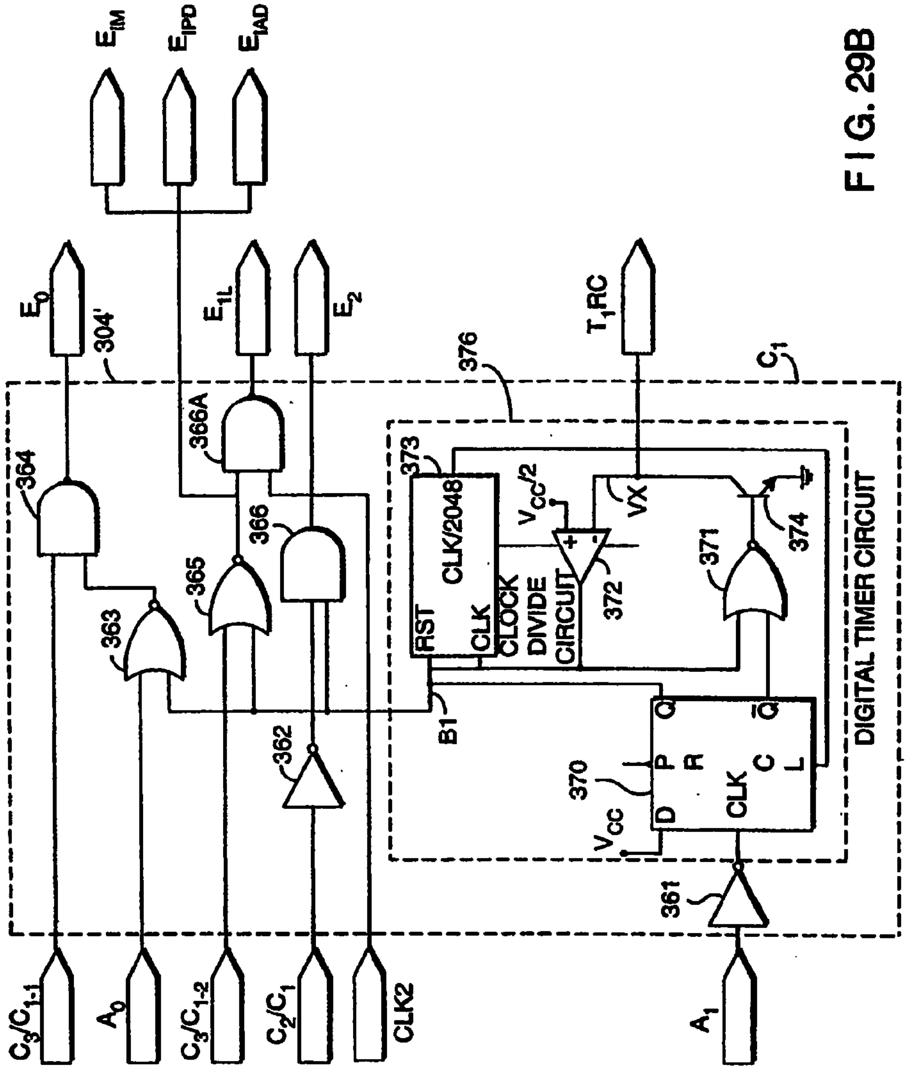
FIG. 29B is a functional logic diagram of the first control circuit ($C_1$) of the control subsystem of FIGS. 29A1 through 29A4.

As shown in FIG. 29B, the first control circuit $C_1$ 304' employed in the system 300' in FIGS. 29A1–29A4 is similar to first control circuit 304 employed in the system 300 in FIGS. 15A1–15A4, except that first control circuit 304' includes an AND gate 366A. As shown, the first input to AND gate 366A is connected to the output of NOR gate 365. The second input to AND gate 377A is connected to the output of clock signal oscillator 301B which generates clock signal CLK2 having binary signal levels indicated by B2, which periodically alternate during each bar code symbol cycle. As shown, the output of the NOR gate 365 provides the enabling/disabling signals $E_{1AD}$, $E_{1M}$ and $E_{1PD}$, whereas the output of AND gate 366A provides enable/disable signal $E_{1L}$. The Boolean expressions set forth in the table of FIG. 29D specify how the enable/disable signals $E_{1AD}$, $E_{1M}$, $E_{1PD}$ and $E_{1L}$ are generated by the first control circuit $C_1$ shown in FIG. 29.

Having described the detailed structure and internal functions of automatic bar code symbol reading device of the fourth generalized system design, the operation of the control system thereof will now be described while referring to the system block diagram shown in FIGS. 29A1–29A4 and control Blocks A to XX in FIGS. 30A1 to 30F2.

Beginning at the START block of Main System Control Routine and proceeding to Block A of FIG. 30A1, the bar code symbol reading system is "initialized". This initialization step involves: activating (i.e. enabling) system override detection circuit 301, first control circuit $C_1$ (304), oscillator circuit 301, the system override signal producing device 333, and IR-based object sensing circuit 306; and deactivating (i.e. disabling) laser scanning circuit 308, photoreceiving circuit 309, and all subcircuits aboard ASIC chip 333 shown in FIGS. 29A1–29A4 that are not associated with the system override detection circuits 301A and 301B, i.e. object detection circuit 307, A/D conversion circuitry 310, second control circuit $C_2$ (313), bar code presence detection circuit 311, third control module $C_3$ (314), symbol decoding module 319, data packet synthesis module 320, and data packet transmission circuit 321. During this initialization step, all timers $T_1$, $T'_1$, $T_2$, $T'_2$, $T_3$, $T_4$, $T_5$, $T_e$ and $T_{laser\ off}$ are reset to t=0, the Decoded Symbol Data Buffer (maintained within the symbol decoding module 319) is initialized, and the "$A_3$=1 Flag" (monitored within the third control module $C_3$) is cleared.

Proceeding to Block B in FIG. 30A1, the first control circuit $C_1$ checks to determine whether it has received control activation signal $A_0$=1 from system override detection circuit 301. If this signal is not received At Block B, then the first control circuit $C_1$ returns to Block A. If control activation signal $A_0$=1 is received at Block B, then at Block C the first control circuit $C_1$ activates (i.e. enables) the object detection circuit 307 by producing enable signal $E_0$, and drives the object detection state indicator 451 also using enable signal $E_0$. At Block D, the first control circuit $C_1$ determines whether it has received control activation signal $A_1$=1, indicating that an object has been detected within the object detection field 9 of the system. If control activation signal $A_1$=1 is not received at Block D, then at Block E the first control circuit $C_1$ determines whether it has received control activation signal $A_0$=1. If the first control circuit $C_1$ has not received control activation signal $A_0$=1 at Block E, then the system control process returns to Block A in FIG. 20A1, as shown.

If the first control circuit $C_1$ has received control activation signal $A_0$=1 at Block E, then the control system returns to Block D, as shown. If at Block D the first control circuit $C_1$ has received first control activation signal $A_1$=1, then at Block F the first control circuit $C_1$ (i) deactivates (i.e. disables) the object sensing circuit 306 and the object detection circuit 307 using disabling signal $E_0$=0, (ii) activates (i.e. enables) laser scanning circuit 308, photoreceiving circuit 309 and A/D signal conversion circuit 310 using enable signal $E_1$=1, (iii) activates bar code detection circuit 311 and second control circuit $C_2$ using enable signal $E_2$=1, (iv) starts timer $T_1$ maintained in the first control circuit $C_1 0 \leqq T_1 \leqq 1.0$ seconds), and (V) drives bar code symbol detection state indicator 452 using enable signal $E_2$=1, and ceases driving object detection state indicator 951 using disable signal $E_0$=0. Notably, the activation of these system components permits the bar code symbol reading device to collect and analyze scan data signals for the purpose of determining whether or not a bar code is within the bar code symbol detection field.

Thereafter, the system control process moves to Block G where the second control circuit $C_2$ determines whether it has received control activation signal $A_2$=1 within $T_1$ seconds, indicating that the bar code has been detected within the bar code symbol detection field 10 within the duration of this time period. If at Block G the second control circuit $C_2$ does not receive control activation signal $A_2$=1 from the bar code detection circuit 311 within time period $T_1$, indicating that a bar code symbol is detected in the bar code symbol detecting field 10, then the control system advances to Block H, at which the second control circuit $C_2$ checks if the $A_3$=1 flag has been set to "true." If the $A_3$=1 flag has been set to $A_3$=1, then the system proceeds to Block A, returning system control to the first control unit $C_1$, as shown in FIG. 30A1. If at Block H the $A_3$=1 flag has been not been set to "true," then the system control process hereof proceeds to Block I, at which the data element stored in the Decoded Symbol Data Buffer (third control module $C_3$) is set to zero, and then the system control process returns back to Block A via Blocks II and JJ. At Block II, the laser scanning mechanism 308 and 309 and its subcomponents are deactivated for laser emission control reasons, and then at Block JJ the system control module $C_2$ determines whether control activation signal $A_1$ has changed to $A_1$=0, indicating that the object has been moved out of the object detection field 9. If the second control module $C_2$ does not receive $A_1$=1, then the system control process returns to Block A, as shown. If the system controller receives $A_1$=1, then the system control process advances to Block LL in FIG. 30F1.

Figure 30C:
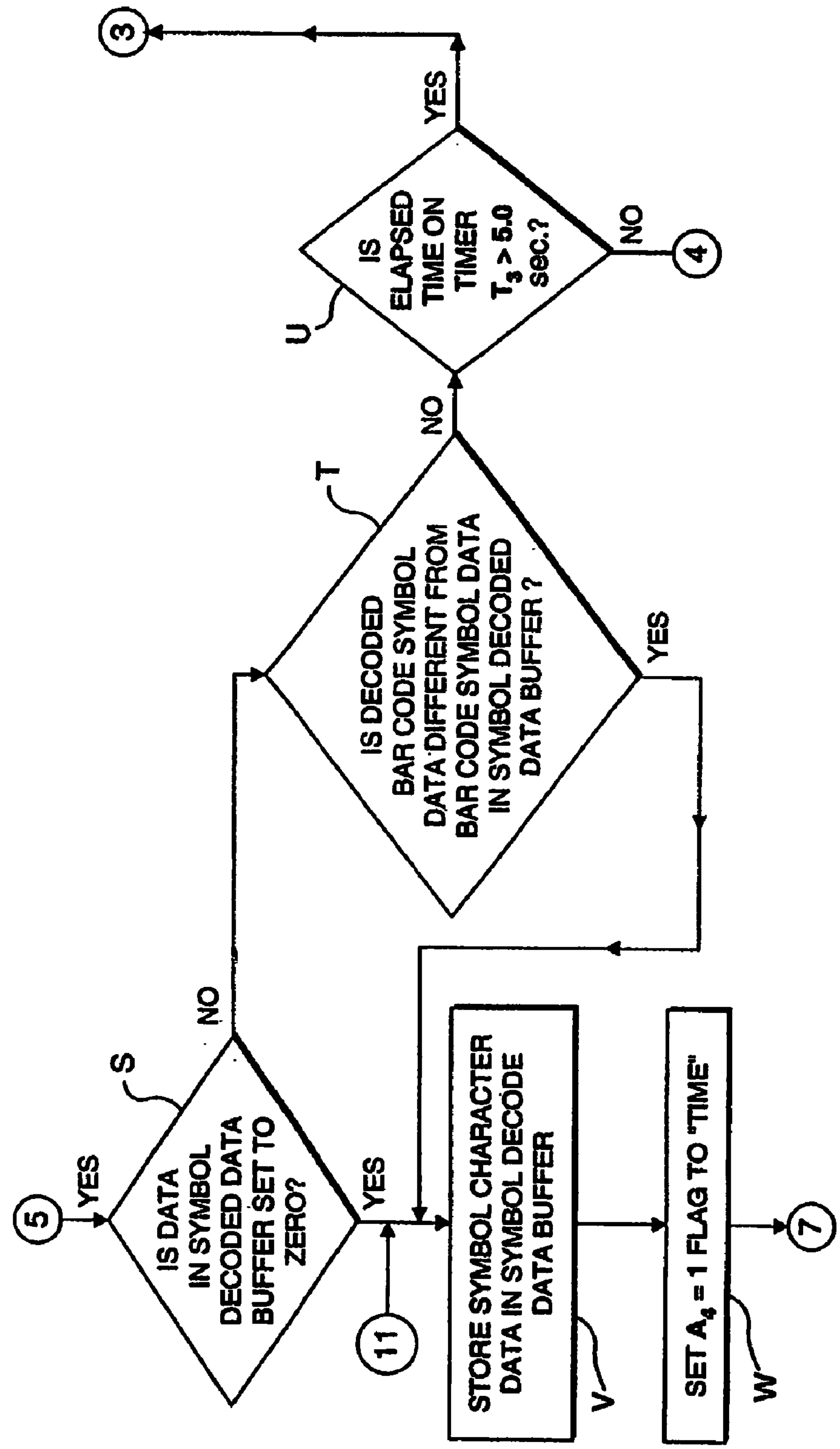

As shown at Block LL in FIG. 30F1, the second control module $C_2$ starts timer $T_e$, wherein $0 \leqq T_e \leqq 30$ seconds. Then at Block MM, the second control module enables the laser scanning mechanism and starts timer $T_2$, wherein $0 \leqq T_1 \leqq 0.5$ seconds. At Block LL, the system enters the Time-Extended Bar Code Symbol Detection State of operation. Thereafter, at Block NN, the second control module $C_2$ determines whether it receives control activation signal $A_2$=1 within $T'_1$. If control module $C_2$ receives $A_2$=1 within $T'_1$, then the control process advances to Block OO, at which the second control module $C_2$ activates the third control module $C_3$ using enable signal $E_3$. Then at Block PP, the third control module $C_3$ activates the symbol decoding module using enable signal $E_4$, and starts timer $T'_2$ where $0 \leqq T_2 \leqq 0.5$ seconds. At Block PP, the system enters the Time-Extended Bar Code Reading State of operation. Then at Block QQ, the third control module $C_3$ determines whether control activation signal $A_3$=1 is received within time period set by timer $T'_2$. If the third control module $C_3$ receives $A_3$=1 within $T'_2$, then the third control module determines at Block RR whether or not it has received control activation signal $A_4$=1 at this stage of the control process. If it has not received $A_4$=1, then the control process returns to Block QQ, as shown in FIG. 30F1. If the third control module $C_3$ receives the control activation signal $A_4$=1, then the system control process returns to Block V, as shown in FIG. 30C. At Block V, the system enters the Data Transmission State of operation.

If at Block QQ, the third control module $C_3$ does not receive control activation signal $A_3$=1 within time period $T_3$, then the system control process advances to Block TT in FIG. 30F2, where the third control module $C_3$ (i) disables the scanning means, laser light source, photoreceiving circuit, A/D conversion circuit, symbol decoding module, etc. and (ii) enables the IR-object sensing circuit and object detection circuit. At Block TT, the system enters the Time-Extended Object Detection State. Thereafter, the system control process advances to Block UU shown in FIG. 30F2. At Block UU, the third control module $C_3$ determines whether the first control module $C_1$ receives control activation signal $A_1$=1, indicating the presence of an object within the IR-based object detection field. If not, then the control process returns to Block A, as shown in FIG. 30A1. If $A_1$=1 has not been received by control circuit $C_1$, then the control process advances to Block VV, at which the third control module $C_3$ determines whether timer $T_e$ has elapsed (i.e. $T_e$>30 seconds). If at Block VV third control module $C_3$ determines that timer $T_e$ has elapsed, then the system control process returns to Block A, as shown in FIG. 30A1. If at Block VV the third control module $C_3$ has not elapsed, then the system control process advances to Block WW, at which the third control module $C_3$ starts timer $T_{laser\ off}$, where $0 \leqq T_{laser\ off} \leqq 0.5$ seconds. Then, at Block XX, the third control module $C_3$ determines whether the timer $T_{laser\ off}$ has elapsed. As shown in FIG. 30F2, so long as this timer has not elapsed, the control process remains at Block XX. When the timer $T_{laser\ off}$ has elapsed, then the control process returns to Block MM, in FIG. 30F1, to form a control loop.

If at Block NN, the second control circuit $C_2$ determines that control activation signal $A_2$=1 has not been received within $T_1$', then the system control process advances to Block SS, at which the second control circuit determines whether timer $T_1$' has elapsed (i.e. $T_1$'>0.5 seconds). If this timer has not elapsed at this point in the control process, then the system control process returns to Block NN, as shown. If timer $T_1$' has elapsed at Block SS, then the system control process advances to Block TT, described hereinabove.

If at Block G, the bar code symbol detection circuit 111 provides the second control circuit $C_2$ with control activation signal $A_2$=1, then at Block J the second control circuit $C_2$ activates (i.e. enables) third control module $C_3$ (i.e. microprocessor 334) using enable signal $E_3$=1, and also resets the timer $T_1$. Then at Block K, the third system control module $C_3$ activates the symbol decoding module using signal $E_4$=1, resets and restarts timer $T_2$ permitting it to run for a second predetermined time period (e.g. 0#$T_2$#1 seconds), and resets and restarts timer $T_3$ permitting it to run for a third predetermined time period (e.g. 0#$T_3$#5 seconds).

At Block L, the third control module $C_3$ checks to determine whether control activation signal $A_3$=1 is received from the symbol decoding module 119 within $T_2$=1 seconds, indicating that a bar code symbol has been successfully read (i.e. scanned and decoded) within the allotted time period. If control activation signal $A_3$=1 is not received within the time period $T_2$=1 second, then at Block M third control module $C_3$ checks to determine whether control activation signal $A_2$=1 is received. If a bar code symbol is not detected (e.g. $A_2$=0), then the control system returns to Block H, to determine if the $A_3$=1 flag has been set to "true" (which it would not have been) and then onto Block I and then back to Block A. However, if at Block M the third control module $C_3$ receives control activation signal $A_2$=1, indicating that a bar code once again is within the bar code symbol detection field 10, then at Block N the third control module $C_3$ checks to determine whether time period $T_3$ has elapsed (i.e. $T_3$>5 seconds).

If at Block N the $T_3$ timer has lapsed, then the control system returns to Block A. If, however, at Block N it is determined that timer $T_3$ has not elapsed, then the system control process advances to Block N1, at which the decode timer $T'_2$ is reset and restarted (e.g. 0 #$T_2$'#0.5 seconds). At this control block, the system reenters the Bar Code Symbol Reading State of operation. Thereafter, the system control process returns to Block L, at which the third control module $C_3$ determines whether control activation signal $A_3$=1 has been received. If not, then the system control process returns to Block M. During typical bar code reading applications, the system control process may progress several times through the control loop defined by Blocks L-M-N-L before a bar code symbol in the laser-based bar code symbol reading field 11 is read (i.e. detected and decoded) within the time period allotted by timer $T_3$. To take human response times into account, the allotted time period in the illustrative embodiment has been set to 5.0 seconds. However, it is understood that in other embodiments of the present invention, the time period may be greater or lesser than this exemplary time period without departing from the principles of the present invention.

Upon receiving control activation signal $A_3$=1 from symbol decoding module 319 at Block L, indicating that a bar code symbol has been successfully read, the control system proceeds to Block 0 where the third control module $C_3$ sets the $A_3$=1 flag to "true" and generates enable signal $E_8$=1 which drives the bar code read state indicator 452 (signaling the operator to depress the data transmission switch 303) and ceases to drive bar code detection state indicated 452 using disable signal $E_2$=0. Thereafter, the system control process proceeds to Block P where the third system control module $C_3$ determines whether the timer $T_3$ has elapsed. If timer $T_3$ has elapsed at Block P, then the system control process returns to Block A. If the timer $T_3$ has not elapsed at Block P, then the system control process advances to Block Q, at which the control module $C_3$ determines whether data transmission control activation signal $A_4$=1 has been received within the $T_3$ time frame. If the third control module $C_3$ determines that $A_4$=0, indicating that the data transmission activation switch 303 has not been depressed within the $T_3$ time frame, then the control module $C_3$ sets the data in the Decoded Symbol Data Module to zero value, and then the system control process returns back to Block M. If at Block Q the control module $C_3$ determine that control activation signal $A_4$=1 has been generated, then the system control process advances to Block S in FIG. 30C, wherein the Data Transmission Mode of operation is entered.

At Block S in FIG. 30C, the control module $C_3$ determines whether the data within the Decoded Symbol Data Buffer has been set to zero value. If this data has not been set to zero value, then the system control process advances to Block T, at which the control module $C_3$ determines whether the bar code symbol character data produced by the symbol decoding module is different than the symbol character data stored in the Decoded Symbol Data Buffer. If these data elements are not the same, then the system control process advances to Block U, where the control module determines whether Timer $T_3$ has elapsed. If Timer $T_3$ has elapsed, then the system control process returns to Block H, as shown in FIG. 30A. If, however, the Timer $T_3$ has not elapsed at Block U, then the system control process returns to Block M, as shown in FIG. 30B.

If at Block S in FIG. 30C, the control module $C_3$ has determined that the data set in the Decoded Symbol Data Buffer is zero value, then the system control process advances to Block V, at which point the control module $C_3$ stores the symbol character data (produced by the symbol decoding module 319) into the Decoded Symbol Data Module. Thereafter, at Block W, the third control module $C_3$ sets the $A_4$=1 flag to "true", and then proceeds to Block X in FIG. 30D.

Figure 30D:
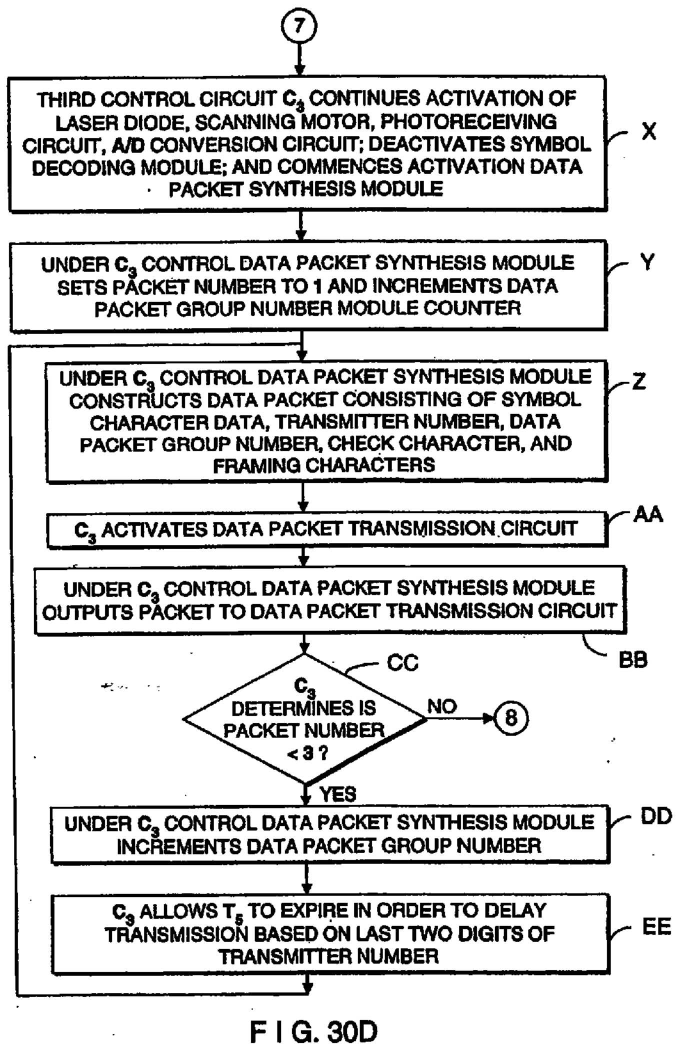

As shown in FIG. 30D, the third control module $C_3$ continues activation of laser scanning circuit 308, photoreceiving circuit 309, and A/D conversion circuit 310, while deactivating symbol decoding module 319 and commencing activation of data packet synthesis module 320.

As indicated at Block X in FIG. 30D, under the control of module $C_3$, the data packet synthesis module 320 first sets the Packet Number to "1", and increments the Packet Group Number from the previous number. Preferably, the data packet synthesis module keeps track of (i.e. manages) the "Packet Number" using a first module-N counter realized by programmable microprocessor 334, while it manages the "Packet Group Number" using a second modulo-M counter also realized by programmed microprocessor 334. In the illustrative embodiment, the first modulo counter has a cyclical count range of N=2 (i.e. 0,1,2,0,1,2, . . . ), whereas the second modulo counter has a cyclical count range of M=10 (i.e. 0,1,2,3,4,5,6,7,8,9,0,1,2, . . . ).

While the laser beam is being continuously scanned during the data transmission state of operation, the operations at Blocks Z to EE described below, are carried out in a high speed manner under the orchestration of control module $C_3$. At Block Z in FIG. 30D, the data packet synthesis module 320 synthesizes or constructs a data packet having a packet format as shown in FIG. 15O, i.e. consisting of symbol character data, a Transmitter Identification Number, a Packet Number, a Packet Group Number, check character, and Packet Start and End (i.e. framing) Characters. After the data packet has been formed and the digital data sequence constituting the same is buffered, the third control module $C_3$ activates at Block AA the data packet transmission circuit 321. Thereafter at Block BB, the data packet synthesis module 320 outputs the buffered digital data sequence (of the first synthesized data packet of the group) to the data packet transmission circuit, which uses the digital data sequence to modulate the frequency of the carrier signal as it is being transmitted from the bar code symbol reading device, to its mated base unit 440, as described hereinabove, and then automatically deactivates itself to conserve power.

At Block CC, the third control module $C_3$ determines whether the Packet Number counted by the first module counter is less than "3". If the Packet Number of the recently transmitted data packet is less than "3", indicating that at most only two data packets in a specific group have been transmitted, then at Block DD the data packet synthesis module 320 increments the Packet Number by +1. At Block EE, the third control module $C_3$ then waits for a time delay $T_5$ maintained by timer $T_5$ to lapse prior to the control system returning to Block Z, as shown in FIG. 30D. Notably, the occurrence of time delay $T_5$ causes a delay in transmission of the next data packet in the data packet group.

Returning to Block Z, the data packet synthesis module 320 synthesizes or constructs the second data packet in the same data packet group. After the second data packet has been formed and the digital data sequence constituting the same is buffered, the third control module $C_3$ reactivates, at Block AA, the data packet transmission circuit 321. Thereafter at Block BB, the data packet synthesis module outputs the buffered digital data sequence (of the second synthesized data packet) to the data packet transmission circuit (34), which uses the digital data sequence to modulate the frequency of the carrier signal as it is being transmitted from the bar code symbol reading device, to its mated base unit 440, and thereafter automatically deactivates itself. When at Block CC third control module $C_3$ determines that the Packet Number is equal to "3", the control system advances to Block FF in FIG. 30E.

Figure 30E:
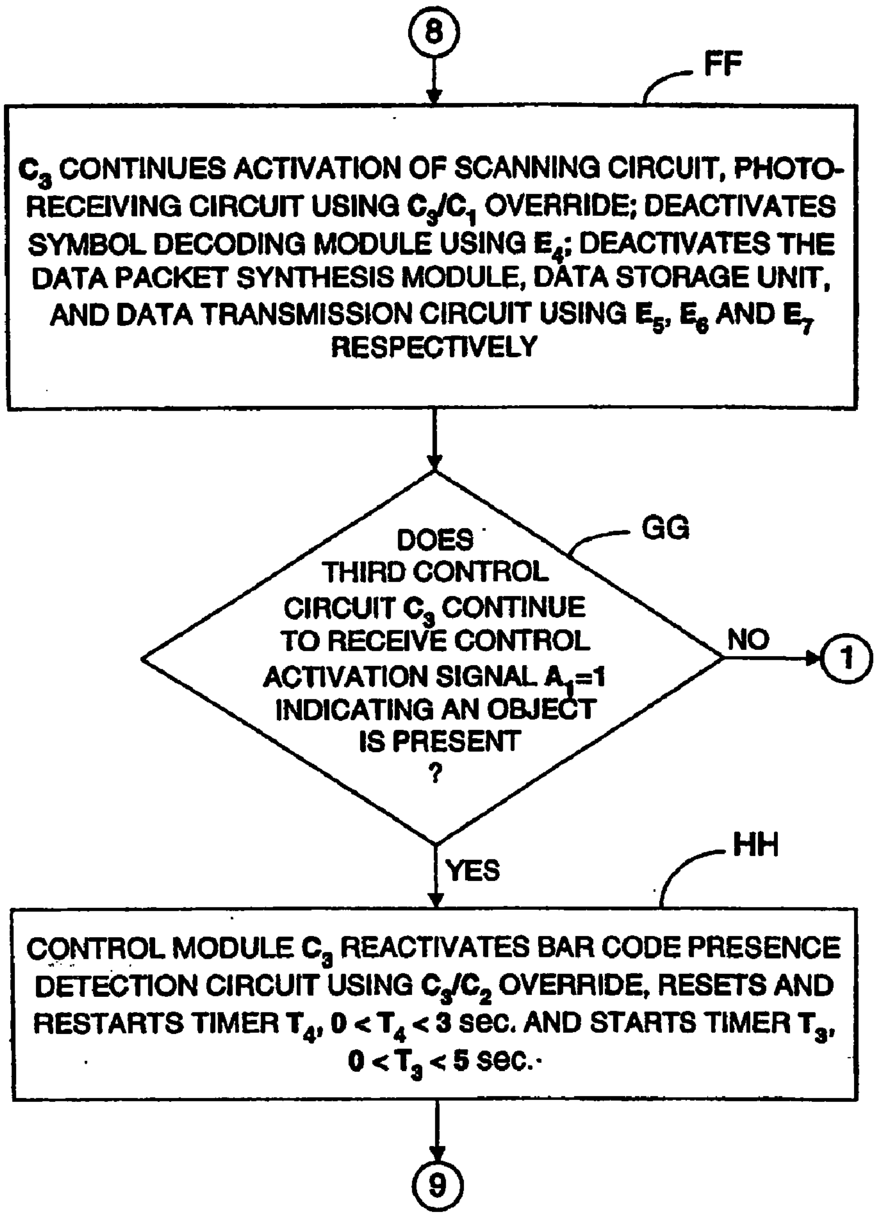

At Block FF in FIG. 30E, the third control module $C_3$ continues activation of laser scanning circuit 308, photoreceiving circuit 309, and A/D conversion circuit 310 using control override signals $C_3/C_1$, and deactivates symbol decoding module 319, data packet synthesis module, 320 the data packet transmission circuit 321 using disable signals $E_4=0$, $E_5=0$, $E_6=0$, and $E_9=0$, respectively. Then at Block GG the third control module $C_3$ determines whether control activation signal $A_1=1$, indicating that an object is present in the object detection field 9. If this control activation signal is not provided to the third control module $C_3$, then the control system returns to Block A, as shown in FIG. 30A1. If control activation signal $A_1=1$ is received, then at Block HH the third control module $C_3$ reactivates the bar code symbol detection circuit 311 using override signal $C_3/C_2$, and resets and restarts timer $T_3$ to start running over its predetermined time period, i.e. $0<T_3<5$ seconds, and resets and restart timer $T_4$ for a predetermined time period $0<T_4<3$ seconds. Thereafter, the system control process returns to Block F in FIG. 30A2 in order to attempt to read another bar code symbol.

Having described the operation of the automatic hand-supportable bar code reading system of the first generalized embodiment, it will be helpful to describe at this juncture the various conditions which cause state transitions to occur during its operation. In this regard, reference is made to FIGS. 31A and 31B which provides a state transition diagram for the illustrative embodiment.

Figure 31A:
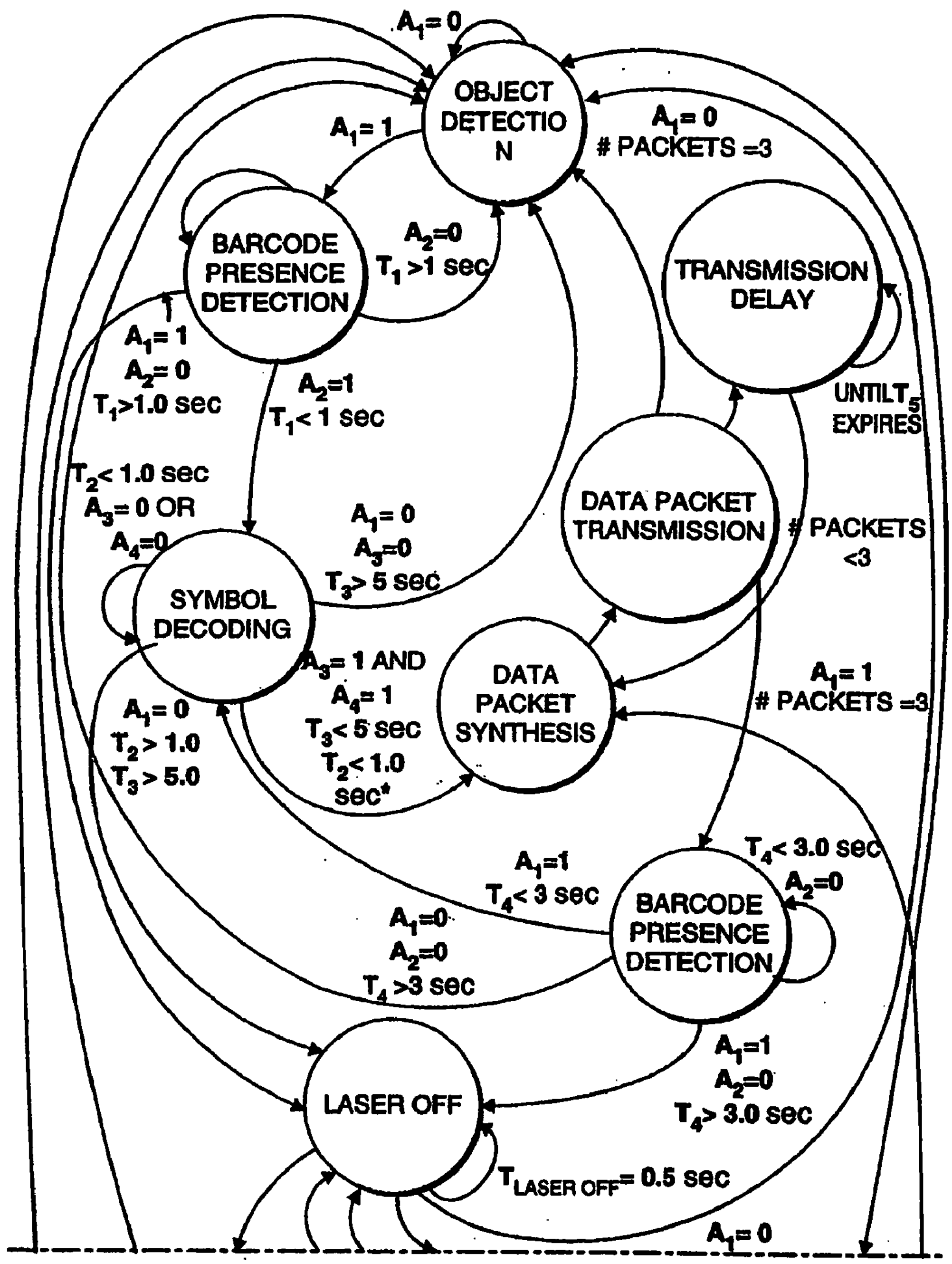
Figure 32B:
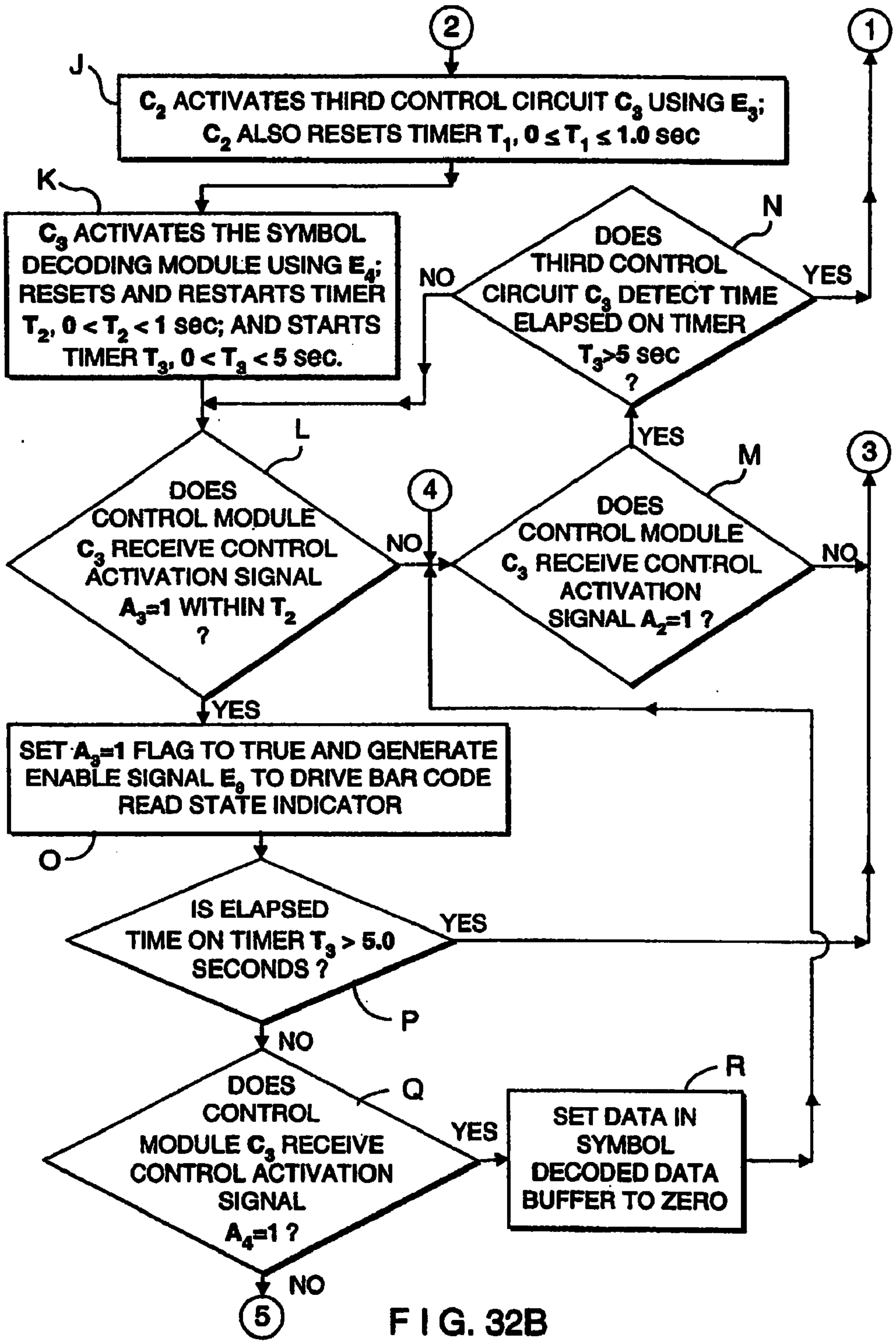
Figure 32C:
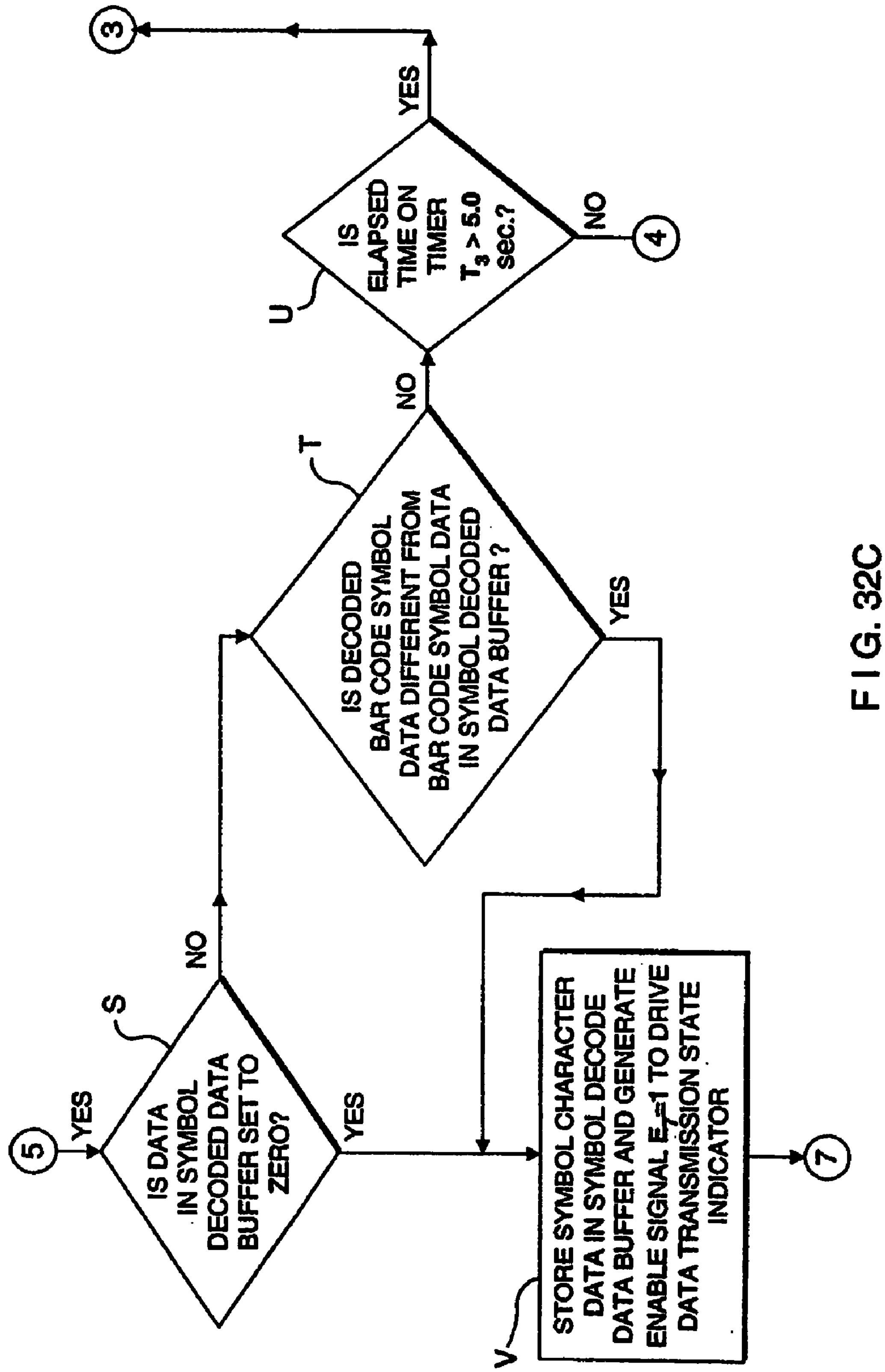
Figure 32D:
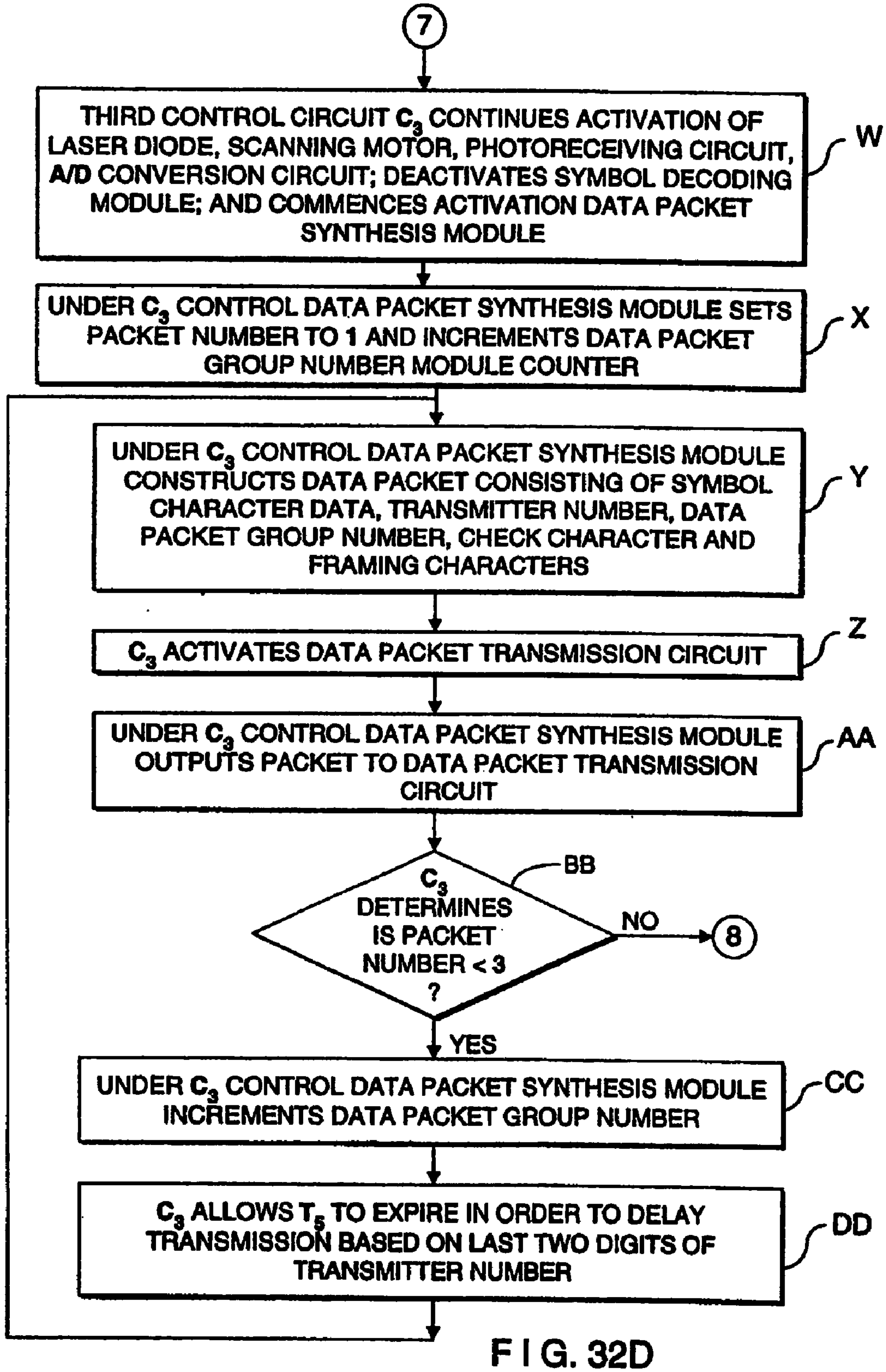
Figure 32E:
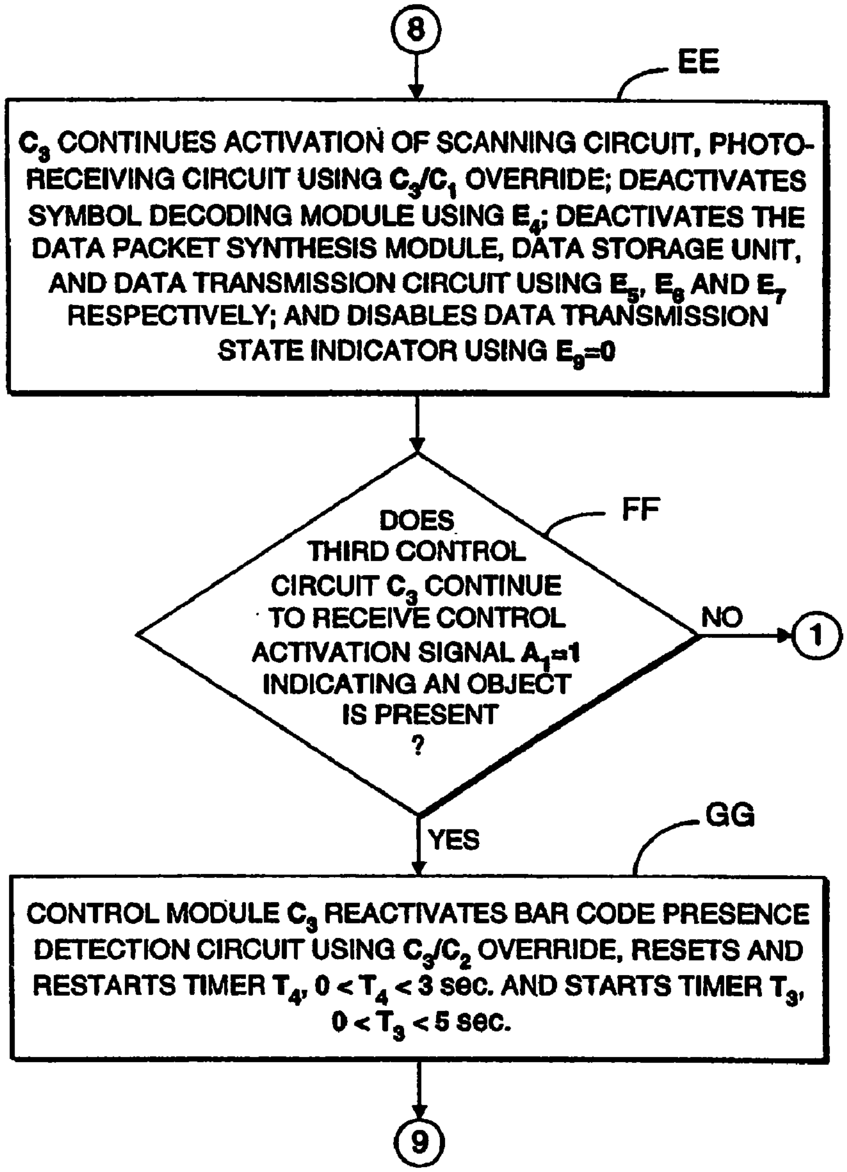

As illustrated in FIGS. 31A and 31B, the automatic hand-supportable bar code reading device of the present invention has four basic states of operation namely: object detection, bar code symbol presence detection, bar code symbol reading, and symbol character data transmission/storage. However, in contrast with the system shown in FIGS. 15A1–15A4, the system shown in FIGS. 29A1–29A4 also includes three Time-Extended States of Operation, namely: a Time-Extended Object Detection State; a Time-extended Bar Code Symbol Detection State; and a Time-Extended Bar Code Symbol Reading State. The nature of each of these states has been described above in great detail.

Transitions between the various states are indicated by directional arrows. Besides each set of directional arrows are transition conditions expressed in terms of control activation signals (e.g. $A_1$, $A_2$, $A_3$ and $A_4$) and where appropriate, state time intervals (e.g. $T_1$, $T_2$, $T_3$, $T_4$, and $T_5$). Conveniently, the state diagram of FIGS. 31A and 31B expresses most simply the four basic operations occurring during the control flow within the system control program of FIGS. 30A1 to 30F2. Significantly, the control activation signals $A_1$, $A_2$, $A_3$ and $A_4$ shown in FIG. 21 indicate which events within the object detection field, bar code detection field and/or bar code reading fields can operate to effect a state transition within the allotted time frame(s), where prescribed.

Automatic Bar Code Symbol Reading Devices Embodying the Modifications To First, Second, Third and Fourth Generalized System Designs of the Present Invention Having described the operation of the automatic hand-supportable bar code reading systems of the first, second, third and fourth generalized embodiments of the present invention, it is noted at this juncture that these generalized embodiments can be further modified to provide four additional generalized system design embodiments of the present invention, as shown in FIGS. 32A1 through 35F2. In each of these alternative generalized embodiments of the present invention, it is desired that the user be able to physically depress (i.e. manually actuate) the data-transmission activation switch in order to suppress data transmission to the host system or device, however realized, and after the targeted bar code within a crowded menu is repeatedly scanned, detected and read, then releasing the switch in order to enable the automatic bar code symbol reader to transmit the produced symbol character data to the host system or device. In such alternative embodiments of the present invention, schematically depicted in FIGS. 32A1 through 35F2, releasing the data transmission activation switch enables the data transmission mode of operation, in contrast to depressing the data transmission activation switch to enable the data transmission mode as in the case of the previously described embodiments of the present invention. These four alternative generalized system designs will be described in greater detail below.

The first generalized system design shown in FIGS. 15A1–15A4 can be readily modified to provide a fifth generalized system design by replacing the system control process shown in FIGS. 20A1 to 20E, with the system control process shown in FIGS. 32A1 through 32E. The only difference between these two system control processes is that at Block Q in FIG. 32B, the conditions for YES and NO responses are reversed from that shown at Block Q in FIG. 20B, and there is no time constraint imposed on control activation signal $A_4$.

Figure 33B:
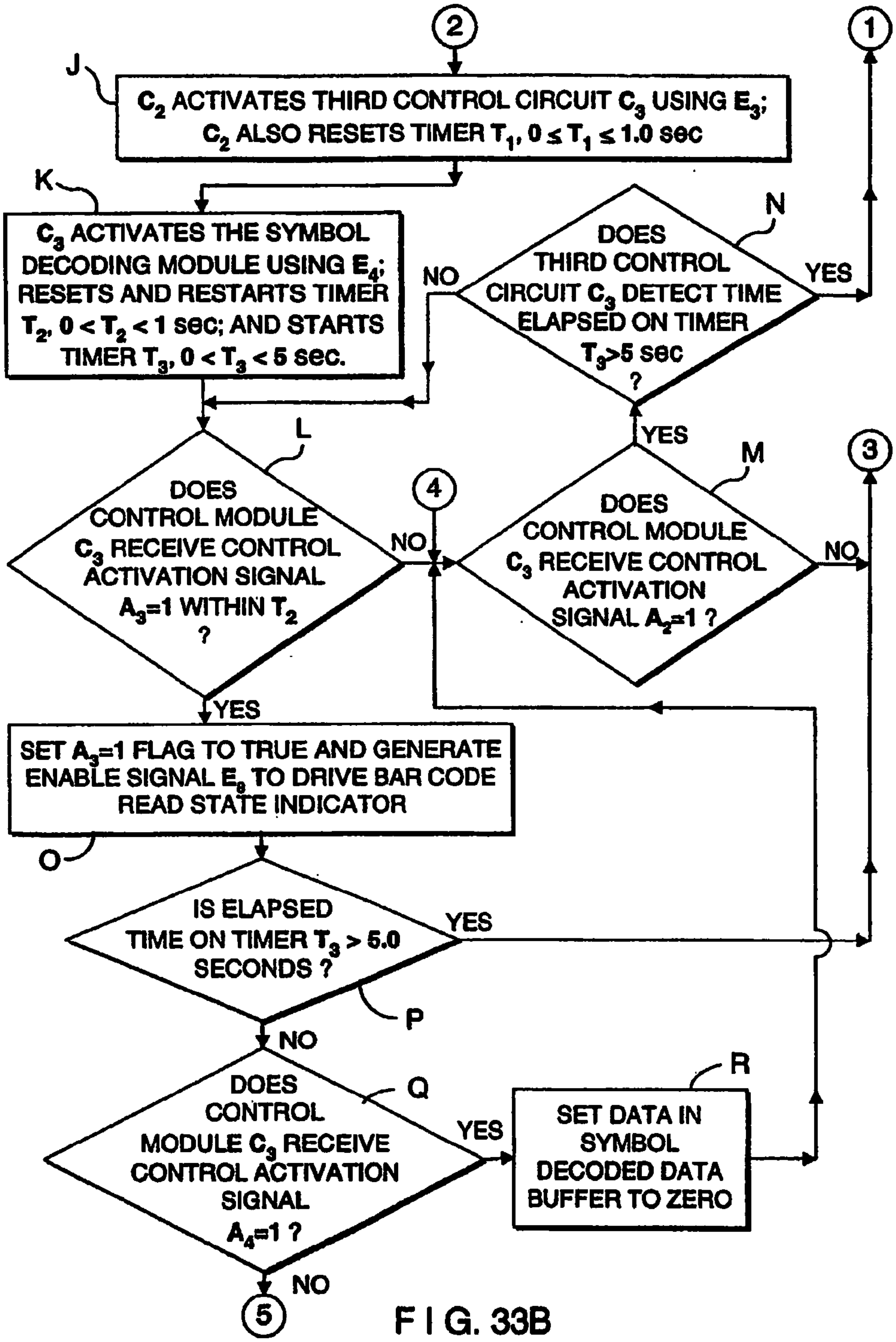
Figure 33C:
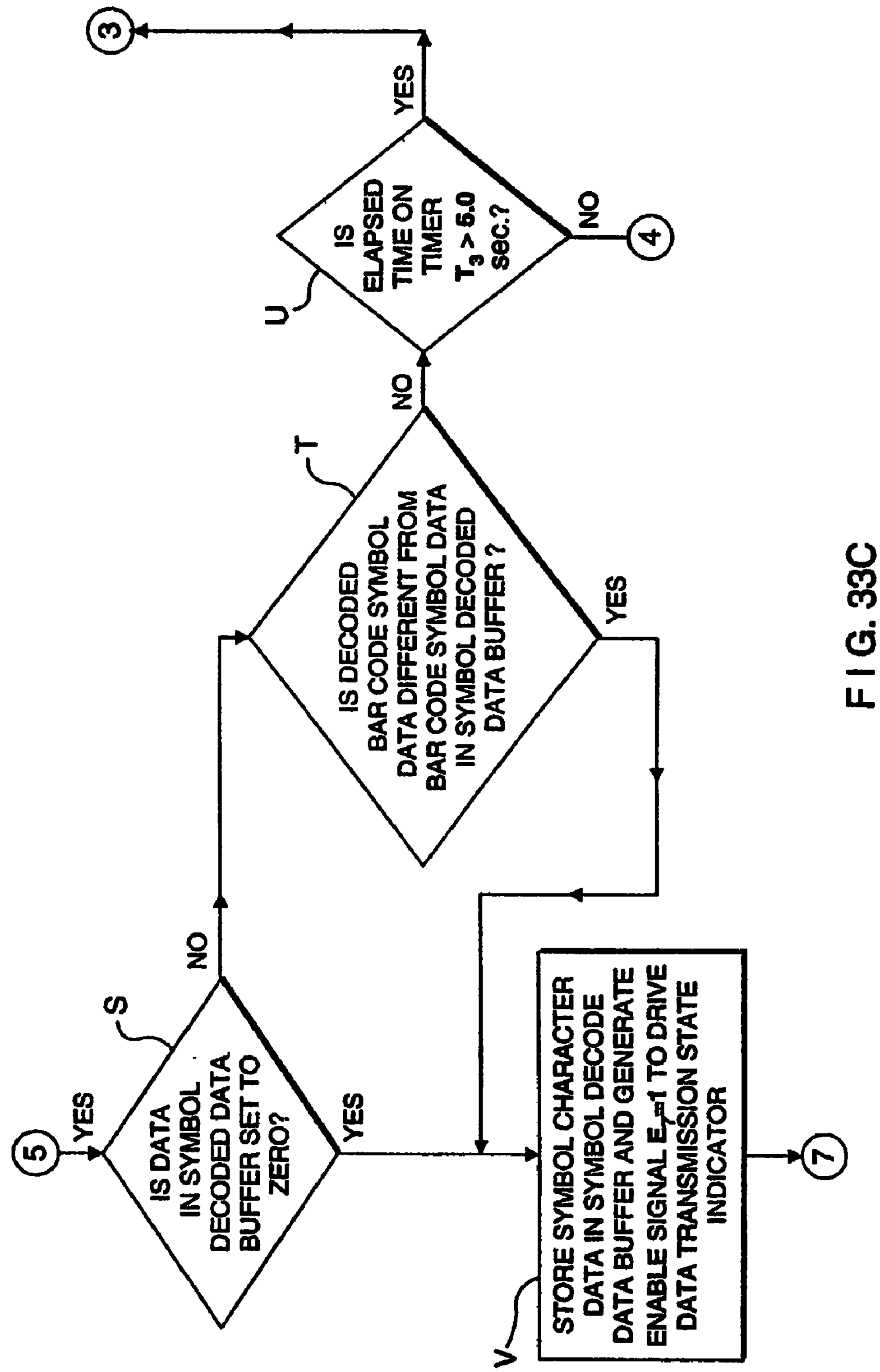
Figure 33D:
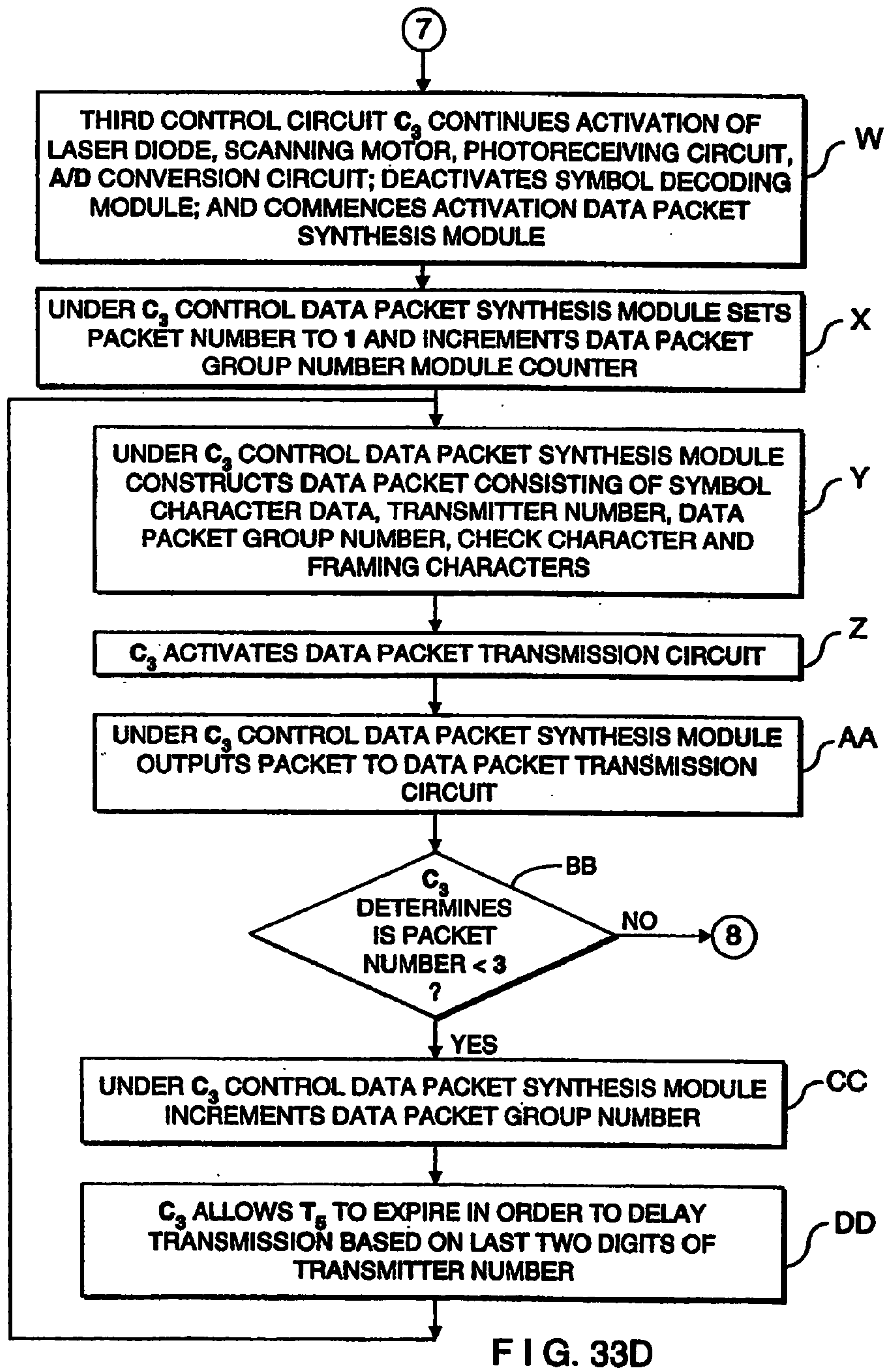
Figure 33E:
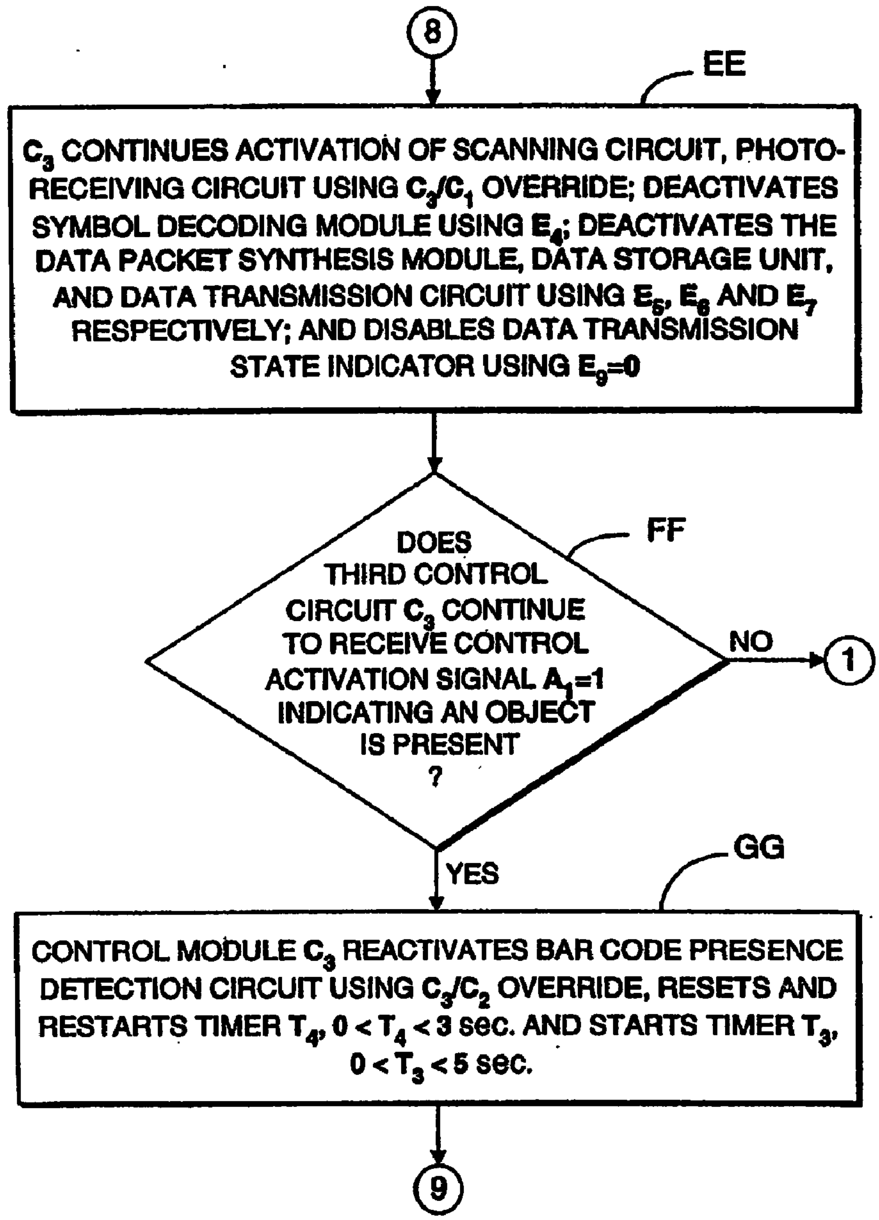

The second generalized system design shown in FIGS. 22A1–22A2 can be readily modified to provide a sixth generalized system design by replacing the system control process shown in FIGS. 23A1 to 23E, with the system control process shown in FIGS. 33A1 through 33E. The only difference between these two system control processes is that at Block Q in FIG. 33B, the conditions for YES and NO responses are reversed from that shown at Block Q in FIG. 23B, and there is no time constraint imposed on control activation signal $A_4$.

Figure 34A:
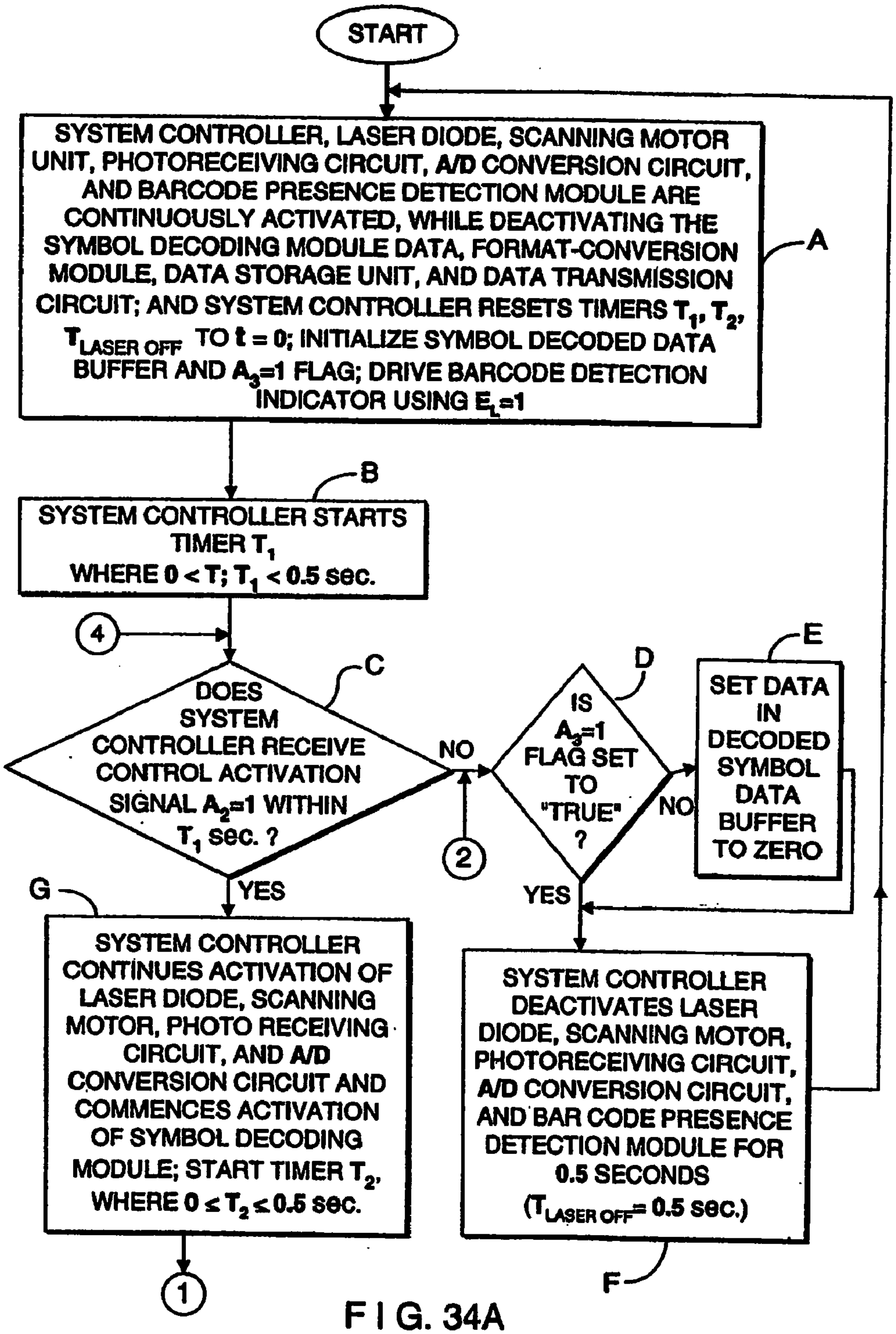

The third generalized system design shown in FIGS. 25A–25B can be readily modified to provide a seventh generalized system design by replacing the system control process shown in FIGS. 27A to 27C, with the system control process shown in FIGS. 34A through 34C. The only difference between these two system control processes is that at Block K in FIG. 34B1, the conditions for YES and NO responses are reversed from that shown at Block K in FIG. 27B1, and there is no time constraint on control activation signal $A_4$.

Figure 35B:
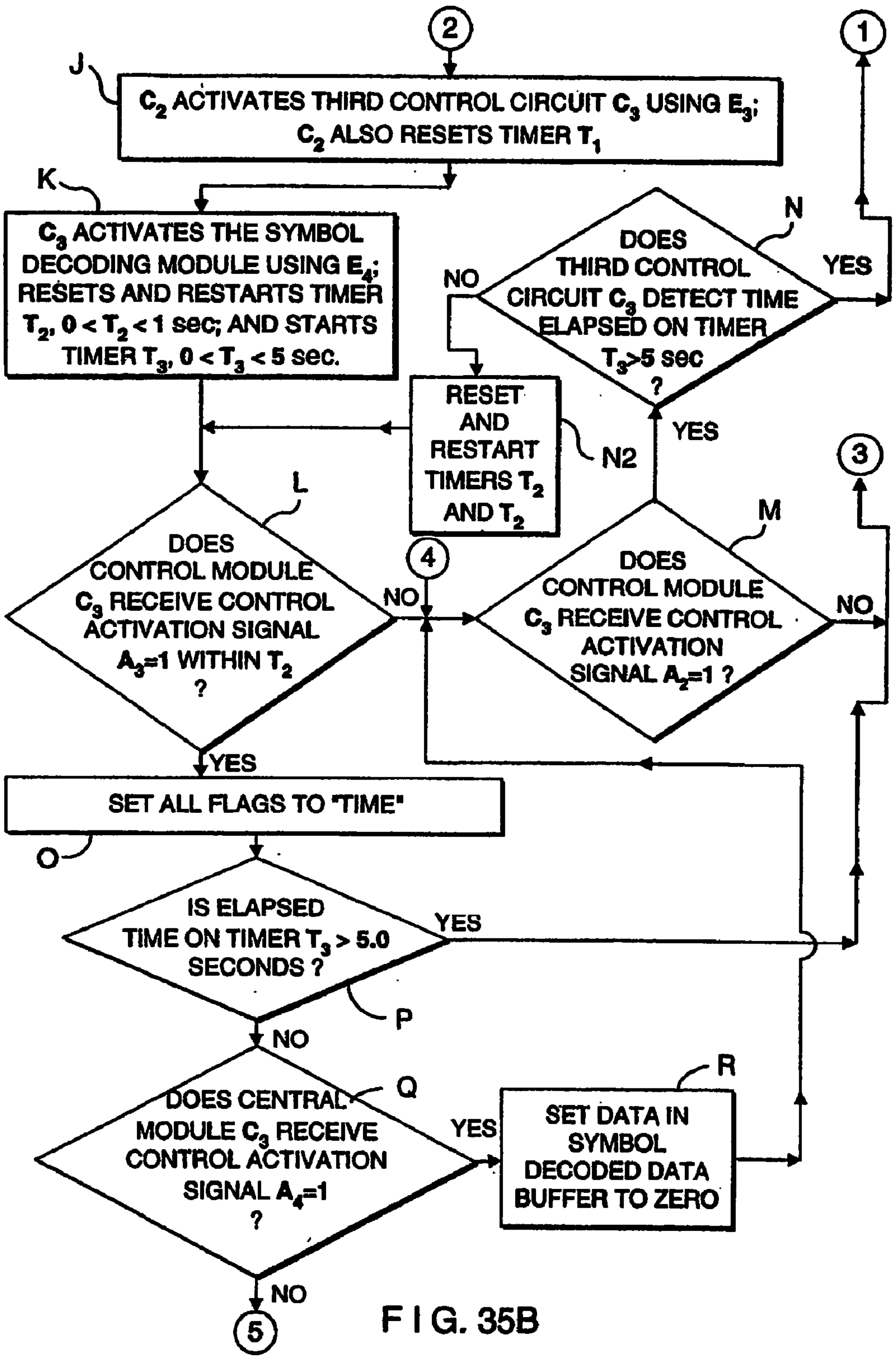
Figure 35C:
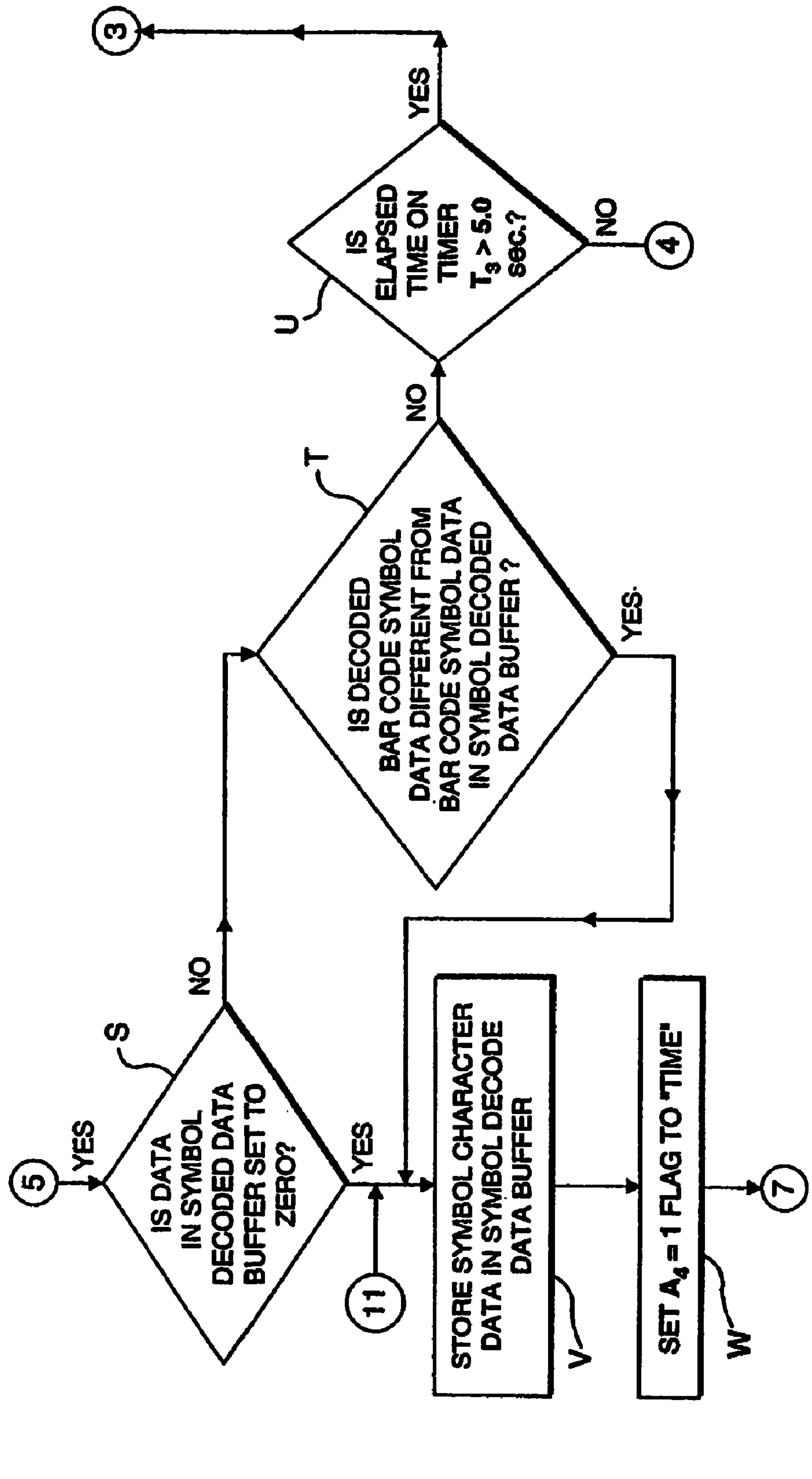
Figure 35D:
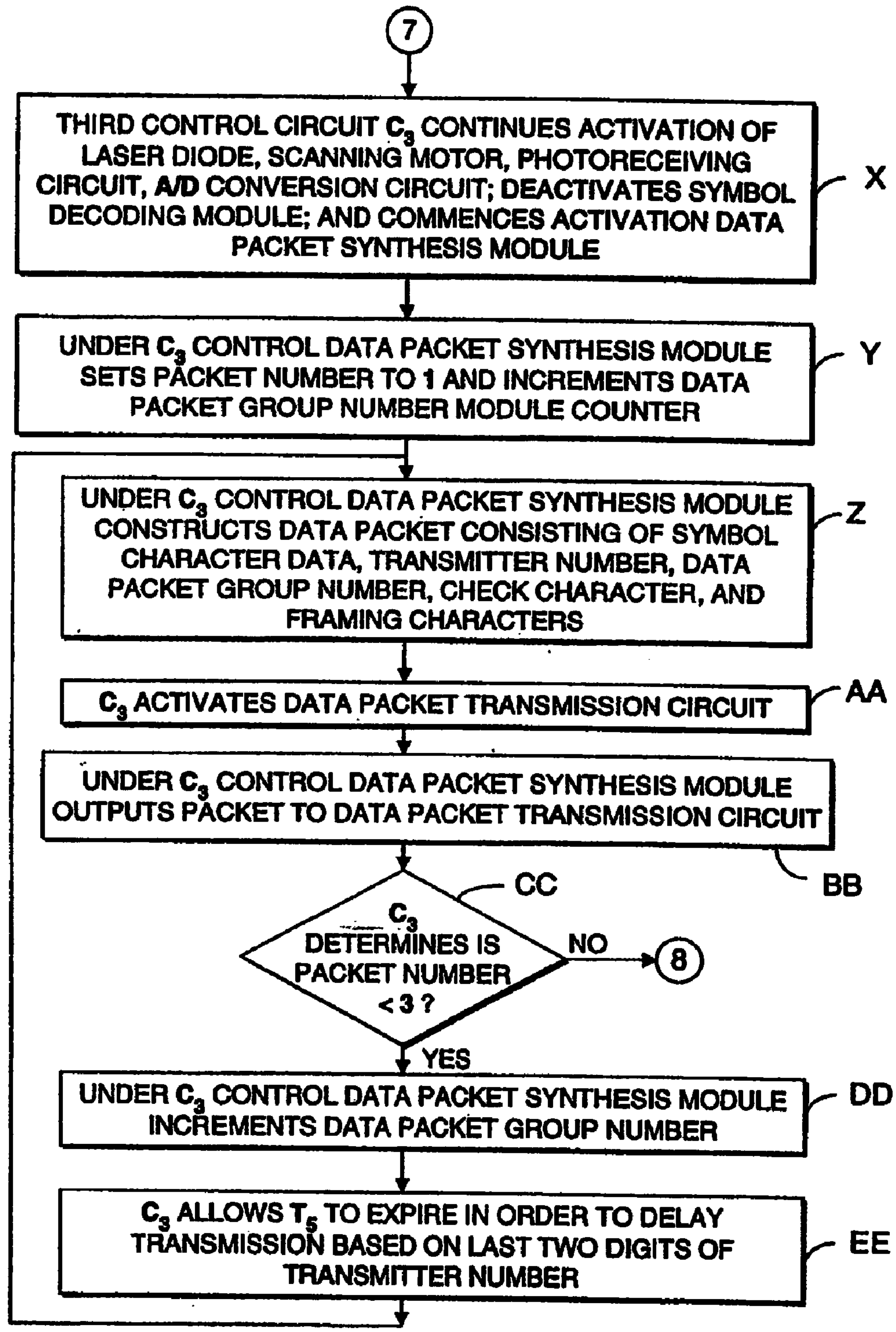
Figure 35E:
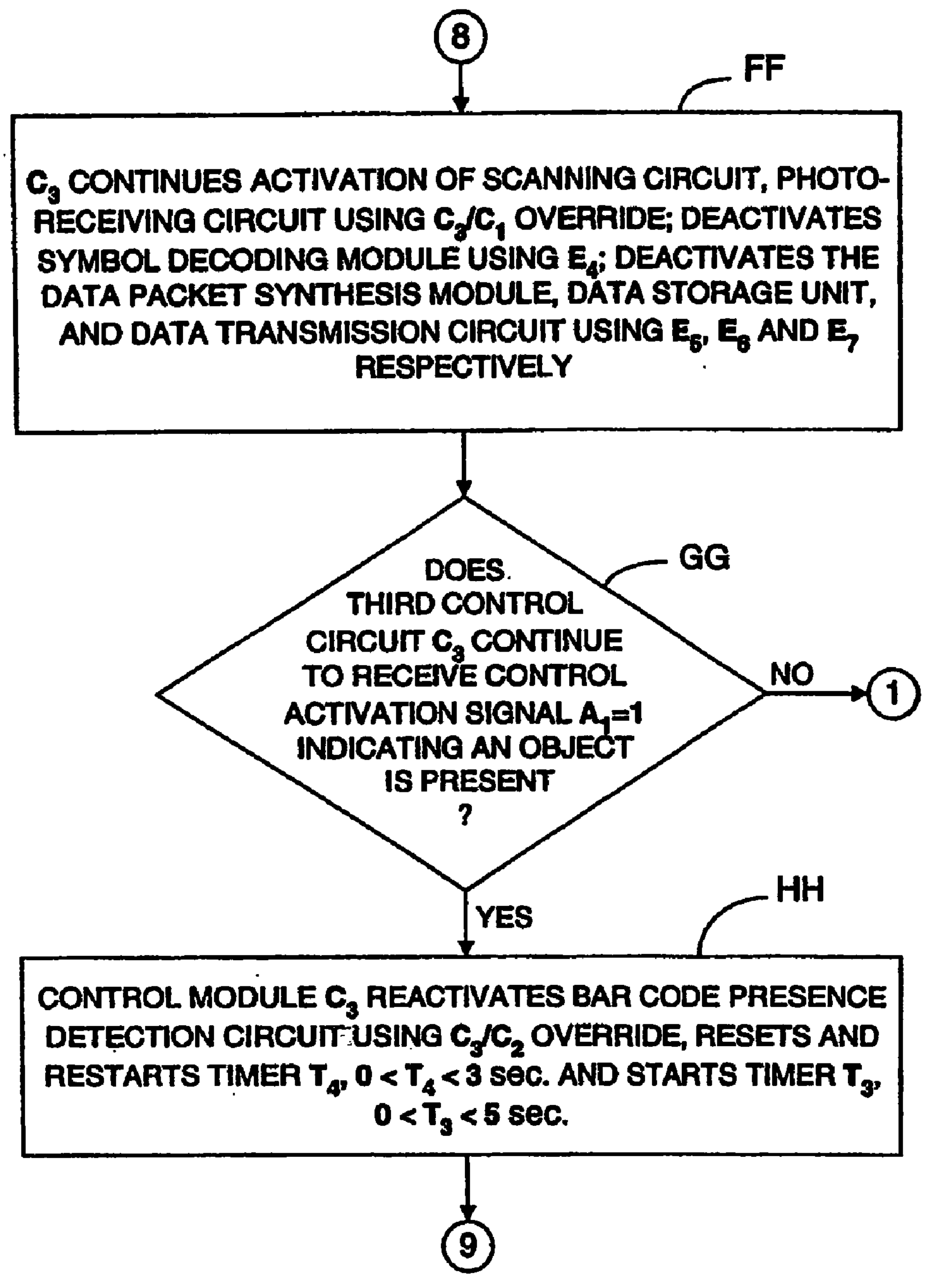

The fourth generalized system design shown in FIGS. 29A1–29A2 can be readily modified by replacing the system control process shown in FIGS. 30A1 to 30F2, with the system control process shown in FIGS. 35A through 35F2. The only difference between these two system control processes is that at Blocks Q in FIG. 35B and Block RR in FIG. 35F1, the conditions for YES and NO responses are reversed from that shown at Blocks Q and RR in FIGS. 30B and 30F1, respectively.

The four generalized system design architectures described above provide an important advantage in applications where it is desired that the user can manually suppress data transmission to the host device until the desired bar code symbol (wherever located) has been automatically detected and read, and only upon releasing of the manually-activatable data transmission activation switch on the automatic bar code reading device. This control process of the present invention provides the user with a different level of control over the data transmission process to the host system. In all other respects, the functionalities of the first, second, third and fourth system design architectures described above are otherwise maintained substantially the same in the four these fourth alternative generalized system designs.

RF-Receiving Base Unit for Use With Automatically-Activated Bar Code Symbol Reading Devices of the Present Invention Referring now to FIGS. 36A to 36C, the RF-signal receiving base unit for use with the first illustrative embodiment of the bar code symbol reading system shown in FIG. 2A will be described. As shown, base unit 42 is realized in the form of scanner stand comprising support frame 43 releasably connected to a base support/mounting plate 550 by way of a snap fit fastening mechanism. In the illustrative embodiment, support frame 43 is formed as an injection molded shell, in which a handle portion support structure is realized by a first support recess 51C; whereas a head portion support structure is realized by a second support recess 51B. As shown in FIG. 36A, first support recess 51C is disposed above base portion 51A and inclined at a first acute angle $B_1$ with respect thereto, while second support recess 51B is disposed above base portion 51A and inclined at a second acute angle $B_2$ with respect thereto.

In order to ensure that the bar code reading device is securely, yet releasably supported within support recesses 51B and 51C and not easily knocked out of the scanner support stand during the hands-free mode of operation, first and second magnetic elements 551A and 551B are permanently mounted to the underside of the planar support surfaces of processes SIB and 51C, as illustrated in FIG. 36C. With this arrangement, magnetic flux of constant intensity continuously emanates from support recesses 51B and 51C. As a result, when the handle and head portions of the bar code reading device are placed within support recesses, a ferrous element 552A in handle portion 49B is magnetically attracted to magnetic element 551B, while ferrous element 552A on head portion 49A is magnetically attracted to magnetic element 551A. The magnetic force of attraction between these elements is selected so that a desired degree of force is required to lift the automatic bar code reading device out of scanner support stand, while preventing accidental displacement of the device from the scanner support stand during use in the hands-free mode of operation.

As illustrated in FIGS. 36B and 36C, base mounting plate 550 is formed as a thin planar structure having perimetrical dimensions substantially equal to the perimetrical dimensions of the base portion of support frame 43. At the front and rear end portions of base plate 550, a pair of projections 553 and 554, extend perpendicularly, as shown. These projections have horizontal flanges which are adapted to snap fit into horizontal grooves formed on the interior surfaces of front and rear walls 555 and 556, as shown in FIGS. 36A to 36C.

In order to perform the data packet reception, processing, retransmission, and acknowledgement functions of base unit 42 described above, a printed circuit board 558 populated with electronic circuitry is concealed within the interior volume contained between the interior surface of support stand portion and the upper surface of base plate. In the illustrated embodiment, PC board 558 contains electronic circuitry for realizing each of the functions represented by the block shown in the system diagram of FIG. 37. As shown in FIG. 36A, flexible communication and power supply cables 46 and 47 are routed through aperture 559 formed in the lower portion of rear wall of the support frame, and connected to the electronic circuitry on PC board 558.

Figure 37:
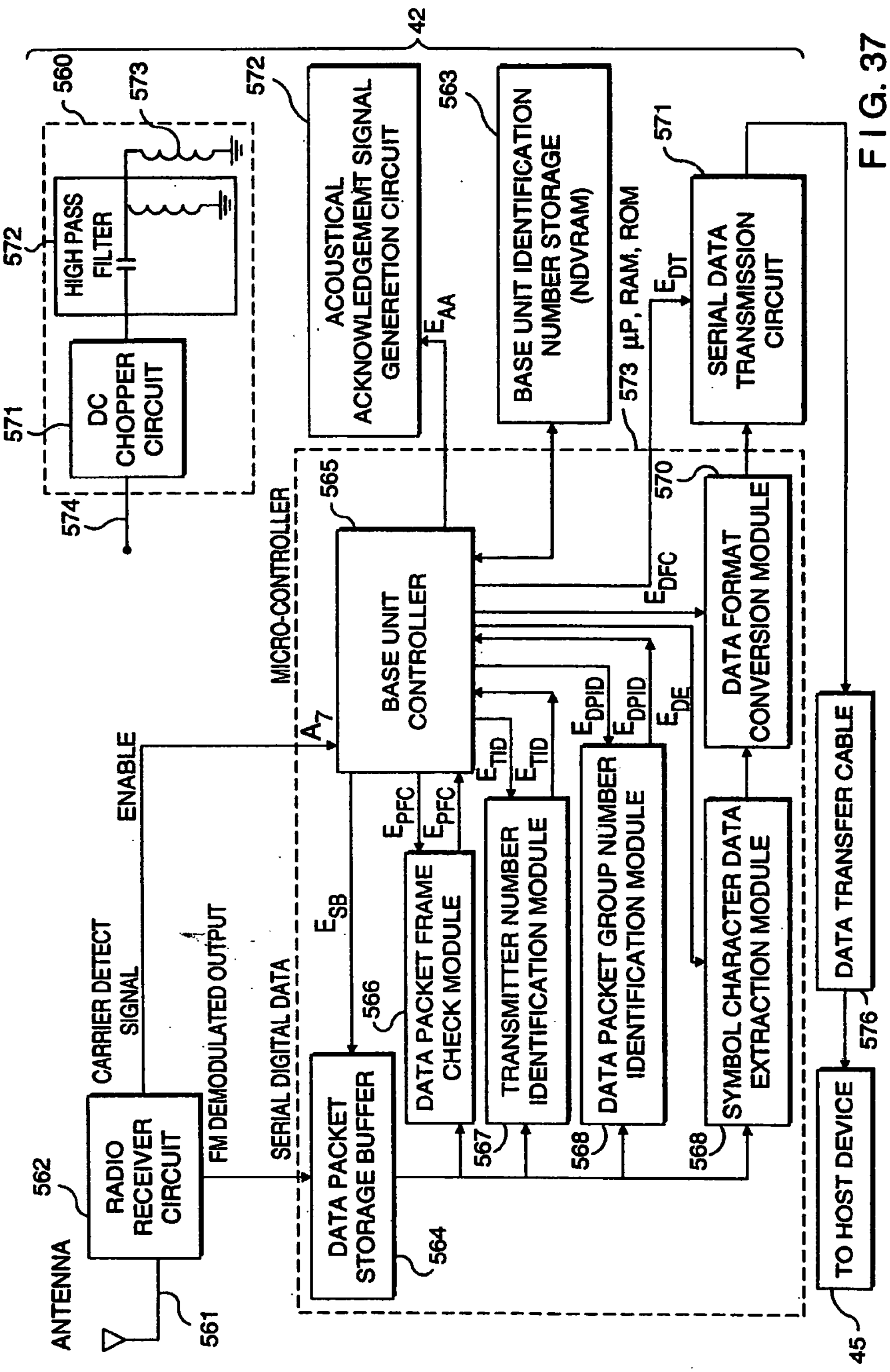
FIG. 37 is a functional block diagram of the data packet receiving and processing circuitry and the acknowledgment signal generating circuitry realized on the printed circuit board in the base unit shown in FIG. 36C.

In FIG. 37, the system architecture of base unit 42 is schematically represented. As shown, base unit 42 comprises a number hardware and software components, namely: a power supply circuit 560; a receiving antenna element 561; an RF carrier signal receiver circuit 562 base unit identification number storage unit 563; a data packet storage buffer 564; a base unit system controller 565; a data packet frame check module 566; a transmitter number identification module 567; a data packet number identification module 568; a symbol character data extraction module 569; a data format conversion module 570; a serial data transmission circuit 571; and an acoustical acknowledgement signal generation circuit 572. In the illustrative embodiment, a programmed microprocessor and associated memory (i.e. ROM and RAM), indicated by reference numeral 573, are used to realize the base unit system controller 565 and each of the above-described data processing modules 564 to 570. The details of such a programming implementation are known by those with ordinary skill in the art to which the present invention pertains.

In the illustrative embodiment, it necessary to provide a means within the base unit housing, to recharge the batteries contained within the hand-supportable housing of the portable bar code symbol reading device 41. Typically, DC electrical power will be available from the host computer system 45, to which the base unit is operably connected by way of flexible cables 45 and 46. An electrical arrangement for achieving this function is set forth in FIG. 37. As shown, power supply circuit 560 aboard the base unit of the present invention comprises a conventional current chopper circuit 571, a high-pass electrical filter 572 in parallel therewith, and a primary inductive coil 573 in parallel with the high-pass electrical filter. Low voltage DC electrical power provided from the host computer system by way of power cable 574 is provided to direct current (DC) chopper circuit 571, which is realized on PC board 558 using high-speed current switching circuits. The function of current chopper circuit 571 is to convert the input DC voltage to the circuit into a high-frequency triangular-type (time-varying) waveform, consisting of various harmonic signal components. The function of the high-pass electrical filter is to filter out the lower frequency signal components and only pass the higher frequency signal components to the inductive coil 573. As such, the high frequency electrical currents permitted to flow through inductive coil 573 induce a high voltage thereacross and produce time-varying magnetic flux (i.e. lines of force). In accordance with well known principles of electrical energy transfer, the produced magnetic flux transfers electrical power from the base unit to the rechargeable battery aboard the bar code symbol reading device, whenever the primary and secondary inductive coils aboard the base unit and the mated device are electromagnetically coupled by the magnetic flux. In order to maximize energy transfer between the base unit and its mated device during battery recharging operations, high permeability materials and well known principles of magnetic circuit design can be used to increase the amount of magnetic flux coupling the primary and secondary inductive coils of the battery recharging circuit.

Further details regarding the structure, function and operation of the base unit of FIGS. 36A–36C can be found in U.S. Pat. No. 5,808,285, incorporated herein by reference.

Portable Base Unit for Use with Automatically-Activated Bar Code Symbol Reading Device of the Present Invention The second illustrative embodiment of the base unit 580 shown in FIGS. 3A through 3E, in particular, will now be described in greater detail with reference to FIGS. 38A to 38C. In general, the base unit of the second illustrative embodiment 580 is similar to the base unit 42 of the first illustrative embodiment described above, except for the following differences described below which reflect additional functionalities provided by the data collection aspect of the portable base unit.

As illustrated in FIGS. 38A to 38C, data collection base unit 580 comprises a hand-holdable housing 581 which houses the operative elements of the device to be described below. Housing 581 has a top panel bottom panel front and rear panels, and two opposing side panels, as shown. A 4×4 membrane keypad 582 is mounted through the lower portions of top panel for manual entry of alphanumeric type data including, for example, data related to bar code symbols. Notably, a separate switch is provided for turning the device ON and OFF. Above the keypad, there is mounted an LCD type 1×16 character display 583 for visually displaying data including (i) data being manually entered through keypad 582, (ii) operator messages and (iii) data entry verification messages which will be described in greater detail hereinafter.

Through front panel, adjacent to character display 582, a data-output communication port 584 is provided. In the illustrative embodiment, data-output communication port 584 includes a 9-pin male connector 585, to which one end of communication cable 586 is connected, while the other end thereof is connected to the data-input port of a host computer system, such as point of sale (POS) cash register/computer 45. As will be described in greater detail hereinafter, data-output communication port 584 is particularly adapted for transmitting collected symbol character data stored in base unit 580, over communication cable 586 and through the data-input communication port of host computer system 45.

As shown in FIG. 38A, a pair of D-rings 587A and 587B are rotatably mounted to the rear end of the housing for conveniently supporting the data collection base unit on the operator's body while, for example, taking inventory. In this way, a cord, shoulder strap or belt strap can be attached to the D-rings. With this housing support arrangement, the user can simply pick up the hand-holdable data collection base unit in his hand and manually enter data through the keypad using his thumb, while viewing the character display screen.

While not visually shown in FIGS. 38A, 38B or 38C, data collection base unit 580 includes a battery-power storage unit realized, in the illustrative embodiment, as four AA type 1.5 volt batteries. These batteries are contained within a battery carrier attached to a hinged panel formed on the bottom panel of the housing. Access to the battery carrier is achieved by simply opening the hinged panel, which after replacement of batteries, can be snapped shut.

The system architecture of data collection base unit 580 and the operation thereof are described in great detail in U.S. Pat. No. 5,808,285, incorporated herein by reference.

PCMCIA-Embedded Base Unit for Use With Automatically-Activated Bar Code Symbol Reading Device of the Present Invention In FIG. 39, there is shown an alternative base unit 600 for use in connection with the automatically-activated bar code symbol reading devices shown in FIGS. 2A through 2J, FIGS. 7A through 7C, and other bar code symbol leading devices constructed in accordance with the principles of the present invention.

As shown in FIG. 39, base unit 600 is realized as a PCMCIA card base unit 78, including a PC board 642 which, as a single device, inserts into the PCMCIA (TYPE II or III) port 603 of a portable or desk-top computer system 77. In general, the system architecture of base unit 600 is similar to base unit 42 of the first illustrative embodiment described above, except that it does not function as a scanner stand, nor recharge the batteries within the portable bar code searching device. Base unit 42 comprises a number hardware and software components which are described in great detail in U.S. Pat. No. 5,808,285, incorporated herein by reference.

Illustrative Methods of Carrying Out the Hands-On and Hands-Off Modes of Operation Provided Within the Bar Code Symbol Reading System of the Present Invention It is appropriate at this juncture to illustrate the automatic hands-on and hands-free modes of operation of the system while utilized in different mounting installations. For purposes of illustration only, the system of the first, second and third illustrative embodiments shown in FIGS. 2A to 2J respectively will be used to illustrate such mounting illustrations.

A point-of-sale (POS) 45 station is shown in FIGS. 40A to 40D, as comprising an electronic cash register 611 operably connected to the automatic bar code reading system of the first illustrative embodiment by way of flexible communication cable 46. Low voltage DC power is provided to base unit 42 by way of flexible power supply cable 47. In this particular mounting installation, base unit 42 is supported on a horizontal countertop surface. If necessary or desired in such mounting installations, the base plate of base unit 42 may be weighted by affixing one or more dense mass elements to the upper surface of the base plate.

Figure 40A:
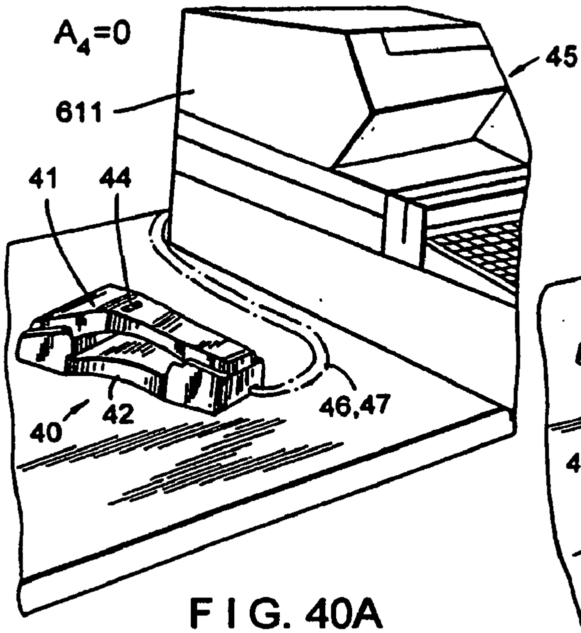
FIGS. 40A to 40D are perspective views of a point-of-sale system, showing the countertop base unit of FIG. 36C supported on a horizontal countertop surface and operably connected to an electronic cash register, with the automatic hand-supportable bar code symbol reading device of FIG. 2A being used in its hands-on mode of operation.
Figure 40B:
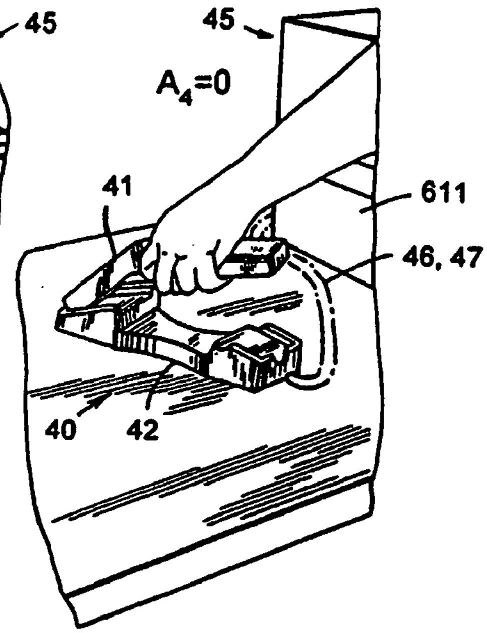

With automatically-activated bar code reading device 41 supported within scanner support stand portion of the base unit 42, as shown in FIG. 40A, the system is automatically induced into its automatic hands-free mode of operation with its manually-activated data transmission state. In order to induce the system into its hands-on mode of operation, the user simply encircles the handle portion of the hand-supportable device with his or her fingers, and then lifts the device out of the scanner support stand, as shown in FIG. 40B. Upon lifting the device out of its stand, the mode selection circuit 650 (e.g. including a Hall-effect magnetic flux sensor mounted in the handle of the bar code reading device housing) detects the absence of magnetic flux produced from a permanent magnet mounted in the support stand 43, and automatically generates the "hands-on" control activation signal (i.e. $A_4=0$) so as to induce the system into its hands-on mode of operation with its manually-activated data transmission state.

Figure 40C:
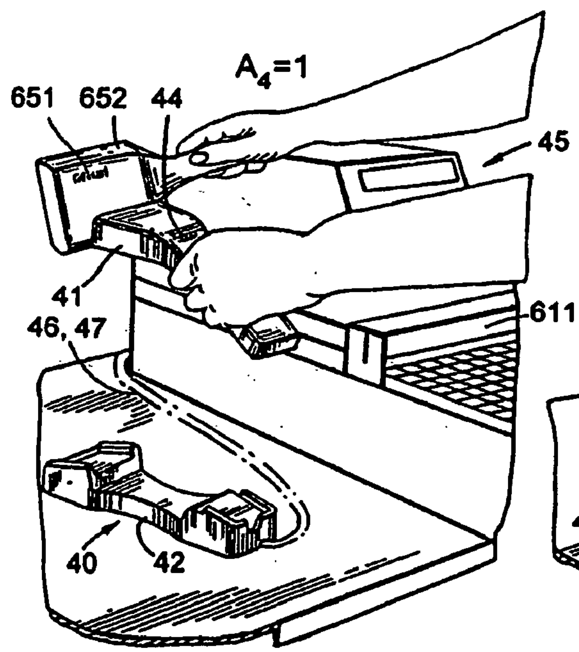
Figure 40D:
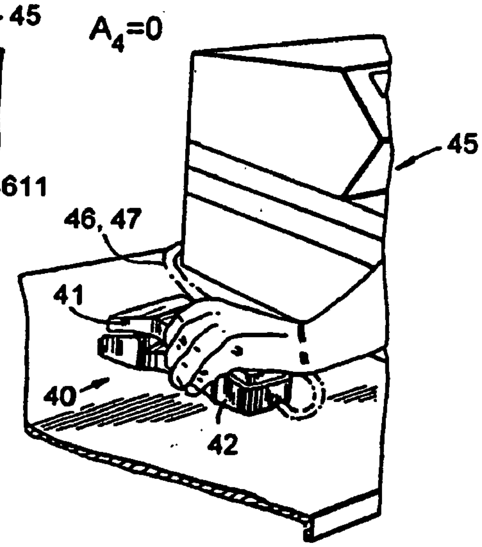

With the automatically-activated bar code reading device held in the user's hand, and a bar coded object 65 is moved into the object 651 detection field 9 of the device as shown in FIG. 40C, where the object is automatically detected, and the bar code symbol 652 thereon is automatically detected and read while the visible laser beam is repeatedly scanned across the bar code detection and reading fields. After each instance that a bar code symbol 651 has been successfully read (i.e. detected and decoded) symbol character data automatically produced, and the bar code symbol read state indicator activated, the user can manually-actuate the data transmission switch 44 on the exterior of the scanner housing, in order to cause data packets containing the automatically generated symbol character data to be automatically transmitted to and processed at base unit 42, as described hereinabove. In response to each successful data transmission to the base unit, a highly audible acoustical acknowledgement signal $S_{ack}$ of a predetermined pitch is produced therefrom to provide an audible signal to the user regarding this event. Thereafter, the bar code reading device can be used to read other bar code symbols, or placed back within the scanner support stand, as shown in FIG. 40D, where once again it is automatically induced into its hands-free mode of operation (i.e. $A_4=1$).

Figure 41A:
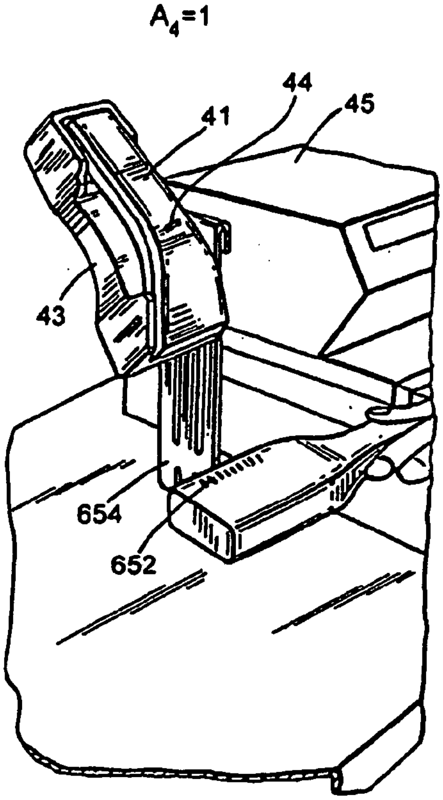
FIG. 41A is a perspective view of a point-of-sale station according to the present invention, showing the countertop base unit of FIG. 36C pivotally supported above a horizontal counter surface by way of a pedestal base mounted under an electronic cash register, and the automatic hand-supportable bar code symbol reading device of FIG. 2A received in the base unit while being used in its automatic "hands-free mode of operation;"
Figure 41B:
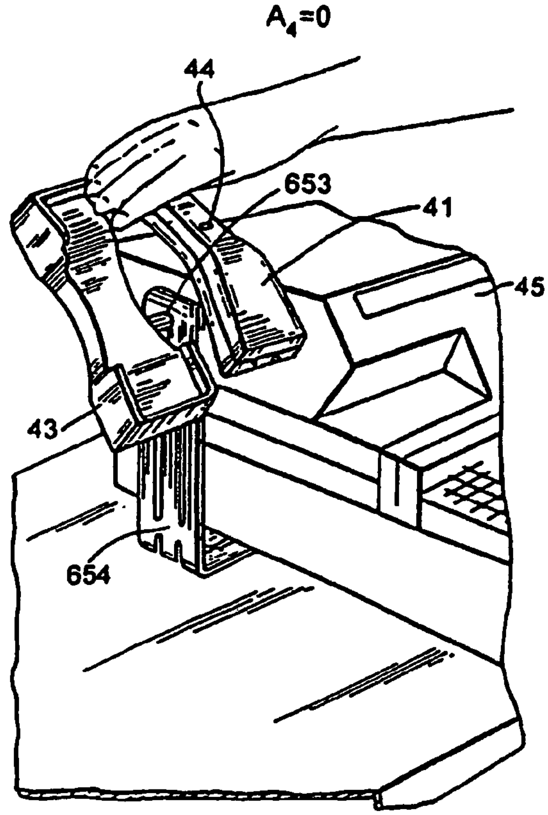
FIGS. 41B and 41C are perspective views of a point-of-sale station according to the present invention, showing the counter-top base unit of FIG. 36C pivotally supported above a horizontal counter surface by way of a pedestal base, and the automatic hand-supportable bar code symbol reading device being used in its automatic "hands-on" mode of operation.
Figure 41C:
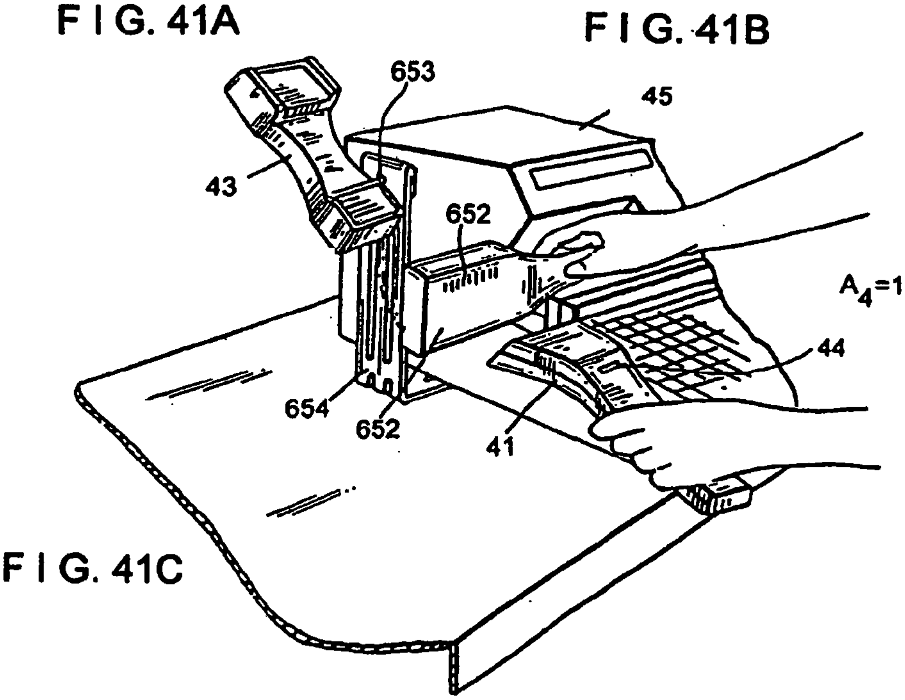

In FIGS. 41A to 41C, a POS station is shown comprising the automatic bar code reading system of FIGS. 2A to 2J, operably connected to electronic cash register 45 by way of flexible communication and power supply cables 46 and 47. In this particular mounting installation, base unit 42 and its associated scanner support stand are pivotally supported above a horizontal counter surface by way of a pivotal joint assembly 653 connected to a pedestal base 654 mounted under the electronic cash register, as shown. When installed in the manner illustrated, scanner support stand 43 can be adjustably positioned and locked into virtually any orientation in three-dimensional space, owing to the three principle degrees of freedom provided by the pivotal joint assembly.

With automatic bar code reading device 41 positioned within scanner stand portion of base unit 42 as shown in FIG. 41A, the system is automatically induced into its hands-free mode of operation by way of the mode-selection circuit 650, employing a magnetic flux sensing technique similar to that disclosed in copending application Ser. No. 07/761,123. In this state of operation, the data transmission control activation signal $A_4=1$ is continuously generated and provided to the system controller. By simply moving an object 651 into the object detection field 9, the bar code symbol 652 is repeatedly scanned by the visible laser beam scanned across the bar code detection and reading fields during bar code symbol detection and reading states of operation, respectively. To induce the automatic bar code reading system into its hands-on mode of operation, the user simply grasps the automatic bar code reading device 41 and lifts it out of the scanner support stand 43, as illustrated in FIG. 41B, whereby control activation signal $A_4$ is set to zero (i.e. $A_4=0$), thus enabling manual data transmission control activation. Then, by placing an object 651 into the object detection field as shown in FIG. 41C, the device automatically detects and reads the bar code symbol 652 thereon, and generates bar code symbol character data representative of the bar code symbol that has been read. If the user depresses the data transmission switch on the device, then the device automatically transmits the decoded symbol character data to the host system 45. Thereafter, the bar code symbol reading device can be placed back into the scanner support stand 43, similar to that shown in FIG. 41B, automatically inducing the system into its hands-free mode of operation (1B $A_4=1$). While the hands-on and hands-off states of operation have been illustrated with reference to the first illustrative embodiment of the bar code symbol reading device of the present invention shown in FIGS. 2A through 2H, it is understood that the other illustrative embodiments of the present invention disclosed herein are also provided with such modes of operation, that can be carried out in a like or similar manner.

Figure 42A:
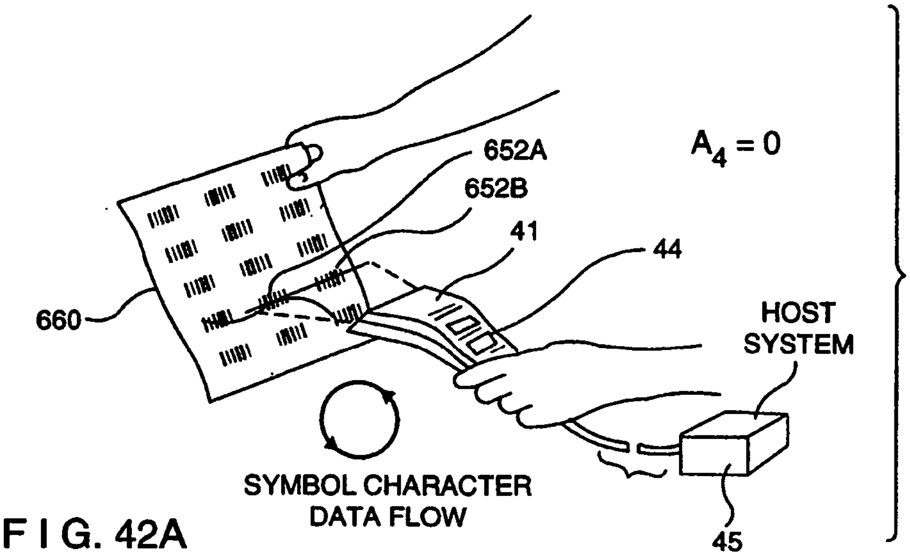
FIGS. 42A through 42C are perspective views of the automatically-activated bar code symbol reading system of FIG. 2A being used to read a bar code symbol menu in accordance with the principles of the present invention.

Returning now to FIGS. 42A through 42C, a novel method in accordance with the present invention will be described for reading bar code symbols printed on bar code symbol menus. In general, the first step of the method involves moving an automatically-activated bar code symbol reading device of the present invention adjacent a bar code symbol menu 660, as shown in FIG. 42A. In FIG. 42A, the visible laser scanning beam is shown scanned across two bar code symbols (652A and 652B) for illustrative purposes. In this configuration, the bar code symbol reading system automatically generates a new bar code symbol character data string each time a bar code symbol is read during the bar code symbol reading cycle. In the present illustration, both of the scanned bar code symbols 652A and 652B are assumed to be read in an alternating manner, and thus (bar code) symbol character data strings (i.e. elements) representative thereof are automatically generated in a cyclical manner, as shown in FIG. 42A. At this stage of the method, symbol character data strings are repeatedly generated and the "bar code symbol read state" indicator repeatedly driven in correspondence with the generated symbol character data, but none of these symbol character data elements are transmitted to the host system 45 during this phase of the bar code symbol reading cycle.

Figure 42B:
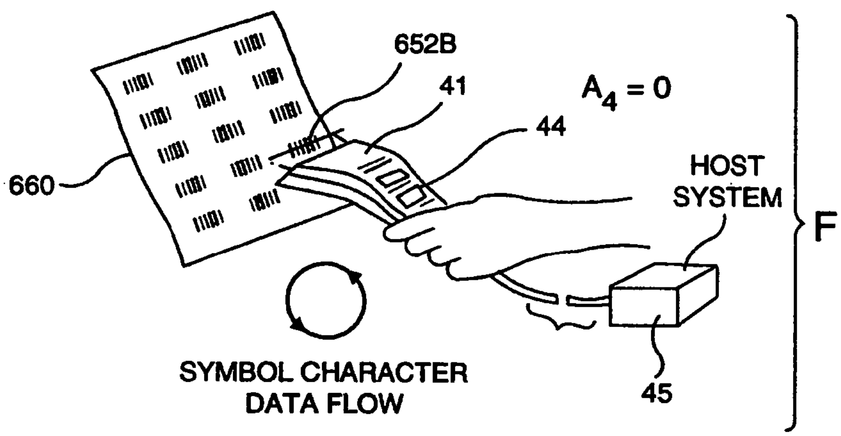

In FIG. 42B, the user is shown moving the bar code symbol reader closer to a particular bar code symbol sought to be read. At this stage of the method, symbol character data strings (associated with the particular bar code symbol) are repeatedly generated and the "bar code symbol read state" indicator repeatedly driven in correspondence with the generated symbol character data, but none of these symbol character data elements are transmitted to the host system 45 during this phase of the bar code symbol reading cycle.

Figure 42C:
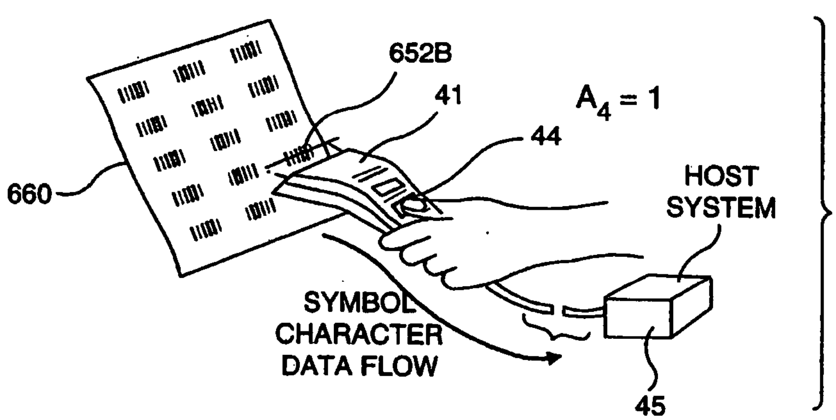

In FIG. 42C, the user is shown depressing the data transmission switch 44 on the automatically-activated bar code symbol reading device 41 momentarily after the bar code symbol read state indicator has been observed to be driven. In response to the manual activation of the data transmission switch 44, a subsequently produced symbol character data string (associated with the particular bar code symbol) is automatically selected within the bar code symbol reading device and transmitted to the host system to which it is connected. At substantially the same instant, the "data transmission state" indicator on the device is momentarily driven for the user to see in the form of visual feedback. To re-transmit a previously transmitted symbol character data string collected from the bar code symbol menu, the user need only depress the data transmission switch 44 once again while the particular bar code symbol remains aligned with the visible scanning beam. Such retransmission of the symbol character data string is carried out upon each depression of the data transmission switch 44. Notably, during each retransmission of symbol character data, there is no need to redetect the object underlying the bar code symbol, or momentarily moving off the read bar code symbol before rereading it and retransmitting its symbol character data to the host system.

Wireless Automatic Hand-Supportable Bar Code Symbol Reading Device of the Present Invention With Automatic Range-Dependent Data Transmission Control FIGS. 43A through 43D show an alternative embodiment of the automatic wireless laser scanning bar code symbol reading system of the present invention 790 employing a 2-way RF-based data communication link between its cradle-providing base station 792 and its wireless hand-supportable code symbol reading device 791 employing a manually-operated data transmission activation switch 303 that is controlled by automatically detecting whether or not the hand-supportable wireless device is located within the RF communication range of the RF-based data communication link. In the illustrative embodiment, this range-dependent condition is detected by detecting the strength of "heartbeat" signals transmitted from the base station 792 to the wireless hand-supportable device. If the hand-supportable scanning device 791 is located out-side of the predetermined 2-way RF communication range, then an audible and/or visual indicator is generated and packaged symbol character data is automatically buffered within the memory storage of device until the device moves into its communication range at a later time, during the next requested data transmission to the host computer system. This wireless hand-held scanning system 790 is designed for use in point-of-sale environments or light warehousing applications. This system design offers operators convenience and freedom of mobility.

The systems design for this illustrative system embodiment 790 is illustrated in FIGS. 45A1 through 45A4, and is very similar to the system design employed in FIGS. 15A1 through 15A4, with following modifications: (1) the 2-way RF data communication link employed therein is implemented by providing Bluetooth™ RF transceiver chip sets 803 and 804 in both the hand-supportable device 791 and the remove cradle-providing base station 792; (2) a Data Packet Group Buffer (i.e. FIFO) 802 is added and arranged in data communication with the Data Packet Transmission Circuit 321 under the control of $C_3$ Control Module 314 using enable signal $E_{11}$; (3) Data Packet Transmission Circuit 321 is controlled by $C_3$ Control Module 314 using enable signal $E_{10}$; (4) an Out-Of-Communication Range Indicator (audible and/or visual) 805 has been added to the system and arranged under the $C_3$ Control Module, for generating audible and/or visual indications to the operator when the hand-supportable bar code reader is moved outside of the communication range of the system; and (5) additional control system logic programmed into the system control process illustrated in the flow charts of FIGS. 46A1 through 46C4, so as to enable the wireless bar code reader to (i) read a barcode while out of the communication range of its remote base station, (ii) store such data until communication can be reestablished between the wireless unit and the base station, and then (3) transmit the data to the base station when the wireless device is located within the communication range of the system. Preferrably, the memory storage capacity of the Data Packet Group Buffer 802 will be sufficient to hold numerous bar code symbols read while the wireless device is outside the communication range of its remote base station.

The details of how to integrate Bluetooth™ RF-based 2-way data communication chip set module technology into wireless applications is generally well known in the art. Reference can be made to supporting documentation located at the official Bluetooth™ Website http://www.bluetooth-.com, which is hereby incorporated herein by reference in its entirety as if set forth fully herein.

Such Bluetooth™ 2-way RF data communication link technology currently has a radio range of approximately 10 m (30 ft), or 100 m optionally. The Bluetooth™ communication protocol employed in the system of this illustrative embodiment enables the reader to operate within a 10 m range. The scanner contains a Bluetooth module, with its own micro-controller that is internal or external to the Bluetooth chipset, that handles the wireless communication. During implementation, a Bluetooth™ module is directly connected to the CPU of the wireless reader (as well as to a CPU within the base station) and it notifies the scanner CPU when the wireless link has been established between the scanner and the receiver (cradle), as well as when the link that been severed.

To implement the wireless data transmission method of the present invention, the reader's system control software always stores in its memory its current "link status" with the base station which is indicated by $A_5$=1 when the link status is GOOD, and $A_5$=0 when the link status is NO GOOD. This link status information is obtained by monitoring "heartbeat signals" transmitted from the base station to the wireless bar code reader unit. When the data transmission activation button 330 is pressed after a valid read, the system control software first checks the wireless link status. If the link has been established, which means that the base station-receiver is in range, then the wireless bar code reader transmits the stored barcode data immediately. If the link has not been established, which means that the base station/receiver is out of range, the wireless reader does not attempt to transmit the barcode data. Instead, it periodically checks the link status until either a link is reestablished and the barcode is transmitted, or until a new barcode has been read and old barcode data discarded.

Another feature which can be programmed into the control process of the system is that after the first read, the decoded data transmission is transmitted to the base unit, meanwhile the laser is turned off, and locked. After the base unit receives the correct data, it will send an ACK command to the wireless reader, and then the laser can be unlocked and reenabled. Then the second read can be processed.

The wireless reader may also be programmed to require the user to press the data transmission activation button another time to transmit the barcode after it has just established a new communication link with its base station. This feature would allow user to rescan a different code to overwrite data before it is sent to the host system via the base station. The system control process can also be programmed to enables multiple reads to be stored before data transmission is to occur to the base station after depressing the data transmission activation switch 330.

The system can be programmed so that all three LEDs illuminate to indicate that wireless reader is out of range, as well as so that all three LEDs illuminate to indicate that there is stored data in the Data Packet Group Buffer 802 waiting to be transmitted to the base station. Also, the system can be programmed so that stored data can be cleared by holding down the data transmission activation switch 330 for programmed duration (i.e. 3 sec.).

Also, the system can be programmed so that it tests its data communication link before transmission of data packets buffered in memory. With this feature, the systems can avoid losing barcode caused by the disconnection of the reader and its base station. Before the reader sends data to its base station, it will test the connection first; and if the connection is broken, then the wireless reader will hold the barcode data and try to establish the connection. When the connection is established again, then the wireless reader will send the stored barcode to its base station.

FIGS. 46A1 through 46C4 illustrates the steps involved in the control process carried out by the control subsystem of the bar code symbol reading system of FIGS. 45A1 through 45A4. This process is similar to the process shown in FIGS. 20A1 through 20E, except for at Blocks Y through FF shown in FIGS. 46C2 and 46C3 which relate to the range-dependent data packet transmission control feature of the present invention.

The system shown in FIGS. 43A through 46C8 also embodied a number of other technical features which shall now be specified below.

For example, a mechanical vibrator can be included within the hand-supportable housing of the wireless device so that when scan data transmission from the reader to the base station is successful, then the reader automatically vibrates. The mechanical vibrator would be arranged under the control of $C_3$ Control Module. In a noisy environment, this feature should provide a clear signal to the operator that the transmission status has been successful.

A low battery protection circuit can be provided within the wireless hand-supportable reader for (i) automatically monitoring battery voltage; (ii) razzing/vibrating the reader if the battery voltage is low, and turning off laser diode within the device, and causing the system to enter its sleep mode. This circuit can protect the battery from over-discharge and data errors, because the current drawn from the battery will be much higher when its voltage is too low.

When wireless reader of the present invention switches into its sleep mode (however it was caused to enter this date), the microcontroller used with each Bluetooth™ RF transceiver chip set (aboard the wireless reader and base station alike) will issue the disconnect commands, causing the data communication link between the wireless bar code reader (i.e. or data terminal) and its base station to be terminated. Thereafter, these microcontrollers enter an idle mode and associated Bluetooth™ RF transceiver chip sets are automatically driven into a low power mode. When the wireless reader is waked up, these microcontrollers are also woken up at the same time, and the transceivers activated and the communication link reestablished. All of these actions are automatically carried out within the wireless communication system of the present invention. All that the operator is required to do during such periods of non-operation is to push the data transmission activation switch 330 in order to wake up the system.

As shown in the figures, the systems power switch can be located at the rear end of reader's housing, and accessible by way of a small pin hole. With this feature, the operator can disconnect the battery using the power switch at the rear of the reader. It provides a simple way to save electrical power and will protect the battery aboard the wireless reader. In addition, this switch can serve as a hardware reset button when something is wrong with the reader.

As illustrated in the figures, the cradle of the base station is provided with protractable/retractable support hooks for supporting the hand-held reader in vertical and horizontal orientations alike.

This feature permits the cradle/base station to be easily mounted to either a desk or to a wall surface.

Another object of the present invention is to enable wireless update the wireless bar code reader's firmware. With this feature, the reader's firmware can be updated by a host computer. To achieve this, the host computer sends a command to base station then the base station will send the command to the wireless reader. Thereafter, the base station transmits firmware code (e.g. associated with the Bluetooth™ wireless data communications interface) from the host computer to the wireless reader. Then using the updated code received by the wireless reader, the reader can update its firmware according to these codes upon entering a firmware update mode of operation.

Wireless Automatic Hand-Supportable 2-D Bar Code Symbol Reading Device of the Present Invention With Automatic Range-Dependent Data Transmission Control VoyagerPDF™, a hand-held laser scanner capable of decoding all standard linear bar codes as well as certain 2-D codes, including PDF417, PDF417 truncated, and RSS composite. With a simple swipe of the easy-to-view laser line over the 2-D code, data is captured, decoded, and transmitted quickly and easily. For linear codes, VoyagerPDF operates in the same fashion as a VoyagerCG®. Simply aim the laser line on a desired bar code, press the patented CodeGate® button, and the data is transmitted.

FIG. 47 shows an alternative embodiment of the automatic wireless laser scanning bar code symbol reading system of the present invention shown in FIGS. 43A–46C4, modified to support the reading of 2-D bar code symbols (e.g. such as the PDF 417 symbology) and the novel 2-way RF-based data communication link interface illustrated in FIGS. 43A–46C4. As shown in FIG. 47, this system is designed to operate by the operator manually moving the linear laser scanning pattern generated from the wireless reader in a downward direction along the height dimension of the 2-D bar code structure. Therewhile, the Bar Code Symbol Data Detector (311') employed therein automatically generates Scan Data Activation Signal $A_2=1$, whereupon the $C_2$ Control Module 313 automatically activates a Audible Data Capture Buffering Indicator (e.g. piezo-electrical transducer) 306, causing audible sounds (e.g. clicks) to be generated as each line of bar code symbol data is detected thereby prior to 2-D symbol decoding.

When the data scanning/collection/buffering process is completed (with the swiping of the linear laser pattern across the 2-D bar code symbol), and each line collected scan data is buffered in memory and ready for decode processing, the system automatically generates a visual indication of such completion (via LEDs on the wireless reader), and if the operator has depressed the data transmission activation switch 330 within when the scanning process is completed, then data packets are automatically transmitted to the remote base station in accordance with the principles of the present invention herein. If the wireless reader is moved outside its communication range, then the data packets are buffered in the Data Packet Group Buffer 802 and subsequently transmitted to the base unit when link status is resumed, as described in detail above.

As illustrated in FIGS. 47A1 through 47A4, the system of FIG. 47 is similar to the system shown and described in FIGS. 43A 46C4, except that the system of FIG. 47 employs Barcode Symbol Data Detection Circuit 311' (for detecting lines of 2-D bar code symbols being scanned) instead of Bar Code Symbol Presence Detection Circuit 311 which has been designed to detect the presence of complete 1-D bar code symbols in a real-time manner; (2) Audible Scan Data Capture Buffering Indicator 806, for generating audible clicking or like sounds during the line by line capture of 2-D bar code symbol scan data during bar code swiping operations illustrated in FIG. 47; and (3) a visual indicator (LEDs) for signaling to the operator that the 2-D bar code symbol has been scanned and decoded (i.e. read).

FIGS. 47A1 through 47C4 shows a high level flow chart of the control process carried out by the control subsystem of the bar code symbol reading system of FIGS. 47A1 through 47A4. The primary points of difference between the control processes of the system shown in FIGS. 47 and 43A are indicated at blocks Y through FF.

Having described the preferred embodiments of the present invention, several modifications come to mind.

For example, in the illustrative embodiments of the present invention, particular types of bar code symbol reading engines disclosed herein have been suggested for incorporation into various types of systems differentiated primarily on the basis of their form factors. It is understood, however, that with or without mode function, any bar code symbol reading engine disclosed herein can be incorporated into any bar code symbol reading system, regardless of its form factor in relation to the form factor of the engine.

While various types of laser scanning bar code symbol reading mechanisms disclosed herein have been shown or realized in the form of an engine, having a separate housing or module, it is understood that each such mechanism need not have a separate housing or modular structure, but can be integrated directly into the structure of the hand-supportable housing of the bar code symbol reading device.

In alternative embodiments of the present invention, the automatic portable bar code symbol reading device may not incorporate within its housing, electronic circuitry for carrying out control, decoding and other data processing functions. Instead such electronic circuitry may be contained within a remote unit operably associated with the hand-supportable device by way of the flexible scanner cable. In such embodiments, the hand-supportable device will function as an automatic hand-supportable laser scanner, rather than a bar code symbol reader.

While the indicator lights provided on the automatic bar code symbol reading devices of the present invention have be linked or correlated to particular states of operation within such devices, it is understood that in alternative embodiments hereof such indicator lights may be configured to indicate different types of information to the user for the purpose of, for example, facilitating easy operation, maintenance and the like in various user environments.

While the illustrative embodiments of the present invention have been described in connection with various types of bar code symbol reading applications involving 1-D and 2-D bar code structures, it is understood that the present invention can be used in connection with any machine-readable indicia or graphical structures including, but not limited to bar code symbol structures. Hereinafter, the term code symbol shall be deemed to include such information carrying structures.

It is understood that the laser scanning modules, engines and bar code symbol reading systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. An automatically-activated wireless bar code symbol reading system for use in a work environment and having an operational mode and a sleep mode, said automatically-activated wireless bar code symbol reading system comprising:

(A) a wireless hand-supportable bar code symbol reader in two-way RF communication with a base station operably connected to a host system, by way of an RF-based wireless data communication link having a predetermined RF communication range over which two-way communication of data packets can occur, said wireless hand-supportable bar code reader including (1) a hand-supportable housing, having a light transmission window, (2) a battery disposed within said hand-supportable housing, for supplying electrical power to electrical-energy consuming components employed therewithin;

(3) an objection detection subsystem disposed within said hand-supportable housing, for automatically detecting an object within the vicinity of said light transmission window and generating a control activation signal in response thereto;

(4) an automatic bar code symbol reading mechanism, disposed in said hand-supportable housing and responsive to the generation of said control activation signal, for automatically reading a bar code symbol on an object and producing a symbol character data string representative of said read bar code symbol, (5) a first RF-based transceiver chipset, disposed in said hand-supportable housing, for transmitting data packets corresponding to said produced symbol character data string, to said base station and for subsequent transmission to said host system, (6) a battery power level detection circuit for automatically detecting the available electrical power remaining within said wireless hand-supportable bar code symbol reader, and when said power level is detected as falling below a predetermined threshold, automatically generating a control signal which causes said automatically-activated wireless bar code symbol reading system to enter said sleep mode, (7) a manually-actuatable switch disposed on said hand-supportable housing for causing said system to exit said sleep mode and re-enter said operational mode, and (8) a first microcontroller, operably associated with said first RF-based transceiver chipset, for controlling the operation of said first RF-based transceiver chipset; and (B) said base station installable within a work environment and including (1) a base station housing, (2) a second RF-based transceiver chipset, disposed within said base station housing, for receiving data packets corresponding to said symbol character data strings transmitted from said first RF-based transceiver chipset, and (3) a second microcontroller, operably associated with said second RF-based transceiver chipset, for controlling the operation of the second RF-based transceiver chipset;

wherein said first and second RF-based transceiver chipsets enable said RF-based wireless data communication link between said wireless hand-supportable bar code symbol reader and said base station;

wherein said first and second RF-based transceiver chipsets cooperate to enable the communication of data packets over said RF-based wireless data communication link, during said operational mode;

wherein said second RF-based transceiver includes means for automatically generating and transmitting a reference signal to said first RF-based transceiver circuit over said RF-based wireless data communication link;

wherein said first RF-based transceiver circuit includes means for automatically receiving said reference signal and detecting the strength of said reference signal; and wherein when said system enters said sleep mode, then said first and second RF-based chipsets and said first and second microcontrollers associated therewith are automatically deactivated and said RF-based wireless data communication link is terminated to conserve said electrical power within said wireless hand-supportable bar code symbol reader, and wherein, when said system re-enters its operational mode, then said first and second RF-based chipsets and said first and second microcontrollers associated therewith are automatically reactivated and said RF-based wireless data communication link is re-established to resume communication between said wireless hand-supportable bar code symbol reader and said base station.

2. The automatically-activated wireless laser scanning bar code symbol reading system of claim 1, wherein said base station further comprises: a cradle portion adapted for receiving said hand-supportable housing.

3. The automatically-activated wireless laser scanning bar code symbol reading system of claim 1, wherein said reference signal is a heartbeat-type signal generated from said second RF-based transceiver circuit.

4. The automatically-activated wireless laser scanning bar code symbol reading system of claim 1, which further comprises an indicator, integrated with said hand-supportable housing, for indicating each instance of when a bar code symbol is read by said automatic bar code symbol reading mechanism and a symbol character data string representative of said read bar code symbol is produced.

5. The automatically-activated wireless laser scanning bar code symbol reading system of claim 1, wherein said objection detection subsystem comprises infrared (IR) signal transmission/receiving circuitry for automatically detecting said object within an object detection field definable relative to said hand-supportable housing.

6. The automatically-activated wireless laser scanning bar code symbol reading system of claim 1, wherein said objection detection subsystem comprises a low-power non-visible laser beam signaling mechanism for automatically detecting said object within an object detection field definable relative to said hand-supportable housing.

* * * * *